United States Patent [19]

Nielsen et al.

[11] Patent Number: 5,187,797
[45] Date of Patent: Feb. 16, 1993

[54] MACHINE INTERFACE SYSTEM WITH HIERARCHAL MENUS ALLOWING USER SEQUENCING AND SELECTION OF MENU ITEMS BY ACTUATION OF THREE SWITCHES

[75] Inventors: Wyn Y. Nielsen, La Jolla; Steven C. Carlin, Spring Valley; Dennis A. Kaiser, Escondido, all of Calif.

[73] Assignee: Solatrol, Inc., San Diego, Calif.

[21] Appl. No.: 334,244

[22] Filed: Apr. 5, 1989

Related U.S. Application Data

[63] Continuation-in-part of Ser. No. 255,156, Oct. 4, 1988, Pat. No. 5,124,942, which is a continuation-in-part of Ser. No. 250,841, Sep. 28, 1988, abandoned.

[51] Int. Cl.⁵ .................................................. G06F 3/02
[52] U.S. Cl. .................................. 395/800; 395/156; 395/160; 364/146; 364/188; 364/DIG. 2; 364/948.2; 364/948.22; 364/921
[58] Field of Search ... 364/200 MS File, 900 MS File, 364/144, 146, 188, 474.01, 474.22, 474.27, 518, 521; 340/792, 825.44; 395/155, 156, 160

[56] References Cited

U.S. PATENT DOCUMENTS

| | | | |
|---|---|---|---|
| 4,024,531 | 5/1977 | Ashby | 340/792 X |
| 4,425,627 | 1/1984 | Eibner | 364/900 |
| 4,635,030 | 1/1987 | Ranch | 340/52 F |
| 4,646,081 | 2/1987 | Tsunoda | 340/825.44 |
| 4,660,031 | 4/1987 | Buchas | 340/792 |
| 4,660,032 | 4/1987 | Tsunoda | 340/825.44 |
| 4,695,942 | 10/1987 | Levine et al. | 364/146 |
| 4,723,207 | 2/1988 | Isobe et al. | 364/171 |
| 4,727,473 | 2/1988 | Anderson et al. | 364/188 |
| 4,823,253 | 4/1989 | Shima et al. | 364/167.01 |
| 4,823,283 | 4/1989 | Diehm et al. | 364/518 |
| 4,846,597 | 7/1989 | Bryant et al. | 400/472 |
| 4,931,769 | 6/1990 | Philips et al. | 340/541 |
| 5,016,003 | 5/1991 | Rice, Jr. et al. | 340/825.19 |
| 5,041;967 | 8/1991 | Ephrath et al. | 364/200 |

FOREIGN PATENT DOCUMENTS 2054909 2/1981 United Kingdom ........... 364/474.27

*Primary Examiner*—Thomas C. Lee
*Assistant Examiner*—Ric... ...is
*Attorney, Agent, or Firm*—William Fuess

[57] ABSTRACT

A user interface, typically to an irrigation controller, prompts user responses by asking questions. The questions are hierarchally organized, preferably in a hierarchal tree having approximately three to six questions on each hierarchal level between root and leaves. All command and data input may be done with only an "OK" pushbutton switch, and with an additional " ↑ ", or " ↓ " pushbuttom switches. Each "OK" user response affirms the premise of a currently-displayed question, and advances the questioning to a related branch upon a next hierarchal level. The " ↑ " pushbutton is used to advance the questioning in a first direction. An optimal " ↓ ", or down arrow,pushbutton switch advances the presentation of successive questions in a second direction. An optional "HELP" switch invokes context-sensitive help messages.

26 Claims, 26 Drawing Sheets

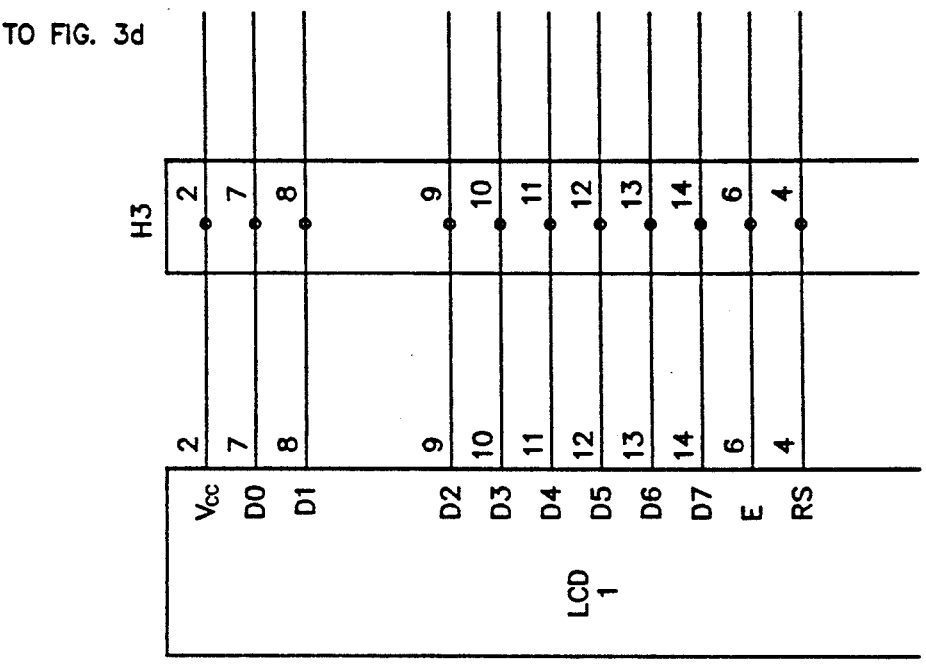
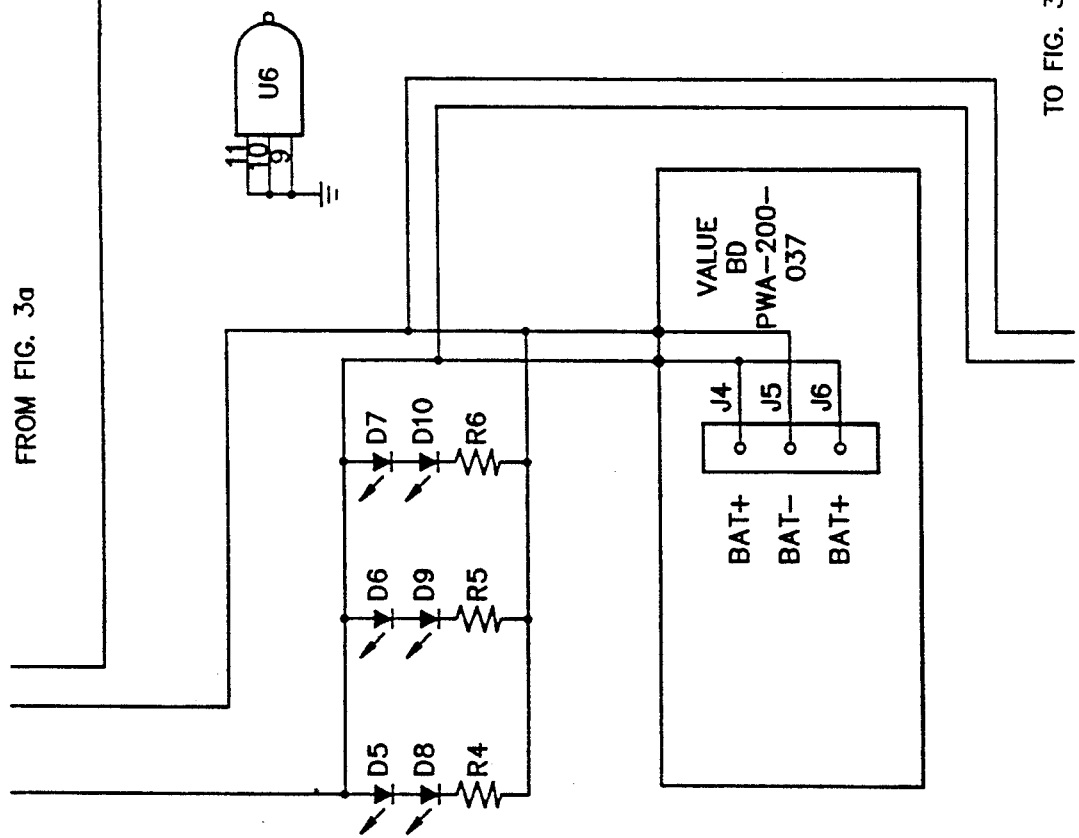
FIG. 3c

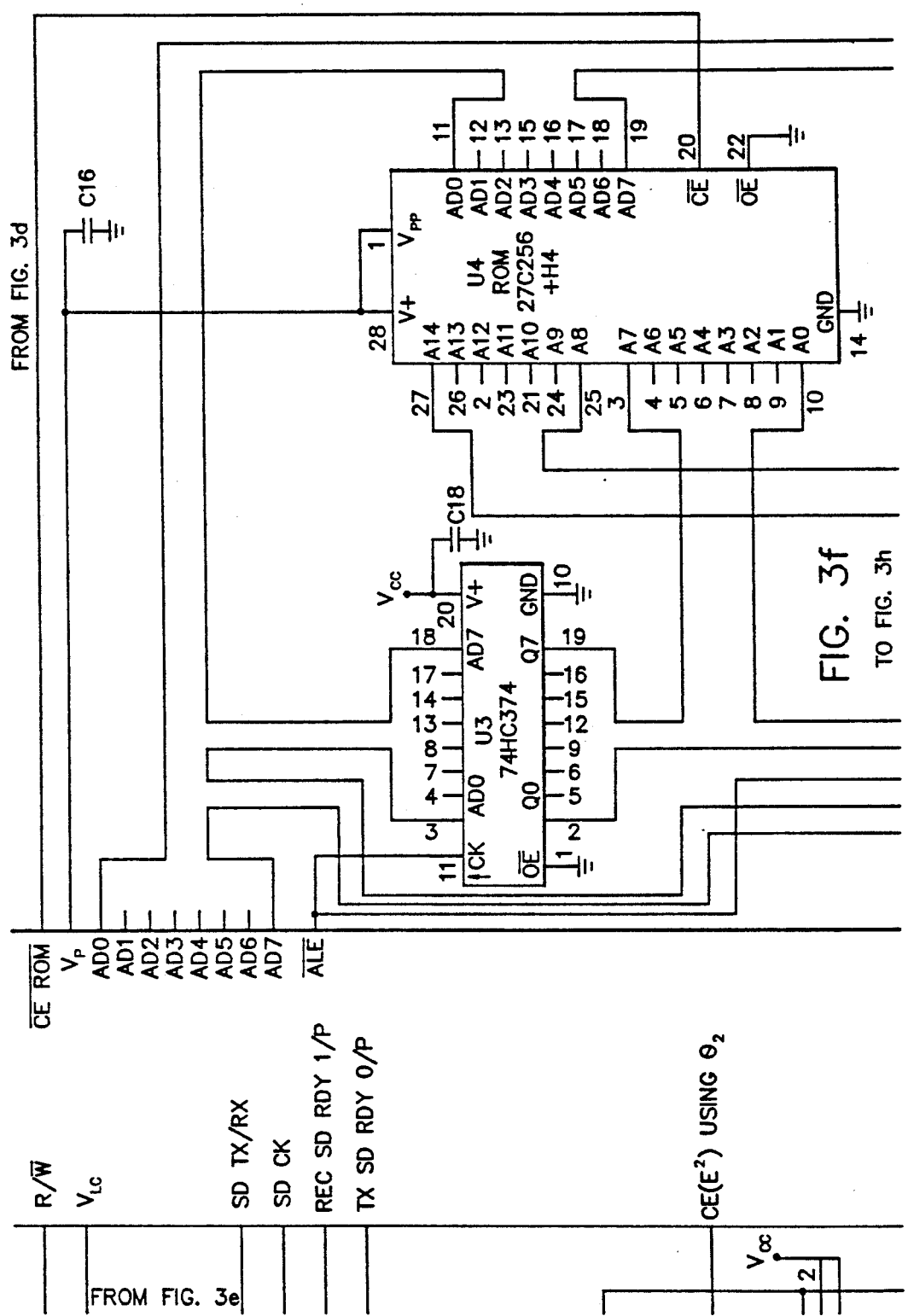

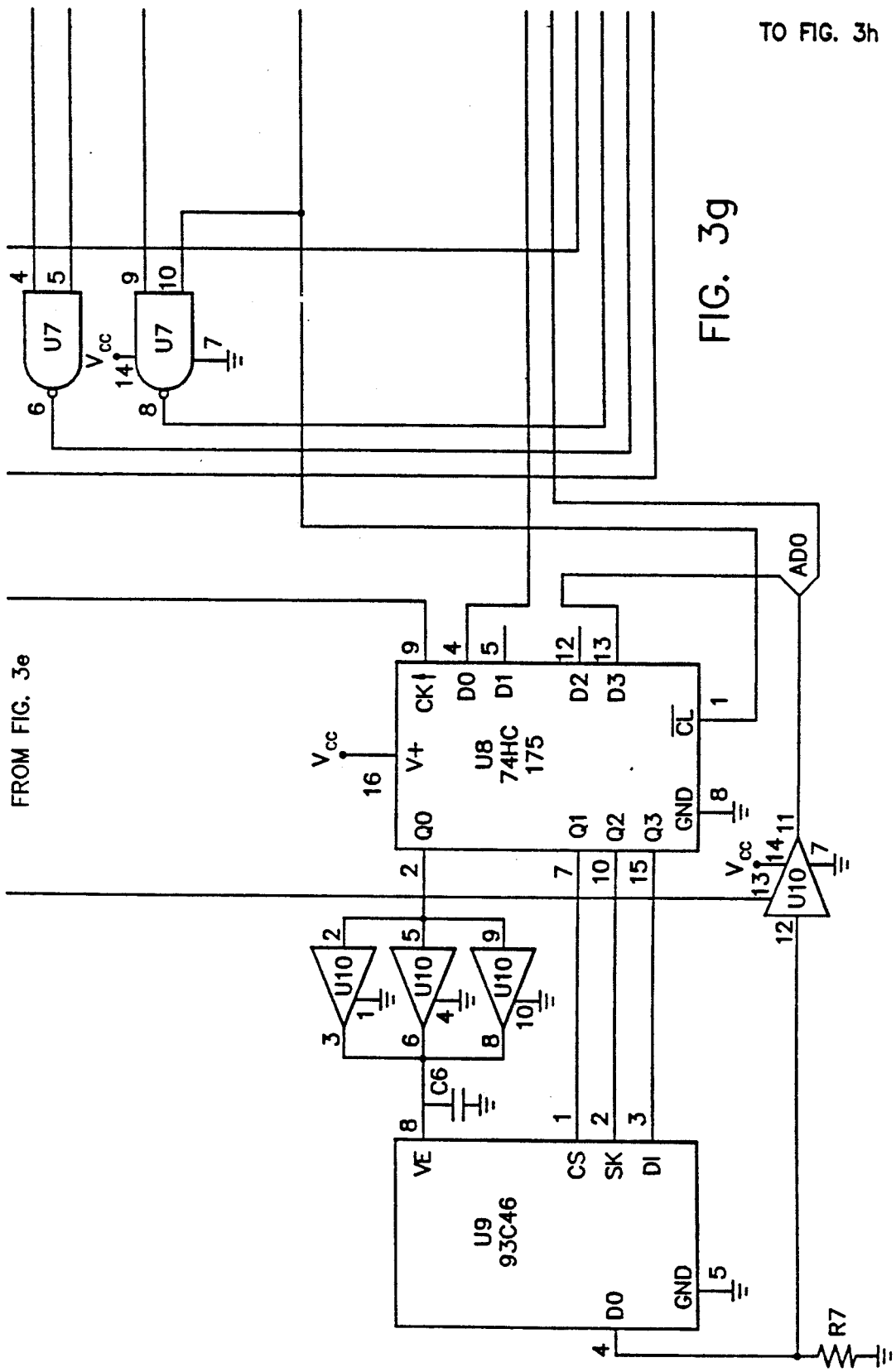

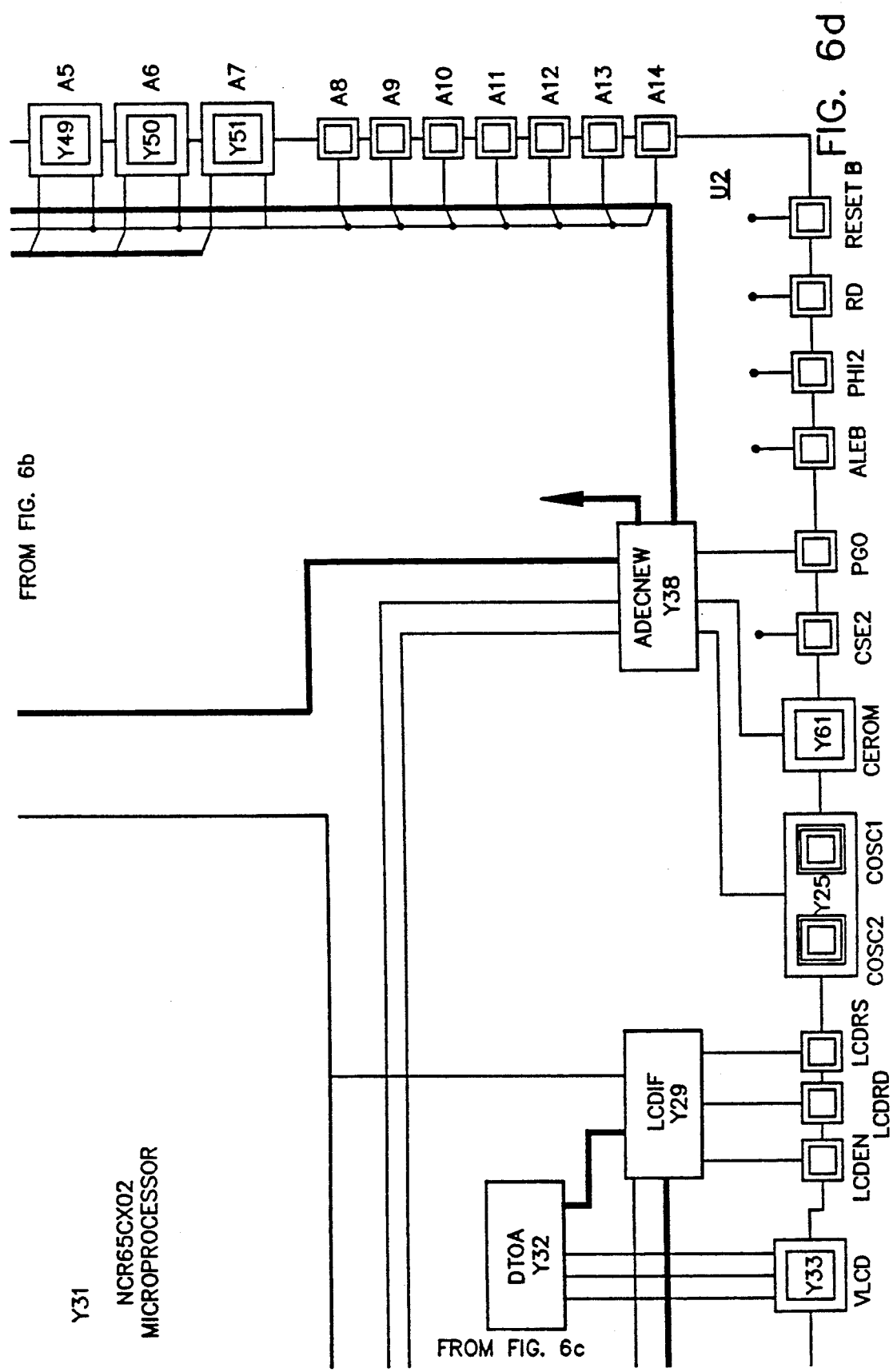

| KEY \ MODE | HELP | OPTION FIELD | NUMERIC ENTRY | WORD ENTRY |
|---|---|---|---|---|
| (HELP) | HOW TO USE HELP | EXPLAINS QUESTION AND CURRENT OPTION | EXPLAINS QUESTION | EXPLAINS QUESTION |
| (↓) | PREVIOUS HELP SCREEN OR END | PREVIOUS OPTION / AUTO-REPEAT SLOW | DECREMENT NUMBER / AUTO-REPEAT FAST | PREVIOUS CHARACTER / AUTO-REPEAT FAST |
| (↑) | NEXT HELP SCREEN OR END | NEXT OPTION / AUTO-REPEAT SLOW | INCREMENT NUMBER / AUTO-REPEAT FAST | NEXT CHARACTER / AUTO-REPEAT FAST |
| (OK) |  | SELECT CURRENT OPTION | SELECT NUMBER | SELECT CURRENT CHARACTER & SKIP TO NEXT |

FIG. 7

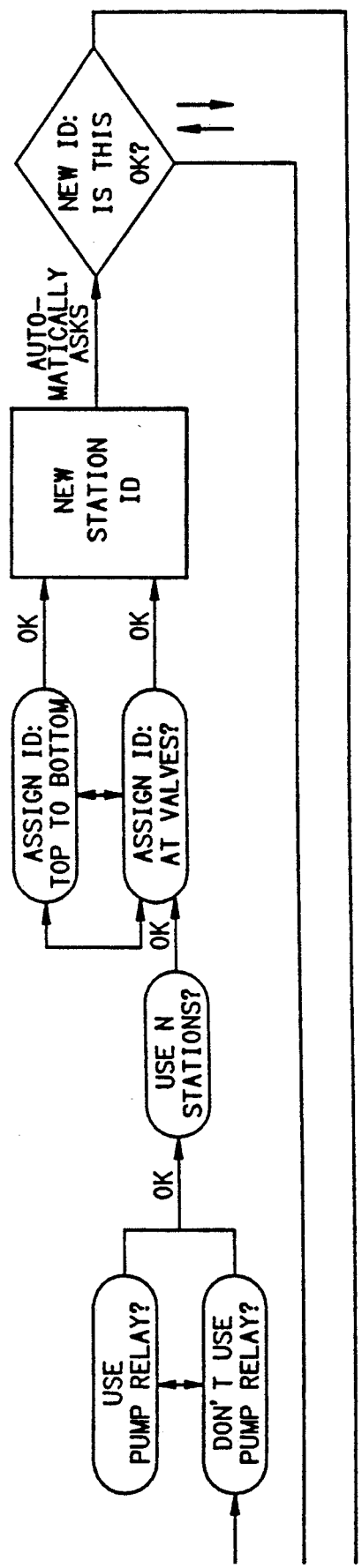

MACHINE INTERFACE SYSTEM WITH HIERARCHAL MENUS ALLOWING USER SEQUENCING AND SELECTION OF MENU ITEMS BY ACTUATION OF THREE SWITCHES

The present patent application is a continuation-in-part of patent application U.S. Ser. No. 255,156 filed Oct. 4, 1988 for QUERY-RESPONSE USER PROGRAMMING OF COMPLEX SEQUENCES, now U.S. Pat. No. 5,124,942, which is a continuation-in-part of patent application U.S. Ser. No. 250,841 filed Sept. 28, 1988 for a FLEXIBLY PROGRAMMABLE IRRIGATION SYSTEM CONTROLLER now abandoned.

BACKGROUND OF THE INVENTION 1.0 Field of the Invention

The present invention concerns electronic devices having a man-machine interface for the display of information and/or status and for the receipt of information and/or control. The present invention more particularly concerns man-machine interfaces where cost and/or physical size constraints limit the display size to a few words or lines, and where, for the same constraints, a full user keyboard is impractical.

2.0

Background Art

The advent and widespread low-cost availability of microprocessors and other powerful digital logic building blocks has given rise to an astonishing array of products exhibiting machine "intelligence". This machine "intelligence" often takes the form of increased flexibility and responsiveness to particular user dictates. The user must make his/her dictates known to the machine through a man-machine interface. The man-machine interface desirably permits detailed user control of the machine.

If a complex machine is to be flexibly controlled by its user at its user interface then an extensive sequence of commands and/or data must typically be entered by the user into the machine. This information entry must typically be in accordance with rigorous procedures. The required exactitude is difficult to achieve, especially to the extent that the required entries are extensive, complex, or infrequently performed.

The goal of man-machine interface design is to permit effective and efficient communication between man and machine, considering the costs to both.

At one end of the spectrum of common interfaces between men and "intelligent" (meaning variably flexibly controllable) machines is the typical interface to a complex, multi-function, digital watch. This interface is characterized by having a very narrow information transfer bandwidth. The user must make large amounts of data and control information known to the watch through typically but a few pushbutton switches. A problem exists with this interface in that large numbers of people desiring to exercise the full functionality of a complex, multi-function, digital watch cannot effectively do so, or are deterred from doing so.

At the other end of the spectrum of common manmachine interfaces is the personal computer. Information is typically entered into the computer by a keyboard or tablet (mouse). The computer typically displays information, questions, and help messages upon a video monitor. The informational bandwidth of this interface is much wider than the informational bandwidth of the user interface to a digital watch. This wider informational bandwidth is required in order to support the relatively more complex tasks that are commanded and parameterized across the interface.

A notable characteristic of the man-machine interfaces exhibiting a relatively wider informational bandwidth, such as those of personal computers, is that the man can usually elicit prompts, questions, and/or help messages from the machine. This capability of the machine to guide the human in performing necessary procedures to enter information is designed to reduce the burden on the human, and to facilitate necessary communication.

In the middle of the spectrum of common manmachine interfaces exist a variety of relatively rudimentary interfaces which, although elementary, must support the human control and parameterization of machines of considerable functional complexity. Interfaces, and machines, in this middle range include common household appliances like microwave ovens and Video Cassette Recorders (VCR's).

A common strategy for implementing man-machine interfaces in this middle range is to use a large number of switches each of which is assigned to a particular datum, or function. Typically, a small display is controlled by the machine. A proliferation of dedicated switches costs money, and occupies considerable room. Nonetheless, when an appropriate multi-function display area shows at various times either prompts or status, and when additional display area is devoted to printed instructions and catalogs, most users manage to use this type of man-machine interface to good effect.

Sometimes, however, the control panels become crowded with switches. The functions enabled become increasingly arcane. The cross-compatibility between the user interfaces of different products becomes nonexistent, making a user unable to transfer his knowledge and experience from one product to another.

Another problem occurs with man-machine interfaces if the number of switches and/or the size of the display is limited (i.e., the information bandwidth is constricted), or if the complexity of the required control is high. This problem is exemplified by the common interface to a VCR. A small display presents the VCR status and parameterization. Because the VCR can be set to initiate and to conclude actions, such as recording of television, at many different times, a great number of similarly-appearing time datums are variously multiplexed into the small display. The user tends to lose track of what times he/she has and has not specified, and also of his/her progress in the intricate stepwise procedures for selecting and setting a number of different timed occurrences. The programming is consequently often erroneous. The user's failure to have programmed the VCR as he/she desired or expected typically goes unrecognized until improper results are obtained. At this time recovery is often difficult or impossible.

SUMMARY OF THE INVENTION

The present invention contemplates the user programming of complex machine control and/or data sequences by manually causing the machine sequence through a hierarchy of questions to collect from the user one response only: "OK", meaning the affirmative.

The man-machine interface in accordance with the present invention typically exhibits a very narrow informational bandwidth relative to the informational bandwidths of traditional man-machine interfaces that attempt to communicate anywheres near the extent, and sophistication, of the control and/or data that typically transpires on the interface of the invention. For example, the informational output from the machine to the user is typically in two lines of sixteen alphanumeric characters each. For example, the informational input from the user to the machine is typically by four simple switches, only one of which is operated at any one time.

Despite the simplicity of the man-machine interface, and despite its narrow informational bandwidth, it is user friendly in permitting man-machine interfacing for the control and parameterization of complex tasks typically including tens or hundreds of control options and hundreds or thousands of datums. For example, the man-machine interface in accordance with the invention permits all necessary control and parameterization of a modern and highly sophisticated programmable irrigation controller. Because of the simplicity of the interface, it is substantially intuitive to a human user. Indeed, those few skills that are needed to operate the interface are actually preferably taught by the interface itself to the user.

In order to realize its high communications effectiveness and its user friendliness while operating at a narrow informational bandwidth, the man-machine interface in accordance with the present invention employs a number of interrelated strategies. Only four user responses—"HELP", "↑", "↓" and "OK" (typically in that left-to-right order of presentation)—are recognized by the machine. Each user response is typically registered at a particular associated switch, normally of the pushbutton type. The up arrow "↑" and the down arrow "↓" switches direct the step-wise sequencing of questions, one question per switch actuation. Holding the "↑" or "↓" depressed will cause the displayed questions to commence to scroll, typically presenting a new question each 2-5 seconds. The "HELP" switch causes the display of a contextsensitive help message. The "OK" switch indicates to the machine that the user adopts, or affirms, the control or data object of the presently-displayed question.

The questions, or messages, presented by the machine at its user interface include absolutely all the control, and absolutely all the datums, which are, at various times, capable of being received by the machine from its human user. The questions—which represent all the control and data entry alternatives of which the machine is capable and are thus typically quite voluminous—are organized in a hierarchy. The hierarchy presents a plurality of questions, which may be directed to control or to data entry, upon each of a plurality of levels.

The step-wise sequential presentation of alternatives ensures that the user is exposed, in the form of hierarchical questions, to all acceptable directives and/or datums, one hierarchical level at a time, which may suitably be entered into the machine. This process is most clearly visible, and is substantially intuitive in nature, when the machine is asking questions about control. The user simply adopts one alternative on each successive hierarchical level dealing with control by responding "OK" to one question on that level. The machine then steps, in a completely logical manner, to another series of questions upon the next control level in the hierarchy.

Responsive to several control inputs (in the form of questions adopted by the "OK" response), the machine typically next presents questions directed to that data that is pertinent to the particular control that has been input to the machine. When the data inputs are finished the machine will typically revert, in accordance with the user response to a question posed by the machine on its user interface, back to a control level in the hierarchy. At the conclusion of the collective user responses the machine may routinely have been programmed with control and/or data that is, in the aggregate, complex.

In accordance with the invention the hierarchy of questions asked by the machine is typically a hierarchical tree exhibiting several hierarchical levels between a root level and a leaf level. An "OK" response to a question on one hierarchical level causes a branching to a related series of questions upon the next hierarchical level. Progress within the hierarchical tree from root level to leaf level thus requires asking only such questions at each hierarchical level as are appropriate to previous branchings within the hierarchical tree. This is obviously efficient because only precisely pertinent questions are asked at each level of the hierarchical tree.

In accordance with the invention the hierarchical tree of machine-posed questions is typically not a binary tree. Instead, several questions of equal stature are preferably asked at each level, or rank, of the hierarchical tree that normally exhibits several hierarchical levels between a root level and a leaf level. The number of related questions at each level is normally not so many that the user is likely to forget the first-asked questions before the last questions are asked, and is typically approximately three to six. When the user responds "OK" to any question, meaning that the question's premise is adopted by the user, then all questioning on that hierarchical level ends and the machine progresses to a new series of questions upon a next hierarchical level. The questioning so proceeds in a hierarchy from root to branches to twig to leaf levels, with one "OK" response being accepted to one of the typically several questions at each level of the hierarchy.

When a question on the leaf hierarchical level is, ultimately, affirmatively answered then the machine will resume questioning at a higher hierarchical level, including commonly at the root level.

Despite the fact that all questions and their ordered hierarchical presentations are always as clear and logically ordered as is possible, it is always possible that a user cannot understand what a particular question is asking. Therefore the present invention contemplates an optional "HELP" switch. User actuation of the "HELP" switch in response to the presentation of any question causes the display of an expanded explanation of that question. After viewing one or more help messages by actuation of the "↑" switch the user may return to the main line of questioning by actuating the "↑" switch.

Actuation of the "HELP" switch at some or all root mode questions may typically result in help messages explaining the operation of the interface of the present invention. Mainly, the messages will explain that the user should attempt to answer the questions with the "OK" switch.

Because of the simplicity of the preferred embodiment of the man-machine interface in accordance with the present invention that uses only four different user inputs one at a time, such limited inputs are readily implemented in voice recognition technology.

Further because of the simplicity of the preferred embodiment interface in accordance with the present invention, use of the interface can be instructed by a "game" that runs upon the interface. The user is offered the option of entering the "game" upon entry into the machine through its interface. The intent of the game is to develop user skills in exercising, and communicating across, the interface. To do so a number, typically ten, questions are asked. Each question requires a user response of a type that is typical on the interface. A total novice must generally use the "HELP" switch in order to progress. The user's correct responses are required to progress, and the user/player's total responses are timed. A score is displayed that indicates the user's command of the interface. The combination of the user's intuitive response to the question-asking interface, and those insights that the user gains from playing the game into the interface operation for tasks such a entering data, reliably (i) educate and (ii) certify a user that is exceedingly unlikely to thereafter experience confusion with any aspect of the interface's operation.

The major attributes of a man-machine interface in accordance with the invention are susceptible of various different combinations. The man-machine interface in accordance with the present invention exhibits at least a display within which a multiplicity of control and datum options, preferably in the form of questions, may be successively individually displayed. The interface also has an "OK" switch or equivalent by which a man may make his affirmation or adoption of a currently-displayed datum known to the machine. The interface also has at least one switch, either an " ↑ " (up arrow) or " ↓ " (down arrow) switch, by which the machine is directed to step-wise sequence the display of questions.

In one of its aspects the man-machine interface in accordance with the invention displays a heirarchy of messages, one message at a time step-wise sequentially among a plurality of messages at each of a plurality of levels of the hierarchy. The interface further includes a first-direction sequencer, or " ↑ " switch, that is manually repetitively actuatable for causing the display means to step-wise sequence through the plurality of messages at one level of the hierarchy in a first direction in response to each actuation. Finally, the interface includes an "OK" switch that is manually actuatable, at a time after a desired one of the plurality of messages at the one level of the hierarchy has been displayed for causing (i) an adoption and use of the currently displayed message by the machine and (ii) the display to display messages from another hierarchical level having a selected relationship to said currently displayed message, thereby branching within the hierarchical tree of messages without ever leaving the hierarchical tree. Notably, all man-machine communication for purposes of manual control and data input to the machine has been accomplished solely by manual responses to various selected ones of the multiplicity of messages, and these responses have been made by the selective actuations of two only switches: a " ↑ " switch and an "OK" switch.

The interface may further include a manually actuatable second-direction sequencer, or " ↓ " switch, for causing the display to step-wise display each of the plurality of messages at one level of the hierarchy in a second direction in response to each actuation. Finally, the interface may further include a manually actuatable "HELP" switch for causing the display to display a new message associated with a currently displayed message.

In still another of its aspects the interface in accordance with the present invention can be used in a machine that interfaces to a man for (i) control and, at a separate time or times, (ii) data entry. The machine has a control state having a hierarchy of control levels, where at each control level the machine is capable of accepting selected commands associated with the control level in order to effect control of the machine. The machine also has a data entry state having a hierarchy of data entry levels. At each data entry level the machine is capable of accepting selected ones of a plurality of datums associated with the data entry level in order to effect entry of data into the machine. The multi-leveled hierarchies of the control and data entry states are permitted to be intermixed and related. However, the machine can be, at any one time, in only one state and at only one level of such state.

The improved man/machine interface to such a multi-stated multi-level hierarchical machine is, in accordance with the present invention, directed to (i) controlling and (ii) entering data into the machine. It includes a display for displaying (i) in the control state of the machine, and at some one control level of this control state, some one of the commands associated with the control level, and (ii) in the data entry state of the machine, and at some one data entry level of this data entry state, some one of the datums associated with the data entry level, one command or one datum at a time. The improved interface also includes a manually actuable " ↑ " switch for causing the display means to advance (i) in the control state of the machine and at some one control level of this control state, the currently displayed command stepwise in a first direction in an endless loop of the commands associated with this one control level and, (ii) in the data entry state of the machine and at some one data entry level of this data entry state, the currently displayed datum stepwise in a first direction in an endless loop of the datums associated with this one data entry level. Finally, the improved interface includes a manual "OK" switch for causing the machine to (i) accept and adopt, in the control state of the machine and at some one control level of this control state, the currently displayed command and, in the data entry state of the machine and at some one data entry level of this data entry state, the currently displayed datum, and also to (ii) cause the display to advance to a next state and/or a next level that is in a predetermined relationship to the currently displayed command or datum. Accordingly, the machine accepts both (i) commands for purposes of control and also (ii) datums for purposes of data entry resultantly from manual actuations, at separate times, of the "OK" switch.

The man-machine interfaces and man-machine interfacing methods in accordance with the invention are perceived to be especially efficacious for control and parameterization of machines that require a lengthy and logical, complex, control sequences. A machine requiring this type of sequential control has previously typically required an instruction manual, and is opposite from machines requiring pure data entry such as, typically, telephones.

These and other aspects and attributes of the present invention will become increasingly clear upon reference to the following drawings and accompanying specification wherein:

BRIEF DESCRIPTION OF THE DRAWINGS

FIGS. 3a, 3b, 3c, 3d, 3e, 3f, 3g, and 3h, are an electrical schematic diagram of a preferred embodiment of the irrigation controller that employs the preferred embodiment of a man-machine interface in accordance with the present invention;

FIG. 7 is a chart showing the mode dependent functions of the keys, or switches, of the preferred embodiment of a man-machine interface in accordance with the invention.

Figure 1:
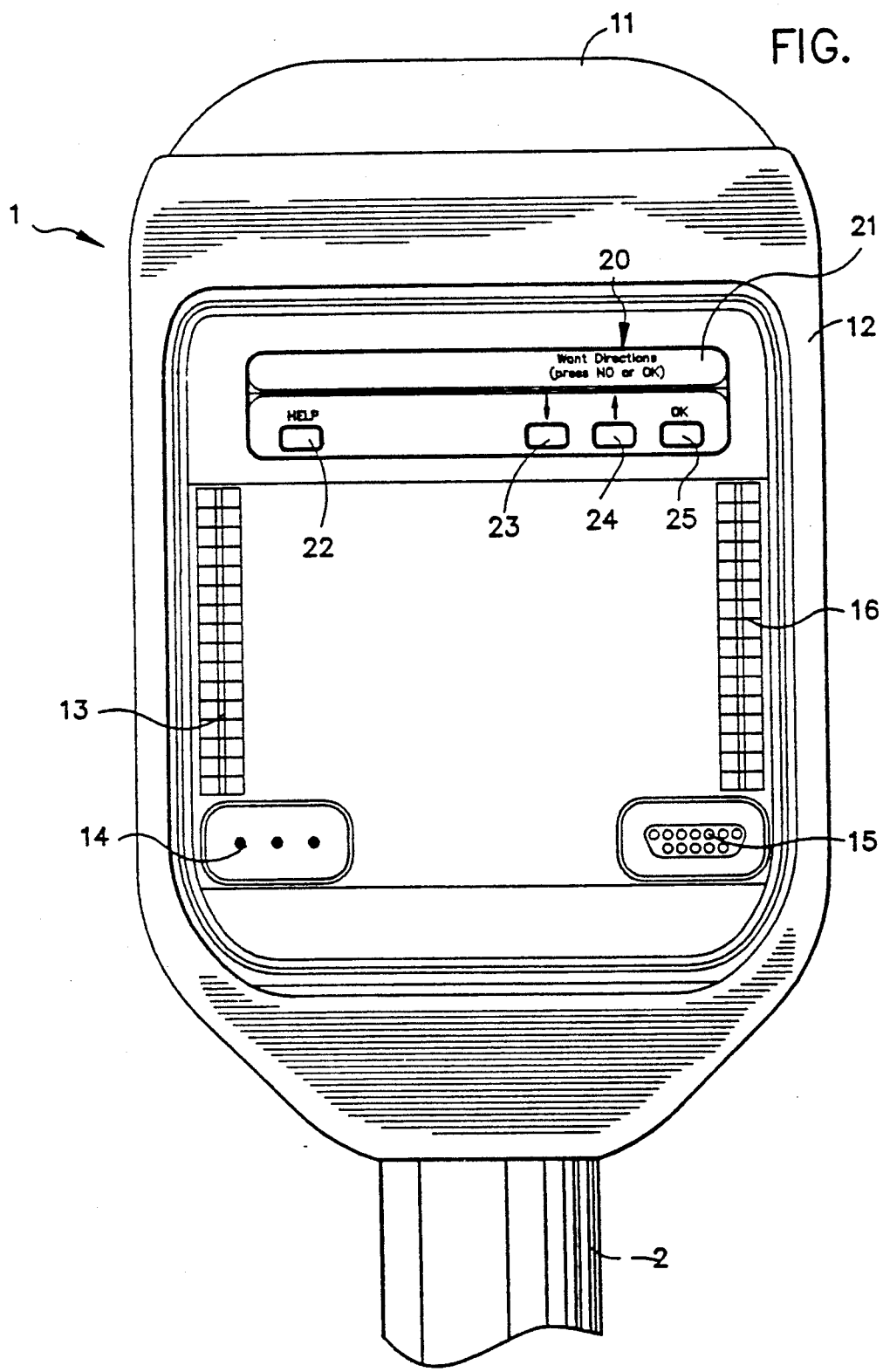
FIG. 1 is the block diagram showing an irrigation controller that employs a preferred embodiment of the man-machine interface in accordance with the present invention.

DESCRIPTION OF THE PREFERRED EMBODIMENT 1.0 The Basic Operation of an Interface in Accordance with the Present Invention The preferred embodiment of a man-machine interface in accordance with the present invention is used in an irrigation controller. The complex function of this irrigation controller, as hereinafter explained, serves to demonstrate the power of the interface in accordance with the present invention for user programming of sequences that are complex. However, it is not necessary to consider the complexities of irrigation control and irrigation controllers in order to understand the basic operation and principles of the present invention.

The man-machine interface in accordance with the present invention greatly simplifies operational control of an intelligent machine because (i) the user is constantly prompted by questions, and (ii) all command and data input may be done with just two, and preferably with no more than four keys. Because of the simplicity of this interface, it has many potential applications. Any device which needs to be programmed with information, and which has a small display (no keyboard is required) can potentially use the interface of the present invention. (Equivalently, a device with a large display only a small portion of which is desired to be used for user interfacing can also use the present invention.) The device is typically controlled by a microprocessor. Examples of possible applications include home appliances such as microwave ovens, and entertainment electronics such as Video Cassette Recorders (VCR's).

The key features of the new user interface and how it might be applied to a machine are as follows. All control and data entry and review for the machine is accomplished by actuating two switches only, namely an affirmation/selection or "OK" switch, and a switch or switches for causing the presentation of successive questions, either or both an " ↑ " (up arrow) or a " ↓ " (down arrow) switch.

A machine may also beneficially use an additional switch, namely a "HELP" switch. The "HELP" switch elicits context sensitive help messages.

The machine's display cycles under control of the " ↑ " or " ↓ " switch continuously between questions on a first, root, hierarchical level. For example, if the machine is an irrigation controller then these first-level questions might typically be: "ENTER SCHEDULE?", "RUN SCHEDULE?", "MANUAL RUN?", "NO WATERING?", "SETUP SYSTEM?", or "VIEW INFO?". If the " ↑ " or " ↓ " switch is held depressed at the first or any other hierarchical level, the display will proceed to cycle at a predetermined rate, typically 2.5 second per question. If the " ↑ " or " ↓ " switch is released then the cycling of the displayed questions stops.

The display steps under control of the " ↑ " or " ↓ " switch until one question is answered by depressing the "OK" switch. The display then commences to step-wise through questions in the appropriate next branch of the hierarchal tree of questions.

The step-wise sequencing through the displayed datums, or questions, is controlled by manual actuation of the " ↑ " or " ↓ " switches. Such actuations indicate that the "currently displayed datum is not adopted, advance to next datum".

The machine user will always know all choices possible because he/she may sequence through all questions upon any one hierarchical level in an endless loop. Control and data options will cycle under control of the " ↑ " or " ↓ " switch in a continuous loop until the user selects one of the options by activating the "OK" switch. Under certain conditions, such as during the conduct of calculations by the machine, the control options may temporarily be limited so that, for example, only a "CALCULATING" or like message is displayed.

To focus the user's attention on the most important part of any option field, the machine typically blinks the important control or data options on the display along with a question mark for each option as the options are displayed one at a time.

A hierarchal tree for control and parameterization of an irrigation controller might be constructed, at least at initial levels of the hierarchy, substantially as shown on Table 1. The options of the hierarchy are not expressed as questions in order to make the structure of the hierarchal tree more visible. However, it should be understood that all options can be, and are, preferably expressed as questions complete with a question mark (or other identifying indicia).

In accordance with the invention the asked questions may be global or specific. A global question asks whether a user desires to adopt a particular course of machine control. For example, "Do you want to start?", "Do you want to set me?", "Do you want to ask me?", and "Do you want to stop?" would be suitable global questions for the control of a microwave oven. Specific questions ask whether a user adopts a particular datum for input to the machine. For example a display that advances under user control through times of 12:00 midnight?, 1:00 a.m.?, 2:00 a.m.?, 3:00 a.m.?, etc. is asking the user to select an hour which he/she desires to enter into the machine. The field that is currently being changed is blinking. All questions both global and specific are always explicit, and never implicit, because they have an appended question mark or similar distinctive indicia.

Sometimes a question will sequence to another question that is only subtly different in wording, although possibly very different in meaning. For example "USE Run Options?" can sequence to "SKIP Run Options". In this case the "USE" or the "SKIP" may be blinked not to indicate that it is to be entered, but to highlight the crux of the question. Pressing "OK" in response to "SKIP" or to "USE" changes to the other. Thus the item to be changed is the item blinked—whether it be control or data. Furthermore, note that the field to be changed is always capitalized in the alphanumeric contents thereof—again whether or not such field is control or data.

Efficient recovery from inadvertent erroneous responses can always be made. Although an erroneous response to a global question may not be immediately subject to retraction, intermediary levels in the hierarchy of questions occasionally contain escape questions, as appropriate, which, when responded to affirmatively, result in a reversion of the hierarchal questioning to previous levels, and typically to the root level.

In any case, the present invention further contemplates user confirmation of his/her responses. Affirmative responses to specific questions at the leaf level are particularly subject to confirmation. This confirmation is itself in the form of an affirmation question. (If desired, these affirmation questions can be considered to exist at the leaf level, and prior specific questions can be considered to exist at the twig, or branch level.) An affirmation question seeks ratification of the prior responses.

If the prior affirmative responses are disavowed, in whole or in part, then the machine will revert to questioning on a previous hierarchal level. When the hierarchy is deep, and the levels many, the machine will typically revert to questioning at an intermediary branch, twig, or leaf level. From these levels it is always possible to retrench still further, and ultimately back to the root level questions. When the hierarchy is shallow, and the levels few, the disavowal of prior responses that results from an affirmative response to the disaffirmation question typically results in reversion to the root level questioning.

Certain attributes of the hierarchy shown in Table 1 are immediately observable. First, the number of levels in the hierarchy that are entered during any one programming episode varies with the response to certain questions. For example, an affirmative response to the "NO WATERING" question is an end in of itself, and does not normally cause progression further into the hierarchy (forebearing the conduct of confirmation). For other responses, such as the entering of an irrigation schedule more extensive levels of the hierarchy are entered.

Second, confirmation questioning (which is only implicit in Table 1) is performed or not performed as appropriate. An affirmative response to the "START ME?" or "PROGRAM SETUP OK?" questions will typically not result in the conduct of confirmation, and the irrigation controller will respond by simply progressing to another level in the hierarchy.

Next, it may be noted that some final, or leaf level, questions have to do with control, e.g. "SYSTEM SETUP OK?". Meanwhile other leaf level questions have to do with data, e.g. "iRRIGATE for 0 hours 0 minutes?, Table 1
Hierarchy of Control for An Irrigation Controller

```
ENTER SCHEDULE?
    ENTER NEW PROGRAM?
        ENTER DURATIONS (BY STATION) [range = 1 min to
        8 hours]
        ENTER START TIME
        SKIP options for water day cycle?/ USE options
           for water day cycle? [If SKIPPED, get SAME
           "SPECIFIC DAYS" cycle for all stations]
            DIFFERENT cycle for all stns? (ISC)
                SPECIFIC days watering cycle?
                   (examples:  M-W-F--, MON every
                   4 weeks)
                "SO MANY" days watering cycle? (ex:
                   every 90 days)
                ONLY ODD days watering cycle? (ex: ODD
                   @ 90 days)
                ONLY EVEN days watering cycle? (ex:
                   EVEN @ 2 days)
            SAME cycle for all stns?
                SPECIFIC days watering cycle?
```

"SO MANY" days watering cycle?
ONLY ODD days watering cycle?
ONLY EVEN days watering cycle?
SKIP EXTRA OPTIONS?/USE ADVANCED OPTIONS?
  AUTO-SPLITS?
    KEEP SAME site info? (default=level sand, flat sprays)
    SEE OR CHANGE site info?
      Using Site Info to Calculate...
      See or change # of splits, maximum ON, and minimum OFF times by Station
  EXCLUDED PERIOD?
    Set Starting & Ending Time for period
  SYRINGE CYCLES?
    Set Syringe Months
    Set Syringe Duration by Station (1-15 min)
    Set Syringe Period (Starting & Ending Time)
    Set Syringe Interval (Time Between Cycles)
    Confirm # of Cycles & Interval
  SOAKS CYCLES? [up to 16 hours]
    Using Site Info to Calculate...
    See or Change Soak Duration & # of splits by Stn Hierarchy of Control for An Irrigation Controller Set Soak Cycle by Stn (range = every 2-26 weeks)
    Pick Soak Day (Mon-Sun)
  SPECIAL STARTS? [up to 16 starts possible]
    Pick Stn Number
    Set Water Day Cycle (example: M-W-F--)
    Set Start Time
    Set Duration (in hours + minutes) [1 min-8 hours]
    NO MORE/MORE special starts?
  OPTION SETUP OK?
WAIT....saving program
SEE/CHANGE PROGRAM?

DURATIONS?
  START TIME?
  DAY CYCLES?
  EXTRA OPTIONS?
    AUTO SPLITS?
      SEE/CHANGE? [Computer automatically splits durations, unless AUTO SPLITS are canceled]
      KEEP SAME?
      CANCEL? (or ADD?, if previously canceled)
    EXCLUDED PERIOD?
      SEE/CHANGE? (if exists)
      KEEP SAME? (or NONE?, if none previously)
      CANCEL? (or ADD?, if none previously)

```
            SYRINGE CYCLES?
                SEE/CHANGE? (if exists)
                KEEP SAME? (or NONE?, if none
                    previously)
                CANCEL? (or ADD?, if none previously)
            SOAK CYCLES?
                SEE/CHANGE? (if exists)
                KEEP SAME? (or NONE?, if none
                    previously)
                CANCEL? (or ADD?, if none previously)
            SPECIAL STARTS?
                SEE/CHANGE? (if exists)
                KEEP SAME? (or NONE?, if none
                    previously)
                CANCEL? (or ADD?, if none previously)
            OPTION SETUP OK? [Press OK when option
                setup done]
    NOTHING? [Press OK when done with changes to
        program]
    Hierarchy of Control for An Irrigation Controller WAIT...saving program
RUN SCHEDULE
    CONFIRM TIME/DATE
    AUTOMATIC RUN?
        SKIP Run options?/USE Run options? [If"OK" to
            SKIP, "START NEW AUTO RUN" assumed and other
            options omitted]
            RESUME LAST run? [resumes at SAME DAY
                NUMBER as when previous run stopped]
            START NEW run? [starts run at day number =
                1]
                WATER BUDGETS?
                    MONTHLY [% of normal month's budget
                        to use]
                    YEARLY [budget % to use]
                SET RAIN DELAY? [0-14 days]
                TURN STNS OFF/ON? [Set each Stn to run
                    or not run]
            ALL OPTIONS OK? [Press OK when done with
                run options]
        READY to run now?/NOT READY to run now?
        Now Watering: Remove LEIT Key!
    SEMI-AUTO RUN?
        NORMAL duration?
        SOAK duration?
        TEST duration?
        READY to run now?/NOT READY to run now?
        Now Watering: Remove LEIT Key!
MANUAL RUN
    RUN STATIONS? [Turn Stations ON/OFF manually, alone
        or in groups]
    RUN TEST SEQ.? [1-30 minutes/station]
    READ SENSORS?
    FINISHED?
NO WATERING?
    DO YOU REALLY WANT NO WATERING?
SETUP SYSTEM?
    USE PASSWORDS?
```

```
        Supervisor password
        Gardener password
        ACTIVATE all passwords/DON'T ACTIVATE all
            passwords
    COMPUTER ID? [6 digit name and/or number ID]
    SET ACTIVE PGM
        MAIN [normal watering program]
        ALTERNATE [alternate program for plant
            establishment, etc.]
Hierarchy of Control for An Irrigation Controller DAILY ["backup" program in case of prolonged
            light interruption]
    WIRING SETUP?
        DO WIRE CHECK? [Tests all wires for opens and
            shorts]
        # OF STNS TO USE? [sets # of active stations]
        USE/DON'T USE PUMP RELAY? [pump is
            automatically assigned to last active station
            number]
        SEE OR CHANGE STN ID #S? [Default ID = 1 to 8
            from top to bottom wire connector]
        ENTER NEW STN ID #S? [Allows new station
            numbers to be assigned without changing
            physical wiring hookup]
        WIRING SETUP OK?
    MONTHLY BUDGETS?
        HOTTEST MONTH [Default = JULY]
        SEE OR CHANGE CALCULATED BUDGETS BY MONTH
            [Computer automatically calculates monthly
            budgets based on hottest month]
    SYSTEM SETUP OK?
VIEW INFO?
    DAILY SCHEDULE?
        TODAY'S ENDING TIME?
        TODAY'S ON TIMES? [Shows all ON times
            sequentially]
    EVENT HISTORY?
        STATION EVENTS? [Shows last 96 automatic &
            manual ONs]
        SYSTEM EVENTS? [Shows last 32 System Events]
    DONE WITH INFO?
```

Irrigate for 1 hours 0 minutes?", etc. Control and data are both forms of information. The questioning method of the present invention permits the machine acceptance of both control and data by the user's affirmative responses.

Next, it may be noted that the nature, and conduct, of confirmation is not rigorous. Confirmation varies. Sometimes the user is not offered the opportunity to confirm his directives. Instead, the machine simply starts, or simply stops, or simply commences to display help messages, all as the user's affirmative response has directed. Sometimes, however, the user will be offered the opportunity to confirm his directives. For example, the user will be posited a confirmation question such as "STA 1 DURATION = 1h + 11 m?" A blinking "?" at the end of the message means "do you confirm".

When confirmation is offered then disavowal is usually by an affirmative response to a disaffirmation question. This subtle point deserves consideration. All control and data that is entered into a machine by a man using the man-machine interface in accordance with the present invention can be achieved solely by selective affirmative responses to questions, each by actuation of the "OK" switch. Confirmation is also by use only of the "OK" switch. For example, "STA 1 DURATION = 1h + 11m?" is a confirmation question. Actuation of the "OK" switch would confirm the display information. If the previously entered information is desired to be disavowed then the " ↑ " or " ↓ " switches would be used to cause the machine to automatically revert to data entry mode. After the user enters new information, the machine would again present a confirmation screen. This process continues until the user uses the "OK" switch in response to the confirmation question.

The man-machine interface in accordance with the present invention cannot be misdirected sufficiently so as reach a communications impasse between man and machine. A machine operating in accordance with the present invention that is programmed to ask a hierarchy of questions on its user interface considers, for each question, what a user probably wants if he/she activates any of the "OK", "↑", or "HELP" switches while that question is displayed. A program jump table is constructed accordingly.

The ability of the man-machine interface in accordance with the present invention to adroitly step up and down the staircase levels of a hierarchal tree no matter what switch is pushed is one reason why people who have never seen or exercised the interface, and who commonly make some "mistakes" (at least initially) in their attempts to use the interface, can nonetheless accomplish satisfactory machine control and parameterization by use of the interface.

The presentation of the hierarchally organized questions and the optional help messages constitute a sufficiently powerful form of man-machine interfacing so as to be, in many cases, self-teaching. A person who has never seen a VCR, a microwave oven, an irrigation controller, or any other machine employing a man-machine interface in accordance with the present invention generally responds to the interface intuitively, and is generally able to attain some success at communicating with the machine totally without instruction. Hitherto challenging machine control and parameterization exercises like setting the time-of-day clock on a VCR are anticipated to be extremely straightforward.

Although users interact with the non-machine interface of the present invention intuitively, and may gain proficiency with the interface by making real control and data entries on it, it is not always desirable that an unskilled user should be controlling and parameterizing a real machine while he/she learns the interface. Additionally, structured learning is generally superior in efficiency and effectiveness to ad hoc learning. Accordingly, the man-machine interface in accordance with the present invention teaches a user how to use the interface by conducting a game as discussed in the next section 1.1.

1.1 User Education Performed by a Man-Machine Interface in Accordance with the Present Invention The interface in accordance with the present invention teaches a user all necessary skills to use the interface by conducting a game. The purpose of the game is to enable the user to make "friends" with the interface, to teach the user how to interact with the interface (primary skills), to teach the user how to accomplish basic tasks with the interface (secondary skills), and to teach the user how one teaches oneself the application specific control options offered across the interface and how one uses them (tertiary skills).

The user is taught how to invoke the use "HELP", how to recognize the types of irrigation controller requests appearing on the interface (option select, number entry, word entry), how to service irrigation controller requests (selecting an option, entering a number, entering a word), and the function of the keys for each type of controller request.

The progression of primary skills acquisition proceeds as follows. The interface attracts a potential user to the vicinity of the irrigation controller and entices the potential user to initiate interaction. To do so the interface alternates an attention-getting display with "Press Any Key to Play Game". The user will press any key. The interface next wants to teach the user how to move through multiple screen text messages. The interface presents the message: "Hello! Please press ↓ ". The user must press the " ↓ " switch.

The interface will provide the user positive feedback for his action, and will next explain the purpose of the down arrow key for moving through text display. The interface states: "Great! The ↓ key moves you to the next screen of information. Whenever you see a blinking ↓ like this [ ↓ ], there are more screens to read". The user again presses the " ↓ " switch.

The interfaces next goal is to teach the user how to invoke help. The interface states: "Very Good Please press the HELP Key". The user must press the "HELP" key.

The interface then explains the function of the "HELP" key. It states in a succession of autoscrolled messages:

"The HELP key provides an explanation whenever you need assistance. Press the ↑ to proceed through the help explanation. After the help message, you return to where you were when you pressed help. Remember, press the HELP key whenever you need more information to make a decision. This is the end of the help explanation."

The user to this point has invoked the help explanation above. The user presses the " ↓ " switch after the last screen to move the machine to the next instructional state.

The interface next desires to introduce the user to the "OK" key. The interface states: "Very Good! Now please press the OK key". If the user presses the "HELP" key then he invokes the help explanation followed with a return to the same interface message. Pressing "OK" moves the user toward the next goal.

The interface's next goal is to explain the purpose and function of the "OK" key. It states: "Thank you. Press the OK key when you are finished selections". The user must press "OK" to continue. If the user depresses the "HELP" key then he/she invokes the help explanation. Depressing "OK" moves the user to the next controller goal.

The interface's next goal is to explain to the user how to enter numbers. The interface states:

"You already know that up and down arrows move you through Help Messages. Up and down arrows also allow you to enter numbers. The ↑ increases a number, and the ↓ decreases a number. Holding down the ↑ and ↓ keys makes the keys repeat. The blinking underline [ _ ] shows you where you are. Use the ↑ and ↓ keys to enter a 36. Press the OK key when you are done."

The interface then states: "Enter 36 [ _ ] Press OK when done". If the user presses "HELP" the interface displays "Use the ↑ and ↓ keys to enter 36. Press OK when you are done". If the user enters an incorrect number then the interface will let the user know he has made a mistake. It will explain the use of the keys again to the user by stating: "Sorry, that wasn't 36. Try again." followed by the help message above, followed by the "Enter 36 . . . " message. If the user enters the correct number then the interface lets the user know he is doing well. It states: "That's right! You're learning fast."

The next goal of the interface is to instruct the user how to select options. It states:

"When you are given options to choose from, use the ↑ and ↓ keys to change the option. Press the OK key to select the displayed option. Here is an example."

It then states: "What is your favorite color?" The interface then states [ ↑ ], [ ↓ ], i.e., a blinking up and down arrow. The user must press "OK" to enter.

The actual options are: Red, Green, Blue, Yellow, Black, White, Pink, Brown, Purple, Orange, Grey.

If the user presses "HELP" then the controller will display "Use the ↑ and ↓ keys to move to your choice. Then press OK to select it". The interface then returns to the message above. When the user presses "OK" then he/she has completed selecting an option.

The interface's final goal is to instruct the user how to enter words. The interface states:

"Very Good! My favorite color is Grey. The last thing you need to know before we play the game is how to enter a word. Use the ↑ and ↓ keys to change a letter, then press OK to move on to the next letter.

It then states: "Try entering the word 'red'". If the user presses "HELP" then the interface displays: "To enter a word, use the ↑ and ↓ keys to change each letter. Then press the OK key to continue." The interface then returns to the "Try . . . " message. If the user presses "OK" to enter an incorrect word then the interface will let the user know he has made a mistake. It will again explain the use of the keys to the user. It states: "Sorry, that wasn't the right answer. Try again." It provides the help message. It returns to the "Try . . . " message. If the user enters the correct word then the interface lets the user know he is doing well. It states: "That's right! Now you know how to enter information, and to answer questions."

Obviously all required responses need to ultimately be made to conclude the game. The interface finally displays the user's elapsed time in the game as an indication of the user's proficiency.

2.0 Exemplary Man-Machine Interfacing with the Preferred Embodiment of Man-Machine Interface in Accordance with the Present Invention The preferred embodiment of a man-machine interface in accordance with the present invention is incorporated in an irrigation controller. This irrigation controller in accordance with the present invention is light-energized with a built-in incident light collector. It exhibits sufficient energy storage to drive a custom CMOS ultra-low-power microcomputer with 32K RAM memory and to cycle up to eight (8) ultra-low-power irrigation valves up to sixteen (16) times each per twenty-four (24) hour period. This provides complete independence from any need for AC power, saving on energy and installation costs and permitting the controller to be located closer to the valves.

An easy to read two-line LCD display with automatic prompting (questioning) in accordance with the present invention is implemented. Each line typically displays sixteen (16) alphanumeric characters. The user is guided through the programming process with easy to understand two-line "prompts," thus substantially eliminating confusion, mistakes, and requirements to repeatedly reference printed or human authority.

Three-button programming with "best guess" defaults is used for all settings. All programming is done by answering simple questions with "OK" or "↑" or "↓" answers in accordance with the present invention. The controller display automatically shows the user "best guess" defaults where applicable.

An on-line help feature in accordance with the present invention gives directions and information for each operational mode and parameter insertion. These on-line help messages are available at any time by pressing a "HELP" key.

The irrigation controller's design is modular in that multiple 8-valve-station controller units can be integrated together. The individual 8-valve-station controller units can be networked together into optionally radio-linked centrally controlled systems, or, alternatively, multiple unrelated controllers on various sites can be centrally managed by optional multi-programming equipment.

Each of the 8 stations for a single controller unit can be independently programmed. This gives the irrigation controller great programming flexibility. Options for (i) simplified watering setups, (ii) "Autosplit" setups with automatically programmed split cycles and sequential non-overlapping operation, (iii) "Ration" setups for odd/even (day of month) water rationing, (iv) "ISC" setups with complete independence between stations, (v) "Special" setups for lights and fountains, (vi) periodic or one-time "Add-on Soak Cycle" setups, and (vii) for multiple "Add-on Syringe Cycle" setups are implemented.

Timing control of the irrigation valves is from 1 minute to 8 hours in one minute increments. Thus one minute precision in starting or stopping irrigation is combined with the ability to set watering durations of up to 8 hours for each start time. One-time or periodic "soak cycles" can have a duration of up to 16 hours.

A calendar is maintained based on "perpetual calendar" data in permanent memory. Schedules may be established for specific days or every "so many" days. This permits flexible day cycles for irrigation, and allows different stations to operate on different day cycles.

Up to 128 automatic starts per day are enabled, thereby meeting the most demanding applications.

The controller's split cycle capability permits watering times to be split into up to 16 substantially equal increments. This minimizes runoff and puddling by splitting the programmed watering duration into shorter cycles each of which is separated by a programmable minimum "off" time.

A System Budgeting Factor of 10 to 200% acts to determine the numbers of split cycles. The System (water) Budgeting Factor increases or decreases the number of split cycles instead of acting as a total duration multiplier which can lead to runoff and puddling. Monthly budgeting with pre-set default values for each month is also available. This allows an entire year's scheduling to be set up.

Automatic sequential program generation permits "Excluded Time Intervals". The controller automatically generates a sequential matrix of start times for all active valves and split irrigation cycles based on user input for determined total watering durations by valve, either site information selection or operator entered number of split cycles, and on any user-defined "Excluded Time Intervals" when no watering is desired.

For very simple applications the advanced features of the controller can be skipped merely by an affirmative answer to the question "SKIP Extra Options?". This makes it extremely easy to enter simple programs for applications where some of the more sophisticated features of the controller are not needed.

All valve stations can be programmed with totally independent watering day cycles. Another option, "Special Starts", can be used for control of non-valve devices such as fountains, or lighting equipment.

One-time or periodic "Soak" cycles can be overlaid on any regular watering program. This feature can be used for watering in fertilizer, for periodically deep watering trees and shrubs in turf areas, and for periodically leaching salts in drip applications.

Multiple daily cooling or frost-wipe "Syringe" cycles can be overlaid on any regular watering program for any pre-programmed month(s) when needed. These cycles help prevent wilting and scorching of plant materials during hot summer months or damage from freezing or morning dew in cold weather months.

Even and odd days can be automatically excluded as watering days with the choice of "ONLY ODD" or "ONLY EVEN" Water Day Cycles. This allows for odd/even water rationing schedules to be easily programmed where this is mandated by law.

A programmable "Delay Start" permits watering to be suspended for up to 90 days during the rainy season, and at the end of the programmed "Rain Delay" the regular watering schedule will automatically resume.

A special "View Info" mode allows the user to review all settings or to view an event report which displays the controller history and daily schedule. This permits the user to easily review the daily schedules of valve on/off cycles, or to view a list of the last 128 events (watering cycles, program changes, etc.) in chronological order starting from the earliest event.

Built-in wire continuity and short testing, system self-test and report functions are implemented. The user is alerted if shorted or open valve wires exist, and the unit performs a self-diagnostic test when requested.

A "Test Sequence" allows each valve to be operated in sequence for one to thirty minutes. This allows the irrigation system to be easily periodically tested.

Valve stations can be operated automatically, semi-automatically, or manually. In semi-automatic mode, all

2.1.1 Basic Function of Setting Up an Irrigation Schedule

The preferred embodiment of an irrigation controller in accordance with the present invention accepts high level information regarding the irrigation site and equipment. This high level information typically concerns (i) soil type, (ii) type of sprinkler or irrigation head, and (iii) terrain.

From these informational inputs a table lookup is performed to determine (i) the maximum "on" time of an individual irrigation watering time and (ii) the minimum "off" time between successive irrigation cycles. A typical table with times in minutes is as follows:

TABLE 1

Lookup Table for "On" and "Off" Times of Irrigation Split Cycles

| HEAD TYPE | MAX ON | | | | | | MIN OFF | | |
|---|---|---|---|---|---|---|---|---|---|
| | LEVEL SAND | HILLY SAND | LEVEL LOAM | HILLY LOAM | LEVEL CLAY | HILLY CLAY | SAND | LOAM | CLAY |
| FLAT SPRAY | 3 | 3 | 6 | 3 | 3 | 2 | 30 | 30 | 30 |
| LAWN SPRAY | 5 | 5 | 9 | 5 | 5 | 3 | 30 | 30 | 30 |
| ROTOR | 8 | 8 | 16 | 8 | 8 | 5 | 30 | 30 | 30 |
| IMPACT | 8 | 8 | 16 | 8 | 8 | 5 | 30 | 30 | 30 |
| STREAM SPR | 8 | 8 | 16 | 8 | 8 | 5 | 30 | 30 | 30 |
| MICROSPRAY | 10 | 10 | 20 | 10 | 10 | 7 | 30 | 30 | 30 |
| DRIP | 30 | 30 | 60 | 30 | 30 | 30 | 30 | 30 | 30 |

(The maximum ON values in this lookup table were calculated by dividing the maximum precipitation rate for each type of sprinkler into the minimum percolation rate typical for each type of soil, and multiplying by 60 to convert to minutes. Since sandy soils require more frequent irrigation than loam soils because of their low moisture holding capacity, the same maximum ON values were used for sand as for clay even though sand has a much higher percolation rate than clay. Loam has the proper balance of percolation rate and moisture holding capacity, and thus the maximum ON times for loam are longer than for either sand or clay. The minimum OFF times are based on field observation.)

or selected valves can be run with either a "normal", "soak", or "test" duration. This allows the user to do a one-time soak for watering in fertilizer or new plantings. The controller then automatically reverts to the automatic "Run" mode Three level access codes provide security and render the controller useless if stolen. Separate codes for gardeners, supervisors, and factory personnel insure that only authorized individuals can change the controller settings, and that codes can be easily changed as operating personnel change.

2.1 Functions Performed by the Preferred Embodiment of an Irrigation Controller Using a Man-Machine Interface In Accordance with the Present Invention The preferred embodiment of an irrigation controller using a man-machine interface in accordance with the present invention (i) receives specified information; (ii) makes decisions and performs calculations based on the specified information; (iii) typically displays the decisions and results derived in order that such may be, if desired, manually changed or modified; (iv) generates irrigation schedules for one or more irrigation stations in accordance with calculated results and (v) conducts irrigation in accordance with the generated schedules.

Information may be specified to the controller by manual data entry or by the download of information (and/or firmware operating programs) through communication ports of the controller.

The calculations are performed by a microprocessor, embedded within one of the Application Specific Integrated Circuits of the controller, that operates under control of firmware instructions resident within any of ROM, RAM, and EE memories of the controller.

The preferred embodiment of the irrigation controller further receives, e.g., by manual data input, a specification of the desired total irrigation time duration for each station. The controller calculates the number of irrigation cycles within the irrigation schedule for that station as:

$$\# \text{ cycles} = \frac{\text{total irrigation time duration}}{\text{maximum ``on'' time duration}}$$

For example, for a station irrigating hilly terrain, loam, soil, with a microspray irrigation head the number of cycles for a total irrigation watering time of 30 minutes is:

$$\text{number of cycles}_{station\ n} = \frac{30 \text{ min}}{10 \text{ min}} = 3 \text{ cycles (of 10 min each)}$$

The irrigation controller may optionally display the irrigation cycle time and number of cycles. The number of cycles may be fractional. In such cases the duration of the last cycle is truncated, so that the total of all the split cycles always exactly equals the duration entered by the user.

The preferred embodiment of the irrigation controller then proceeds by use of (i) the minimum irrigation "off" time, and (ii) the maximum irrigation "on" time that now becomes the duration of an optimal, normal, non-partial irrigation cycle (both quantities derived by table lookup) and (iii) the calculated number of irrigation cycles, to generate the irrigation schedules. The manner of this schedule generation is to (i) allocate irrigation cycles for any one station as "on" times followed by "off" times until the calculated number of irrigation cycles ensue, insofar as (ii) the necessary and prioritized scheduling of irrigation cycles for other stations permits. These rules are best illustrated by example. If, for example, station 1 is a sole station that should, in accordance with the previous example of hilly terrain loam soil with a microspray irrigation head, irrigate for 3 cycles of 10 minutes each cycle separated by 30 minutes between cycles, an irrigation schedule would be generated as follows:

| Time      | Station #1 | Station #2 | ... | Station #8 |
|-----------|------------|------------|-----|------------|
| 12:00 mid.| on         | off        |     | off        |
| 12:05     | —          | —          |     | —          |
| 12:10     | off        | —          |     | —          |
| 12:15     | —          | —          |     | —          |
| 12:20     | —          | —          |     | —          |
| 12:25     | —          | —          |     | —          |
| 12:30     | —          | —          |     | —          |
| 12:35     | —          | —          |     | —          |
| 12:40     | —          | —          |     | —          |
| 12:45     | —          | —          |     | —          |
| 12:50     | —          | —          |     | —          |
| 12:55     | on         | —          |     | —          |
| 1:00 am   | —          | —          |     | —          |
| 1:05      | off        | —          |     | —          |
| 1:10      | —          | —          |     | —          |
| 1:15      | —          | —          |     | —          |
| 1:20      | —          | —          |     | —          |
| 1:25      | —          | —          |     | —          |
| 1:30      | —          | —          |     | —          |
| 1:35      | —          | —          |     | —          |
| 1:40      | —          | —          |     | —          |
| 1:45      | —          | —          |     | —          |
| 1:50      | on         | —          |     | —          |
| 1:55      | —          | —          |     | —          |
| 2:00      | off        | —          |     | —          |
| 2:05      | —          | —          |     | —          |
|           | etc.       |            |     |            |

The last irrigation by station #1 was during the period 1:50 to 2:00 a.m. The cycle recommences the following day.

If station #2 is also enabled under the same circumstances the combined irrigation schedules will be as follows:

| Time      | Station #1 | Station #2 | ... | Station #8 |
|-----------|------------|------------|-----|------------|
| 12:00 mid.| on         | off        |     | off        |
| 12:05     | —          | —          |     | —          |
| 12:10     | off        | on         |     | —          |
| 12:15     | —          | —          |     | —          |
| 12:20     | —          | off        |     | —          |
| 12:25     | —          | —          |     | —          |
| 12:30     | —          | —          |     | —          |
| 12:35     | —          | —          |     | —          |
| 12:40     | —          | —          |     | —          |
| 12:45     | —          | —          |     | —          |
| 12:50     | —          | —          |     | —          |
| 12:55     | on         | —          |     | —          |
| 1:00 am   | —          | —          |     | —          |
| 1:05      | off        | on         |     | —          |
| 1:10      | —          | —          |     | —          |
| 1:15      | —          | off        |     | —          |
| 1:20      | —          | —          |     | —          |
| 1:25      | —          | —          |     | —          |
| 1:30      | —          | —          |     | —          |
| 1:35      | —          | —          |     | —          |
| 1:40      | —          | —          |     | —          |
| 1:45      | —          | —          |     | —          |
| 1:50      | on         | —          |     | —          |
| 1:55      | —          | —          |     | —          |
| 2:00      | off        | on         |     | —          |
| 2:05      | —          | —          |     | —          |
|           | etc.       |            |     |            |

The last irrigation was by station #2 was during the period 2:00 to 2:10 a.m. The cycles recommence the following day.

If the full eight stations are all enabled under the same circumstances then the combined irrigation schedules will be as follows:

| Time      | Station #1 | Station #2 | ... | Station #8 |
|-----------|------------|------------|-----|------------|
| 12:00 mid.| on         | off        |     | off        |
| 12:05     | —          | —          |     | —          |
| 12:10     | off        | on         |     | —          |
| 12:15     | —          | —          |     | —          |
| 12:20     | —          | off        |     | —          |
| 12:25     | —          | —          |     | —          |
| 12:30     | —          | —          |     | —          |
| 12:35     | —          | —          |     | —          |
| 12:40     | —          | —          |     | —          |
| 12:45     | —          | —          |     | —          |
| 12:50     | —          | —          |     | —          |
| 12:55     | —          | —          |     | —          |
| 1:00 am   | —          | —          |     | —          |
| 1:05      | —          | —          |     | —          |
| 1:10      | —          | —          |     | on         |
| 1:15      | —          | —          |     | —          |
| 1:20      | on         | —          |     | off        |
| 1:25      | —          | —          |     | —          |
| 1:30      | off        | on         |     | —          |
| 1:35      | —          | —          |     | —          |
| 1:40      | —          | off        |     | —          |
| 1:45      | —          | —          |     | —          |
| 1:50      | —          | —          |     | —          |
| 1:55      | —          | —          |     | —          |
| 2:00      | —          | —          |     | —          |
| 2:05      | —          | —          |     | —          |
|           | etc.       |            |     |            |

The last irrigation by station #1 was during the period form 2:40 to 2:50 a.m. The last irrigation overall was by station #8 during the period from 3:50 to 4:00 a.m. In total, eight stations have irrigated for a total of 30 minutes each during 4 chronological hours.

The goal of the staggered starts is to (i) operate one irrigation station at a time with (ii) a minimum amount of dead time on all stations consonant with (iii) operating each station in accordance with its maximum "on" and minimum "off" times while (iv) prioritizing between stations in accordance with their numbers. Each successive station is looked at in turn to see if an irrigation cycle for that station will properly fit within a window within the combined schedules, and if so the cycle is scheduled and the station will water. Which station's cycle to insert in any given window is determined by (i) which station has had the longest wait for a turn to have an irrigation cycle, and if two stations have equal waits then by (ii) the lowest numbered station first.

2.1.2 Exclusionary Periods

The preferred embodiment of an irrigation controller in accordance with the present invention accepts the specification, normally by user input, of one or more exclusion time intervals during which irrigation is not to transpire from any station. The specification is normally in the form of interval start and stop times, which are the corresponding times that irrigation is stopped and permissively restarted. The scheduling of irrigation cycles simply works around these one or more exclusion time intervals. An irrigation cycle may start before an exclusion interval, be suspended (off) during the exclusion interval, and resume to completion after the exclusion interval. This in essence adds an extra split watering cycle.

2.1.3 Budgeting of Irrigation

The preferred embodiment of an irrigation controller in accordance with the present invention accepts specification of a budget factor. The controller uses this budget factor to calculate a new, budgeted, total irrigation time duration as budgeted total irrigation time duration = budget factor × total irrigation time duration

For example, if the budget factor is 200% and a station's total irrigation time is 1 hour, then budgeted total irrigation time duration = 200% × 1 hour budgeted total irrigation time duration = 200% × 1 hour
= 2 hours The controller then proceeds to calculate a budgeted number of irrigation cycles in consideration of the maximum "on" time derived from the table lookup as budgeted number of cycles =

$$\frac{\text{budgeted total irrigation time duration}}{\text{maximum "on" time duration}}$$

For example, for the hilly terrain loam soil irrigated with a microspray irrigation head:

budgeted number of cycles = $\frac{2 \text{ hours}}{10 \text{ minutes}}$
= 12 cycles This should be compared to the 6 cycles during which irrigation would normally transpire. The creation of irrigation schedules for the adjusted (budgeted) number of irrigation cycles transpires normally. There is also a Monthly Budget feature that allows a different budget to be set for each month of the year. Defaults are provided for each month.

2.1.4 Deep Soak Cycles

The preferred embodiment of an irrigation controller in accordance with the present invention accepts programming of a deep soak cycle for a selected station that overrides, supplants, and substitutes for all normal irrigation that might otherwise normally be scheduled for the station upon a particular day.

The (i) time duration, (ii) first occurrence, and (iii) periodicity days of the soak cycle are specified to the irrigation controller. The soak duration can be automatically calculated from site information, or user entered. For example, a particular, station might be programmed to conduct a 1 hour soak cycle every 30 days from a set day. Upon the set day, and each 30 days thereafter, the composite irrigation schedules will be routinely computed in a normal manner as if the particular station had only one irrigation period of duration 1 hour. All other irrigation cycles at other stations may be shifted in time-of-day but will otherwise proceed normally. Any base irrigation cycles that fall on a soak day for any particular station are skipped. Syringe cycles, if programmed, can fall on a soak day (see below).

2.1.5 Syringe Cycles

Syringe cycles are implemented in the preferred embodiment of an irrigation controller in accordance with the present invention as a separate schedule, automatically generated, that is (i) prioritized above the normal irrigation schedules. Syringe cycles are programmed in common for all stations based on one (only) set of input information for all parameters, except the syringe cycle duration. (They are not, however, conducted simultaneously.)

The controller accepts specification of the (i) syringe cycle duration by station, (ii) start time of the first station's (i.e., station #1) initial syringe cycle occurrence, (iii) start time of the first station's final syringe cycle occurrence, (iv) periodicity of the syringe cycles in the defined time interval, and, (v) active months during which syringe cycles are to be performed. The controller schedules syringe cycles of the indicated duration starting at the initial start time for station #1 followed by station #2 continuing up to station #8. After the proscribed time interval the syringe cycles repeat, and so continue until the last sequence of eight cycles upon the eight stations. This schedule is enabled only for the designated months.

For example, 1 minute duration syringe cycles might be specified to occur every two hours during a syringe period starting at 10:00 a.m. and ending with a 6:00 p.m. start time. Eight minutes of syringes would transpire, one minute per station, from 10:00 to 10:09 a.m. Another series would transpire from 12:00 noon to 12:09 p.m. The final series would be from 6:00 to 6:09 p.m. Each of these series would suspend any other irrigation cycle otherwise in progress. Each suspended cycle will conclude to its full scheduled duration at the end of the current series of syringe cycles.

2.2 Overview of the Preferred Embodiment of an Irrigation Controller

The preferred embodiment of an irrigation controller using a man-machine interface in accordance with the present invention uses Light Energized Irrigation Technology (LEIT TM) (trademark of Solatrol, Inc., San Diego, Calif.). It can operate with the amount of incident light available in northern latitudes on a worst-case cloudy winter's day without needing any of the batteries, external solar panels, or the A.C. power connections required for traditional controllers. It is also extremely flexible and versatile in its operation.

A diagrammatic view of the preferred embodiment of the controller, with its cover plate removed and operator's panel area exposed, is shown in FIG. 1. Controller 1 is typically attached to post 2. An array of photovoltaic devices 10 (not shown) is located under transparent lens 11 on top of case 12.

Various electrical connectors are presented. A valve connector block 13 permits electrical connection by wires (not shown) to up to eight (8) electrically actuated valves. A control key socket 14 accepts a pluggable power source (not shown), being a 9 vdc battery suitably packaged so as to plug into socket 14. A digital accessory connector 15 permits communication connection to a multiprogramming unit (not shown) that may upload and download programs into the controller 1 (among other alternative ways of programming controller 1). The connector 15 is a standard type, and may, under firmware control within controller 1, interface to further devices. A sensor connector block 16 permits connection of up to eight (8) optional soil moisture sensors or other sensing devices. These soil moisture sensors, and the control proceeding therefrom, are not taught within this specification for being unimportant to the present invention.

A control panel 20 contains a liquid crystal display (LCD) 21 for showing information, questions, and directives. The control panel 20 also contains pushbutton switches 22-25. A "HELP" switch 22 causes the controller 1 to display more information and/or instructions, keyed to the current operation or displayed questions, in LCD 21. The " ↓ " switch 23 and the " ↑ " switch 24 are used to change the displayed options and data which are needed to specify the parameters of irrigation (e.g., the watering schedule) and to enable selectable readout of controller stored data. The "OK" switch 25 is used to select options and confirm data entries.

The controller 1 is controlled in its operation by firmware running on a special Application Specific Integrated Circuit (ASIC) that includes a microprocessor. The explanation of the controller 1 hardware is contained in major sections 3-5 of this specification. The firmware executed by controller 1 is attached as Appendix A to this specification. This major section 2 deals with the user interface to controller 1, and serves to show its many unique aspects that are controlled and parameterized by an interface in accordance with the present invention.

The term "programming" used throughout this specification includes actions performed at the operator interface to the controller 1—actions normally but not necessarily performed in the field—by which the controller 1 is parameterized and directed in its programmed operation. The firmware itself is, of course, also "programmed". In some cases the act of "programming" at the operator's panel will alter the flow, as well as the parameters used, within the firmware; thus constituting a form of "programming" at the process control level. The word "programming" is used to refer to the total compendium of operator/programmer interface to, and control of, irrigation controller 1. The word includes actions more exactingly thought of as parameterization (typically done in the field), as well as actions more exactingly thought of as coding (typically done in the factory or depot).

2.3 Talking to the Irrigation Controller

The key features of the user interface to the irrigation controller in accordance with the present invention are as follows:

2.3.1 General Operation of the Interface

The irrigation controller always shows the user two or more blinking choices or options. To see next available option, the user must press " ↑ ". To see the previous option, the user must press " ↓ ". When best option is displayed, the user must press "OK".

When entering numbers or other information, items to accept or change will blink. To increase numbers the user presses " ↑ ". To decrease them he/she presses " ↓ ". Holding down either arrow key makes items change faster. When the desired item is displayed, the user must press "OK".

When the user sees a BLINKING QUESTION MARK (?), the irrigation controller is asking if the settings shown are correct. To keep the settings shown, the user must press OK", or to change settings, the user must press " ↑ " or " ↓ " to advance to a new setting.

The irrigation controller lets the user copy the settings made for one valve for use with the next valve. The user has two options when he/she is asked:

"Use SAME SETTING for next valve?"

To use SAME setting, the user must press "OK". To enter a new setting, he/she must press " ↑ " or " ↓ ".

To get help at any point the user should press "HELP". The user may then read the displayed information. To read further, the user should press " ↑ ". A blinking UP ARROW " ↓ " in the lower right hand corner of the display screen reminds the user how to advance to the next screen.

To back up to the previous text, the user should press " ↑ ". When the user is finished with help messages then he/she should press " ↓ ". The machine will continue where it was before the user pressed "HELP".

2.3.2 Setting the Display Contrast

When the user first inserts a pluggable power source to activate the man-machine interface, the display will come on immediately if the irrigation controller is fully charged. Otherwise, the message: "Charging! Please Wait . . . " flashes periodically. The 9-volt battery in the pluggable power source charges the irrigation controller, and provides power to run the display. New and previously unpowered, or profoundly discharged, irrigation controllers may take up to 10 minutes to charge fully. The user should use a fresh 9-volt alkaline battery, or Nickel-Cadmium rechargeable battery in the pluggable power source. When it becomes fully charged, the irrigation controller displays the following message: "Press OK when most readable 1". This message is sequentially displayed at three different contrast levels (numbered 1 to 3). The user should press "OK" when the display is most readable. The display contrast will cycle continuously (autoscroll) until the user selects a contrast level.

2.3.3 Practice Game

The irrigation controller next conducts the practice game previously discussed in Section 1.1 to teach the user the basic operating skills that he/she needs to use the irrigation controller. The game shows the user how to use the keys and how to select options. The user's score on the game will depend on how fast he/she can correctly answer ten questions. Some of the questions require the user to press "HELP" for a hint about the correct answer.

To play the game, the user should press "OK" when the irrigation controller asks "Press OK to PLAY GAME". The game is self-teaching. When the user is done, the user will have all the skills he/she needs to use the irrigation controller.

Once the user is familiar with the few simple skills that he/she needs to know to operate the irrigation controller, he or she can thereafter skip the game by merely pressing " ↑ " or " ↓ ".

2.3.4 Getting Started

After setting the display contrast and conducting the optional practice game, the irrigation controller asks "SKIP Self Test?" To do a system self test, the user must press " ↑ " and then press "OK" to the question "DO Self Test?" The system self test automatically tests the wiring and displays the time, date, & current operating mode.

If the user has entered and activated passwords in setup system he/she will need to enter a correct password to continue.

The user must next enter either a 3-digit supervisor or gardener code, pressing "OK" after each digit (letter or number). Without a correct password the user cannot see or change watering schedules or other irrigation controller settings, but can do a system self test.

To see or change irrigation controller settings, the user must temporarily stop the current run cycle (if running) by pressing "OK" when the display reads "Press OK to STOP RUNNING". The Computer automatically resumes running when the user removes the "LEIT Key TM " or starts a new automatic or semi-auto run.

2.3.5 Main Options

When the display reads "HELLO! PRESS OK TO PICK OPTIONS" the user must press "OK" to see the first blinking option. There are six main options used in running the irrigation controller. To see all of the main options, the user keeps pressing the " ↑ " key.

When the user decides which option he/she wants to use, he/she must then press "OK". The six blinking options are:

ENTER SCHEDULE. ENTER SCHEDULE lets the user enter or change watering schedules. Depending on the ACTIVE watering program chosen in SETUP SYSTEM, the user can enter either: MAIN PGM, ALTERNATE PGM, or DAILY PGM.

RUN SCHEDULE. RUN SCHEDULE lets the user run watering schedules. There are three run options: AUTOMATIC RUN, SEMI-AUTOMATIC RUN, RESUME LAST RUN.

MANUAL RUN. MANUAL RUN lets the user RUN STATIONS one at a time, in groups, or in a defined TEST SEQUENCE.

NO WATERING. For times when the user wants NO WATERING to occur, he/she should select this option. The irrigation controller will keep its schedules, but will not conduct irrigation.

SETUP SYSTEM. SETUP SYSTEM lets the user set up the system to fit his/her site & specific needs.

SEE INFO. SEE INFO lets the user see an EVENT HISTORY by date and time, or see today's DAILY SCHEDULE of all watering starts by station.

2.3.6 Setup Sequence

The first time the user programs the irrigation controller, he/she normally uses Setup System to enter his/her specific requirements. System settings are optional, since the irrigation controller comes with pre-programmed station numbers and monthly water budgets.

After making any desired changes in the SYSTEM SETUP, the user should choose ENTER SCHEDULE to enter a watering schedule. The user should choose RUN SCHEDULE to start AUTOMATIC or SEMI-AUTOMATIC watering, and to see or change the time, watering budgets, or optional rain delays.

2.3.7 Setup System

SET PASSWORDS. This sequence allows the user to establish passwords. Passwords prevent unauthorized individuals from changing settings. The user can enter two separate codes, a gardener and a supervisor code. A third factor code is preset.

SET COMPUTER ID. SET COMPUTER ID assigns a name or number for each individual controller in multi-controller applications.

SET ACTIVE PGM. SET ACTIVE PGM lets the user switch between different watering schedules. The user should select MAIN PGM, ALTERNATE PGM, or DAILY PGM.

WIRING SETUP. WIRING SETUP lets the user do a wire self-test, change the number of active stations, change the station numbers assigned to each valve without switching the valve wires, or use a pump relay. Pump relays are automatically activated whenever any other station is on.

MONTHLY BUDGETS. MONTHLY BUDGETS customize the watering budgets for each month of the year, based on the hottest month and the historical weather patterns (rainfall and evapotranspirative demand) for the user's particular area.

SYSTEM SETUP OK. The user should select this option when he/she is finished configuring the irrigation control system.

2.3.8 Use of Passwords

PASSWORDS limit access to the controller. Tne user can enter two different PASSWORDS: SUPERVISOR CODE and GARDENER CODE. Both codes allow access to the irrigation controller, but only the SUPERVISOR CODE lets the user change passwords. When the Computer asks "Supervisor Password : --- ?" the user should depress either of the arrow keys " ↑ " or " ↓ " to change the three dashes (-) to the desired letters or numbers, pressing "OK" after each letter or number. The user enters the GARDENER code in the same way.

After the user has entered both passwords, the controller asks: "ACTIVATE All Passwords?" The user will now need a password each time he/she uses the irrigation controller. If the user forgets his/her passwords, he or she may use a pre-set FACTORY code stamped on his/her irrigation controller Warranty Card.

2.3.9 Set Irrigation Controller ID

SETUP SYSTEM allows the user to assign a name or number to each irrigation controller. This allows each irrigation controller to be uniquely identified by communication devices, such as the MULTI-PROGRAMMER unit taught in co-pending U.S. patent application Ser. No. 255,150 filed Oct. 4, 1988, a device that allows programs for multiple irrigation controllers to be stored and downloaded simply by plugging into the communication port on each irrigation controller. Similarly, RADIO-LINK CENTRAL STATION is a unit that allows individual field irrigation controllers to communicate with a central office irrigation controller via radio. Entering an ID name or number works exactly like entering a PASSWORD code, except that the irrigation controller ID is 9 digits long. To use a name less than 9 digits long, the user must press "OK" for each unused dash (-) on the entry screen. The irrigation controller ID can be composed of all letters, all numbers, or a combination of letters and numbers.

2.3.10 Set Active PGM

The irrigation controller lets the user set up three entirely different watering programs. MAIN PGM is used to control a regular watering schedule. Each station can have a totally independent watering day cycle. The user can either use or skip all of the irrigation controller's advanced features, such as Auto Splits, Syringes, Soaks, Special Starts, and Excluded Periods, with this program. ALTERNATE PGM lets the user enter a separate and independent schedule for special needs, such as watering newly planted or seeded areas. The user can also use this program to experiment with a new watering schedule without losing his/her MAIN PGM. DAILY PGM is entered to modify the factory-entered backup watering schedule that is automatically invoked if the light-gathering photocells of the irrigation controller are covered for prolonged periods, causing a power loss. This program is stored in special non-erasable memory within the irrigation controller. Only ONE of these programs can be active at one time.

The option selected in SET ACTIVE PGM becomes the active program for both ENTERING and RUNNING schedules.

2.3.11 Wiring Setup

Wiring setup lets the user do a wire check to self-test the wiring for opens and shorts. The user may either see or change the current number of active stations. Initially all 8 stations are active. To use fewer stations, the user must tell the irrigation controller how many stations he/she wants to use. This manner of data entry simplifies entering a watering schedule, since the user will not have to enter settings for any unused stations. The user views the current valve-wire identification numbers. The irrigation controller initially has Station #s 1 to 8 respectively assigned to the top through the bottom positions of the physical valve-wire terminal strip. The user first tells the irrigation controller whether or not he/she is using a PUMP RELAY. The user may then proceed to change the station #s assigned to the physical valve-wire positions without actually changing the valve-wire positions.

First the user must do a WIRE CHECK to check for shorted or broken (open) valve-wires. The LEFT symbol on the display shows the status of the TOP wire position with 'o'=OPEN, 'V'=VALVE, 'x'=SHORT. An "open" indicates that either no wire is connected or the wire is broken or not inserted properly into the connector. The user should try re-inserting the wire to correct the "open" condition. In case "shorts" are detected it is wise to install a new wire, instead of trying to find the shorted wire.

The user must never attach batteries or continuity testers to the wires while they are still attached to the irrigation controller because this can cause permanent damage to the irrigation controller.

The irrigation controller asks: "Use 8 Stations?" To change the display number, the user must press " ↑ " in order to enter the number that he/she would like to use. This number can be changed later.

The irrigation controller asks: "View Current Station IDs?" The current ID shows how the wires are connected to the valve terminal strip (on left side of irrigation controller). The leftmost number shows the number assigned to the top light grey connector pair on the left terminal strip.

When the irrigation controller asks: "Enter New Station IDs?" the user should press OK" to change valve numbers without switching wires.

USE PUMP RELAY lets the user employ the last active station number to control a pump relay. The pump relay will come on when any other valve is on. To activate a pump relay, the user must press "OK" when the irrigation controller asks "USE Pump Relay?".

To identify the valves to the irrigation controller, the user must go to the valve station that he/she wants to be Stn #1. The user inserts a pen or a paper clip into the small hole on the wire connector between the valve pigtail and the wire run to the irrigation controller. This action depresses a switch which tells the irrigation controller to assign identification #1 to this station. The user then goes to the valve station that he/she wants to be Stn # 2, and repeats this process. The user ultimately conducts this process for all wired stations. If the system displays a pump relay, the user must identify the pump relay as the last station number. After conclusion of the identifications, the user must press "OK" to SAVE new valve number assignments, ... to ERASE old ones.

2.3.12 Set Monthly Budgets

A system setup lets the user customize the monthly watering budgets of the irrigation controller to the weather pattern in the user's geographical area. The irrigation controller is pre-programmed with monthly watering budgets that reflect typical seasonal weather changes. It automatically changes these estimated monthly watering budgets based on a user input for the hottest month in the user's geographical area. The hottest month is always budgeted at 100%. The user can change each individual monthly watering budget to match the particular weather for the user's area. The appropriate budget for each month is the historical Net $ET_o$ (Evapotranspirative demand in inches) for the month divided by the demand for the hottest month.

$$\text{Budget \%} = \frac{\text{Net } ET_o \text{ for month}}{\text{Hottest Mo. Net } ET_o} \times 100$$

where Net $ET_o$=Total $ET_o$ for month - Total Rainfall for month.

The user can fine tune the monthly watering budgets when he/she starts a new AUTOMATIC RUN. Run Budgets can be changed in 10% increments above or below the normal monthly budgets (from 10% to 200% of normal). This does not change the normal monthly budgets.

2.3.13 System Setup OK

The user must press OK" after he/she has made all desired changes in the other SETUP SYSTEM options. In order to go back and change one or more of the SETUP SYSTEM options, the user should press " ↑ " or " ↓ " and then select the SETUP SYSTEM option that he/she wants to change.

2.3.14 Enter Schedules

SET NEW SCHEDULE lets the user enter a new watering schedule. A watering schedule includes HOW LONG to water with each station. This is the Total Duration or Run Time that will be used with a Water Budget of 100%. The watering schedule also includes WHEN to start watering. This is the Start Time. The user need only to enter one Start Time, since the irrigation controller automatically calculates all repeat starts. The watering schedule also includes HOW OFTEN to water with each station. This is the Watering Day Cycle. Finally, the watering schedule optionally includes EXTRA OPTIONS. For very simple applications the user can choose to SKIP some or all of the many available EXTRA OPTIONS. The user presses "OK" to SKIP all of the extra features, or presses " ↑ " or " ↓ " to see all the options available: Auto-splits, Excluded Periods, Soaks, Syringes, and Special Starts.

2.3.15 See/Change Old Schedule

The user selects this option to see or change a previously entered schedule. The user may see or change some or all of the following previously entered settings: Durations, Start Time, Day Cycles, Extra Options, Nothing. The user must press "OK" for each type of setting that he/she wants to see or change. The previously entered settings will then be displayed, one by one, with a blinking question mark (?).

The user should press "OK" to keep the setting shown and advance to the next setting, or should press " ↑ " or " ↓ " to change the setting shown. This process must be repeated for each setting that the user wants to see or change. For EXTRA OPTIONS the user will get additional choices. These choices differ depending on whether or not the Extra Option listed on the top line of the display was used previously. If the feature was used previously, the choices are: SEE/CHANGE (which lets the user review or modify current settings), KEEP SAME (which lets the user keep the same settings without reviewing them), and CANCEL (which lets the user stop using the current Extra Option).

If the feature was not previously used, the choices are: ADD (which lets the user start using a previously unused Extra Option), NONE (which lets the user continue NOT using the current Extra Option).

When the user is finished reviewing or changing extra options, he/she then picks: "Extra Options: ALL OPTIONS OK". When the user is are finished reviewing or modifying the previous settings, he/she selects: "See or change NOTHING". The irrigation controller then tell the user that it is SAVING the user's program. Any changes the user has made will not be saved until the user advances to this point.

2.3.16 Entering Durations

The user may enter the TOTAL desired watering time per day for each valve. The irrigation controller automatically splits this duration into shorter repeat cycles (if needed), based on the site information for each station. Watering Durations can be from 1 minute to 8 hours. The user must enter numbers for both hours and minutes. The ARROW KEYS are used to select an appropriate hour (h), followed by pressing "OK". To enter a total duration of less than 1 hour, the user should press "OK" for zero hours (0h). The desired number of minutes (m) is entered by using the ARROW KEYS, and again pressing "OK". Entering a 100% Duration=0h+0m lets the user SKIP watering with the indicated valve number. The user continues each duration just entered by pressing "OK" when the irrigation controller displays the entered duration (in hours+minutes) followed by a blinking question mark. The user is then asked if he/she wants to Use SAME SETTING for next valve? This lets the user copy settings from one valve station to the next. The user will press one of the ARROW KEYS to enter a different duration.

2.3.17 Entering Start Time

The user may enter when to START WATERING commencing with the first active valve station. The ARROW KEYS are used to select the desired hour, followed by pressing "OK". The user next sets the desired minutes after the hour when he/she wants to begin watering, and again presses "OK". To confirm the start time the user just entered, he/she still again presses "OK". The user need only to enter one Start Time because the irrigation controller automatically calculates all the repeat start times.

The user should be sure to use AM for morning start times, and PM for afternoon start times. Noon and Midnight are indicated 12:Noon and 12:Midn. The user must select a Start Time early enough to finish before midnight if he/she is using long watering times or an Excluded Period. If there are times during the day when the user wants NO WATERING to occur, he/she may set an Excluded Period. This tells the irrigation controller to automatically SKIP over this period of time when it automatically calculates the repeat starts.

3.0 Programmed Control of the Irrigation Controller

The hierarchical structure of the man-machine interface, specifically to an irrigation controller, in accordance with the present invention is outlined in Table I of previous Section 2.1. An abbreviated description of the programmed management of the interface in accordance with the hierarchical structure is contained in this section 3.0 A chart showing the mode dependent functions of the " ↑ ", " ↓ ", "OK" and "HELP" is shown in FIG. 7. Finally, a diagram showing the possible entry of control and data on the preferred embodiment of a man-machine interface in accordance with the present invention is shown in FIG. 8, consisting of FIG. 8a through FIG. 8i. The Table I, section 3.0, FIG. 7 chart and FIG. 8 diagram considered collectively accord understanding of how the preferred embodiment of the man-machine interface functions in detail in its preferred application in an irrigation controller.

At its first level the irrigation controller presents through its interface the following six questions: "ENTER SCHEDULE?", "RUN SCHEDULE?", "MANUAL RUN?", NO WATERING?", SETUP SYSTEM?", and "VIEW INFO?"

An OK response to the first-level question "ENTER SCHEDULE?" causes the second level to be entered. At this second level the irrigation controller presents the following two questions: "ENTER NEW PROGRAM?", "SEE/CHANGE PROGRAM?"

An OK response to the second-level question "ENTER NEW PROGRAM" causes the third level to be entered (at this point in the hierarchy). At this third level point the controller will (i) accept data entry and (ii) ask further, third-level, questions.

At the onset, the controller will display "STA 1 DURATION=0h+0m" The hours field is initially blinking. After running the hours to the desired number 0-8, and pressing OK active entry shifts to the minutes field, which then blinks. Entry continues for the number of stations set-up in the system, a maximum of eight.

Next at this level three, and at this point in the hierarchy, a principle start time from which all other start times will be automatically calculated is entered. The controller displays "Start Time=12:mid" and progresses through the hours, and then the minutes.

Also at this level three at this point in the hierarchal tree, the irrigation controller will sequence to the following two questions:

"SKIP Day Cycle Options", or "USE Day Cycle Options"

"SKIP EXTRA OPTIONS" or "USE EXTRA OPTIONS"The blinking "SKIP" messages are always displayed first, and with use of either arrow key (" ↑ ", " ↓ "), the message cycles to "USE". One alternative—"SKIP" or "USE"—must be adapted with the "OK" key.

An "OK" response to the third-level question "SKIP Day Cycle Options" causes branching to the fifth level questions within the second following paragraph.

An "OK" response to the third-level question "USE Day Cycle Options" causes the fourth level to be entered at this point in the hierarchy. At this fourth-level point the controller will ask "DIFFERENT For All Stns?" or "SAME For All Stns?" The blinking "DIFFERENT" message is always displayed first, followed by the "SAME" message upon use of either arrow (" ↑ ", " ↓ ") key.

Adaptation of either fourth-level message with the "OK" key causes the following four fifth-level questions to be displayed:

"SPECIFIC days watering cycle?"
"SO MANY days watering cycle?"
"ONLY ODD days watering cycle?"
"ONLY EVEN days watering cycle?"

An "OK" response to the "SPECIFIC" question gives a display of:
STA 1:—
Water On: MON
The user depresses "OK" for each day to water (causing a letter mnemonic to appear at the appropriate topline display position) and to sequence to the next day, or depresses an arrow key to sequence to the next day.

Responses to the "SO MANY", "ONLY ODD", and "ONLY EVEN" fifth-level questions are straightforward. For example, "SO MANY" can be answered (by appropriate key actuations) to be every 90 days in a range from 1 to 90; "ONLY ODD" can be answered to be ODD @ XX days in a range XX from 2 to 90 by twos; and "ONLY EVEN" can be answered EVEN @ YY days in a range YY from 2 to 90 by twos.

At any conclusion in the hierarchy below the third-level question "SKIP Day Cycles" the controller will advance to the related third level question(s): "SKIP EXTRA OPTIONS" or "USE EXTRA OPTIONS".

Reverting to a higher level in the hierarchy, an "OK" response to the third level question "USE EXTRA OPTIONS" will cause the controller to cycle through the following six fourth-level questions:
"AUTO-SPLITS?"
"EXCLUDED PERIOD?"
"SYRINGE CYCLES?"
"SOAKS CYCLES?"
"SPECIAL STARTS?"
"OPTION SETUP OK?"

The fourth-level question "AUTO-SPLITS?" may be adapted, causing display of fifth-level questions:
"KEEP SAME site info?"
"SEE OR CHANGE site info?"

The default to the first fifth-level question, and to the fourth level question "AUTO-SPLITS" itself, is based on site information by station. The default to the site information itself (entered elsewhere) is level sand, flat sprays. After default, or entered, information is accepted the controller will display calculated maximum ON and minimum OFF times by station.

Adaptation of the fourth-level question "EXCLUDED PERIOD" requires entry of a start and a stop time to the excluded period, all in the conventional manner of entering time first by (blinking) hour and then by (blinking) minute.

Adaptation by pressing the "OK" key of the fourth-level question "SYRINGE CYCLES" causes an irrevocable sequence to gather the following information (not hereinafter next expressed in the form of questions):
Set Syringe Months
Set Syringe Duration by Station (1–15 min)
Set Syringe Period (Starting & Ending Time)
Set Syringe Interval (Time Between Cycles)
Confirm # of Cycles & Interval
The detailed information entry varies but is substantially respectively similar to data entry transpiring in response to (i) the fifth-level question "SPECIFIC...", (ii) the third-level question "STA 1 DURATION=0 h+0m", (iii) the fourth level question "EXCLUDED PERIOD?", (iv) a generalized time interval entry in hours and minutes, and (v) a generalized confirmation of a displayed number—each as discussed above.

Adoption by pressing the "OK" key of the fourth-level question SOAKS CYCLES? causes a totally automated calculation to transpire. The calculated results are displayed as:
SOAK DURATION (by station)
SOAK CYCLE (by station in range 2–26 weeks by week)
Disavowal is by use of the arrow keys, and is followed by user insertion of desired data. The user is in any case asked for the soak day by question "SOAK DAY?" Day of the week entry response to this question is conventional.

Adoption by pressing the "OK" key of the fourth-level question "SPECIAL STARTS?" is directed to entering data for lights, fountains, and other fixedtime events up to sixteen in number (of starts). Data that is enterable includes, for each start, includes the following:
Stn Number
Day Cycle (example M-W-F—)
Start Time
Duration (in hours & minutes) [1 min–8 hours]
At the end of each entry the questions "NO MORE/MORE" are positioned in the alternative to let the user choose to enter more information, or to exit to the next fourth-level question.

An affirmative, "OK" key, response to the final fourth-level question "OPTION SETUP OK?" causes an information-only screen (no keys are active) saying "WAIT... saving program" while the entered option data is saved. Thereafter continuation is made at the next first-level menu item, or "RUN SCHEDULE?".

Returning to the second level, an "OK" response to the second-level question "SEE/CHANGE PROGRAM?" causes the sequential display of the following five questions in the form of a menu:
"DURATIONS?"
"START TIME?"
"DAY CYCLES?"
"EXTRA OPTIONS?"
"NOTHING?"
At each of the "DURATIONS?", "START TIME?", "DAY CYCLES?" the displayed quantity is respectively the duration, start time, and cycles previously entered for a particular station. Repudiation of any or all of these quantities by use of the arrow keys permits the immediate entry of new data in the conventional manner.

An "OK" response to the third-level question "EXTRA OPTIONS?" causes the fourth level to be entered at this point in the hierarchy. At this fourth-level point the controller cycles through fourth-level questions:
"AUTO-SPLITS?"
"EXCLUDED PERIOD?"
"SYRINGE CYCLES?"
"SOAK CYCLES?"
"SPECIAL STARTS?"
"OPTION SETUP OK?"
Data entry in accordance with each question may be entered by pressing the "OK" key, or a next question may be sequenced by pressing the arrow keys. Exit from this fourth level is accomplished by pressing the "OK" key to the question "OPTION SETUP OK?".

Adaptation of any of the fourth-level questions "AUTO-SPLITS?", "EXCLUDED PERIOD?", "SYRINGE CYCLES?", and/or "SPECIAL STARTS?", results in the further sequencing through the following fifth-level questions:
"SEE/CHANGE?"
"KEEP SAME?"
"CANCEL?", or "ADD". An "OK" response to the "SEE/CHANGE?" question means to see. Any existent data within the computer for the corresponding quantity will then be displayed. An arrow response to the "SEE/CHANGE?" question will allow entry of data changing the display quantity in a conventional data entry manner. The "SEE/CHANGE?" sequence steps through all stations, including those for which no data has been previously entered.

The "KEEP SAME?" fifth-level question applies to all stations in aggregate. If this question is responded to by an "OK" response then all data for all stations remains as previously set. Depression of an arrow key cycles to one of the remaining two questions upon the same fifth level.

An "OK" response to the "CANCEL?" question indicates that the corresponding splits, period, cycles, or starts, as the case may be, should be cancelled. Alternatively, an "OK" response to the "ADD?" question causes a branch back to the appropriate third-level data entry section as respectively regards auto-splits, excluded period, syringe cycles, soak cycles, or special starts. An "OK" response to the "ADD?" is thus a means, accomplished during the program review cycle ("SEE/CHANGE PROGRAM?"), permit expeditious return to an appropriate data entry area if program changes are desired to be made.

At the conclusion of all adoptions and/or changes that are desired to be made due to program review under the second-level question "SEE/CHANGE PROGRAM?", an "OK" response is made to the third-level question "NOTHING?". At this time the controller will display the information-only message (no keys are active) "WAIT . . . saving program". At this time any revised information is saved. The controller thereafter continues at the next first-level menu item, or RUN SCHEDULE?".

Continuing at the highest, first, level, the second of the controller's six positive questions is "RUN SCHEDULE?". If this question is adopted by an "OK" response then the controller will (i) display a particular piece of data, and accept changes thereto, and (ii) ask further second-level questions.

At the onset, the controller will display the current time in hours, minutes, day of week, month, date, and year—accompanied by a blinking question mark. An "OK" response to this display will cause sequencing on this second level to one of the two additional activities thereat, both in the form of options. An arrow key response to the display time and blinking question mark will cause a first one of the seven fields thereof to blink. If it is desired to change this field then data entry to do so may be accomplished by conventional use of the arrow keys.

If, however, the content of this particular field is satisfactory then the next field may be sequenced for change by depressing the "OK" key. At such time as all fields have been sequenced through the entire seven-field current date will again be displayed with the blinking question mark.

Continuing at the second level, an "OK" response to the question "AUTOMATIC RUN?" permits entry into options for initiating automated activity, or running, of the irrigation controller. At this point in the second hierarichal level, the irrigation controller will sequence through the following two questions:
"SKIP Run Options?" or "USE Run Options?"
"READY to Run Now?" or "NOT READY to Run Now?"

As with the "SKIP"/"USE" options available under first-level question "ENTER NEW PROGRAM?", the blinking "SKIP" message is always displayed first. Use of either arrow key causes the message to cycle to "USE". One alternative, either "SKIP" or "USE" must be adopted by depressing the "OK" key.

An "OK" response to the second-level question "USE Run Options?" causes the controller to sequence through the following three fourth-level questions:
"RESUME LAST run?"
"START NEW run?"
"ALL OPTIONS OK?"
An "OK" response to "RESUME LAST run?" will cause resumption of running at the same day number as when the previous running stopped. It will additionally cause that further questions upon this fourth-level are skipped, and the controller will proceed to the next second-level "READY to run now?/NOT READY to run now?" questions.

An arrow response to the question "RESUME LAST run?" will cause the question "START NEW run?" to be displayed. An "OK" response to this question starts the run at day number one, and causes the controller to sequence to a next, fifth-level, menu. The questions on this fifth-level menu are as follows:
"SET RAIN DELAY?"
"SET RAIN DELAY?"
"TURN STNS OFF/ON?"
Data in response to each of these questions may be entered by depressing the "OK" key. In the case of an "OK" response to the "WATER BUDGETS?" question, the further questions "MONTHLY?" followed by "YEARLY" will be asked. The "MONTHLY?" question may be responded to by conventionally entering a number which represents the percent of a normal months budget which is to be used. The question "YEARLY?" may likewise be responded to by entering a number which represents the percentage of the overall watering budget that is to be used.

The next fifth-level question "SET RAIN DELAY?" may be responded to by a conventional data entry of a period from 0 to 90 days. The final fifth-level question at this point in the hierarchy, "TURN STNS OFF/ON?" may be responded to so as to set (by the "OK" key) or not set (by the arrow keys) each individual station either to respectively run or not to run.

At such time as fourth-level questions "RESUME LAST run?" and "START NEW run?" have been responded to, a final fourth-level question at this point in the hierarchy asks "ALL OPTIONS OK?". An "OK" response to this question indicates that the user is done with setting the run resumption and start options, and that reversion to the second level of the hierarchy is desired. Conversely, an arrow key response to this question will continue cycling within the fourth level of the hierarchy.

If a reversion is made to the third level of the hierarchy, and if the "READY to run now?" question is adopted by use of the "OK" key, the controller will display the information-only message "Now Watering: Remove LEIT Key!" as the terminal message of operator communication. The acronym "LEIT" stands for Light Energized Irrigation Technology, and refers to the irrigation controller in accordance with the present invention.

The function of the man-machine interface has been explained, to this point, sufficiently so as to permit recognition of the control and data entry that transpires across the interface, and of the manner of context switching that the interface undergoes in response to user entries. The equivalent use of the interface to realize still other function so irrigation control may be understood by further reference to Table 1, FIG. 7, and particularly to FIG. 8.

4.0 Functional Description of the U1 ASIC Device

Figure 3A:
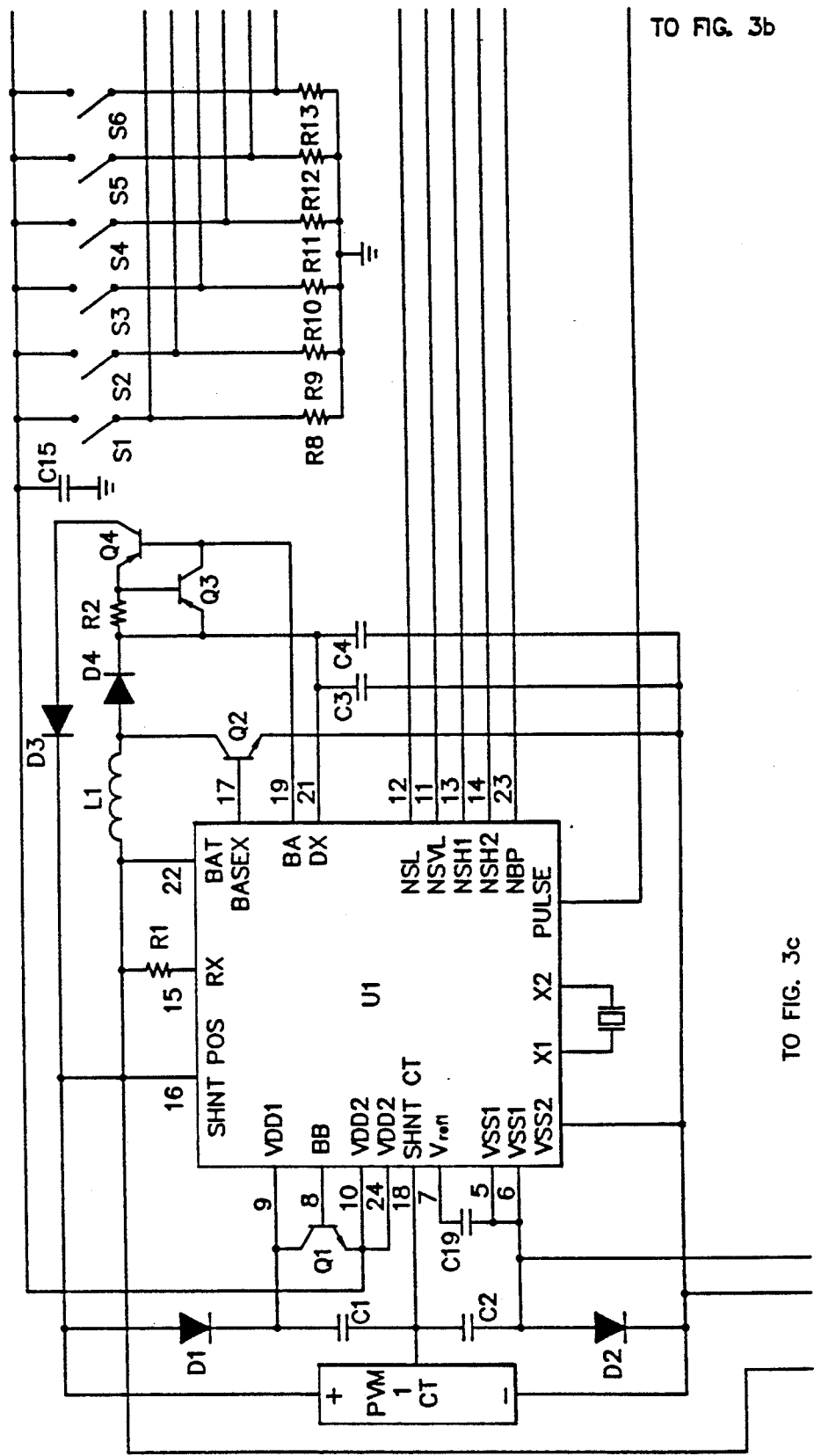
Figure 3B:
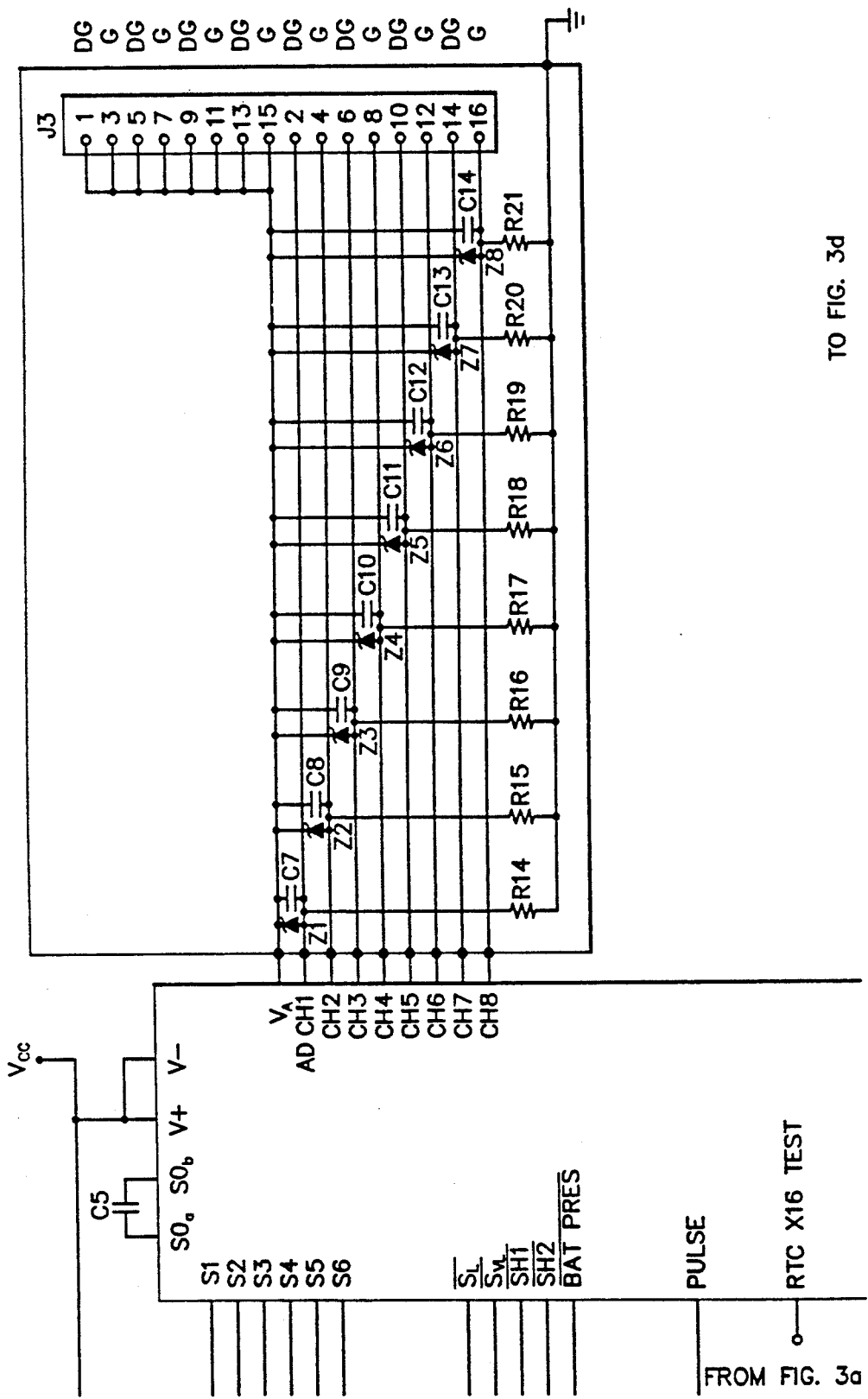
Figure 3D:
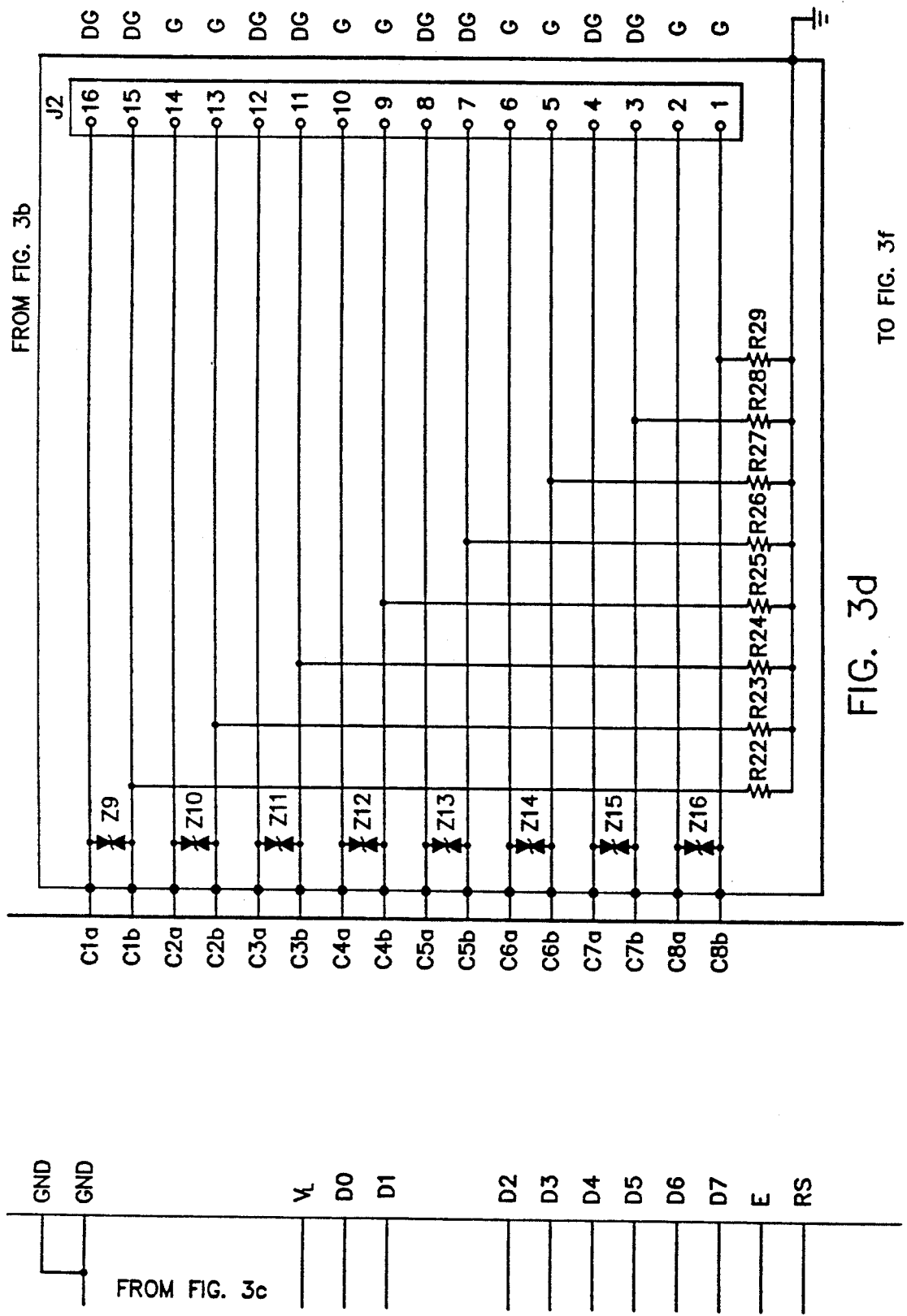
Figure 3E:
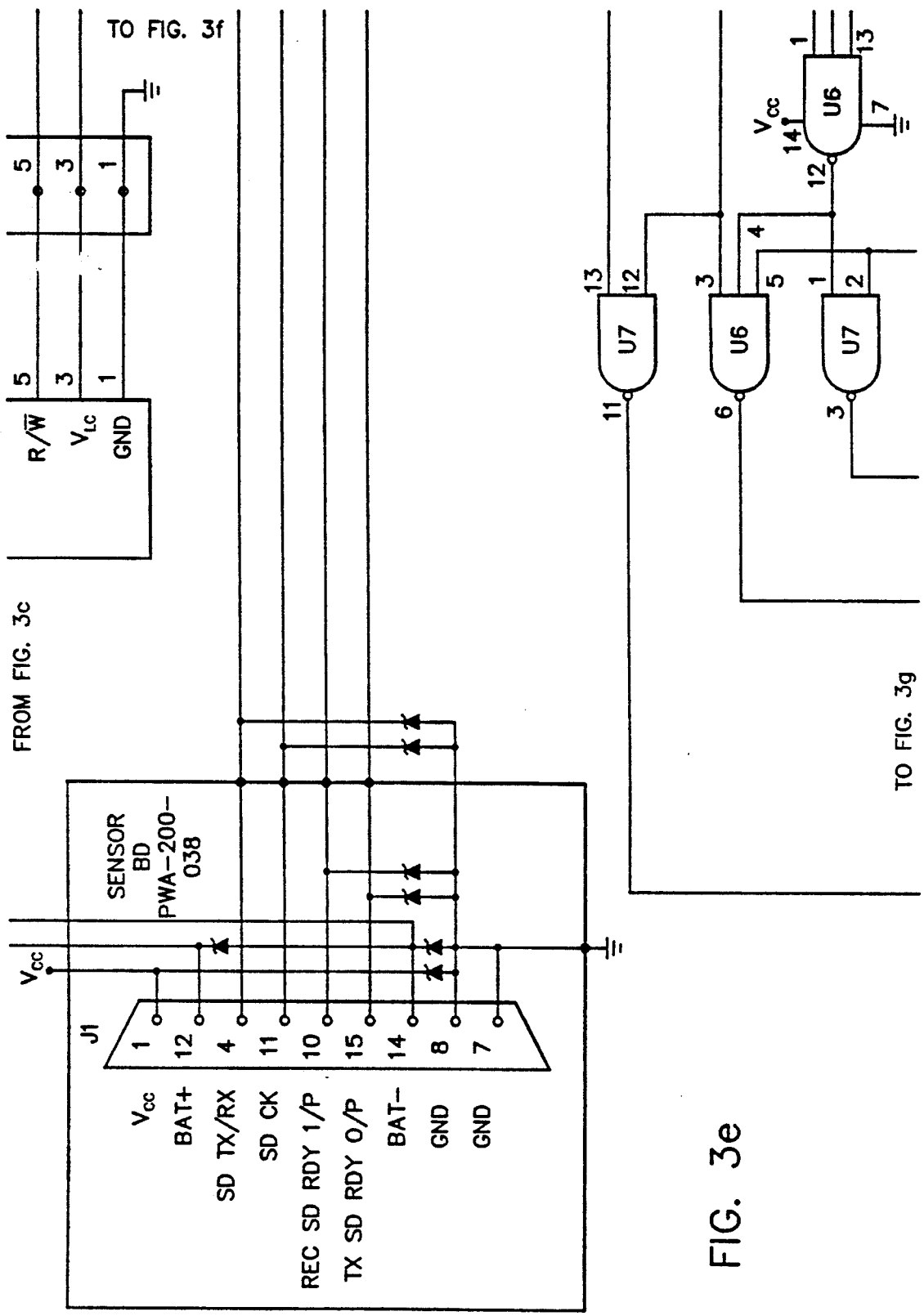
Figure 4:
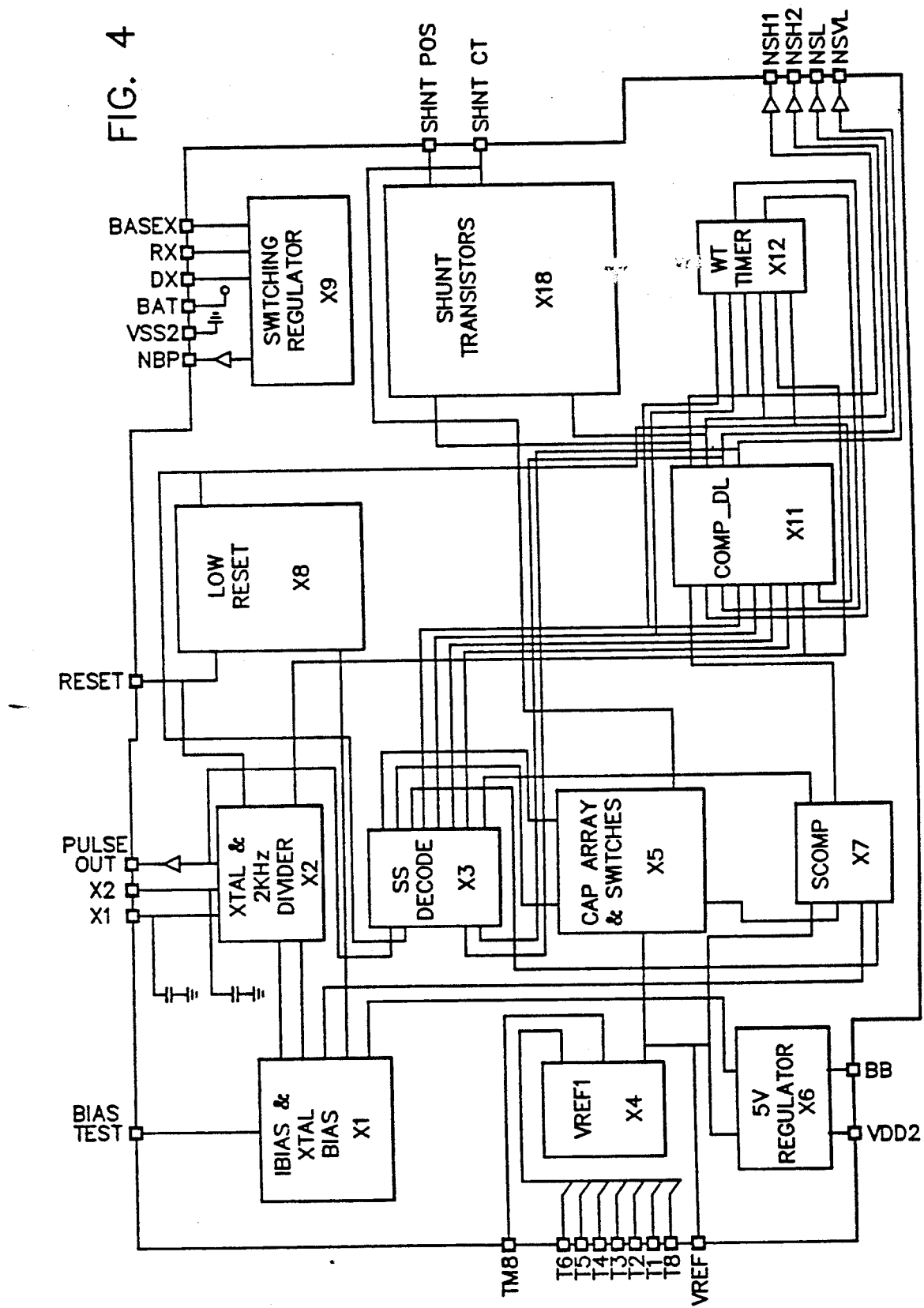
FIG. 4 is a block diagram of a first, U1, Application Specific Integrated Circuit (ASIC) used in the preferred embodiment of an irrigation controller that employs the preferred embodiment of a man-machine interface in accordance with the present invention.

The block diagram of FIG. 4 shows the overall architecture of the first, U1, Application Specific Integrated Circuit (ASIC) used within the preferred embodiment of the irrigation controller using a manmachine interface in accordance with the present invention. The detail function of ASIC U1 is essentially unimportant for the purposes of the present invention, and is included within this specification only for purposes of completeness. The photovoltaic module (PVM, shown in FIG. 3a), SUPERCAPS C1 and C2 (shown in FIG. 3a) and ASIC U1 (shown in FIG. 3a) may be considered to simply be the implementation of a special form of a light-energized power supply. The general implementation of an a.c. or battery source power supply is, of course, routine in the electrical arts.

The U1 ASIC device is used to generate a 5 volt power supply using power from a photovoltaic modult or battery. Power is stored by charging very large supercapacitors ("SUPERCAPS") to 10.8 volts. The stored energy is then used for operation during dark periods. Because the energy stored in the SUPERCAPS=$\frac{1}{2} CV_{cap}^2$, the run time duration of the controller during conditions of darkness is greatly affected by how closely the maximum charge voltage can be brought to the maximum tolerable voltage for the SUPERCAP components. Therefore, to increase the dark run time, the "SUPERCAPS" are very carefully monitored, so that they may be charged to a maximum value without being over-charged.

The U1 ASIC device is designed to use minimal power while providing five (5) functions:

First, it monitors SUPERCAP voltages and shunts the charging current if they are over-charged. The monitoring holds this voltage to within +/− 1.75%.

Second, it provides a 5 volt +/−2.5%, 0-65 mA output voltage to power other electronics.

Third, it provides status signals indicating the condition of the power supply.

Fourth, it provides a 2 kHz, 30 us pulse for use as a time base.

Fifth, it steps up a 9 volt battery to 17 volts to charge the SUPERCAPS and provide current during programming of other electronics. (Power consumption is less of a concern in this mode.)

Sampling capacitors are used to monitor the various capacitor and power supply voltages, allowing the use of only one comparator to conserve current. CrSi 100 k$\Omega$/resistors are used to minimize analog currents.

The voltage reference is trimmed using on-chip metal fuses.

There are 3 potential 'most positive' voltages and two potential 'most negative' voltages, making substrate connections difficult. This is handled by using bipolar junction isolation that employs the isolated n- regions as separate CMOS substrates. This allows the CMOS circuitry to operate from several supplies, any one of which could be at the highest potential at different times.

The logic generally runs from VSSI (OV) to VDD2 (0–5 V), level shifting where required. Analog references run from VSS1 to VDD1 (0–11 V). Switching regulator components run from VSS2 (−0.7 to +5.5 V) to VBAT (0 to 15 V). The upper shunt transistor is connected to a voltage which can range from 0 to VDD1 +0.7 V.

4.1 VREF1 Voltage Reference

The VREF1 circuit X4 is a voltage reference for monitoring supercaps, system low, and system very low. The circuit requires no opamps, reducing offset error. NMOS transistors at collectors of non bandgap transistors are used to eliminate early voltage effects. The circuit has a buffered output which multiplies the bandgap voltage and is trimmed to 1.50 volts. This trimming is with on-chip metal fuses. The trim range is approximately 1.5 +/−0.1 volts with minimum steps of 3 mV. An extra +/−1 LSB is provided in case original trim is incorrect. The circuit temperature coefficient is 60 ppm/° C. typical, 150 ppm/° C. worst case.

4.2 IBIAS & XTAL BIAS Bias Current Generator

The IBIAS & XTAL BIAS circuit X1 generates 20 nA bias currents for other cells, and 100nA bias (voltage) for xtal oscillator. It generates buffered 2 Vth voltage "VLOW" used to run the xtal oscillator and high-order dividers at low current. CrSi and p-resistors are combined to match TC of Vbe. The bias varies approximately +/− 28% over all parameters.

4.3 XTAL OSC & HIGH ORDER DIVIDERS

The XTAL & 2 kHz DIVIDERS circuit X2 generates a clock for capacitor switch sequencing. It uses a low current oscillator (CASC1 from TCJ) running from the second Vth supply voltage called VLOW. Internal trim capacitors are added to the crystal pins and are metal mask trimmable. Dividers to 2 kHz run from VLOW, then are level shifted to VSS1, VDD2 (0 to 5 V). This avoids level shifting at 32 kHz, conserving current.

Circuit input PULSE receives a 2 kHz 30 microsecond pulse used for on and off chip timing. Circuit input NSTROBE receives a 2 kHz, 15 us negative pulse occurring 60 us after PULSE and is used for on chip timing. The level shifters use approx. 30 nA each at 2 kHz.

4.4 SAMPLING SWITCH DECODE

The SS DECODE circuit X3 is clocked by input PULSE. One-shot is used to effectively generate a non-overlapped clock for the switch output signals. All switch signals are disabled (by inputs E and NE) for 0.6 to 4 us after each clock.

Switch sequencing samples the upper supercap, lower supercap, system low, and system very low in that order. Inputs NSC1, NSC2, NSSL, NSSVL define which voltage is being sampled. Each voltage is sampled once every 7.8 ms.

Input NCMP_CLK is the comparator clock. Input NCMP_ON powers down the comparator during unused periods.

4.5 SAMPLING CAP ARRAY & SWITCHES

The CAP ARRAY & SWITCHES circuit X5 contains sampling capacitors that are basically unit sizes. Due to the variety of voltages sampled, fractions of units are required. Poly etch tolerance can cause approximately 0.2% ratio error.

Inputs S1, S2, S3, S8 and S9 require signals level shifted above VSS2 (the normal logic level is VSS1, VDD2). Inputs S1, S2, S3, S8, S9 must save bodies tied to VSS1 & VDD1. All other switches may be tied to VSS1, VDD2. Note that this includes p-channel bodies, since they are isolated from the substrate in this process.

Sampling occurs such that the node OUT should remain at the reference voltage level if the sampled voltage is at its exact trip point. This avoids parasitic capacitance effects at this high-impedance node.

100 mV of hysteresis is added to the SL and SVL tests by switching between two slightly different capacitor values.

Figure 5A:
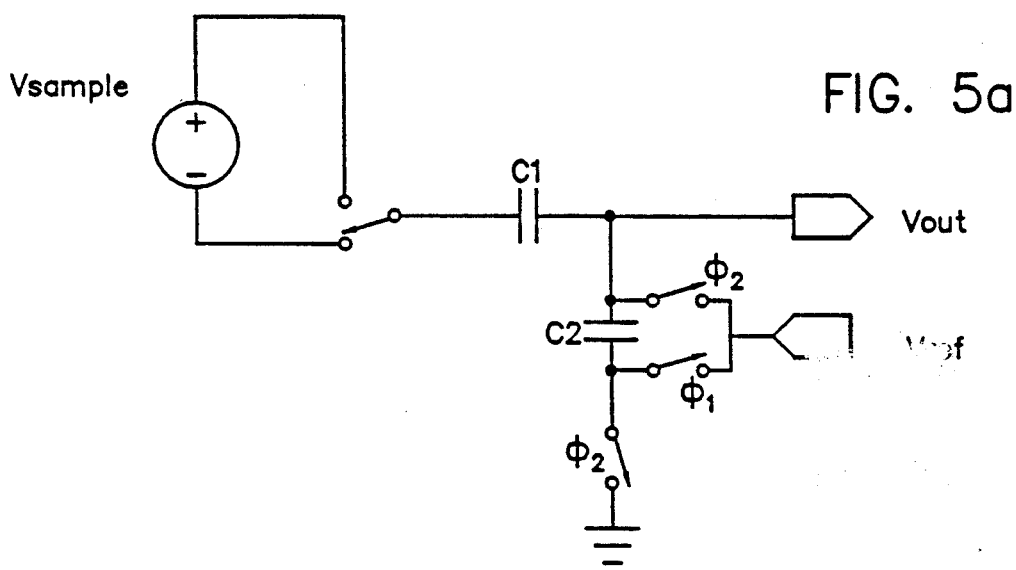
FIG. 5a is a simplified electrical schematic diagram of the sampling capacitor array and switches used in the ASIC U1 previously diagrammed in FIG. 4.

A simplified electrical schematic of the CAP ARRAY & SWITCHES circuit X5 illustrating its function is shown in FIG. 5a. In operation, $V_{OUT}=V_{REF}$ if $V_{SAMPLE} \cdot C1 = V_{REF} \cdot C2$.

4.6 SAMPLING COMPARATOR

The SCOMP circuit X7 compares output from the capacitor array to the reference voltage. It is inherently offset compensated. It's response time is less than 25 us.

Figure 5B:
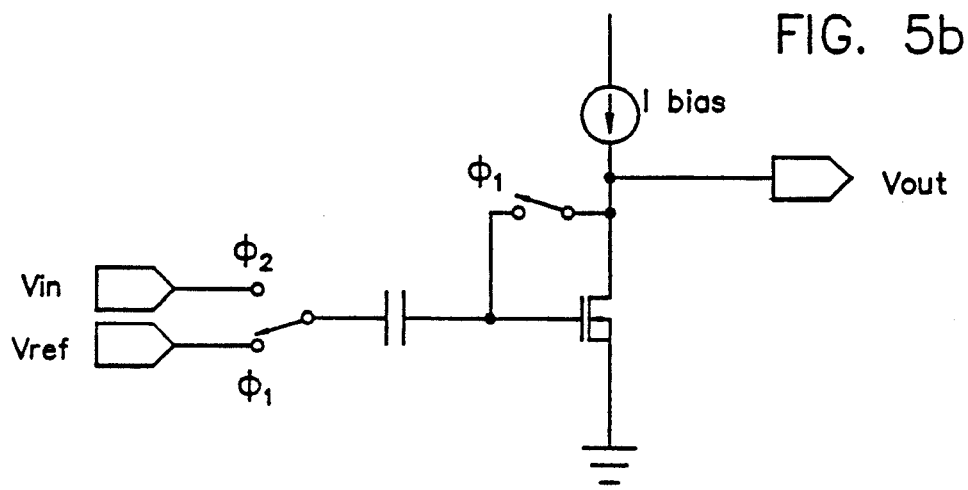
FIG. 5b is a simplified electrical schematic diagram of a sampling comparator used in the ASIC U1 previously diagrammed in FIG. 4.

A simplified electrical schematic of the SCOMP circuit X7 illustrating its function is shown in FIG. 5b. Phase 1 shorts the n-channel so that its gate voltage moves to the voltage where it carries exactly the current source current. The input capacitor is shorted to VREF and stores the difference between this gate voltage and VREF. Phase 2 opens the n-channel and connects the capacitor to the input voltage. If the input voltage is different from the reference, the gate is forced higher or lower, pulling the output of the current source down or allowing the current source to pull up.

4.7 COMPARATOR DATA LATCHES

The COMP DL circuit X11 stores the output of the comparator in the latch corresponding to the voltage being tested. It is clocked by input NSTROBE.

4.8 WAIT TIMERS

The WT TIMER circuit X12 is used as a "timed hysteresis" when the SUPERCAP voltages are sampled.

When near the trip voltage, the capacitors will tend to be above the trip voltage when charging, and immediately fall below the trip voltage when the charging current is shunted away. This is due to approximately 7Ω internal resistance in the SUPERCAPS.

The SUPERCAPS are sampled every 7.8 ms, and under the above conditions would alternate charging/discharging at a 50% cycle. A typical charge current of 20 mA would average 10 mA, while a typical load current is 12 mA continuous, resulting in a net energy loss. This would result in the capacitor charging to less than its maximum value by the internal I-R drop.

To avoid this situation, the comparator data latch is disabled for 3×7.8 ms after it comes out of a shunt mode. This results in a 3:1 charge to shunt ratio, ensuring that the net charge current is positive.

4.9 SHUNT TRANSISTORS

The SHUNT TRANSISTORS X10 shunt up to 70 mA away from the SUPERCAP when the maixmum voltage is exceeded. The SHUNT TRANSISTORS X10 have a resistance of approximately 3.5 Ω.

4.10 SWITCHING REGULATOR

The SWITCHING REGULATOR circuit X9 provides 17 volts from a 9 volt battery. The inductor shorting transistor of the circuit is off-chip (the IC is not required to handle the 17 volts).

Output NBP signals the VDD2, VSS1 logic when a battery is attached to the BAT, VSS2 terminals.

Figure 5C:
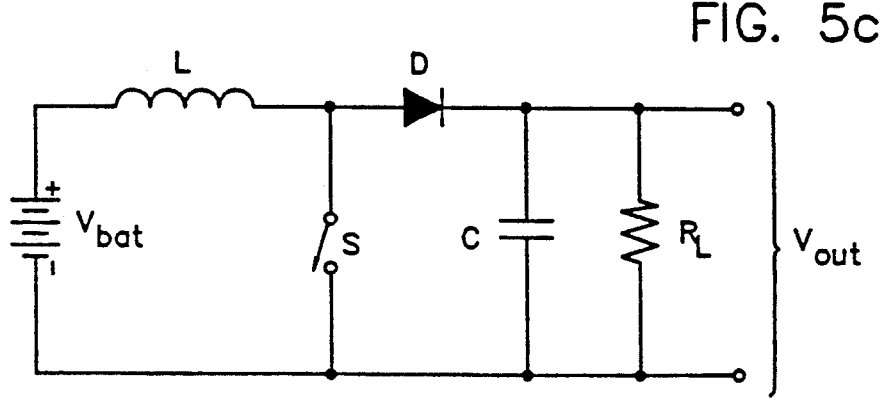
FIG. 5c is a simplified electrical schematic diagram of a step-up DC-to-DC converter used in the switching regulator of the ASIC U1 previously diagrammed in FIG. 4.
Figure 6A:
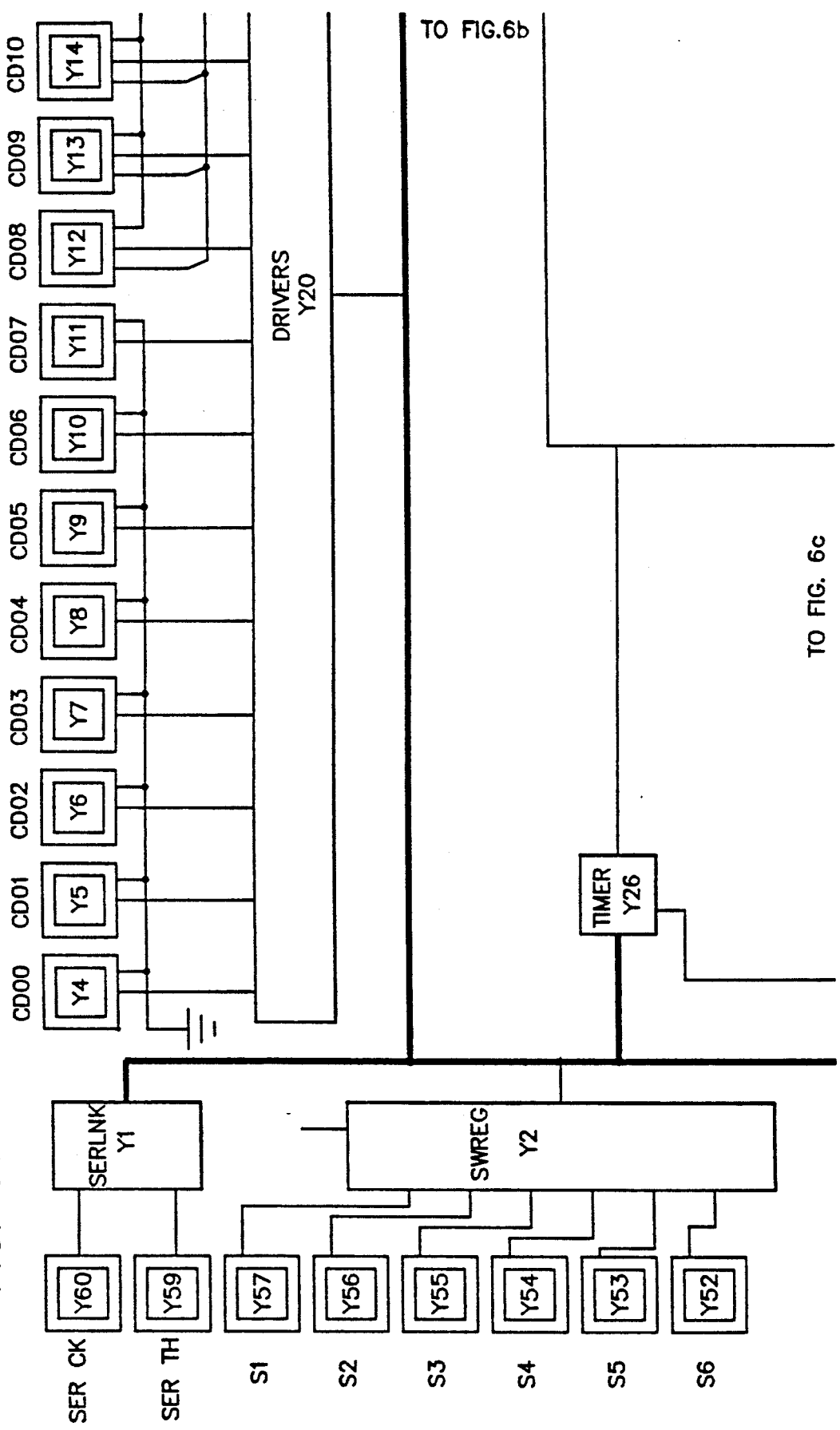
FIGS. 6a, 6b, 6c, and 6d are a block diagram of a second, U2, Application Specific Integrated Circuit (ASIC) used in the preferred embodiment of an irrigation controller that employs the preferred embodiment of a man-machine interface in accordance with the present invention.
Figure 6B:
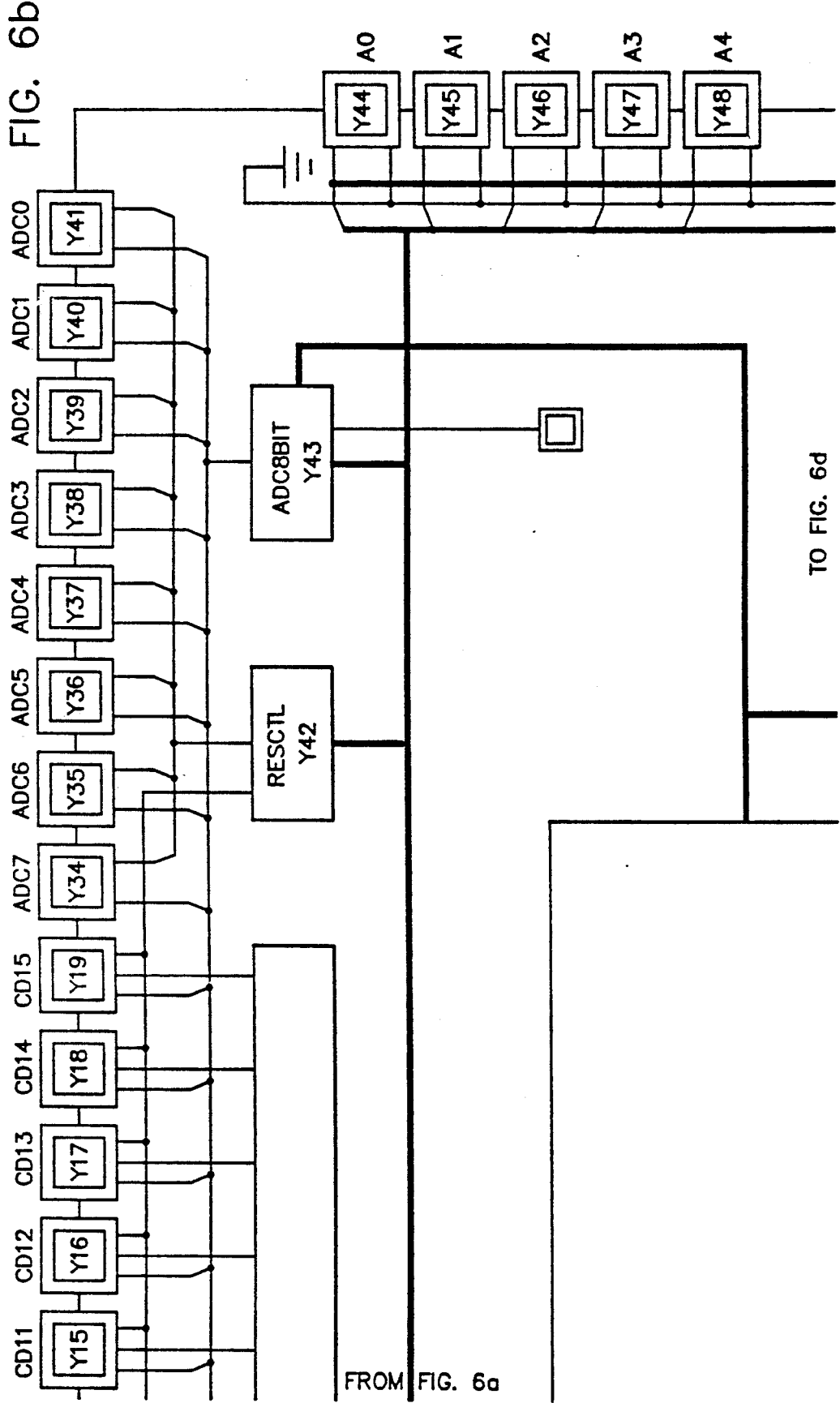
Figure 6C:
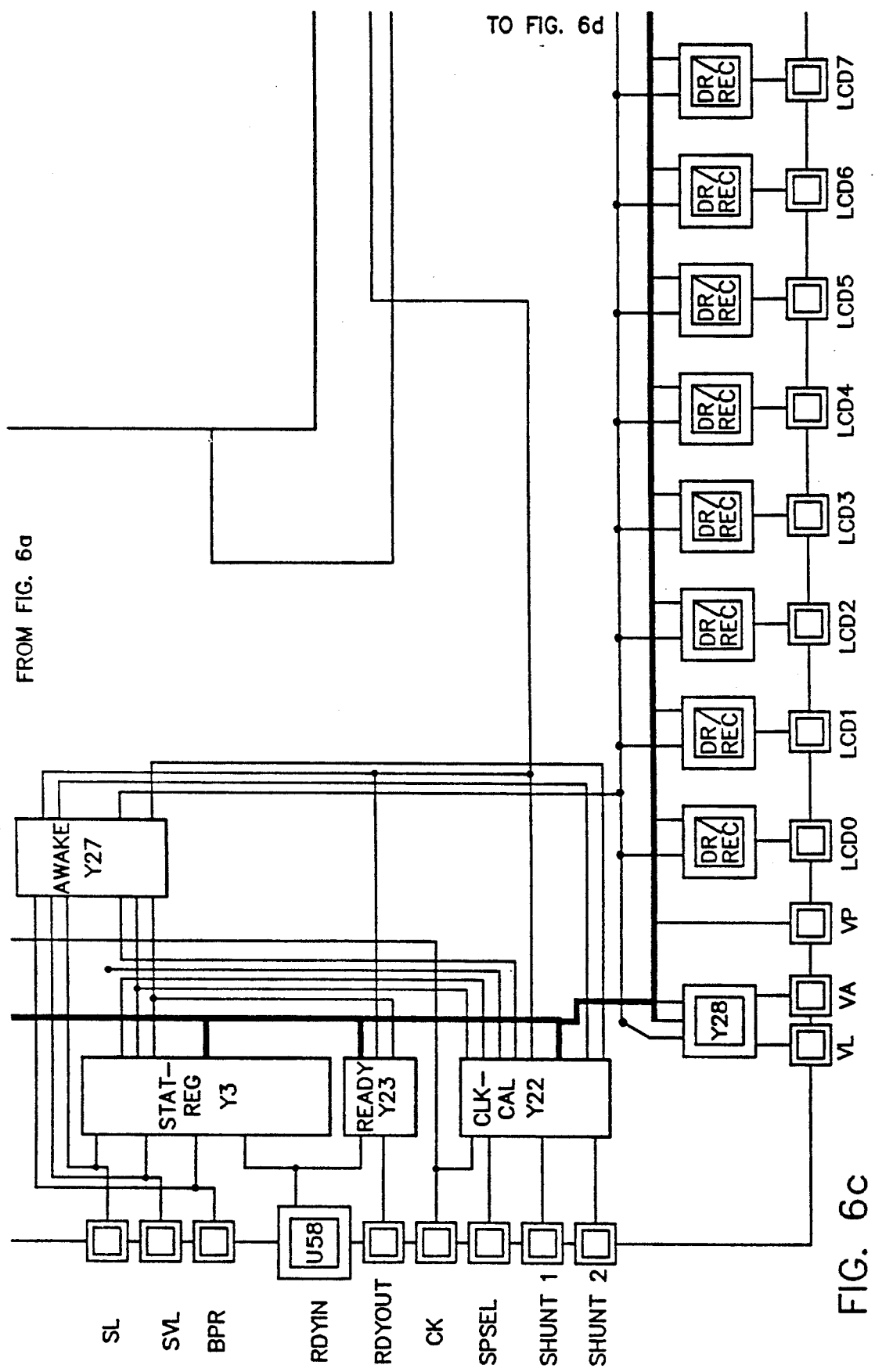
Figure 8A:
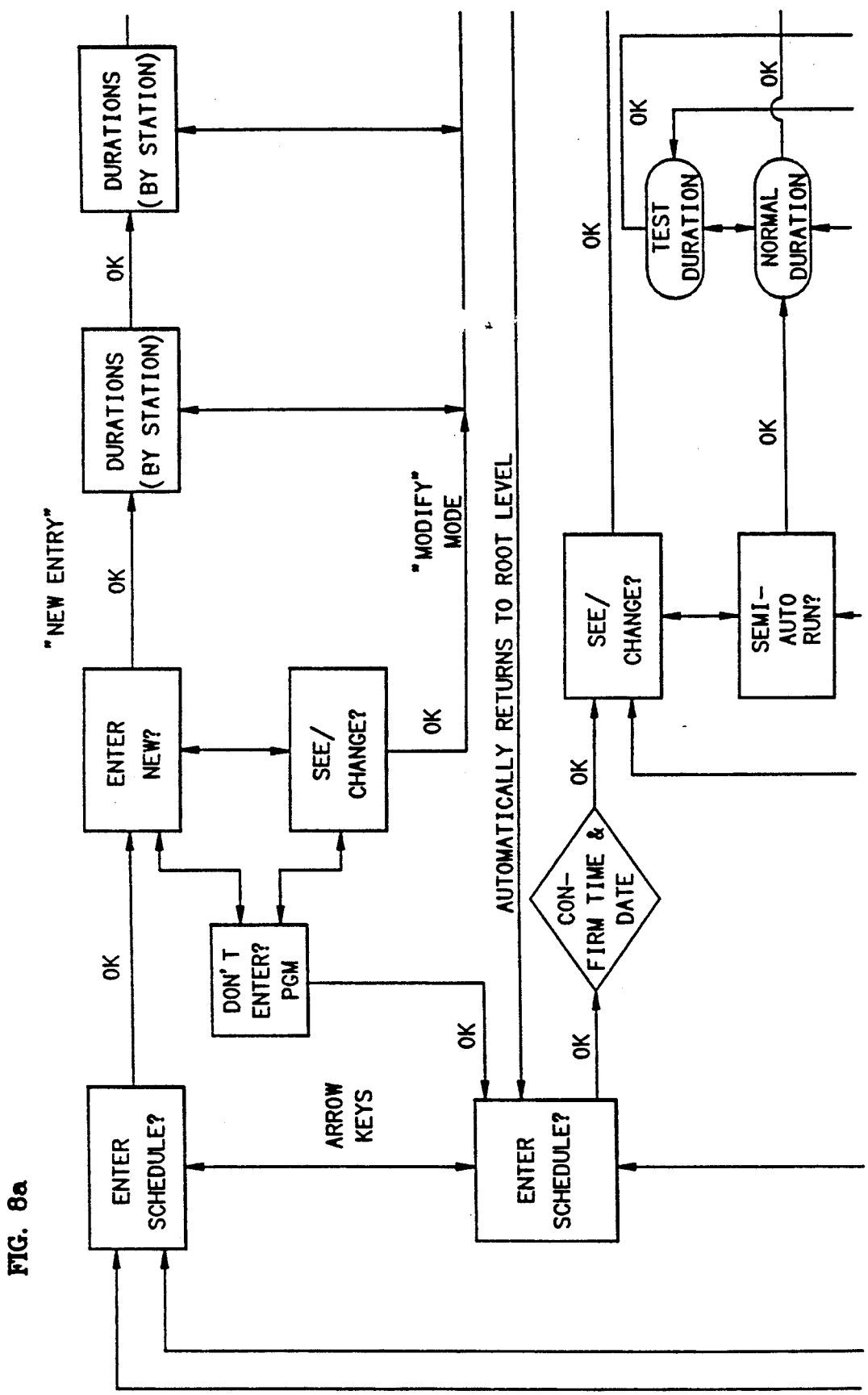
FIG. 8, consisting of FIGS. 8a, 8b, 8c, 8d, 8e, 8f, 8g, 8h, and FIG. 8i, is a diagram of the control and data entry activity transpiring on the preferred embodiment of a man-machine interface in accordance with the present invention as employed in an irrigation controller for purposes of irrigation control.
Figure 8B:
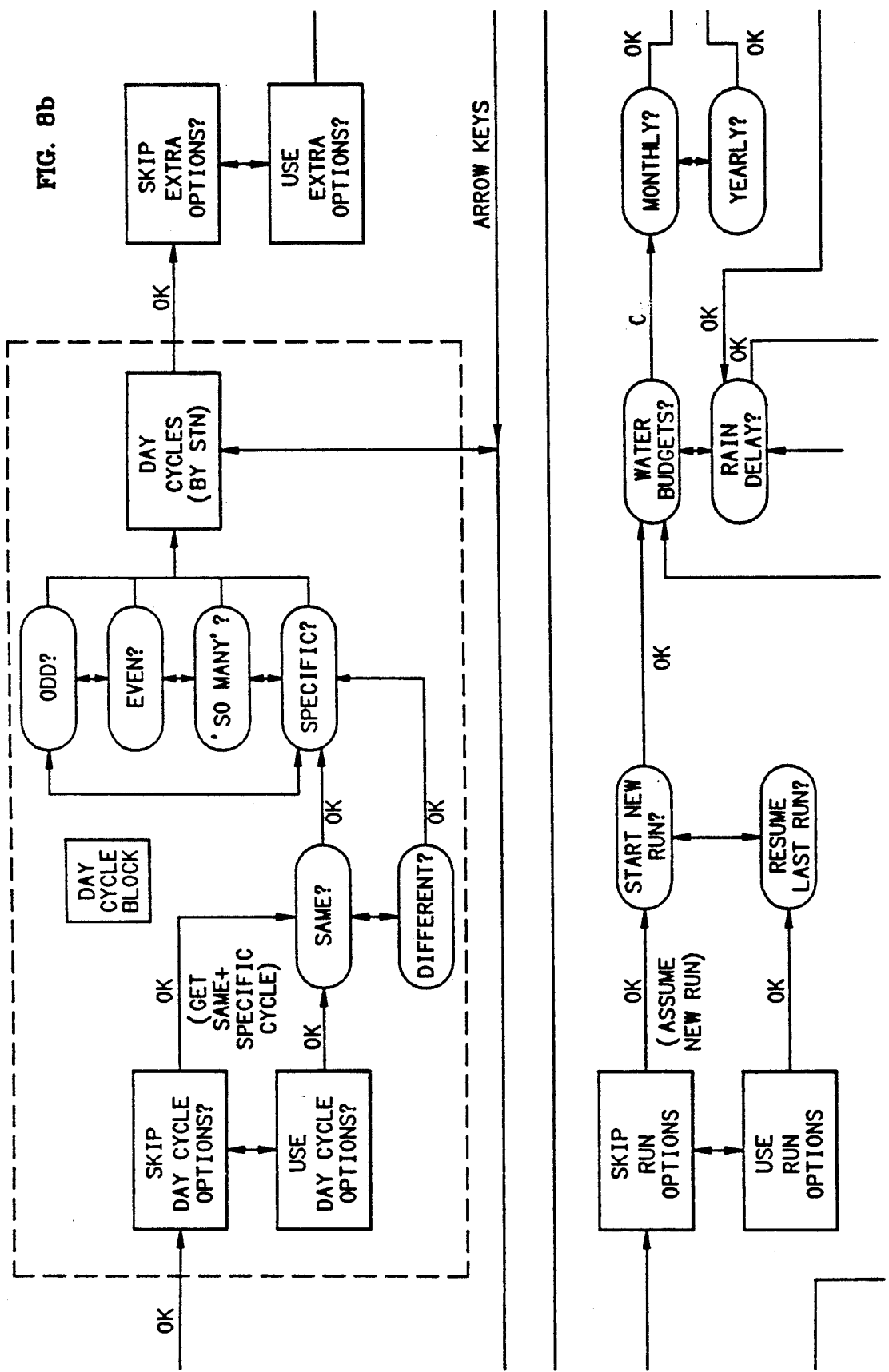
Figure 8C:
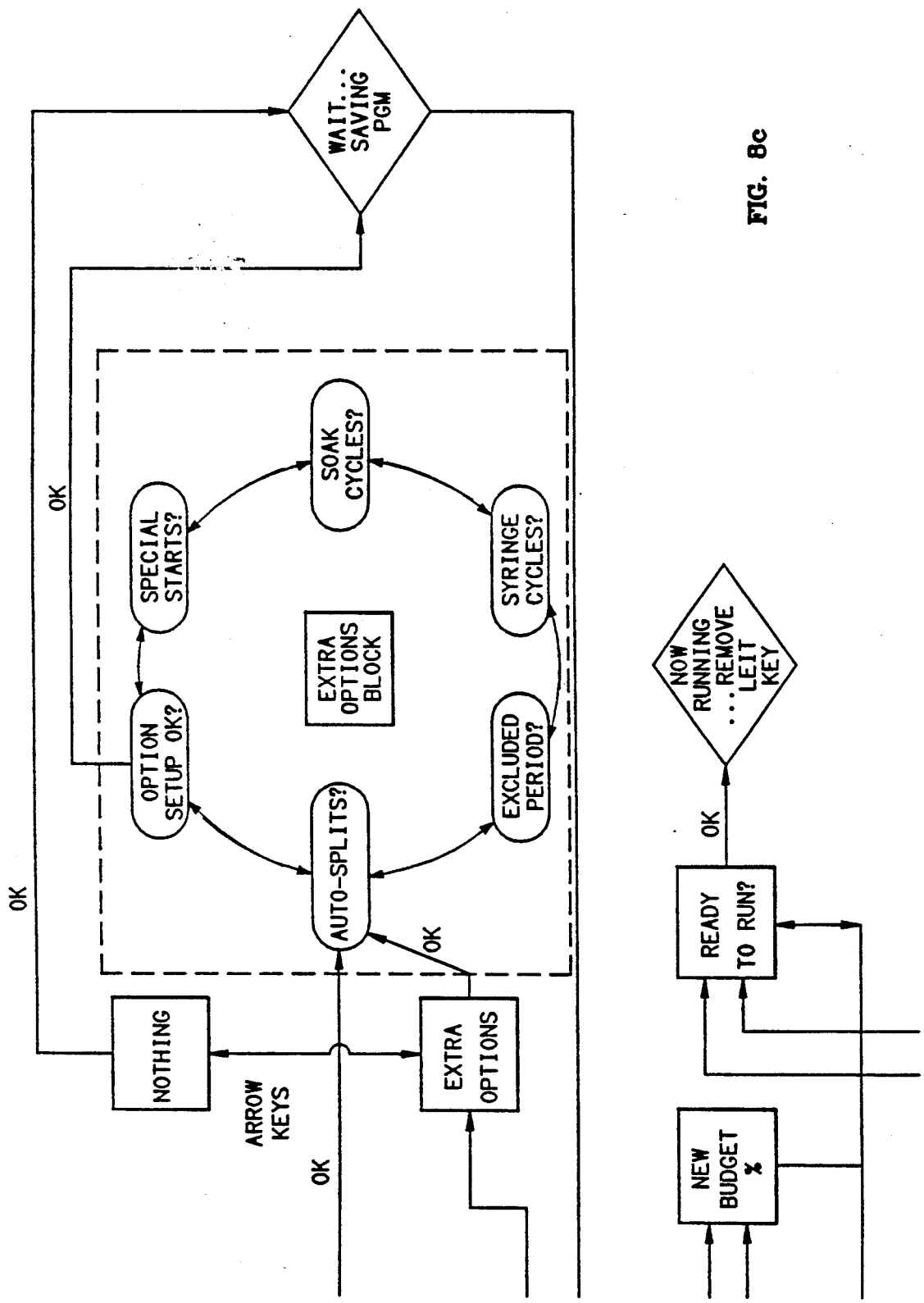
Figure 8D:
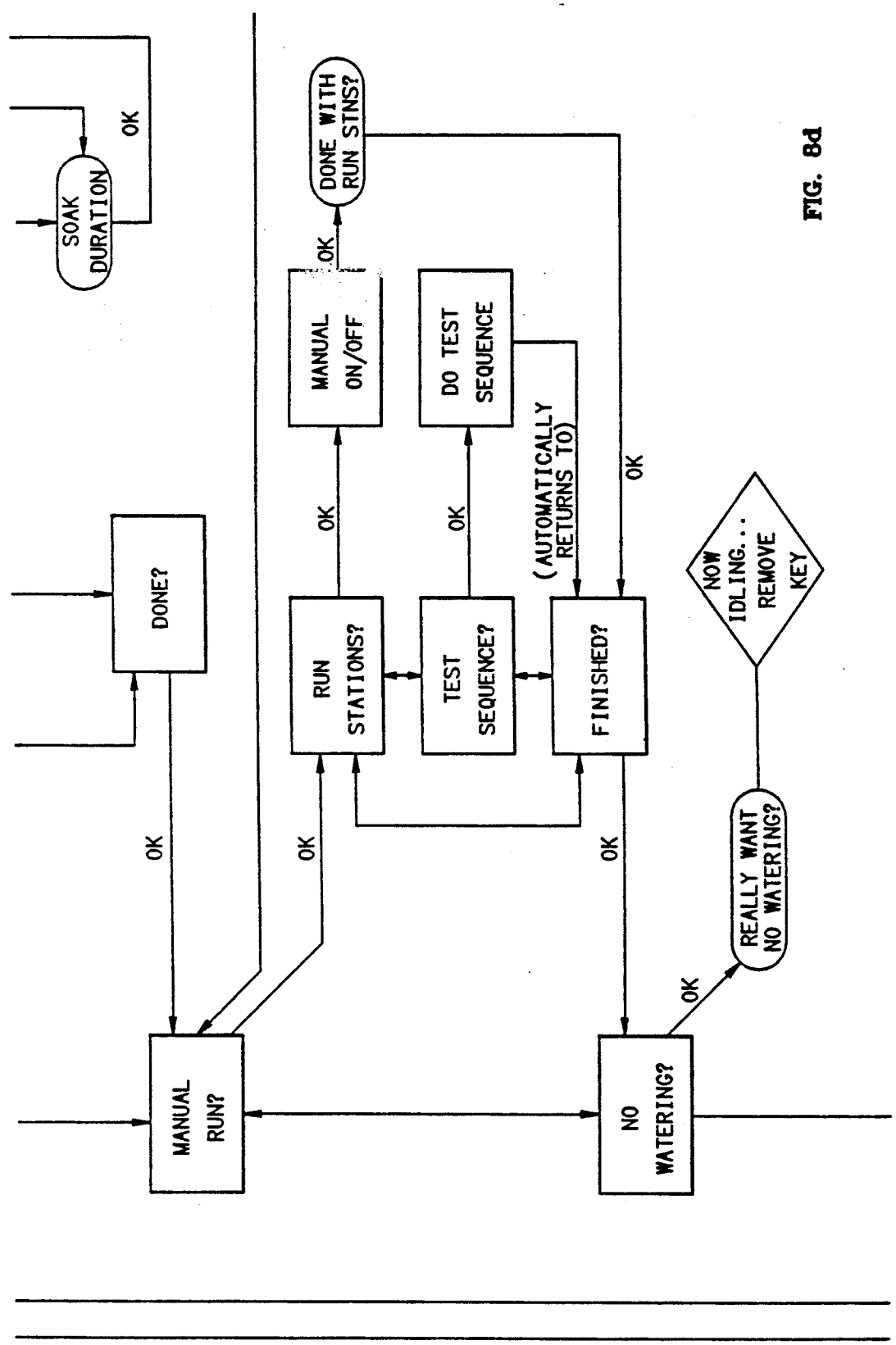
Figure 8E:
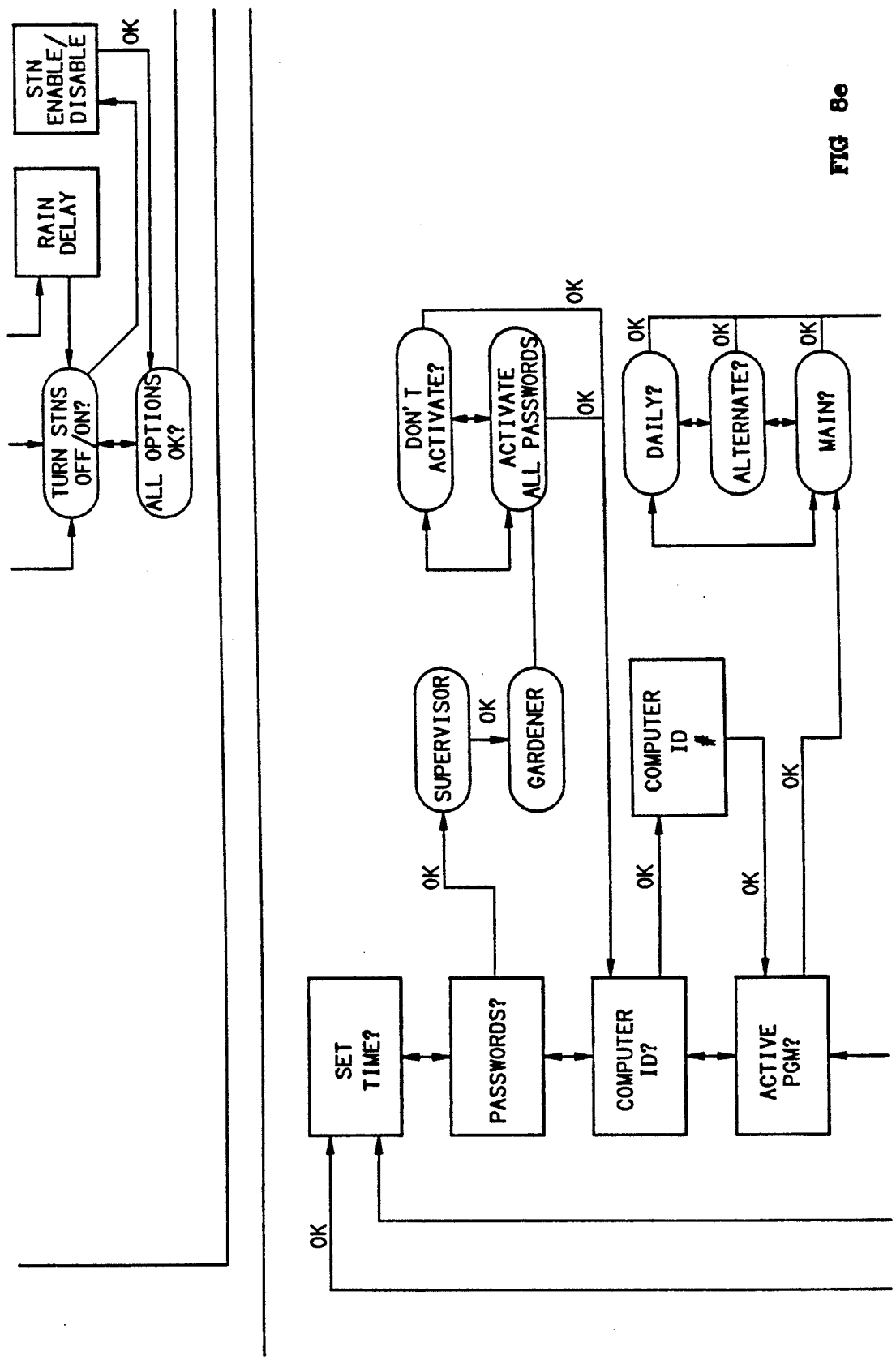
Figure 8F:
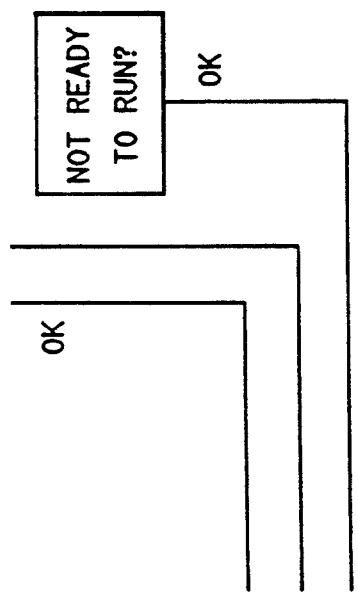
Figure 8G:
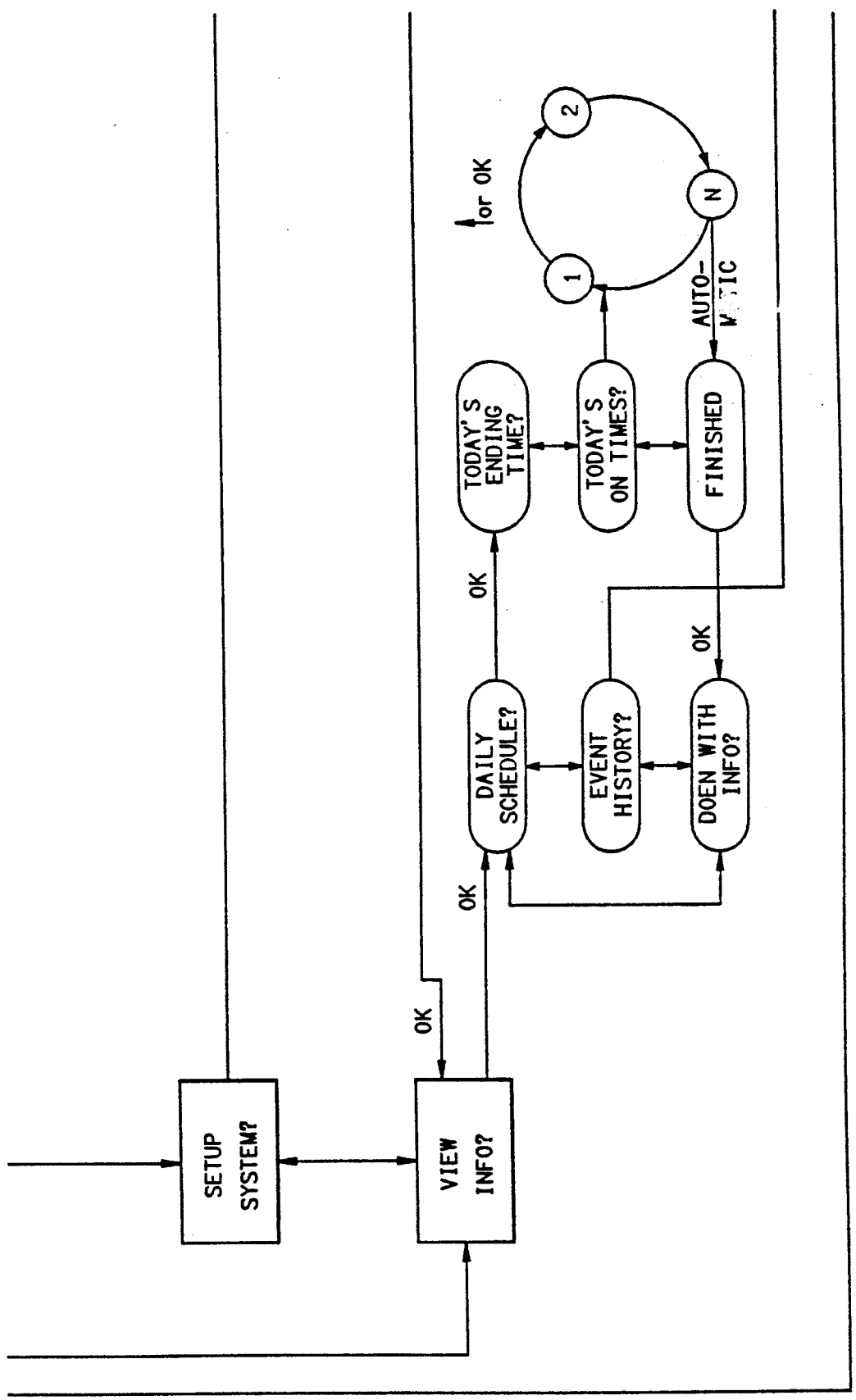
Figure 6H:
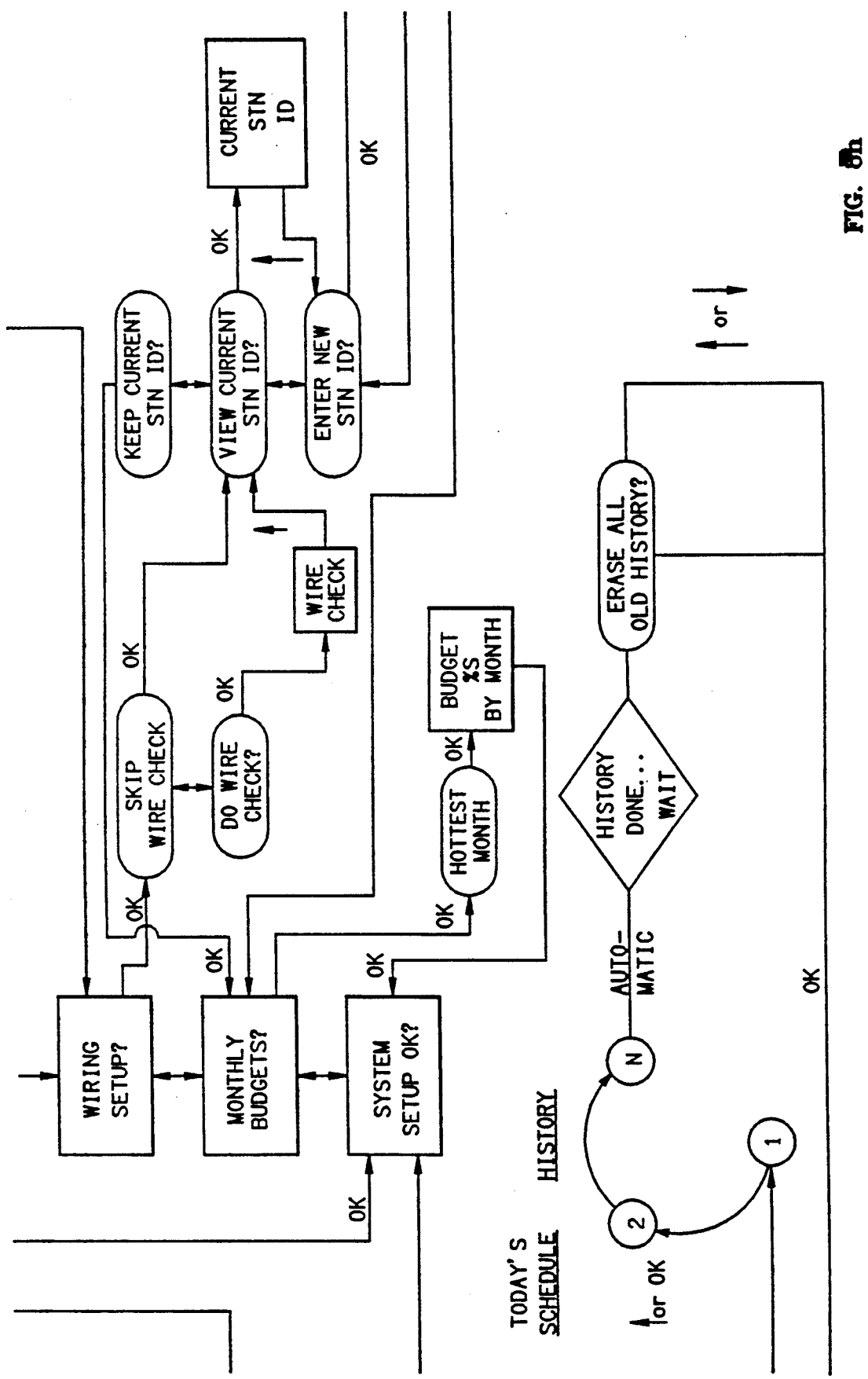

A simplified electrical schematic of a step-up DC-to-DC Converter circuit used in SWITCHING REGULATOR circuit X9 and illustrating its function is shown in FIG. 5c. When switch S is closed the battery voltage is applied across the inductor L. Charging current flows through the inductor, building up a magnetic field, increasing as the switch is held closed. While the switch is closed, the diode D is reverse biased (open circuit) and current is supplied to the load by the capacitor C. Until the switch is opened the inductor current will increase linearly to a maximum value determined by the battery voltage, inductor value, and the amount of time the switch is held closed ($I_{PEAK}=V_{BAT}/L \times T_{ON}$). When the switch is opened, the magnetic field collapses, and the energy stored in the magnetic field is converted into a discharge current which flows through the inductor in the same direction as the charging current. Because there is no path for current to flow through the switch, the current must flow through the diode to supply the load and charge the output capacitor.

If the switch is opened and closed repeatedly, at a rate much greater than the time constant of the output RC, then a constant DC voltage will be produced at the output.

4.10.1 SWITCHING REGULATOR BIAS

The internal bias of SWITCHING REGULATOR circuit X9 is used only for biasing switching regulator components. The bias is provided by a Standard 5 uA bias cell type A54020. Its absolute value is not critical.

4.10.2 VREF2

The SWITCHING REGULATOR circuit X9 has an internal reference for monitoring switching regulator output voltage. The reference is provided by a standard cell reference type A53000 that is modified to use CrSi.

The reference circuit is chosen to keep non collectors at positive voltage. (Switching regulator can have voltages below the substrate voltage VSS1.)

The value and temperature coefficient of the circuit are not critical, and trim is not required.

4.10.3 RC OSC

The SWITCHING REGULATOR circuit X9 has an internal clock for switching the regulator at approx. 25 kHz. The clock is divided from 50 kHz to give a 50% duty cycle. It employs a standard cell reference type A55010 that is modified for CrSi. An approximate 150 k$\Omega$ external resistor is required.

4.10.4 SWITCHING REGULATOR COMPARATOR

The SWITCHING REGULATOR circuit X9 has a comparator that uses positive feedback for an improved response time of 3.5 us maximum.

4.11 VREG

The 5 V REGULATOR circuit X6 provides a 5 volt +/−2.5% regulated output for external electronics as well as VDD2 for internal logic. An external NPN is used to avoid thermal effects on the IC.

4.12 LOW VOLTAGE RESET

The LOW RESET circuit X8 resets the entire U1 ASIC. The power supply can (under various light conditions) take minutes to hours for power up, which eliminates normal power-on-reset circuits. This circuit must ensure that all outputs are valid until the analog circuits are operational.

The output holds all latches in reset until the bias, reference, and regulator circuits are all running at levels acceptable for operation.

4.13 Preferred Technology for the U1 ASIC

The U1 ASIC is suitably implemented in BIPOLAR-CMOS technology available from several semiconductor foundaries. It is typically implemented in the BI-CMOS process of Micro-Rel Division of Medtronic, Inc., 2343 W. 10th Place, Tempe, Ariz. 85281.

5.0 FUNCTIONAL DESCRIPTION OF THE U2 ASIC DEVICE

The block diagram of FIG. 6, consisting of FIG. 6a through FIG. 6f, shows the overall architecture of the second, U2, Application Specific Integrated Circuit (ASIC) used within the preferred embodiment of the irrigation controller using a manmachine interface in accordance with the present invention.

The U2 ASIC device is concerned with calculation, command, and control. It is primarily digital in operation, and may be considered to be a specialized microprocessor with substantial analog as well as digital I/0 capabilities. The diagram of the U2 ASIC device shows the detailed interconnection of the various functional blocks.

5.1 U2 ASIC Device Architecture

5.1.1 Microprocessor

The central microprocessor Y31 of the U2 ASIC device is a NCR 65CX02 macrocell. It employs an 8-bit datapath structure controlled by an internal programmable logic array (PLA) using 8-bit instructions and having a 16-bit addressing capability. Importantly, all circuitry internal to the microprocessor is completely static and complementary so that the clock signal may be frozen and only leakage current will be consumed. It has a clock speed of 455 KHz and a 2.2 microsecond cycle time.

The microprocessor Y31 executes the instruction repertoire of commercially available micorprocessor type 6502. The mnemonic codes for the instructions of this repertoire, such mnemonic codes as appear with the firmware program listing attached as Appendix A to this specification, are commonly recognized mnemonics, and a complete description of the microprocessor type 6502 instruction repertoire, are contained, among numerous other places, in the book "6502 Assembly Language Programming" by Lance A. Leventhal, published in 1979 by Osborne/McGraw Hill, 630 Bancroft Way, Berkeley, Calif. 94710. It will be recognized that, consonant with the modest computational requirements of an irrigation controller, the relatively simple 6502 microprocessor macrocell is not the sole type that could be employed, and that many microprocessors including types commonly incorporated in ASICs are suitable for use within the irrigation controller in accordance with the present invention.

Figure 3H:
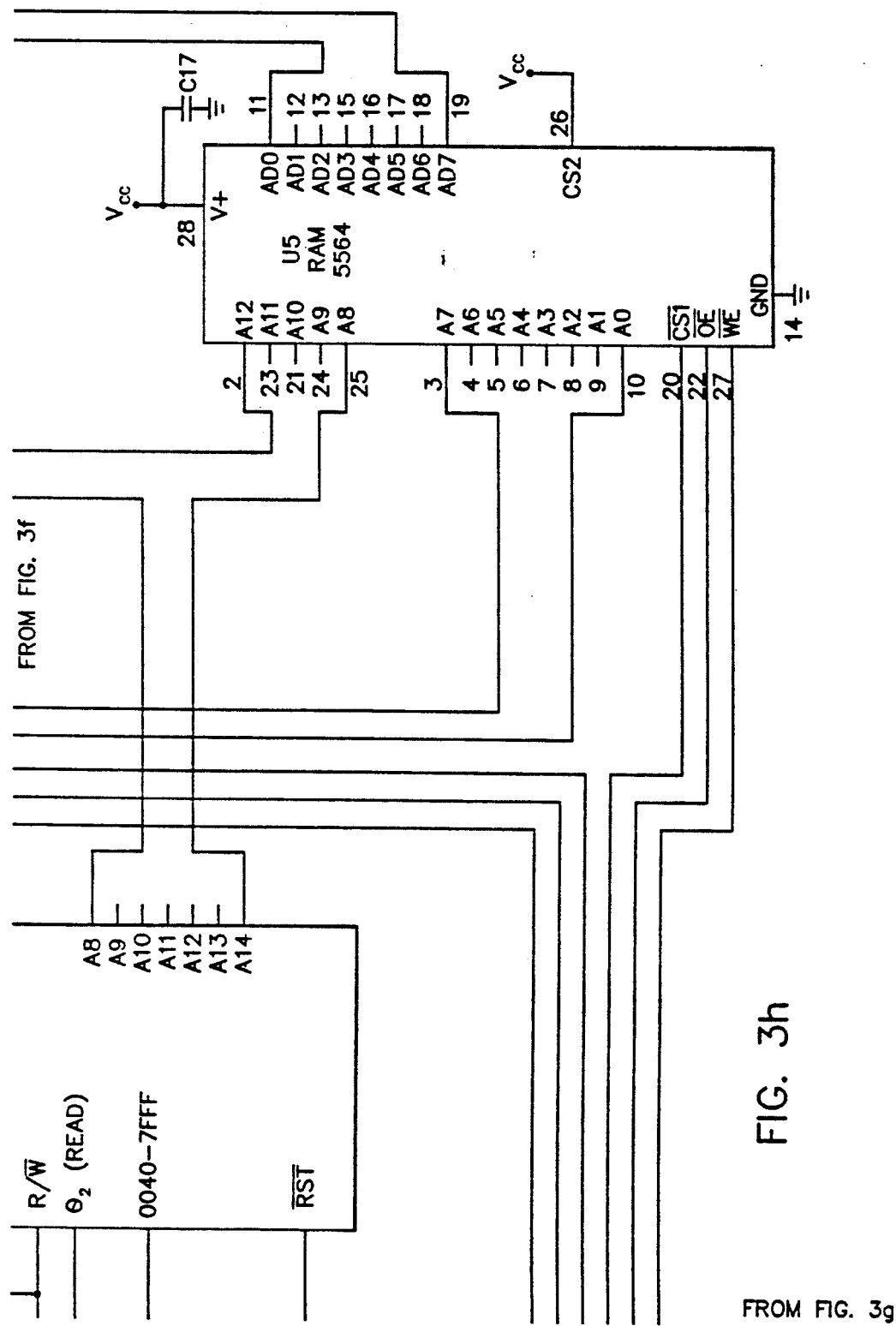

The firmware instructions executed by micorprocessor Y31 occupy memory addresses in accordance with the following memory map table:

| | |
|---|---|
| 00-3F | I/O Parts |
| 40-7FFF | RAM Memory U5 (shown in FIG. 3h) |
| 8000-FFFF | ROM Memory U4 (shown in FIG. 3f) |

The operand fields of the firmware instructions are interpretable in accordance with the following memory map table:

| | | |
|---|---|---|
| 00 | O | Microprocessor power off |
| 01 | O | RTC counter clear |
| 02 | O | A/D power, 1=on, 0=off |
| 03 | O | A/D interface, 1=enable, 0=disable |
| 04 | O | LCD power, 1=on, 0=off |
| 05 | O | LCD interface, 1=enable, 0=disable |
| 06 | O | Valve select byte bits 0-2 - valve #, + side bits 3-5 - valve #, − side bit 6 - polarity, 0=normal, 1=reversed |
| 07 | O | Valve enable, 1=on, 0=off |
| 08 | O | TIMER hi byte latch |
| 09 | O | TIMER lo byte latch |
| 0A | O | TIMER control, 1=on, 0=off |
| 0B | O | RTC, 1=10 seconds, 0=1 minute |
| 0C | O | Serial clock |
| 0D | O | TIMER load |
| 0E | O | Write serial data out |
| 0F | O | Serial output ready |
| 10 | I | RTC counter hi byte |
| 11 | I | RTC counter lo byte |
| 12 | I | Status register 1 bit 0 - 0=external battery present bit 1 - 1=watchdog timeout bit 2 - 0=system power low bit 3 - 0=system power very low |

-continued

| | | |
|---|---|---|
| | | bit 4 - 0=RTC pulse |
| | | bit 5 - 1=battery low or caps charging |
| | | bit 6 - 1=serial data link present |
| | | bit 7 - 0=serial data link ready |
| 13 | I | Status register 2 |
| | | bit 0 - Switch 1, 1=pressed STOP |
| | | bit 1 - Switch 2 |
| | | bit 2 - Switch 3 |
| | | bit 3 - Switch 4 HELP |
| | | bit 4 - Switch 5 NO |
| | | bit 5 - Switch 6 OK |
| | | bit 6 - |
| | | bit 7 - 0=A/D end of conversion |
| 14 | I | Read serial data in |
| 15 | I | Read A/D converter |
| 16 | I | Load serial shift register |
| 17 | I | Clear input ready latch |
| 18 (RS=0) | I | LCD busy flag & address counter |
| | | bit 7 - 1=busy |
| | O | LCD instruction register (RS=0) |
| 19 | I | LCD read data (RS=1) |
| | O | LCD write data (RS=1) |
| 1A | O | LCD contrast select (0-7) |
| 1B | O | Clear watchdog timer |
| 1C | O | Clock RTC counter |
| 1D | I/O | EEPROM |
| 1E | O | Coil test drivers |
| 1F | O | Sensor test drivers |
| 20 | O | Start A/D channel 0, sensor 1 |
| 21 | O | Start A/D channel 1, sensor 2 |
| 22 | O | Start A/D channel 2, sensor 3 |
| 23 | O | Start A/D channel 3, sensor 4 |
| 24 | O | Start A/D channel 4, sensor 5 |
| 25 | O | Start A/D channel 5, sensor 6 |
| 26 | O | Start A/D channel 6, sensor 7 |
| 27 | O | Start A/D channel 7, sensor 8 |
| 28 | O | Start A/D channel 8, valve 1 |
| 29 | O | Start A/D channel 9, valve 2 |
| 2A | O | Start A/D channel 10, valve 3 |
| 2B | O | Start A/D channel 11, valve 4 |
| 2C | O | Start A/D channel 12, valve 5 |
| 2D | O | Start A/D channel 13, valve 6 |
| 2E | O | Start A/D channel 14, valve 7 |
| 2F | O | Start A/D channel 15, valve 8 |
| 30-3F | | |
| 40-FF | | Zero page variables, pointers, and tables |
| 100-1FF | | Stack |
| 200-3FF | | Program variables |
| 8000 | | ROM start |
| FFFA-FFFB | | NMI vector |
| FFFC-FFFD | | RESET vector |
| FFFE-FFFF | | IRQ vector |

5.1.2 Drivers

The coil drivers Y20 work in pairs to supply relatively large bidirectional current pulses to operate electromagnetically actuated valves. Only one pair of coil drivers is active at a time, as specified by the contents of the data bus. Additionally, the output (coil) drivers have the capability to sink a regulated current for testing and programming purposes.

5.1.3 Timer

The timer Y26 consists of two 8-bit latches on the data bus and a 16-bit down counter which is clocked at 2 kHz. Loading of the counter and latches is under the control of the processor. When the counter reaches zero, a processor interrupt is generated.

5.1.4 ADC

The Analog-to-digital converter Y43 receives signals from external sensors and from the valves, a total of 16 channels in all, which are converted to digital information and placed on the data bus. The selection of the channel to be digitized is made on the basis of the contents of the address bus. The converted data is expressed as an eight-bit fraction. For the eight channels originating at the sensors and for the eight channels originating at the coils, this fraction is the ratio of the input voltage to the full power supply. All 16 ADC inputs may be pulled to ground through a poly resistor and an n-channel switch which together constitute a nominal 330 ohm resistance. The resistors associated with the eight channels originating at the sensors are enabled individually (as determined by the contents of the data bus) upon command of the processor. The performance specifications of the Analog-to-digital (A/D) Converter are as follows:

| | | |
|---|---|---|
| a. | Resolution/Accuracy | 8 bits ± one-half LSB for VIN = 1 (Vd) |
| | | 8 bits ± one LSB for VIN = ½ (Vd) |
| b. | Conversion Time | $\frac{8}{f_{osc}} \times n$ where n = 8 or 9 depending upon whether the conversion is full scale or half scale. |
| c. | Operating Current | 3 mA maximum |
| d. | Analog Reference | Digital Supply Voltage (Vd) |
| e. | Analog Inputs (Vin) | Each input voltage is ratiometric with the digital supply voltage (Vd) where: |
| | Vin for full scale = | ½ (Vd) for A/D channels 1 through 8 |
| | Vin for full scale = | 1 (Vd) for A/D channels 9 through 16 |

5.1.5 Clock/Calendar

This clock/calendar Y22 provides several timing functions. It generates a 2 second timing tick at 10 second or 1 minute intervals.

It keeps watch on the status of the programmer battery by generating a "Battery Low" status bit if either of two "Supercap Shunt" signals are absent for more than 64 second during programming activity.

It counts up to 65535 ticks while the processor is in a low voltage shutdown mode so as to provide calendar memory. The calendar contents may be placed on the data bus.

It maintains a 128 second dead-man timer which can generate a hardware reset if the processor fails.

5.1.6 Switch Register

The switch register Y2 acts as an interface between six external configuration switches and the data bus. An additional input is the end-of-conversion signal from the analog-to-digital converter.

5.1.7 Status Register

The status register Y3 makes the following internal flags available to the processor as data on the data bus: Battery Present, Dead-man timeout, System Low, System Very Low, Real Time Clock Tick, Battery Low, Serial Data Link Present, and External Ready.

5.1.8 Serial Data Link

The serial data link Y1 provides high speed two-way communication between the device and a remote data transceiver. Data is loaded or retrieved via the data bus under control of the processor. Transmission of serial data is also directly controlled by the processor.

5.1.9 Ready

These circuits Y23 provide handshaking between the processor and an external device (such as a serial data link) through the status register and data bus.

5.1.10 Wakeup

The wakeup circuit Y27, upon stimulation by either the Serial Data Link Present or the clock/calendar time-tic or the Battery Present signals, starts the main system oscillator and then after a 500 microsecond delay, removes the system reset. Upon stimulation by the System Very Low signal or by the processor, the wakeup circuit immediately causes the system to be reset. The dead-man timeout signal will cause a 30 microsecond reset pulse to occur at two second intervals until the processor resets it.

5.1.11 Main Oscillator

The main oscillator Y25 uses an external capacitor and a charge-discharge scheme to produce a high-speed clock for the processor. This oscillator can be shut down to conserve power. It will restart immediately upon command. The frequency of oscillations is determined by the size of the external capacitor. The relationship between capacitor size and frequency, as well as the frequency stability over changes in operating environment, may be tailored in consideration of the operational environment within which the irrigation controller is used.

5.1.12 LCD Interface

The LCD interface Y29 consists of a latch on the data bus and the control circuitry needed to operate an external liquid crystal display and the DAC. The LCD interface can be configured to function as the 6502 Data I/O port. The interface is configured in this way only during a special test mode. Under processor control, a flip flop is set which alters the internal logic paths so that the LCD bus will be configured as a 6502 Data I/O port. This special test feature allows the 6502 to be tested independently of the peripheral logic.

5.1.13 DAC

The four bit digital-to-analog converter Y32 provides a voltage, as specified by the contents of the data bus, through the LCD interface for contrast control of the external liquid crystal display.

The performance specification of the DAC are as follows:

| | | |
|---|---|---|
| a. | Resolution: | 4 bits |
| b. | Accuracy: | $\pm \frac{1}{2}$ LSB for all voltage steps |
| c. | Vout = | n(0.147) where $0 \leq n \leq 15$ |
| d. | Io (min) = | 500 uA sink for Vout = 0V $\pm$ 50 mV |
| e. | Vo (max) = | $\pm$ 50 mV for Io = 500 uA for the DAC setting D3 = D2 = D1 = D0 = 0 |

5.1.14 Address Decoding

The address decoder circuit Y38 uniquely maps all internal functions into page zero of the processor's memory space. The decoder produces timing and control signals for these internal circuits as well as for reading and writing of external memory.

1.15 Power Switching

The power switch circuit Y28 controls the power for the external ROM and display as well as the internal analog functions in order to conserve power and to permit the irrigation controller to enter a "sleep" mode.

5.1.16 Resistor Control

The resistor control circuit U42 permits reconfiguration of the sensor and coil interfaces to enable communication upon each of the A/D channel lines so that integrity of both valve coils and moisture elements may be self-tested. This is accomplished by selectively switching a low value resistor between the channel signal line and ground.

5.2 U2 ASIC Input/Output Description

5.2.1 CD0 - CD15 - Coil Driver Outputs

These pins operate in pairs, one pair at a time, when driving the coils of the electromagnetically actuated valves. One pin of the pair goes high while the other goes low in order to provide bidirectional current. Inactive coil driver pairs assume a high impedance state. When the coil is deenergized the driver circuitry must absorb the energy of the collapsing field. CD8-CD15 also function as analog inputs to the ADC. These pins have the additional capability of sinking a regulated current for testing and programming purposes.

5.2.2 ADC0 - ADC15 Analog Inputs to the ADC

These pins provide information from the coils and sensors whose integrity the processor must evaluate. ADC8-ADC15 are shared with the 8 valve lines CD8-CD15. ADC0-ADC7 are shared with the 8 sensor lines. All these 166 lines have the capability of sinking a regulated current for testing purposes.

5.2.3 SL - System Low

An active low input indicates that the condition of the power supply is such that further operation will soon be impossible. The processor, upon receiving this signal, will immediately turn off all valves in anticipation of approaching shutdown.

5.2.4 SVL - System Very Low

An active low signal indicates that the condition of the power supply is such that further operation is impossible. Upon receiving this signal the processor will immediately go into hibernation. After approximately 100 milliseconds, a hardware system reset will occur independently of the processor.

5.2.5 SH0, SH1 - Supercap Shunt Signals

If either of these signals persists in the high state for longer than 64 seconds, a Battery Low status will be generated.

5.2.6 BPR - Battery Present

An active low signal indicates that a battery is connected to the power supply so that the processor may run continuously.

5.2.7 S1 - S6 - Switch Inputs

Active high inputs with internal pulldowns go directly to the switch register.

5.2.8 A0 - A14 - Address Outputs

The external RAM and ROM are addressed by these pins. A0 - A7 in conjunction with ALE also functions as D0 - D7.

5.2.9 D0 - D7 - Bidirectional Data Bus

The external RAM and ROM use these lines for transferring data to and from the device. The lower address bits are multiplexed with the data on these lines in conjunction with the ALE signal.

5.2.10 ALE - Address Latch Enable

When this signal is high, data transfers may take on the D0-D7 pins. When this signal is low, these same pins are used as A0-A7 outputs.

5.2.11 RDYIN - Ready Input

This signal appears as one of the bits of the status register. RDYIN provides handshaking protocol from a distant serial data link. A low-to-high transition of this signal sets the Serial Data Link Present status bit low. The signal is provided with an internal pulldown.

5.2.12 RDYOUT—Ready Output

This signal passes the contents of data bus bit zero out of the device under control of the processor to provide handshaking protocol to a distant serial data link.

5.2.13 CEROM - ROM Chip Enable

This signal is used to enable the outputs of the external ROM onto the D0-D7 pins.

5.2.14 LCD0—LCD7—Liquid Crustal Data

These bidirectional signals transfer data to and from the external liquid crystal display. They are provided with internal pulldowns.

5.2.15 LCDEN—LCD Enable

This output signal enables the external liquid crystal display. This output signal can be made to exhibit high impedance with an internal pulldown.

5.2.16 LCDRS - LCD Register Select

This output signal informs the external LCD module that either data or command appears on the data inputs. This output signal can be made high impedance with an internal pulldown.

5.2.17 LCDRD - LCD Read

This output signal controls the direction of data flow to or from the external liquid crystal display. This output signal can be made to exhibit high impedance with an internal pulldown.

5.2.18 VLCD - Analog Output From the DAC to the External Liquid Crystal Display This analog output signal is used to control the display contrast.

5.2.19 VL - Switched Power to the External Liquid Crystal Display

When this signal is switched on it provides current from the device power input VDD. When it is switched off, it sinks current into the device power return VSS.

5.2.20 VA - Switched Power to the External Sensors

When this signal is switched on, it provides current from the device power input VDD. When it is switched off, it sinks current into the device power return VSS.

5.2.21 VP - Switched Power to the External ROM

When this signal is switched on, it provides the device power input VDD. When it is switched off, it sinks current into the device power return VSS.

5.2.22 Serial Clock - Clock Input/Output for Serial Data Transfer

When driven by the device for outward data transmission, this signal alternatively assumes a low impedance high state and a low impedance low state. If the low state persists for more than 20 to 40 nanoseconds then the signal remains at a high impedance with an internal pulldown. In this last state, the pin may be driven by an external source for inward data transfer (reception). The clocks generated by this pin may have a rate of up to 32,000 Hertz. This pin may be loaded with up to 300 picofarads capacitance.

5.2.23 Serial Data - Data Input/Output for Serial Data Transfer

When driven by the device for outward data transmission, this signal assumes a low impedance state whenever the Serial Clock is high, and then, if the clock low state persists for more than 20 to 40 nanoseconds, a high impedance with an internal pulldown. In this last state, the pin may be driven by an external source for inward data transfer (reception). The data generated by this pin may have a rate of up to 32,000 bits per second. This pin may be loaded with up to 300 picofarads.

5.2.24 C01, C02 - Capacitor Connections

Provides a connection for a capacitor whose value determines the frequency of the Main Oscillator.

5.2.25 READ (WRITENOT) - R/W Signal From the Processor

Indicates whether a memory read or memory write cycle is in progress.

5.2.26 PH12 - Processor Clock

This signal is high during the active portion of the processor's operation. When low, the processor is precharging its internal busses. This signal must logically combine with Read and the appropriate address decode to create the control signals to apply to external memory.

5.2.27 CSE2 - EEPROM Chip Select

This signal is used in conjunction with READ and PH12 for external EEPROM operations.

5.2.28 RSTB - Processor Reset

This active-low signal indicates that the processor is shut down and may be used to initialize external circuitry to the correct state for processor startup.

5.2.29 PAGE0 - Page Zero

This pin goes high when the address bus is in address area 0040H through 7FFFH inclusive.

5.2.30 VDD - Device positive supply.

5.2.31 VSS - Device negative supply.

5.2.32 CK - Real-Time Clock Input for Clock Calendar Timer

The frequency is nominally 2 Khz with a 30 u second high-going pulse.

5.2.33 SPSEL

When SPSEL=1, the chip requires a 32 Khz time base on the CK input. When SPSEL=0, the chip requires a 2Khz time base on the CK input.

5.3 ASIC U2 Power Supply Requirements

| Parameter | Symbol | Min | Max | Units |
|---|---|---|---|---|
| Power supply All circuitry active | VDD A | 4.5 | 5.5 | V |
| Power Supply Real time clock, interrupt, and battery low detection circuitry operative. All other circuits are at a static, defined logic level (therefore, not being clocked). | VDD B | 2.00 | 5.5 | V |
| Active Supply Current VDD = 5.5v, 2Khz Real time clock running, main oscillator running, processor, ADC, LCD interface logic running (only), DAC running, coil drivers in high-impedance state, external interface circuitry to EEPROM, ROM and RAM is active, however, the active current of the EEPROM, ROM and RAM is not included. | Ia | | 6.0 | mA |
| Quiescent Supply Current VDD = 5.5v, Real time clock running, main oscillator stopped, processor stopped, coil drivers in high-impedance state, ADC, LCD, DAC are all powered off. External EEPROM and ROM are powered off. External RAM is at a static, defined logic level (therefore, not being clocked). The quiescent current of the RAM is not included in Iq. | Iq | | 1.5 | uA |

5.4 ASIC U2 Signal Pin Requirements

Unless otherwise stated, the following characteristics apply over the applicable operating power supply range as specified above. All pins are protected against electrostatic discharge.

| Parameter | Symbol | Min | Max | Unit |
|---|---|---|---|---|
| Capacitance of Inputs | Ci | | 10 | pF |
| Capacitance of Outputs | Co | | 10 | pF |
| Capacitance of Tristate | Ct | | 10 | pF |
| Input Leakage Current | Iil | −1 | +1 | uA |
| Tristate Leakage Current | Itl | −1 | +1 | uA |
| Passive Pulldown Current (@ Vih = VDD)z | Ipd | −1 | −30 | uA |
| Active Pulldown Current (@ Vi = 2.5v) VA, VL, VP | Irpd | −4 | −12 | mA |
| Output High Voltage | Voh | VDD−0.3 | VDD+0.3 | V |
| Output Low Voltage | Vol | −0.3 | +0.4 | V |
| Output High Current (@ Voh = VDD−0.3V) | Ioh | −6.0 | | mA |
| Output Low Current VLCD | Iol | 6.0 | | mA |
| Output Voltage Range | Volcd | 0.0 | 2.2 | V |
| Output Current | Ioled | +0.5 | | mA |
| (@ Vol = 0.05V) Coil Driver Pins | | | | |
| Input Voltage Range | | See ADC8 − ADC15 below | | |
| Output Pair Drop (@ I = 45mA, Vdd = 4.5v) ADC0 - ADC15 | Vdr | 0.0 | 1.0 | V |
| Input resistance | Rin | 10Meg | | Ohm |
| Input Voltage Range C01, C02 | Vina | −0.0 | VDD | V |
| Output High Voltage | Voh | 0.5 | VDD+0.3 | V |
| Output Low Voltage | Vol | −0.3 | 0.4 | V |
| Output High Current (@ Voh = 2.5V) | Ioh | −4.0 | −12.0 | mA |
| Output Low Current (@ Vol = 0.4V) All Other Pins | Iol | 4.0 | | mA |
| Input High Voltage | Vih | 2.0 | VDD+0.3 | V |
| Input Low Voltage | Vil | −0.3 | 0.8 | V |
| Output High Voltage | Voh | VDD−0.5 | VDD+0.3 | V |
| Output Low Voltage | Vol | −0.3 | +0.4 | V |
| Output High Current (@ Voh = VDD−0.5V) | Ioh | −2.0 | | mA |
| Output Low Current (@ Vol = 4.0V) | Iol | 4.0 | | mA |

5.5 ASIC U2 Mechanical Characteristics

5.5.1 Package Requirements.

The device is packaged in an 84-pin plastic leaded chip carrier. The package life exceeds 20 years.

5.5.2 Environmental Requirements.

The limits below represent the environmental limits to which the device will ordinarily be subjected.

| Rating | Value | Unit |
|---|---|---|
| Storage Temperature | −40 to +85 | deg C. |
| Operating Temperature | −10 to +70 | deg C. |
| Lead Temperature (4 min soldering) | 250 | deg C. |
| Humidity | 85/85 | deg C./percents |

5.6 Preferred Technology for Implementation of the U2 ASIC

Figure 2:
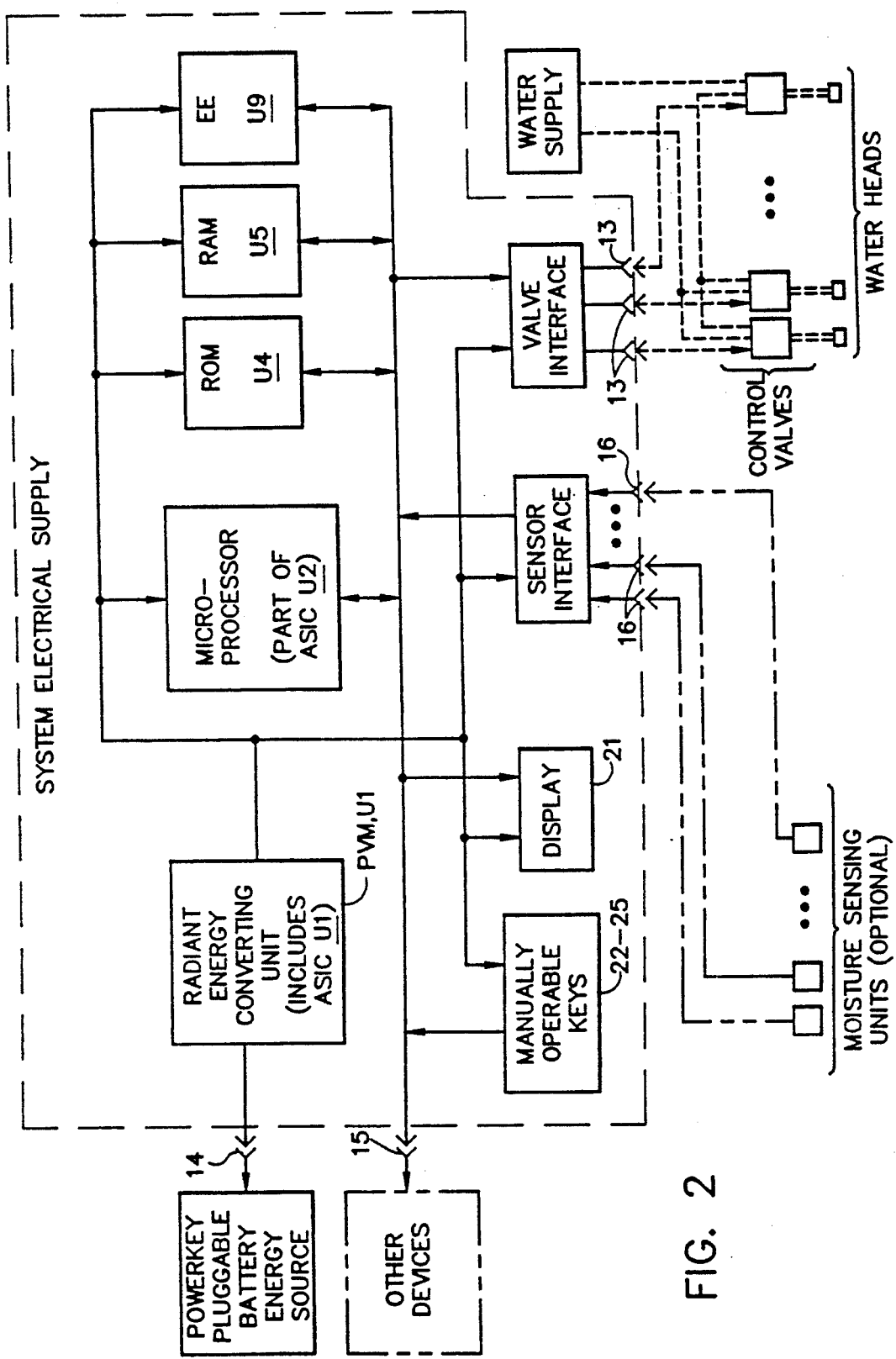
FIG. 2 is a block diagram of an irrigation system employing the irrigation controller, previously seen in FIG. 1, that employs the man-machine interface in accordance with the present invention.

The preferred embodiment of ASIC U2 is preferably implemented in the CMOS technology of NCR Corporation, Dayton, Ohio. This technology, and the design rules and standard cells therein, is discussed in the "NCR ASIC Data Book" for January 1987. The equivalent technologies of other manufacturers will be realized to be equally suitable. It will be understood that the irrigation system of FIG. 2 could be also be implemented using standard integrated circuit and microprocessor components in combination with a control program corresponding to that of attachment A. Such a system could be used alternately to implement the present method.

6.0 Variations and Adaptations of the Invention

Although the present invention has been taught in the context of electrical circuits that are fairly sophisticated for employing both a predominantly digital ASIC (ASIC U2), it should be understood that the functionality of the preferred embodiment of an interface in accordance with the present invention is readily realizable by diverse alternative designs. In particular, the core microprocessor of the preferred embodiment of the invention is 100% compatible with industry standard type 6502. All firmware appended to this specification will execute on a 6502 microprocessor, and is readily convertible to alternative microinstruction repertoires executing on alternative microprocessors. The circuits by which data is manually input to the microprocessor and displayed are, in the preferred embodiment of the invention, powered and sequenced to states of activity in a highly unique manner. Nonetheless, it will be recognized that alternative implementations of these circuits, particularly as consume higher power and/or operate at higher or continuous duty cycles, are readily realizable by a practitioner of the electrical design arts. Accordingly, the present invention should be considered in terms of the functions that it performs, and not solely in terms of any particular hardware embodiment for realizing these functions.

In accordance with these and other aspects and attributes of the present invention, the invention should be determined by the scope of the following claims, only, and not solely in accordance with those particular embodiments within which the invention has been taught.

APPENDIX A

```
1               TITLE    'Solatrol Kernal Software'
2
3            ;  by Dennis A. Kaiser & John S. Houston
4            ;  SOLATROL, Inc.
5            ;  San Diego, CA,  3 Jan 89
6
7            ;  Code for the 65C02 processor
8            ;  Clock speed 455 KHz, cycle time 2.2 microseconds
9
10
11  0000              CHIP       65C02
12                    MACLIST    OFF
13                    ASCLIST    OFF
14  0000              INCLUDE    KEQUATES.ASM
15           ;--------------------------------
16           ;  MEMORY MAP
17           ;--------------------------------
18
19           ;00-3F       I/O
20           ;40-7FFF     RAM
21           ;8000-FFFF   ROM
22
23           ;00         0  Microprocessor power off
24           ;01         0  RTC counter clear
25           ;02         0  A/D power, 1=on, 0=off
26           ;03         0  A/D interface, 1=enable, 0=disable
27           ;04         0  LCD power, 1=on, 0=off
28           ;05         0  LCD interface, 1=enable, 0=disable
29           ;06         0  Valve select byte
30           ;                   bits 0-2 - valve #, + side
31           ;                   bits 3-5 - valve #, - side
32           ;                   bit 6 - polarity, 0=normal, 1=reversed
33           ;07         0  Valve enable, 1=on, 0=off
34           ;08         0  TIMER hi byte latch
35           ;09         0  TIMER lo byte latch
36           ;0A         0  TIMER control, 1=on, 0=off
37           ;0B         0  RTC, 1=10 seconds, 0=1 minute
38           ;0C         0  Serial clock
39           ;0D         0  TIMER load
40           ;0E         0  Write serial data out
```

```
41              ;0F          O  Serial output ready
42              ;10          I  RTC counter hi byte
43              ;11          I  RTC counter lo byte
44              ;12          I  Status register 1
45              ;                   bit 0 - 0=external battery present
46              ;                   bit 1 - 1=watchdog timeout
47              ;                   bit 2 - 0=system power low
48              ;                   bit 3 - 0=system power very low
49              ;                   bit 4 - 0=RTC pulse
50              ;                   bit 5 - 1=battery low or caps charging
51              ;                   bit 6 - 1=serial data link present
52              ;                   bit 7 - 0=serial data link ready
53              ;13          I  Status register 2
54              ;                   bit 0 - Switch 1, 1=pressed STOP
55              ;                   bit 1 - Switch 2
56              ;                   bit 2 - Switch 3
57              ;                   bit 3 - Switch 4 HELP
58              ;                   bit 4 - Switch 5 NO
59              ;                   bit 5 - Switch 6 OK
60              ;                   bit 6 -
61              ;                   bit 7 - 0=A/D end of conversion
62              ;14          I  Read serial data in
63              ;15          I  Read A/D converter
64              ;16          I  Load serial shift register
65              ;17          I  Clear input ready latch
66              ;18          I  LCD busy flag & address counter (RS=0)
67              ;                   bit 7 - 1=busy
68              ;             O  LCD instruction register (RS=0)
69              ;19          I  LCD read data (RS=1)
70              ;             O  LCD write data (RS=1)
71              ;1A          O  LCD contrast select (0-7)
72              ;1B          O  Clear watchdog timer
73              ;1C          O  Clock RTC counter
74              ;1D          IO EEPROM
75              ;1E          O  Coil test drivers
76              ;1F          O  Sensor test drivers
77              ;20          O  Start A/D channel 0, sensor 1
78              ;21          O  Start A/D channel 1, sensor 2
79              ;22          O  Start A/D channel 2, sensor 3
80              ;23          O  Start A/D channel 3, sensor 4
81              ;24          O  Start A/D channel 4, sensor 5
82              ;25          O  Start A/D channel 5, sensor 6
83              ;26          O  Start A/D channel 6, sensor 7
84              ;27          O  Start A/D channel 7, sensor 8
85              ;28          O  Start A/D channel 8, valve 1
86              ;29          O  Start A/D channel 9, valve 2
87              ;2A          O  Start A/D channel 10, valve 3
88              ;2B          O  Start A/D channel 11, valve 4
89              ;2C          O  Start A/D channel 12, valve 5
90              ;2D          O  Start A/D channel 13, valve 6
91              ;2E          O  Start A/D channel 14, valve 7
92              ;2F          O  Start A/D channel 15, valve 8
93              ;30-3F          Unused memory mapped area
94
95
96              ;----------------------------------
97              ;     VARIABLES, ZERO PAGE
98              ;----------------------------------
99
```

```
100                     ;RAM LOCATIONS
101    0000                               PAGE0
102    00C0                               ORG     $C0         ;kernel named variables
103    00C0             retadr            ds      2           ;temp storage of stack return addr
104    00C2             e2wr              ds      1           ;byte to send to EEPROM
105    00C3             e2mask            ds      1           ;byte to EEPROM interface
106    00C4             e2addr            ds      1           ;address in EEPROM (0-3FH)
107    00C5             e2ptr             ds      2           ;pointer
108    00C7             multiplier        ds      1           ;math variables
109    00C8             multiplicand      ds      1
110    00C9             dividend          ds      2
111    00CB             divisor           ds      2
112    00CD             blink_ctr         ds      1           ;counter for blinking chars
113    00CE             on_off            ds      1           ;state of blinking chars
114
115    00F0                               ORG     $F0         ;kernel scratch pad area
116    00F0             scratch_pad       ds      $10         ;temp use by subroutines
117
118
119                     ;----------------------------------
120                     ;     VARIABLES, NON ZERO-PAGE
121                     ;----------------------------------
122
123    0000                               DATA
124    0300                               ORG     $300
125
126    0300             ckdata            ds      16          ;checksum data
127    0310             act_key_reg       ds      1           ;active key register
128    0311             act_key_state     ds      1           ;active key state
129    0312             act_key_dcount    ds      1           ;active key duration count
130    0313             act_key_repeat    ds      1           ;active key repeat mode
131    0314             old_keystate      ds      4           ;reserve old keystate table
132    0318             keystate          ds      4           ;reserve keystate table
133    031C             pending           ds      4           ;reserve pending table
134    0320             repeat            ds      4           ;reserve repeat table
135    0324             repeat_rate       ds      1           ;repeat rate
136
137
138    0400                               ORG     $0400       ;kernel scratch area
139    0400             scratch_ram       ds      256
140
141
142
143
144
145
146
147    0500                     INCLUDE           GLOBALS.ASM
148                     ;global equates
149                     ;---------------
150           0000      FALSE             equ     $00
151           000F      TRUE              equ     $0F
152
153
154    0500                               DATA
155    0200                               ORG     $0200       ;global ram variables
156
157                     ;----------------------------------
```

```
158                                                    ;these are global variables
159  0200           cksum       ds    1                ;result of ram checksum
160  0201           hour        ds    1                ;real time clock
161  0202           minute      ds    1
162  0203           dow         ds    1
163  0204           month       ds    1
164  0205           day         ds    1
165  0206           year        ds    1
166  0207           dim         ds    1                ;number of days in the month
167  0208           ad          ds    16               ;16 bytes of AD readings
168  0218           char_index  ds    1                ;screen location
169  0219           video       ds    32               ;video ram, characters
170  0239           attribute   ds    32               ;video ram, attributes
171  0259           cursor      ds    2                ;cursor position & attributes
172  025B           IBFR        ds    10               ;input buffer
173                                                    ;use to pass params between modules
174                                                    ;where stack passing doesn't exist
175
176  0265           hbfr        ds    8                ;history buffer for storage/retrieval
177
178                ;----------------------------------
179
180
181
182
183  026D                       INCLUDE    KMACROS.ASM
184                ;----------------------------------
185                ;          MACROS
186                ;----------------------------------
187
188
189                set:   macro    a0                  ;store a 1 to memory
190                       lda      #1
191                       sta      a0
192                       endm
193
194                blt:   macro    a0                  ;branch if A<M
195                       bcc      a0
196                       endm
197
198                bge:   macro    A0                  ;branch if A>=M
199                       bcs      A0
200                       endm
201
202                inc16: macro    a0                  ;increment a 16 bit number
203                       clc
204                       lda      a0
205                       adc      #1
206                       sta      a0
207                       lda      a0+1
208                       adc      #0
209                       sta      a0+1
210                       endm
211
212                ldw:   macro    a0,a1               ;load 16 bit pointer
213                       lda      #<a1
214                       sta      a0
215                       lda      #>a1
```

```
216                          sta     a0+1
217                          endm
218
219     pushptr:  macro a0                   ;push pointer on stack
220                          lda     #>a0
221                          pha
222                          lda     #<a0
223                          pha
224                          endm
225
226     save_retadr:  macro                  ;save return address
227                          pla
228                          sta     retadr
229                          pla
230                          sta     retadr+1
231                          endm
232
233     get_retadr:  macro                   ;restore return address
234                          lda     retadr+1
235                          pha
236                          lda     retadr
237                          pha
238                          endm
239
240
241
242
243                          GLOBALS ON
244  0000                     CODE
245  F000                     ORG     $F000
246
247  F000                     INCLUDE R1.ASM
248                 ;----------------------------------
249                 ;       RESOURCE #1
250                 ;       DISPLAY MANAGER
251                 ;----------------------------------
252
253  0004           LCD_POWER     equ    4      ;LCD power
254  0005           LCD_ENABLE    equ    5      ;LCD enable
255  0018           LCD_STATUS    equ    $18    ;LCD register 0
256  0018           LCD_CMD       equ    $18
257  0019           LCD_DATA      equ    $19    ;LCD register 1
258  001A           LCD_CONTRAST  equ    $1A    ;LCD contrast
259
260  000E           on_rate       equ    14     ;blink rate for cursor, blinking chars
261  0004           off_rate      equ    4
262  0014           first_rate    equ    20
263
264
265                       COMMENT * The display manager contains those functions
266                       which actually control the LCD. Functions which write
267                       to video RAM are grouped in the FIELD MANAGER resource.  *
268
269
270                 ;      Title:  Display a character
271                 ;
272                 ;      Purpose: Show character on screen
273                 ;      Entry:  char in A
```

```
274                        ;   Exit: char displayed
275                        ;   Regs used: A
276                        ;   RAM used: none
277
278   F000                 R1_dchar:
279   F000  DA                     phx
280   F001  A6 18          ?0:     ldx    LCD_STATUS      ;wait for LCD ready
281   F003  30 FC                  bmi    ?0
282   F005  85 19                  sta    LCD_DATA        ;give LCD the data
283   F007  FA                     plx
284   F008  60                     rts
285
286
287                        ;   Title: Send command to LCD
288                        ;
289                        ;   Purpose: Program the LCD
290                        ;            wait for LCD ready first
291                        ;
292                        ;   Entry: A has index into command table
293                        ;   Exit: none
294                        ;   RAM used: none
295
296   F009                 R1_cmd:
297   F009  A4 18                  ldy    LCD_STATUS
298   F00B  30 FC                  bmi    R1_cmd          ;wait for ready
299   F00D  AA                     tax
300   F00E  BD 5C F1               lda    lcdtbl,x        ;get cmd from table
301   F011  85 18                  sta    LCD_CMD         ;send cmd in A
302   F013  60                     rts
303
304                        ;   Title: Initialize LCD
305                        ;
306                        ;   Purpose: Turn on the LCD and initialize
307                        ;            Program custom characters
308                        ;
309                        ;   Entry: none
310                        ;   Exit: LCD ready to go
311                        ;   RAM used: none
312
313   F014                 R1_display_init:
314   F014                         set    LCD_POWER
318   F018  A9 32                  lda    #50             ;power on, wait
319   F01A  20 24 F5               jsr    R9_wait_ms
320   F01D                         set    LCD_ENABLE      ;enable interface
324
325   F021  A2 09                  ldx    #9              ;function set, don't wait
326   F023  BD 5C F1               lda    lcdtbl,x
327   F026  85 18                  sta    LCD_CMD
328   F028  A9 0A                  lda    #10
329   F02A  20 24 F5               jsr    R9_wait_ms
330   F02D  A2 09                  ldx    #9              ;function set, don't wait
331   F02F  BD 5C F1               lda    lcdtbl,x
332   F032  85 18                  sta    LCD_CMD
333   F034  A9 0A                  lda    #10
334   F036  20 24 F5               jsr    R9_wait_ms
335   F039  A9 05                  lda    #5              ;display on, no cursor
336   F03B  20 09 F0               jsr    R1_cmd
337   F03E  A9 02                  lda    #2              ;entry mode set
338   F040  20 09 F0               jsr    R1_cmd
```

```
339  F043  A9 01              lda      #1                 ;cursor home
340  F045  20 09 F0           jsr      R1_cmd
341
342  F048                     pushptr  cchar6             ;make custom char 6
348  F04E  A9 06              lda      #6
349  F050  20 2E F1           jsr      R1_custom_char
350  F053                     pushptr  cchar7             ;make custom char 7
356  F059  A9 07              lda      #7
357  F05B  20 2E F1           jsr      R1_custom_char
358
359  F05E  20 62 F0           jsr      R1_blink_init      ;init blink counter
360
361  F061  60                 rts
362
363
364
365                        ;  Title: Blink_init
366                        ;
367                        ;  Purpose: Set up blinker so that the next
368                        ;           R1_display_update will cause blinking
369                        ;           chars to be ON for the entire ON time.
370                        ;
371                        ;  Entry: none
372                        ;  Exit: none
373                        ;  RAM used: none
374
375  F062                  R1_blink_init:
376  F062  A9 14              lda      #first_rate
377  F064  85 CD              sta      blink_ctr
378  F066  A9 01              lda      #1
379  F068  85 CE              sta      on_off
380  F06A  60                 rts
381
382
383                        ;  Title: Turn LCD off
384                        ;
385                        ;  Purpose: Remove power to LCD
386                        ;
387                        ;  Entry: none
388                        ;  Exit: none
389                        ;  RAM used: none
390
391  F06B                  R1_display_off:
392  F06B  64 04              stz      LCD_POWER
393  F06D  64 05              stz      LCD_ENABLE
394  F06F  60                 rts
395
396
397                        ;  Title: Turn cursor on
398                        ;
399                        ;  Purpose: Show cursor
400                        ;
401                        ;  Entry: none
402                        ;  Exit: none
403                        ;  RAM used: none
404
405  F070                  R1_cursor_on:
```

```
406   F070    A9 03               lda     #3
407   F072    20 09 F0            jsr     R1_cmd
408   F075    60                  rts
409
410
411                         ;       Title:  Turn cursor off
412                         ;
413                         ;       Purpose: Wipe cursor off screen
414                         ;
415                         ;       Entry: none
416                         ;       Exit: none
417                         ;       RAM used:  none
418
419   F076                R1_cursor_off:
420   F076    A9 05               lda     #5
421   F078    20 09 F0            jsr     R1_cmd
422   F07B    60                  rts
423
424
425
426                         ;       Title:  Set cursor address
427                         ;
428                         ;       Purpose: Move cursor without changing screen
429                         ;
430                         ;       Entry: A has cursor address (0-31)
431                         ;       Exit: cursor moved
432                         ;       RAM used:  none
433
434   F07C                R1_addr:
435   F07C    DA                  phx
436   F07D    A6 18       ?0:     ldx     LCD_STATUS
437   F07F    30 FC               bmi     ?0
438   F081    C9 10               cmp     #16             ;if addr >$0F
439   F083                        blt     ?1
442   F085    29 0F               and     #00001111b      ;then make it $40-$4F
443   F087    09 40               ora     #01000000b
444   F089    09 80       ?1:     ora     #10000000B      ;Set address for data display
445   F08B    85 18               sta     LCD_CMD
446   F08D    FA                  plx
447   F08E    60                  rts
448
449
450                         ;       Title:  Update the display
451                         ;
452                         ;       Purpose: Make display and cursor match
453                         ;                the video RAM
454                         ;
455                         ;       Entry: none
456                         ;       Exit: display refreshed
457                         ;       RAM used: video area, attribute area, cursor,
458                         ;                 on_off, blink_ctr
459
460   F08F                R1_display_update:
461   F08F    A5 CD               lda     blink_ctr
462   F091    D0 37               bne     ?1              ;if zero,
463   F093    E6 CE               inc     on_off          ;then swap on/off
464   F095    A5 CE               lda     on_off          ;and reload
```

| | | | | | | |
|---|---|---|---|---|---|---|
| 465 | F097 | 29 01 | | and | #00000001b | |
| 466 | F099 | F0 04 | | beq | ?off | |
| 467 | F09B | A9 0E | ?on: | lda | #on_rate | |
| 468 | F09D | 80 02 | | bra | ?b | |
| 469 | F09F | A9 04 | ?off: | lda | #off_rate | |
| 470 | F0A1 | 85 CD | ?b: | sta | blink_ctr | |
| 471 | | | | | | |
| 472 | F0A3 | A2 00 | | ldx | #0 | ;for character 0 to 31 |
| 473 | F0A5 | BD 39 02 | ?2: | lda | attribute,x | |
| 474 | F0A8 | 29 40 | | and | #01000000b | ;if blink_enabled, |
| 475 | F0AA | F0 08 | | beq | ?3 | |
| 476 | F0AC | BD 39 02 | | lda | attribute,x | ;then set new bit |
| 477 | F0AF | 09 80 | | ora | #10000000b | |
| 478 | F0B1 | 9D 39 02 | | sta | attribute,x | |
| 479 | F0B4 | E8 | ?3: | inx | | ;next character |
| 480 | F0B5 | E0 20 | | cpx | #32 | |
| 481 | F0B7 | D0 EC | | bne | ?2 | |
| 482 | | | | | | |
| 483 | F0B9 | AD 5A 02 | | lda | cursor+1 | ;if cursor enabled and blinking, |
| 484 | F0BC | 29 60 | | and | #01100000b | |
| 485 | F0BE | C9 60 | | cmp | #01100000b | |
| 486 | F0C0 | D0 08 | | bne | ?1 | |
| 487 | F0C2 | AD 5A 02 | | lda | cursor+1 | ;then set new bit |
| 488 | F0C5 | 09 80 | | ora | #10000000b | |
| 489 | F0C7 | 8D 5A 02 | | sta | cursor+1 | |
| 490 | | | | | | |
| 491 | | | ?1: | | | ;display video ram |
| 492 | F0CA | A2 00 | | ldx | #0 | ;for char 0 to 31 |
| 493 | F0CC | BD 39 02 | ?4: | lda | attribute,x | ;if not new, do nothing |
| 494 | F0CF | 10 28 | | bpl | ?8 | |
| 495 | F0D1 | 29 7F | | and | #01111111b | ;else clear new bit |
| 496 | F0D3 | 9D 39 02 | | sta | attribute,x | |
| 497 | F0D6 | 8A | | txa | | ;set LCD address |
| 498 | F0D7 | 20 7C F0 | | jsr | R1_addr | |
| 499 | F0DA | AD 5A 02 | | lda | cursor+1 | ;tell cursor mgr to put cursor |
| 500 | F0DD | 09 80 | | ora | #10000000b | ;back when through |
| 501 | F0DF | 8D 5A 02 | | sta | cursor+1 | |
| 502 | F0E2 | BD 39 02 | | lda | attribute,x | |
| 503 | F0E5 | 29 40 | | and | #01000000b | ;if blink enabled |
| 504 | F0E7 | F0 0A | | beq | ?6 | |
| 505 | F0E9 | A5 CE | | lda | on_off | ;and off |
| 506 | F0EB | 29 01 | | and | #00000001b | |
| 507 | F0ED | D0 04 | | bne | ?6 | |
| 508 | F0EF | A9 20 | | lda | #' ' | ;then display space |
| 509 | F0F1 | 80 03 | | bra | ?7 | |
| 510 | F0F3 | BD 19 02 | ?6: | lda | video,x | ;else display char |
| 511 | F0F6 | 20 00 F0 | ?7: | jsr | R1_dchar | |
| 512 | F0F9 | E8 | ?8: | inx | | ;next character |
| 513 | F0FA | E0 20 | | cpx | #32 | |
| 514 | F0FC | D0 CE | | bne | ?4 | |
| 515 | | | | | | ;cursor manager |
| 516 | F0FE | AD 5A 02 | ?10: | lda | cursor+1 | ;if cursor is new |
| 517 | F101 | 10 27 | | bpl | ?11 | |
| 518 | F103 | 29 7F | | and | #01111111b | ;then clear new bit |
| 519 | F105 | 8D 5A 02 | | sta | cursor+1 | |
| 520 | | | | | | |
| 521 | F108 | AD 5A 02 | | lda | cursor+1 | ;if disabled then off |

```
522   F10B   29 20              and     #00100000b
523   F10D   F0 1B              beq     ?12
524
525   F10F   AD 5A 02           lda     cursor+1              ;if blinking
526   F112   29 40              and     #01000000b
527   F114   F0 06              beq     ?13
528   F116   A5 CE              lda     on_off                ;and off
529   F118   29 01              and     #00000001b
530   F11A   F0 0B              beq     ?12                   ;then cursor off
531
532   F11C   AD 59 02    ?13:   lda     cursor                ;else cursor on
533   F11F   20 7C F0           jsr     ?1_addr
534   F122   20 70 F0           jsr     R1_cursor_on
535   F125   80 03              bra     ?11
536
537   F127   20 76 F0    ?12:   jsr     R1_cursor_off         ;cursor off
538   F12A   60          ?11:   rts
539
540
541                       ;     Title:  Display IRQ routine
542                       ;
543                       ;     Purpose: Manage counters for display blinking
544                       ;
545                       ;     Entry: blink_ctr
546                       ;     Exit:  blink_ctr decremented
547                       ;     RAM used: none
548
549   F12B               R1_display_irq:
550   F12B   C6 CD              dec     blink_ctr             ;count down
551   F12D   60                 rts
552
553
554
555                       ;     Title: Custom character
556                       ;
557                       ;     Purpose: To program the LCD with a user-defined character
558                       ;
559                       ;     Description:
560                       ;       The LCD command is 01aaabbb, where aaa is the char
561                       ;       number (0-7) and bbb is the row number (0-7).
562                       ;       The CG RAM command is first sent with b=0.
563                       ;       Eight rows of bit data are then sent, and the LCD
564                       ;       increments the row number after each write.
565                       ;
566                       ;     Entry: top of stack
567                       ;       low byte, hi byte of return addr
568                       ;       low byte, hi byte of pointer to char data (8 bytes)
569                       ;       A has char number (0-15)
570                       ;
571                       ;     Exit:  none
572                       ;
573                       ;     Registers used: all
574                       ;
575                       ;     RAM used: retadr, 2 bytes of scratchpad
576
577   F12E               R1_custom_char:
578
```

```
579  F12E  18                    clc                          ;make LCD command for CG RAM
580  F12F  2A                    rol    a                     ;start at row=0
581  F130  2A                    rol    a
582  F131  2A                    rol    a
583  F132  09 40                 ora    #01000000b
584  F134  A6 18          ?1:    ldx    LCD_STATUS            ;wait for LCD ready
585  F136  30 FC                 bmi    ?1
586  F138  85 18                 sta    LCD_CMD               ;then send command
587
588  F13A                        save_retadr
594  F140  68                    pla                          ;get pointer from stack
595  F141  85 F0                 sta    scratch_pad
596  F143  68                    pla
597  F144  85 F1                 sta    scratch_pad+1
598  F146                        get_retadr
604
605  F14C  A0 00                 ldy    #0                    ;get row data from pointer
606  F14E  B1 F0          ?2:    lda    (scratch_pad),y
607  F150  A6 18          ?3:    ldx    LCD_STATUS            ;wait for LCD ready
608  F152  30 FC                 bmi    ?3
609  F154  85 19                 sta    LCD_DATA              ;then send row data
610  F156  C8                    iny
611  F157  C0 08                 cpy    #8
612  F159  D0 F3                 bne    ?2                    ;do 8 bytes
613
614  F15B  60                    rts
615
616
617
618                      ;---------------------------------
619                      ;     RESOURCE #1
620                      ;     DATA
621                      ;---------------------------------
622
623
624  F15C  01            lcdtbl: BYTE    00000001B            ;Clear display
625  F15D  02                    BYTE    00000010B            ;Cursor home
626  F15E  06                    BYTE    00000110B            ;Entry mode, no scrolling
627  F15F  0E                    BYTE    00001110B            ;Display on, show cursor
628  F160  08                    BYTE    00001000B            ;Display off
629  F161  0C                    BYTE    00001100B            ;Display on, no cursor
630  F162  0D                    BYTE    00001101B            ;Display on, blink cursor position
631  F163  14                    BYTE    00010100B            ;Move cursor right
632  F164  18                    BYTE    00011000B            ;Scroll display left
633  F165  38                    BYTE    00111000B            ;Interface data length=8 bits
634
635                      cchar6:                              ;custom char=6 data
636  F166  04 0E 1F 04 04        BYTE    $04,$0E,$1F,$04,$04,$04,$04,0
637                      cchar7:                              ;custom char=7 data
638  F16E  04 04 04 04 1F        BYTE    $04,$04,$04,$04,$1F,$0E,$04,0
639
640
641
642
643  F176                        INCLUDE   R2.ASM
644                      ;---------------------------------
645                      ;     RESOURCE #2
```

```
646                  ;       KEYBOARD MANAGER
647                  ;       written by John Stuart Houston
648                  ;       version 1.0
649                  ;       5 January 1989
650                  ;----------------------------------------
651
652                  ; I/O Addresses
653      0013        status  equ     $13             ;keyboard status address
654
655                  ; Constants
656      0000        UP      equ     $0
657      000F        DOWN    equ     $0F
658
659      0004        MAXKEY      equ     4            ;maximum number of keys
660      0003        LASTKEY     equ     MAXKEY-1     ;maximum key number
661      0012        REPEAT_ONSET equ    18           ;onset to enter repeat mode
662      000A        REPEAT_CYCLE equ    10           ;.5 second interval between repeats
663
664
665  F176            KEYMASK
666  F176  20                db      00100000b       ;key 1  "OK"
667  F177  01                db      00000001b       ;key 2  "HELP"
668  F178  10                db      00010000b       ;key 3  "up arrow"
669  F179  08                db      00001000b       ;key 4  "down arrow"
670                  pag
671                  ;       Title: Key Manager Init
672                  ;
673                  ;       Purpose: Initializes the Key Manager Resource
674                  ;
675                  ;       Entry: nothing
676                  ;       Exit:  nothing
677                  ;       Registers used: X
678                  ;       RAM used: Kernal Private Allocation, 21 non-zero page locations
679                  ;
680  F17A            R2_key_init:
681  F17A  9C 10 03          stz     act_key_reg     ;free active key register
682  F17D  9C 11 03          stz     act_key_state   ;clear active key state
683  F180  9C 12 03          stz     act_key_dcount  ;reset active key duration count
684  F183  9C 13 03          stz     act_key_repeat  ;clear active key repeat mode
685  F186  A2 0A             ldx     #REPEAT_CYCLE   ;set up repeat rate
686  F188  8E 24 03          stx     repeat_rate     ; with default value
687
688  F18B  A2 03             ldx     #LASTKEY        ;get last key number
689
690  F18D            ?next_key:
691  F18D  9E 14 03          stz     old_keystate,x  ;old key state is off
692  F190  9E 18 03          stz     keystate,x      ;key state is off
693  F193  9E 1C 03          stz     pending,x       ;key pending is false
694  F196  9E 20 03          stz     repeat,x        ;key repeat enable is false
695  F199  CA                dex                     ;completed initialization?
696  F19A  10 F1             bpl     ?next_key       ; no, continue to next key...
697
698  F19C  60                rts                     ; yes, exit...
699
700                  pag
```

```
701                     ;       Title:  Key Manager Update
702                     ;
703                     ;       Purpose:. To debounce the keys, check the active key state,
704                     ;                 automatically repeat the active key if enabled
705                     ;
706                     ;       Entry: nothing
707                     ;       Exit:  nothing
708                     ;       Registers used:  A, X
709                     ;       RAM used: Kernal Private Allocation, 21 non-zero page locations
710                     ;
711    F19D             R2_key_update:
712                     ; this pass scans the keys for the current state
713                     ;
714    F19D             pass1:
715    F19D  A2 03              ldx     #LASTKEY        ;get last key number for index
716
717    F19F             ?next1:
718    F19F  A5 13              lda     status          ;read keyboard
719    F1A1  3D 76 F1           and     KEYMASK,x       ;mask for each key
720    F1A4  9D 18 03           sta     keystate,x      ;update key state
721    F1A7  CA                 dex                     ;scan completed?
722    F1A8  10 F5              bpl     ?next1          ; no, continue to next key...
723    F1AA
724    F1AA  A2 03              ldx     #LASTKEY        ;get last key number for index
725    F1AC  A9 00              lda     #00             ;zero accumulator
726    F1AE             ?next2:
727    F1AE  1D 18 03           ora     keystate,x      ;or with this key state
728    F1B1  CA                 dex                     ;scan completed?
729    F1B2  10 FA              bpl     ?next2          ; no, continue to next key...
730    F1B4  C9 00              cmp     #00             ;any key pressed?
731    F1B6  F0 12              beq     pass3           ; no, skip delay and second pass
732
733                     ; this pass waits 5ms, and scans the keys again
734                     ;
735    F1B8             pass2:
736    F1B8  A9 05              lda     #5
737    F1BA  20 24 F5           jsr     R9_wait_ms      ;delay 5ms
738    F1BD  A2 03              ldx     #LASTKEY        ;get last key number for index
739
740    F1BF             ?next1:
741    F1BF  A5 13              lda     status          ;read keyboard
742    F1C1  3D 18 03           and     keystate,x      ;and with previous key state
743    F1C4  9D 18 03           sta     keystate,x      ;update key state
744    F1C7  CA                 dex                     ;scan completed?
745    F1C8  10 F5              bpl     ?next1          ; no, continue to next key...
746
747                     ; pass3
748                     ;
749    F1CA             pass3:
750    F1CA  A2 03              ldx     #LASTKEY        ;get last key number for index
751
752    F1CC             ?next:
753    F1CC  BD 18 03           lda     keystate,x
754    F1CF  DD 14 03           cmp     old_keystate,x  ;are the states the same?
755    F1D2  F0 0D              beq     ?skip           ; yes, skip...
756    F1D4  C9 00              cmp     #$00            ; no, is the key now up?
757    F1D6  F0 04              beq     ?false          ; yes, skip...
```

```
758  F1D8  A9 0F              lda    #TRUE         ;  no, key is now pending...
759  F1DA  80 02              bra    ?true
760  F1DC          ?false:
761  F1DC  A9 00              lda    #FALSE        ;key is not pending...
762  F1DE          ?true:
763  F1DE  9D 1C 03           sta    pending,x
764  F1E1          ?skip:
765  F1E1  BD 18 03           lda    keystate,x    ;current keystate becomes
766  F1E4  9D 14 03           sta    old_keystate,x ; old keystate...
767  F1E7  CA                 dex                  ;scan completed?
768  F1E8  10 E2              bpl    ?next         ;  no, continue to next key...
769  F1EA
770  F1EA          ?alpha:
771  F1EA  AE 10 03           ldx    act_key_reg   ;load active key for index
772
773  F1ED  BD 18 03           lda    keystate,x    ;  yes, active key up?
774  F1F0  C9 00              cmp    #UP
775  F1F2  F0 38              beq    ?beta         ;  yes, skip to beta...
776
777  F1F4  BD 1C 03           lda    pending,x
778  F1F7  C9 0F              cmp    #TRUE         ;active key pending?
779  F1F9  F0 4C              beq    ?gamma        ;  yes, skip to gamma...
780
781  F1FB  BD 20 03           lda    repeat,x      ;
782  F1FE  C9 0F              cmp    #TRUE         ;  not pending, repeat enabled?
783  F200  D0 56              bne    ?exit         ;    no, exit...
784  F202
785  F202  EE 12 03           inc    act_key_dcount ;  yes, increment dcount
786  F205
787  F205  AD 13 03           lda    act_key_repeat ;  yes, in repeat mode yet?
788  F208  C9 00              cmp    #FALSE
789  F20A  F0 0A              beq    ?next1        ;    no, check count
790
791  F20C  AD 12 03           lda    act_key_dcount ;  yes, check cycle count
792  F20F  CD 24 03           cmp    repeat_rate   ;  user defined value
793  F212  D0 44              bne    ?exit         ;  not time to repeat, exit...
794  F214  F0 0C              beq    ?delta        ;  time to repeat, skip to delta
795
796  F216          ?next1:
797  F216  AD 12 03           lda    act_key_dcount ;  yes,
798  F219  C9 12              cmp    #REPEAT_ONSET ;  at repeat onset yet?
799  F21B  D0 3B              bne    ?exit         ;    no, exit...
800
801  F21D  A9 0F              lda    #TRUE         ;  yes,
802  F21F  8D 13 03           sta    act_key_repeat ;   repeat_mode = true
803  F222
804                 ; active key is pending now from auto-repeat
805  F222          ?delta:
806  F222  9C 12 03           stz    act_key_dcount ; zero dcount
807  F225  A9 0F              lda    #TRUE
808  F227  9D 1C 03           sta    pending,x
809  F22A  80 1B              bra    ?gamma        ; and skip to gamma
810
811                 ; active key is up, free active key registers
812  F22C          ?beta:
813  F22C  9C 10 03           stz    act_key_reg   ;clear active key register
814  F22F  9C 12 03           stz    act_key_dcount ;zero active_key dcount
```

```
815  F232  9C 13 03              stz   act_key_repeat  ;active key is not in repeat mode
816  F235
817  F235  A2 03                 ldx   #LASTKEY        ;get last key number for index
818  F237          ?next2:
819  F237  BD 1C 03              lda   pending,x       ;is this key pending?
820  F23A  C9 0F                 cmp   #TRUE
821  F23C  F0 06                 beq   ?next3          ; yes, skip to next4
822  F23E  CA                    dex                   ; no, scan completed?
823  F23F  10 F6                 bpl   ?next2          ;   no, continue to next key...
824  F241  4C 58 F2              jmp   ?exit           ;   yes, exit...
825  F244          ?next3:
826  F244  8E 10 03              stx   act_key_reg     ;set up active key register
827  F247
828                  ; active key is pending, try to service
829  F247          ?gamma:
830  F247  AD 11 03              lda   act_key_state   ;active key cleared yet?
831  F24A  D0 0C                 bne   ?exit           ; no, exit...
832  F24C  AE 10 03              ldx   act_key_reg     ; yes, replace with new value
833  F24F  A9 00                 lda   #FALSE
834  F251  9D 1C 03              sta   pending,x       ;clear active key pending
835  F254  E8                    inx
836  F255  8E 11 03              stx   act_key_state
837
838  F258          ?exit:
839  F258  60                    rts
840                      pag
841
842                  ;   Title:  get_key
843                  ;
844                  ;   Purpose: This function returns the key number of the pending
845                  ;            key, or zero if no key is pending.
846                  ;
847                  ;   Entry: nothing
848                  ;   Exit:  <A> contains the key number, or zero
849                  ;   Registers used: A
850                  ;   RAM used: Kernal Private Allocation, 21 non-zero page locations
851                  ;
852  F259          R2_get_key:
853  F259  AD 11 03              lda   act_key_state   ;get active key state
854  F25C  60                    rts                   ;and exit...
855                      pag
856
857                  ;   Title:  clear_key
858                  ;
859                  ;   Purpose: This function clears the pending key, signaling the
860                  ;            Key Manager that the pending key has been processed.
861                  ;
862                  ;   Entry: nothing
863                  ;   Exit:  nothing
864                  ;   Registers used: none
865                  ;   RAM used: Kernal Private Allocation, 21 non-zero page locations
866                  ;
867  F25D          R2_clear_key:
868  F25D  9C 11 03              stz   act_key_state   ;clear active key state
869  F260  60                    rts                   ;and exit...
870                      pag
```

```
871
872                    ;      Title: repeat_enable
873                    ;
874                    ;      Purpose:  This function allows the application to enable
875                    ;                the auto_repeat feature for a specified key.
876                    ;
877                    ;      Entry: <A> contains key number to enable auto_repeat
878                    ;      Normal Exit:  Carry Clear
879                    ;      Error Exit:   Carry Set  (key number out of range)
880                    ;      Registers used:  A, X
881                    ;      RAM used: Kernal Private Allocation, 21 non-zero page locations
882                    ;
883  F261              R2_repeat_enable:
884  F261   AA                 tax                    ;is key = zero?
885  F262   F0 05              beq      ?error_exit   ; yes, error exit...
886  F264   CA                 dex
887  F265   E0 04              cpx      #MAXKEY       ;is key < MAXKEY?
888  F267   90 02              bcc      ?continue     ; yes, continue...
889  F269              ?error_exit:
890  F269   38                 sec                    ; set carry flag
891  F26A   60                 rts                    ; and exit...
892  F26B              ?continue:
893  F26B   A9 0F              lda      #TRUE
894  F26D   9D 20 03           sta      repeat,x      ;set key repeat to false
895  F270   18                 clc
896  F271   60                 rts                    ;and exit normally...
897                    pag
898                    ;      Title: repeat_disable
899                    ;
900                    ;      Purpose:  This function allows the application to disable
901                    ;                the auto_repeat feature for a specified key.
902                    ;
903                    ;      Entry: <A> contains key number to disable auto_repeat
904                    ;      Normal Exit:  Carry Clear
905                    ;      Error Exit:   Carry Set  (key number out of range)
906                    ;      Registers used:  A, X
907                    ;      RAM used: Kernal Private Allocation, 21 non-zero page locations
908                    ;
909  F272              R2_repeat_disable:
910  F272   AA                 tax                    ;is key = zero?
911  F273   F0 05              beq      ?error_exit   ; yes, error exit...
912  F275   CA                 dex
913  F276   E0 04              cpx      #MAXKEY       ;is key < MAXKEY?
914  F278   90 02              bcc      ?continue     ; yes, continue...
915  F27A              ?error_exit:
916  F27A   38                 sec                    ; set carry flag
917  F27B   60                 rts                    ; and exit...
918  F27C              ?continue:
919  F27C   A9 00              lda      #FALSE
920  F27E   9D 20 03           sta      repeat,x      ;set key repeat to false
921  F281   18                 clc
922  F282   60                 rts                    ;and exit normally...
923                    pag
924                    ;      Title: repeat_rate
925                    ;
926                    ;      Purpose:  This function allows the application to specify
927                    ;                the repeat rate.
928                    ;
929                    ;      Entry: <A> contains rate information
```

```
930                         ;       Registers used:  none
931                         ;       RAM used: Kernal Private Allocation, 21 non-zero page locations
932                         ;
933   F283                  R2_repeat_rate:
934   F283  8D 24 03                sta     repeat_rate     ;change repeat rate
935   F286  60                      rts                     ; and exit...
936                         pag
937
938
939
940
941
942
943
944
945
946
947
948
949
950   F287                          INCLUDE    R3.ASM
951
952                         ;-----------------------------------
953                         ;    RESOURCE #3
954                         ;    EEPROM SUPPORT
955                         ;-----------------------------------
956                                 COMMENT * This resource writes and reads the EEPROM.
957                                          Writing must be done only when necessary to
958                                          extend the life of the chip.
959                                          This code is for the ASIC version of hardware. *
960
961         001D            E2              equ     $1D     ;EEPROM
962
963
964                         ;       Title:   Read entire EEPROM contents
965                         ;
966                         ;       Purpose: Get EEPROM contents into RAM area
967                         ;
968                         ;       Entry: A=msb, Y=lsb of ram address
969                         ;       Exit: EEPROM contents in ram, 128 bytes
970                         ;       Registers used: all
971                         ;       RAM used:  zero page : e2addr, e2ptr
972
973                         R3_read_all:                    ;read E2 contents into ram
974   F287  84 C5                   sty     e2ptr
975   F289  85 C6                   sta     e2ptr+1
976   F28B  20 05 F3                jsr     R3_init         ;power on
977   F28E  64 C4                   stz     e2addr          ;pointer to eeprom addr (0-63)
978   F290  20 64 F3        ?1:     jsr     R3_read         ;returns data in A,Y
979   F293  90 04                   bcc     ?ok
980   F295  A9 00                   lda     #0              ;bad reading
981   F297  A0 00                   ldy     #0
982   F299  48              ?ok:    pha                     ;msb of reading
983   F29A  98                      tya                     ;lsb of reading
984   F29B  92 C5                   sta     (e2ptr)
985   F29D                          inc16   e2ptr
994   F2AA  68                      pla
995   F2AB  92 C5                   sta     (e2ptr)
```

```
996   F2AD                        inc16    e2ptr
1005  F2BA  E6 C4                 inc      e2addr
1006  F2BC  A5 C4                 lda      e2addr
1007  F2BE  C9 40                 cmp      #64
1008  F2C0  D0 CE                 bne      ?1
1009  F2C2  64 1D                 stz      E2              ;power off
1010  F2C4  60                    rts
1011
1012
1013                        ;     Title: Write entire EEPROM contents
1014                        ;
1015                        ;     Purpose:  Save RAM in EEPROM
1016                        ;
1017                        ;     Entry: A=msb, Y=lsb of ram address of 128 bytes to store
1018                        ;     Exit: RAM contents in EEPROM
1019                        ;     Registers used: all
1020                        ;     RAM used:  zero page : e2addr, e2ptr
1021
1022  F2C5                  R3_write_all:
1023  F2C5  84 C5                 sty      e2ptr
1024  F2C7  85 C6                 sta      e2ptr+1
1025  F2C9  20 05 F3              jsr      R3_init          ;power on
1026  F2CC  64 C4                 stz      e2addr           ;pointer to eeprom addr (0-63)
1027  F2CE  B2 C5           ?1:   lda      (e2ptr)
1028  F2D0  48                    pha                       ;lsb from ram
1029  F2D1                        inc16    e2ptr
1038  F2DE  B2 C5                 lda      (e2ptr)          ;msb from ram
1039  F2E0  7A                    ply
1040  F2E1  20 92 F3              jsr      R3_write         ;store 16 bits in EEPROM
1041  F2E4                        inc16    e2ptr
1050  F2F1  E6 C4                 inc      e2addr
1051  F2F3  A5 C4                 lda      e2addr
1052  F2F5  C9 40                 cmp      #64
1053  F2F7  D0 D5                 bne      ?1
1054  F2F9  64 1D                 stz      E2              ;power off
1055  F2FB  60                    rts
1056
1057
1058                        ;-----------------------------------------------------------
1059
1060  F2FC  A5 C3           R3_cshi:lda    e2mask           ;bring EEPROM chip select high
1061  F2FE  09 02                 ora      #00000010B
1062  F300  85 C3                 sta      e2mask
1063  F302  85 1D                 sta      E2
1064  F304  60                    rts
1065
1066  F305  A9 01           R3_init: lda   #00000001B       ;initialize EEPROM interface
1067  F307  85 C3                 sta      e2mask           ;VE high, CS low, DI low
1068  F309  85 1D                 sta      E2
1069  F30B  60                    rts
1070
1071  F30C  A5 C3           R3_clk: lda    e2mask           ;bring EEPROM serial clock high
1072  F30E  09 04                 ora      #00000100B
1073  F310  85 C3                 sta      e2mask
1074  F312  85 1D                 sta      E2
1075  F314  A5 C3                 lda      e2mask           ;then low
1076  F316  29 FB                 and      #11111011B
1077  F318  85 C3                 sta      e2mask
```

```
1078   F31A  85 1D                   sta    E2
1079   F31C  60                      rts
1080
1081   F31D  A9 30      R3_ewen: lda    #E2EWEN_CMD   ;EEPROM erase/write enable
1082   F31F  20 26 F3            jsr    R3_cmd        ;e2addr must be 0
1083   F322  20 05 F3            jsr    R3_init
1084   F325  60                  rts
1085
1086   F326  85 C2      R3_cmd:  sta    e2wr          ;send EEPROM command in A
1087   F328  20 FC F2            jsr    R3_cshi
1088   F32B  A5 C3               lda    e2mask        ;send 0 start bit
1089   F32D  29 F7               and    #11110111B
1090   F32F  85 C3               sta    e2mask
1091   F331  20 0C F3            jsr    R3_clk
1092   F334  A5 C3               lda    e2mask        ;send 1 start bit
1093   F336  09 08               ora    #00001000B
1094   F338  85 C3               sta    e2mask
1095   F33A  20 0C F3            jsr    R3_clk
1096   F33D  A5 C4               lda    e2addr
1097   F33F  05 C2               ora    e2wr
1098   F341  20 45 F3            jsr    R3_tx
1099   F344  60                  rts
1100
1101   F345  85 C2      R3_tx:   sta    e2wr          ;send byte in A to EEPROM
1102   F347  A2 08               ldx    #8            ;8 bits, no start
1103   F349  A5 C3      ?1:      lda    e2mask
1104   F34B  29 F7               and    #11110111b
1105   F34D  85 C3               sta    e2mask
1106   F34F  26 C2               rol    e2wr          ;msb of data
1107   F351  90 06               bcc    ?2
1108   F353  A5 C3               lda    e2mask        ;set data bit
1109   F355  09 08               ora    #00001000b
1110   F357  85 C3               sta    e2mask
1111   F359  A5 C3      ?2:      lda    e2mask
1112   F35B  85 1D               sta    E2            ;send the bit
1113   F35D  20 0C F3            jsr    R3_clk
1114   F360  CA                  dex
1115   F361  D0 E6               bne    ?1
1116   F363  60                  rts
1117
1118
1119              R3_read:                            ;read word from EEPROM @ e2addr
1120                                                  ;into A,Y  (A=msb, Y=lsb)
1121                                                  ;carry set if error
1122   F364  A9 80               lda    #E2READ_CMD
1123   F366  20 26 F3            jsr    R3_cmd
1124   F369  A5 1D               lda    E2
1125   F36B  6A                  ror    a
1126   F36C  B0 18               bcs    ?ng           ;DO start bit should be 0
1127   F36E  A2 10               ldx    #16           ;get in 16 data bits
1128   F370  20 0C F3   ?1:      jsr    R3_clk        ;msbit comes out first
1129   F373  A5 1D               lda    E2            ;bit is in DO
1130   F375  2A                  rol    A             ;bit is in carry
1131   F376  26 F0               rol    scratch_pad   ;now in target word
1132   F378  26 F1               rol    scratch_pad+1
1133   F37A  CA                  dex
1134   F37B  D0 F3               bne    ?1
1135   F37D  20 05 F3            jsr    R3_init       ;good exit
```

```
1136   F380   A5 F1                  lda     scratch_pad+1    ;msb
1137   F382   A4 F0                  ldy     scratch_pad      ;lsb
1138   F384   18                     clc
1139   F385   60                     rts
1140   F386   20 05 F3      ?ng:     jsr     R3_init          ;didn't get start bit
1141   F389   38                     sec
1142   F38A   60                     rts
1143
1144
1145   F38B   A9 C0         R3_erase: lda    #E2ERASE_CMD      ;erase EEPROM @ e2addr
1146   F38D   20 26 F3                jsr     R3_cmd
1147          80 JF                   BRA     e2w2
1148
1149                        R3_write:                          ;write word to EEPROM @ e2addr
1150                                                           ;from A,Y  (A=msb, Y=lsb)
1151                                                           ;carry set if error
1152   F392   5A                     phy
1153   F393   48                     pha
1154   F394   A9 40                  lda     #E2WRITE_CMD
1155   F396   20 26 F3               jsr     R3_cmd
1156   F399   68                     pla                       ;send data
1157   F39A   20 45 F3               jsr     R3_tx             ;msb first
1158   F39D   68                     pla
1159   F39E   20 45 F3               jsr     R3_tx             ;then lsb
1160   F3A1   20 05 F3      e2w2:    jsr     R3_init
1161   F3A4   20 0C F3               jsr     R3_clk            ;start programming cycle
1162   F3A7   20 FC F2               jsr     R3_cshi
1163   F3AA   A9 14                  lda     #20
1164   F3AC   85 F2                  sta     scratch_pad+2     ;wait 20 ms. max
1165   F3AE   A9 01         ?1:      lda     #1
1166   F3B0   20 24 F5               jsr     R9_wait_ms
1167   F3B3   A5 1D                  lda     E2
1168   F3B5   29 01                  and     #00000001b
1169   F3B7   D0 09                  bne     ?ok               ;for cycle to finish
1170   F3B9   C6 F2                  dec     scratch_pad+2
1171   F3BB   D0 F1                  bne     ?1
1172   F3BD   20 05 F3               jsr     R3_init           ;didn't get ready bit
1173   F3C0   38                     sec
1174   F3C1   60                     rts
1175   F3C2   20 05 F3      ?ok:     jsr     R3_init           ;good exit
1176   F3C5   18                     clc
1177   F3C6   60                     rts
1178
1179
1180                        ;----------------------------------
1181                        ;       CONSTANTS
1182                        ;----------------------------------
1183
1184          0080          E2READ_CMD    equ  10000000B       ;EEPROM read command
1185          0040          E2WRITE_CMD   equ  01000000B       ;EEPROM write command
1186          00C0          E2ERASE_CMD   equ  11000000B       ;EEPROM erase command
1187          0030          E2EWEN_CMD    equ  00110000B       ;EEPROM erase/write enable cmd
1188
1189
1190
1191
1192
1193
```

```
1194  F3C7                    INCLUDE    R4.ASM
1195                        ;---------------------------------------
1196                        ;    RESOURCE #4
1197                        ;    TIMER
1198                        ;---------------------------------------
1199
1200                        COMMENT # The timer output is conected to the INT line.
1201                                  the timer counts 2048 Hz. pulses. To generate INT,
1202                                  load the 16-bit timer with a value.  After INT, the
1203                                  timer needs to be re-loaded, or else it will wrap
1204                                  around, counting 65535.  The timer can
1205                                  also be enable/disabled via I/O. #
1206
1207       000B             TIMER_MSB     equ    8       ;TIMER hi byte
1208       0009             TIMER_LSB     equ    9       ;TIMER lo byte
1209       000A             TIMER         equ    $0A     ;TIMER on/off
1210       000D             TIMER_LOAD    equ    $0D     ;load TIMER msb,lsb into TIMER
1211
1212                        ;
1213                        ;    Title:  Init the timer (start interrupts)
1214                        ;
1215                        ;    Purpose: To turn on power to the timer and load the counter,
1216                        ;             which starts interrupts.
1217                        ;
1218                        ;    Entry, & Exit:   none
1219                        ;    Registers used: A
1220                        ;    RAM used:  none
1221                        ;
1222
1223                        R4_timer_on:                  ;set up timer for 40 ms. interrupts
1224  F3C7  78                   sei
1225  F3C8  A9 00                lda    #0             ;82 * (1/2048) = .040
1226  F3CA  85 08                sta    TIMER_MSB      ;store value in timer registers
1227  F3CC  A9 52                lda    #82
1228  F3CE  85 09                sta    TIMER_LSB
1229  F3D0  85 0D                sta    TIMER_LOAD     ;load regs into timer
1230  F3D2                       set    TIMER          ;turn timer power on
1234  F3D6  58                   cli
1235  F3D7  60                   rts
1236
1237                        ;
1238                        ;    Title:  Start timer
1239                        ;
1240                        ;    Purpose: To re-load the timer with a preset value
1241                        ;
1242                        ;    Entry: timer power must be on, value loaded in timer registers
1243                        ;
1244                        ;    Exit:  none
1245                        ;    Registers used: none
1246                        ;    RAM used:  none
1247
1248                        R4_timer_start:               ;load regs into timer
1249  F3D8  85 0D                sta    TIMER_LOAD
1250  F3DA  60                   rts
1251
1252
1253                        ;
1254                        ;    Title:  Timer off
```

```
1255                          ;
1256                          ;     Purpose: To turn timer off (stop interrupts)
1257                          ;
1258                          ;     Entry, & Exit:  none
1259                          ;     Registers used: none
1260                          ;     RAM used:  none
1261
1262   F3DB                   R4_timer_off:
1263   F3DB   78                      sei
1264   F3DC   64 0A                   stz      TIMER           ;turn timer power off
1265   F3DE   60                      rts
1266
1267
1268
1269
1270
1271
1272
1273
1274
1275                          ;        INCLUDE       R5.ASM
1276   F3DF                            INCLUDE       R6.ASM
1277                          ;----------------------------------
1278                          ;        RESOURCE #6
1279                          ;        DIAGNOSTICS
1280                          ;----------------------------------
1281
1282          0006            VALVE_SETUP     equ      6       ;valve select
1283          0007            VALVE_ENABLE    equ      7       ;valve enable
1284          001E            WCVALVES        equ      $1E     ;Wire check drivers for valves
1285          0032            adwait          equ      50      ;wait time for wire check
1286
1287
1288
1289
1290                          ;     Title:  Is a valve
1291                          ;
1292                          ;     Purpose: To determine if a position is open, shorted,
1293                          ;              or has a valve
1294                          ;
1295                          ;     Entry: A has valve position (0-7), A/D must be on
1296                          ;     Exit:  A has reading, Y=0 if open, 1 if valve, 2 if shorted
1297                          ;     RAM used: scratch pad+1
1298
1299                          R6_isvalve:                       ;test station for a valve
1300   F3DF   85 F0                    sta      scratch_pad
1301   F3E1                            set      WCVALVES
1305.
1306   F3E5   A5 F0                    lda      scratch_pad    ;to turn on,
1307   F3E7   29 07                    and      #00000111B     ;+ is set to position 0-7
1308   F3E9   D0 02                    bne      ?1             ;- is set to position 0
1309   F3EB   09 38                    ora      #00111000B     ;if valve=0, then set - not position 0
1310   F3ED   85 06           ?1:      sta      VALVE_SETUP
1311   F3EF   A9 03                    lda      #3
1312   F3F1   85 07                    sta      VALVE_ENABLE
1313
1314   F3F3   A9 32                    lda      #adwait        ;settle
1315   F3F5   20 24 F5                 jsr      R9_wait_ms
```

```
1316  F3F8  A5 F0              lda     scratch_pad       ;position 0-7 is A/D channel (8-15)
1317  F3FA  29 07              and     #00000111B
1318  F3FC  09 08              ora     #00001000B
1319  F3FE  20 34 F4           jsr     R7_ad_read        ;let's see what's out there
1320  F401  85 F1              sta     scratch_pad+1
1321  F403  64 07              stz     VALVE_ENABLE      ;valve line dismissed
1322  F405  64 1E              stz     NCVALVES
1323
1324  F407  A5 F1              lda     scratch_pad+1
1325  F409  C9 A8              cmp     #168              ;if <3.3 volts
1326  F40B        blt     ?open             ;then line open
1329  F40D  C9 E6       ?0:    cmp     #230              ;if >=4.5 volts
1330  F40F        bge     ?short            ;then line shorted
1333  F411  A0 00              ldy     #0                ;otherwise valve is present
1334  F413  60                 rts
1335  F414  A0 01       ?open: ldy     #1
1336  F416  60                 rts
1337  F417  A0 02       ?short: ldy    #2
1338  F419  60                 rts
1339
1340
1341
1342
1343
1344
1345
1346
1347  F41A                      INCLUDE    R7.ASM
1348                       ;----------------------------------
1349                       ;     RESOURCE #7
1350                       ;     A/D CONVERTER
1351                       ;----------------------------------
1352
1353        0002     AD_POWER     equ    2        ;A/D power
1354        0003     AD_ENABLE    equ    3        ;A/D enable
1355        0015     AD_DATA      equ    $15      ;read A/D data
1356        0020     ADBASE       equ    $20      ;A/D base address
1357        0013     STATUS2      equ    $13      ;second status byte
1358
1359
1360                       ;     Title: Turn A/D converter on
1361                       ;
1362                       ;     Purpose: Apply power to A/D and warm up
1363                       ;
1364                       ;     Entry: none
1365                       ;     Exit: none
1366                       ;     RAM used: none
1367
1368  F41A              R7_ad_on:
1369  F41A                      set     AD_POWER          ;turn A/D on
1373  F41E  A9 1E              lda     #30
1374  F420  20 24 F5           jsr     R9_wait_ms
1375  F423                      set     AD_ENABLE
1379  F427  95 20              sta     ADBASE,x          ;do dummy start to get EOC high
1380  F429  A9 01              lda     #1
1381  F42B  20 24 F5           jsr     R9_wait_ms
1382  F42E  60                 rts
1383
```

```
1384
1385                    ;       Title:  Turn A/D converter off
1386                    ;
1387                    ;       Entry: none
1388                    ;       Exit: none
1389                    ;       RAM used:  none
1390
1391   F42F             R7_ad_off:
1392   F42F  64 02              stz     AD_POWER        ;turn A/D off
1393   F431  64 03              stz     AD_ENABLE
1394   F433  60                 rts
1395
1396
1397                    ;       Title:  Read A/D converter
1398                    ;
1399                    ;       Purpose: Get reading from A/D channel
1400                    ;
1401                    ;       Entry: channel #(0-15) in A
1402                    ;       Exit: reading in A
1403                    ;             carry set if timeout
1404                    ;       RAM used:  none
1405
1406   F434             R7_ad_read:
1407   F434  78                 sei                     ;NO INTERRUPTS!
1408   F435  A6 15              ldx     AD_DATA         ;bogus read clears EOC
1409   F437  AA                 tax                     ;set up AD mux and start convert
1410   F438  95 20              sta     ADBASE,X
1411   F43A  A0 64              ldy     #100            ;software timeout after 2ms.
1412   F43C  88        ?1:      dey
1413   F43D  F0 12              beq     ?4
1414   F43F  A5 13              lda     STATUS2         ;Wait for EOC high
1415   F441  30 F9              bmi     ?1
1416   F443  A0 64              ldy     #100
1417   F445  88        ?3:      dey
1418   F446  F0 09              beq     ?4
1419   F448  A5 13              lda     STATUS2         ;Wait for EOC low
1420   F44A  10 F9              bpl     ?3
1421   F44C  A5 15              lda     AD_DATA         ;read data
1422   F44E  18                 clc                     ;return carry clear if ok
1423   F44F  58                 cli
1424   F450  60                 rts
1425   F451  38        ?4:      sec                     ;carry set if timeout
1426   F452  A9 00              lda     #0
1427   F454  58                 cli
1428   F455  60                 rts
1429
1430
1431
1432
1433
1434
1435
1436
1437   F456                      INCLUDE    RB.ASM
1438                    ;----------------------------------
1439                    ;       RESOURCE #8
1440                    ;       REAL TIME CLOCK
```

```
1441                            ;------------------------------------
1442                            .                              -
1443        0001    RTC_CLR     equ     1           ;clear RTC counter
1444        000B    RTC         equ     $0B         ;Real time clock
1445        0010    RTC_MSB     equ     $10         ;RTC counter hi byte
1446        0011    RTC_LSB     equ     $11         ;RTC counter lo byte
1447        001C    RTC_TEST    equ     $1C         ;RTC counter clock
1448
1449
1450                ;       Title:  Initialize clock
1451                ;
1452                ;       Purpose: Init clock bytes
1453                ;
1454                ;       Entry: none
1455                ;       Exit: none
1456                ;       RAM used:  none
1457
1458  F456          R8_clock_init:
1459  F456  A2 06           ldx     #6
1460  F458  BD 62 F4  ?1:   lda     clocknit,x
1461  F45B  9D 01 02        sta     hour,x
1462  F45E  CA              dex
1463  F45F  10 F7           bpl     ?1
1464  F461  60              rts
1465
1466  F462          clocknit:
1467  F462  01 00 07 01 01  BYTE    1,0,7,1,1,89,31         ;1:00 am, Sun, Jan 1, 89
1468
1469
1470                ;       Title:  Read the Real Time Counter
1471                ;
1472                ;       Purpose: See if a RTC tick (every minute) happened
1473                ;
1474                ;       Entry: none
1475                ;       Exit: A=msb of counter, Y=lsb of counter
1476                ;       RAM used: scratch_pad+1
1477
1478  F469          R8_rtc_read:
1479  F469  A5 11           lda     RTC_LSB        ;do it twice in case update in progress
1480  F46B  85 F0           sta     scratch_pad
1481  F46D  A5 10           lda     RTC_MSB
1482  F46F  85 F1           sta     scratch_pad+1
1483  F471  A5 11           lda     RTC_LSB
1484  F473  C5 F0           cmp     scratch_pad
1485  F475  D0 F2           bne     R8_rtc_read
1486  F477  A5 10           lda     RTC_MSB
1487  F479  C5 F1           cmp     scratch_pad+1
1488  F47B  D0 EC           bne     R8_rtc_read
1489  F47D  A4 F0           ldy     scratch_pad
1490  F47F  A5 F1           lda     scratch_pad+1
1491  F481  60              rts
1492
1493
1494                ;       Title:  Clear Real Time Counter
1495                ;
1496                ;       Purpose: Set counter to zero after reading
1497                ;
```

```
1498                    ;       Entry: none
1499                    ;       Exit: none
1500                    ;       RAM used: none
1501
1502   F482             R8_rtc_init:
1503   F482  64 01              stz     RTC_CLR
1504   F484  A5 11              lda     RTC_LSB
1505   F486  A5 10              lda     RTC_MSB
1506   F488  60                 rts
1507
1508
1509                    ;       Title: Bump Clock
1510                    ;
1511                    ;       Purpose: Increment the real time clock
1512                    ;
1513                    ;       Entry: A has # of minutes (1-60)
1514                    ;       Exit: A=1 if new day, 2 if new month (and new day)
1515                    ;       RAM used: RTC( hour, minute, dow, month, day, year, dim)
1516
1517                    R8_bump_clock:              ;minutes in A   (<=60)
1518   F489  A6 F0              ldx     scratch_pad
1519   F48B  DA                 phx
1520   F48C  18                 clc
1521   F48D  6D 02 02           adc     minute
1522   F490  8D 02 02           sta     minute
1523   F493  C9 3C              cmp     #60
1524   F495                     blt     ?4
1527   F497  38                 sec                 ;if >=60 minutes,
1528   F498  AD 02 02           lda     minute
1529   F49B  E9 3C              SBC     #60         ;then subtract 60 minutes
1530   F49D  8D 02 02           sta     minute
1531   F4A0  EE 01 02    ?1:    inc     hour        ;and add 1 hour
1532   F4A3  AD 01 02           lda     hour
1533   F4A6  C9 18              cmp     #24
1534   F4A8                     blt     ?4
1537   F4AA  9C 01 02           stz     hour        ;if midnight, then new day
1538   F4AD  EE 05 02           inc     day
1539   F4B0                     set     scratch_pad
1543   F4B4  EE 03 02           inc     dow
1544   F4B7  AD 03 02           lda     dow         ;new day of the week
1545   F4BA  C9 08              cmp     #8
1546   F4BC  D0 05              bne     ?2
1547   F4BE                     set     dow
1551   F4C3  AD 05 02    ?2:    lda     day
1552   F4C6  CD 07 02           cmp     dim
1553   F4C9  F0 3E              beq     ?4
1554   F4CB                     blt     ?4
1557   F4CD                     set     day         ;new month, day=1
1561   F4D2  A9 02              lda     #2
1562   F4D4  85 F0              sta     scratch_pad
1563   F4D6  EE 04 02           inc     month
1564   F4D9  AD 04 02           lda     month
1565   F4DC  C9 0D              cmp     #13
1566   F4DE                     blt     ?3
1569   F4E0                     set     month       ;new year, month=1
1573   F4E5  EE 06 02           inc     year
1574   F4E8  AD 06 02           lda     year
```

```
1575  F4EB  C9 64              cmp     #100
1576  F4ED  D0 03              bne     ?3
1577  F4EF  9C 06 02           stz     year
1578  F4F2  AE 04 02   ?3:     ldx     month           ;find # of days in month
1579  F4F5  BD 0F F5           lda     daytbl,x
1580  F4F8  8D 07 02           sta     dim
1581  F4FB  C9 02              cmp     #2              ;if FEB
1582  F4FD  D0 0A              bne     ?4
1583  F4FF  AD 06 02           lda     year
1584  F502  29 03              and     #00000011B      ;and leap year
1585  F504  D0 03              bne     ?4
1586  F506  EE 07 02           inc     dim             ;then add a day
1587  F509  A5 F0      ?4:     lda     scratch_pad
1588  F50B  FA                 plx
1589  F50C  86 F0              stx     scratch_pad
1590  F50E  60                 rts
1591
1592
1593  F50F  00         daytbl: BYTE    0               ;number of days in each month
1594  F510  1F                 BYTE    31              ;JAN
1595  F511  1C                 BYTE    28              ;FEB
1596  F512  1F                 BYTE    31              ;MAR
1597  F513  1E                 BYTE    30              ;APR
1598  F514  1F                 BYTE    31              ;MAY
1599  F515  1E                 BYTE    30              ;JUN
1600  F516  1F                 BYTE    31              ;JUL
1601  F517  1F                 BYTE    31              ;AUG
1602  F518  1E                 BYTE    30              ;SEP
1603  F519  1F                 BYTE    31              ;OCT
1604  F51A  1E                 BYTE    30              ;NOV
1605  F51B  1F                 BYTE    31              ;DEC
1606
1607
1608
1609                   ;       Title: Real Time Clock 10 sec.
1610                   ;
1611                   ;       Purpose: Make RTC do 10 sec. ticks
1612                   ;
1613                   ;       Entry: none
1614                   ;       Exit: none
1615                   ;       RAM used: none
1616
1617  F51C             R8_rtc10:
1618  F51C  A9 01              lda     #1
1619  F51E  85 0B              sta     RTC
1620  F520  60                 rts
1621
1622
1623                   ;       Title: Real Time Clock 60 sec.
1624                   ;
1625                   ;       Purpose: Make RTC do 60 sec. ticks
1626                   ;
1627                   ;       Entry: none
1628                   ;       Exit: none
1629                   ;       RAM used: none
1630
1631  F521             R8_rtc60:
```

```
1632  F521  64 0B              stz    RTC
1633  F523  60                 rts
1634
1635
1636
1637
1638  F524                      INCLUDE    R9.ASM
1639                    ;----------------------------------
1640                    ;      RESOURCE #9
1641                    ;      UTILITIES
1642                    ;----------------------------------
1643
1644                    ;      Title:  Wait millisecond
1645                    ;
1646                    ;      Purpose: Waste time
1647                    ;              1ms. at 455KHz, will vary according to clock speed
1648                    ;
1649                    ;      Entry: A= # of ms to waste
1650                    ;      Exit: none
1651                    ;      RAM used:  none
1652
1653  F524              R9_wait_ms:
1654  F524  DA                  phx
1655  F525  5A                  phy
1656  F526  A8                  tay
1657  F527  A2 5A       ?0:     ldx    #90
1658  F529  CA          ?1:     dex
1659  F52A  D0 FD               bne    ?1
1660  F52C  88                  dey
1661  F52D  D0 F8               bne    ?0
1662  F52F  7A                  ply
1663  F530  FA                  plx
1664  F531  60                  rts
1665
1666
1667                    ;      Title:  Convert Accum to ASCII char
1668                    ;
1669                    ;      Purpose: To make a byte displayable
1670                    ;
1671                    ;      Entry: A is 0-F
1672                    ;      Exit: A is ASCII 0-9 or A-F
1673                    ;      RAM used:  none
1674
1675  F532              R9_ascii:
1676  F532  29 0F               and    #00001111B     ;convert low 4 bits of A to ASCII char
1677  F534  C9 0A               cmp    #10            ;if A>=10 then add 7
1678  F536  90 03               bcc    ?1
1679  F538  18                  clc
1680  F539  69 07               adc    #7
1681  F53B  18          ?1:     clc                   ;add 30H to make ASCII
1682  F53C  69 30               adc    #30H
1683  F53E  60                  rts
1684
1685
1686                    ;      Title:  Convert byte to 3 digit decimal
1687                    ;
1688                    ;      Purpose: To make a number displayable
```

```
1689                    ;
1690                    ;       Entry: byte in A
1691                    ;       Exit: 3 digits on stack, MSB pushed on last
1692                    ;       RAM used: scratch_pad+2
1693
1694   F53F                     R9_bindec:
1695   F53F   AA                        tax
1696   F540   A9 30                     lda     #'0'
1697   F542   85 F0                     sta     scratch_pad
1698   F544   85 F1                     sta     scratch_pad+1
1699   F546   85 F2                     sta     scratch_pad+2
1700   F548                             save_retadr
1706   F54E   8A        ?0:             txa
1707   F54F   38                        sec
1708   F550   E9 64                     sbc     #100
1709   F552   90 05                     bcc     ?1
1710   F554   AA                        tax                     ;if >=100, then inc scratch_pad
1711   F555   E6 F0                     inc     scratch_pad
1712   F557   80 F5                     bra     ?0
1713   F559   8A        ?1:             txa
1714   F55A   38                        sec
1715   F55B   E9 0A                     sbc     #10
1716   F55D   90 05                     bcc     ?2
1717   F55F   AA                        tax                     ;if >=10, then inc scratch_pad+1
1718   F560   E6 F1                     inc     scratch_pad+1
1719   F562   80 F5                     bra     ?1
1720   F564   8A        ?2:             txa                     ;<10, add to scratch_pad+2
1721   F565   18                        clc
1722   F566   65 F2                     adc     scratch_pad+2
1723   F568   85 F2                     sta     scratch_pad+2
1724   F56A   48                        pha
1725   F56B   A5 F1                     lda     scratch_pad+1
1726   F56D   48                        pha
1727   F56E   A5 F0                     lda     scratch_pad
1728   F570   48                        pha
1729   F571                             get_retadr
1735   F577   60                        rts
1736
1737
1738
1739                    ;       Title: Block move
1740                    ;
1741                    ;       Purpose: To move a block of data
1742                    ;
1743                    ;       Entry: stack:  return address word
1744                    ;                      lsb,msb of count
1745                    ;                      lsb,msb of destination addr
1746                    ;                      lsb,msb of source addr
1747                    ;       Exit: data moved
1748                    ;       RAM used: scratch_pad+5
1749
1750   F578                     R9_block_move:
1751   F578   7A                        ply                     ;save return address
1752   F579   FA                        plx
1753   F57A   68                        pla                     ;get count
1754   F57B   85 F0                     sta     scratch_pad
1755   F57D   68                        pla
```

```
1756  F57E  85 F1                sta    scratch_pad+1
1757  F580  68                   pla                          ;get destination
1758  F581  85 F2                sta    scratch_pad+2
1759  F583  68                   pla
1760  F584  85 F3                sta    scratch_pad+3
1761  F586  68                   pla                          ;get source
1762  F587  85 F4                sta    scratch_pad+4
1763  F589  68                   pla
1764  F58A  85 F5                sta    scratch_pad+5
1765  F58C  DA                   phx                          ;restore return addr
1766  F58D  5A                   phy
1767
1768  F58E  A5 F0         ?0:    lda    scratch_pad           ;while scratch_pad <>0,
1769  F590  05 F1                ora    scratch_pad+1
1770  F592  F0 1A                beq    ?done
1771  F594  B2 F4                lda    (scratch_pad+4)       ;move data
1772  F596  92 F2                sta    (scratch_pad+2)
1773  F598  E6 F4                inc    scratch_pad+4         ;inc source addr
1774  F59A  D0 02                bne    ?1
1775  F59C  E6 F5                inc    scratch_pad+5
1776  F59E  E6 F2         ?1:    inc    scratch_pad+2         ;inc destination addr
1777  F5A0  D0 02                bne    ?2
1778  F5A2  E6 F3                inc    scratch_pad+3
1779  F5A4  A5 F0         ?2:    lda    scratch_pad           ;dec 16 bit counter
1780  F5A6  D0 02                bne    ?3
1781  F5A8  C6 F1                dec    scratch_pad+1
1782  F5AA  C6 F0         ?3:    dec    scratch_pad
1783  F5AC  80 E0                bra    ?0
1784  F5AE  60            ?done: rts
1785
1786
1787                      ;      Title: Clear RAM
1788                      ;
1789                      ;      Purpose: To fill RAM area with 0
1790                      ;
1791                      ;      Entry: stack:  return address word
1792                      ;                     lsb,msb of count
1793                      ;                     lsb,msb of destination addr
1794                      ;      Exit: RAM cleared
1795                      ;      RAM used: scratch_pad+3
1796
1797  F5AF                R9_clear_RAM:
1798  F5AF  7A                   ply                           ;save return address
1799  F5B0  FA                   plx
1800  F5B1  68                   pla                           ;get count
1801  F5B2  85 F0                sta    scratch_pad
1802  F5B4  68                   pla
1803  F5B5  85 F1                sta    scratch_pad+1
1804  F5B7  68                   pla                           ;get destination
1805  F5B8  85 F2                sta    scratch_pad+2
1806  F5BA  68                   pla
1807  F5BB  85 F3                sta    scratch_pad+3
1808  F5BD  DA                   phx                           ;restore return addr
1809  F5BE  5A                   phy
1810
1811  F5BF  A5 F0         ?0:    lda    scratch_pad            ;while scratch_pad <>0,
1812  F5C1  05 F1                ora    scratch_pad+1
```

```
1813   F5C3   F0 14                beq     ?done
1814   F5C5   A9 00                lda     #0              ;clear byte
1815   F5C7   92 F2                sta     (scratch_pad+2)
1816   F5C9   E6 F2                inc     scratch_pad+2   ;inc destination addr
1817   F5CB   D0 02                bne     ?2
1818   F5CD   E6 F3                inc     scratch_pad+3
1819   F5CF   A5 F0       ?2:      lda     scratch_pad     ;dec 16 bit counter
1820   F5D1   D0 02                bne     ?3
1821   F5D3   C6 F1                dec     scratch_pad+1
1822   F5D5   C6 F0       ?3:      dec     scratch_pad
1823   F5D7   80 E6                bra     ?0
1824   F5D9   60          ?done:   rts
1825
1826
1827                      ;        Title: Wait a second
1828                      ;
1829                      ;        Purpose: To waste time
1830                      ;
1831                      ;        Entry: A has # of secs
1832                      ;        Exit: none
1833                      ;        RAM used: none
1834
1835   F5DA                R9_wait_sec:
1836   F5DA   48                   pha
1837   F5DB   A9 FA                lda     #250
1838   F5DD   20 24 F5             jsr     R9_wait_ms
1839   F5E0   A9 FA                lda     #250
1840   F5E2   20 24 F5             jsr     R9_wait_ms
1841   F5E5   A9 FA                lda     #250
1842   F5E7   20 24 F5             jsr     R9_wait_ms
1843   F5EA   A9 FA                lda     #250
1844   F5EC   20 24 F5             jsr     R9_wait_ms
1845   F5EF   68                   pla
1846   F5F0   38                   sec
1847   F5F1   E9 01                sbc     #1
1848   F5F3   D0 E5                bne     R9_wait_sec
1849   F5F5   60                   rts
1850
1851
1852                      ;----------------------------------
1853                      ;        MATH ROUTINES
1854                      ;----------------------------------
1855
1856                      ;        Title: Multiply
1857                      ;
1858                      ;        Purpose: Multiply two 8 bit numbers
1859                      ;
1860                      ;        Entry: multiplier in A, multiplicand in Y
1861                      ;        Exit: 16 bit product: msb in A, lsb in Y
1862                      ;        RAM used: scratch_pad
1863
1864   F5F6                R9_mult:
1865   F5F6   85 C7                sta     multiplier      ;multiplier
1866   F5F8   84 C8                sty     multiplicand    ;multiplicand
1867   F5FA   A9 00                lda     #0
1868   F5FC   85 F0                sta     scratch_pad     ;msb of product
1869   F5FE   A2 08                ldx     #8
```

```
1870  F600  0A              ?1:     asl     a
1871  F601  26 F0                   rol     scratch_pad
1872  F603  06 C7                   asl     multiplier
1873  F605  90 07                   bcc     ?2
1874  F607  18                      clc
1875  F608  65 C8                   adc     multiplicand
1876  F60A  90 02                   bcc     ?2
1877  F60C  E6 F0                   inc     scratch_pad
1878  F60E  CA              ?2:     dex
1879  F60F  D0 EF                   bne     ?1
1880  F611  A8                      tay                         ;lsb of product
1881  F612  ., F0                   lda     scratch_pad         ;msb of product
1882  F614  60                      rts
1883
1884
1885                        ;       Title:  Divide
1886                        ;
1887                        ;       Purpose: Divide dividend (15 bits) by divisor (7 bits)
1888                        ;           and return quotient and remainder
1889                        ;
1890                        ;       Entry:  A= msb of dividend
1891                        ;               Y= lsb of dividend
1892                        ;               X= divisor
1893                        ;       Exit:   A=quotient, remainder in Y
1894                        ;       RAM used: scratch_pad
1895
1896  F615              R9_divide:
1897  F615  85 CA                   sta     dividend+1          ;msb of dividend
1898  F617  84 C9                   sty     dividend            ;lsb of dividend
1899  F619  86 CB                   stx     divisor             ;divisor
1900  F61B  A2 08                   ldx     #8
1901  F61D  A5 C9                   lda     dividend
1902  F61F  85 F0                   sta     scratch_pad         ;quotient
1903  F621  A5 CA                   lda     dividend+1
1904  F623  06 F0           ?1:     asl     scratch_pad
1905  F625  2A                      rol     a
1906  F626  C5 CB                   cmp     divisor
1907  F628  90 04                   bcc     ?2
1908  F62A  E5 CB                   sbc     divisor
1909  F62C  E6 F0                   inc     scratch_pad
1910  F62E  CA              ?2:     dex
1911  F62F  D0 F2                   bne     ?1
1912  F631  A8                      tay                         ;remainder
1913  F632  A5 F0                   lda     scratch_pad         ;quotient
1914  F634  60                      rts
1915
1916
1917
1918                        ;       Title:  Word divide
1919                        ;
1920                        ;       Purpose: Divide dividend (16 bits) by divisor (16 bits)
1921                        ;           and return quotient (16 bits)
1922                        ;
1923                        ;       Entry:  stack: return addr
1924                        ;               lsb,msb of dividend
1925                        ;               lsb,msb of divisor
1926                        ;       Exit:   A=msb of quotient, Y=lsb of quotient
```

```
1927                    ;       RAM used: scratch_pad+1
1928
1929  F635              R9_div16:
1930  F635  68                  pla                      ;save return address
1931  F636  A8                  tay
1932  F637  68                  pla
1933  F638  AA                  tax
1934  F639  68                  pla                      ;pull dividend
1935  F63A  85 C9               sta     dividend
1936  F63C  68                  pla
1937  F63D  85 CA               sta     dividend+1
1938  F63F  68                  pla                      ;pull divisor
1939  F640  85 CB               sta     divisor
1940  F642  68                  pla
1941  F643  85 CC               sta     divisor+1
1942  F645  8A                  txa                      ;put ret addr back
1943  F646  48                  pha
1944  F647  98                  tya
1945  F648  48                  pha
1946
1947  F649  A9 00               lda     #0               ;clear partial dividend
1948  F64B  85 F0               sta     scratch_pad
1949  F64D  85 F1               sta     scratch_pad+1
1950  F64F  A2 10               ldx     #16              ;dividend bit count=16
1951  F651  06 C9      nxtbt:   asl     dividend         ;shift dividend (quotient) left
1952  F653  26 CA               rol     dividend+1
1953  F655  26 F0               rol     scratch_pad              ;shift partial dividend left
1954  F657  26 F1               rol     scratch_pad+1
1955  F659  A5 F0               lda     scratch_pad              ;subtract low bytes
1956  F65B  38                  sec
1957  F65C  E5 CB               sbc     divisor
1958  F65E  A8                  tay                      ;save low result in Y
1959  F65F  A5 F1               lda     scratch_pad+1            ;subtract hi bytes
1960  F661  E5 CC               sbc     divisor+1
1961  F663  90 06               bcc     cntdn            ;divisor>dividend?
1962  F665  E6 C9               inc     dividend         ;no, set bit in quotient
1963  F667  85 F1               sta     scratch_pad+1            ; and enter subtraction result
1964  F669  84 F0               sty     scratch_pad              ; into partial dividend
1965  F66B  CA         cntdn:   dex                      ;decrement bit count
1966  F66C  D0 E3               bne     nxtbt            ;loop until 16 bits are done
1967  F66E  A4 C9               ldy     dividend         ;return quotient
1968  F670  A5 CA               lda     dividend+1
1969  F672  60                  rts
1970
1971
1972
1973
1974
1975
1976
1977
1978                            GLOBALS OFF
1979
1980  F673                      END
```

Lines Assembled : 1980            Assembly Errors : 0

```
 1                      TITLE    'Bank 1 Controller Firmware'
 2
 3              ;       by Dennis Kaiser
 4              ;       SOLATROL, Inc.
 5              ;       San Diego, CA,  17 Mar 89
 6
 7              ;       Code for the 65C02 processor
 8              ;       Clock speed 455 KHz, cycle time 2.2 microseconds
 9
10   0000               CHIP            65C02
11                      MACLIST         OFF
12                      ASLLIST         OFF
13
14              ;       This module contains code to move messages from the upper
15              ;       bank of ROM (8000-FFFF) into a RAM buffer area.
16              ;       Control then returns to the lower bank of ROM, where the
17              ;       message is retrieved from RAM and displayed.
18
19              ;       This module is separately assembled. The resulting file,
20              ;       BANK1.HEX is downloaded to the EPROM programmer using
21              ;       an offset of 0.
22
23              ;---------------------------------
24              ;       equates
25              ;---------------------------------
26
27      001D    E2              equ     $1D     ;EEPROM
28      0006    UA              equ     6               ;up arrow character
29      0007    DA              equ     7               ;down arrow character
30
31   0000               PAGE0
32   009C               ORG     $9C
33
34   009C       ramptr          ds      2       ;pointer into msgbfr
35   009E       romptr          ds      2       ;pointer into rom data
36
37   0000               DATA
38   0A00               ORG     $0A00
39
40   0A00       msgbfr          ds      256     ;message xfer ram area
41
42   0000               CODE
43   8000               ORG     $8000
44
45              ;---------------------------------
46              ;       message retrieval code
47              ;---------------------------------
```

```
48
49                      ;      Title: message transfer
50                      ;
51                      ;      Purpose: Move text from ROM bank1 to RAM buffer area
52                      ;
53                      ;      Entry: A=msb, Y=lsb of text address
54                      ;             X=mode, 0=one line message, 1=help message
55                      ;      Exit: text in msgbfr
56                      ;      RAM used: ramptr, romptr
57
58  8000                message_xfer:
59  8000  84 9E                 sty     romptr          ;point to rom area
60  8002  85 9F                 sta     romptr+1
61
62  8004  A9 00                 lda     #<msgbfr        ;point to start of ram area
63  8006  85 9C                 sta     ramptr
64  8008  A9 0A                 lda     #>msgbfr
65  800A  85 9D                 sta     ramptr+1
66
67  800C  B2 9E         ?0:     lda     (romptr)        ;while rom byte <>0
68  800E  92 9C                 sta     (ramptr)        ;store in ram bfr
69  8010  F0 0E                 beq     ?5
70
71  8012  E6 9E                 inc     romptr          ;inc16 rom pointer
72  8014  D0 02                 bne     ?1
73  8016  E6 9F                 inc     romptr+1
74
75  8018  E6 9C         ?1:     inc     ramptr          ;inc16 ram pointer
76  801A  D0 02                 bne     ?2
77  801C  E6 9D                 inc     ramptr+1
78  801E  80 EC         ?2:     bra     ?0              ;wend
79
80  8020  E0 00         ?5:     cpx     #0              ;end of line
81  8022  F0 12                 beq     ?done           ;if mode=0 then done
82                                                      ;else
83  8024  E6 9E                 inc     romptr          ;inc16 rom pointer
84  8026  D0 02                 bne     ?6
85  8028  E6 9F                 inc     romptr+1
86
87  802A  E6 9C         ?6:     inc     ramptr          ;inc16 ram pointer
88  802C  D0 02                 bne     ?7
89  802E  E6 9D                 inc     ramptr+1
90
91  8030  B2 9E         ?7:     lda     (romptr)
92  8032  D0 D8                 bne     ?0              ;done if two zeros in a row
93  8034  92 9C                 sta     (ramptr)
94
95  8036  4C EA FF      ?done:  jmp     to_bank0
96
97                              GLOBALS ON
98  8039                         INCLUDE        MSG.ASM
99
100
101                     ;----------------------------------
102                     ;     STRING STORAGE
103                     ;----------------------------------
104
```

```
105  8039  20 50 72 65 73  MSG0:    BYTE    ' Press OK when most readable ',0
106
107                                 ;MAIN MENU
108
109  805B  4D 61 69 6E 20  MSG1:    BYTE    'Main Options:',0
110
111  8066  45 4E 54 45 52  mainopt: BYTE    'ENTER SCHEDULE?',0
112  8076  52 55 4E 20 53           BYTE    'RUN SCHEDULE?',0
113  8084  4D 41 4E 55 41           BYTE    'MANUAL RUN?',0
114  8090  4E 4F 20 57 41           BYTE    'NO WATERING?',0
115  809D  53 45 54 55 50           BYTE    'SETUP SYSTEM?',0
116  80AB  56 49 45 57 20           BYTE    'VIEW INFO?',0,0
117
118                                 ;MANUAL RUN
119                                 ;ruler      12345678901234567890123456789012
120  80B7  4D 61 6E 75 61  MSG8:    BYTE    'Manual Run:',0
121  80C3  52 55 4E 20 53  manopt:  BYTE    'RUN STATIONS?',0
122  80D1  54 45 53 54 20           BYTE    'TEST SEQUENCE?',0
123                        ;        BYTE    'READ SENSORS?',0
124  80E0  46 49 4E 49 53           BYTE    'FINISHED?',0,0
125  80EB  00              MSG13:   BYTE    0
126  80EC  45 6E 74 65 72  MSG14:   BYTE    'Enter or Change ',0
127  80FD  00              MSG15:   BYTE    0
128  80FE  23 20 6F 66 20  MSG16:   BYTE    '# of STATIONS',0
129  810C  20 68 2B 20 20  MSG18:   BYTE    ' h+ m',0
130  8113  43 68 61 72 67  MSG19:   BYTE    'Charging...   Please Wait',0
131  812F  56 69 65 77 20  MSG20:   BYTE    'View Info:',0
132  813A  44 41 49 4C 59  infoopt: BYTE    'DAILY SCHEDULE?',0
133  814A  45 56 45 4E 54           BYTE    'EVENT HISTORY?',0
134  8159  44 4F 4E 45 20           BYTE    'DONE WITH INFO?',0,0
135  816A  28 31 30 30 25  MSG24:   BYTE    '(100%=    )',0
136  8179  20 73 70 6C 69  MSG25:   BYTE    ' splits',0
137  8181  4F 4E 20 64 61  MSG26:   BYTE    'ON days: ',0
138  818B  57 69 72 65 20  MSG27:   BYTE    'Wire check?',0
139  8197  20 31 30 30 25  MSG28:   BYTE    ' 100%=',0
140  819E  20 4F 4E 00     MSG29:   BYTE    ' ON',0
141  81A2  3A 55 73 65 20  MSG30:   BYTE    ':Use Splits',0
142  81AE  20 20 6D 20 4F  MSG31:   BYTE    '  m ON,  m OFF',0
143  81BE  53 74 61 74 69  MSG32:   BYTE    'Station #',0
144  81CB  20 64 61 79 73  MSG33:   BYTE    ' days',0
145  81CE  55 73 65 20 53  MSG34:   BYTE    'Use SAME setting for ',0
146  81E3  20 77 6B 73 00  MSG35:   BYTE    ' wks',0
147  81E8  53 74 61 72 74  MSG36:   BYTE    'Start Time each ON day =',0
148  8201  20 57 61 74 65  MSG37:   BYTE    ' Watering Duration=',0
149  8215  65 76 65 72 79  MSG38:   BYTE    'every ',0
150  821C  4F 44 44 20 40  MSG38A:  byte    'ODD @ ',0
151  8223  45 56 45 4E 40  MSG38B:  byte    'EVEN@ ',0
152  822A  23 20 53 74 6E  MSG39:   BYTE    '# Stns to use?',0
153  8239  53 4B 49 50 00  opt6:    BYTE    'SKIP',0
154  823E  55 53 45 20 00           BYTE    'USE ',0,0
155  8244  45 52 41 53 45  MSG42:   BYTE    'ERASE ALL OLD   History entries',0
156  8264  54 75 72 6E 69  MSG43:   BYTE    'Turning OFF..',0
157  8272  50 72 65 73 73  MSG44:   BYTE    'Press OK for   durations',0
158  828C  41 43 54 49 56  opt4:    BYTE    'ACTIVATE',0
159  8295  44 4F 4E 27 54           BYTE    'DON''T ACTIVATE',0,0
160  82A5  20 41 6C 6C 00  MSG47:   BYTE    ' All',0
161  82AA  45 78 63 6C 75  MSG48:   BYTE    'Excluded Period:',0
```

```
162  B2BB  45 7B 74 72 61  MSG49:   BYTE   'Extra Options:',0
163  B2CA  FF FF 48 49 53  MSG50:   BYTE   $FF,$FF,'HISTORY DONE',$FF,$FF,'Please Wait',0
164
165                                ;ADVANCED OPTIONS
166
167  B2E6  41 55 54 4F 2D  advopt:  BYTE   'AUTO-SPLITS?',0
168  B2F3  45 58 43 4C 55           BYTE   'EXCLUDED PERIOD?',0
169  B304  53 59 52 49 4E           BYTE   'SYRINGE CYCLES? ',0
170  B315  53 4F 41 4B 20           BYTE   'SOAK CYCLES?',0
171  B322  53 50 45 43 49           BYTE   'SPECIAL STARTS? ',0
172  B333  4F 50 54 49 4F           BYTE   'OPTION SETUP OK?',0,0
173
174  B345  44 49 53 41 42  MSG59:   BYTE   'DISABLED',0
175  B34E  45 4E 41 42 4C  MSG60:   BYTE   'ENABLED ',0
176  B357  53 74 6E 20 23  MSG61:   BYTE   'Stn #: ',0
177  B35F  20 53 65 6E 73  MSG62:   BYTE   ' Sensor',0
178  B367  44 72 79 20 4C  MSG63:   BYTE   'Dry Level :    %',0
179  B378  53 6F 61 6B 20  MSG64:   BYTE   'Soak Level:    %',0
180  B389  45 6E 74 65 72  MSG65:   BYTE   'Enter optional  Syringe Cycles',0
181  B3A8  20 20 20 20 20  MSG66:   BYTE   '       ',0
182  B3B1  54 69 6D 65 00  MSG67:   BYTE   'Time',0
183  B3B6  65 76 65 72 79  MSG68:   BYTE   'every    days',0
184  B3C4  52 65 61 6C 6C  MSG69:   BYTE   'Really do    NO WATERING',0
185  B3E0  69 73 20 52 55  MSG70:   BYTE   'is RUNNING',0
186  B3EB  69 73 20 4E 4F  MSG71:   BYTE   'is NOT watering',0
187  B3FB  2A 2A 4C 4F 57  MSG72:   BYTE   'LOW BATTERY in Power Key',0
188  8419  53 74 6E 00     MSG73:   BYTE   'Stn',0
189  841D  C0              MSG74:   BYTE   0
190  841E  2D 2D 00        MSG75:   BYTE   '--',0
191  8421  54 75 72 6E 69  MSG76:   BYTE   'Turning ON...',0
192  842F  54 69 6D 65 20  MSG89:   BYTE   'Time is ',0
193  8438  52 65 70 6C 61  MSG90:   BYTE   'Replace Battery  in Power Key',0
194  8456  52 65 70 65 61  MSG98:   BYTE   'Repeat',0
195  845D  4E 6F 77 20 49  MSG99:   BYTE   'Now Idling..   Remove LEIT key!',0
196  847E  44 61 69 6C 79  MSG101:  BYTE   'Daily #       ,  m. per valve',0
197  849D  50 6F 77 65 72  MSG102:  BYTE   'Power Key in',0
198  84AB  6D 69 6E 2E 00  MSG103:  BYTE   'min.',0
199  84B0  4E 4F 20 57 61  MSG104:  BYTE   'NO Watering ',0
200  84BD  41 6C 6C 20 61  MSG106:  BYTE   'All assigned    Stations OK',0
201  84D9  53 74 6E 20 77  MSG107:  BYTE   'Stn wires OPEN:',0
202  84E9  53 74 6E 20 77  MSG108:  BYTE   'Stn wires SHORT:',0
203  84FA  55 73 65 20 20  MSG109:  BYTE   'Use    Stations',0
204  8509  28 65 78 63 6C  MSG111:  BYTE   '(excluding pump)',0
205  851A  48 45 4C 4C 4F  MSG115:  BYTE   'HELLO!  Press OKto pick options',0
206  853A  4E 6F 77 20 57  MSG116:  BYTE   'Now Watering.. Remove LEIT key!',0
207  855B  54 75 72 6E 20  MSG117:  BYTE   'Turn on valves    min. each?',0
208  8579  54 65 73 74 3A  MSG118:  BYTE   'Test: ',0
209  8580  56 61 6C 76 65  MSG119:  BYTE   'Valve',0
210  8586  4D 61 73 74 65  MSG120:  BYTE   'Master',0
211  858D  53 70 65 63 69  MSG121:  BYTE   'Special',0
212  8595  54 79 70 65 3A  MSG123:  BYTE   'Type: ',0
213  859C  20 20 20 20 20  MSG124:  BYTE   '    System    self-test?',0
214  85B7  41 6E 79 20 76  MSG125:  BYTE   'Any valves ON    are turning OFF',0
215  85D7  56 61 6C 76 65  MSG126:  BYTE   'Valve # ',0
216  85E0  55 73 65 20 53  MSG127:  BYTE   'Use Stn#',0
217  85E9  49 73 20 74 68  MSG128:  BYTE   'Is this OK ',0
218  85F5  55 73 65 20 00  MSG129:  BYTE   'Use ',0
```

| | | | | | |
|---|---|---|---|---|---|
| 219 | 85FA | 44 6F 20 79 6F | MSG130: | BYTE | 'Do you want to delay watering',0 |
| 220 | 8619 | 44 65 6C 61 79 | MSG131: | BYTE | 'Delay watering for    days?',0 |
| 221 | 8636 | 52 75 6E 20 00 | MSG132: | BYTE | 'Run ',0 |
| 222 | 863B | 4F 6E 2C 20 20 | MSG133: | BYTE | 'On,    left',0 |
| 223 | 864A | 3A 20 53 6F 61 | MSG134: | BYTE | ': Soak every   weeks ',0 |
| 224 | 8660 | 73 70 65 63 69 | MSG135: | BYTE | 'special starts?',0 |
| 225 | 8670 | 45 6E 74 65 72 | MSG136: | BYTE | 'Enter new',0 |
| 226 | 867A | 43 68 61 6E 67 | MSG137: | BYTE | 'Change existing',0 |
| 227 | 868A | 54 69 6D 65 20 | MSG139: | BYTE | 'Time between  Syringes=',0 |
| 228 | 86A4 | 20 73 79 72 69 | MSG140: | BYTE | ' syringes at       interval',0 |
| 229 | 86C2 | 45 6E 74 65 72 | MSG141: | BYTE | 'Enter optional  Soak Cycles.',0 |
| 230 | 86DF | 56 69 65 77 20 | MSG142: | BYTE | 'View for       Day = #',0 |
| 231 | 86F7 | 56 69 65 77 20 | MSG143: | BYTE | 'View for       week= #',0 |
| 232 | 870F | 4D 69 64 6E 00 | MSG144: | BYTE | 'Midn',0 |
| 233 | 8714 | 4E 6F 6F 6E 00 | MSG145: | BYTE | 'Noon',0 |
| 234 | 8719 | 3A 20 44 6F 20 | MSG146: | BYTE | ': Do Soak',0 |
| 235 | 8723 | 4E 4F 20 77 61 | MSG147: | BYTE | 'NO watering for ',0 |
| 236 | 8734 | 20 4F 4E 20 00 | MSG148: | BYTE | ' ON ',0 |
| 237 | 8739 | 20 53 59 52 00 | MSG149: | BYTE | ' SYR',0 |
| 238 | 873E | 53 4F 41 4B 00 | MSG150: | BYTE | 'SOAK',0 |
| 239 | 8743 | 53 50 45 43 00 | MSG151: | BYTE | 'SPEC',0 |
| 240 | 8748 | 56 61 6C 76 65 | MSG152: | BYTE | 'Valves:       starting at top',0 |
| 241 | 8768 | 50 72 6F 67 72 | MSG154: | BYTE | 'Program to use:',0 |
| 242 | 877B | 3A 20 6E 6F 74 | MSG155: | BYTE | ': not split (Are you sure?)',0 |
| 243 | 8794 | 45 4E 54 45 52 | opt5: | BYTE | 'ENTER NEW',0 |
| 244 | 879E | 53 45 45 2F 43 | | BYTE | 'SEE/CHANGE',0,0 |
| 245 | 87AA | 4D 4F 52 45 00 | opt9: | BYTE | 'MORE',0 |
| 246 | 87AF | 4E 4F 20 4D 4F | | BYTE | 'NO MORE',0,0 |
| 247 | 87B8 | 4E 6F 6E 65 20 | MSG162: | BYTE | 'None entered   ',0 |
| 248 | 87CB | 53 79 73 74 65 | MSG163: | BYTE | 'System Low',0 |
| 249 | 87D3 | 53 56 4C 20 00 | MSG164: | BYTE | 'SVL ',0 |
| 250 | 87D8 | 4C 20 45 20 49 | MSG165: | BYTE | 'L E I T Key Low',0 |
| 251 | 87E8 | 4C 20 45 20 49 | MSG166: | BYTE | 'L E I T Key Out',0 |
| 252 | 87FB | 4C 20 45 20 49 | MSG167: | BYTE | 'L E I T Key In',0 |
| 253 | 8807 | 53 74 61 72 74 | MSG168: | BYTE | 'Start Watering',0 |
| 254 | 8816 | 48 61 6C 74 20 | MSG169: | BYTE | 'Halt Watering',0 |
| 255 | 8824 | 50 61 73 73 3D | MSG170: | BYTE | 'Pass=',0 |
| 256 | | | | | |
| 257 | 882A | 56 69 65 77 20 | IDopt: | byte | 'View current',0 |
| 258 | 8837 | 4B 65 65 70 20 | | byte | 'Keep current',0 |
| 259 | 8844 | 45 6E 74 65 72 | | byte | 'Enter new',0,0 |
| 260 | 884F | 73 74 61 74 69 | MSG171: | BYTE | 'station IDs?',0 |
| 261 | | | | | |
| 262 | 885C | 43 75 72 72 65 | MSG173: | BYTE | 'Current ID (fromTOP) : ',0 |
| 263 | 8874 | 53 74 6E 20 23 | MSG174: | BYTE | 'Stn #s:      Short # to ID!',0 |
| 264 | 8895 | 53 74 6E 20 23 | MSG175: | BYTE | 'Stn #s:      Is this OK',0 |
| 265 | 88B0 | 53 74 6E 20 23 | MSG175A: | byte | 'Stn #s:      ID pump/master!',0 |
| 266 | 88D0 | 53 63 68 65 64 | MSG176: | BYTE | 'Schedule?',0 |
| 267 | 88DA | 41 73 73 69 67 | MSG177: | BYTE | 'Assign ID #s ',0 |
| 268 | 88EB | FF 57 61 69 74 | MSG179: | BYTE | $FF,'Wait... Saving',0 |
| 269 | 88F8 | 50 72 65 73 73 | MSG180: | BYTE | 'Press OK to see each event',0 |
| 270 | 8913 | 50 72 65 73 73 | MSG181: | BYTE | 'Press OK to    STOP watering',0 |
| 271 | 8931 | 57 61 74 65 72 | MSG182: | BYTE | 'Watering ends  at ',0 |
| 272 | 8945 | 53 6F 61 6B 20 | MSG183: | BYTE | 'Soak Dur=',0 |
| 273 | 894F | 77 69 74 68 20 | MSG184: | BYTE | 'with    # ONs',0 |
| 274 | 895F | 4E 4F 20 53 6F | MSG185: | BYTE | 'NO Soak Cycle  for ',0 |
| 275 | 8974 | 20 53 6F 61 68 | MSG186: | BYTE | ' Soak=',0 |

```
276  B97B  53 79 72 3A 20   MSG187: BYTE   'Syr:        daily in ',0
277  8995  4D 4F 2E 20 42   MSG188: BYTE   'MO. BUDGET %s',0
278  89A3  53 49 54 45 20   MSG189: BYTE   'SITE INFO',0
279  89AD  53 79 72 20 4D   MSG190: BYTE   'Syr Months :',0
280  89BA  20 53 79 72 69   MSG191: BYTE   ' Syringe Duration =  m',0
281  89D3  4E 4F 20 53 79   MSG192: BYTE   'NO Syringes for',0
282
283                                        ;SYSTEM OPTIONS
284
285  89E3  53 79 73 74 65   MSG193: BYTE   'System Options:',0
286  89F3  53 45 54 20 54   sysopt: byte   'SET TIME?',0
287  89FD  55 53 45 20 50           BYTE   'USE PASSWORDS?',0
288  8A0C  43 4F 4D 50 55           BYTE   'COMPUTER ID?',0
289  8A19  53 45 54 20 41           BYTE   'SET ACTIVE PGM?',0
290  8A29  57 49 52 49 4E           BYTE   'WIRING SETUP?',0
291  8A37  4D 4F 4E 54 48           BYTE   'MONTHLY BUDGETS?',0
292  8A48  46 49 4E 49 53           BYTE   'FINISHED?',0,0
293
294  8A53  54 75 72 6E 20   MSG200: BYTE   'Turn #  OFF',0
295  8A60  54 75 72 6E 20   MSG201: BYTE   'Turn #  ON ',0
296  8A6D  47 6F 20 74 6F   MSG202: BYTE   'Go to Stn #  ?',0
297
298                                        ;SET ACTIVE PROGRAM (MSG154)
299  8A7C                   pgmopt:
300  8A7C  4D 41 49 4E 20   MSG203: BYTE   'MAIN PROGRAM',0
301  8A89  41 4C 54 45 52   MSG204: BYTE   'ALTERNATE PROG',0
302  8A98  44 41 49 4C 59   MSG205: BYTE   'DAILY PROGRAM',0,0
303
304  8AA7  53 79 72 69 6E   MSG206: BYTE   'Syringe Period :',0
305  8AB8  50 72 61 63 74   MSG207: BYTE   'Practice Game?',0
306  8AC7  4E 6F 74 68 69   MSG208: BYTE   'Nothing',0
307  8ACF  44 6F 20 20 20   MSG209: BYTE   'Do         ',0
308  8AE0  45 6E 64 20 69   MSG210: BYTE   'End if special  program',0
309  8AF8  44 6F 20 79 6F   MSG211: BYTE   'Do you want     to use splits ',0
310  8B17  4D 61 78 20 4F   MSG212: BYTE   'Max ON/Min OFF:',0
311  8B27  20 53 69 74 65   MSG213: BYTE   ' Site Info',0
312  8B32  55 73 69 6E 67   MSG214: BYTE   'Using Site Info to Auto-split..',0
313  8B52                   teropt:
314  8B52  6C 65 76 65 6C   MSG215: BYTE   'level sand',0
315  8B5D  68 69 6C 6C 79   MSG216: BYTE   'hilly sand',0
316  8B68  6C 65 76 65 6C   MSG217: BYTE   'level loam',0
317  8B73  68 69 6C 6C 79   MSG218: BYTE   'hilly loam',0
318  8B7E  6C 65 76 65 6C   MSG219: BYTE   'level clay',0
319  8B89  68 69 6C 6C 79   MSG220: BYTE   'hilly clay',0,0
320  8B95                   spropt:
321  8B95  66 6C 61 74 20   MSG221: BYTE   'flat sprays',0
322  8BA1  6C 61 77 6E 20   MSG222: BYTE   'lawn sprays',0
323  8BAD  72 6F 74 6F 72   MSG223: BYTE   'rotors/impacts',0
324  8BBC  73 74 72 65 61   MSG224: BYTE   'stream sprays ',0
325  8BCB  6D 69 63 72 6F   MSG225: BYTE   'microsprays',0
326  8BD7  62 75 62 62 6C   MSG226: BYTE   'bubblers',0
327  8BE0  64 72 69 70 20   MSG227: BYTE   'drip emitters ',0,0
328
329  8BF0  55 73 69 6E 67   MSG228: BYTE   'Using Site Info to calculate...',0
330  8C10  61 6C 6C 20 50   MSG229: BYTE   'all Passwords',0
331  8C1E  4E 6F 74 20 73   MSG230: BYTE   'Not split',0
332  8C28  52 75 6E 20 73   MSG232: byte   'Run stations?',0
```

```
333  8C36  45 6E 74 65 72   MSG233: BYTE    'Enter          Password : ',0
334  8C52  46 61 63 74 6F   MSG234: BYTE    'Factory',0
335  8C5A  53 75 70 65 72   MSG235: BYTE    'Supervisor',0
336  8C65  47 61 72 64 65   MSG236: BYTE    'Gardener',0
337  8C6E  48 6F 74 74 65   MSG237: BYTE    'Hottest month: 100% = ',0
338  8C86  4D 6F 6E 74 68   MSG238: BYTE    'Monthly Budget:',0
339  8C96  55 73 65 20 6F   MSG239: BYTE    'Use optional    water budgeting',0
340  8CB6  4E 6F 72 6D 20   MSG240: BYTE    'Norm    = %',0
341  8CC5  42 75 64 67 65   MSG241: BYTE    'Budget to use=',0
342  8CD4  42 75 64 67 65   MSG242: BYTE    'Budget =  % of Normal    = %',0
343  8CF4  42 75 64 67 65   MSG246: BYTE    'Budget type:        budget?',0
344  8D14  4D 4F 4E 54 48   budopt: BYTE    'MONTHLY',0
345  8D1C  20 59 45 41 52           BYTE    ' YEARLY',0,0
346
347                                 ;RUN MENU
348
349  8D25  52 75 6E 20 53   MSG252: BYTE    'Run Schedule:',0
350  8D33  41 55 54 4F 4D   schopt: BYTE    'AUTOMATIC RUN?',0
351  8D42  53 45 4D 49 20           BYTE    'SEMI-AUTO RUN?',0
352  8D51  45 58 49 54 20           BYTE    'EXIT RUN?',0,0
353  8D5C  4B 45 45 50 20   MSG256: BYTE    'KEEP SAME    ',0
354  8D6A  53 45 45 20 4F   MSG257: BYTE    'SEE OR CHANGE',0
355  8D78  53 65 65 20 6F   MSG258: BYTE    'See or change:',0
356  8D87  00               MSG259: BYTE    0
357
358                                 ;DAY CYCLE OPTIONS (SKIP/USE = MSG40-1)
359
360  8D88  20 20 20 20 20   MSG260: BYTE    '     options forWater Day Cycle?',0
361  8DA9  20 20 53 41 4D   opt7:   BYTE    '  SAME',0
362  8DB0  44 49 46 46 45           BYTE    'DIFFERENT',0,0
363  8DBB  20 20 20 20 20   MSG263: BYTE    '        cycle for all stns?',0
364
365  8DD9  53 50 45 43 49   cycopt: BYTE    'SPECIFIC ',0
366  8DE3  53 4F 20 4D 41           BYTE    'SO MANY',0
367  8DEB  4F 4E 4C 59 20           BYTE    'ONLY ODD ',0
368  8DF5  4F 4E 4C 59 20           BYTE    'ONLY EVEN',0,0
369  8E00  20 20 20 20 20   MSG269: BYTE    '        days watering cycle?',0
370
371                                 ;SKIP/USE ADVANCED OPTIONS (MSG40-1)
372
373  8E20  20 20 20 20 20   MSG270: BYTE    '          Extra options?',0
374
375                                 ;SITE INFO
376
377  8E3F  20 20 4B 45 45   opt8:   BYTE    ' KEEP SAME ',0
378  8E4D  53 45 45 20 4F           BYTE    'SEE OR CHANGE',0,0
379  8E5C  20 20 20 20 20   MSG273: BYTE    '          site info?',0
380
381                                 ;SEMI-AUTO DURATIONS
382
383  8E77  53 65 6D 69 2D   MSG275: BYTE    'Semi-Auto Run:',0
384  8E86  4E 4F 52 4D 41   semiopt: BYTE   'NORMAL',0
385  8E8D  20 53 4F 41 4B           BYTE    ' SOAK ',0
386  8E94  20 54 45 53 54           BYTE    ' TEST ',0,0
387  8E9C  20 20 20 20 20   MSG279: BYTE    '        duration?',0
388
389                                 ;RUN OPTIONS (SKIP/USE= MSG40-1)
```

```
390
391   BEAD   20 20 20 20 20   MSG280: BYTE    '          Run options?',0
392   8ECA   52 75 6E 20 4F   MSG281: BYTE    'Run Option:',0
393   BED6   52 45 53 55 4D   resopt: BYTE    'RESUME LAST',0
394   8EE2   20 53 54 41 52           BYTE    ' START NEW ',0,0
395   8EEF   20 20 20 20 20   MSG284: BYTE    '          run?',0
396   8F00   50 72 65 73 73   MSG285: BYTE    'Press OK to see more run options',0
397   8F21   57 41 54 45 52   runopt: BYTE    'WATER BUDGETS? ',0
398   8F31   52 41 49 4E 20           BYTE    'RAIN DELAY?',0
399   8F3D   53 54 4E 53 20           BYTE    'STNS ON/OFF?',0
400   8F4A   41 4C 4C 20 4F           BYTE    'ALL OPTIONS OK?',0,0
401   8F5B   52 45 41 44 59   opt10:  BYTE    'READY',0
402   8F61   4E 4F 54 20 52           BYTE    'NOT READY',0,0
403   8F6C   20 20 20 20 20   MSG292: BYTE    '               to run now?',0
404   8F88   44 4F 4E 45 20   opt3:   BYTE    'DONE WITH',0
405   8F92   52 45 50 45 41           BYTE    'REPEAT ',0,0
406   8F9B   53 4B 49 50 00   opt2:   BYTE    'SKIP',0
407   8FA0   20 44 4F 20 00           BYTE    ' DO ',0,0
408   8FA6   53 63 68 65 64   MSG297: BYTE    'Schedule today:',0
409   8FB6   45 4E 44 49 4E   revopt: BYTE    'ENDING TIME?',0
410   8FC3   4F 4E 20 54 49           BYTE    'ON TIMES?',0
411   8FCD   46 49 4E 49 53           BYTE    'FINISHED?',0,0
412   8FD8   FF 45 6E 64 20   MSG301: BYTE    $FF,'End of starts, Please Wait',0
413   8FF4   44 55 52 41 54   modopt: BYTE    'DURATIONS?',0
414   8FFF   53 54 41 52 54           BYTE    'START TIME?',0
415   900B   44 41 59 20 43           BYTE    'DAY CYCLES?',0
416   9017   45 58 54 52 41           BYTE    'EXTRA OPTIONS?',0
417   9026   4E 4F 54 48 43           BYTE    'NOTHING?',0,0
418
419   9030                    soak_msg:
420   9030   53 6F 61 6B 20           byte    'Soak cycles:',0
421   903D                    no_extra:
422   903D   41 44 44 3F 00           byte    'ADD?',0
423   9042   4E 4F 4E 45 3F           byte    'NONE?',0,0
424   9049                    extra:
425   9049   43 41 4E 43 45           byte    'CANCEL?',0
426   9051   53 45 45 2F 43           byte    'SEE/CHANGE?',0
427   905D   4B 45 45 50 20           byte    'KEEP SAME?',0,0
428
429   9069                    syringe_msg:
430   9069   53 79 72 69 6E           byte    'Syringe cycles:',0
431   9079                    auto_msg:
432   9079   41 75 74 6F 20           byte    'Auto-split:',0
433   9085                    spec_msg:
434   9085   53 70 65 63 69           byte    'Specials:',0
435   908F                    name_msg:
436   908F   43 6F 6D 70 75           byte    'Computer ID:',0
437
438   909C   4D 61 6E 75 61   vmanual: byte   'Manual',0
439
440   90A3   44 4F 4E 27 54   opt11:  byte    'DON''T USE',0
441   90AD   55 53 45 00 00           byte    'USE',0,0
442   90B2   50 75 6D 70 20   MSG100: byte    'Pump relay?',0
443
444   90BE   41 73 73 69 67   assign: byte    'Assign ID',0
445   90C8   54 4F 50 20 54   assign1: byte   'TOP TO BOTTOM?',0
446   90D7   41 54 20 56 41           byte    'AT VALVES?',0,0
```

```
447
448
449
450  90E3                          INCLUDE    JSHMSG.ASM
451
452  90E3  50 72 65 73 73   M1A:   BYTE 'Press OK to',0
453  90EF  20 20 70 6C 61   M1B:   BYTE '  play Game',0
454
455  90FB  57 45 4C 43 4F   MC1A:  BYTE 'WELCOME! please',0
456  910B  20 20 20 20 70   MC1B:  BYTE '    press ',UA,0
457
458  9117                   MC2A:
459  9117  47 52 45 41 54          BYTE    'GREAT! Press ',UA,0
460  9126  77 68 65 6E 20          BYTE    'when it blinks',0,0
461
462  9136  56 45 52 59 20   MC3A:  BYTE 'VERY GOOD! Press',0
463  9147  74 68 65 20 48   MC3B:  BYTE 'the HELP key',0
464
465  9154                   MC3H:
466  9154  47 4F 4F 44 21          BYTE    'GOOD! For each',0
467  9163  6F 66 20 31 30          BYTE    'of 10 questions',0
468  9173  63 68 6F 6F 73          BYTE    'choose the',0
469  917E  63 6F 72 72 65          BYTE    'correct answer',0
470  918D  66 72 6F 6D 20          BYTE    'from the options',0
471  919E  70 72 65 73 65          BYTE    'presented by',0
472  91AB  70 72 65 73 73          BYTE    'pressing ',UA,' or ',DA,0
473  91BB  26 20 74 68 65          BYTE    '& then press OK',0,0
474
475  91CC  43 6F 6C 6F 72   Q1A:   BYTE 'Color of sky:',0
476
477  91DA  20 20 52 45 44   Q1M:   BYTE ' RED',0,' BLUE',0,'GREEN',0,'WHITE',0,'YELLOW',0,0
478
479  91FA  4E 6F 2C 20 74   Q1IA:  BYTE 'No, try again',0,0
480
481  9209  47 72 65 61 74   Q1CA:  BYTE 'Great,',0
482  9210  6C 65 74 27 73          BYTE 'let''s continue',0,0
483
484  9220  4D 6F 6E 74 68   Q2A:   BYTE 'Months in year:',0
485
486                         Q2H:                          ; HELP FOR ENTERING NUMBERS.
487  9230
488  9230  4E 6F 2C 20 74   Q2IA:  BYTE 'No, try again',0,0
489
490  923F  47 72 65 61 74   Q2CA:  BYTE 'Great,',0
491  9246  6C 65 74 27 73          BYTE 'let''s continue',0,0
492
493  9256  50 69 63 6B 20   Q3A:   BYTE 'Pick correct #',0
494  9265  66 72 6F 6D 20   Q3B:   BYTE 'from 1-100 :',0
495
496  9272  48 69 6E 74 3A   Q3H:   BYTE 'Hint: number =',0
497  9281  43 61 6C 69 66          BYTE 'Calif speed lim',0,0
498
499  9292  4E 6F 2C 20 74   Q3IA:  BYTE 'No, try again',0,0
500
501  92A1  47 72 65 61 74   Q3CA:  BYTE 'Great,',0
502  92A8  6C 65 74 27 73          BYTE 'let''s continue',0,0
503
```

```
504   92BB  4D 6F 72 6E 69   Q4A:    BYTE 'Morning @ 15min',0
505
506   92CB  70 61 73 74 20   Q4B:    BYTE 'past ·7 =',0,0
507
508                          Q4H:                              ; HELP FOR ENTERING TIME
509
510   92D2  4E 6F 2C 20 74   Q4IA:   BYTE 'No, try again',0,0
511
512   92E1  47 72 65 61 74   Q4CA:   BYTE 'Great,',0
513   92E8  6C 65 74 27 73           BYTE 'let''s continue',0,0
514   92FB
515   92FB  23 20 6F 66 20   Q5A:    BYTE '# of min in half',0
516
517   9309  68 6F 75 72 20   Q5B:    BYTE 'hour = ',0,0
518
519                          Q5H:                              ;HELP FOR ENTERING DURATIONS
520
521   9312  4E 6F 2C 20 74   Q5IA:   BYTE 'No, try again',0,0
522
523   9321  47 72 65 61 74   Q5CA:   BYTE 'Great,',0
524   9328  6C 65 74 27 73           BYTE 'let''s continue',0,0
525
526   9338  53 6F 69 6C 20   Q6A:    BYTE 'Soil @ beach :',0
527
528   9347  4C 45 56 45 4C   Q6M:    BYTE 'LEVEL SAND',0,'HILLY SAND',0,'LEVEL LOAM',0
529   9368  48 49 4C 4C 59           BYTE 'HILLY LOAM',0,'LEVEL CLAY',0,'HILLY CLAY',0,0
530
531   938A  4E 6F 2C 20 74   Q6IA:   BYTE 'No, try again',0,0
532
533   9399  47 72 65 61 74   Q6CA:   BYTE 'Great,',0
534   93A0  6C 65 74 27 73           BYTE 'let''s continue',0,0
535
536   93B0  53 65 74 20 50   Q7A:    BYTE 'Set PASSWORD =',0
537.
538   93BF  57 49 4E 20 3A   Q7B:    BYTE 'WIN : ',0,0
539
540   93C7  4E 6F 2C 20 74   Q7IA:   BYTE 'No, try again',0,0
541
542   93D6  47 72 65 61 74   Q7CA:   BYTE 'Great,',0
543   93DD  6C 65 74 27 73           BYTE 'let''s continue',0,0
544
545   93ED  53 65 74 20 74   Q8A:    BYTE 'Set time = noon',0
546   93FD  54 75 65 20 4A           BYTE 'Tue Jul 4, ''89',0,0
547
548   940D  4E 6F 2C 20 74   Q8IA:   BYTE 'No, try again',0,0
549
550   941C  47 72 65 61 74   Q8CA:   BYTE 'Great,',0
551   9423  6C 65 74 27 73           BYTE 'let''s continue',0,0
552   9433
553   9433  53 4F 4C 41 54   Q9A:    BYTE 'SOLATROL''s city:',0
554
555   9444  20 20 20 53 59   Q9M:    BYTE '   SYDNEY',0,' JERSEY CITY',0,' SAN DIEGO',0
556   9467  20 20 20 42 4F           BYTE '   BOSTON',0,'PALM SPRINGS',0,0
557
558                          Q9H:                              ; HELP FOR SELECTING OPTIONS
559
560   947F  4E 6F 2C 20 74   Q9IA:   BYTE 'No, try again',0,0
```

```
561
562   948E   47 72 65 61 74   Q9CA:    BYTE 'Great;',0
563   9495   6C 65 74 27 73            BYTE 'let''s continue',0,0
564
565   94A5   54 68 65 20 4C   Q10A:    BYTE 'The LEIT 8000 is :',0
566
567   94BB   45 4E 45 52 47   Q10M:    BYTE 'ENERGY EFFICIENT',0,'EASY TO INSTALL ',0
568   94DA   20 46 45 41 54            BYTE ' FEATURE-LOADED ',0,'EASY TO PROGRAM ',0
569   94FC   41 4C 4C 20 4F            BYTE 'ALL OF THE ABOVE',0,0
570
571                            Q10H:                        ;HELP FOR SELECTING OPTIONS
572
573   950E   .. .. 61 74 27   Q10IA:   BYTE 'That''s true, but',0
574   951F   69 74 27 73 20            BYTE 'it''s more!',0,0
575
576   952B   47 72 65 61 74   Q10CA:   BYTE 'Great,',0
577   9532   74 68 61 74 27            BYTE 'that''s it!',0,0
578
579   953E   54 69 6D 65 20   msgtime: BYTE    'Time is ',0
580
581   9547   59 6F 75 72 20   MSGL1:   BYTE 'Your Level is:',0
582   9556   20 20 20 45 58            BYTE '   EXPERT',0,0
583
584   9561   59 6F 75 72 20   MSGL2:   BYTE 'Your Level is:',0
585   9570   50 52 4F 46 45            BYTE 'PROFESSIONAL',0,0
586
587   957E   59 6F 75 72 20   MSGL3:   BYTE 'Your Level is:',0
588   958D   49 4E 54 45 52            BYTE 'INTERMEDIATE',0,0
589
590   959B   59 6F 75 72 20   MSGL4:   BYTE 'Your Level is:',0
591   95AA   20 20 20 4E 4F            BYTE '   NOVICE',0,0
592
593   95B5                    options:
594   95B5   56 69 65 77 20            BYTE 'View options by',0
595   95C5   70 72 65 73 73            BYTE 'pressing ',6,' or ',7,',',0
596   95D6   74 68 65 6E 20            BYTE 'then pick one',0
597   95E4   62 79 20 70 72            BYTE 'by pressing OK.',0,0
598
599   95F5                    numbers:
600   95F5   57 68 65 6E 20            BYTE 'When the display',0
601   9606   62 6C 69 6E 6B            BYTE 'blinks words or',0
602   9616   6E 75 6D 62 65            BYTE 'numbers, press',0
603   9625   06 20 6F 72 20            BYTE '',6,' or ',7,' to see',0
604   9633   61 6C 6C 20 6F            BYTE 'all options,',0
605   9640   74 68 65 6E 20            BYTE 'then press OK',0
606   964E   74 6F 20 70 69            BYTE 'to pick one.',0
607   965B   48 4F 4C 44 49            BYTE 'HOLDING DOWN',0
608   9668   74 68 65 20 07            BYTE 'the ',7,' or ',6,' keys',0
609   9678   63 61 75 73 65            BYTE 'causes the',0
610   9683   6F 70 74 69 6F            BYTE 'options to',0
611   968E   63 68 61 6E 67            BYTE 'change rapidly.',0,0
612
613   969F                    help:
614   969F   50 72 65 73 73            BYTE 'Press HELP to',0
615   96AD   67 65 74 20 6D            BYTE 'get more info.',0,0
616
617   96BD                    password:
```

```
618   96BD  55 73 65 20 61        BYTE 'Use arrow keys',0
619   96CC  74 6F 20 63 68        BYTE 'to change each',0
620   96DB  62 6C 69 6E 6B        BYTE 'blinking letter',0
621   96EB  74 68 65 6E 20        BYTE 'then press OK.',0,0
622
623   96FB              duration:
624   96FB  53 65 74 20 68        BYTE 'Set hours (h),',0
625   970A  70 72 65 73 73        BYTE 'press OK, then',0
626   9719  73 65 74 20 6D        BYTE 'set minutes (m),',0
627   972A  26 20 68 69 74        BYTE '& hit OK again.',0,0
628
629   973B              time:
630   973B  53 65 74 20 63        BYTE 'Set correct hour',0
631   974C  26 20 70 72 65        BYTE '& press OK.',0
632   9758  54 68 65 6E 20        BYTE 'Then set minutes',0
633   9769  26 20 6B 69 74        BYTE '& hit OK again.',0,0
634
635   977A              timedate:
636   977A  53 65 74 20 63        BYTE 'Set correct hour,',0
637   978C  6D 69 6E 75 74        BYTE 'minute, day,',0
638   9799  6D 6F 6E 74 68        BYTE 'month, date, &',0
639   97AB  79 65 61 72 20        BYTE 'year by using',0
640   97B6  74 68 65 20 07        BYTE 'the ',7,', ',6,', & OK',0
641   97C5  6B 65 79 73 20        BYTE 'keys as usual.',0,0
642
643   97D5  4D 6F 6E 69 74  QU1A:   BYTE 'Monitor Mode:',0
644
645   97E3  43 68 61 6E 67  QU1M:   BYTE 'Change Address',0,'Review/Modify',0,'    Exit',0,0
646
647   980A  20 20 59 6F 75  mon:    BYTE '  You are in',0
648   9817  20 74 68 65 20          BYTE ' the Monitor!',0,0
649
650   9826              QU1B:
651   9826  42 61 73 65 20        BYTE 'Base Address:',0
652
653   9834              hexword:
654   9834  65 6E 74 65 72        BYTE 'enter a hex',0
655   9840  61 64 64 72 65        BYTE 'address here',0,0
656
657   984E              rev:
658   984E  20 20 72 65 76        BYTE '  review       ',0
659
660   985F              mod:
661   985F  20 20 20 20 20        BYTE '         modify',0
662
663
664
665
666   9870                      INCLUDE   HELP.ASM
667                         ;----------------------------------
668                         ;   HELP MESSAGES
669                         ;----------------------------------
670   9870
671   9870  54 68 69 73 20  not_avail:   byte  'This feature not',0
672   9881  79 65 74 20 61               byte  'yet available.',0,0
673
674   9891  54 68 65 72 65  no_stations: byte  'There are',0
```

```
675   989B   6C 65 73 73 20                   byte    'less vires',0
676   98A6   74 68 61 6E 20                   byte    'than there',0
677   98B1   61 72 65 20 73                   byte    'are stations.',0,0
678
679   98C0   4E 6F 20 77 61    no_schedule:   byte    'No watering',0
680   98CC   66 6F 72 20 74                   byte    'for today.',0,0
681
682
683
684                            ;--------------------------------
685                            ; HELP MESSAGES  31 MAR 89
686                            ;--------------------------------
687
688   98D8   56 69 65 77 20    MainOptHELP:   BYTE    'View options by',0
689   98E8   70 72 65 73 73                   BYTE    'pressing ',UA,' or ',DA,',',0
690
691   98F9   74 68 65 6E 20                   BYTE    'then pick one',0
692   9907   62 79 20 70 72                   BYTE    'by pressing OK.',0,0
693
694   991B   45 4E 54 45 52    EnterSchHELP:  BYTE    'ENTER SCHEDULE',0
695   9927   6C 65 74 73 20                   BYTE    'lets you enter',0
696
697   9936   4D 41 49 4E 2C                   BYTE    'MAIN, ALTERNATE,',0
698   9947   6F 72 20 44 41                   BYTE    'or DAILY',0
699
700   9950   53 43 48 45 44                   BYTE    'SCHEDULES to',0
701   995D   74 65 6C 6C 20                   BYTE    'tell the',0
702
703   9966   43 6F 6D 70 75                   BYTE    'Computer when',0
704   9974   61 6E 64 20 68                   BYTE    'and how to run',0
705
706   9983   65 61 63 68 20                   BYTE    'each valve or',0
707   9991   73 74 61 74 69                   BYTE    'station.',0,0
708
709   999B   52 55 4E 20 53    RunSchedHELP:  BYTE    'RUN SCHEDULE',0
710   99A8   6C 65 74 73 20                   BYTE    'lets you START',0
711
712   99B7   4E 45 57 20 41                   BYTE    'NEW AUTO RUN,',0
713   99C5   52 45 53 55 4D                   BYTE    'RESUME PREVIOUS',0
714
715   99D5   41 55 54 4F 20                   BYTE    'AUTO RUN, or',0
716   99E2   53 54 41 52 54                   BYTE    'START SEMI-AUTO',0,0
717
718   99F3   4D 41 4E 55 41    ManualHELP:    BYTE    'MANUAL RUN lets',0
719   9A03   79 6F 75 20 72                   BYTE    'you run valves',0
720
721   9A12   6F 6E 65 20 61                   BYTE    'one at a time,',0
722   9A21   69 6E 20 67 72                   BYTE    'in groups, or',0
723
724   9A2F   69 6E 20 61 20                   BYTE    'in a defined',0
725   9A3C   54 45 53 54 20                   BYTE    'TEST SEQUENCE.',0,0
726
727   9A4C   4E 4F 20 57 41    IdleHELP:      BYTE    'NO WATERING will',0
728   9A5D   6F 63 63 75 72                   BYTE    'occur if you OK',0
729
730   9A6D   22 4E 4F 20 57                   BYTE    '"NO WATERING?"',0
731   9A7C   54 68 65 20 43                   BYTE    'The Computer',0
```

```
732
733   9A89  77 69 6C 6C 20              BYTE    'will keep your',0
734   9A98  73 63 68 65 64              BYTE    'schedules, but',0
735
736   9AA7  6E 6F 74 20 72              BYTE    'not run them.',0,0
737
738   9AB6  53 45 54 55 50   SystemHELP: BYTE   'SETUP SYSTEM',0
739   9AC3  6C 65 74 73 20              BYTE    'lets you set up',0
740
741   9AD3  74 68 65 20 53              BYTE    'the SYSTEM to',0
742   9AE1  66 69 74 20 79              BYTE    'fit your site &',0
743
744   9AF1  73 70 65 63 69              BYTE    'specific needs.',0,0
745
746   9B02  56 49 45 57 20   InfoHELP:   BYTE   'VIEW INFO lets',0
747   9B11  79 6F 75 20 73              BYTE    'you see HISTORY',0
748
749   9B21  65 76 65 6E 74              BYTE    'events by date,',0
750   9B31  6F 72 20 73 65              BYTE    'or see DAILY',0
751
752   9B3E  53 43 48 45 44              BYTE    'SCHEDULES of all',0
753   9B4F  77 61 74 65 72              BYTE    'watering starts',0
754
755   9B5F  62 79 20 73 74              BYTE    'by station for',0
756   9B6E  61 6E 79 20 63              BYTE    'any chosen day.',0,0
757
758   9B7F  45 4E 54 45 52   EnterNewHELP: BYTE 'ENTER NEW lets',0
759   9B8E  79 6F 75 20 65              BYTE    'you enter a new',0
760
761   9B9E  77 61 74 65 72              BYTE    'watering program',0
762   9BAF  77 69 74 68 20              BYTE    'with or without',0
763
764   9BBF  76 61 72 69 6F              BYTE    'various EXTRA',0
765   9BCD  4F 50 54 49 4F              BYTE    'OPTIONS.',0,0
766
767   9BD7  53 45 45 2F 43   ChangeProgHELP: BYTE 'SEE/CHANGE lets',0
768   9BE7  79 6F 75 20 72              BYTE    'you review all',0
769
770   9BF6  63 75 72 72 65              BYTE    'current settings',0
771   9C07  6F 72 20 63 68              BYTE    'or change some,',0
772
773   9C17  6F 72 20 61 6C              BYTE    'or all of them.',0,0
774
775   9C28  53 45 54 20 54   TimeSetHELP: BYTE  'SET TIME/DATE',0
776   9C36  6C 65 74 73 20              BYTE    'lets you see or',0
777
778   9C46  63 68 61 6E 67              BYTE    'change the time',0
779   9C56  26 20 64 61 74              BYTE    '& date setting.',0,0
780
781   9C67  41 55 54 4F 4D   AutoRunHELP: BYTE  'AUTOMATIC RUN',0
782   9C75  74 75 72 6E 73              BYTE    'turns valves on',0
783
784   9C85  26 20 6F 66 66              BYTE    '& off according',0
785   9C95  74 6F 20 74 68              BYTE    'to the watering',0
786
787   9CA5  73 63 68 65 64              BYTE    'schedule & RUN',0
788   9CB4  4F 50 54 49 4F              BYTE    'OPTIONS used.',0,0
```

```
789
790   9CC3   53 45 4D 49 2D   SemiAutoHELP   BYTE   'SEMI-AUTO RUN',0
791   9CD1   6C 65 74 73 20                  BYTE   'lets you do a',0
792
793   9CDF   4F 6E 65 2D 54                  BYTE   'One-Time Soak,',0
794   9CEE   54 65 73 74 20                  BYTE   'Test Sequence,',0
795
796   9CFD   6F 72 20 4E 6F                  BYTE   'or Normal water',0
797   9D0D   63 79 63 6C 65                  BYTE   'cycle before',0
798
799   9D1A   72 65 76 65 72                  BYTE   'reverting to',0
800   9D27   41 55 54 4F 4D                  BYTE   'AUTOMATIC RUN.',0,0
801
802   9D37   50 72 65 73 73   ExitRunHELP:   BYTE   'Press OK if you',0
803   9D47   64 6F 20 4E 4F                  BYTE   'do NOT want to',0
804
805   9D56   73 74 61 72 74                  BYTE   'start new AUTO',0
806   9D65   6F 72 20 53 45                  BYTE   'or SEMI-AUTO',0
807
808   9D72   72 75 6E 2E 20                  BYTE   'run. Old run',0
809   9D80   77 69 6C 6C 20                  BYTE   'will resume',0
810
811   9D8C   61 75 74 6F 6D                  BYTE   'automatically',0
812   9D9A   77 68 65 6E 20                  BYTE   'when LEIT Key',0
813
814   9DAB   69 73 20 72 65                  BYTE   'is removed!',0,0
815
816   9DB5   54 68 65 20 74   ManStnsHELP:   BYTE   'The top line',0
817   9DC2   73 68 6F 77 73                  BYTE   'shows whether',0
818
819   9DD0   73 74 61 74 69                  BYTE   'stations are ON',0
820   9DE0   28 6E 75 6D 62                  BYTE   '(number shown)',0
821
822   9DEF   6F 72 20 4F 46                  BYTE   'or OFF (-). ',0
823   9DFC   47 6F 20 74 6F                  BYTE   'Go to the',0
824
825   9E06   4E 45 58 54 20                  BYTE   'NEXT station by',0
826   9E16   70 72 65 73 73                  BYTE   'pressing ',UA,' key.',0,0
827
828   9E27   54 45 53 54 20   TestSeqHELP:   BYTE   'TEST SEQUENCE',0
829   9E35   6C 65 74 73 20                  BYTE   'lets you turn',0
830
831   9E43   61 6C 6C 20 61                  BYTE   'all active stns',0
832   9E53   4F 4E 20 66 6F                  BYTE   'ON for 1 to 30',0
833
834   9E62   6D 69 6E 75 74                  BYTE   'minutes each in',0
835   9E72   73 65 71 75 65                  BYTE   'sequence.',0,0
836
837   9E7D   50 72 65 73 73   FinishedHELP:  BYTE   'Press OK if you',0
838   9E8D   61 72 65 20 46                  BYTE   'are FINISHED',0
839
840   9E9A   75 73 69 6E 67                  BYTE   'using MANUAL',0
841   9EA7   52 55 4E 2E 00                  BYTE   'RUN.',0,0
842
843   9EAD   53 45 54 20 50   PasswordsHELP: BYTE   'SET PASSWORDS',0
844   9EBB   6C 69 6D 69 74                  BYTE   'limits who may',0
845
```

```
846  9ECA  6B 61 76 65 20           BYTE  'have access to',0
847  9ED9  74 68 65 20 43           BYTE  'the Computer.',0,0
848
849  9EEB  43 4F 4D 50 55  ComputIDHELP:      BYTE  'COMPUTER ID',0
850  9EF4  6C 65 74 73 20           BYTE  'lets you enter',0
851
852  9F03  6F 72 20 73 65           BYTE  'or see a name or',0
853  9F14  49 44 20 6E 75           BYTE  'ID number for',0
854
855  9F22  74 68 69 73 20           BYTE  'this individual',0
856  9F32  43 6F 6D 70 75           BYTE  'Computer.',0,0
857
858  9F3D  41 43 54 49 56  ActivePgmHELP:     BYTE  'ACTIVE PGM lets',0
859  9F4D  79 6F 75 20 6D           BYTE  'you make either',0
860
861  9F5D  4D 41 49 4E 2C           BYTE  'MAIN, ALTERNATE',0
862  9F6D  6F 72 20 44 41           BYTE  'or DAILY your',0
863
864  9F7B  61 63 74 69 76           BYTE  'active watering',0
865  9F8B  70 72 6F 67 72           BYTE  'program.',0,0
866
867  9F95  57 49 52 49 4E  WiringHELP:        BYTE  'WIRING SETUP',0
868  9FA2  6C 65 74 73 20           BYTE  'lets you check',0
869
870  9FB1  77 69 72 69 6E           BYTE  'wiring, specify',0
871  9FC1  6E 75 6D 62 65           BYTE  'number of stns',0
872
873  9FD0  74 6F 20 75 73           BYTE  'to use, specify',0
874  9FE0  61 20 70 75 6D           BYTE  'a pump relay,',0
875  9FEE
876  9FEE  6F 72 20 63 68           BYTE  'or change valve',0
877  9FFE  49 44 20 23 73           BYTE  'ID #s without',0
878
879  A00C  73 77 69 74 63           BYTE  'switching wires.',0,0
880
881  A01E  4D 4F 4E 54 48  MoBudHELP:         BYTE  'MONTHLY BUDGETS',0
882  A02E  6C 65 74 73 20           BYTE  'lets you enter',0
883
884  A03D  68 6F 74 74 65           BYTE  'hottest month',0
885  A04B  66 6F 72 20 79           BYTE  'for your area,',0
886
887  A05A  26 20 73 65 65           BYTE  '& see or change',0
888  A06A  74 68 65 20 73           BYTE  'the system',0
889
890  A075  77 61 74 65 72           BYTE  'water budgets',0
891  A083  66 6F 72 20 65           BYTE  'for each month.',0,0
892
893
894  A094  50 72 65 73 73  OKSysHELP:         BYTE  'Press OK when',0
895  A0A2  79 6F 75 20 61           BYTE  'you are DONE',0
896
897  A0AF  75 73 69 6E 67           BYTE  'using SETUP',0
898  A0BB  53 59 53 54 45           BYTE  'SYSTEM.',0,0
899
900  A0C4  44 41 49 4C 59  DailySchedHELP:    BYTE  'DAILY SCHEDULE',0
901  A0D3  73 68 6F 77 73           BYTE  'shows today''s',0
902
```

```
903  A0E1  45 4E 44 49 4E              BYTE    'ENDING TIME &',0
904  A0EF  61 6C 6C 20 73              BYTE    'all scheduled',0
905
906  A0FD  76 61 6C 76 65              BYTE    'valve ON times',0
907  A10C  26 20 64 75 72              BYTE    '& durations.',0,0
908
909  A11A  45 56 45 4E 54  HistoryHELP:   BYTE    'EVENT HISTORY',0
910  A128  73 68 6F 77 73              BYTE    'shows the last',0
911
912  A137  31 32 38 20 70              BYTE    '128 programming',0
913  A147  26 20 76 61 6C              BYTE    '& valve events.',0,0
914
915  A158  50 72 65 73 73  InfoDoneHELP:          BYTE    'Press OK when',0
916  A166  44 4F 4E 45 20              BYTE    'DONE using VIEW',0
917
918  A176  49 4E 46 4F 2E              BYTE    'INFO.',0,0
919
920  A17D  50 72 65 73 73  ConfirmHELP:   BYTE    'Press OK to KEEP',0
921  A18E  74 68 69 73 20              BYTE    'this setting,',0
922
923  A19C  6F 72 20 70 72              BYTE    'or press ',DA,' or ',UA,'',0
924  A1AC  74 6F 20 43 48              BYTE    'to CHANGE it.',0
925
926  A1BA  41 73 6B 20 61  none:          BYTE    'Ask a SOLATROL',0
927  A1C9  53 61 6C 65 73              BYTE    'Sales Rep for',0
928
929  A1D7  48 45 4C 50 20              BYTE    'HELP on this',0
930  A1E4  66 65 61 74 75              BYTE    'feature.',0,0
931
932
933
934
935
936                      GLOBALS OFF
937
938
939                      ;--------------------------------
940                      ;    bank switching
941                      ;--------------------------------
942
943  FFE0                ORG     $FFE0
944
945                      from_bank0:              ; (this code never executes)
946  FFE0  78              sei                    ;
947  FFE1  48              pha                    ;
948  FFE2  A9 10           lda     #00010000b     ;
949  FFE4  85 1D           sta     E2             ;
950  FFE6  68              pla                    ; entry point into this bank
951  FFE7  4C 00 80        jmp     message_xfer   ;A,X,Y still intact
952  FFEA
953  FFEA                to_bank0:
954  FFEA  64 1D           stz     E2
955  FFEC  58              cli                    ; (this code never executes)
956  FFED  60              rts                    ;
957
958                      ;--------------------------------
959                      ;    vectors
```

```
360                        ;---------------------------------
361                                          .            ;never happens here
362
363  FFEE                           END Lines Assembled :  963           Assembly Errors :  0

1                               TITLE   'Library routines for LEIT 8000'
2
3                          ;    by Dennis Kaiser & John S. Houston
4                          ;    SOLATROL, Inc.
5                          ;    San Diego, CA,  10 Mar 89
6
7                          ;    Code for the 65C02 processor
8                          ;    Clock speed 455 KHz, cycle time 2.2 microseconds
9
10   0000                         CHIP         65C02
11                                 MACLIST      OFF
12                                 ASCLIST      OFF
13
14   0000                          INCLUDE      LEQUATES.ASM
15                         ;----------------------------------------
16                         ;    library routine equates
17                         ;----------------------------------------
18
19                         ;EQUATES
20
21         0001            okkey          equ    1            ;keys from key manager
22         0002            helpkey        equ    2
23         0003            upkey          equ    3
24         0004            downkey        equ    4
25         0013            STATUS2        equ    $13
26
27                         ;RAM
28   0000                        PAGE0
29   00A0                        ORG     $A0                  ;zero page variables, $A0-$BF
30
31                                                            ;history pointers
32   00A0            hwrite0        ds     2            ;write bank 0
33   00A2            hread0         ds     2            ;read bank 0
34   00A4            hwrite1        ds     2            ;write bank 1
35   00A6            hread1         ds     2            ;read bank 1
36   00A8            hwrite2        ds     2            ;write bank 2
37   00AA            hread2         ds     2            ;read bank 2
38
39   00AC            base_address:  ds     2            ;monitor
40
41                                                            ;field manager
42   00AE            msgptr         ds     2            ;16 bit message pointer
43   00B0            scratch    -   ds     15           ;misc storage
44
45
46   0000                          DATA
47   0500                          ORG     $500               ;library ram, non-zero page, $500-$9FF
```

```
 48
 49    C300                 retadr       ds       2
 50
 51    C302                 history0     ds       768     ;history bank 0 (96*8)
 52           07FA          history0_end equ      $-8
 53    C600                 history1     ds       128     ;history bank 1 (16*8)
 54           087A          history1_end equ      $-8
 55    0882                 history2     ds       128     ;history bank 2 (16*8)
 56           08FA          history2_end equ      $-8
 57
 58                                                       ;game ram
 59    0902                 game_active: ds       1       ;game in progress flag
 60    0903                 second_count:ds       1       ;five second period counter
 61    0904                 level_count: ds       1       ;game timer used for level
 62                                                       ;determination
 63    0905                 temp         ds       1
 64
 65                                                       ;monitor ram
 66    0906                 temp_word:   ds       2
 67    0908                 temp_byte:   ds       1
 68    0909                 high_nibble: ds       1
 69    090A                 low_nibble:  ds       1
 70    090B                 mon_refresh: ds       1
 71    090C                 nibble       ds       1
 72
 73                                                       ;field manager
 74    090D                 option_list  ds       25*2    ;list of messages for field mgr
 75    093F                 len_list     ds       25      ;list of msg lengths
 76    0958                 fscratch     ds       4       ;scratch area
 77
 78                                                       ;help manager
 79    095C                 helplist     ds       40      ;list of screen addresses for help
 80    0984                 helpram      ds       2       ;temp storage for help
 81    0986                 video_store  ds       66      ;save old video
 82
 83
 84                  ;EXTERNAL REFERENCES
 85
 86                         XREF    DKCLR, GETKEY
 87                         XREF    R9_bindec
 88                         XREF    R2_repeat_rate
 89                         XREF    R1_blink_init
 90                         XREF    DAYTBL
 91                         XREF    get_time, get_duration
 92                         XREF    ENTER_CODE3, DISPTIME
 93                         XREF    display_bank1
 94                         XREF    get_option_bank1
 95                         XREF    help_bank1
 96
 97                  ;messages used by the game
 98
 99                         XREF    none
100                         XREF    M1A,M1B,MC1A,MC1B,MC2A,MC3A,MC3B,MC3H
101                         XREF    Q1A,Q1H,Q1IA,Q1CA,Q2A,Q2H,Q2IA,Q2CA
102                         XREF    Q3A,Q3B,Q3H,Q3IA,Q3CA,Q4A,Q4B,Q4H,Q4IA,Q4CA
103                         XREF    Q5A,Q5B,Q5H,Q5IA,Q5CA,Q6A,Q6H,Q6IA,Q6CA
104                         XREF    Q7A,Q7B,Q7IA,Q7CA,Q8A,Q8IA,Q8CA
```

```
105                    XREF    Q9A,Q9M,Q9H,Q9IA,Q9CA,Q10A,Q10M
106                    XREF    Q10H,Q10IA,Q10CA,msgtime
107                    XREF    MS6L1,MS6L2,MS6L3,MS6L4
108                    XREF    options,numbers,help,password,duration
109                    XREF    time,timedate
110
111            ;messages used by the monitor
112
113                    XREF    QU1A,QU1M,QU1B,mon,hexword,rev,mod
114
115
116
117
118
119  09CB                      INCLUDE    GLOBALS.ASM
120            ;global equates
121            ;---------------
122       0000   FALSE         equ       $00
123       000F   TRUE          equ       $0F
124
125
126  09CB                      DATA
127  0200                      ORG        $0200    ;global ram variables
128
129            ;----------------------------------
130                                               ;these are global variables
131  0200      cksum         ds    1              ;result of ram checksum
132  0201      hour          ds    1              ;real time clock
133  0202      minute        ds    1
134  0203      dow           ds    1
135  0204      month         ds    1
136  0205      day           ds    1
137  0206      year          ds    1
138  0207      dim           ds    1              ;number of days in the month
139  0208      ad            ds    16             ;16 bytes of AD readings
140  0218      char_index    ds    1              ;screen location
141  0219      video         ds    32             ;video ram, characters
142  0239      attribute     ds    32             ;video ram, attributes
143  0259      cursor        ds    2              ;cursor position & attributes
144  025B      IBFR          ds    10             ;input buffer
145                                               ;use to pass params between modules
146                                               ;where stack passing doesn't exist
147
148  0265      hbfr          ds    8              ;history buffer for storage/retrieval
149
150            ;----------------------------------
151
152
153
154
155  026D                      -INCLUDE   MACROS.ASM
156            ;----------------------------------
157            ;       MACROS
158            ;----------------------------------
159
160            DBLW:   MACRO    A0               ;multiply word by 2
161                    CLC
```

```
162             ROL     A0
163             ROL     A0+1
164             ENDM
165
166     DBL:    MACRO   A0              ;multiply byte by 2
167             CLC
168             ROL     A0
169             ENDM
170
171     DBLX:   MACRO                   ;multiply index by 2
172             PHA
173             TXA
174             ASL     A
175             TAX
176             PLA
177             ENDM
178
179
180     RTC_PULSE: MACRO                ;check for RTC timeout
181             LDA     STATUS1
182             AND     #00010000B
183             ENDM
184
185     set:    MACRO   A0              ;store a 1 to memory
186             LDA     #1
187             STA     A0
188             ENDM
189     SET:    MACRO   A0              ;store a 1 to memory
190             LDA     #1
191             STA     A0
192             ENDM
193
194     near_msg: macro a0              ;display msg resident in bank 0
195             lda     #>a0
196             ldy     #<a0
197             jsr     display_msg
198             endm
199
200     MESSAGE: macro a0               ;display msg resident in bank 1
201             lda     #>a0
202             ldy     #<a0
203             jsr     display_bank1
204             endm
205
206     SET_CURSOR: macro    a0         ;move char_index to address
207             lda     #a0
208             sta     char_index
209             endm
210
211     BACKUP: macro   a0              ;backup cursor
212             lda     char_index
213             sec
214             sbc     #a0
215             sta     char_index
216             endm
217
218     SKIP:   macro   a0              ;move cursor ahead
```

```
219              lda     char_index
220              clc
221              adc     #a0
222              sta     char_index
223              endm
224
225     blt:     MACRO   A0              ;branch if A<M
226              BCC     A0
227              ENDM
228     BLT:     MACRO   A0              ;branch if A<M
229              BCC     A0
230              ENDM
231
232     bge:     MACRO   A0              ;branch if A>=M
233              BCS     A0
234              ENDM
235     BGE:     MACRO   A0              ;branch if A>=M
236              BCS     A0
237              ENDM
238
239     ADD16:   MACRO   A0,A1,A2        ;A2=A0+A1, 16 bits
240              CLC
241              LDA     A0
242              ADC     A1
243              STA     A2
244              LDA     A0+1
245              ADC     A1+1
246              STA     A2+1
247              ENDM
248
249     inc16:   MACRO   A0              ;increment a 16 bit number
250              CLC
251              LDA     A0
252              ADC     #1
253              STA     A0
254              LDA     A0+1
255              ADC     #0
256              STA     A0+1
257              ENDM
258
259     MOV16:   MACRO   A0,A1           ;move 16 bits from A0 to A1
260              LDA     A0
261              STA     A1
262              LDA     A0+1
263              STA     A1+1
264              ENDM
265
266     LDW:     MACRO   A0,A1           ;load 16 bits of immediate data
267              LDA     #<A1
268              STA     A0
269              LDA     #>A1
270              STA     A0+1
271              ENDM
272
273     HELP:    MACRO   A0              ;help message in bank 1
274              lda     #>A0
275              ldy     #<A0
```

```
276                     jsr     help_bank1
277                     endm
278
279
280             ;       Example of select macro use:
281             ;       select  down limit, up limit, increment value
282             ;       This example returns a number between 1-52, starting at 5.
283             ;
284             ;       lda     #5
285             ;       select  1,59,1
286             ;       bcs     ?help
287             ;       sta     new value
288             ;
289             select: macro   a0,a1,a2        ;set up for get_number
290                     ldx     #a2             ;increment value
291                     phx
292                     ldx     #a1             ;up limit
293                     phx
294                     ldx     #a0             ;down limit
295                     phx
296                     ldy     char_index      ;cursor location
297                     ldx     #0              ;no leading zeros
298                     jsr     get_number
299                     endm
300
301
302
303             SHR16:  MACRO   A0              ;shift 16 bits right (divide by 2)
304                     CLC
305                     ROR     A0+1
306                     ROR     A0
307                     ENDM
308
309
310             DISP:   MACRO   A0              ;display 1 char
311                     LDA     #A0
312                     jsr     dchar
313                     ENDM
314
315             pushptr: macro  a0              ;push pointer on stack
316                     lda     #>a0
317                     pha
318                     lda     #<a0
319                     pha
320                     endm
321
322             push16: macro   a0              ;push 16 bit word
323                     lda     a0+1
324                     pha
325                     lda     a0
326                     pha
327                     endm
328
329
330             ;       Example of local_option macro use:
331             ;       local_option    message address
332             ;       A contains the initial selection. If there are n selections,
```

```
333         ;       the routine returns a number from 0 to n-1 in A.
334         ;
335         ;       lda     #2
336         ;       local_option list
337         ;       bcs     ?help
338         ;       sta     new value
339         ;
340         local_option macro a0        ;set up for get_option
341                 tax                  ;save initial selection
342                 lda     #>a0
343                 ldy     #<a0
344                 jsr     get_option_bank1
345                 endm
346
347
348         QM:     MACRO                ;blink question mark
349                 lda     #'?'
350                 jsr     bchar
351                 endm
352
353
354         save_retadr: macro           ;save return address
355                 pla
356                 sta     retadr
357                 pla
358                 sta     retadr+1
359                 endm
360
361         get_retadr: macro            ;restore return address
362                 lda     retadr+1
363                 pha
364                 lda     retadr
365                 pha
366                 endm
367
368
369         CURSOR: macro a0             ;move char_index to location
370                 pha
371                 lda     #a0
372                 sta     char_index
373                 pla
374                 endm
375
376         SCREEN1: macro a0            ;display static screen
377                 pha
378                 jsr     DKCLR
379                 MESSAGE a0
380                 CURSOR  LINE2
381                 pla
382                 endm
383
384         SCREEN2: macro a0,a1         ;display static screen
385                 pha
386                 jsr     DKCLR
387                 MESSAGE a0
388                 CURSOR  LINE2
389                 MESSAGE a1
```

```
390                         pla
391                         enda
392
393
394             HELPER: macro  a0
395                         pha
396                         HELP   a0
397                         pla
398                         enda
399
400             INC16:  macro  a0          ;increment a 16 bit number
401                         pha
402                         lda    a0       ;   load low order byte
403                         clc
404                         adc    #1       ;   add 1
405                         sta    a0       ;   and save
406                         lda    a0+1     ;   load high order byte
407                         adc    #0       ;   add 0
408                         sta    a0+1     ;   and save
409                         pla
410                         enda
411
412             DEC16:  macro  a0          ;decrement a 16 bit number
413                         pha
414                         sec
415                         lda    a0       ;   load low order byte
416                         sbc    #1       ;   subtract 1
417                         sta    a0       ;   and save
418                         lda    a0+1     ;   load high order byte
419                         sbc    #0       ;   subtract 0
420                         sta    a0+1     ;   and save
421                         pla
422                         enda
423
424             COPY16: macro  a0,a1
425                         pha
426                         lda    a0
427                         sta    a1
428                         lda    a0+1
429                         sta    a1+1
430                         pla
431                         enda
432
433
434
435
436  0000                   CODE
437                         GLOBALS    ON
438  D100                   ORG        $D100
439
440  D100                   INCLUDE    GAME.ASM
441             ;----------------------------------------
442             ;   Game Application Module
443             ;   written by John Stuart Houston
444             ;   version 1.0
445             ;   27 February 1989
446             ;----------------------------------------
```

```
447  D100
448                    ; Constants
449
450  0004              DOWN_ARROW_KEY    equ   4
451  0002              HELP_KEY          equ   2
452  007D              FIVE_SECONDS      equ   125    ;125 40ms intervals = 5 seconds
453
454  001B              LEVEL2            equ   24     ;2 minutes
455  0024              LEVEL3            equ   36     ;3 minutes
456  0030              LEVEL4            equ   48     ;4 minutes
457
458  0006              UA                equ   6      ;up arrow character
459  0007              DA                equ   7      ;down arrow character
460
461  0017              LETTERW           equ   23     ; W
462  0009              LETTERI           equ   9      ; I
463  000E              LETTERN           equ   14     ; N
464
465                    ; helpkey
466                    ; okkey
467                    ;FALSE
468                    ;TRUE
469
470                    ;   RAM locations
471
472                    ; char_index
473                    ; hour
474                    ; IBFR
475                    ; DAYTBL
476                    ;game_active
477                    ;second_count
478                    ;level_count
479                    ;temp
480
481                    ;   Macros
482
483                    ; select
484                    ; local_option
485                    ; HELP
486                    ; MESSAGE
487                    ; DISP
488                    ; CURSOR
489                    ; SCREEN1
490                    ; SCREEN2
491
492
493                    ;   External Routines
494
495                    ; DISPTIME
496                    ; display_dow
497                    ; display_date
498                    ; get_dow
499                    ; get_month
500                    ; get_number
501
502                    ;   HELP messages called
503                    ;      none (blank message)
```

```
504                   ;    M1A,M1B,MC1A,MC1B,MC2A,MC3A,MC3B,MC3H
505                   ;    Q1A,Q1M,Q1IA,Q1CA,Q2A,Q2H,Q2IA,Q2CA
506                   ;    Q3A,Q3B,Q3H,Q3IA,Q3CA,Q4A,Q4B,Q4H,Q4IA,Q4CA
507                   ;    Q5A,Q5B,Q5H,Q5IA,Q5CA,Q6A,Q6M,Q6IA,Q6CA
508                   ;    Q7A,Q7B,Q7IA,Q7CA,Q8A,Q8IA,Q8CA
509                   ;    Q9A,Q9M,Q9H,Q9IA,Q9CA,Q10A,Q10M
510                   ;    Q10H,Q10IA,Q10CA,msgtime
511                   ;    MSGL1,MSGL2,MSGL3,MSGL4
512                   ;    options,numbers,help,password,duration
513                   ;    time,timedate
514
515
516
517                   ;###############################################################
518                   ;    Title:  game
519                   ;
520                   ;    Purpose:  This is the main game routine
521                   ;
522                   ;    Entry:
523                   ;    Exit:
524                   ;    Registers Used:
525                   ;    RAM used:
526                   ;
527                   ;###############################################################
528    D100           game:
529    D100  20 36 D1          jsr    just_make_sure  ;does the user want to play?
530    D103  B0 30             bcs    ?exit           ; no, exit...
531    D105  20 F5 D5          jsr    game_timer_init ; yes,initialize game timer
532
533    D108  20 61 D1          jsr    CA1             ;down arrow instructions
534    D10B  20 83 D1          jsr    CA2             ;multi-screens instructions
535    D10E  20 8E D1          jsr    CA3             ;help and game instructions
536    D111  20 B7 D1          jsr    Q1              ;Options
537    D114  20 FD D1          jsr    Q2              ;Numeric Entry
538    D117  20 4C D2          jsr    Q3              ;HELP
539    D11A  20 A2 D2          jsr    Q4              ;Time Entry
540    D11D  20 F6 D2          jsr    Q5              ;Durations
541    D120  20 4B D3          jsr    Q6              ;Site Info / Options
542    D123  20 8E D3          jsr    Q7              ;Password
543    D126  20 EE D3          jsr    Q8              ;Time / Date
544    D129  20 44 D4          jsr    Q9              ;Solatrol's City
545    D12C  20 8B D4          jsr    Q10             ;LEIT 8000 features
546
547    D12F  20 01 D6          jsr    game_timer_stop ;stop timer
548    D132  20 24 D6          jsr    display_level   ;display user's level
549
550    D135  60         ?exit: rts                    ;and exit...
551
552                   ;###############################################################
553                   ;    Title:  just make sure
554                   ;
555                   ;    Purpose:  Verify that the user wants to play the game
556                   ;
557                   ;    Entry:
558                   ;    Exit:
559                   ;    Registers Used:
560                   ;    RAM used:
```

```
561                   ;
562                   ;***************************************************************
563
564  D136             just_make_sure:
565  D136  20 00 00           jsr     DKCLR
566  D139                     SCREEN2 M1A, M1B        ;set up static display
587
588  D153             ?check:
589  D153  20 00 00           jsr     GETKEY
590  D156  F0 FB              beq     ?check
591  D158  C9 01              cmp     #okkey          ; play game?
592  D15A  F0 03              beq     ?game_exit      ;   yes, exit normal...
593
594  D15C  38                 sec                     ;   no, set carry
595  D15D  80 01              bra     ?exit           ;     and exit...
596
597  D15F             ?game_exit:
598  D15F  18                 clc
599  D160             ?exit:
600  D160  60                 rts
601
602  D161
603                   ;***************************************************************
604                   ;       Controller Goal 1:  Teach the user how to move through multiple
605                   ;       screen messages
606                   ;
607                   ;       Message:  Welcome! Please Press [down arrow]
608                   ;
609                   ;       User Action 1: must press [down arrow]
610                   ;***************************************************************
611
612  D161             CA1:
613  D161                     SCREEN2 MC1A, MC1B      ;set up static display
634
635  D17B             ?check:
636  D17B  20 00 00           jsr     GETKEY
637  D17E  C9 03              cmp     #upkey
638  D180  D0 F9              bne     ?check
639  D182  60                 rts
640
641
642                   ;***************************************************************
643                   ;       Controller Action 2: Provide the user positive feedback for
644                   ;       his action, and explain the purpose of the down arrow key for
645                   ;       moving through text displays
646                   ;
647                   ;       Message:  Great! The [down arrow] key move you to the next
648                   ;       screen of info.  A blinking down arrow means there are more
649                   ;       screens to see.
650                   ;
651                   ;       User Action 2: must press [down arrow]
652                   ;***************************************************************
653
654  D183             CA2:
655  D183  20 00 00           jsr     DKCLR
656  D1B6                     HELP    MC2A
661
```

```
652  D18D  60                        rts
683  D18E
684                 ;################################################################
685                 ;       Controller Action 3:  Teach the user how to invoke help
686                 ;
687                 ;       Message: Very Good! Press the HELP key
688                 ;
689                 ;       User Action 3:  must press [HELP]
670                 ;
671                 ;       Controller Action 4:  To explain the function of the help key
672                 ;       and the instructions for the game.
673                 ;
674                 ;       Message: Good! You will be asked a series of questions. Choose
675                 ;       the correct answer to the question from the options presented or
676                 ;       in the cases of entering numbers or works, use the [up arrow] and
677                 ;       [down arrow] along with the OK key to enter your answer.
678                 ;
679                 ;       User Action 4:  must press [down arrow]
680                 ;################################################################
681  D18E
682  D18E          CA3:
683  D18E                  SCREEN2  MC3A,MC3B
704
705  D1A8          ?check:
706  D1A8  20 00 00         jsr      GETKEY
707  D1AB  C9 02            cmp      #HELP_KEY
708  D1AD  D0 F9            bne      ?check
709  D1AF                   HELP     MC3H
714
715  D1B6  60               rts
716
717
718                 ;################################################################
719                 ;       Q1: Options
720                 ;
721                 ;
722                 ;################################################################
723
724  D1B7          Q1:
725  D1B7  A9 00            lda      #0           ;select first option
726
727  D1B9          ?GA:     SCREEN1  Q1A
743  D1CC                   CURSOR   LINE2        ;move to second line
749  D1D3                   local_option  Q1M    ;get color option
755  D1DB  90 0B            bcc      ?D           ;continue if no help request
756  D1DD  48               pha
757  D1DE                   HELP     options
762  D1E5  68               pla
763  D1E6  80 D1            bra      ?GA          ;ask again
764
765  D1EB  C9 01   ?D:     cmp      #1           ;correct?  (BLUE = 1)
766  D1EA  F0 09           beq      ?CA          ; yes, skip to next section...
767
768  D1EC                   HELP     Q11A         ; no, signal wrong answer
773  D1F3  80 C4            bra      ?GA          ;and try again...
774
775  D1F5          ?CA:    HELP     Q1CA
```

```
780  D1FC  60                rts                     ;exit...
781
782
783
784                  ;###############################################################
785                  ;     Q2:  Numeric entry
786                  ;
787                  ;
788                  ;###############################################################
789
790  D1FD                     Q2:
791  D1FD  A9 01              lda     #1
792
793  D1FF              ?GA:   SCREEN1  Q2A
809  D212                     CURSOR   LINE2          ;move to second line
815  D219                     select   1,12,1         ;get month
826  D22A  90 0B              bcc      ?D             ;continue if no help request
827  D22C  48                 pha
828  D22D                     HELP     numbers
833  D234  68                 pla
834  D235  80 C8              bra      ?GA            ;ask again
835
836  D237  C9 0C      ?D:     cmp      #12            ;correct?
837  D239  F0 09              beq      ?CA            ; yes, skip to next section...
838
839  D23B                     HELP     Q2IA           ; no, signal wrong answer
844  D242  80 BB              bra      ?GA            ;and try again...
845
846  D244       ?CA:          HELP     Q2CA
851  D24B  60                 rts                     ;exit...
852
853
854
855                  ;###############################################################
856                  ;     Q3:  Force the user to use help
857                  ;
858                  ;
859                  ;###############################################################
860  D24C
861  D24C                     Q3:
862  D24C                     SCREEN2  Q3A, Q3B
883
884  D266  A9 01              lda      #1             ;is this needed?
885  D268              ?GA:   CURSOR   29             ;move to second line
891  D26F                     select   1,100,1        ;get number between 1 and 100
902  D280  90 0B              bcc      ?D             ;continue if no help request
903  D282  48                 pha
904  D283                     HELP     Q3H
909  D28A  68                 pla
910  D28B  80 DB              bra      ?GA            ;ask again
911
912  D28D  C9 37      ?D:     cmp      #55            ;correct?
913  D28F  F0 09              beq      ?CA            ; yes, skip to next section...
914
915  D291                     HELP     Q3IA           ; no, signal wrong answer
920  D293  80 CE              bra      ?GA            ;and try again...
921
```

```
922  D29A                 ?CA:  HELP   Q3CA
927  D2A1   60                  rts                    ;exit...
928
929
930                      ;###############################################
931                      ;   Q4:   Teach the user how to enter the time
932                      ;
933                      ;
934                      ;###############################################
935
936  D2A2                 Q4:
937  D2A2                       SCREEN2 Q4A, Q4B
958
959  D2BC   9C 5F 02            stz    IBFR+4          ;zero hours
960  D2BF   9C 60 02            stz    IBFR+5          ;zero minutes
961  D2C2                 ?GA:  CURSOR 25              ;move to second line
967  D2C9   20 00 00            jsr    get_time        ;get duration
968  D2CC   90 09               bcc    ?D              ;continue if no help request
969  D2CE                       HELP   time
974  D2D5   80 EB               bra    ?GA             ;ask again
975
976  D2D7   AD 5F 02      ?D:   lda    IBFR+4
977  D2DA   C9 07               cmp    #7              ;hour = 7AM?
978  D2DC   D0 07               bne    ?IA             ; no, skip to IA
979  D2DE   AD 60 02            lda    IBFR+5          ;minutes = 15M?
980  D2E1   C9 0F               cmp    #15
981  D2E3   F0 09               beq    ?CA             ;correct, skip...
982
983  D2E5                 ?IA:  HELP   Q4IA            ; no, signal wrong answer
988  D2EC   80 D4               bra    ?GA             ;and try again...
989
990  D2EE                 ?CA:  HELP   Q4CA
995  D2F5   60                  rts                    ;exit...
996
997
998                      ;###############################################
999                      ;   Q5:   Teach the user how to enter durations
000                      ;
001                      ;
002                      ;###############################################
003
004  D2F6                 Q5:
005  D2F6                       SCREEN2 Q5A, Q5B
026
027  D310   9C 5F 02            stz    IBFR+4          ;zero hours
028  D313   9C 60 02            stz    IBFR+5          ;zero minutes
029  D316                 ?GA:  CURSOR 23              ;move to second line
035  D31D   20 00 00            jsr    get_duration    ;get duration
036  D320   90 09               bcc    ?D              ;continue if no help request
037  D322
038  D322                       HELP   duration
043  D329   80 EB               bra    ?GA             ;ask again
044
045  D32B   AD 5F 02      ?D:   lda    IBFR+4
046  D32E   D0 07               bne    ?IA             ;hours not correct
047  D330   AD 60 02            lda    IBFR+5          ;check minutes
048  D333   C9 1E               cmp    #30
```

```
1049  D335  F0 09              beq     ?CA             ;correct, skip...
1050
1051  D337              ?IA:   HELP    Q5IA            ; no, signal wrong answer
1056  D33E  80 D6              bra     ?GA             ;and try again...
1057
1058  D340              ?CA:   HELP    Q5CA
1063  D347  60                 rts                     ;exit...
1064
1065
1066
1067                    ;##############################################################
1068                    ;   Q6:     Teach the user how to enter site info with options
1069                    ;
1070                    ;
1071                    ;##############################################################
1072
1073  D348              Q6:
1074  D348                     SCREEN1 Q6A
1090
1091  D35B  A9 03              lda     #3              ;set up temporary location
1092  D35D              ?GA:   CURSOR  LINE2           ;move to second line
1098  D364                     local_option    Q6M     ;get soil/terrain option
1104  D36C  90 08              bcc     ?D              ;continue if no help request
1105  D36E  48                 pha
1106  D36F                     HELP    options
1111  D376  68                 pla
1112  D377  80 E4              bra     ?GA             ;ask again
1113
1114  D379  C9 00      ?D:     cmp     #0              ;correct?
1115  D37B  F0 09              beq     ?CA             ; yes, skip to next section...
1116
1117  D37D                     HELP    Q6IA            ; no, signal wrong answer
1122  D384  80 D7              bra     ?6A             ;and try again...
1123
1124  D386              ?CA:   HELP    Q6CA
1129  D38D  60                 rts                     ;exit...
1130
1131
1132
1133                    ;##############################################################
1134                    ;   Q7:     Teach the user how to enter a password
1135                    ;
1136                    ;
1137                    ;##############################################################
1138
1139  D38E              Q7:
1140  D38E                     SCREEN2 Q7A, Q7B
1161
1162  D3AB  A9 00              lda     #0              ;character number for 'A'
1163  D3AA  8D 5B 02           sta     IBFR            ;set up password to start at
1164  D3AD  8D 5C 02           sta     IBFR+1          ; 'AAA'
1165  D3B0  8D 5D 02           sta     IBFR+2
1166  D3B3              ?6A:   CURSOR  22              ;move to second line
1172  D3BA  20 00 00           jsr     ENTER_CODE3     ;get password
1173  D3BD  90 09              bcc     ?D              ;continue if no help request
1174  D3BF                     HELP    password
1179  D3C6  80 EB              bra     ?6A             ;ask again
```

```
1180
1181  D3CB  AD 5B 02    ?D:    lda    IBFR
1182  D3CB  C9 17              cmp    #LETTERW
1183  D3CD  D0 0E              bne    ?IA
1184  D3CF  AD 5C 02           lda    IBFR+1
1185  D3D2  C9 09              cmp    #LETTERI
1186  D3D4  D0 07              bne    ?IA
1187  D3D6  AD 5D 02           lda    IBFR+2
1188  D3D9  C9 0E              cmp    #LETTERN
1189  D3DB  F0 09              beq    ?CA
1190
1191  D3DD              ?IA    HELP   @?IA       ; no, signal wrong answer
1196  D3E4  80 CD              bra    ?GA        ;and try again...
1197
1198  D3E6              ?CA:   HELP   @?CA
1203  D3ED  60                 rts               ;exit...
1204
1205
1206
1207                    ;###############################################################
1208                    ;     @8:    Teach the user how to enter time and date
1209                    ;
1210                    ;
1211                    ;###############################################################
1212
1213  D3EE              @8:
1214  D3EE  A2 05              ldx    #5          ;read current time of day
1215  D3F0  BD 01 02    ?next: lda    hour,x      ;use hour as base pointer
1216  D3F3  9D 5F 02           sta    IBFR+4,x    ;IBFR+4 = hour, +5 = minute
1217  D3F6  CA                 dex                ;IBFR+6 = day of week, +7 = month
1218  D3F7  10 F7              bpl    ?next       ;IBFR+8 = day, +9 = year
1219
1220  D3F9  20 00 00    ?GA:   jsr    DKCLR       ;clear display
1221  D3FC                     HELP   @8A         ;display static line
1226
1227  D403  20 00 00           jsr    DKCLR
1228  D406  20 D0 D4           jsr    get_td      ;get time and date
1229  D409
1230  D409  AD 5F 02    ?D:    lda    IBFR+4
1231  D40C  C9 0C              cmp    #12         ;hour = 12 NOON ?
1232  D40E  D0 23              bne    ?IA         ; no, skip to IA
1233  D410  AD 60 02           lda    IBFR+5
1234  D413  C9 00              cmp    #0          ;minutes = OK?
1235  D415  D0 1C              bne    ?IA         ;correct, skip...
1236  D417  AD 61 02           lda    IBFR+6      ;day = Tuesday?
1237  D41A  C9 02              cmp    #2
1238  D41C  D0 15              bne    ?IA         ;correct, skip...
1239  D41E  AD 62 02           lda    IBFR+7      ;month = July?
1240  D421  C9 07              cmp    #7
1241  D423  D0 0E              bne    ?IA         ;correct, skip...
1242  D425  AD 63 02           lda    IBFR+8      ;date = 4?
1243  D428  C9 04              cmp    #4
1244  D42A  D0 07              bne    ?IA         ;correct, skip...
1245  D42C  AD 64 02           lda    IBFR+9      ;year = 89?
1246  D42F  C9 59              cmp    #89
1247  D431  F0 09              beq    ?CA         ;correct, skip...
1248
```

```
1249  D433                ?IA:    HELP    @81A            ; no, signal wrong answer
1254  D43A  80 BD                 bra     ?GA             ;and try again...
1255
1258  D43C                ?CA:    HELP    @BCA
1261  D443  60                    rts                     ;exit...
1262
1263
1264                      ;################################################################
1265                      ;     Q9:   Teach user how to use Help, options, and a little PR
1266                      ;
1267                      ;
1268                      ;################################################################
1269
1270  D444                Q9:
1271  D444                        SCREEN! Q9A
1287
1288  D457                ?6A:    CURSOR      LINE2       ;move to second line
1294  D45E                        local_option    Q9M     ;get city name
1300  D466  90 0B                 bcc     ?D              ;continue if no help request
1301  D468  48                    pha
1302  D469                        HELP    options
1307  D470  68                    pla
1308  D471  80 E4                 bra     ?6A             ;ask again
1309
1310  D473  C9 02         ?D:     cmp     #2              ;correct?
1311  D475  F0 09                 beq     ?CA             ; yes, skip to next section...
1312
1313  D477                        HELP    @91A            ; no, signal wrong answer
1318  D47E  80 D7                 bra     ?6A             ;and try again...
1319
1320  D480                ?CA:    HELP    @9CA
1325  D487  60                    rts                     ;exit...
1326
1327
1328
1329                      ;################################################################
1330                      ;     Q10:  Teach user how to use Help, options, and a little PR
1331                      ;
1332                      ;
1333                      ;################################################################
1334
1335  D488                Q10:
1336  D498                        SCREEN! Q10A
1352
1353  D49B  9C 05 09              stz     temp            ;zero temporary location
1354  D49E                ?6A:    CURSOR      LINE2       ;move to second line
1360  D4A5  AD 05 09              lda     temp
1361  D4A8                        local_option    Q10M    ;get LEIT 8000 attribute option
1367  D4B0  90 09                 bcc     ?D              ;continue if no help request
1368  D4B2                        HELP    options
1373  D4B9  80 E3                 bra     ?6A             ;ask again
1374
1375  D4BB  C9 04         ?D:     cmp     #4              ;correct?
1376  D4BD  F0 09                 beq     ?CA             ; yes, skip to next section..
1377
1378  D4BF                        HELP    @101A           ; no, signal wrong answer
1383  D4C6  80 D6                 bra     ?GA             ;and try again...
```

```
1384
1385   D4CB                    ?CA:    HELP    @10CA
1390   D4CF   60                       rts                          ;exit...
1391
1392
1393
1394                           ;###############################################################
1395                           ;    Title: GET_TD
1396                           ;
1397                           ;    Purpose: Get time and date
1398                           ;
1399                           ;    Entry:
1400                           ;    Exit:
1401                           ;    Registers Used:
1402                           ;    RAM used:
1403                           ;###############################################################
1404
1405   D4D0                    get_td:
1406
1407   D4D0   20 00 00          ?1:     jsr     DKCLR           ;clear display
1408   D4D3                            MESSAGE msgtime         ;display 'time is '
1413   D4DA   20 00 00                 jsr     DISPTIME
1414   D4DD                            CURSOR  LINE2           ;move to second line
1420   D4E4   AD 61 02                 lda     IBFR+6          ;get day of week
1421   D4E7   20 10 DC                 jsr     display_dow     ;and display it
1422   D4EA                            SKIP    2
1428   D4F3   AD 62 02                 lda     IBFR+7          ;get month, day, and year
1429   D4F6   AC 63 02                 ldy     IBFR+8
1430   D4F9   AE 64 02                 ldx     IBFR+9
1431   D4FC   20 6E DC                 jsr     display_date    ;and display it
1432
1433   D4FF                            QM                      ;display question mark
1437   D504   20 00 00          ?2:    jsr     GETKEY          ;wait for an answer
1438   D507   F0 FB                    beq     ?2
1439   D509   C9 01                    cmp     #okkey          ;time ok?
1440   D50B   D0 03                    bne     ?3
1441   D50D   4C F4 D5                 jmp     ?time_ok        ; yes, clean up and check it
1442   D510   C9 02             ?3:    cmp     #helpkey        ;help needed?
1443   D512   D0 09                    bne     ?change_time    ; no, skip...
1444   D514                            HELP    timedate        ; yes, display it
1449   D51B   80 B3                    bra     ?1              ;start again
1450
1451   D51D                    ?change_time:
1452   D51D   20 00 00                 jsr     DKCLR           ;now we shall change the time
1453   D520                            MESSAGE msgtime         ;display 'time is '
1458   D527                            CURSOR  8               ;get time
1464   D52E   20 00 00                 jsr     get_time
1465   D531   90 09                    bcc     ?change_dow     ;everything ok?
1466   D533                            HELP    timedate        ; no, display help
1471   D53A   80 E1                    bra     ?change_time    ; and do it again
1472
1473   D53C                    ?change_dow:
1474   D53C                            CURSOR  LINE2           ;move to second line
1480   D543   AD 61 02                 lda     IBFR+6          ;get current day of week
1481   D546   20 04 E1                 jsr     get_dow
1482   D549   90 09                    bcc     ?save_dow       ;everything ok?
1483   D549                            HELP    timedate        ; no, display help
```

```
1488  D552  80 EB              bra      ?change_dow    ; and do it again
1489  D554
1490  D554          ?save_dow:
1491  D554  8D 61 02           sta      IBFR+6
1492
1493  D557          ?change_date:
1494  D557                     CURSOR   LINE2+5
1500  D55E  AD 62 02           lda      IBFR+7
1501  D561  20 DB E0           jsr      get_month
1502  D564  90 09              bcc      ?save_month    ;everything ok?
1503  D566                     HELP     none           ; no, display help
1508  D56D  80 EB              bra      ?change_date   ; and do it again
1509
1510  D56F          ?save_month:
1511  D56F  8D 62 02           sta      IBFR+7
1512
1513  D572                     CURSOR   LINE2+9
1519  D579                     set      IBFR+1         ;select day based on days in month
1523  D57E  AE 62 02           ldx      IBFR+7
1524  D581  BD 00 00           lda      DAYTBL,x
1525  D584  8D 5D 02           sta      IBFR+2
1526  D587  AD 63 02           lda      IBFR+8         ;default = present day
1527  D58A  8D 5B 02           sta      IBFR
1528  D58D  DD 00 00           cmp      DAYTBL,x       ;unless > present day
1529  D590  F0 07              beq      ?skip
1530  D592                     blt      ?skip
1533  D594                     set      IBFR           ;then start at day = 1
1537  D599  AD 5B 02  ?skip:   lda      IBFR
1538  D59C  A2 01              ldx      #1
1539  D59E  DA                 phx
1540  D59F  AE 5D 02           ldx      IBFR+2         ;upper limit = days in month
1541  D5A2  DA                 phx
1542  D5A3  A2 01              ldx      #1
1543  D5A5  DA                 phx
1544  D5A6  AC 1B 02           ldy      char_index
1545  D5A9  A2 00              ldx      #0
1546  D5AB  20 45 DD           jsr      get_number
1547  D5AE  90 0A              bcc      ?skip2
1548  D5B0                     HELP     timedate
1553  D5B7  4C 57 D5           jmp      ?change_date
1554  D5BA          ?skip2:
1555  D5BA  8D 63 02           sta      IBFR+8         ;keep date
1556
1557  D5BD                     CURSOR   LINE2+11
1563  D5C4                     DISP     ','
1567  D5C9                     DISP     $27
1571  D5CE  AD 64 02           lda      IBFR+9
1572  D5D1                     select   0,99,1         ;select year
1583  D5E2  90 0A              bcc      ?save_year
1584  D5E4                     HELP     timedate
1589  D5E8  4C 57 D5           jmp      ?change_date
1590
1591  D5EE          ?save_year:
1592  D5EE  8D 64 02           sta      IBFR+9
1593  D5F1  4C D0 D4           jmp      ?1             ;confirm
1594
1595  D5F4          ?time_ok:
```

```
1596   D5F4  60                    rts                          ;return to caller
1597
1598
1599                         ;       Title:  game_init
1600                         ;
1601                         ;       Purpose:
1602                         ;
1603                         ;       Entry:
1604                         ;       Exit:
1605                         ;       Registers Used:
1606                         ;       RAM used:
1607                         ;
1608   D5F5                  game_timer_:
1609   D5F5  9C 03 09                stz     second_count         ;clear second count
1610   D5F8  9C 04 09                stz     level_count          ;clear level count
1611   D5FB  A9 0F                   lda     #TRUE
1612   D5FD  8D 02 09                sta     game_active          ;set game active flag true
1613
1614   D600  60                      rts
1615
1616
1617                         ;       Title:  game_stop
1618                         ;
1619                         ;       Purpose:
1620                         ;
1621                         ;       Entry:
1622                         ;       Exit:
1623                         ;       Registers Used:
1624                         ;       RAM used:
1625                         ;
1626   D601                  game_timer_stop:
1627   D601  A9 00                   lda     #FALSE
1628   D603  8D 02 09                sta     game_active          ;set game active flag false
1629
1630   D606  60                      rts
1631
1632
1633
1634                         ;       Title:  game_irq_service
1635                         ;
1636                         ;       Purpose:  This routine is called by the main IRQ service routine
1637                         ;
1638                         ;       Entry:
1639                         ;       Exit:
1640                         ;       Registers Used:
1641                         ;       RAM used:
1642                         ;
1643   D607                  game_irq_service:
1644   D607  AD 02 09                lda     game_active          ;are we in the game?
1645   D60A  C9 0F                   cmp     #TRUE
1646   D60C  D0 15                   bne     ?exit                ; no, exit...
1647
1648   D60E  EE 03 09                inc     second_count         ; yes, increment second count
1649   D611  AD 03 09                lda     second_count
1650   D614  C9 7D                   cmp     #FIVE_SECONDS        ;Five seconds up?
1651   D616  D0 0B                   bne     ?exit                ; no, exit...
1652
```

```
1653   D61B   9C 03 09              stz      second_count         ; yes, reset second count
1654   D61B   EE 04 09              inc      level_count          ;level_count at max?
1655   D61E   D0 03                 bne      ?exit                ; no, exit...
1656   D620   CE 04 09              dec      level_count          ; yes, fix count
1657
1658   D623                ?exit:
1659   D623   60                    rts                           ; and exit...
1660
1661                       ;     Title:   display level
1662                       ;
1663                       ;     Purpose:
1664                       ;     Entry:
1665                       ;     Exit:
1666                       ;     Registers Used:
1667                       ;     RAM used:
1668                       ;
1669   D624                display_level:
1670
1671   D624   AD 04 09              lda      level_count          ;get count
1672   D627   C9 18                 cmp      #LEVEL2              ;user qualified for Level 2?
1673   D629   B0 09                 bcs      ?next1               ; yes, skip...
1674   D62B                         HELP     MSGL1                ; no, display level 1 message
1679   D632   80 21                 bra      ?exit
1680
1681   D634                ?next1:
1682   D634   C9 24                 cmp      #LEVEL3              ;user qualified for Level 3?
1683   D636   B0 09                 bcs      ?next2               ; yes, skip...
1684   D638                         HELP     MSGL2                ; no, display level 2 message
1689   D63F   80 14                 bra      ?exit
1690
1691   D641                ?next2:
1692   D641   C9 30                 cmp      #LEVEL4              ;user qualified for Level 4?
1693   D643   B0 09                 bcs      ?next3               ; yes, skip...
1694   D645                         HELP     MSGL3                ; no, display level 3 message
1699   D64C   80 07                 bra      ?exit
1700
1701   D64E                ?next3:
1702   D64E                         HELP     MSGL4                ;display level 4 message
1707
1708   D655                ?exit:
1709   D655   60                    rts                           ;exit...
1710
1711
1712
1713
1714
1715
1716
1717   D656                         INCLUDE      NEWMONIT.ASM
1718                       ;----------------------------------------
1719                       ;   Monitor Application Module
1720                       ;   written by John Stuart Houston
1721                       ;   version 1.0
1722                       ;   7 March 1989
1723                       ;----------------------------------------
1724   D656
1725                       ; Constants
```

```
1726
1727                    ;DOWN_ARROW_KEY   equ    4
1728                    ;HELP_KEY         equ    2
1729                    ;
1730                    ;UA               equ    6          ;up arrow character
1731                    ;DA               equ    7          ;down arrow character
1732      000A          NORMAL            equ    10         ;speed
1733      0003          VERYFAST          equ    3          ;speed
1734      0004          FAST              equ    4          ;speed
1735
1736                    ;MACROS
1737
1738                    ; CURSOR
1739                    ; SCREEN1
1740                    ; SCREEN2
1741                    ; INC16
1742                    ; DEC16
1743                    ; HELPER
1744                    ; COPY16
1745
1746
1747                    ; External Routines
1748
1749                    ;ram locations
1750                    ;temp_word:
1751                    ;        ds    2
1752                    ;base_address:
1753                    ;        ds    2
1754                    ;temp_byte:
1755                    ;        ds    1
1756                    ;high_nibble:
1757                    ;        ds    1
1758                    ;low_nibble:
1759                    ;        ds    1
1760                    ;mon_refresh:
1761                    ;        ds    1
1762                    ;nibble:
1763                    ;        ds    1
1764
1765
1766                    ;**************************************************************
1767                    ;     Title: monitor
1768                    ;
1769                    ;     Purpose: This is the main game routine
1770                    ;
1771                    ;     Entry:
1772                    ;     Exit:
1773                    ;     Registers Used:
1774                    ;     RAM used:
1775                    ;
1776                    ;**************************************************************
1777  D656              monitor:
1778  D656  A9 80                 lda    #$80
1779  D658  85 AD                 sta    base_address+1
1780  D65A  A9 00                 lda    #$00
1781  D65C  85 AC                 sta    base_address
1782  D65E  A9 00                 lda    #0              ;select first option
```

```
1783
1784    D660                    ?6A:    SCREEN1    QU1A
1800    D673                            CURSOR     LINE2          ;move to second line
1806    D67A                            local_option  QU1M        ;get monitor option
1812    D682    90 0B                   bcc        ?D             ;continue if no help request
1813    D684                            HELPER     mon
1822    D68D    80 D1                   bra        ?6A            ;ask again
1823
1824    D68F            ?D:
1825    D68F    C9 02                   cmp        #2             ;exit?
1826    D691    F0 0E                   beq        ?exit          ; yes, bring it on home ...
1827
1828    D693    C9 01                   cmp        #1             ;review/modify?
1829    D695    D0 05                   bne        ?skip          ; no, skip to next section...
1830    D697    20 FF D6        ?zip:   jsr        review
1831    D69A    80 C4                   bra        ?6A
1832
1833    D69C            ?skip:
1834    D69C    20 A2 D6                jsr        new_address    ;call change base address subroutine
1835    D69F    80 F6                   bra        ?zip
1836
1837    D6A1            ?exit:
1838    D6A1    60                      rts
1839
1840
1841
1842                            ;##############################################################
1843                            ;       Title: new_address
1844                            ;
1845                            ;       Purpose:
1846                            ;
1847                            ;       Entry:
1848                            ;       Exit:
1849                            ;       Registers Used:
1850                            ;       RAM used:
1851                            ;
1852                            ;##############################################################
1853    D6A2            new_address:
1854    D6A2                            COPY16     base_address, temp_word
1862
1863    D6AE    20 00 00        ?start:  jsr       DKCLR          ;clear display
1864    D6B1                            SCREEN1    QU1B           ;display current address
1880    D6C4                            SET_CURSOR    20          ;position cursor for the kill
1884    D6C9    20 56 D8                jsr        display_word
1885    D6CC                            SET_CURSOR    20          ;position cursor for the kill
1889    D6D1    20 B4 D7                jsr        get_hex_word
1890    D6D4    90 0B                   bcc        ?store
1891    D6D6                            HELPER     hexword
1900    D6DF    80 CD                   bra        ?start
1901
1902    D6E1            ?store:
1903    D6E1                            QM                        ;put out QM
1907    D6E6    20 00 00        ?look:  jsr        GETKEY
1908    D6E9    F0 FB                   beq        ?look
1909    D6EB    C9 01                   cmp        #okkey
1910    D6ED    F0 03                   beq        ?exit
1911    D6EF    4C AE D6                jmp        ?start
```

```
1912
1913   D6F2                     ?exit:
1914   D6F2                             COPY16   temp_word, base_address
1922   D6FE    60                       rts                              ;that's all, folks!
1923
1924                            ;###############################################################
1925                            ;
1926                            ;  Review/Modify
1927                            ;
1928                            ;
1929                            ;###############################################################
1930
1931   D5FF                     review:
1932   D6FF    20 00 00                 jsr      DKCLR
1933   D702                             SCREEN1  rev
1949   D715    A9 04                    lda      #FAST
1950   D717    20 00 00                 jsr      R2_repeat_rate
1951
1952   D71A                     ?display:
1953   D71A    AD 0B 09                 lda      non_refresh
1954   D71D    C9 0F                    cmp      #TRUE
1955   D71F    D0 F9                    bne      ?display
1956   D721                             CURSOR   20
1962   D728                             COPY16   base_address, temp_word
1970   D734    20 56 D8                 jsr      display_word
1971   D737                             CURSOR   26
1977   D73E    B2 AC                    lda      (base_address)
1978   D740    20 63 D8                 jsr      display_byte
1979   D743    A9 00                    lda      #FALSE
1980   D745    8D 0B 09                 sta      non_refresh
1981   D748
1982   D748    20 00 00                 jsr      GETKEY
1983   D74B    C9 00                    cmp      #0                      ;key pressed?
1984   D74D    F0 CB                    beq      ?display                ;  no, repeat display
1985   D74F    C9 02                    cmp      #helpkey                ;  yes, help key?
1986   D751    F0 55                    beq      ?exit                   ;     yes, exit to main
1987   D753    C9 01                    cmp      #okkey
1988   D755    F0 28                    beq      ?modify
1989   D757    C9 04                    cmp      #downkey
1990   D759    F0 12                    beq      ?down
1991
1992   D75B                             INC16    base_address
2003   D76A    4C 1A D7                 jmp      ?display
2004
2005   D76D                     ?down:
2006   D76D                             DEC16    base_address
2017   D77C    4C 1A D7                 jmp      ?display
2018
2019   D77F                     ?modify:
2020   D77F                             SCREEN1  mod
2036   D792                             CURSOR   26
2042   D799    B2 AC                    lda      (base_address)
2043   D79B    48                       pha
2044   D79C    20 63 D8                 jsr      display_byte
2045   D79F    68                       pla
2046   D7A0    20 C7 D7                 jsr      get_hex_byte
2047   D7A3    92 AC                    sta      (base_address)
```

```
2048   D7A5   4C FF D6              jmp     review
2049
2050   D7A8                 ?exit:
2051   D7A8   A9 0A                 lda     #NORMAL
2052   D7AA   20 00 00              jsr     R2_repeat_rate
2053   D7AD   60                    rts
2054
2055
2056                ;################################################################
2057                ;
2058                ;   monitor_irq_service
2059                ;
2060                ;
2061                ;################################################################
2062   D7AE                 monitor_irq_service:
2063   D7AE   A9 0F                 lda     #TRUE
2064   D7B0   8D 08 09              sta     mon_refresh
2065   D7B3   60                    rts
2066
2067
2068
2069                ;################################################################
2070                ;
2071                ;   get_hex_word
2072                ;
2073                ;
2074                ;################################################################
2075   D7B4                 get_hex_word:
2076   D7B4   AD 07 09              lda     temp_word+1
2077   D7B7   20 C7 D7              jsr     get_hex_byte    ;get high byte
2078   D7BA   8D 07 09              sta     temp_word+1     ;    save
2079   D7BD   AD 06 09              lda     temp_word
2080   D7C0   20 C7 D7              jsr     get_hex_byte    ;get low byte
2081   D7C3   8D 06 09              sta     temp_word       ;    and save
2082   D7C6   60                    rts
2083
2084                ;################################################################
2085                ;
2086                ;   get_hex_byte
2087                ;
2088                ;
2089                ;################################################################
2090   D7C7                 get_hex_byte:
2091   D7C7   48                    pha
2092   D7C8   29 F0                 and     #$F0
2093   D7CA   4A                    lsr     a
2094   D7CB   4A                    lsr     a
2095   D7CC   4A                    lsr     a
2096   D7CD   4A                    lsr     a
2097   D7CE   8D 09 09              sta     high_nibble
2098
2099   D7D1   68                    pla
2100   D7D2   29 0F                 and     #$0F
2101   D7D4   8D 0A 09              sta     low_nibble
2102
2103   D7D7   A9 03                 lda     #VERYFAST
2104   D7D9   20 00 00              jsr     R2_repeat_rate  ;speed up entry rate
```

```
2105
2106    D7DC    AD 09 09                lda     high_nibble
2107    D7DF    20 0A D8                jsr     get_nibble
2108    D7E2    0A                      asl     a
2109    D7E3    0A                      asl     a
2110    D7E4    0A                      asl     a
2111    D7E5    0A                      asl     a
2112    D7E6    8D 08 09                sta     temp_byte
2113
2114    D7E9    AD 0A 09                lda     low_nibble
2115    D7EC    20 0A D8                jsr     get_nibble
2116    D7EF    0D 0B 09                ora     temp_byte
2117    D7F2
2118    D7F2    48                      pha
2119    D7F3    A9 0A                   lda     #NORMAL
2120    D7F5    20 00 00                jsr     R2_repeat_rate          ;reset entry rate
2121    D7F8    68                      pla
2122
2123    D7F9    60                      rts
2124
2125    D7FA                    hex_chars:
2126    D7FA    30 31 32 33 34          BYTE    '0','1','2','3','4','5','6','7'
2127    D802    38 39 41 42 43          BYTE    '8','9','A','B','C','D','E','F'
2128
2129                            ;##################################################################
2130                            ;
2131                            ;   get_nibble
2132                            ;
2133                            ;
2134                            ;##################################################################
2135    D80A                    get_nibble:
2136    D80A    8D 0C 09                sta     nibble                  ;save incoming data
2137    D80D                    ?refresh:
2138    D80D    AD 0C 09                lda     nibble
2139    D810    29 0F                   and     #$0F                    ;mask for low bits
2140    D812    8D 0C 09                sta     nibble                  ;save
2141    D815    AA                      tax                             ;use for index
2142    D816    BD FA D7                lda     hex_chars,x             ;get hex character
2143    D819    20 CF DB                jsr     bchar                   ;display character
2144    D81C                    ?check:
2145    D81C    20 00 00                jsr     GETKEY
2146    D81F    F0 FB                   beq     ?check
2147    D821    C9 02                   cmp     #helpkey
2148    D823    F0 1B                   beq     ?error_exit
2149    D825    C9 01                   cmp     #okkey
2150    D827    F0 1C                   beq     ?normal_exit
2151    D829    C9 04                   cmp     #downkey
2152    D82B    F0 06                   beq     ?decrement
2153
2154    D82D    AE 0C 09                ldx     nibble
2155    D830    E8                      inx
2156    D831    80 04                   bra     ?continue
2157
2158    D833                    ?decrement:
2159    D833    AE 0C 09                ldx     nibble
2160    D836    CA                      dex
2161    D837
```

```
2162  D837              ?continue:
2163  D837  8E 0C 09        stx     nibble
2164  D83A  CE 18 02        dec     char_index
2165  D83D  4C 0D D8        jmp     ?refresh
2166
2167  D840              ?error_exit:
2168  D840  AD 0C 09        lda     nibble
2169  D843  38              sec
2170  D844  60              rts
2171
2172  D845              ?normal_exit:
2173  D845  CE 18 02        dec     char_index
2174  D848  AE 0C 09        ldx     nibble
2175  D84B  BD FA D7        lda     hex_chars,x
2176  D84E  20 B6 DB        jsr     dchar
2177  D851  AD 0C 09        lda     nibble
2178  D854  18              clc
2179  D855  60              rts
2180
2181                    ;###############################################################
2182                    ;
2183                    ;   display_word
2184                    ;
2185                    ;
2186                    ;###############################################################
2187  D856              display_word:
2188  D856  AD 07 09        lda     temp_word+1         ;get high byte
2189  D859  20 63 D8        jsr     display_byte        ; and display it
2190  D85C  AD 06 09        lda     temp_word           ;get low byte
2191  D85F  20 63 D8        jsr     display_byte        ; and display it
2192
2193  D862  60              rts
2194  D863
2195                    ;###############################################################
2196                    ;
2197                    ;   display_byte
2198                    ;
2199                    ;
2200                    ;###############################################################
2201  D863              display_byte:
2202  D863  8D 08 09        sta     temp_byte
2203  D866  29 F0           and     #$F0                ;mask for high nibble
2204  D868  4A              lsr     a
2205  D869  4A              lsr     a
2206  D86A  4A              lsr     a                   ;only do three shifts for
2207  D86B  4A              lsr     a                   ; indexing
2208
2209  D86C  AA              tax
2210  D86D  BD FA D7        lda     hex_chars,x
2211  D870  20 B6 DB        jsr     dchar               ;display character
2212
2213  D873  AD 08 09        lda     temp_byte
2214  D876  29 0F           and     #$0F                ;mask for low nibble
2215  D878  AA              tax
2216  D879  BD FA D7        lda     hex_chars,x
2217  D87C  20 B6 DB        jsr     dchar               ;display character
```

```
2219  DB7F  60                    rts
2220
...
2254
2255  DB80              INCLUDE       HISTORY.ASM
2256              ;------------------------------------
2257              ;     HISTORY RESOURCE
2258              ;------------------------------------
2259              ;constants
2260  0010        LINE2    equ    16
2261
2262              ;external routines called
2263              ;display_time
2264              ;display_month
2265              ;d2d
2266              ;MESSAGE
2267
2268              ;     Title: Initialize all history
2269              ;
2270              ;     Purpose: Clear history ram area
2271              ;
2272              ;     Entry:
2273              ;     Exit: History cleared
2274              ;     RAM used:
2275
```

```
2276  D880              history_init:
2277  D880  A9 00            lda    #0              ;clear bank 0
2278  D882  20 90 D8         jsr    history_write_init
2279  D885  A9 01            lda    #1              ;clear bank 1
2280  D887  20 90 D8         jsr    history_write_init
2281  D88A  A9 02            lda    #2              ;clear bank 2
2282  D88C  20 90 D8         jsr    history_write_init
2283  D88F  60               rts
2284
2285
2286
2287                    ;     Title:   Initialize history bank
2288                    ;
2289                    ;     Purpose: Clear history ram area
2290                    ;
2291                    ;     Entry: A=bank number (0-2)
2292                    ;     Exit: History cleared
2293                    ;     RAM used: hwrite for selected bank
2294
2295  D890              history_write_init:
2296  D890  C9 02            cmp    #2
2297  D892  F0 28            beq    ?bank2
2298  D894  C9 01            cmp    #1
2299  D896  F0 12            beq    ?bank1
2300
2301  D898              ?bank0:
2302  D898                   LDW    hwrite0,history0
2308  D8A0  A9 00       ?0:  lda    #0              ;clear all entries
2309  D8A2  92 A0            sta    (hwrite0)
2310  D8A4  20 6A DA         jsr    inc_hwrite0
2311  D8A7  90 F7            bcc    ?0              ;until wraparound
2312  D8A9  60               rts
2313
2314  D8AA              ?bank1:
2315  D8AA                   LDW    hwrite1,history1
2321  D8B2  A9 00       ?1:  lda    #0              ;clear all entries
2322  D8B4  92 A4            sta    (hwrite1)
2323  D8B6  20 94 DA         jsr    inc_hwrite1
2324  D8B9  90 F7            bcc    ?1
2325  D8BB  60               rts
2326
2327  D8BC              ?bank2:
2328  D8BC                   LDW    hwrite2,history2
2334  D8C4  A9 00       ?2:  lda    #0              ;clear all entries
2335  D8C6  92 A8            sta    (hwrite2)
2336  D8C8  20 BE DA         jsr    inc_hwrite2
2337  D8CB  90 F7            bcc    ?2
2338  D8CD  60               rts
2339
2340
2341                    ;     Title:   History read init
2342                    ;
2343                    ;     Purpose: Put read pointer at oldest entry
2344                    ;
2345                    ;     Entry: A=bank number (0-2)
2346                    ;     Exit: hread initialized
2347                    ;     RAM used: hread for selected bank
```

```
2348
2349  D8CE                   history_read_init:
2350  D8CE  C9 02                    cmp    #2
2351  D8D0  F0 3C                    beq    ?bank2
2352  D8D2  C9 01                    cmp    #1
2353  D8D4  F0 1C                    beq    ?bank1
2354
2355  D8D6                   ?bank0:
2356  D8D6                            MOV16  hwrite0,hread0    ;start at write pointer
2362  D8DE  20 EB DA         ?0:     jsr    inc_hread0        ;read until key not 0,
2363  D8E1  B2 A2                    lda    (hread0)
2364  D8E3  D0 0C                    bne    ?1
2365  D8E5  A5 A2                    lda    hread0            ;or wrapped back to write ptr
2366  D8E7  C5 A0                    cmp    hwrite0           ;(history empty)
2367  D8E9  D0 F3                    bne    ?0
2368  D8EB  A5 A3                    lda    hread0+1
2369  D8ED  C5 A1                    cmp    hwrite0+1
2370  D8EF  D0 ED                    bne    ?0
2371  D8F1  60               ?1:     rts
2372
2373  D8F2                   ?bank1:
2374  D8F2                            MOV16  hwrite1,hread1    ;start at write pointer
2380  D8FA  20 0C DB         ?2:     jsr    inc_hread1        ;read until key not 0,
2381  D8FD  B2 A6                    lda    (hread1)
2382  D8FF  D0 0C                    bne    ?3
2383  D901  A5 A6                    lda    hread1            ;or wrapped back to write ptr
2384  D903  C5 A4                    cmp    hwrite1           ;(history empty)
2385  D905  D0 F3                    bne    ?2
2386  D907  A5 A7                    lda    hread1+1
2387  D909  C5 A5                    cmp    hwrite1+1
2388  D90B  D0 ED                    bne    ?2
2389  D90D  60               ?3:     rts
2390
2391  D90E                   ?bank2:
2392  D90E                            MOV16  hwrite2,hread2    ;start at write pointer
2398  D916  20 30 DB         ?4:     jsr    inc_hread2        ;read until key not 0,
2399  D919  B2 AA                    lda    (hread2)
2400  D91B  D0 0C                    bne    ?5
2401  D91D  A5 AA                    lda    hread2            ;or wrapped back to write ptr
2402  D91F  C5 A8                    cmp    hwrite2           ;(history empty)
2403  D921  D0 F3                    bne    ?4
2404  D923  A5 AB                    lda    hread2+1
2405  D925  C5 A9                    cmp    hwrite2+1
2406  D927  D0 ED                    bne    ?4
2407  D929  60               ?5:     rts
2408
2409
2410
2411                         ;       Title:  History write
2412                         ;
2413                         ;       Purpose: Store data in history
2414                         ;
2415                         ;       Entry: A=bank number (0-2)
2416                         ;              8 bytes on stack for storage
2417                         ;       Exit: hwrite incremented
2418                         ;       RAM used: hwrite for selected bank, hbfr
2419
```

```
2420  D92A                history_write:
2421  D92A  A8                    tay
2422  D92B  68                    pla                      ;save return addr
2423  D92C  8D 00 05              sta    retadr
2424  D92F  68                    pla
2425  D930  8D 01 05              sta    retadr+1
2426  D933  A2 07                 ldx    #7                ;get passed params
2427  D935  68          ?0:       pla
2428  D936  9D 65 02              sta    hbfr,x
2429  D939  CA                    dex
2430  D93A  10 F9                 bpl    ?0
2431  D93C  AD 01 05              lda    retadr+1          ;put back return addr
2432  D93F  48                    pha
2433  D940  AD 00 05              lda    retadr
2434  D943  48                    pha
2435
2436  D944  98                    tya
2437  D945  C9 02                 cmp    #2
2438  D947  F0 2A                 beq    ?bank2
2439  D949  C9 01                 cmp    #1
2440  D94B  F0 13                 beq    ?bank1
2441
2442                    ?bank0:                            ;write data to write pointer
2443  D94D  A2 00                 ldx    #0
2444  D94F  A0 00                 ldy    #0
2445  D951  BD 65 02   ?1:        lda    hbfr,x
2446  D954  91 A0                 sta    (hwrite0),y
2447  D956  C8                    iny
2448  D957  E8                    inx
2449  D958  E0 08                 cpx    #8
2450  D95A  D0 F5                 bne    ?1
2451  D95C  20 6A DA              jsr    inc_hwrite0       ;then point to next entry space
2452  D95F  60                    rts
2453
2454                    ?bank1:                            ;write data to write pointer
2455  D960  A2 00                 ldx    #0
2456  D962  A0 00                 ldy    #0
2457  D964  BD 65 02   ?2:        lda    hbfr,x
2458  D967  91 A4                 sta    (hwrite1),y
2459  D969  C8                    iny
2460  D96A  E8                    inx
2461  D96B  E0 08                 cpx    #8
2462  D96D  D0 F5                 bne    ?2
2463  D96F  20 94 DA              jsr    inc_hwrite1       ;then point to next entry space
2464  D972  60                    rts
2465
2466                    ?bank2:                            ;write data to write pointer
2467  D973  A2 00                 ldx    #0
2468  D975  A0 00                 ldy    #0
2469  D977  BD 65 02   ?3:        lda    hbfr,x
2470  D97A  91 A8                 sta    (hwrite2),y
2471  D97C  C8                    iny
2472  D97D  E8                    inx
2473  D97E  E0 08                 cpx    #8
2474  D980  D0 F5                 bne    ?3
2475  D982  20 BE DA              jsr    inc_hwrite2       ;then point to next entry space
2476  D985  60                    rts
```

```
2477
2478    D9E6
2479
2480                            ;   Title:   History read
2481                            ;
2482                            ;   Purpose: Retrieve data from history
2483                            ;
2484                            ;   Entry:   A=bank number (0-2)
2485                            ;   Exit:    8 bytes on stack
2486                            ;            hread incremented
2487                            ;   RAM used: hread for selected bank
2488
2489    D9E6                    history_read:
2490    D986    FA                      plx                     ;save return addr
2491    D987    8E 00 05                stx     retadr
2492    D98A    FA                      plx
2493    D98B    8E 01 05                stx     retadr+1
2494
2495    D98E    C9 02                   cmp     #2
2496    D990    F0 2A                   beq     ?bank2
2497    D992    C9 01                   cmp     #1
2498    D994    F0 13                   beq     ?bank1
2499
2500    D996            ?bank0:
2501    D996    A0 00                   ldy     #0
2502    D998    B1 A2           ?0:     lda     (hread0),y
2503    D99A    48                      pha
2504    D99B    C8                      iny
2505    D99C    C0 08                   cpy     #8
2506    D99E    D0 FB                   bne     ?0
2507    D9A0    B2 A2                   lda     (hread0)
2508    D9A2    F0 2B                   beq     ?done
2509    D9A4    20 E8 DA                jsr     inc_hread0
2510    D9A7    80 26                   bra     ?done
2511
2512    D9A9            ?bank1:
2513    D9A9    A0 00                   ldy     #0
2514    D9AB    B1 A6           ?1:     lda     (hread1),y
2515    D9AD    48                      pha
2516    D9AE    C8                      iny
2517    D9AF    C0 08                   cpy     #8
2518    D9B1    D0 FB                   bne     ?1
2519    D9B3    B2 A6                   lda     (hread1)
2520    D9B5    F0 1B                   beq     ?done
2521    D9B7    20 0C DB                jsr     inc_hread1
2522    D9BA    80 13                   bra     ?done
2523
2524    D9BC            ?bank2:
2525    D9BC    A0 00                   ldy     #0
2526    D9BE    B1 AA           ?2:     lda     (hread2),y
2527    D9C0    48                      pha
2528    D9C1    C8                      iny
2529    D9C2    C0 08                   cpy     #8
2530    D9C4    D0 FB                   bne     ?2
2531    D9C6    B2 AA                   lda     (hread2)
2532    D9C8    F0 05                   beq     ?done
2533    D9CA    20 30 DB                jsr     inc_hread2
```

```
2534  D9CD  80 00                      bra     ?done
2535
2536  D9CF  AD 01 05      ?done:       lda     retadr+1
2537  D9D2  48                         pha
2538  D9D3  AD 00 05                   lda     retadr
2539  D9D6  48                         pha
2540  D9D7  60                         rts
2541
2542
2543                      ;            Title: History backup
2544                      ;
2545                      ;            Purpose: Move read pointer back
2546                      ;
2547                      ;            Entry: A=bank number (0-2)
2548                      ;            Exit:  read pointer decremented
2549                      ;                   carry set if oldest entry
2550                      ;            RAM used: hread for selected bank
2551
2552  D9D8              history_backup:
2553  D9D8  C9 02                      cmp     #2
2554  D9DA  F0 5C                      beq     ?bank2
2555  D9DC  C9 01                      cmp     #1
2556  D9DE  F0 2C                      beq     ?bank1
2557
2558  D9E0              ?bank0:
2559  D9E0  A5 A2                      lda     hread0          ;if at top,
2560  D9E2  C9 02                      cmp     #<history0
2561  D9E4  D0 10                      bne     ?0
2562  D9E6  A5 A3                      lda     hread0+1
2563  D9E8  C9 05                      cmp     #>history0
2564  D9EA  D0 0A                      bne     ?0
2565  D9EC                             LDW     hread0,history0_end   ;then put at bottom
2571  D9F4  80 0D                      bra     ?1
2572  D9F6  38            ?0:          sec                     ;else dec read pointer
2573  D9F7  A5 A2                      lda     hread0
2574  D9F9  E9 08                      sbc     #8
2575  D9FB  85 A2                      sta     hread0
2576  D9FD  A5 A3                      lda     hread0+1
2577  D9FF  E9 00                      sbc     #0
2578  DA01  85 A3                      sta     hread0+1
2579  DA03  B2 A2         ?1:          lda     (hread0)        ;if points to dead space,
2580  DA05  D0 61                      bne     ?done
2581  DA07  20 E8 DA                   jsr     inc_hread0      ;then put it back
2582  DA0A  80 5A                      bra     ?end
2583
2584  DA0C              ?bank1:
2585  DA0C  A5 A6                      lda     hread1          ;if at top,
2586  DA0E  C9 02                      cmp     #<history1
2587  DA10  D0 10                      bne     ?2
2588  DA12  A5 A7                      lda     hread1+1
2589  DA14  C9 08                      cmp     #>history1
2590  DA16  D0 0A                      bne     ?2
2591  DA18                             LDW     hread1,history1_end   ;then put at bottom
2597  DA20  80 0D                      bra     ?3
2598  DA22  38            ?2:          sec                     ;dec read pointer
2599  DA23  A5 A6                      lda     hread1
2600  DA25  E9 08                      sbc     #8
```

```
2601  DA27  85 A6              sta   hread1
2602  DA29  A5 A7              lda   hread1+1
2603  DA2B  E9 00              sbc   #0
2604  DA2D  85 A7              sta   hread1+1
2605  DA2F  B2 A6       ?3:    lda   (hread1)         ;if points to dead space,
2606  DA31  D0 35              bne   ?done
2607  DA33  20 0C BB           jsr   inc_hread1       ;then put it back
2608  DA36  80 2E              bra   ?end
2609
2610  DA38               ?bank2:
2611  DA38  A5 AA              lda   hread2           ;if at top,
2612  DA3A  C9 B2              cmp   #<history2
2613  DA3C  D0 12              bne   ?4
2614  DA3E  A0 01              ldy   #1
2615  DA40  A5 AB              lda   hread2+1
2616  DA42  C9 08              cmp   #>history2
2617  DA44  D0 0A              bne   ?4
2618  DA46                     LDW   hread2,history2_end   ;then put at bottom
2624  DA4E  80 0D              bra   ?5
2625  DA50  38          ?4:    sec                    ;dec read pointer
2626  DA51  A5 AA              lda   hread2
2627  DA53  E9 08              sbc   #8
2628  DA55  85 AA              sta   hread2
2629  DA57  A5 AB              lda   hread2+1
2630  DA59  E9 00              sbc   #0
2631  DA5B  85 AB              sta   hread2+1
2632  DA5D  B2 AA       ?5:    lda   (hread2)         ;if points to dead space,
2633  DA5F  D0 07              bne   ?done
2634  DA61  20 30 BB           jsr   inc_hread2       ;then put it back
2635  DA64  80 00              bra   ?end
2636
2637  DA66  38          ?end:  sec
2638  DA67  60                 rts
2639  DA68  18          ?done: clc
2640  DA69  60                 rts
2641
2642
2643
2644                    inc_hwrite0:                   ;point to next entry
2645                                                   ;carry set if wraparound
2646  DA6A  A5 A0              lda   hwrite0          ;if pointer = end,
2647  DA6C  C9 FA              cmp   #<history0_end
2648  DA6E  D0 11              bne   ?3
2649  DA70  A5 A1              lda   hwrite0+1
2650  DA72  C9 07              cmp   #>history0_end
2651  DA74  D0 0B              bne   ?3
2652  DA76                     LDW   hwrite0,history0 ;then reset to beginning
2658  DA7E  38                 sec
2659  DA7F  80 0E              bra   ?4
2660  DA81  18          ?3:    clc                    ;else inc pointer
2661  DA82  A5 A0              lda   hwrite0
2662  DA84  69 08              adc   #8
2663  DA86  85 A0              sta   hwrite0
2664  DA88  A5 A1              lda   hwrite0+1
2665  DA8A  69 00              adc   #0
2666  DA8C  85 A1              sta   hwrite0+1
2667  DA8E  18                 clc
```

```
2668  DA8F  A9 00       ?4:    lda   #0              ;mark new entry as empty
2669  DA91  92 A0              sta   (hwrite0)
2670  DA93  60                 rts
2671
2672                    inc_hwrite1:                 ;point to next entry
2673  DA94  A5 A4              lda   hwrite1         ;if pointer = end,
2674  DA96  C9 7A              cmp   #<history1_end
2675  DA98  D0 11              bne   ?3
2676  DA9A  A5 A5              lda   hwrite1+1
2677  DA9C  C9 08              cmp   #>history1_end
2678  DA9E  D0 0B              bne   ?3
2679  DAA0                     LDW   hwrite1,history1   ;then reset to beginning
2685  DAA8  38                 sec
2686  DAA9  80 0E              bra   ?4
2687  DAAB  18          ?3:    clc                   ;else inc pointer
2688  DAAC  A5 A4              lda   hwrite1
2689  DAAE  69 08              adc   #8
2690  DAB0  85 A4              sta   hwrite1
2691  DAB2  A5 A5              lda   hwrite1+1
2692  DAB4  69 00              adc   #0
2693  DAB6  85 A5              sta   hwrite1+1
2694  DAB8  18                 clc
2695  DAB9  A9 00       ?4:    lda   #0              ;mark new entry as empty
2696  DABB  92 A4              sta   (hwrite1)
2697  DABD  60                 rts
2698
2699                    inc_hwrite2:                 ;point to next entry
2700  DABE  A5 A8              lda   hwrite2         ;if pointer = end,
2701  DAC0  C9 FA              cmp   #<history2_end
2702  DAC2  D0 11              bne   ?3
2703  DAC4  A5 A9              lda   hwrite2+1
2704  DAC6  C9 08              cmp   #>history2_end
2705  DAC8  D0 0B              bne   ?3
2706  DACA                     LDW   hwrite2,history2   ;then reset to beginning
2712  DAD2  38                 sec
2713  DAD3  80 0E              bra   ?4
2714  DAD5  18          ?3:    clc                   ;else inc pointer
2715  DAD6  A5 A8              lda   hwrite2
2716  DAD8  69 08              adc   #8
2717  DADA  85 A8              sta   hwrite2
2718  DADC  A5 A9              lda   hwrite2+1
2719  DADE  69 00              adc   #0
2720  DAE0  85 A9              sta   hwrite2+1
2721  DAE2  18                 clc
2722  DAE3  A9 00       ?4:    lda   #0              ;mark new entry as empty
2723  DAE5  92 A8              sta   (hwrite2)
2724  DAE7  60                 rts
2725
2726
2727                    inc_hread0:                  ;point to next entry
2728  DAE8  A5 A2              lda   hread0          ;if pointer = end,
2729  DAEA  C9 FA              cmp   #<history0_end
2730  DAEC  D0 10              bne   ?3
2731  DAEE  A5 A3              lda   hread0+1
2732  DAF0  C9 07              cmp   #>history0_end
2733  DAF2  D0 0A              bne   ?3
2734  DAF4                     LDW   hread0,history0    ;then reset to beginning
```

```
2740  DAFC  80 0D                bra     ?4
2741  DAFE  18        ?3:        clc                     ;else inc pointer
2742  DAFF  A5 A2                lda     hread0
2743  DB01  69 08                adc     #8
2744  DB03  85 A2                sta     hread0
2745  DB05  A5 A3                lda     hread0+1
2746  DB07  69 00                adc     #0
2747  DB09  85 A3                sta     hread0+1
2748  DB0B  60        ?4:        rts
2749
2750                  inc_hread1:                         ;point to next entry
2751  DB0C  A5 A6                lda     hread1          ;if pointer = end,
2752  DB0E  C9 7A                cmp     #<history1_end
2753  DB10  D0 10                bne     ?3
2754  DB12  A5 A7                lda     hread1+1
2755  DB14  C9 08                cmp     #>history1_end
2756  DB16  D0 0A                bne     ?3
2757  DB18                       LDW     hread1,history1 ;then reset to beginning
2763  DB20  80 0D                bra     ?4
2764  DB22  18        ?3:        clc                     ;else inc pointer
2765  DB23  A5 A6                lda     hread1
2766  DB25  69 08                adc     #8
2767  DB27  85 A6                sta     hread1
2768  DB29  A5 A7                lda     hread1+1
2769  DB2B  69 00                adc     #0
2770  DB2D  85 A7                sta     hread1+1
2771  DB2F  60        ?4:        rts
2772
2773                  inc_hread2:                         ;point to next entry
2774  DB30  A5 AA                lda     hread2          ;if pointer = end,
2775  DB32  C9 FA                cmp     #<history2_end
2776  DB34  D0 10                bne     ?3
2777  DB36  A5 AB                lda     hread2+1
2778  DB38  C9 08                cmp     #>history2_end
2779  DB3A  D0 0A                bne     ?3
2780  DB3C                       LDW     hread2,history2 ;then reset to beginning
2786  DB44  80 0D                bra     ?4
2787  DB46  18        ?3:        clc                     ;else inc pointer
2788  DB47  A5 AA                lda     hread2
2789  DB49  69 08                adc     #8
2790  DB4B  85 AA                sta     hread2
2791  DB4D  A5 AB                lda     hread2+1
2792  DB4F  69 00                adc     #0
2793  DB51  85 AB                sta     hread2+1
2794  DB53  60        ?4:        rts
2795
2796
2797
2798
2799
2800
2801
2802
2803
2804
2805
```

```
2807   [E54                    INCLUDE      FIELD.ASM
2808                         ;----------------------------------
2809                         ;    FIELD MANAGER
2810                         ;----------------------------------
2811
2812                              COMMENT  * This resource contains functions which
2813                              control the video RAM and may also use the keyboard.
2814                              The DISPLAY MANAGER is responsible for displaying
2815                              the video RAM on the LCD screen.  *
2816
2817
2818
2819                         ;    Title: Clear video
2820                         ;
2821                         ;    Purpose: Clear video RAM & set index to
2822                         ;             upper left hand corner
2823                         ;
2824                         ;    Entry: none
2825                         ;    Exit: none
2826                         ;    RAM used: none
2827   DB54
2828   DB54                    video_clear:
2829   DB54  A2 00                    ldx    #0              ;fill video RAM with spaces
2830   DB56  A9 20             ?1:    lda    #$20
2831   DB58  9D 19 02                 sta    video,x
2832   DB5B  A9 80                    lda    #10000000b      ;attribute=new, no blink
2833   DB5D  9D 39 02                 sta    attribute,x
2834   DB60  E8                       inx
2835   DB61  E0 20                    cpx    #32
2836   DB63  D0 F1                    bne    ?1
2837   DB65  9C 18 02                 stz    char_index
2838   DB68  9C 59 02                 stz    cursor
2839   DB6B  A9 80                    lda    #10000000b      ;cursor is off
2840   DB6D  8D 5A 02                 sta    cursor+1
2841   DB70  60                       rts
2842
2843
2844                         ;    Title: Clear line 2
2845                         ;
2846                         ;    Purpose: Erase bottom line of video RAM,
2847                         ;             put index at beginning of bottom line
2848                         ;
2849                         ;    Entry: none
2850                         ;    Exit: none
2851                         ;    RAM used: none
2852
2853   DB71                    line2_clear:
2854   DB71  A2 10                    ldx    #16             ;fill video RAM with spaces
2855   DB73  A9 20             ?1:    lda    #$20
2856   DB75  9D 19 02                 sta    video,x
2857   DB78  A9 80                    lda    #10000000b      ;attribute=new, no blink
2858   DB7A  9D 39 02                 sta    attribute,x
2859   DB7D  E8                       inx
2860   DB7E  E0 20                    cpx    #32
2861   DB80  D0 F1                    bne    ?1
2862   DB82  A9 10                    lda    #16
2863   DB84  8D 18 02                 sta    char_index
```

```
2864  DB87  8D 59 02                sta     cursor
2865  DB8A  A9 80                   lda     #10000000b        ;cursor is off
2866  DB8C  8D 5A 02                sta     cursor+1
2867  DB8F  60                      rts
2868
2869
2870                        ;       Title:  Stop blink
2871                        ;
2872                        ;       Purpose: Kill all blinking
2873                        ;
2874                        ;       Entry: none
2875                        ;       Exit: none
2876                        ;       RAM used: none
2877
2878  DB90              stop_blink:
2879  DB90  A2 00                   ldx     #0
2880  DB92  BD 39 02      ?1:       lda     attribute,x       ;if blinking,
2881  DB95  29 40                   and     #01000000b
2882  DB97  F0 05                   beq     ?2
2883  DB99  A9 80                   lda     #10000000b        ;then stop it
2884  DB9B  9D 39 02                sta     attribute,x
2885  DB9E  E8            ?2:       inx
2886  DB9F  E0 20                   cpx     #32
2887  DBA1  D0 EF                   bne     ?1
2888  DBA3  60                      rts
2889
2890
2891                        ;       Title:  Blink cursor
2892                        ;
2893                        ;       Purpose: Start cursor blinking at it's present position
2894                        ;
2895                        ;       Entry: char_index=video RAM location
2896                        ;       Exit: none
2897                        ;       RAM used: none
2898
2899  DBA4              blink_cursor:
2900  DBA4  A9 E0                   lda     #11100000b        ;attribute is new, blink,
2901  DBA6  8D 5A 02                sta     cursor+1          ;and enable
2902  DBA9  60                      rts
2903
2904
2905                        ;       Title:  Blink character
2906                        ;
2907                        ;       Purpose: Blink the char at index
2908                        ;
2909                        ;       Entry: char_index=video RAM location
2910                        ;       Exit: none
2911                        ;       RAM used: none
2912
2913  DBAA              blink_char:
2914  DBAA  AE 18 02                ldx     char_index
2915  DBAD  BD 39 02                lda     attribute,x       ;tell attribute to blink
2916  DBB0  09 40                   ora     #01000000b
2917  DBB2  9D 39 02                sta     attribute,x
2918  DBB5  60                      rts
2919
2920
```

```
2921                    ;       Title:  Display character
2922                    ;
2923                    ;       Purpose: Put char in video RAM, increment char_index
2924                    ;
2925                    ;       Entry: char in A, char_index=video RAM location
2926                    ;       Exit: char_index incremented
2927                    ;       RAM used: none
2928
2929   DBB6                     dchar:
2930   DBB6   DA                        phx
2931   DBB7   AE 1B 02                  ldx     char_index
2932   DBBA   9D 19 02                  sta     video,x
2933   DBBD   A9 80                     lda     #10000000b      ;attribute=nev, no blink
2934   DBBF   9D 39 02                  sta     attribute,x
2935   DBC2   EE 1B 02                  inc     char_index      ;inc index
2936   DBC5   AD 1B 02                  lda     char_index      ;don't allow past 31
2937   DBC8   29 1F                     and     #00011111b
2938   DBCA   8D 1B 02                  sta     char_index
2939   DBCD   FA                        plx
2940   DBCE   60                        rts
2941
2942                    ;       Title: Blink character
2943                    ;
2944                    ;       Purpose: Put blinking char in video RAM, increment char_index
2945                    ;
2946                    ;       Entry: char in A, char_index=video RAM location
2947                    ;       Exit: char_index incremented
2948                    ;       RAM used: none
2949
2950   DBCF                     bchar:
2951   DBCF   DA                        phx
2952   DBD0   AE 1B 02                  ldx     char_index
2953   DBD3   9D 19 02                  sta     video,x
2954   DBD6   A9 C0                     lda     #11000000b      ;attribute=nev & blink
2955   DBD8   9D 39 02                  sta     attribute,x
2956   DBDB   EE 1B 02                  inc     char_index
2957   DBDE   AD 1B 02                  lda     char_index      ;don't allow past 31
2958   DBE1   29 1F                     and     #00011111b
2959   DBE3   8D 1B 02                  sta     char_index
2960   DBE6   FA                        plx
2961   DBE7   60                        rts
2962
2963
2964                    ;       Title: Display message
2965                    ;
2966                    ;       Purpose: Show bytes until 0
2967                    ;
2968                    ;       Entry: A=msb of message address, Y=lsb
2969                    ;              char_index=video RAM location
2970                    ;       Exit: msgptr at end of msg+1
2971                    ;       RAM used: msgptr
2972
2973   DBE8                     display_msg:
2974   DBE8   85 AF                     sta     msgptr+1
2975   DBEA   84 AE                     sty     msgptr
2976   DBEC   B2 AE            ?0:      lda     (msgptr)        ;get byte
2977   DBEE   F0 12                     beq     ?2              ;if 0 then done
```

```
2978  DBF0  20 B6 DB            jsr    dchar           ;else display it
2979  DBF3             inc16   msgptr          ;then get next byte
2988  DC00  80 EA               bra    ?0
2989  DC02           ?2:  inc16   msgptr
2998  DC0F  60                  rts
2999
3000
3001                  ;       Title:  Display day of the week
3002                  ;
3003                  ;       Purpose:  Put 3 char day of week in video RAM
3004                  ;
3005                  ;       Entry:  day of week (1-7) in A, char_index=video RAM location,
3006                  ;                table of 3 char messages at dowmsg
3007                  ;       Exit: none
3008                  ;       RAM used:  scratch
3009
3010  DC10                display_dow:
3011  DC10  85 B0               sta    scratch
3012  DC12  C9 08               cmp    #8
3013  DC14                      BLT    ?0
3016  DC16  A9 07               lda    #7
3017  DC18  85 B0               sta    scratch
3018  DC1A           ?0:  LDW    msgptr,dowmsg   ;message begins at
3024  DC22  C6 B0    ?1:  dec    scratch         ;dowmsg + 4*(dow-1)
3025  DC24  A5 B0         lda    scratch
3026  DC26  F0 0F         beq    ?2
3027  DC28  18            clc
3028  DC29  A5 AE         lda    msgptr
3029  DC2B  69 04         adc    #4
3030  DC2D  85 AE         sta    msgptr
3031  DC2F  A5 AF         lda    msgptr+1
3032  DC31  69 00         adc    #0
3033  DC33  85 AF         sta    msgptr+1
3034  DC35  80 EB         bra    ?1
3035  DC37  A4 AE   ?2:   ldy    msgptr
3036  DC39  A5 AF         lda    msgptr+1
3037  DC3B  20 E6 DB      jsr    display_msg
3038  DC3E  60            rts
3039
3040
3041                  ;       Title:  Display month
3042                  ;
3043                  ;       Purpose:  Put 3 char month in video RAM
3044                  ;
3045                  ;       Entry:  month (1-12) in A, char_index=video RAM location,
3046                  ;                table of 3 char messages at monmsg
3047                  ;       Exit: none
3048                  ;       RAM used:  scratch
3049
3050  DC3F               display_month:
3051  DC3F  85 B0               sta    scratch
3052  DC41  C9 0D               cmp    #13
3053  DC43                      BLT    ?0
3056  DC45  A9 0C               lda    #12
3057  DC47  85 B0               sta    scratch
3058  DC49           ?0:  LDW    msgptr,monmsg   ;message begins at
3064  DC51  C6 B0    ?1:  DEC    SCRATCH         ;monmsg + 4*(month-1)
```

```
3065  DC53  A5 B0              lda    scratch
3066  DC55  F0 0F              beq    ?2
3067  DC57  18                 clc
3068  DC58  A5 AE              lda    msgptr
3069  DC5A  69 04              adc    #4
3070  DC5C  85 AE              sta    msgptr
3071  DC5E  A5 AF              lda    msgptr+1
3072  DC60  69 00              adc    #0
3073  DC62  85 AF              sta    msgptr+1
3074  DC64  80 EB              bra    ?1
3075  DC66  A4 AE       ?2:    ldy    msgptr
3076  DC68  A5 AF              lda    msgptr+1
3077  DC6A  20 EB DB           jsr    display_msg
3078  DC6D  60                 rts
3079
3080
3081                    ;      Title: Display date
3082                    ;
3083                    ;      Purpose: Show month, day, year
3084                    ;
3085                    ;      Entry: month (1-12) in A, char_index=video RAM location,
3086                    ;             Y= day, X=year (0-99)
3087                    ;      Exit: none
3088                    ;      RAM used: scratch+2,+3
3089
3090  DC6E              display_date:
3091  DC6E  84 B3              sty    scratch+3
3092  DC70  86 B2              stx    scratch+2
3093  DC72  20 3F DC           jsr    display_month
3094  DC75              SKIP   1
3100  DC7E  A5 B3              lda    scratch+3
3101  DC80  20 01 DD           jsr    d2d
3102  DC83              DISP   ','
3106  DC88              DISP   $27
3110  DC8D  A5 B2              lda    scratch+2
3111  DC8F  20 26 DD           jsr    d2dxx
3112  DC92  60                 rts
3113
3114
3115                    ;      Title: Display time
3116                    ;
3117                    ;      Purpose: Show time as hh:mm
3118                    ;
3119                    ;      Entry: hour in A, minute in Y, char_index=video RAM location
3120                    ;      Exit: none
3121                    ;      RAM used: scratch+1
3122
3123              display_time:                    ;display the hour and minute
3124  DC93  85 B0              sta    scratch      ;store hour
3125  DC95  84 B1              sty    scratch+1    ;store minute
3126
3127  DC97  A5 B0              lda    scratch      ;show 12 if hour=0
3128  DC99  F0 09              beq    ?3
3129  DC9B  C9 0D              cmp    #13
3130  DC9D              blt    ?0
3133  DC9F  38                 sec                 ;if hour>12 then show hour-12
3134  DCA0  E9 0C              sbc    #12
```

```
3135  DCA2  80 02            bra   ?0
3136  DCA4  A9 0C      ?3:   lda   #12
3137  DCA6  20 01 DD   ?0:   jsr   d2d
3138  DCA9  A9 3A            lda   #':'
3139  DCAB  20 B6 DB         jsr   dchar
3140  DCAE  A5 B1            lda   scratch+1    ;show minute
3141  DCB0  20 26 DD         jsr   d2dxx        ;without suppressing leading 0
3142  DCB3  A5 B0            lda   scratch
3143  DCB5  C9 00            cmp   #0
3144  DCB7  F0 08            beq   ?1
3145  DCB9  C9 ??            cmp   #12          ;show am or pm
3146  DCBB                   blt   ?1
3149  DCBD  A9 70            lda   #'p'
3150  DCBF  80 02            bra   ?2
3151  DCC1  A9 61      ?1:   lda   #'a'
3152  DCC3  20 B6 DB   ?2:   jsr   dchar
3153  DCC6  A9 6D            lda   #'m'
3154  DCC8  20 B6 DB         jsr   dchar
3155  DCCB  60         ?10:  rts
3156
3157
3158                         ;     Title: Display 3 digits
3159                         ;
3160                         ;     Purpose: Display number as 3 digits with leading blanks
3161                         ;
3162                         ;     Entry: A=number (255 max)
3163                         ;     Exit: none
3164                         ;     RAM used: none
3165
3166  DCCC  20 00 00   d3d:  jsr   R9_bindec
3167  DCCF  68               pla
3168  DCD0  C9 30            cmp   #'0'
3169  DCD2  D0 0E            bne   ?1
3170  DCD4  A9 20            lda   #' '
3171  DCD6  20 B6 DB         jsr   dchar
3172  DCD9  68               pla
3173  DCDA  C9 30            cmp   #'0'
3174  DCDC  D0 08            bne   ?2
3175  DCDE  A9 20            lda   #' '
3176  DCE0  80 04            bra   ?2
3177  DCE2  20 B6 DB   ?1:   jsr   dchar
3178  DCE5  68               pla
3179  DCE6  20 B6 DB   ?2:   jsr   dchar
3180  DCE9  68               pla
3181  DCEA  20 B6 DB         jsr   dchar
3182  DCED  60               rts
3183
3184                         ;     Title: Blinken
3185                         ;
3186                         ;     Purpose: Blink a number of previously displayed chars
3187                         ;
3188                         ;     Entry: A=number of chars to blink
3189                         ;            X=starting location
3190                         ;     Exit: none
3191                         ;     RAM used: none
3192
3193  DCEE             blinken:
```

```
3194  DCEE  A8                         tay
3195  DCEF  C0 00        ?1:           cpy    #0                ;while # of chars >0,
3196  DCF1  F0 0D                      beq    ?done
3197  DCF3  88                         dey
3198  DCF4  E0 20                      cpx    #32               ;and still on the screen,
3199  DCF6                             BGE    ?done
3202  DCF8  A9 C0                      lda    #11000000b        ;blink it
3203  DCFA  9D 39 02                   sta    attribute,x
3204  DCFD  E8                         inx
3205  DCFE  80 EF                      bra    ?1
3206  DD00  60           ?done:        rts
3207
3208
3209
3210                     ;             Title: Display 2 digits
3211                     ;
3212                     ;             Purpose: Display number as 2 digits with leading blanks
3213                     ;                      99 maximum
3214                     ;             Entry: A=number
3215                     ;             Exit: none
3216                     ;             RAM used:  none
3217
3218  DD01  20 00 00     d2d:          jsr    R9_bindec
3219  DD04  68                         pla                      ;if third digit not zero
3220  DD05  C9 30                      cmp    #'0'
3221  DD07  F0 0E                      beq    ?0
3222  DD09  68                         pla
3223  DD0A  A9 39                      lda    #'9'              ;then display 99
3224  DD0C  20 B6 DB                   jsr    dchar
3225  DD0F  68                         pla
3226  DD10  A9 39                      lda    #'9'
3227  DD12  20 B6 DB                   jsr    dchar
3228  DD15  80 0E                      bra    ?1
3229  DD17  68           ?0:           pla
3230  DD18  C9 30                      cmp    #'0'
3231  DD1A  D0 02                      bne    ?2
3232  DD1C  A9 20                      lda    #' '
3233  DD1E  20 B6 DB     ?2:           jsr    dchar
3234  DD21  68                         pla
3235  DD22  20 B6 DB                   jsr    dchar
3236  DD25  60           ?1:           rts
3237
3238
3239
3240                     ;             Title: Display 2 digits as XX
3241                     ;
3242                     ;             Purpose: Display number as 2 digits with leading zero
3243                     ;                      99 maximum
3244                     ;             Entry: A=number
3245                     ;             Exit: none
3246                     ;             RAM used:  none
3247
3248  DD26  20 00 00     d2dxx:        jsr    R9_bindec
3249  DD29  68                         pla                      ;if third digit not zero
3250  DD2A  C9 30                      cmp    #'0'
3251  DD2C  F0 0E                      beq    ?0
3252  DD2E  68                         pla
```

```
3253  DD2F  A9 39              lda   #'9'           ;then display 99
3254  DD31  20 B6 BB           jsr   dchar
3255  DD34  68                 pla
3256  DD35  A9 39              lda   #'9'
3257  DD37  20 B6 BB           jsr   dchar
3258  DD3A  80 08              bra   ?1
3259  DD3C  68          ?0:    pla
3260  DD3D  20 B6 BB           jsr   dchar
3261  DD40  68                 pla
3262  DD41  20 B6 BB           jsr   dchar
3263  DD44  60          ?1:    rts
3264
3265
3266
3267
3268                     ;     Title: Get number
3269                     ;
3270                     ;     Purpose: Input number from user, 255 max.
3271                     ;     Entry: A=present value, Y=cursor location
3272                     ;            X=0 for no leading zeros, 1 shows leading zero if 2 chars
3273                     ;            stack: down limit, up limit, increment value
3274                     ;     Exit: Number in A, carry set if Help requested
3275                     ;     RAM used: scratch+6, char_index
3276
3277                     get_number:                 ;save parameters
3278  DD45  85 B0              sta   scratch         ;present value
3279  DD47  84 B1              sty   scratch+1       ;cursor location
3280  DD49  86 B5              stx   scratch+5
3281
3282  DD4B               save_retadr                 ;return address
3288  DD53  68                 pla
3289  DD54  85 B2              sta   scratch+2       ;down limit
3290  DD56  68                 pla
3291  DD57  85 B3              sta   scratch+3       ;up limit
3292  DD59  68                 pla
3293  DD5A  85 B4              sta   scratch+4       ;increment value
3294  DD5C               get_retadr                  ;put return addr back
3300  DD64  A9 03              lda   #3              ;fast key repeat
3301  DD66  20 00 00           jsr   R2_repeat_rate
3302
3303  DD69  A5 B3              lda   scratch+3       ;if highest num>=100
3304  DD6B  C9 64              cmp   #100
3305  DD6D                     blt   ?h2
3308  DD6F  A9 03              lda   #3              ;then display 3 digits
3309  DD71  80 0A              bra   ?h
3310  DD73  C9 0A       ?h2:   cmp   #10             ;if >=10
3311  DD75                     blt   ?h3
3314  DD77  A9 02              lda   #2              ;then display 2 digits
3315  DD79  80 02              bra   ?h
3316  DD7B  A9 01       ?h3:   lda   #1              ;else display 1 digit
3317  DD7D  85 B6       ?h:    sta   scratch+6
3318
3319  DD7F  A5 B1       ?0:    lda   scratch+1       ;start displaying at cursor
3320  DD81  8D 18 02           sta   char_index
3321
3322  DD84  A5 B0              lda   scratch         ;if num>upper limit
3323  DD86  C5 B3              cmp   scratch+3
```

```
3324  DDB8                      blt    ?5
3327  DD8A   F0 04              beq    ?5
3328  DD8C   A5 B2              lda    scratch+2      ;then num=down limit
3329  DD8E   85 B0              sta    scratch
3330  DD90   A5 B0       ?5:    lda    scratch        ;if num<down limit
3331  DD92   C5 B2              cmp    scratch+2
3332  DD94                      bge    ?1
3335  DD96   A5 B3              lda    scratch+3      ;then num=up limit
3336  DD98   85 B0              sta    scratch
3337
3338  DD9A   A5 B6       ?1:    lda    scratch+6      ;display number
3339  DD9C   C9 03              cmp    #3
3340  DD9E   D0 07              bne    ?2
3341  DDA0   A5 B0              lda    scratch        ;display 3 digits
3342  DDA2   20 CC DC           jsr    d3d
3343  DDA5   80 1F              bra    ?4
3344  DDA7   C9 02       ?2:    cmp    #2
3345  DDA9   D0 12              bne    ?3
3346  DDAB   A5 B5              lda    scratch+5      ;display 2 digits
3347  DDAD   F0 07              beq    ?9
3348  DDAF   A5 B0              lda    scratch
3349  DDB1   20 26 DD           jsr    d2dxx
3350  DDB4   80 10              bra    ?4
3351  DDB6   A5 B0       ?9:    lda    scratch
3352  DDB8   20 01 DD           jsr    d2d
3353  DDBB   80 09              bra    ?4
3354  DDBD   A5 B0       ?3:    lda    scratch
3355  DDBF   09 30              ora    #$30           ;else display 1 digit
3356  DDC1   20 B6 DB           jsr    dchar
3357  DDC4   80 00              bra    ?4
3358
3359  DDC6   20 00 00    ?4:    jsr    R1_blink_init
3360
3361  DDC9   A5 B6       ?1:    lda    scratch+6      ;wait for key, blinking
3362  DDCB   A6 B1              ldx    scratch+1
3363  DDCD   20 EE DC           jsr    blinkem
3364  DDD0   20 00 00    ?a:    jsr    GETKEY
3365  DDD3   F0 FB              beq    ?a
3366
3367                    ?n:                           ;got a key
3368  DDD5   C9 01              cmp    #okkey
3369  DDD7   F0 26              beq    ?ok
3370  DDD9   C9 02              cmp    #helpkey
3371  DDDB   F0 29              beq    ?help
3372  DDDD   C9 03              cmp    #upkey
3373  DDDF   F0 02              beq    ?up
3374  DDE1   80 0E              bra    ?down
3375
3376
3377  DDE3   A5 B0       ?up:   lda    scratch        ;up key, inc num
3378  DDE5   18                 clc
3379  DDE6   65 B4              adc    scratch+4
3380  DDE8   90 02              bcc    ?7
3381  DDEA   A5 B2              lda    scratch+2      ;if >255 then down limit
3382  DDEC   85 B0       ?7:    sta    scratch
3383  DDEE   4C 7F DD           jmp    ?0
3384
```

```
3385  BDF1  A5 B0      ?down:  lda    scratch         ;down key, dec num
3386  BDF3  38                 sec
3387  BDF4  E5 B4              sbc    scratch+4
3388  BDF6  B0 02              bcs    ?8
3389  BDF8  A5 B3              lda    scratch+3       ;if <0 then up limit
3390  BDFA  85 B0      ?8:     sta    scratch
3391  BDFC  4C 7F BD           jmp    ?0
3392
3393  BDFF  20 90 BB   ?ok:    jsr    stop_blink      ;OK, return num and carry clear
3394  BE02  A5 B0              lda    scratch
3395  BE04  18                 clc
3396  BE05  60                 rts
3397                   ?help:                         ;HELP, return carry set
3398  BE06  A5 B0              lda    scratch
3399  BE08  38                 sec
3400  BE09  60                 rts
3401
3402
3403
3404
3405                   ;       Title: Get option
3406                   ;
3407                   ;       Purpose: Make a selection from a list of options
3408                   ;
3409                   ;       Entry: A=present choice, Y=cursor location
3410                   ;              X=mode (0=no blink, 1=blink) (not done, always blinks.
3411                   ;              stack: address of start of option messages
3412                   ;                     each message terminated by 0; end of list=0,0
3413                   ;       Exit: Option number in A (from 0 to number in list-1)
3414                   ;             carry set if help requested
3415                   ;       RAM used: scratch+6, char_index, msgptr
3416                   ;                 option_list, len_list
3417
3418
3419                   get_option:                     ;save entry parameters
3420  BE0A  85 B0              sta    scratch         ;current selection
3421  BE0C  84 B1              sty    scratch+1       ;cursor location
3422  BE0E  86 B2              stx    scratch+2       ;mode
3423
3424  BE10              save_retadr                    ;save return addr
3430  BE18  68                 pla
3431  BE19  85 AE              sta    msgptr
3432  BE1B  68                 pla
3433  BE1C  85 AF              sta    msgptr+1
3434  BE1E              get_retadr                     ;put return addr back
3440  BE26  A9 09              lda    #9              ;repeat at slow rate
3441  BE28  20 00 00           jsr    R2_repeat_rate
3442
3443                                                  ;build option list
3444  BE2B  64 B3              stz    scratch+3       ;# of list entries
3445  BE2D  B2 AE      ?11:    lda    (msgptr)        ;while messages,
3446  BE2F  F0 3F              beq    ?1done
3447  BE31  A6 B3              ldx    scratch+3       ;store message start
3448  BE33  8A                 txa
3449  BE34  0A                 asl    a
3450  BE35  AA                 tax
3451  BE36  A5 AE              lda    msgptr
```

```
3452  DE38  9D 0D 09             sta    option_list,x
3453  DE3B  A5 AF                lda    msgptr+1
3454  DE3D  9D 0E 09             sta    option_list+1,x
3455  DE40  A6 B3                ldx    scratch+3
3456  DE42  9E 3F 09             stz    len_list,x
3457  DE45  A6 B3        ?10:    ldx    scratch+3          ;calculate message length
3458  DE47  FE 3F 09             inc    len_list,x
3459  DE4A                       inc16  msgptr
3468  DE57  B2 AE                lda    (msgptr)
3469  DE59  D0 EA                bne    ?10
3470  DE5B                       inc16  msgptr             ;point to next message
3479  DE68  E6 B3                inc    scratch+3
3480  DE6A  A5 B3                lda    scratch+3          ;maximum of 25
3481  DE6C  C9 19                cmp    #25
3482  DE6E                       blt    ?11
3485  DE70         ?1done:
3486
3487  DE70  A5 B0        ?0:     lda    scratch            ;if selection<0
3488  DE72  10 08                bpl    ?2
3489  DE74  A5 B3                lda    scratch+3          ;then make it up limit-1
3490  DE76  85 B0                sta    scratch
3491  DE78  C6 B0                dec    scratch
3492  DE7A  80 08                bra    ?1
3493  DE7C  A5 B0        ?2:     lda    scratch            ;if selection>=up limit
3494  DE7E  C5 B3                cmp    scratch+3
3495  DE80                       blt    ?1
3498  DE82  64 B0                stz    scratch            ;then start at top of option list
3499
3500  DE84  A6 B0        ?1:     ldx    scratch            ;get msgptr from option list
3501  DE86  8A                   txa
3502  DE87  0A                   asl    a
3503  DE88  AA                   tax
3504  DE89  BC 0D 09             ldy    option_list,x
3505  DE8C  BD 0E 09             lda    option_list+1,x
3506  DE8F  A6 B1                ldx    scratch+1          ;start at user supplied addr
3507  DE91  8E 18 02             stx    char_index
3508  DE94  20 E8 DB     ?5:     jsr    display_msg        ;show the option
3509
3510
3511  DE97  20 00 00     ?4:     jsr    R1_blink_init
3512
3513  DE9A  A6 B0        ?1:     ldx    scratch            ;wait for key, blinking
3514  DE9C  BD 3F 09             lda    len_list,x
3515  DE9F  A6 B1                ldx    scratch+1
3516  DEA1  20 EE DC             jsr    blinkem
3517  DEA4  20 00 00     ?m:     jsr    GETKEY
3518  DEA7  F0 FB                beq    ?m
3519
3520  DEA9  C9 01        ?n:     cmp    #okkey             ;got a key
3521  DEAB  F0 1E                beq    ?ok
3522  DEAD  C9 02                cmp    #helpkey
3523  DEAF  F0 21                beq    ?help
3524  DEB1  C9 03                cmp    #upkey
3525  DEB3  F0 06                beq    ?up
3526  DEB5  C9 04                cmp    #downkey
3527  DEB7  F0 0A                beq    ?down
3528  DEB9  80 DC                bra    ?4
```

```
3529
3530  DEBB  20 D6 DE    ?up:    jsr     erase        ;up key
3531  DEBE  E6 90               inc     scratch
3532  DEC0  4C 70 DE            jmp     ?0
3533
3534  DEC3  20 D6 DE    ?down:  jsr     erase        ;down key
3535  DEC6  C6 90               dec     scratch
3536  DEC8  4C 70 DE            jmp     ?0
3537
3538  DECB  20 90 DB    ?ok:    jsr     stop_blink   ;OK, return num and carry clear
3539  DECE  A5 90               lda     scratch
3540  DED0  18                  clc
3541  DED1  60                  rts
3542  DED2  A5 90       ?help:  lda     scratch      ;HELP, return carry set
3543  DED4  38                  sec
3544  DED5  60                  rts
3545
3546              erase:                             ;wipe out chars
3547                                                 ;len_list,scratch has # of chars
3548                                                 ;char_index is at end of message+1
3549  DED6  A5 91               lda     scratch+1
3550  DED8  8D 18 02            sta     char_index
3551  DEDB  A6 90               ldx     scratch
3552  DEDD  BD 3F 09            lda     len_list,x
3553  DEE0  AA                  tax
3554  DEE1  CA          ?0:     dex
3555  DEE2  30 07               bmi     ?done
3556  DEE4  A9 20               lda     #' '
3557  DEE6  20 B6 DB            jsr     dchar
3558  DEE9  80 F6               bra     ?0
3559  DEEB  60          ?done:  rts
3560
3561
3562
3563              ;       Title:  Display spaces
3564              ;
3565              ;       Purpose:  Clear area of video RAM starting at char_index
3566              ;
3567              ;       Entry: # of spaces in A, char_index=video RAM location
3568              ;       Exit:  none
3569              ;       RAM used:  none
3570
3571  DEEC              spaces:
3572  DEEC  AA                  tax
3573  DEED  A9 20       ?0:     lda     #' '
3574  DEEF  20 B6 DB            jsr     dchar
3575  DEF2  CA                  dex
3576  DEF3  D0 F8               bne     ?0
3577  DEF5  60                  rts
3578
3579
3580              ;       Title:  Set alpha
3581              ;
3582              ;       Purpose: Input one alpha-numeric character at char_index
3583              ;
3584              ;       Entry: A= present choice, Y=cursor location
3585              ;       Exit: character in A, carry set if help requested
```

```
3586                    ;       char_index incremented by 1
3587                    ;       RAM used: scratch+1
3588
3589  DEF6              get_alpha:
3590  DEF6  85 B0               sta     scratch      ;save entry parameters
3591  DEF8  84 B1               sty     scratch+1
3592  DEFA  A9 04               lda     #4           ;fast repeat
3593  DEFC  20 00 00            jsr     R2_repeat_rate
3594
3595  DEFF  A5 B1       ?0:     lda     scratch+1    ;display at cursor
3596  DF01  8D 18 02            sta     char_index
3597
3598  DF04  A5 B0               lda     scratch      ;must be 0-36
3599  DF06  10 06               bpl     ?2
3600  DF08  A9 24               lda     #36
3601  DF0A  85 B0               sta     scratch
3602  DF0C  80 0B               bra     ?1
3603  DF0E  C9 24       ?2:     cmp     #36
3604  DF10                      blt     ?1
3607  DF12  F0 02               beq     ?1
3608  DF14  64 B0               stz     scratch
3609
3610  DF16  A6 B0       ?1:     ldx     scratch      ;show the selected char
3611  DF18  BD 9C DF            lda     antbl,x
3612  DF1B  20 CF DB            jsr     bchar
3613
3614  DF1E  20 00 00    ?4:     jsr     R1_blink_init
3615  DF21
3616  DF21  20 00 00    ?a:     jsr     GETKEY       ;wait for key
3617  DF24  F0 FB               beq     ?a
3618  DF26  C9 01               cmp     #okkey
3619  DF28  F0 16               beq     ?ok
3620  DF2A  C9 02               cmp     #helpkey
3621  DF2C  F0 19               beq     ?help
3622  DF2E  C9 03               cmp     #upkey
3623  DF30  F0 06               beq     ?up
3624  DF32  C9 04               cmp     #downkey
3625  DF34  F0 06               beq     ?down
3626  DF36  80 E6               bra     ?4
3627
3628  DF38  E6 B0       ?up:    inc     scratch      ;up key, inc num
3629  DF3A  80 C3               bra     ?0
3630
3631  DF3C  C6 B0       ?down:  dec     scratch      ;down key, dec num
3632  DF3E  80 BF               bra     ?0
3633
3634  DF40  20 90 DB    ?ok:    jsr     stop_blink   ;OK, return num and carry clear
3635  DF43  A5 B0               lda     scratch
3636  DF45  18                  clc
3637  DF46  60                  rts
3638  DF47  20 90 DB    ?help:  jsr     stop_blink   ;HELP, return carry set
3639  DF4A  A5 B0               lda     scratch
3640  DF4C  38                  sec
3641  DF4D  60                  rts
3642
3643
```

```
3645                            ;         CONSTANTS
3646                            ;-------------------------------------
3647
3648                            dowmsg:                         ;days of the week
3649    DF4E  4D 4F 4E 00               BYTE    'MON',0
3650    DF52  54 55 45 00               BYTE    'TUE',0
3651    DF56  57 45 44 00               BYTE    'WED',0
3652    DF5A  54 48 55 00               BYTE    'THU',0
3653    DF5E  46 52 49 00               BYTE    'FRI',0
3654    DF62  53 41 54 00               BYTE    'SAT',0
3655    DF66  53 55 4E 00 00            BYTE    'SUN',0,0
3656
3657                            monmsg:                         ;months of the year
3658    DF6B  4A 41 4E 00               BYTE    'JAN',0
3659    DF6F  46 45 42 00               BYTE    'FEB',0
3660    DF73  4D 41 52 00               BYTE    'MAR',0
3661    DF77  41 50 52 00               BYTE    'APR',0
3662    DF7B  4D 41 59 00               BYTE    'MAY',0
3663    DF7F  4A 55 4E 00               BYTE    'JUN',0
3664    DF83  4A 55 4C 00               BYTE    'JUL',0
3665    DF87  41 55 47 00               BYTE    'AUG',0
3666    DF8B  53 45 50 00               BYTE    'SEP',0
3667    DF8F  4F 43 54 00               BYTE    'OCT',0
3668    DF93  4E 4F 56 00               BYTE    'NOV',0
3669    DF97  44 45 43 00 00            BYTE    'DEC',0,0
3670
3671                            antbl:                          ;alpha-numeric chars
3672    DF9C  2D 41 42 43 44            BYTE    '-ABCDEFGHIJKLMNOPQRSTUVWXYZ1234567890'
3673
3674
3675                            ;       Title:  Enter time
3676                            ;
3677                            ;       Purpose:  Input time from user
3678                            ;
3679                            ;       Entry: A=hour, Y=minute, char_index
3680                            ;       Exit: A=hour, Y=minute
3681                            ;             carry set if help requested
3682                            ;       RAM used: fscratch, scratch+10,11
3683
3684    DFC1                    enter_time:
3685    DFC1  85 BA                     sta     scratch+10      ;save hour, minute
3686    DFC3  84 BB                     sty     scratch+11
3687    DFC5  AD 18 02                  lda     char_index      ;store starting location
3688    DFC8  8D 58 09                  sta     fscratch
3689
3690    DFCB  A5 BA                     lda     scratch+10      ;start at present value
3691    DFCD  AC 58 09                  ldy     fscratch        ;at cursor location
3692    DFD0  8C 18 02                  sty     char_index
3693    DFD3  A2 E0                     ldx     #>timetbl
3694    DFD5  DA                        phx
3695    DFD6  A2 1A                     ldx     #<timetbl
3696    DFD8  DA                        phx
3697    DFD9  A2 01                     ldx     #1
3698    DFDB  20 0A DE                  jsr     get_option      ;get hour
3699    DFDE  B0 38                     bcs     ?help
3700
3710    DFE0  85 BA                     STA     SCRATCH+10
```

```
3702
3703   DFE2  AD 58 09        ?1:     lda     fscratch
3704   DFE5  8D 18 02                sta     char_index
3705   DFE8  A5 BA                   lda     scratch+10
3706   DFEA  A4 BB                   ldy     scratch+11
3707   DFEC  20 93 DC                jsr     display_time
3708   DFEF  AD 58 09                lda     fscratch           ;move cursor to minute field
3709   DFF2  8D 18 02                sta     char_index
3710   DFF5                          SKIP    3
3716   DFFE  A5 BB                   lda     scratch+11         ;now get minute
3717   E000  A2 01                   ldx     #1
3718   E002  DA                      phx
3719   E003  A2 3B                   ldx     #59
3720   E005  DA                      phx
3721   E006  A2 00                   ldx     #0
3722   E008  DA                      phx
3723   E009  AC 18 02                ldy     char_index
3724   E00C  A2 01                   ldx     #1                 ;with leading zeros
3725   E00E  20 45 DD                jsr     get_number
3726   E011  B0 05                   bcs     ?help
3727   E013  A8                      tay
3728   E014  A5 BA                   lda     scratch+10
3729   E016  18                      clc
3730   E017  60                      rts
3731   E018  38               ?help: sec
3732   E019  60                      rts
3733
3734                          timetbl:                          ;messages for 24 hours
3735   E01A  31 32 3A 4D 69          BYTE    '12:Midn',0
3736   E022  20 31 3A 20 20          BYTE    ' 1:  am',0
3737   E02A  20 32 3A 20 20          BYTE    ' 2:  am',0
3738   E032  20 33 3A 20 20          BYTE    ' 3:  am',0
3739   E03A  20 34 3A 20 20          BYTE    ' 4:  am',0
3740   E042  20 35 3A 20 20          BYTE    ' 5:  am',0
3741   E04A  20 36 3A 20 20          BYTE    ' 6:  am',0
3742   E052  20 37 3A 20 20          BYTE    ' 7:  am',0
3743   E05A  20 38 3A 20 20          BYTE    ' 8:  am',0
3744   E062  20 39 3A 20 20          BYTE    ' 9:  am',0
3745   E06A  31 30 3A 20 20          BYTE    '10:  am',0
3746   E072  31 31 3A 20 20          BYTE    '11:  am',0
3747   E07A  31 32 3A 4E 6F          BYTE    '12:Noon',0
3748   E082  20 31 3A 20 20          BYTE    ' 1:  pm',0
3749   E08A  20 32 3A 20 20          BYTE    ' 2:  pm',0
3750   E092  20 33 3A 20 20          BYTE    ' 3:  pm',0
3751   E09A  20 34 3A 20 20          BYTE    ' 4:  pm',0
3752   E0A2  20 35 3A 20 20          BYTE    ' 5:  pm',0
3753   E0AA  20 36 3A 20 20          BYTE    ' 6:  pm',0
3754   E0B2  20 37 3A 20 20          BYTE    ' 7:  pm',0
3755   E0BA  20 38 3A 20 20          BYTE    ' 8:  pm',0
3756   E0C2  20 39 3A 20 20          BYTE    ' 9:  pm',0
3757   E0CA  31 30 3A 20 20          BYTE    '10:  pm',0
3758   E0D2  31 31 3A 20 20          BYTE    '11:  pm',0,0
3759
3760
3761                          ;       Title:   Get month
3762                          ;
3763                          ;       Purpose: Input month from user
```

```
3764                             ;
3765                             ;   Entry: A=month(1-12), char_index
3766                             ;   Exit: A=month
3767                             ;         carry set if help requested
3768                             ;   RAM used: fscratch, scratch
3769
3770   E0D8            get_month:
3771   E0DB  85 B0             sta     scratch       ;save month
3772   E0DD  C6 B0             dec     scratch
3773   E0DF  AD 18 02          lda     char_index    ;store starting location
3774   E0E2  8D 58 09          sta     fscratch
3775
3776   E0E5  A5 B0             lda     scratch       ;start at present value
3777   E0E7  AC 58 09          ldy     fscratch      ;at cursor location
3778   E0EA  8C 18 02          sty     char_index
3779   E0ED  A2 DF             ldx     #>monmsg
3780   E0EF  DA                phx
3781   E0F0  A2 6B             ldx     #<monmsg
3782   E0F2  DA                phx
3783   E0F3  A2 01             ldx     #1
3784   E0F5  20 0A DE          jsr     get_option    ;get month
3785   E0F8  B0 08             bcs     ?help
3786
3787   E0FA  85 B0             sta     scratch       ;returns 0-6
3788   E0FC  E6 B0             inc     scratch       ;make it 1-7
3789   E0FE  A5 B0             lda     scratch
3790   E100  18                clc
3791   E101  60                rts
3792   E102  38        ?help:  sec
3793   E103  60                rts
3794
3795
3796                             ;   Title: Get day of the week
3797                             ;
3798                             ;   Purpose: Input dow from user
3799                             ;
3800                             ;   Entry: A=dow(1-7), char_index
3801                             ;   Exit: A=dow
3802                             ;         carry set if help requested
3803                             ;   RAM used: fscratch, scratch
3804
3805   E104            get_dow:
3806   E104  85 B0             sta     scratch       ;save month
3807   E106  C6 B0             dec     scratch
3808   E108  AD 18 02          lda     char_index    ;store starting location
3809   E10B  8D 58 09          sta     fscratch
3810
3811   E10E  A5 B0             lda     scratch       ;start at present value
3812   E110  AC 58 09          ldy     fscratch      ;at cursor location
3813   E113  8C 18 02          sty     char_index
3814   E116  A2 DF             ldx     #>dowmsg
3815   E118  DA                phx
3816   E119  A2 4E             ldx     #<dowmsg
3817   E11B  DA                phx
3818   E11C  A2 01             ldx     #1
3819   E11E  20 0A DE          jsr     get_option    ;get month
3820   E121  B0 08             bcs     ?help
```

```
3821
3822    E123   85 B0                sta     scratch
3823    E125   E6 B0                inc     scratch
3824    E127   A5 B0                lda     scratch
3825    E129   18                   clc
3826    E12A   60                   rts
3827    E12B   38          ?help:   sec
3828    E12C   60                   rts
3829
3830
3831                         ;       Title:   display alpha-numeric
3832                         ;
3833                         ;       Purpose: Show one character from alpha-numeric table
3834                         ;
3835                         ;       Entry: A=table entry (0-36)
3836                         ;       Exit: char displayed
3837                         ;       RAM used:  none
3838
3839    E12D                disp_an:
3840    E12D   AA                   tax
3841    E12E   BD 9C DF             lda     antbl,x
3842    E131   20 B6 DB             jsr     dchar
3843    E134   60                   rts
3844
3845
3846
3847
3848
3849
3850
3851    E135                         INCLUDE    HELPMAN.ASM
3852                         ;------------------------------------
3853                         ;       HELP MANAGER
3854                         ;------------------------------------
3855
3856                                 COMMENT  * These functions control the retrieval
3857                                 and display of help messages.  *
3858
3859
3860
3861                         ;       Title:  Help Manager
3862                         ;
3863                         ;       Purpose: Display help output
3864                         ;
3865                         ;       Entry:  Y= lo address of help message
3866                         ;               A= hi address of help message
3867                         ;               message is of the form:
3868                         ;                   'text',0       1st line of 1st screen
3869                         ;                   'text',0       2nd line of 1st screen
3870                         ;                   'text',0       1st line of 2nd screen
3871                         ;                   'text',0       2nd line of 2nd screen
3872                         ;                   ....
3873                         ;                   'text',0,0     last line of last screen
3874                         ;                                  (last screen can be 1 or 2 lines)
3875                         ;
3876                         ;       Exit: video RAM is intact
3877                         ;       RAM used: msgptr
```

```
3878
3879  E135                help_manager:
3880  E135  84 AE                       sty   msgptr              ;message address
3881  E137  85 AF                       sta   msgptr+1
3882
3883  E139  7B                          sei
3884  E13A  A2 00                       ldx   #0                  ;save current video RAM
3885  E13C  BD 19 02      ?1:           lda   video,x
3886  E13F  9D 86 09                    sta   video_store,x
3887  E142  E8                          inx
3888  E143  E0 42                       cpx   #66
3889  E145  D0 F5                       bne   ?1
3890
3891  E147  9C 85 09                    stz   helpram+1           ;build list of line start addrs
3892                                                              ;0 if blank second line
3893
3894  E14A  B2 AE         ?c:           lda   (msgptr)            ;if msg exists,
3895  E14C  F0 6E                       beq   ?done
3896  E14E  AE 85 09                    ldx   helpram+1           ;put addr of 1st line in list
3897  E151                              DBLX
3904  E156                              DBLX
3911  E15B  A5 AE                       lda   msgptr
3912  E15D  9D 5C 09                    sta   helplist,x
3913  E160  A5 AF                       lda   msgptr+1
3914  E162  9D 5D 09                    sta   helplist+1,x
3915  E165                ?a:           inc16 msgptr              ;move msgptr to beginning of 2nd line
3924  E172  B2 AE                       lda   (msgptr)
3925  E174  D0 EF                       bne   ?a
3926  E176                              inc16 msgptr
3935
3936  E183  B2 AE                       lda   (msgptr)
3937  E185  D0 08                       bne   ?b                  ;2nd line
3938  E187  9E 5E 09                    stz   helplist+2,x        ;none, put 0 in list
3939  E18A  9E 5F 09                    stz   helplist+3,x
3940  E18D  80 2B                       bra   ?next
3941  E18F  A5 AE         ?b:           lda   msgptr              ;else put addr of line 2 in list
3942  E191  9D 5E 09                    sta   helplist+2,x
3943  E194  A5 AF                       lda   msgptr+1
3944  E196  9D 5F 09                    sta   helplist+3,x
3945  E199                ?d:           inc16 msgptr              ;move msgptr to next msg
3954  E1A6  B2 AE                       lda   (msgptr)
3955  E1A8  D0 EF                       bne   ?d
3956  E1AA                              inc16 msgptr
3965
3966  E1B7  EE 85 09      ?next:  inc   helpram+1           ;one more screen in list
3967  E1BA  80 8E                       bra   ?c                  ;see if any more
3968                      ?done:                                  ;no more
3969  E1BC  9C 84 09                    stz   helpram             ;begin display at 1st screen
3970  E1BF  58                          cli
3971
3972                      new_screen:                             ;show the screen (helpram=index)
3973  E1C0  20 00 00                    JSR   DKCLR
3974  E1C3  AE 84 09                    ldx   helpram
3975  E1C6                              DBLX
3982  E1CB                              DBLX
3983  E1D0  BC 5C 09                    ldy   helplist,x
3990  E1D3  BD 5D 09                    lda   helplist+1,x
```

```
3991  E1D6  DA                      phx
3992  E1D7  20 E8 DB                jsr    display_msg      ;1st line
3993  E1DA  FA                      plx
3994  E1DB  BD 5E 09                lda    helplist+2,x     ;if 2nd line,
3995  E1DE  1D 5F 09                ora    helplist+3,x
3996  E1E1  F0 0E                   beq    ?n1
3997  E1E3                          SET_CURSOR LINE2        ;then display it
4001  E1EB  BC 5E 09                ldy    helplist+2,x
4002  E1EB  BD 5F 09                lda    helplist+3,x
4003  E1EE  20 E8 DB                jsr    display_msg
4004  E1F1           ?n1:           SET_CURSOR LINE2+15
4008  E1F6  A9 06                   lda    #6               ;blinking arrow in corner
4009  E1F8  20 CF DB                jsr    bchar
4010
4011  E1FB  A5 13    ?n2:   LDA     STATUS2
4012  E1FD  29 29           AND     #00101001B              ;look for HELP-NO-OK
4013  E1FF  C9 29           CMP     #00101001B
4014  E201  D0 0C           BNE     ?n3
4015  E203  A5 13    ?12:   LDA     STATUS2                 ;wait for keys released
4016  E205  29 29           and     #00101001b
4017  E207  D0 FA           BNE     ?12
4018  E209  20 56 D6                jsr    monitor
4019  E20C  4C 3A E2                jmp    ?done
4020
4021  E20F  20 00 00 ?n3:   JSR     GETKEY                  ;wait for response
4022  E212  F0 E7                   beq    ?n2
4023  E214  C9 04                   cmp    #downkey
4024  E216  F0 14                   beq    ?last
4025  E218  C9 03                   cmp    #upkey
4026  E21A  F0 02                   beq    ?next
4027  E21C  80 DD                   bra    ?n2
4028
4029  E21E  EE 84 09 ?next: inc     helpram                 ;next screen
4030  E221  AD 84 09                lda    helpram
4031  E224  CD 85 09                cmp    helpram+1
4032  E227  F0 11                   beq    ?done            ;done if no more screens
4033  E229  4C C0 E1                jmp    new_screen
4034
4035  E22C  CE 84 09 ?last: dec     helpram                 ;backup a screen
4036  E22F  AD 84 09                lda    helpram
4037  E232  10 03                   bpl    ?3               ;only to first screen
4038  E234  9C 84 09                stz    helpram
4039  E237  4C C0 E1 ?3:    jmp     new_screen
4040
4041  E23A  78       ?done: sei
4042  E23B  A2 00                   ldx    #0               ;restore video RAM
4043  E23D  BD 86 09 ?2:    lda     video_store,x
4044  E240  9D 19 02                sta    video,x
4045  E243  E8                      inx
4046  E244  E0 42                   cpx    #66
4047  E246  D0 F5                   bne    ?2
4048  E249  A2 00                   ldx    #0               ;all new chars
4049  E24A  BD 39 02 ?d1:   lda     attribute,x
4050  E24D  09 80                   ora    #10000000b
4051  E24F  9D 39 02                sta    attribute,x
4052  E252  E8                      inx
4053  E253  E0 20                   cpx    #32
```

```
4054   E255  D0 F3              bne     ?d1
4055   E257  58                 cli
4056
4057   E258  60                 rts
4058
4059
4060
4061
4062
4063
4064
4065   E259                     END 1                            TITLE   'Controller Firmware, Version 3.06'
   2
   3                       ;    by Dennis Kaiser
   4                       ;    SOLATROL, Inc.
   5                       ;    San Diego, CA,  3 Apr 89
   6
   7                       ;    Code for the 65C02 processor
   8                       ;    Clock speed 455 KHz, cycle time 2.2 microseconds
   9
  10                       ;    This module must be linked with LIBRARY and KERNAL to create
  11                       ;    the finished code LEIT.HEX. Download the hex file to the
  12                       ;    EPROM programmer with an offset of $80. This means that
  13                       ;    the code assembled at $8000 will be physically in the
  14                       ;    $0000-$7FFF area of the EPROM.
  15
  16
  17   0000                     CHIP            65C02
  18                            MACLIST         OFF
  19                            ASCLIST         OFF
  20
  21                            LIST            ON
  22   0000                     INCLUDE         EQUATES.ASM
  23                       ;----------------------------------
  24                       ;    MEMORY MAP
  25                       ;----------------------------------
  26
  27                       ;00-3F      I/O
  28                       ;40-7FFF    RAM
  29                       ;8000-FFFF  ROM
  30
  31                       ;00         0  Microprocessor power off
  32                       ;01         0  RTC counter clear
  33                       ;02         0  A/D power, 1=on, 0=off
  34                       ;03         0  A/D interface, 1=enable, 0=disable
  35                       ;04         0  LCD power, 1=on, 0=off
  36                       ;05         0  LCD interface, 1=enable, 0=disable
  37                       ;06         0  Valve select byte
  38                       ;                 bits 0-2 - valve #, + side
  39                       ;                 bits 3-5 - valve #, - side
  40                       ;                 bit 6 - polarity, 0=normal, 1=reversed
  41                       ;07         0  Valve enable, 1=on, 0=off
  42                       ;08         0  TIMER hi byte latch
  43                       ;09         0  TIMER lo byte latch
  44                       ;0A         0  TIMER control, 1=on, 0=off
```

```
45              ;0B          0  RTC, 1=10 seconds, 0=1 minute
46              ;0C          0  Serial clock
47              ;0D          0  TIMER load
48              ;0E          0  Write serial data out
49              ;0F          0  Serial output ready
50              ;10          I  RTC counter hi byte
51              ;11          I  RTC counter lo byte
52              ;12          I  Status register 1
53              ;                  bit 0 - 0=external battery present
54              ;                  bit 1 - 1=watchdog timeout
55              ;                  bit 2 - 0=system power low
56              ;                  bit 3 - 0=system power very low
57              ;                  bit 4 - 0=RTC pulse
58              ;                  bit 5 - 1=battery low or caps charging
59              ;                  bit 6 - 1=serial data link present
60              ;                  bit 7 - 0=serial data link ready
61              ;13          I  Status register 2
62              ;                  bit 0 - Switch 1, 1=pressed STOP
63              ;                  bit 1 - Switch 2
64              ;                  bit 2 - Switch 3
65              ;                  bit 3 - Switch 4 HELP
66              ;                  bit 4 - Switch 5 NO
67              ;                  bit 5 - Switch 6 OK
68              ;                  bit 6 -
69              ;                  bit 7 - 0=A/D end of conversion
70              ;14          I  Read serial data in
71              ;15          I  Read A/D converter
72              ;16          I  Load serial shift register
73              ;17          I  Clear input ready latch
74              ;18          I  LCD busy flag & address counter (RS=0)
75              ;                  bit 7 - 1=busy
76              ;            0  LCD instruction register (RS=0)
77              ;19          I  LCD read data (RS=1)
78              ;            0  LCD write data (RS=1)
79              ;1A          0  LCD contrast select (0-7)
80              ;1B          0  Clear watchdog timer
81              ;1C          0  Clock RTC counter
82              ;1D          IO EEPROM
83              ;1E          0  Coil test drivers
84              ;1F          0  Sensor test drivers
85              ;20          0  Start A/D channel 0, sensor 1
86              ;21          0  Start A/D channel 1, sensor 2
87              ;22          0  Start A/D channel 2, sensor 3
88              ;23          0  Start A/D channel 3, sensor 4
89              ;24          0  Start A/D channel 4, sensor 5
90              ;25          0  Start A/D channel 5, sensor 6
91              ;26          0  Start A/D channel 6, sensor 7
92              ;27          0  Start A/D channel 7, sensor 8
93              ;28          0  Start A/D channel 8, valve 1
94              ;29          0  Start A/D channel 9, valve 2
95              ;2A          0  Start A/D channel 10, valve 3
96              ;2B          0  Start A/D channel 11, valve 4
97              ;2C          0  Start A/D channel 12, valve 5
98              ;2D          0  Start A/D channel 13, valve 6
99              ;2E          0  Start A/D channel 14, valve 7
100             ;2F          0  Start A/D channel 15, valve 8
101             ;30-3F       Unused memory mapped area
```

```
102              ;40-9B          Zero page for application program (bank 0)
103              ;9C-9F          Zero page for application (bank 1)
104              ;A0-BF          Zero page for library
105              ;C0-FF          Zero page for kernel
106              ;100-1FF        Stack
107              ;200-2FF        Global variables
108              ;300-4FF        Kernel ram
109              ;500-9FF        Library ram
110              ;A00-1FFF       Application ram, to 8K
111              ;2000-7FFF      Reserved for future 32K ram
112              ;8000           ROM start, bank 1
113              ;8000-CFFF      application code
114              ;D000-EFFF      library code
115              ;F000-FFF9      kernal code
116              ;FFFA-FFFB      NMI vector
117              ;FFFC-FFFD      RESET vector
118              ;FFFE-FFFF      IRQ vector
119              ;8000-FFFF      ROM bank 2, messages
120
121              ;-----------------------------------
122              ;      VARIABLES, ZERO PAGE
123              ;-----------------------------------
124
125              ;RAM LOCATIONS
126  0000                        PAGE0
127  0040                        ORG     $40       ;application ram
128
129  0040        LSB        ds   1         ;general purpose register
130  0041        MSB        ds   1         ;general purpose register
131  0042        ADCHANNEL  ds   1         ;A/D channel number
132  0043        TIMCTR     ds   1         ;down counter for TIMER int
133  0044        TIMCTR2    ds   1         ;another one
134  0045        VALVE      ds   1         ;valve number
135  0046        MODE       ds   2         ;present menu selection
136  0048        sub_mode   ds   1
137  0049        iptr       ds   2         ;general purpose input pointer
138
139  004B        FLAGS      ds   1         ;bit 0 - 1=power key in
140                                        ;bit 1 - 1=serial data link
141                                        ;bit 2 - 1=SL
142                                        ;bit 3 - stay idle when pwrkey out
143
144  004C        CTR        ds   2         ;16 bit counter
145  004E        srcptr     ds   2         ;source pointer
146  0050        destptr    ds   2         ;destination pointer
147  0052        ERROR      ds   1         ;passing errors from subroutines
148  0053        SECCTR     ds   2         ;counts seconds
149  0055        R1         ds   1         ;local use registers
150  0056        R2         ds   1
151  0057        R3         ds   1
152  0058        R4         ds   1
153  0059        OFFSET     ds   4         ;next available start time
154  005D        CONTRAST   ds   1         ;LCD contrast
155  005E        SCREENS    ds   1         ;how many screens to display
156  005F        SCREEN     ds   1         ;the current screen displayed
157  0060        SUB        ds   1         ;which sub source in use
158  0061        ALTCLK     ds   2         ;clock for semi-auto to use
159  0063        WATERCLK   ds   2         ;actual clock in use
```

```
160  0065              POSITION    ds    1      ;valve/sensor connector location
161  0066              R5          ds    1
162  0067              STTS        ds    1      ;status byte at reset
163  0068              R6          ds    1
164  0069              QUOTIENT    ds    2      ;result of divide
165  006B              STARTPTR    ds    2      ;pointer into daily schedule
166  006D              STARTCTR    ds    1      ;the current start
167  006E              specram     ds    3      ;ram for entering specials
168
169  0071              scratch     ds    $10
170  0081              gptr        ds    2      ;pointer for generator
171  0083
172
173                   ;------------------------------------
174                   ;    VARIABLES, NON ZERO-PAGE
175                   ;------------------------------------
176
177  0000                          DATA
178
179  0A00                          ORG   $0A00   ;application ram
180
181  0A00              msgbfr      ds    256     ;messages from bank1
182
183
184                   ;------------------------------------
185                   ;    eeprom virtual ram area
186                   ;------------------------------------
187
188  0B00              eeram:
189
190  0B00              CNAME       ds    9      ;controller name
191  0B09              PASSWORD    ds    1      ;password used to gain entry 0=disabled
192  0B0A              PASS1       ds    3      ;passwords
193  0B0D              PASS2       ds    3
194  0B10              PASS3       ds    3
195  0B13              FACTORY     ds    4      ;start time, duration(2) for backup pgm
196  0B17              VALVEID     ds    9      ;valve position and polarity
197  0B20              SENSORID    ds    9      ;same deal for sensors
198  0B29              TERRAIN     ds    9      ;terrain
199  0B32              SPRINKLER   ds    9      ;sprinkler type
200  0B3B              numsta      ds    1      ;number of stations to use
201  0B3C              pump        ds    1      ;station # to use as pump
202  0B3D                          ds    29     ;spares
203  0B5A                          ds    18     ;spares
204  0B6C                          ds    18     ;spares
205  0B7E              eesum       ds    2      ;last 2 bytes are checksum
206                   ;           -----------
207                   ;    total            128
208
209
210                   ;------------------------------------
211                   ;    RUN PARAMETERS
212                   ;------------------------------------
213
214  0BB0              EXEC_BLOCK:
215
216  0BB0              SOURCE      ds    1      ;program in use
```

```
217   0B81              SEMIAUTO     ds    1        ;bit 7 - 1=do semi-auto
218                                                  ;bit 6 - 1=use test dur
219                                                  ;bit 5 - 1=use soak dur
220   0B82              SEMI_TEST    ds    1        ;semi-auto test duration
221   0B83              RAIN_DELAY   ds    1        ;# of days to wait before run
222   0B84              BUDGET_TYPE  ds    1        ;1=use monthly budgets, 0=yearly
223   0B85              YEAR_BUDGET  ds    1        ;yearly budget
224   0B86              MO_BUDGET    ds    13       ;monthly budgets
225                                                  ;1st byte is hottest month
226   0B93              FINETUNE     ds    1        ;budget multiplier (10-200%)
227   0B94              DAYNUM       ds    4        ;day to generate
228                                                  ;byte 0-1=day #
229                                                  ;byte 2-3=wk #
230   0B98              SPECDAY      ds    4        ;special day to generate
231
232   0B9C                           ds    5        ;spares
233                     ;                 ----------
234                     ;     total       34
235
236
237   0BA1              RUN_BLOCK:
238
239   0BA1              ENABLES      ds    9        ;which valves to water with
240   0BAA              new_time     ds    2        ;start running at this time
241   0BAC              done         ds    1        ;1=schedule completed
242   0BAD              idle         ds    1        ;1=inhibit all valve turn ons
243   0BAE                           ds    4        ;spares
244                     ;                 ----------
245                     ;     total       17
246
247
248                     ;----------------------------------
249                     ;     SCHEDULE STORAGE
250                     ;----------------------------------
251
252         012C        SOURCELEN    equ   300
253   0BB2              MAIN         ds    SOURCELEN  ;Main program
254   0CDE              ALT          ds    SOURCELEN  ;Alternate program
255
256
257                     ;----------------------------------
258                     ;     OBJECT STORAGE
259                     ;----------------------------------
260
261                                                  ;this is the schedule currently in use
262   0E0A              OBJBASE:
263   0E0A              SOURCE_TYPE  ds    1        ;source type 0=main, 1=alt, 2=factory
264   0E0B              CYCLE_TYPE   ds    1        ;0=so many, 1=specific, 2=odd, 3=even
265
266   0E0C              MAXON        ds    9        ;maximum on time
267   0E15              MINOFF       ds    9        ;minimum off time for splits
268   0E1E              XFROM        ds    2        ;excluded time, from-to
269   0E20              XTO          ds    2
270   0E22
271   0E22              DUR1         ds    18       ;base durations
272   0E34              CYCLE1       ds    18       ;base cycles
273   0E46              BASE_START   ds    2        ;time of first start
```

```
275  0E48            DUR2             ds      18      ;syringe durations
276  0E5A            CYCLE2           ds      18      ;cycles (daily if syringe)
277  0E6C            ACTIVE_MONTH     ds      13      ;months to syringe
278  0E79            SYRINGE_START    ds      2       ;time to start syringing
279  0E7B            SYRINGE_END      ds      2       ;time to end syringes
280  0E7D            SOFTEN           ds      2       ;how often to syringe
281
282  0E7F            DUR3             ds      18      ;soak durations
283  0E91            CYCLE3           ds      18      ;soak cycles
284
285  0EA3            NSPECIAL         ds      1       ;number of special starts
286  0EA4            SPECIALS:        ds      128     ;special starts begin here, 16*8 bytes
287
288  0F24                             ds      18      ;spares
289                  ;                                -----------
290                  ;       total                    300
291
292
293                  ;-----------------------------------
294                  ;       DAILY SCHEDULE
295                  ;-----------------------------------
296
297                  daily_schedule:                  ;daily schedule (from GENERATE)
298  0F36            NSTARTS          ds      1       ;number of starts for the day
299  0F37            DONETIME         ds      2       ;when schedule is finished
300  0F39            NSPLIT           ds      9       ;# of starts generated for each valve
301  0F42            NSYR             ds      1       ;total number of syringes
302  0F43            NSPEC            ds      9       ;# of specials for each valve
303  0F4C            STARTS           ds      1024    ;128 starts @ 8 bytes each
304
305
306                  ;-----------------------------------
307                  ;       HISTORY STORAGE
308                  ;-----------------------------------
309
310  134C            HISTORY          ds      1016    ;127 history entries @ 8 bytes each
311  1744            HEND             ds      8       ;last entry
312
313                  ;-----------------------------------
314                  ;       MACHINE-MACHINE INTERFACE
315                  ;-----------------------------------
316
317  174C            mmi_cmd          ds      1       ;command byte (location)
318  174D            mmi_bfr          ds      512     ;data in/out
319
320
321                  ;-----------------------------------
322                  ;       MAILBOXES
323                  ;-----------------------------------
324
325
326                  ;-----------------------------------
327                  ;       MISC. APPLICATION STORAGE
328                  ;-----------------------------------
329
330  194D            DEFAULT          ds      8       ;storage for defaults
331
```

```
333  1???           VCTR         ds    18    ;duration down counters
334                                          ;number of base starts displayed
335  1???           TR           ds    18    ;time remaining for watering
336  19??           TIMEON       ds    18    ;how long valve was on
337  1???           S            ds     2    ;start time for valve
338  1???           E            ds     2    ;end time for valve
339  1???           WT           ds     2    ;watering time for valve
340  1???           NXTTIME      ds    18    ;next watering time while generating
341  1???           BASETYPE     ds     9    ;0=base watering, 2=soak
342  1???           SNUM         ds     1    ;number of syringes (end-start / how often)
343  1???           gram         ds     5    ;scratch area
344  19??           gbfr         ds    10    ;for parameter passing
345  19??           gctr         ds     2    ;counter
346
347  19??           SL           ds     1    ;1=System Low flag
348  19FF           VSYR         ds     9    ;number of syringes displayed
349  19??           VSPEC        ds     9    ;number of special starts displayed
350  19D1           REVIEW       ds     1    ;new, review, or modify schedules
351  19D2           SEL1         ds     1    ;temp storage in select routines
352  19D3           SEL2         ds     1
353  19D4           CHARGING     ds     1    ;contrast for charging msg
354
355  19D5           option       ds     1    ;menu selection
356  19D6           version      ds     4    ;version #
357  19DA           block        ds     1    ;new/modify schedule blocks
358  19DB           retadr       ds     2    ;storage for return address
359  19DD           hflag        ds     1    ;history empty flag
360
361  19DE           exec_command ds     1    ;0 = generate schedule
362                                          ;1 = begin idle
363                                          ;2 = begin run
364
365  19DF           runram       ds     4    ;storage of user run options
366  19E3           selfram      ds     2    ;results of selftest
367
368  19E5           VS           ds     9    ;valve status
369                                          ;bit 4 - 0=off, 1=on
370                                          ;bit 0 - 1=new
371  19EE           SS           ds     9    ;sensor status
372  19F7           DRY_LEVEL    ds     9
373  1A00           SOAK_LEVEL   ds     9
374
375
376                ;----------------------------------
377                ;      CONSTANTS
378                ;----------------------------------
379
380                ;I/O ADDRESSES
381  0063                        PAGE0
382        0000    POWER_OFF     equ    0    ;processor power off
383        0001    RTC_CLR       equ    1    ;clear RTC counter
384        0002    AD_POWER      equ    2    ;A/D power
385        0003    AD_ENABLE     equ    3    ;A/D enable
386        0004    LCD_POWER     equ    4    ;LCD power
387        0005    LCD_ENABLE    equ    5    ;LCD enable
388        0006    VALVE_SETUP   equ    6    ;valve select
389        0007    VALVE_ENABLE  equ    7    ;valve enable
```

```
390     0008            TIMER_MSB       equ     8               ;TIMER hi byte
391     0009            TIMER_LSB       equ     9               ;TIMER lo byte
392     000A            TIMER           equ     $0A             ;TIMER on/off
393     000B            RTC             equ     $0B             ;Real time clock
394     000C            SERIAL_CLK      equ     $0C             ;Serial interface clock
395     000D            TIMER_LOAD      equ     $0D             ;load TIMER msb,lsb into TIMER
396     000E            SERIAL_OUT      equ     $0E             ;output serial data
397     000F            SO_RDY          equ     $0F             ;serial output ready
398     0010            RTC_MSB         equ     $10             ;RTC counter hi byte
399     0011            RTC_LSB         equ     $11             ;RTC counter lo byte
400     0012            STATUS1         equ     $12             ;1st status byte
401     0013            STATUS2         equ     $13             ;2nd status byte
402     0014            SERIAL_IN       equ     $14             ;serail data in
403     0015            AD_DATA         equ     $15             ;read A/D data
404     0016            SO_LOAD         equ     $16             ;load serial shift register
405     0017            SI_CLR          equ     $17             ;clear serial in ready
406     0018            LCD_STATUS      equ     $18             ;LCD register 0
407     0018            LCD_CMD         equ     $18
408     0019            LCD_DATA        equ     $19             ;LCD register 1
409     001A            LCD_CONTRAST    equ     $1A             ;LCD contrast
410     001B            WATCHDOG        equ     $1B             ;Watchdog timer
411     001C            RTC_TEST        equ     $1C             ;RTC counter clock
412     001D            E2              equ     $1D             ;EEPROM
413     001E            WCVALVES        equ     $1E             ;Wire check drivers for valves
414     001F            WCSENSORS       equ     $1F             ;Wire check drivers for sensors
415     0020            ADBASE          equ     $20             ;A/D base address
416
417
418                     ;OTHER CONSTANTS
419
420     0040            NEG             equ     01000000B
421     0000            POS             equ     0
422     0040            SI_PRESENT      equ     01000000B       ;serial device plugged in
423     0019            PERSEC          equ     25              ;how many INTs per second
424     000A            SLOW_REPEAT     equ     10              ;how many INT routines to repeat key
425     0006            BLINK_RATE      equ     6               ;to blink
426     0007            SRATE1          equ     7               ;scrolling blank time
427     003E            SRATE2          equ     62              ;scroll msg time
428     0078            SRATE3          equ     120             ;last msg time
429     0064            SRATE4          equ     100             ;self test msg time
430     0003            FAST_REPEAT     equ     3               ;fast time set up repeat
431     0010            LINE2           equ     $10             ;video line 2
432     0030            ASCMASK         equ     00110000B       ;change 0-9 to ASCII
433     0080            VID             equ     10000000B       ;valve ID bit in VS
434     0040            VEN             equ     01000000B       ;enable bit in VS
435     0032            ADWAIT          equ     50              ;ms to wait before read (coil test)
436
437     0001            okkey           equ     1               ;keys from key manager
438     0002            helpkey         equ     2
439     0003            upkey           equ     3
440     0004            downkey         equ     4
441
442     1A09                            DATA                    ;16 bit constants
443
444                     ;GLOBAL LABELS
445                     ;subroutines or tables used in other modules
446
```

```
447                     GLOBAL    DKCLR, GETKEY
448                     GLOBAL    DAYTBL
449                     GLOBAL    get_time, get_duration
450                     GLOBAL    ENTER_CODE3, DISPTIME
451                     GLOBAL    display_bank1
452                     GLOBAL    get_option_bank1
453                     GLOBAL    help_bank1
454
455
456
457
458
459
460
461  1A09               INCLUDE    GLOBALS.ASM
462                    ;global equates
463                    ;--------------
464       0000   FALSE    equ    $00
465       000F   TRUE     equ    $0F
466
467
468  1A09               DATA
469  0200               ORG    $0200    ;global ram variables
470
471                    ;-----------------------------------
472                                            ;these are global variables
473  0200   cksum       ds    1     ;result of ram checksum
474  0201   hour        ds    1     ;real time clock
475  0202   minute      ds    1
476  0203   dow         ds    1
477  0204   month       ds    1
478  0205   day         ds    1
479  0206   year        ds    1
480  0207   dim         ds    1     ;number of days in the month
481  0208   ad          ds    16    ;16 bytes of AD readings
482  0218   char_index  ds    1     ;screen location
483  0219   video       ds    32    ;video ram, characters
484  0239   attribute   ds    32    ;video ram, attributes
485  0259   cursor      ds    2     ;cursor position & attributes
486  025B   IBFR        ds    10    ;input buffer
487                                    ;use to pass params between modules
488                                    ;where stack passing doesn't exist
489
490  0265   hbfr        ds    8     ;history buffer for storage/retrieval
491
492                    ;-----------------------------------
493
494
495
496
497
498                    LIST    OFF
499  026D               INCLUDE    XREF.ASM
500
501                    ;kernal routines
502
503                    XREF    R1_dchar, R1_cad, R1_display_init, R1_cursor_on
```

```
504            XREF    R1_cursor_off, R1_addr, R1_display_update
505            XREF    R1_display_irq, R1_custom_char
506            XREF    R1_display_off, R1_blink_init
507
508            XREF    R2_key_init, R2_key_update, R2_get_key
509            XREF    R2_clear_key, R2_repeat_enable, R2_repeat_disable
510            XREF    R2_repeat_rate
511
512            XREF    R3_read_all, R3_cshi, R3_read, R3_write
513            XREF    R3_write_all
514
515            XREF    R4_timer_on, R4_timer_off, R4_timer_start
516
517            XREF    R6_read_sum, R6_write_sum, R6_isvalve
518            XREF    R7_ad_on, R7_ad_off, R7_ad_read
519            XREF    R8_rtc_read, R8_rtc_init, R8_bump_clock
520            XREF    R8_rtc10, R8_rtc60
521            XREF    R8_clock_init
522
523            XREF    R9_wait_ms, R9_ascii, R9_bindec, R9_block_move
524            XREF    R9_wait_sec, R9_mult, R9_divide, R9_div16
525            XREF    R9_clear_RAM
526
527       ;library routines
528
529            XREF    game, game_irq_service
530            XREF    monitor, monitor_irq_service
531
532            XREF    history_init, history_write, history_read
533            XREF    history_backup, display_history
534            XREF    history_read_init
535            XREF    history_write_init
536
537            XREF    help_manager
538            XREF    video_clear, line2_clear, stop_blink, blink_cursor
539            XREF    blink_char, dchar, bchar, display_msg
540            XREF    display_dow, display_month, display_date
541            XREF    display_time, d3d, d2d, blinkem, d2dxx
542            XREF    get_number, get_option, spaces, get_alpha, enter_time
543            XREF    get_month, get_dow, disp_an
544
545
546
547       ;    These are the labels used for external messages
548       ;-----------------------------------------------------------
549
550       ;    One line messages and option lists
551       ;-----------------------------------------
552
553            XREF    MSG0, MSG1, mainopt, MSG8, manopt
554            XREF    MSG13, MSG14, MSG15, MSG16, MSG18, MSG19, MSG20
555            XREF    infoopt, MSG24,MSG25,MSG26,MSG27,MSG28,MSG29,MSG30
556            XREF    MSG31,MSG32,MSG33,MSG34,MSG35,MSG36,MSG37,MSG38
557            XREF    MSG38A,MSG38B,MSG39, opt6, MSG42,MSG43,MSG44, opt4
558            XREF    MSG47,MSG48,MSG49,MSG50,advopt
559            XREF    MSG59,MSG60,MSG61,MSG62,MSG63,MSG64,MSG65,MSG66
560            XREF    MSG67,MSG68,MSG69,MSG70,MSG71,MSG72,MSG73,MSG74
```

```
561             XREF    MSG75,MSG76,MSG89,MSG690,MSG98,MSG99,MSG100
562             XREF    MSG101,MSG102,MSG103,MSG104,MSG106,MSG107
563             XREF    MSG108,MSG109,MSG111
564             XREF    MSG115,MSG116,MSG117,MSG118,MSG119,MSG120,MSG121
565             XREF    MSG123,MSG124,MSG125,MSG126,MSG127,MSG128
566             XREF    MSG129,MSG130,MSG131,MSG132,MSG133,MSG134,MSG135
567             XREF    MSG136,MSG137,MSG139,MSG140,MSG141,MSG142
568             XREF    MSG143,MSG144,MSG145,MSG146,MSG147,MSG148,MSG149
569             XREF    MSG150,MSG151,MSG152,MSG154,MSG155
570             XREF    opt5, opt9, sysopt, pgmopt, teropt, spropt
571             XREF    MSG171,MSG172,MSG173,MSG174,MSG175,MSG176,MSG177
572             XREF    MSG179,MSG180,MSG181,MSG182,MSG183,MSG184
573             XREF    MSG185,MSG188,MSG189,MSG190,MSG191,MSG192,MSG193
574             XREF    MSG200,MSG201,MSG202,MSG203,MSG204,MSG205,MSG206
575             XREF    MSG207,MSG208,MSG209,MSG210,MSG211,MSG212,MSG213
576             XREF    MSG214,MSG215,MSG216,MSG217,MSG218,MSG219,MSG220
577             XREF    MSG221,MSG222,MSG223,MSG224,MSG225,MSG226,MSG227
578             XREF    MSG228,MSG229,MSG230,MSG233,MSG234,MSG232
579             XREF    MSG235,MSG236,MSG237,MSG238,MSG239,MSG240,MSG241
580             XREF    MSG242,MSG246,MSG252,MSG256,MSG257,MSG258,MSG259
581             XREF    budopt,schopt,opt7,cycopt,opt8,semiopt
582             XREF    MSG260,MSG263,MSG269,MSG270,MSG273,MSG275,MSG279
583             XREF    MSG280,MSG281,MSG284,MSG285,MSG292,MSG297
584             XREF    resopt,runopt,opt10,opt3,opt2,revopt
585             XREF    MSG301
586             XREF    codopt,soak_msg,no_extra,extra
587             XREF    syringe_msg,auto_msg,spec_msg,name_msg
588             XREF    MSG162,MSG187,MSG186
589             XREF    vmanual,IDopt,opt11,MSG175A
590             xref    assign,assign1
591
592
593
594
595
596
597   026D      INCLUDE   XHELP.ASM
598
599         ;   help messages
600         ;--------------------------
601   026D
602             xref    none, not_avail, no_stations, no_schedule
603
604             xref    MainOptHELP
605             xref    EnterSchHELP, RunSchedHELP, ManualHELP, IdleHELP
606             xref    SystemHELP, InfoHELP
607             xref    EnterNewHELP, ChangeProgHELP
608             xref    TimeSetHELP, AutoRunHELP, SemiAutoHELP, ExitRunHELP
609             xref    ManStnsHELP, TestSeqHELP, SensorHELP, FinishedHELP
610             xref    PasswordsHELP, ComputIDHELP, ActivePgmHELP
611             xref    WiringHELP, NoBudHELP, OKSysHELP
612             xref    DailySchedHELP, HistoryHELP, InfoDoneHELP
613
614
615
616
617   026D      INCLUDE   MACROS.ASM
```

```
;----------------------------------
;           MACROS
;----------------------------------

DBLW:   MACRO   A0              ;multiply word by 2
                CLC
                RDL     A0
                RDL     A0+1
                ENDM DBL:    MACRO   A0              ;multiply byte by 2
                CLC
                RDL     A0
                ENDM DBLX:   MACRO                   ;multiply index by 2
                PHA
                TXA
                ASL     A
                TAX
                PLA
                ENDM RTC_PULSE: MACRO                ;check for RTC timeout
                LDA     STATUS1
                AND     #00010000B
                ENDM set:    MACRO   A0              ;store a 1 to memory
                LDA     #1
                STA     A0
                ENDM
        SET:    MACRO   A0              ;store a 1 to memory
                LDA     #1
                STA     A0
                ENDM near_msg: macro a0              ;display msg resident in bank 0
                lda     #>a0
                ldy     #<a0
                jsr     display_msg
                endm MESSAGE: macro a0               ;display msg resident in bank 1
                lda     #>a0
                ldy     #<a0
                jsr     display_bank1
                endm SET_CURSOR: macro    a0         ;move char_index to address
                lda     #a0
                sta     char_index
                endm BACKUP: macro a0                ;backup cursor
                lda     char_index
```

```
675                 sec
676                 sbc     #a0
677                 sta     char_index
678                 endm
679
680        SKIP:    macro   a0              ;move cursor ahead
681                 lda     char_index
682                 clc
683                 adc     #a0
684                 sta     char_index
685                 endm
686
687        blt:     MACRO   A0              ;branch if A<M
688                 BCC     A0
689                 ENDM
690        BLT:     MACRO   A0              ;branch if A<M
691                 BCC     A0
692                 ENDM
693
694        bge:     MACRO   A0              ;branch if A>=M
695                 BCS     A0
696                 ENDM
697        BGE:     MACRO   A0              ;branch if A>=M
698                 BCS     A0
699                 ENDM
700
701        ADD16:   MACRO   A0,A1,A2        ;A2=A0+A1, 16 bits
702                 CLC
703                 LDA     A0
704                 ADC     A1
705                 STA     A2
706                 LDA     A0+1
707                 ADC     A1+1
708                 STA     A2+1
709                 ENDM
710
711        inc16:   MACRO   A0              ;increment a 16 bit number
712                 CLC
713                 LDA     A0
714                 ADC     #1
715                 STA     A0
716                 LDA     A0+1
717                 ADC     #0
718                 STA     A0+1
719                 ENDM
720
721        MOV16:   MACRO   A0,A1           ;move 16 bits from A0 to A1
722                 LDA     A0
723                 STA     A1
724                 LDA     A0+1
725                 STA     A1+1
726                 ENDM
727
728        LDW:     MACRO   A0,A1           ;load 16 bits of immediate data
729                 LDA     #<A1
730                 STA     A0
731                 LDA     #>A1
```

```
732                STA     A0+1
733                ENDM
734
735        HELP:   MACRO   A0              ;help message in bank 1
736                lda     #>A0
737                ldy     #<A0
738                jsr     help_bank1
739                endm
740
741
742        ;       Example of select macro use:
743        ;       select  down limit, up limit, increment value
744        ;       This example returns a number between 1-52, starting at 5.
745        ;
746        ;       lda     #5
747        ;       select  1,59,1
748        ;       bcs     ?help
749        ;       sta     new value
750        ;
751        select: macro   a0,a1,a2        ;set up for get_number
752                ldx     #a2             ;increment value
753                phx
754                ldx     #a1             ;up limit
755                phx
756                ldx     #a0             ;down limit
757                phx
758                ldy     char_index      ;cursor location
759                ldx     #0              ;no leading zeros
760                jsr     get_number
761                endm
762
763
764
765        SHR16:  MACRO   A0              ;shift 16 bits right (divide by 2)
766                CLC
767                ROR     A0+1
768                ROR     A0
769                ENDM
770
771
772        DISP:   MACRO   A0              ;display 1 char
773                LDA     #A0
774                jsr     dchar
775                ENDM
776
777        pushptr: macro  a0              ;push pointer on stack
778                lda     #>a0
779                pha
780                lda     #<a0
781                pha
782                endm
783
784        push16: macro   a0              ;push 16 bit word
785                lda     a0+1
786                pha
787                lda     a0
788                pha
```

```
789             endm
790
791             ;
792             ;       Example of local_option macro use:
793             ;       local_option    message address
794             ;       A contains the initial selection. If there are n selections,
795             ;       the routine returns a number from 0 to n-1 in A.
796             ;
797             ;       lda     #2
798             ;       local_option list
799             ;       bcs     ?help
800             ;       sta     new value
801             ;
802     local_option macro a0           ;set up for get_option
803             tax                     ;save initial selection
804             lda     #>a0
805             ldy     #<a0
806             jsr     get_option_bank1
807             endm
808
809
810     DM:     MACRO                   ;blink question mark
811             lda     #'?'
812             jsr     bchar
813             endm
814
815
816     save_retadr: macro              ;save return address
817             pla
818             sta     retadr
819             pla
820             sta     retadr+1
821             endm
822
823     get_retadr: macro               ;restore return address
824             lda     retadr+1
825             pha
826             lda     retadr
827             pha
828             endm
829
830
831     CURSOR: macro a0                ;move char_index to location
832             pha
833             lda     #a0
834             sta     char_index
835             pla
836             endm
837
838     SCREEN1: macro a0               ;display static screen
839             pha
840             jsr     DKCLR
841             MESSAGE a0
842             CURSOR  LINE2
843             pla
844             endm
845
```

```
846              SCREEN2: macro   a0,a1           ;display static screen
847                      pha
848                      jsr     DKCLR
849                      MESSAGE a0
850                      CURSOR  LINE2
851                      MESSAGE a1
852                      pla
853                      endm
854
855
856              HELPER:  macro   a0
857                      pha
858                      HELP    a0
859                      pla
860                      endm
861
862              INC16:   macro   a0              ;increment a 16 bit number
863                      pha
864                      lda     a0              ; load low order byte
865                      clc
866                      adc     #1              ; add 1
867                      sta     a0              ; and save
868                      lda     a0+1            ; load high order byte
869                      adc     #0              ; add 0
870                      sta     a0+1            ; and save
871                      pla
872                      endm
873
874              DEC16:   macro   a0              ;decrement a 16 bit number
875                      pha
876                      sec
877                      lda     a0              ; load low order byte
878                      sbc     #1              ; subtract 1
879                      sta     a0              ; and save
880                      lda     a0+1            ; load high order byte
881                      sbc     #0              ; subtract 0
882                      sta     a0+1            ; and save
883                      pla
884                      endm
885
886              COPY16:  macro   a0,a1
887                      pha
888                      lda     a0
889                      sta     a1
890                      lda     a0+1
891                      sta     a1+1
892                      pla
893                      endm
894
895
896
897                      LIST    ON
898
899  0000                 CODE
900  8000                 ORG     $8000
901
902  8000                 INCLUDE CYCLE.ASM
```

```
                        ;----------------------------------
                        ;     EXECUTIVE (POWER ON)
                        ;----------------------------------

910  8010  A2 FF        RESET:  LDX   #$FF            ;init stack pointer
911  8012  9A                   TXS
912  8013  78                   SEI
913  8014  64 4B                STZ   FLAGS
914  8016  A5 12                LDA   STATUS1         ;save status in case it changes
915  8018  85 67                STA   STTS
916  801A  29 08                AND   #00001000B      ;if SVL, then do nothing
917  801C  D0 03                BNE   RS0
918  801E  4C B7 81             JMP   DEATH
917
918                     RS0:                          ;first see if system RAM is ok
919  8011  20 26 B8             jsr   read_eesum
920  8014  B0 10                bcs   RAMNG
921  8016  A2 03                ldx   #3              ;or if eprom changed
922  8018  BD F5 FF     ?0:     lda   pversion,x
923  801B  DD D6 19             cmp   version,x
924  801E  D0 06                bne   RAMNG
925  8020  CA                   dex
926  8021  10 F5                bpl   ?0
927
928  8023  4C 2C 80             jmp   RAMOK
929
930                     RAMNG:                        ;RAM corrupted
931  8026  20 0A 81             JSR   INITIALIZE
932  8029  4C 9B 80             JMP   RS17
933
934  802C               RAMOK:
935  802C  20 00 00             jsr   RB_rtc_read     ;if more than 1 RTC, then SVL happened
936  802F  85 41                sta   MSB
937  8031  84 40                sty   LSB
938  8033  A5 41                LDA   MSB
939  8035  D0 08                BNE   RS21
940  8037  A5 40                LDA   LSB
941  8039  C9 02                CMP   #2
942  803B                       BGE   RS21
945  803D  80 29                BRA   RS22
946
947  803F  A9 12        RS21:   lda   #$12            ;tell history about SVL
948  8041  20 76 B7             jsr   log_history
949  8044  20 00 00             jsr   RB_rtc_init
950  8047  A5 41        RS23:   LDA   MSB             ;while RTC>60,
951  8049  D0 08                BNE   RS24
952  804B  A5 40                LDA   LSB
953  804D  F0 19                BEQ   RS22
954  804F  C9 3C                CMP   #60
955  8051                       BLT   RS25
958  8053  A9 3C        RS24:   LDA   #60             ;update clock in <=60 min. chunks
959  8055  20 00 00     RS25:   jsr   RB_bump_clock
960  8058  38                   SEC
961  8059  A5 40                LDA   LSB
962  805B  ED 5B 02             SBC   IBFR
963  805E  85 40                STA   LSB
```

```
964   8060  A5 41                    LDA   MSB
965   8062  E9 00                    SBC   #0
966   8064  85 41                    STA   MSB
967   8066  80 DF                    BRA   RS23
968
969   8068  4C 9B 80    RS22:  jmp   RS17             ;*****temporary
970   806B  A5 67              LDA   STTS
971   806D  29 04              AND   #00000100B       ;if SL,
972   806F  D0 1A              BNE   NOSL
973   8071  AD BE 19           LDA   SL
974   8074  D0 12              BNE   RS16             ;pre-existing condition, do nothing more
975
976                                                   ;1st time SL noticed:
977   8076  A9 02              lda   #2               ;then suspend watering
978   8078  8D DE 19           sta   exec_command
979   807B  20 D5 83           jsr   executive
980
981   807E  A9 11    RS2A:     lda   #$11
982   8080  20 76 B7           jsr   log_history      ;tell history (only once)
983   8083              set   SL
987   8088  4C B7 81  RS16:    JMP   DEATH
988
989
990   808B             NOSL:
991   808B  AD BE 19           LDA   SL               ;no SL now
992   808E  F0 0B              BEQ   RS17
993   8090  9C BE 19           STZ   SL               ;but there was one, recover
994   8093  A9 03              lda   #3               ;resume running
995   8095  8D DE 19           sta   exec_command
996   8098  20 D5 83           jsr   executive
997
998                                                   ;what woke me up?
999   809B  A5 67    RS17:     LDA   STTS             ;is it serial link?
1000  809D  29 40              AND   #SI_PRESENT
1001  809F  D0 0A              BNE   RS15
1002  80A1  A5 67              LDA   STTS             ;serial link present
1003  80A3  A5 67              LDA   STTS
1004  80A5  29 80              AND   #10000000B       ;if ready
1005  80A7  F0 00              BEQ   RS14
1006                                                  ;serivce serial port
1007  80A9  A5 17    RS14:     LDA   SI_CLR           ;else clear it
1008
1009  80AB  A5 67    RS15:     LDA   STTS             ;is it the power key?
1010  80AD  29 01              AND   #00000001B
1011  80AF  D0 3D              BNE   RS11
1012  80B1  A5 67              LDA   STTS             ;battery is present
1013  80B3  29 20              AND   #00100000B
1014  80B5  D0 03              BNE   RS12
1015  80B7  4C 4B 85           JMP   PROGIN           ;and fully charged
1016
1017            RS12:                                 ;batt is low
1018  80BA  EE D4 19           INC   CHARGING         ;change contrast
1019  80BD  AD D4 19           LDA   CHARGING
1020  80C0  C9 04              CMP   #4
1021  80C2              BLT   RS1A
1024  80C4              set   CHARGING
1028  80C9             RS1A:
```

```
1029  80C9  20 00 00             jsr      video_clear
1030  80CC  20 00 00             jsr      R1_display_init
1031  80CF                       MESSAGE  MSG19                ;& say so
1036  80D6  AE D4 19             LDX      CHARGING
1037  80D9  BD 95 C3             LDA      CONTRAST_TBL,X
1038  80DC  85 1A                STA      LCD_CONTRAST
1039  80DE  20 00 00             jsr      R1_display_update
1040  80E1  A9 FA                lda      #250                 ;give user time to see msg
1041  80E3  20 00 00             jsr      R9_wait_ms
1042  80E6  A9 C8                lda      #200
1043  80E8  20 00 00             jsr      R9_wait_ms
1044  80EB  4C A3 81             JMP      SHUT_DOWN
1045
1046  80EE  20 00 00   RS11:     jsr      R8_rtc_read          ;is it the RTC?
1047  80F1  C0 01                cpy      #1
1048  80F3  D0 06                bne      RS13
1049  80F5  20 2E 83             jsr      maintenance          ;yes, do watering, etc
1050  80F8  4C B7 81             jmp      DEATH
1051
1052
1053  80FB  A5 67      RS13:     LDA      STTS                 ;is it the watchdog?
1054  80FD  29 02                AND      #00000010B
1055  80FF  F0 05                beq      ?1
1056  8101  9C 00 02             stz      cksum                ;yes, system is probably corrupted
1057  8104  4C B7 81             JMP      DEATH                ;cause init at next wakeup
1058
1059  8107  4C B7 81   ?1:       jmp      DEATH                ;unknown, spurious wakeup
1060                                                           ;(probably jittery power key)
1061
1062
1063                             ;----------------------------------
1064                             ;   RAM INITIALIZATION
1065                             ;----------------------------------
1066
1067                             INITIALIZE:                    ;init RAM variables
1068                                                            ;cold start
1069
1070                                                            ;init system vars in eeram area
1071  810A  20 09 B8             jsr      ee2ram               ;init from EEPROM
1072  810D  20 26 B8             jsr      read_eesum
1073  8110  90 0C                bcc      ?eeok                ;if EPROM contents no good,
1074  8112  20 11 B8             jsr      eeram_init           ;then init system vars from PROM
1075  8115  20 26 B8             jsr      read_eesum           ;make new checksum
1076  8118  20 1F B8             jsr      write_eesum
1077  811B  20 01 B8             jsr      ram2ee               ;and init EEPROM also
1078  811E             ?eeok:
1079
1080  811E  A2 00                LDX      #0                   ;init generate and water params
1081  8120  BD 30 C3   NIT7:     LDA      RUNTBL,X             ;from default table
1082  8123  9D 80 0B             STA      EXEC_BLOCK,X
1083  8126  E8                   INX
1084  8127  E0 33                CPX      #51
1085  8129  D0 F5                BNE      NIT7
1086
1087  812B  A2 08                ldx      #8                   ;init valve status
1088  812D  9E E5 19   ?nit0:    stz      VS,x
1089  8130  CA                   dex
```

```
1090  8131  10 FA              bpl      ?nit0
1091                                                       ;init MAIN, ALT programs from FACTORY
1092  8133  20 A9 96           jsr      schedule_init
1093
1094  8136  9C BE 19           STZ      SL                ;clear SL flag
1095  8139  20 00 00           jsr      R8_rtc60
1096  813C  20 00 00           jsr      R8_rtc_init       ;clear RTC counter
1097  813F  20 00 00           jsr      R8_clock_init
1098  8142  64 53              STZ      SECCTR
1099  8144  64 54              STZ      SECCTR+1          ;seconds counter
1100
1101  8146  20 00 00           jsr      history_init      ;init history area
1102
1103  8149  A9 03              lda      #3                ;run schedule
1104  814B  8D DE 19           sta      exec_command
1105  814E  20 D5 83           jsr      executive
1106
1107  8151  A2 03              ldx      #3                ;store version # in rom to ram
1108  8153  BD F5 FF    ?0:    lda      pversion,X
1109  8156  9D D6 19           sta      version,x
1110  8159  CA                 dex
1111  815A  10 F7              bpl      ?0
1112  815C  60                 rts
1113
1114
1115                           ;----------------------------------
1116                           ;   ORDERLY SHUT-DOWN
1117                           ;----------------------------------
1118
1119                           BATT_LOW:                    ;battery is low
1120  815D  20 00 00           jsr      R4_timer_off
1121  8160  20 5B B7           JSR      DKCLR
1122  8163                     MESSAGE  MS672             ;alert the user
1127  816A  A9 03              lda      #3
1128  816C  20 00 00           jsr      R9_wait_sec
1129  816F  20 5B B7           JSR      DKCLR
1130  8172  20 F4 B0           JSR      FLASH
1131  8175                     MESSAGE  MS690
1135  817C  A9 05              lda      #5
1136  817E  20 00 00           jsr      R9_wait_sec
1137  8181  A9 22              lda      #$22              ;tell history
1139  8183  20 76 B7           jsr      log_history
1140  8186  80 06              BRA      YANK
1141
1142                           NO_BATT:                     ;battery removed
1143  8188  A5 4B              lda      FLAGS             ;see if key removed at proper time
1144  818A  29 08              and      #00001000b
1145  818C  D0 15              bne      SHUT_DOWN
1146
1147                           YANK:                        ;key was yanked out in wrong place
1148  818E  AD AD 0B           lda      idle              ;if not already running,
1149  8191  F0 10              beq      SHUT_DOWN
1150  8193  A9 01              lda      #1                ;then make sure schedule is good
1151  8195  8D DE 19           sta      exec_command
1152  8198  20 D5 83           jsr      executive
1153
1154  819B  A9 03              lda      #3
```

```
1155   819D   8D DE 19                 sta    exec_command
1156   81A0   20 D5 83                 jsr    executive        ;and resume running
1157
1158
1159                         SHUT_DOWN:                         ;nite nite
1160   81A3   20 00 00                 jsr    R4_timer_off
1161   81A6   20 00 00                 jsr    R1_display_off
1162   81A9   20 00 00                 jsr    R7_ad_off
1163
1164   81AC   20 26 B9                 jsr    read_eesum       ;if anything in system has changed,
1165   81AF   90 06                    bcc    DEATH
1166   81B1   20 1F B9                 jsr    write_eesum      ;then make new checksum
1167   81B4   20 01 B8                 jsr    ram2ee           ;and store entire system area in EEPROM
1168
1169   81B7   85 00    DEATH:          STA    0                ;processor power off
1170   81B9   80 FC                    BRA    DEATH            ;shouldn't get here
1171
1172
1173
1174                         ;----------------------------------
1175                         ;   WATERING ROUTINE
1176                         ;----------------------------------
1177
1178                         ;    The watering task executes the schedule stored at
1179                         ;    daily_schedule.  If new_time msb is set, all valves are
1180                         ;    turned off, and schedule begins at the time provided.
1181                         ;    Done is set when the schedule has been completed.
1182                         ;    Idle inhibits all valve turn ons.
1183
1184
1185   81BB             WATER:
1186   81BB   AD AB 0B                  lda    new_time+1
1187   81BE   30 10                    bmi    ?new             ;if old,
1188   81C0                             inc16  WATERCLK         ;then do next minute
1197   81CD   4C FD 81                  jmp    CY30
1198
1199                         ?new:                              ;else time for a change
1200   81D0   20 91 82                  jsr    end_run          ;turn off any valves still on
1201
1202   81D3   AD AB 0B                  lda    new_time+1       ;replace my clock with given clock
1203   81D6   29 7F                    and    #01111111b
1204   81D8   85 64                    sta    WATERCLK+1
1205   81DA   AD AA 0B                  lda    new_time
1206   81DD   85 63                    sta    WATERCLK
1207   81DF   9C AA 0B                  stz    new_time
1208   81E2   9C AB 0B                  stz    new_time+1
1209   81E5   9C AC 0B                  stz    done
1210
1211   81E8   AD AD 0B                  lda    idle             ;if idle then done
1212   81EB   F0 03                    beq    ?2
1213   81ED   4C 90 82                  jmp    CY99
1214   81F0   20 64 C2    ?2:           jsr    POINT            ;find new place in the schedule
1215   81F3   90 08                    bcc    CY30
1216   81F5                             set    done             ;done already
1220   81FA   4C 90 82                  jmp    CY99
1221
1222                         CY30:                              ;running
```

```
                AD AC 0B            lda     done        ;if done
                F0 03               beq     ?2
                4C 90 82            jmp     CY99
                AD AD 0B    ?2:     lda     idle        ;or idle, then do nothing
                F0 03               beq     service
                4C 90 82            jmp     CY99 service:
                                    set     VALVE       ;1st service active valves
1239            A6 45       CY31:   LDX     VALVE
1240            BD E5 19            LDA     VS,X
1241            29 10               AND     #00010000B
1242            F0 2D               BEQ     CY35        ;valve is not on, try next
1243            A6 45               LDX     VALVE       ;valve is on
1246                                DBLX
1247    8221    FE 79 19            INC     TIMEON,X    ;inc time on
1248    8224    D0 03               BNE     CY32
1249    8226    FE 7A 19            INC     TIMEON+1,X
1250    8229    38          CY32:   SEC                 ;dec time remaining
1251    822A    BD 67 19            LDA     TR,X
1252    822D    E9 01               SBC     #1
1253    822F    9D 67 19            STA     TR,X
1254    8232    BD 68 19            LDA     TR+1,X
1255    8235    E9 00               SBC     #0
1256    8237    9D 68 19            STA     TR+1,X
1257    823A    BD 67 19            LDA     TR,X        ;if no time remaining, then done
1258    823D    1D 68 19            ORA     TR+1,X
1259    8240    F0 02               BEQ     CY34
1260                                                    ;check for sensor limit here
1261    8242    80 03               bra     CY35
1262    8244    20 AF B9    CY34:   JSR     VALVEOFF    ;so turn this one off
1263    8247    E6 45       CY35:   INC     VALVE       ;check the next valve
1264    8249    A5 45               LDA     VALVE
1265    824B    C9 09               CMP     #9
1266    824D    D0 C2               BNE     CY31
1267
1268    824F    AD 36 0F    CY40:   LDA     NSTARTS     ;2nd, service new starts
1269    8252    C5 6D               CMP     STARTCTR
1270    8254    F0 24               BEQ     CY70        ;no more to do
1271
1272    8256    B2 6B       CY41:   LDA     (STARTPTR)  ;see if time to do next start
1273    8258    C5 63               CMP     WATERCLK
1274    825A    D0 1E               BNE     CY70
1275    825C    A0 01               LDY     #1
1276    825E    B1 6B               LDA     (STARTPTR),Y
1277    8260    C5 64               CMP     WATERCLK+1
1278    8262    D0 16               BNE     CY70        ;nope, nothing to do yet
1279                                                    ;time is now
1280    8264    A0 02               LDY     #2          ;get station #
1281    8266    B1 6B               LDA     (STARTPTR),Y
1282    8268    85 45               STA     VALVE
1283    826A    A6 45               ldx     VALVE       ;if enabled, then turn on
1284    826C    BD A1 0B            lda     ENABLES,x
1285    826F    F0 03               beq     CY50
1286    8271    20 8A B9            JSR     VALVEON
1287    8274    20 21 B4    CY50:   JSR     NEXTSTART   ;go to the next start
1288    8277    4C 4F 82            JMP     CY40        ;see if that one is for now
```

```
1289
1290  827A                 CY70:
1291                                                ;3rd, service pump
1292
1293  827A  20 73 BB              jsr    valve_update   ;make all the changes real
1294
1295  827D  AD 37 0F              lda    DONETIME       ;if =donetime then done
1296  8280  C5 63                 cmp    WATERCLK
1297  8282  D0 0C                 bne    CY99
1298  8284  AD 38 0F              lda    DONETIME+1
1299  8287  C5 64                 cmp    WATERCLK+1
1300  8289  D0 05                 bne    CY99
1301  828B                        set    done
1305
1306  8290  60           CY99:    rts
1307
1308
1309                     ;------------------------------------------------------
1310                     end_run:                        ;stop running
1311  8291                        set    VALVE
1315  8295  A6 45        STR1:    LDX    VALVE          ;turn off all valves that are on
1316  8297  BD E5 19              LDA    VS,X
1317  829A  29 10                 AND    #00010000B
1318  829C  F0 03                 BEQ    STR2
1319  829E  20 AF B9              JSR    VALVEOFF       ;updating their history
1320  82A1  E6 45        STR2:    INC    VALVE
1321  82A3  A5 45                 LDA    VALVE
1322  82A5  C9 09                 CMP    #9
1323  82A7  D0 EC                 BNE    STR1
1324  82A9  20 73 B9              jsr    valve_update
1325  82AC  60                    rts
1326
1327                     INCDAYNUM:                     ;move DAYNUM array to next day
1328  82AD                        inc16  DAYNUM         ;a new day
1337  82BE  AD 94 0B              lda    DAYNUM         ;if divisible by 8,
1338  82C1  29 07                 and    #00000111b
1339  82C3  D0 11                 bne    ?1
1340  82C5                        inc16  DAYNUM+2       ;then new week
1349  82D6  AD 03 02     ?1:      lda    dow            ;save day of week
1350  82D9  8D 98 0B              sta    DAYNUM+4
1351  82DC  60                    rts
1352
1353                     INCSPECNUM:                    ;increment special day num
1354  82DD                        inc16  SPECDAY        ;same for special day num
1363  82EE  AD 98 0B              lda    SPECDAY
1364  82F1  29 07                 and    #00000111b
1365  82F3  D0 11                 bne    ?2
1366  82F5                        inc16  SPECDAY+2
1375  8306  60           ?2:      rts
1376
1377                     FIRSTDAY:                      ;init DAYNUM array
1378  8307                        set    DAYNUM         ;first day
1382  830C  9C 95 0B              STZ    DAYNUM+1
1383  830F                        set    DAYNUM+2       ;first week
1387  8314  9C 97 0B              STZ    DAYNUM+3
1388  8317  AD 03 02              lda    dow
1389  831A  8D 98 0B              sta    DAYNUM+4       ;day of the week
```

```
1390   831D                            set   SPECDAY        ;save for special day num
1394   8322   9C 99 0B                 stz   SPECDAY+1
1395   8325                            set   SPECDAY+2
1399   832A   9C 9B 0B                 stz   SPECDAY+3
1400   832D   60                       RTS
1401
1402
1403
1404                     ;----------------------------------
1405                     ;       MAINTENANCE TASKS
1406                     ;----------------------------------
1407
1408                     ;    Title: maintenance
1409                     ;
1410                     ;    Purpose: This routine handles necessary system maintenance.
1411                     ;             This routine must be called as often as possible
1412                     ;             via in-line code, not in the interrupt.
1413                     ;
1414                     ;             These tasks are done each time called:
1415                     ;             If key in, check for key removed
1416                     ;             Executes exec commands
1417                     ;
1418                     ;             If RTC counter=1, then these tasks are performed:
1419                     ;             Real time clock updated
1420                     ;             Watchdog cleared
1421                     ;             System power checked
1422                     ;             Watering task serviced
1423                     ;             Daily self test performed
1424                     ;             Power key removed or low checked
1425                     ;
1426                     ;    Entry: none
1427                     ;    Exit: none
1428                     ;    RAM used: ?
1429
1430   832E                    maintenance:
1431
1432   832E   A5 4B                     lda   FLAGS          ;if human interface:
1433   8330   29 01                     and   #00000001b
1434   8332   F0 1D                     beq   ?3
1435   8334   A5 12                     lda   STATUS1        ;if power key now gone,
1436   8336   29 01                     and   #00000001B
1437   8338   F0 0E                     beq   ?2
1438   833A   A9 64                     lda   #100           ;debounce it
1439   833C   20 00 00                  jsr   R9_wait_ms
1440   833F   A5 12                     lda   STATUS1
1441   8341   29 01                     and   #00000001b
1442   8343   F0 03                     beq   ?2
1443   8345   4C 88 81                  jmp   NO_BATT        ;do orderly shut down
1444
1445   8348   A5 12           ?2:       LDA   STATUS1        ;if battery low,
1446   834A   29 20                     AND   #00100000B
1447   834C   F0 03                     beq   ?3
1448   834E   4C 5D 81                  jmp   BATT_LOW       ;give msg then shut down
1449   8351
1450   8351   20 D5 83        ?3:       jsr   executive      ;do any exec command
1451
1452   8354   20 00 00                  jsr   R8_rtc_read    ;read rtc counter
```

```
1453  8357  98                       tya                          ;if not 0, assume to be 1
1454  8358  D0 03                    bne     onemin
1455  835A  4C D4 83                 jmp     mdone
1456
1457  835D  20 00 00       onemin:   jsr     R8_rtc_init          ;then clear it
1458
1459  8360  85 1B                    sta     WATCHDOG             ;do once a minute tasks
1460                                                               ;increment clock
1461  8362  A9 01                    lda     #1
1462  8364  20 00 00                 jsr     R8_bump_clock
1463
1464  8367  AD 01 02                 lda     hour                 ;if noon,
1465  836A  C9 0C                    cmp     #12
1466  836C  D0 0E                    bne     ?not_noon
1467  836E  AD 02 02                 lda     minute
1468  8371  D0 09                    bne     ?not_noon
1469  8373  20 EF B9                 jsr     selftest             ;do self test
1470  8376  AD E3 19                 lda     selfram
1471  8379  20 62 BA                 jsr     disable_shorts       ;and disable any shorts found
1472
1473  837C           ?not_noon:
1474  837C  AD 01 02                 lda     hour                 ;check for midnight
1475  837F  0D 02 02                 ora     minute
1476  8382  D0 15                    bne     ?skip
1477
1478                                                               ;it's midnight
1479  8384  20 DD 82                 jsr     INCSPECNUM           ;inc special day num
1480  8387  AD 83 0B                 lda     RAIN_DELAY           ;if rain delay, then dec delay
1481  838A  F0 05                    beq     ?a
1482  838C  CE 83 0B                 dec     RAIN_DELAY
1483  838F  80 08                    bra     ?skip
1484  8391  AD 81 0B       ?a:       lda     SEMIAUTO             ;if semiauto, then skip
1485  8394  D0 03                    bne     ?skip
1486
1487  8396           ?no_skip:
1488  8396  20 AD 82                 jsr     INCDAYNUM
1489                     ?skip:                                    ;skip means don't inc daynum
1490
1491  8399  AD 81 0B                 lda     SEMIAUTO             ;if semiauto,
1492  839C  F0 0A                    beq     ?no_semi
1493  839E  AD AC 0B                 lda     done                 ;and done then
1494  83A1  F0 2E                    beq     ?old
1495  83A3  9C 81 0B                 stz     SEMIAUTO             ;end semiauto
1496  83A6  80 08                    bra     ?new                 ;and begin a normal schedule
1497
1498  83A8           ?no_semi:
1499  83A8  AD 01 02                 lda     hour                 ;if midnite then
1500  83AB  0D 02 02                 ora     minute
1501  83AE  D0 21                    bne     ?old
1502  83B0  A9 01          ?new:     lda     #1                   ;tell exec to generate new schedule
1503  83B2  8D DE 19                 sta     exec_command
1504  83B5  20 D5 83                 jsr     executive
1505  83B8  AD AD 0B                 lda     idle                 ;if idling,
1506  83BB  F0 0A                    beq     ?3
1507  83BD  A9 02                    lda     #2                   ;then idle
1508  83BF  8D DE 19                 sta     exec_command
1509  83C2  20 D5 83                 jsr     executive
```

```
1510  83C5  80 0D                    bra     ?more
1511  83C7  A9 03         ?3:        lda     #3              ;else run
1512  83C9  8D DE 19                 sta     exec_command
1513  83CC  20 D5 83                 jsr     executive
1514  83CF  80 03                    bra     ?more
1515
1516  83D1          ?old:
1517  83D1  20 BB 81                 jsr     WATER           ;call water mgr
1518
1519                ?more:                                   ;do daily self test at noon
1520
1521  83D4  60      mdone: rts
1522
1523
1524                          ;----------------------------------
1525                          ;     EXECUTIVE COMMANDS
1526                          ;----------------------------------
1527
1528  83D5          executive:
1529  83D5  AD DE 19                 lda     exec_command    ;do exec command
1530  83D8  F0 19                    beq     ?done           ;if any
1531  83DA  C9 01                    cmp     #1
1532  83DC  D0 05                    bne     ?2
1533  83DE  20 F7 83                 jsr     exec_command_1  ;make a new schedule
1534  83E1  80 10                    bra     ?done
1535  83E3  C9 02         ?2:        cmp     #2
1536  83E5  D0 05                    bne     ?3
1537  83E7  20 F5 84                 jsr     exec_command_2  ;idle
1538  83EA  80 07                    bra     ?done
1539  83EC  C9 03         ?3:        cmp     #3
1540  83EE  D0 03                    bne     ?done
1541  83F0  20 18 85                 jsr     exec_command_3  ;run
1542  83F3          ?done:
1543  83F3  9C DE 19                 stz     exec_command
1544  83F6  60                       rts
1545
1546
1547
1548                          ;     Title: executive command 1
1549                          ;
1550                          ;     Purpose: Create a schedule for today
1551                          ;
1552                          ;     Entry: SOURCE, real time calendar,
1553                          ;            and RUN_BLOCK
1554                          ;     Exit: daily schedule
1555                          ;     RAM used:  all kinds
1556
1557  83F7          exec_command_1:
1558  83F7  AD 80 0B                 lda     SOURCE          ;make sure object is there
1559  83FA  CD 0A 0E                 cmp     SOURCE_TYPE
1560  83FD  F0 03                    beq     ?semi
1561                                                         ;get program
1562  83FF  20 59 B4                 jsr     S2D
1563
1564  8402          ?semi:
1565  8402  AD 81 0B                 lda     SEMIAUTO        ;if semi-auto,
1566  8405  F0 22                    beq     ?rain
```

```
1555    8417   AD 9B 0B              lda    SPECDAY+3      ;then generate semi-auto schedule
1556    841A   48                    pha                   ;push special day#
1557    841B   AD 9A 0B              lda    SPECDAY+2
1558    841E   48                    pha
1559    841F   AD 99 0B              lda    SPECDAY+1
1560    8412   48                    pha
1561    8413   AD 98 0B              lda    SPECDAY
1562    8416   48                    pha
1563    8417   A9 00                 lda    #0
1564    8419   48                    pha                   ;push bogus daynum
1565    841A   48                    pha
1566    841B   48                    pha
1567    841C   48                    pha
1568    841D   48                    pha
1569    841E   AC 81 0B              ldy    SEMIAUTO       ;semi-auto type
1570    8421   A9 64                 lda    #100           ;no budget
1571    8423   AE 82 0B              ldx    SEMI_TEST
1572    8426   4C CE 84              jmp    do_gen
1573
1574    8429          ?rain:
1575    8429   AD 83 0B              LDA    RAIN_DELAY     ;if rain delay then
1576    842C   F0 03                 beq    ?ration
1577    842E   4C 6C 84              jmp    skip_sched     ;make skip schedule
1578
1579    8431          ?ration:
1580    8431   AD 0B 0E              LDA    CYCLE_TYPE     ;if RATION,
1581    8434   C9 02                 cmp    #2
1582    8436   F0 04                 beq    ?r
1583    8438   C9 03                 cmp    #3
1584    843A   D0 62                 bne    normal
1585    843C   AD 05 02       ?r:    LDA    day            ;then skip 31st day
1586    843F   C9 1F                 CMP    #31
1587    8441   F0 29                 BEQ    skip_sched
1588    8443   AD 04 02              LDA    month          ;also skip Feb 29
1589    8446   C9 02                 CMP    #2
1590    8448   D0 07                 BNE    ?p
1591    844A   AD 05 02              LDA    day
1592    844D   C9 1D                 CMP    #29
1593    844F   F0 1B                 BEQ    skip_sched
1594    8451   AD 0B 0E       ?p:    LDA    CYCLE_TYPE     ;skip if ODD/EVEN mismatch
1595    8454   C9 02                 cmp    #2
1596    8456   D0 0A                 bne    ?e
1597    8458   AD 05 02              lda    day            ;odd ration, skip if even day
1598    845B   29 01                 and    #00000001b
1599    845D   F0 0D                 beq    skip_sched
1600    845F   4C 9E 84              jmp    normal
1601    8462   AD 05 02       ?e:    lda    day            ;even ration, skip if odd day
1602    8465   29 01                 and    #00000001B
1603    8467   D0 03                 bne    skip_sched
1604    8469   4C 9E 84              jmp    normal
1605
1606                  skip_sched:                           ;generate skip schedule
1607    846C   AD 9B 0B              lda    SPECDAY+3      ;push special day#
1608    846F   48                    pha
1609    8470   AD 9A 0B              lda    SPECDAY+2
1610    8473   48                    pha
```

```
1624  8474  AD 99 0B              lda    SPECDAY+1
1625  8477  48                    pha
1626  8478  AD 98 0B              lda    SPECDAY
1627  847B  48                    pha
1628  847C  AD 03 02              lda    dow
1629  847F  48                    pha
1630  8480  A2 03                 ldx    #3
1631  8482  BD 94 0B       ?3:    lda    DAYNUM,x       ;push day number
1632  8485  48                    pha
1633  8486  CA                    dex
1634  8487  10 F9                 bpl    ?3
1635  8489  AE 04 02              ldx    month
1636  848C  BD 6C 0E              lda    ACTIVE_MONTH,x
1637  848F  F0 04                 beq    ?nosyr
1638  8491  A0 1A                 ldy    #00011010b     ;do syringes and specials
1639  8493  80 02                 bra    ?5
1640  8495  A0 18         ?nosyr: ldy    #00011000b     ;do specials only
1641  8497  A9 64          ?5:    lda    #100           ;budget irrelevant
1642  8499  A2 00                 ldx    #0
1643  849B  4C CE 84              jmp    do_gen
1644
1645                       normal:                      ;else generate normal schedule
1646  849E  AD 9B 0B              lda    SPECDAY+3      ;push special days
1647  84A1  48                    pha
1648  84A2  AD 9A 0B              lda    SPECDAY+2
1649  84A5  48                    pha
1650  84A6  AD 99 0B              lda    SPECDAY+1
1651  84A9  48                    pha
1652  84AA  AD 98 0B              lda    SPECDAY
1653  84AD  48                    pha
1654  84AE  AD 03 02              lda    dow
1655  84B1  48                    pha
1656  84B2  A2 03                 ldx    #3
1657  84B4  BD 94 0B       ?3:    lda    DAYNUM,x       ;push day number
1658  84B7  48                    pha
1659  84B8  CA                    dex
1660  84B9  10 F9                 bpl    ?3
1661  84BB  AE 04 02              ldx    month
1662  84BE  BD 6C 0E              lda    ACTIVE_MONTH,x
1663  84C1  F0 04                 beq    ?nosyr
1664  84C3  A0 1F                 ldy    #00011111b     ;do all advanced options
1665  84C5  80 02                 bra    ?5
1666  84C7  A0 1D         ?nosyr: ldy    #00011101b     ;no syringes
1667  84C9  20 D2 84       ?5:    jsr    calc_budget    ;do budget
1668  84CC  A2 00                 ldx    #0
1669
1670                       do_gen:                      ;generate the setup schedule
1671  84CE  20 70 BA              jsr    GENERATE
1672  84D1  60                    rts
1673
1674                       calc_budget:                 ;figure out today's budget
1675  84D2  5A                    phy
1676  84D3  DA                    phx
1677  84D4  AD 84 0B              lda    BUDGET_TYPE    ;get budget
1678  84D7  D0 05                 bne    ?2
1679  84D9  AD 85 0B              lda    YEAR_BUDGET
1680  84DC  80 06                 bra    ?4
```

```
1681  84DE  AE 04 02    ?2:           ldx     month
1682  84E1  BD 86 0B                  lda     MO_BUDGET,x
1683  84E4  AC 93 0B    ?4:           ldy     #FINETUNE
1684  84E7  20 00 00                  jsr     R9_mult         ;budget=budget*finetune/100
1685  84EA  A2 00                     ldx     #0              ;divisor
1686  84EC  DA                        phx
1687  84ED  A2 64                     ldx     #100
1688  84EF  DA                        phx
1689  84F0  48                        pha                     ;dividend
1690  84F1  5A                        phy
1691  84F2  20 00 00                  jsr     R9_div16
1692  84F5  98                        tya                     ;lsb of quotient
1693  84F6  FA                        plx
1694  84F7  7A                        ply
1695  84F8  60                        rts
1696
1697
1698                    exec_command_2:                       ;idle
1699                                                          ;setting new_time makes valves turn off
1700  84F9  78                        sei
1701  84FA  AD 01 02                  lda     hour
1702  84FD  AC 02 02                  ldy     minute
1703  8500  20 D6 B6                  jsr     hm2m
1704  8503  8C AA 0B                  sty     new_time
1705  8506  8D AB 0B                  sta     new_time+1
1706  8509  09 80                     ora     #10000000b
1707  850B  8D AB 0B                  sta     new_time+1
1709  850E                            set     idle
1712  8513  20 BB 81                  jsr     WATER
1713  8516  58                        cli
1714  8517  60                        rts
1715
1716                    exec_command_3:                       ;run
1717                                                          ;setting new_time makes valves turn off
1718  8518  78                        sei
1719  8519  AD 81 0B                  lda     SEMIAUTO        ;if semi-auto, start now
1720  851C  F0 0E                     beq     ?0
1721  851E                            MOV16   BASE_START,new_time
1727  852A  80 0F                     bra     ?1
1728  852C  AD 01 02    ?0:           lda     hour
1729  852F  AC 02 02                  ldy     minute
1730  8532  20 D6 B6                  jsr     hm2m
1731  8535  8C AA 0B                  sty     new_time
1732  8538  8D AB 0B                  sta     new_time+1
1733  853B  AD AB 0B    ?1:           lda     new_time+1
1734  853E  09 80                     ora     #10000000b
1735  8540  8D AB 0B                  sta     new_time+1
1736  8543  9C AD 0B                  stz     idle
1737  8546  20 BB 81                  jsr     WATER
1738  8549  58                        cli
1739  854A  60                        rts
1740
1741
1742
1743
1744
1745
```

```
1746
1747  854B                      INCLUDE     PWRKEY.ASM
1748  854B
1749                        ;----------------------------------
1750                        ;    POWER KEY INSTALLED
1751                        ;----------------------------------
1752
1753  854B  A5 4B     PROGIN: LDA    FLAGS          ;Power key is in, system charged
1754  854D  09 01             ORA    #00000001B
1755  854F  85 4B             STA    FLAGS
1756                                                ;init key manager
1757  8551  20 00 00          jsr    R2_key_init
1758  8554  A9 03             lda    #3             ;repeat up,down arrows
1759  8556  20 00 00          jsr    R2_repeat_enable
1760  8559  A9 04             lda    #4
1761  855B  20 00 00          jsr    R2_repeat_enable
1762
1763  855E           P60:
1764  855E  A9 21             lda    #$21           ;tell history key is in
1765  8560  20 76 B7          jsr    log_history
1766  8563  A9 C8             lda    #200           ;debounce power key
1767  8565  20 00 00          jsr    R9_wait_ms
1768  8568  20 00 00          jsr    video_clear
1769  856B  20 00 00          jsr    R1_display_init ;fire LCD up
1770
1771
1772  856E  20 00 00          jsr    R4_timer_on    ;enable INT
1773  8571                    MESSAGE MSG0
1778  8578  A9 01     P64:    LDA    #1
1779  857A  85 5D             STA    CONTRAST       ;start with default contrast
1780  857C  A6 5D     P62:    LDX    CONTRAST
1781  857E  BD 95 C3          LDA    CONTRAST_TBL,X ;send contrast to LCD
1782  8581  85 1A             STA    LCD_CONTRAST
1783  8583                    SET_CURSOR LINE2+14
1787  8588  A5 5D             LDA    CONTRAST
1788  858A  20 00 00          jsr    d2d
1789  858D  A9 19             LDA    #PERSEC
1790  858F  85 43             STA    TIMCTR         ;wait 1 sec. between contrasts
1791  8591  20 4B B7  P63:    JSR    GETKEY
1792  8594  C9 01             cmp    #okkey
1793  8596  F0 0E             BEQ    ISGAME         ;OK key
1794  8598  A5 43             LDA    TIMCTR
1795  859A  D0 F5             BNE    P63
1796  859C  E6 5D             INC    CONTRAST       ;timed out
1797  859E  A5 5D             LDA    CONTRAST
1798  85A0  C9 04             CMP    #4
1799  85A2                    BGE    P64
1802  85A4  80 D6             BRA    P62
1803
1804  85A6           ISGAME:
1805  85A6  20 00 00          jsr    game
1806
1807
1808  85A9           ISDIRECTIONS:
1809
1810
1811                        ;----------------------------------
```

```
1812                           ;       SELF TEST
1813                           ;------------------------------------
1814                                     .
1815                           SELFTEST:                ;do system self test
1816  85A9  20 5B B7                   JSR     DKCLR
1817  85AC                             MESSAGE MSG124
1822  85B3                             SET_CURSOR 0
1825  85B8  A9 00                      lda     #0
1827  85BA                             local_option opt2
1833  85C2  90 09                      bcc     ?1
1834  85C4                             HELP    none
1839  85CB  80 DC                      BRA     SELFTEST
1840  85CD  D0 03          ?1:         bne     SLF
1841  85CF  4C 09 B7                   jmp     SECRET
1842
1843  85D2  20 5B B7       SLF:        jsr     DKCLR        ;test valve wiring
1844  85D5  20 EF B9                   jsr     selftest
1845
1846  85D8  AD E3 19       SLF30:  LDA     selfram       ;if no shorts or opens,
1847  85DB  0D E4 19               ORA     selfram+1
1848  85DE  D0 19                  BNE     SLF35
1849  85E0  20 5B B7               JSR     DKCLR
1850  85E3                         MESSAGE MSG106          ;then show good status
1855  85EA  20 EE B7               jsr     prompt
1856  85ED  20 4B B7       ?2:     jsr     GETKEY
1857  85F0  C9 03                  cmp     #upkey
1858  85F2  F0 02                  beq     ?up
1859  85F4  80 F7                  bra     ?3
1860  85F6  4C 81 86       ?up:    jmp     SLF60
1861
1862  85F9            SLF35:
1863  85F9  AD E4 19               LDA     selfram+1     ;if any opens
1864  85FC  F0 3F                  BEQ     SLF40
1865  85FE  8D 5B 02               sta     IBFR
1866  8601  20 5B B7               JSR     DKCLR
1867  8604                         SET     IBFR+1        ;then show them
1871  8609                         MESSAGE MSG107
1876  8610                         SET_CURSOR LINE2
1880  8615                         DISP    '#'
1884  861A  6E 5B 02       SLF36:  ROR     IBFR
1885  861D  90 08                  BCC     SLF37
1886  861F  AD 5C 02               LDA     IBFR+1
1887  8622  09 30                  ORA     #ASCMASK
1888  8624  20 00 00               jsr     dchar
1889  8627  EE 5C 02       SLF37:  INC     IBFR+1
1890  862A  AD 5C 02               LDA     IBFR+1
1891  862D  C9 09                  CMP     #9
1892  862F  D0 E9                  BNE     SLF36
1893  8631  20 EE B7               jsr     prompt
1894  8634  20 4B B7       ?3:     jsr     GETKEY
1895  8637  C9 03                  cmp     #upkey
1896  8639  F0 02                  beq     SLF40
1897  863B  80 F7                  bra     ?3
1898
1899  863D            SLF40:
1900  863D  AD E3 19               lda     selfram      ;if any shorts
1901  8640  F0 3F                  BEQ     SLF60
```

```
1910  8E42  8D 5B 02              sta     IBFR
1911  8E45  20 5B B7              JSR     DKCLR
1912  8E48                        SET     IBFR+1          ;then show them
1913  8E4C                        MESSAGE MSG108
1920  8E54                        SET_CURSOR LINE2
1921  8E58                        DISP    '='
1922  8E5B  EE 5B 02      SLF46:  ROR     IBFR
1923  8E5E  90 08                 BCC     SLF47
1923  8E60  AD 5C 02              LDA     IBFR+1
1924  8E63  09 30                 ORA     #ASCMASK
1925  8E65  20 00 00              JSR     dchar
1926  8E68  EE 5C 02      SLF47:  INC     IBFR+1
1927  8E6B  AD 5C 02              LDA     IBFR+1
1928  8E6E  C9 09                 CMP     #9
1929  8E70  D0 E9                 BNE     SLF46
1930  8E72  20 EE B7              jsr     prompt
1931  8E75  20 4B B7      ?3:     jsr     GETKEY
1932  8E78  C9 03                 cmp     #upkey
1933  8E7A  F0 02                 beq     SLF60
1934  8E7C  80 F7                 bra     ?3
1935
1936                    SLF60:                            ;show if running or not
1937  8E7E  20 5B B7              jsr     DKCLR
1938  8E81  20 30 B2              jsr     DISP_SOURCE
1939  8E84                        SET_CURSOR LINE2
1943  8E8C  AD AD 0B              lda     idle
1944  8E8F  F0 09                 beq     ?1
1945  8E91                        MESSAGE MSG71           ;idle
1950  8E9B  80 07                 bra     ?2
1951  8E9A          ?1:           MESSAGE MSG70
1956  8EA1  20 EE B7      ?2:     jsr     prompt
1957  8EA4  20 4B B7      ?3:     jsr     GETKEY
1958  8EA7  C9 03                 cmp     #upkey
1959  8EA9  F0 02                 beq     SLF70
1960  8EAB  80 F7                 bra     ?3
1961
1962  8EAD  78            SLF70:  sei
1963  8EAE  20 5B B7              JSR     DKCLR           ;show system time and version
1964  8EB1  A2 05                 LDX     #5
1965  8EB3  BD 01 02      SLF71:  LDA     hour,X          ;move current time to working area
1966  8EB6  9D 5F 02              STA     IBFR+4,X
1967  8EB9  CA                    DEX
1968  8EBA  10 F7                 BPL     SLF71
1969  8EBC  20 B9 B1              JSR     DISPTIME
1970  8EBF                        SKIP    2
1976  8EC8                        DISP    'v'
1980  8ECD                        DISP    '.'
1984  8ED2                        near_msg pversion
1989  8ED9                        SET_CURSOR LINE2
1993  8EDE  AD 61 02              lda     IBFR+6
1994  8EE1  20 00 00              jsr     display_dow
1995  8EE4                        SKIP    2
2001  8EED  AD 62 02              lda     IBFR+7
2002  8EF0  AC 63 02              ldy     IBFR+8
2003  8EF3  AE 64 02              ldx     IBFR+9
2004  8EF6  20 00 00              jsr     display_date
2005  8EF9  58                    cli
```

```
2006  86FA  20 EE B7           jsr    prompt
2007  86FD  20 4B B7    ?3:    jsr    GETKEY
2008  8700  C9 03              cmp    #upkey
2009  8702  F0 02              beq    self_done
2010  8704  80 F7              bra    ?3
2011
2012  8706              self_done:
2013  8706  4C A9 85           JMP    SELFTEST        ;do it again?
2014
2015
2016                    ;------------------------------------
2017                    ;     PASSWORD
2018                    ;------------------------------------
2019
2020                    SECRET:                        ;enter password to go any further
2021  8709  AD 09 0B           LDA    PASSWORD        ;if enabled
2022  870C  F0 05              beq    GOOD_WORD
2023
2024  870E  20 AB 8C           JSR    ENTER_PASSWORD
2025  8711  B0 F6              BCS    SECRET          ;carry set if no match
2026
2027
2028                    GOOD_WORD:                     ;password entered
2029  8713  AD AD 0B           lda    idle            ;if running,
2030  8716  D0 38              bne    ?done
2031  8718  20 5B B7    ?0:    JSR    DKCLR
2032  871B              MESSAGE MSS181                 ;verify that user wants to STOP
2037  8722  20 4B B7    ?1:    JSR    GETKEY          ;or expect pwrkey to be yanked out
2038  8725  F0 FB              beq    ?1
2039  8727  C9 01              CMP    #okkey
2040  8729  F0 0D              beq    ?stop
2041  872B  C9 02              cmp    #helpkey
2042  872D  D0 F3              bne    ?1
2043  872F              HELP    none
2048  8736  80 E0              bra    ?0
2049
2050  8738              ?stop:
2051  8738  AD 81 0B           lda    SEMIAUTO
2052  873B  F0 0B              beq    ?2
2053  873D  9C 81 0B           stz    SEMIAUTO        ;if semiauto, then stop it
2054  8740  A9 01              lda    #1              ;and create a normal schedule
2055  8742  8D DE 19           sta    exec_command
2056  8745  20 D5 83           jsr    executive
2057  8748  A9 02       ?2:    lda    #2              ;idle
2058  874A  8D DE 19           sta    exec_command
2059  874D  20 D5 83           jsr    executive
2060
2061  8750              ?done:
2062  8750  4C 53 87           jmp    welcome
2063
2064                    ;------------------------------------------
2065
2066
2067
2068
2069
2070
```

```
2071  8753                           INCLUDE    MENU.ASM
2072                          ;---------------------------------
2073                          ;      MAIN MENU SCREEN
2074                          ;---------------------------------
2075
2076                          welcome:                         ;preamble to main menu
2077  8753  20 00 00                  JSR     R4_timer_on
2078  8756  20 5B B7                  JSR     DKCLR            ;welcome aboard
2079  8759                            MESSAGE MSG115
2084
2085  8760  20 4B B7          ?11:    JSR     GETKEY
2086  8763  C9 01                     cmp     #okkey
2087  8765  F0 0D                     beq     main_menu
2088  8767  C9 02                     cmp     #helpkey
2089  8769  D0 F5                     BNE     ?11
2090  876B                            HELP    MainOptHELP
2095  8772  80 DF                     bra     welcome
2096
2097                          ;---------------------------------
2098                          ;      MAIN MENU
2099                          ;---------------------------------
2100
2101                          main_menu:                       ;main menu selection
2102  8774  64 46                     stz     MODE
2103  8776  20 5B B7          main1:  JSR     DKCLR
2104  8779                            MESSAGE MSG1
2109  8780                            SET_CURSOR LINE2
2113  8785  A5 46                     LDA     MODE
2114  8787                            local_option mainopt    ;pick main option
2120  878F  85 46                     sta     MODE
2121  8791  90 0D                     bcc     ?1
2122  8793  0A                        asl     a                ;context sensitive help
2123  8794  AA                        tax
2124  8795  BC BB 87                  ldy     ?htable,x
2125  8798  BD BC 87                  lda     ?htable+1,x
2126  879B  20 E1 B7                  jsr     help_bank1
2127  879E  80 D6                     bra     main1
2128  87A0  0A                ?1:     asl     a                ;branch to selection
2129  87A1  AA                        tax
2130  87A2  BD AF 87                  lda     ?tbl,x
2131  87A5  85 4E                     sta     srcptr
2132  87A7  BD B0 87                  lda     ?tbl+1,x
2133  87AA  85 4F                     sta     srcptr+1
2134  87AC  6C 4E 00                  jmp     (srcptr)
2135
2136  87AF                    ?tbl:
2137  87AF  CA96                      WORD    ENTER_SCHEDULE
2138  87B1  ABAA                      WORD    RUN_SCHEDULE
2139  87B3  CB87                      WORD    MANUAL_MODE
2140  87B5  F2B9                      WORD    IDLE_MODE
2141  87B7  358A                      WORD    SETUP_SYSTEM
2142  87B9  AC93                      WORD    VIEW_INFO
2143
2144  87BB                    ?htable:
2145  87BB  0000                      word    EnterSchHELP
2146  87BD  0000                      word    RunSchedHELP
2147  87BF  0000                      word    ManualHELP
```

```
2148  87C1  0000              word     IdleHELP
2149  87C3  0000              word     SystemHELP
2150  87C5  0000              word     InfoHELP
2151
2152  87C7           next_main:
2153  87C7  E6 46             inc      MODE
2154  87C9  80 AB             bra      main1
2155
2156
2157                   ;--------------------------------
2158                   ;       MANUAL MODE
2159                   ;--------------------------------
2160
2161                   MANUAL_MODE:                    ;select function
2162  87CB  64 48             stz      sub_mode
2163  87CD  20 5B B7   mm1:   JSR      DKCLR
2164  87D0                    MESSAGE  MS68
2169  87D7                    SET_CURSOR LINE2
2173  87DC  A5 48             lda      sub_mode
2174  87DE                    local_option manopt
2180  87E6  85 48             sta      sub_mode
2181  87E8  90 0D             bcc      ?1
2182  87EA  0A                asl      a             ;context sensitive help
2183  87EB  AA                tax
2184  87EC  BC 0C 88          ldy      ?htable,x
2185  87EF  BD 0D 88          lda      ?htable+1,x
2186  87F2  20 E1 B7          jsr      help_bank1
2187  87F5  80 D6             bra      mm1
2188  87F7           ?1:
2189  87F7  0A                asl      a             ;then go there
2190  87F8  AA                tax
2191  87F9  BD 06 88          lda      ?tbl,x
2192  87FC  85 4E             sta      srcptr
2193  87FE  BD 07 88          lda      ?tbl+1,x
2194  8801  85 4F             sta      srcptr+1
2195  8803  6C 4E 00          jmp      (srcptr)
2196
2197  8806           ?tbl:
2198  8806  1288             WORD     MMV
2199  8808  1389             WORD     MMT
2200                   ;       WORD     MMS
2201  880A  C787             WORD     next_main
2202
2203  880C           ?htable:
2204  880C  0000              word     ManStnsHELP
2205  880E  0000              word     TestSeqHELP
2206                   ;       word     SensorHELP
2207  8810  0000              word     FinishedHELP
2208
2209
2210                   ;       manual valves
2211                   ;--------------------------------
2212
2213  8812           MMV:
2214  8812  64 45             STZ      VALVE         ;Manual Mode - Valves
2215  8814  4C BA 88          JMP      MMV2
2216  8817  20 5B B7   MMV0:  JSR      DKCLR
```

```
2217  881A  20 F3 88              JSR     DISPVS
2218  881D                        SET_CURSOR LINE2           ;show second line
2222  8822  A6 45                 LDX     VALVE
2223  8824  BD E5 19              LDA     VS,X
2224  8827  89 10                 BIT     #00010000B
2225  8829  D0 09                 BNE     ?8
2226  882B                        MESSAGE MSG201
2231  8832  80 07                 BRA     ?6
2232  8834              ?8:       MESSAGE MSG200
2237  883B              ?6:       SET_CURSOR LINE2+7
2241  8840  20 FC B1              JSR     DV
2242  8843                        SET_CURSOR LINE2+12
2246  8848                        ON
2250  884D  20 4B B7    ?7:       JSR     GETKEY
2251  8850  F0 FB                 beq     ?7
2252  8852  C9 01                 CMP     #okkey
2253  8854  F0 13                 BEQ     MMV1
2254  8856  C9 02                 CMP     #helpkey
2255  8858  D0 09                 bne     ?2
2256  885A                        HELP    none
2261  8861  80 AF                 BRA     MMV
2262  8863  C9 03       ?2:       cmp     #upkey
2263  8865  F0 53                 beq     MMV2
2264  8867  80 E4                 bra     ?7
2265
2266  8869  A6 45       MMV1:     LDX     VALVE            ;OK key, toggle ON/OFF
2267  886B  BD E5 19              LDA     VS,X
2268  886E  89 10                 BIT     #00010000B
2269  8870  F0 21                 BEQ     MMV3
2270  8872  A5 45                 lda     VALVE
2271  8874  20 67 B8              jsr     valve_off
2272  8877  20 73 B8              jsr     valve_update
2273  887A  20 5B B7              JSR     DKCLR            ;wait after turning valve off
2274  887D  20 F3 88              JSR     DISPVS
2275  8880                        SET_CURSOR LINE2
2279  8885                        MESSAGE MSG43
2284  888C  A9 05                 lda     #5
2285  888E  20 00 00              jsr     R9_wait_sec
2286  8891  80 27                 BRA     MMV2
2287  8893  A5 45       MMV3:     lda     VALVE
2288  8895  20 5D B8              jsr     valve_on
2289  8898  20 73 B8              jsr     valve_update
2290  889B  A9 02                 lda     #$02
2291  889D  20 76 B7              jsr     log_history
2292  88A0  20 5B B7              JSR     DKCLR            ;wait after turning valve on
2293  88A3  20 F3 88              JSR     DISPVS
2294  88A6                        SET_CURSOR LINE2
2298  88AB                        MESSAGE MSG76
2303  88B2  A9 05                 lda     #5
2304  88B4  20 00 00              jsr     R9_wait_sec
2305  88B7  4C 17 88              JMP     MMV0
2306
2307  88BA  20 50 B0    MMV2:     JSR     NXTSTA           ;do next valve
2308  88BD  90 31                 BCC     ?22
2309
2310  88BF  20 5B B7    ?3:       JSR     DKCLR            ;Finished?
2311  88C2                        SET_CURSOR LINE2
```

```
2315  88C7                        MESSAGE MSG232
2316  88CE                        SET_CURSOR 0
2324  88D3  A9 00                 lda     #0
2325  88D5                        local_option opt3
2331  88DC  90 09           bcc     ?1
2332  88DF                        HELP    none
2337  88EE  80 D7                 bra     ?3
2338  88E8  F0 03           ?1:   beq     ?done        ;yes
2339  88EA  4C 12 88              JMP     MMV          ;no, repeat run stations
2340
2341  88ED  4C CC B9        ?done: jmp    exit_manual
2342  88F0  4C 17 88        ?22:   JMP    MMV0
2343
2344                        DISPVS:                    ;display valve status line
2345  88F3                        MESSAGE MSG61
2350  88FA  A2 01                 LDX     #1
2351  88FC  BD E5 19        ?V3:  LDA     VS,X
2352  88FF  89 10                 BIT     #00010000B
2353  8901  F0 05                 BEQ     ?V1
2354  8903  8A                    TXA                  ;valve is on, show valve #
2355  8904  09 30                 ORA     #ASCMASK
2356  8906  80 02                 BRA     ?V2
2357  8908  A9 2D           ?V1:  LDA     #'-'         ;valve off, show -
2358  890A  20 00 00        ?V2:  jsr     cchar
2359  890D  E8                    INX                  ;do all 8
2360  890E  E0 09                 CPX     #9
2361  8910  D0 EA                 BNE     ?V3
2362  8912  60                    RTS
2363
2364                        ;--------------------------------
2365                        ;    manual test sequence
2366                        ;--------------------------------
2367
2368  8913  20 5B B7        MMT:  JSR     DKCLR        ;Test sequence for valves
2369  8916                        MESSAGE MSG117
2374  891D                        SET_CURSOR LINE2
2378  8922  A9 02                 LDA     #2           ;get duration, default=2
2379  8924                        select  1,30,1
2390  8935  90 09                 BCC     MMT1
2391  8937                        HELP    none
2396  893E  80 D3                 BRA     MMT
2397  8940                  MMT1: set     VALVE        ;start with valve 1
2401  8944  20 5B B7        MMT2: JSR     DKCLR
2402  8947                        MESSAGE MSG118
2407  894E  20 EC B1              JSR     DVALVEMSG    ;show valve # and status
2408
2409  8951  A5 45           ?10:  lda     VALVE        ;turn it on
2410  8953  20 5D B8              jsr     valve_on
2411  8956  20 73 B8              jsr     valve_update
2412  8959  A9 02                 lda     #$02
2413  895B  20 76 B7              jsr     log_history
2414  895E  AD 5B 02              LDA     IBFR         ;start countdown
2415  8961  85 41                 STA     MSB
2416  8963  64 53                 STZ     SECCTR
2417  8965  64 40                 STZ     LSB
2418  8967                        MESSAGE MSG133           ;show that valve is on
2423  896E                  ?11:  SET_CURSOR LINE2+4   ;show time remaining
```

```
2427  8973  A5 41                  LDA    MSB
2428  8975  20 00 00               jsr    d2dxx
2429  8978                         DISP   ':'
2433  897D  A5 40                  LDA    LSB
2434  897F  20 00 00               jsr    d2dxx
2435  8982  A5 53         ?12:     LDA    SECCTR       ;if new second, show it
2436  8984  C5 40                  CMP    LSB
2437  8986  F0 10                  BEQ    ?15
2438  8988  85 40                  STA    LSB
2439  898A  A5 40                  LDA    LSB          ;if new minute, dec minute
2440  898C  10 E0                  BPL    ?11
2441  898E  C6 41                  DEC    MSB
2442  8990  A9 3B                  LDA    #59
2443  8992  85 40                  STA    LSB
2444  8994  85 53                  STA    SECCTR
2445  8996  80 D6                  BRA    ?11
2446  8998  20 4B B7      ?15:     JSR    GETKEY       ;wait until OK key
2447  899B  C9 01                  cmp    #okkey
2448  899D  F0 28                  beq    ?done
2449  899F  A5 41                  LDA    MSB          ;or no more time
2450  89A1  05 40                  ORA    LSB
2451  89A3  D0 DD                  BNE    ?12
2452  89A5  A5 45                  lda    VALVE        ;then valve off
2453  89A7  20 67 B8               jsr    valve_off
2454  89AA  20 73 B8               jsr    valve_update
2455  89AD  20 00 00               jsr    line2_clear  ;wait for valve to turn off
2456  89B0                         MESSAGE MSG43
2461  89B7  A9 14                  lda    #20
2462  89B9  20 00 00               jsr    R9_wait_sec
2463
2464  89BC                ?NEXT:
2465  89BC  E6 45                  INC    VALVE
2466  89BE  A5 45                  LDA    VALVE
2467  89C0  CD 3B 0B               CMP    numsta
2468  89C3                         blt    ?more
2471  89C5  F0 02                  beq    ?more
2472
2473  89C7  80 03         ?done:   bra    exit_manual
2474  89C9  4C 44 89      ?more:   JMP    MMT2
2475
2476  89CC                exit_manual:
2477  89CC  20 B0 B8               jsr    ALL_VALVES_OFF
2478  89CF  90 10                  bcc    ?1
2479  89D1  20 5B B7               jsr    DKCLR
2480  89D4                         MESSAGE MSG125
2485  89DB  20 47 B5               jsr    MSGWAIT
2486  89DE  20 47 B5               jsr    MSGWAIT
2487  89E1  A9 02         ?1:      lda    #2
2488  89E3  85 4B                  sta    sub_mode
2489  89E5  4C CD 87               jmp    mm1
2490  89E8
2491
2492                      ;------------------------------
2493                      ;     manual sensors
2494                      ;------------------------------
2495
2496  89E8                MMS:
```

```
2497  89E8                              HELP    not_avail
2502  89EF   4C CB 87                   JMP     MANUAL_MODE
2503
2504
2505                          ;--------------------------------
2506                          ;       IDLE
2507                          ;--------------------------------
2508
2509                          IDLE_MODE:                      ;do nothing mode
2510  89F2   20 5B B7                   JSR     DKCLR           ;confirm
2511  89F5                              MESSAGE MSG69
2516  89FC                              QM
2520
2521  8A01   20 4B B7          ?3:      jsr     GETKEY
2522  8A04   F0 FB                      beq     ?3
2523  8A06   C9 01                      cmp     #okkey
2524  8A08   F0 0E                      beq     ?1
2525  8A0A   C9 02                      cmp     #helpkey
2526  8A0C   D0 07                      bne     ?2
2527  8A0E                              HELP    none
2532  8A15   4C C7 87          ?2:      jmp     next_main       ;changed my mind, exit
2533
2534  8A18   20 5B B7          ?1:      JSR     DKCLR           ;ok, do it
2535  8A1B   A9 01                      lda     #1
2536  8A1D   8D DE 19                   sta     exec_command
2537  8A20   20 D5 83                   jsr     executive
2538  8A23   A5 4B                      lda     FLAGS           ;tell no_batt this is legal exit
2539  8A25   09 08                      ora     #00001000b
2540  8A27   85 4B                      sta     FLAGS
2541  8A29                              MESSAGE MSG99           ;wait for power key gone
2546  8A30   20 4B B7          ?0:      jsr     GETKEY          ;keep doing maintenance
2547  8A33   80 FB                      bra     ?0
2548
2549
2550                          ;--------------------------------
2551                          ;       SET UP SYSTEM
2552                          ;--------------------------------
2553
2554                          SETUP_SYSTEM:                   ;select function
2555  8A35   64 48                      stz     sub_mode
2556  8A37   20 5B B7          SU1:     JSR     DKCLR
2557  8A3A                              MESSAGE MSG193
2562  8A41                              SET_CURSOR LINE2
2566  8A46   A5 48                      lda     sub_mode
2567  8A48                              local_option sysopt
2573  8A50   85 48                      sta     sub_mode
2574  8A52   90 0D                      bcc     ?1
2575  8A54   0A                         asl     a               ;context sensitive help
2576  8A55   AA                         tax
2577  8A56   BC 7E 8A                   ldy     ?htable,x
2578  8A59   BD 7F 8A                   lda     ?htable+1,x
2579  8A5C   20 E1 B7                   jsr     help_bank1
2580  8A5F   80 D6                      bra     SU1
2581  8A61                    ?1:
2582  8A61   0A                         asl     a               ;then go there
2583  8A62   AA                         tax
2584  8A63   BD 70 8A                   lda     ?tbl,x
```

```
2585  8A66  85 4E            sta     srcptr
2586  8A68  BD 71 8A         lda     ?tbl+1,x
2587  8A6B  85 4F            sta     srcptr+1
2588  8A6D  6C 4E 00         jmp     (srcptr)
2589
2590  8A70           ?tbl:
2591  8A70  908A             word    system_time
2592  8A72  958A             WORD    SET_CODES
2593  8A74  2A8D             WORD    SET_NAME
2594  8A76  438E             WORD    SET_PROGRAM
2595  8A78  BD8E             WORD    STATION_ID
2596  8A7A  4992             WORD    MONTHLY
2597  8A7C  C787             WORD    next_main
2598
2599  8A7E           ?htable:
2600  8A7E  0000             word    TimeSetHELP
2601  8A80  0000             word    PasswordsHELP
2602  8A82  0000             word    ComputIDHELP
2603  8A84  0000             word    ActivePgmHELP
2604  8A86  0000             word    WiringHELP
2605  8A88  0000             word    MoBudHELP
2606  8A8A  0000             word    OKSysHELP
2607
2608  8A8C           next_system:
2609  8A8C  E6 48            inc     sub_mode
2610  8A8E  80 A7            bra     SU1
2611
2612                  ;--------------------------------
2613                  ;     get time
2614                  ;--------------------------------
2615
2616  8A90           system_time:
2617  8A90  20 37 AF         jsr     SET_TIME
2618  8A93  80 F7            bra     next_system
2619
2620
2621                  ;--------------------------------
2622                  ;     passwords
2623                  ;--------------------------------
2624
2625                  SET_CODES:                    ;enter/edit supervisor and gardener
2626
2627  8A95  AD 0A 0B         LDA     PASS1         ;if no factory code,
2628  8A98  0D 0B 0B         ORA     PASS1+1
2629  8A9B  0D 0C 0B         ORA     PASS1+2
2630  8A9E  D0 50            BNE     PW20          ;then enter it
2631  8AA0  20 5B B7  PW21:  JSR     DKCLR
2632  8AA3             MESSAGE MSG233
2637  8AAA             SET_CURSOR 6
2641  8AAF             MESSAGE MSG234
2646  8AB6             SET_CURSOR LINE2+11
2650  8ABB  AD 0A 0B         LDA     PASS1
2651  8ABE  8D 5B 02         STA     IBFR
2652  8AC1  AD 0B 0B         LDA     PASS1+1
2653  8AC4  8D 5C 02         STA     IBFR+1
2654  8AC7  AD 0C 0B         LDA     PASS1+2
2655  8ACA  8D 5D 02         STA     IBFR+2
```

```
2656  8ACD  20 5B 8C              JSR    ENTER_CODE3
2657  8AD0  90 09                 BCC    ?done
2658  8AD2                        HELP   none
2663  8AD9  80 15                 BRA    PW20
2664  8ADB  AD 5B 02    ?done:    LDA    IBFR
2665  8ADE  8D 0A 0B              STA    PASS1
2666  8AE1  AD 5C 02              LDA    IBFR+1
2667  8AE4  8D 0B 0B              STA    PASS1+1
2668  8AE7  AD 5D 02              LDA    IBFR+2
2669  8AEA  8D 0C 0B              STA    PASS1+2
2670  8AED  4C 8C 8A              JMP    next_system
2671
2672  8AF0  AD 0D 0B    PW20:     LDA    PASS2              ;if there is a supvsr password,
2673  8AF3  0D 0E 0B              ORA    PASS2+1
2674  8AF6  0D 0E 0B              ORA    PASS2+1
2675  8AF9  F0 16                 BEQ    PW30
2676  8AFB  20 AB 8C              JSR    ENTER_PASSWORD     ;then must enter password
2677  8AFE  B0 07                 BCS    PW25
2678  8B00  AD 09 0B              LDA    PASSWORD
2679  8B03  C9 03                 CMP    #3                 ;no access to gardener
2680  8B05  D0 0A                 BNE    PW30
2681  8B07              PW25:     HELP   none
2686  8B0E  4C 8C 8A              JMP    next_system
2687
2688                   PW30:                                 ;enter/edit supervisor code
2689  8B11  AD 0D 0B              LDA    PASS2
2690  8B14  8D 5B 02              STA    IBFR
2691  8B17  AD 0E 0B              LDA    PASS2+1
2692  8B1A  8D 5C 02              STA    IBFR+1
2693  8B1D  AD 0F 0B              LDA    PASS2+2
2694  8B20  8D 5D 02              STA    IBFR+2
2695  8B23  A9 02                 LDA    #2
2696  8B25  8D 5E 02              STA    IBFR+3
2697  8B28  20 FC 8B              JSR    VERIF
2698  8B2B  90 3D                 BCC    PW40
2699  8B2D  20 5B B7              JSR    DKCLR
2700  8B30                        MESSAGE MSG233
2705  8B37                        SET_CURSOR 6
2709  8B3C                        MESSAGE MSG235
2714  8B43                        SET_CURSOR LINE2+11
2718  8B48  20 5B 8C              JSR    ENTER_CODE3
2719  8B4B  90 09                 BCC    PW32
2720  8B4D                        HELP   none
2725  8B54  80 BB                 BRA    PW30
2726  8B56  AD 5B 02    PW32:     LDA    IBFR
2727  8B59  8D 0D 0B              STA    PASS2
2728  8B5C  AD 5C 02              LDA    IBFR+1
2729  8B5F  8D 0E 0B              STA    PASS2+1
2730  8B62  AD 5D 02              LDA    IBFR+2
2731  8B65  8D 0F 0B              STA    PASS2+2
2732  8B68  80 A7                 BRA    PW30
2733
2734              PW40:                                      ;enter/edit gardener code
2735  8B6A  AD 10 0B              LDA    PASS3
2736  8B6D  8D 5B 02              STA    IBFR
2737  8B70  AD 11 0B              LDA    PASS3+1
2738  8B73  8D 5C 02              STA    IBFR+1
```

```
2739  8B76  AD 12 0B              LDA   PASS3+2
2740  8B79  8D 5D 02              STA   IBFR+2
2741  8B7C  A9 03                 LDA   #3
2742  8B7E  8D 5E 02              STA   IBFR+3
2743  8B81  20 FC 8B              JSR   VERIF
2744  8B84  90 3D                 BCC   PW50
2745  8B86  20 5B B7              JSR   DKCLR
2746  8B89                        MESSAGE MSG233
2751  8B90                        SET_CURSOR 6
2755  8B95                        MESSAGE MSG236
2760  8B9C                        SET_CURSOR LINE2+11
2764  8BA1  20 5B 8C              JSR   ENTER_CODE3
2765  8BA4  90 09                 BCC   PW42
2766  8BA6                        HELP  none
2771  8BAD  80 BB                 BRA   PW40
2772  8BAF  AD 5B 02    PW42:     LDA   IBFR
2773  8BB2  8D 10 0B              STA   PASS3
2774  8BB5  AD 5C 02              LDA   IBFR+1
2775  8BB8  8D 11 0B              STA   PASS3+1
2776  8BBB  AD 5D 02              LDA   IBFR+2
2777  8BBE  8D 12 0B              STA   PASS3+2
2778  8BC1  80 A7                 BRA   PW40
2779
2780  8BC3  20 5B B7    PW50:     JSR   DKCLR          ;enable codes?
2781  8BC6                        SET_CURSOR LINE2
2785  8BCB                        MESSAGE MSG229
2790  8BD2                        SET_CURSOR 0
2794  8BD7  A9 00                 lda   #0
2795  8BD9                        local_option opt4
2801  8BE1  90 09                 bcc   ?1
2802  8BE3                        HELP  none
2807  8BEA  80 D7                 BRA   PW50
2808  8BEC  F0 06       ?1:       beq   ?3
2809  8BEE  9C 09 0B              STZ   PASSWORD       ;codes disabled
2810  8BF1  4C 8C 8A              JMP   next_system
2811  8BF4  A9 02       ?3:       LDA   #2             ;codes enabled
2812  8BF6  8D 09 0B              STA   PASSWORD
2813  8BF9  4C 8C 8A              JMP   next_system
2814
2815                    VERIF:                         ;verify code in IBFR
2816                                                   ;in: IBFR+3 is code type
2817                                                   ;out: carry set if NO
2818  8BFC  20 5B B7              JSR   DKCLR
2819  8BFF                        MESSAGE MSG233
2824  8C06                        SET_CURSOR 0
2828  8C0B  AD 5E 02              LDA   IBFR+3
2829  8C0E  C9 01                 cmp   #1
2830  8C10  D0 09                 bne   ?2
2831  8C12                        MESSAGE MSG234
2836  8C19  80 14                 bra   ?4
2837  8C1B  C9 02       ?2:       cmp   #2
2838  8C1D  D0 09                 bne   ?3
2839  8C1F                        MESSAGE MSG235
2844  8C26  80 07                 bra   ?4
2845  8C28              ?3:       MESSAGE MSG236
2850  8C2F              ?4:       SET_CURSOR LINE2+11
2854  8C34  20 8C 8C              JSR   DISP_CODE3
```

```
2655  8C37                        SET_CURSOR LINE2+15
2659  8C3C                        QM
2663  8C41  20 4B B7    ?0:   JSR    GETKEY
2664  8C44  F0 FB             beq    ?0
2665  8C46  C9 01             cmp    #okkey
2666  8C48  F0 0F             beq    ?ok
2667  8C4A  C9 02             cmp    #helpkey
2668  8C4C  D0 09             bne    ?ng
2669  8C4E                    HELP   none
2874  8C55  80 A5             BRA    VERIF
2875  8C57  38        ?ng:   sec
2876  8C58  60               rts
2877  8C59  18        ?ok:   clc
2878  8C5A  60               rts
2879
2880                    ENTER_CODE3:              ;input 3 char code
2881                                              ;in: characters in IBFR, IBFR+1, IBFR+2
2882                                              ;    screen location = char_index
2883                                              ;out: IBFR, IBFR+1, IBFR+2
2884                                              ;    carry set if HELP
2885  8C5B  20 8C 8C          JSR    DISP_CODE3
2886  8C5E  AD 5B 02          lda    IBFR
2887  8C61  AC 18 02          ldy    char_index
2888  8C64  20 00 00          jsr    get_alpha
2889  8C67  B0 21             bcs    ?10
2890  8C69  8D 5B 02          sta    IBFR
2891  8C6C  AD 5C 02          lda    IBFR+1
2892  8C6F  AC 18 02          ldy    char_index
2893  8C72  20 00 00          jsr    get_alpha
2894  8C75  B0 13             bcs    ?10
2895  8C77  8D 5C 02          sta    IBFR+1
2896  8C7A  AD 5D 02          lda    IBFR+2
2897  8C7D  AC 18 02          ldy    char_index
2898  8C80  20 00 00          jsr    get_alpha
2899  8C83  B0 05             bcs    ?10
2900  8C85  8D 5D 02          sta    IBFR+2
2901  8C88  18                CLC
2902  8C89  60                RTS
2903  8C8A  38        ?10:   SEC
2904  8C8B  60               RTS
2905
2906                    DISP_CODE3:               ;display 3 char code
2907  8C8C  AD 5B 02          lda    IBFR
2908  8C8F  20 00 00          jsr    disp_an
2909  8C92  AD 5C 02          lda    IBFR+1
2910  8C95  20 00 00          jsr    disp_an
2911  8C98  AD 5D 02          lda    IBFR+2
2912  8C9B  20 00 00          jsr    disp_an
2913  8C9E                    BACKUP 3
2919  8CA7  60                RTS
2920
2921                    ENTER_PASSWORD:           ;get password from user
2922                                              ;out: carry set if no match
2923                                              ;    else code in PASSWORD
2924  8CA8  20 5B B7          JSR    DKCLR       ;enter the code
2925  8CAB                    MESSAGE MSG233
2930  8C32  9C 5B 02          STZ    IBFR
```

```
2931  8CB5  9C 5C 02            STZ     IBFR+1
2932  8CB8  9C 5D 02            STZ     IBFR+2
2933  8CBB  20 5B 8C            JSR     ENTER_CODE3
2934  8CBE  90 09               BCC     PW7
2935  8CC0                      HELP    none
2940  8CC7  80 DF               BRA     ENTER_PASSWORD
2941
2942  8CC9  AD 5B 02    PW7:    LDA     IBFR            ;check against existing words
2943  8CCC  CD 0A 0B            CMP     PASS1           ;factory code
2944  8CCF  D0 1B               BNE     PW4
2945  8CD1  AD 5C 02            LDA     IBFR+1
2946  8CD4  CD 0B 0B            CMP     PASS1+1
2947  8CD7  D0 10               BNE     PW4
2948  8CD9  AD 5D 02            LDA     IBFR+2
2949  8CDC  CD 0C 0B            CMP     PASS1+2
2950  8CDF  D0 0B               BNE     PW4
2951  8CE1  A9 01               LDA     #1
2952  8CE3  8D 09 0B            STA     PASSWORD
2953  8CE6  4C 26 8D            JMP     PW8
2954
2955  8CE9  AD 5B 02    PW4:    LDA     IBFR
2956  8CEC  CD 0D 0B            CMP     PASS2           ;supervisor code
2957  8CEF  D0 1B               BNE     PW5
2958  8CF1  AD 5C 02            LDA     IBFR+1
2959  8CF4  CD 0E 0B            CMP     PASS2+1
2960  8CF7  D0 10               BNE     PW5
2961  8CF9  AD 5D 02            LDA     IBFR+2
2962  8CFC  CD 0F 0B            CMP     PASS2+2
2963  8CFF  D0 0B               BNE     PW5
2964  8D01  A9 02               LDA     #2
2965  8D03  8D 09 0B            STA     PASSWORD
2966  8D06  4C 26 8D            JMP     PW8
2967
2968  8D09  AD 5B 02    PW5:    LDA     IBFR
2969  8D0C  CD 10 0B            CMP     PASS3           ;gardener code
2970  8D0F  D0 17               BNE     PW6
2971  8D11  AD 5C 02            LDA     IBFR+1
2972  8D14  CD 11 0B            CMP     PASS3+1
2973  8D17  D0 0F               BNE     PW6
2974  8D19  AD 5D 02            LDA     IBFR+2
2975  8D1C  CD 12 0B            CMP     PASS3+2
2976  8D1F  D0 07               BNE     PW6
2977  8D21  A9 03               LDA     #3
2978  8D23  8D 09 0B            STA     PASSWORD
2979              PW8:                                  ;code found
2980  8D26  18                  CLC                    ;good exit
2981  8D27  60                  RTS
2982  8D28  38          PW6:    SEC                    ;no match found
2983  8D29  60                  RTS
2984
2985                  ;--------------------------------
2986                  ;       controller name
2987                  ;--------------------------------
2988
2989  8D2A        SET_NAME:
2990  8D2A  A2 08               ldx     #8             ;move name to buffer
2991  8D2C  BD 00 05    ?0:     lda     CNAME,x
```

```
2992  8D2F  9D 4D 17              sta      ami_bfr,x
2993  8D32  CA                    dex
2994  8D33  10 F7                 bpl      ?0
2995
2996  8D35               name_confirm:
2997  8D35  20 5B B7              jsr      DKCLR          ;confirm controller name
2998  8D38                        MESSAGE  name_msg
3003  8D3F                        SET_CURSOR LINE2+2
3007  8D44  20 30 8E              jsr      disp_name
3008  8D47                        ON
3012  8D4C  20 4B B7     ?0:      jsr      GETKEY
3013  8D4F  F0 FB                 beq      ?0
3014  8D51  C9 01                 cmp      #okkey
3015  8D53  F0 06                 beq      ?ok
3016  8D55  C9 02                 cmp      #helpkey
3017  8D57  F0 05                 beq      ?help
3018  8D59  80 0C                 bra      name_entry
3019  8D5B  4C 22 8E     ?ok:     jmp      name_exit
3020  8D5E               ?help:   HELP     none
3025  8D65  80 CE                 bra      name_confirm
3026
3027                     name_entry:                      ;enter new name
3028  8D67  20 5B B7              jsr      DKCLR
3029  8D6A                        MESSAGE  name_msg
3034  8D71                        SET_CURSOR LINE2+2
3038  8D76  20 30 8E              jsr      disp_name
3039
3040  8D79                        SET_CURSOR LINE2+2
3044  8D7E  AD 4D 17              lda      ami_bfr
3045  8D81  8D 5B 02              sta      IBFR
3046  8D84  AD 4E 17              lda      ami_bfr+1
3047  8D87  8D 5C 02              sta      IBFR+1
3048  8D8A  AD 4F 17              lda      ami_bfr+2
3049  8D8D  8D 5D 02              sta      IBFR+2
3050  8D90  20 5B 8C              jsr      ENTER_CODE3
3051  8D93  90 09                 bcc      ?0
3052  8D95                        HELP     none
3057  8D9C  80 C9                 bra      name_entry
3058  8D9E  AD 5B 02     ?0:      lda      IBFR
3059  8DA1  8D 4D 17              sta      ami_bfr
3060  8DA4  AD 5C 02              lda      IBFR+1
3061  8DA7  8D 4E 17              sta      ami_bfr+1
3062  8DAA  AD 5D 02              lda      IBFR+2
3063  8DAD  8D 4F 17              sta      ami_bfr+2
3064
3065  8DB0                        SET_CURSOR LINE2+5
3069  8DB5  AD 50 17              lda      ami_bfr+3
3070  8DB8  8D 5B 02              sta      IBFR
3071  8DBB  AD 51 17              lda      ami_bfr+4
3072  8DBE  8D 5C 02              sta      IBFR+1
3073  8DC1  AD 52 17              lda      ami_bfr+5
3074  8DC4  8D 5D 02              sta      IBFR+2
3075  8DC7  20 5B 8C              jsr      ENTER_CODE3
3076  8DCA  90 09                 bcc      ?1
3077  8DCC                        HELP     none
3082  8DD3  80 92                 bra      name_entry
3083  8DD5  AD 5B 02     ?1:      lda      IBFR
```

```
3084  8DD8  8D 50 17          sta    ami_bfr+3
3085  8DDB  AD 5C 02          lda    IBFR+1
3086  8DDE  8D 51 17          sta    ami_bfr+4
3087  8DE1  AD 5D 02          lda    IBFR+2
3088  8DE4  8D 52 17          sta    ami_bfr+5
3089
3090  8DE7                    SET_CURSOR LINE2+8
3094  8DEC  AD 53 17          lda    ami_bfr+6
3095  8DEF  8D 5B 02          sta    IBFR
3096  8DF2  AD 54 17          lda    ami_bfr+7
3097  8DF5  8D 5C 02          sta    IBFR+1
3098  8DF8  AD 55 17          lda    ami_bfr+8
3099  8DFB  8D 5D 02          sta    IBFR+2
3100  8DFE  20 5B 8C          jsr    ENTER_CODE3
3101  8E01  90 0A             bcc    ?2
3102  8E03                    HELP   none
3107  8E0A  4C 67 8D          jmp    name_entry
3108  8E0D  AD 5B 02    ?2:   lda    IBFR
3109  8E10  8D 53 17          sta    ami_bfr+6
3110  8E13  AD 5C 02          lda    IBFR+1
3111  8E16  8D 54 17          sta    ami_bfr+7
3112  8E19  AD 5D 02          lda    IBFR+2
3113  8E1C  8D 55 17          sta    ami_bfr+8
3114
3115  8E1F  4C 35 8D          jmp    name_confirm
3116
3117                    name_exit:                  ;save entered name
3118  8E22  A2 08             ldx    #8
3119  8E24  BD 4D 17    ?0:   lda    ami_bfr,x
3120  8E27  9D 00 0B          sta    CNAME,x
3121  8E2A  CA                dex
3122  8E2B  10 F7             bpl    ?0
3123  8E2D  4C 8C 8A          jmp    next_system
3124
3125                    disp_name:                  ;display name in ami_bfr
3126  8E30  64 71             stz    scratch
3127  8E32  A6 71       ?0:   ldx    scratch
3128  8E34  BD 4D 17          lda    ami_bfr,x
3129  8E37  20 00 00          jsr    disp_an
3130  8E3A  E6 71             inc    scratch
3131  8E3C  A5 71             lda    scratch
3132  8E3E  C9 09             cmp    #9
3133  8E40  D0 F0             bne    ?0
3134  8E42  60                rts
3135
3136
3137
3138                    ;--------------------------------
3139                    ;   set active pgm
3140                    ;--------------------------------
3141
3142  8E43                    SET_PROGRAM:
3143  8E43  AD 80 0B          lda    SOURCE
3144  8E46  8D 5B 02          sta    IBFR
3145  8E49  20 5B B7    sp1:  JSR    DKCLR          ;show existing pgm
3146  8E4C                    MESSAGE MSG154
3151  8E53                    SET_CURSOR LINE2
```

```
3155  8E5B  AD 5B 02            lda    IBFR
3156  8E5B  20 33 B2            jsr    DISP_SOURCEA
3157  8E5E                      QM
3161  8E63  20 4B B7    ?2:     JSR    GETKEY
3162  8E66  F0 FB               beq    ?2
3163  8E68  C9 01               cmp    #okkey         ;accept it
3164  8E6A  F0 39               beq    ?ok
3165  8E6C  C9 02               cmp    #helpkey
3166  8E6E  D0 09               bne    ?ng            ;or reject it and do over
3167  8E70                      HELP   none
3172  8E77  80 D0               bra    sp1
3173
3174                    ?ng:                           ;enter a new active pgm.
3175  8E79  20 5B B7            JSR    DKCLR
3176  8E7C                      MESSAGE MSG154
3181  8E83                      SET_CURSOR LINE2
3185  8E88  AD 5B 02            lda    IBFR
3186  8E8B                      local_option pgmopt
3192  8E93  90 09               bcc    ?1
3193  8E95                      HELP   none
3198  8E9C  80 A5               bra    SET_PROGRAM
3199  8E9E  8D 5B 02    ?1:     sta    IBFR           ;new source
3200  8EA1  4C 49 BE            jmp    sp1
3201
3202  8EA4  AD 5B 02    ?ok:    lda    IBFR           ;if changed,
3203  8EA7  CD 80 0B            cmp    SOURCE
3204  8EAA  F0 0E               beq    ?5
3205  8EAC  8D 80 0B            sta    SOURCE         ;then make new pgm and schedule
3206  8EAF  20 59 B4            jsr    S20
3207  8EB2  A9 01               lda    #1
3208  8EB4  8D DE 19            sta    exec_command
3209  8EB7  20 D5 83            jsr    executive
3210  8EBA  4C BC 8A    ?5:     jmp    next_system
3211
3212                    ;--------------------------------
3213                    ;   wiring setup
3214                    ;--------------------------------
3215
3216  8EBD              STATION_ID:
3217
3218  8EBD  20 5B B7            jsr    DKCLR          ;skip/do wire check?
3219  8EC0                      SET_CURSOR LINE2
3223  8EC5                      MESSAGE MSG27
3228  8ECC                      SET_CURSOR 0
3232  8ED1  A9 00               lda    #0
3233  8ED3                      local_option opt2
3239  8EDB  90 09               bcc    ?0
3240  8EDD                      HELP   none
3245  8EE4  80 D7               bra    STATION_ID
3246  8EE6  8D 5B 02    ?0:     sta    IBFR
3247  8EE9  F0 34               beq    VASSIGN
3248
3249  8EEB  20 B5 B9    ?1:     jsr    station_wire_check  ;get readings
3250  8EEE  20 5B B7            jsr    DKCLR               ;display them
3251  8EF1                      MESSAGE MSG152
3256  8EF8                      SET_CURSOR 7
3260  8EFD  A2 08               ldx    #8
```

```
3261  8EFF  68            ?loop:  pla
3262  8F00  20 00 00              jsr     dchar
3263  8F03  CA                    dex
3264  8F04  D0 F9                 bne     ?loop
3265  8F06  20 EE B7              jsr     prompt
3266  8F09  20 4B B7      ?2:     jsr     GETKEY
3267  8F0C  F0 DD                 beq     ?1
3268  8F0E  C9 03                 cmp     #upkey
3269  8F10  F0 0D                 beq     VASSIGN
3270  8F12  C9 02                 cmp     #helpkey
3271  8F14  D0 D5                 bne     ?1
3272  8F16                        HELP    none
3277  8F1D  80 9E                 bra     STATION_ID
3278
3279
3280                      VASSIGN:                        ;valve IDs
3281  8F1F  64 49                 stz     iptr
3282  8F21  20 5B B7      VA1:    JSR     DKCLR
3283  8F24                        SET_CURSOR LINE2
3287  8F29                        MESSAGE MS6171
3292  8F30                        SET_CURSOR 0
3296  8F35  A5 49                 lda     iptr
3297  8F37                        local_option IDopt     ;view, done, or new ID
3303  8F3F  90 09                 bcc     ?0
3304  8F41                        HELP    none
3309  8F49  80 D7                 bra     VA1
3310  8F4A  8D 5B 02      ?0:     sta     IBFR
3311  8F4D  F0 0B                 beq     LV60
3312  8F4F  C9 02                 cmp     #2
3313  8F51  F0 39                 beq     new_id
3314  8F53  4C 35 92              jmp     end_ID
3315
3316  8F56              next_assign:
3317  8F56  E6 49                 inc     iptr
3318  8F58  80 C7                 bra     VA1
3319
3320  8F5A  20 5B B7      LV60:   JSR     DKCLR           ;show the current IDs
3321  8F5D                        MESSAGE MS6173
3326  8F64  20 35 B9              JSR     VID2BFR
3327  8F67  AD 3B 0B              lda     numsta
3328  8F6A  AC 3C 0B              ldy     pump
3329  8F6D  20 54 B9              JSR     DISPID
3330  8F70  20 EE B7              jsr     prompt
3331  8F73  20 4B B7      ?1:     JSR     GETKEY          ;wait for key
3332  8F76  F0 FB                 beq     ?1
3333  8F78  C9 03                 cmp     upkey
3334  8F7A  F0 0D                 beq     ?up
3335  8F7C  C9 02                 cmp     #helpkey
3336  8F7E  D0 F3                 bne     ?1
3337  8F80                        HELP    none
3342  8F87  80 D1                 bra     LV60
3343  8F89  4C 56 8F      ?up:    jmp     next_assign
3344
3345
3346                      new_id:                         ;enter a new id
3347                      pump_relay:                     ;use/don't use pump
3348  8F8C  20 5B B7              jsr     DKCLR
```

```
3349  8FBF                        SET_CURSOR LINE2
3353  8F94                        MESSAGE MSG100
3358  8F9B                        SET_CURSOR 0
3362  8FA0  AD 3C 0B               lda      pump
3363  8FA3  F0 02                  beq      ?1
3364  8FA5  A9 01                  lda      #1
3365  8FA7              ?1:        local_option opt11
3371  8FAF  90 09                  bcc      ?0
3372  8FB1                         HELP     none
3377  8FB8  80 D2                  bra      pump_relay
3378  8FBA  8D 4E 19  ?0:          sta      DEFAULT+1      ;0=no pump, 1=pump
3379
3380
3381                    number_stations:                   ;entry of # of stations
3382  8FBD  AD 3B 0B               lda      numsta
3383  8FC0  8D 4D 19               sta      DEFAULT
3384  8FC3  AD 4E 19               lda      DEFAULT+1
3385  8FC6  F0 69                  beq      NVCONFIRM
3386  8FC8  AD 4D 19               lda      DEFAULT        ;if pump, then max numsta=7
3387  8FCB  C9 08                  cmp      #8
3388  8FCD  D0 62                  bne      NVCONFIRM
3389  8FCF  CE 4D 19               dec      DEFAULT
3390  8FD2  80 5D                  bra      NVCONFIRM
3391
3392                    NVENTRY:                           ;enter number of valves
3393  8FD4  20 5B B7               JSR      DKCLR
3394  8FD7                         MESSAGE  MSG109
3399  8FDE  AD 4E 19               lda      DEFAULT+1      ;if pump, show line 2
3400  8FE1  F0 27                  beq      ?1
3401  8FE3                         SET_CURSOR LINE2
3405  8FE8                         MESSAGE  MSG111
3410  8FEF                         SET_CURSOR 4
3414  8FF4  AD 4D 19               LDA      DEFAULT
3415  8FF7                         select   1,7,1          ;and select 1-7 max
3426  9008  80 19                  bra      ?2
3427  900A              ?1:        SET_CURSOR 4
3431  900F  AD 4D 19               LDA      DEFAULT
3432  9012                         select   1,8,1          ;else select 1-8 max
3443  9023  90 09      ?2:         BCC      NV5
3444  9025                         HELP     none
3449  902C  80 A6                  BRA      NVENTRY
3450  902E  8D 4D 19  NV5:         sta      DEFAULT
3451
3452                    NVCONFIRM:                         ;show default and confirm
3453  9031  20 5B B7               JSR      DKCLR
3454  9034                         MESSAGE  MSG109
3459  903B  AD 4E 19               lda      DEFAULT+1      ;if pump, show line 2
3460  903E  F0 0C                  beq      ?1
3461  9040                         SET_CURSOR LINE2
3465  9045                         MESSAGE  MSG111
3470  904C              ?1:        SET_CURSOR 3
3474  9051  AD 4D 19               LDA      DEFAULT
3475  9054  20 00 00               jsr      d2d
3476  9057                         SET_CURSOR 15
3480  905C                         QM
3484  9061  20 4B B7  ?2:          JSR      GETKEY
3485  9064  F0 FB                  beq      ?2
```

```
3486   9066   C9 01                    cmp     #okkey
3487   9068   F0 11                    BEQ     ?ok
3488   906A   C9 02                    cmp     #helpkey
3489   906C   D0 0A                    BNE     ?ng
3490   906E                            HELP    none
3495   9075   4C 31 90                 JMP     NVCONFIRM
3496   9078   4C D4 BF        ?ng:     JMP     NVENTRY
3497
3498   907B   AD 4E 19        ?ok:     lda     DEFAULT+1       ;default is confirmed
3499   907E   F0 09                    beq     ?no_pump
3500   9080   AD 4D 19                 lda     DEFAULT
3501   9083   8D 4E 19                 sta     DEFAULT+1
3502   9086   EE 4E 19                 inc     DEFAULT+1
3503   9089                   ?no_pump:
3504
3505                          LV70:                            ;enter new ID
3506   9089   20 81 B9                 JSR     CLR_IDBFR
3507   908C   20 5B B7                 jsr     DKCLR           ;use top to bottom or custom
3508   908F                            MESSAGE assign
3513   9096                            SET_CURSOR LINE2
3517   909B   A9 00                    lda     #0
3518   909D                            local_option assign1
3524   90A5   90 09                    bcc     ?1
3525   90A7                            HELP    none
3530   90AE   80 D9                    bra     LV70
3531   90B0   8D 5B 02        ?1:      sta     IBFR
3532   90B3   D0 24                    bne     custom_id
3533
3534   90B5   A2 00                    ldx     #0              ;ID top to bottom
3535   90B7                            set     IBFR
3539   90BC   AD 5B 02        ?loop:   lda     IBFR            ;do numsta positions
3540   90BF   9D 4D 17                 sta     ani_bfr,x
3541   90C2   E8                       inx
3542   90C3   EE 5B 02                 inc     IBFR
3543   90C6   AD 5B 02                 lda     IBFR
3544   90C9   CD 4D 19                 cmp     DEFAULT
3545   90CC                            blt     ?loop
3548   90CE   F0 EC                    beq     ?loop
3549   90D0   AD 4E 19                 lda     DEFAULT+1       ;do pump (0 if none)
3550   90D3   9D 4D 17                 sta     ani_bfr,x
3551
3552   90D6   4C E9 91                 jmp     LV90            ;confirm it
3553
3554
3555                          custom_id:                       ;enter custom station id
3556   90D9   20 00 00                 jsr     R7_ad_on
3557   90DC   64 65                    STZ     POSITION        ;find which positions have valves
3558   90DE   9C 60 02                 STZ     IBFR+5
3559   90E1   A5 65          ?8:       lda     POSITION
3560   90E3   20 00 00                 jsr     R6_isvalve
3561   90E6   98                       tya                     ;y=0 if valve
3562   90E7   F0 03                    beq     ?9
3563   90E9   18                       clc
3564   90EA   80 01                    bra     ?10
3565   90EC   38             ?9:       sec
3566   90ED   6E 60 02       ?10:      ROR     IBFR+5          ;set bit in IBFR+5 if valve present
3567   90F0   E6 65                    INC     POSITION
```

```
3568  90F2  A5 65              LDA      POSITION
3569  90F4  C9 08              CMP      #8
3570  90F6  D0 E9              BNE      ?8
3571
3572  90F8  64 66              STZ      R5          ;R5 = how many stations present
3573  90FA  AD 60 02           LDA      IBFR+5
3574  90FD  A2 08              LDX      #8
3575  90FF  6A         ?J:     ROR      A
3576  9100  90 02              BCC      ?K
3577  9102  E6 66              INC      R5
3578  9104  CA         ?K:     DEX
3579  9105  D0 F8              BNE      ?J
3580
3581  9107  AD 4E 19           lda      DEFAULT+1   ;error if less wires than stations
3582  910A  F0 05              beq      ?1
3583  910C  AD 4E 19           lda      DEFAULT+1   ;stations = numsta or pump (numsta+1)
3584  910F  80 03              bra      ?2
3585  9111  AD 4D 19   ?1:     lda      DEFAULT     ;if actual # of stations
3586  9114  C5 66      ?2:     cmp      R5          ;is < what user says,
3587  9116                     blt      LV7G         ;then message
3590  9118  F0 0A              beq      LV7G
3591
3592  911A         ?err:       HELP     no_stations
3597  9121  4C 56 8F           jmp      next_assign
3598
3599  9124  AD 60 02   LV76:   LDA      IBFR+5
3600  9127  8D 5B 02           STA      IBFR
3601  912A                     set      VALVE        ;start at station #1
3605
3606  912E  AD 5B 02   LV81:   LDA      IBFR         ;IBFR=which positions have valves to ID
3607  9131  F0 15              BEQ      LV8A         ;done when no wires left
3608  9133  AD 4E 19           lda      DEFAULT+1    ;or next staion is > pump (if any)
3609  9136  F0 07              beq      ?1
3610  9138  A5 45              lda      VALVE
3611  913A  CD 4E 19           cmp      DEFAULT+1
3612  913D  80 05              bra      ?2
3613  913F  A5 45      ?1:     LDA      VALVE        ;or next station is > numsta
3614  9141  CD 4D 19           cmp      DEFAULT
3615  9144  F0 05      ?2:     beq      LV7H
3616  9146                     blt      LV7H
3619  9148  4C E9 91   LV8A:   JMP      LV90         ;done
3620
3621  914B  20 5B B7   LV7H:   JSR      DKCLR        ;show current status
3622  914E  A5 45              lda      VALVE
3623  9150  CD 4E 19           cmp      DEFAULT+1
3624  9153  D0 09              bne      ?1
3625  9155                     MESSAGE  MSG175A      ;ask for pump ID
3630  915C  80 0F              bra      ?2
3631  915E         ?1:         MESSAGE  MSG174
3636  9165                     SET_CURSOR LINE2+6
3640  916A  20 F3 B1           JSR      DVALVE
3641  916D         ?2:         SET_CURSOR 8
3645  9172  AD 4D 19           lda      DEFAULT
3646  9175  AC 4E 19           ldy      DEFAULT+1
3647  9178  20 54 B9           JSR      DISPID
3648  917B  AD 5B 02   LV82:   LDA      IBFR         ;look for a valve being IDed
3649  917E  8D 5C 02           STA      IBFR+1
```

```
3650   9181  A9 08              LDA     #8
3651   9183  85 42              STA     ADCHANNEL
3652   9185  64 65              STZ     POSITION
3653   9187  6E 5C 02    LV83:  ROR     IBFR+1          ;if position has a valve,
3654   918A  90 51              BCC     LV88
3655   918C  64 57              STZ     R3
3656
3657   918E  A5 57      LVLP:   LDA     R3
3658   9190  D0 0F              BNE     LVL1
3659   9192  A5 65              lda     POSITION
3660   9194  20 00 00           jsr     R6_isvalve      ;1st look for short
3661   9197  C0 02              cpy     #2
3662   9199  D0 26              bne     LV87            ;nope
3663   919B                     set     R3              ;yes
3667   919F  80 20              BRA     LV87
3668   91A1  A5 65      LVL1:   lda     POSITION        ;then look for valve present again
3669   91A3  20 00 00           jsr     R6_isvalve
3670   91A6  C0 00              cpy     #0
3671   91A8  D0 17              bne     LV87
3672
3673   91AA  A6 65      LV86:   LDX     POSITION        ;valve returns
3674   91AC  A5 45              LDA     VALVE
3675   91AE  9D 4D 17           STA     ami_bfr,X       ;store it's position
3676   91B1  A6 65              LDX     POSITION        ;remove bit from IBFR
3677   91B3  AD 5B 02           LDA     IBFR
3678   91B6  3D 8D C3           AND     BITOFF,X
3679   91B9  8D 5B 02           STA     IBFR
3680   91BC  E6 45              INC     VALVE           ;look for next valve
3681   91BE  4C 2E 91           jmp     LV81            ;after updating display
3682
3683   91C1  20 4B B7   LV87:   JSR     GETKEY          ;check for key pressed
3684   91C4  C9 02              cmp     #helpkey
3685   91C6  D0 0A              BNE     LV89
3686   91C8                     HELP    none
3691   91CF  4C 2E 91           JMP     LV81
3692   91D2  A9 C8      LV89:   lda     #200            ;wait for power to recover
3693   91D4  20 00 00           jsr     R9_wait_ms
3694   91D7  A5 57              LDA     R3
3695   91D9  F0 02              BEQ     LV88            ;no open, try next position
3696   91DB  80 B1              BRA     LVLP            ;keep waiting for valve
3697
3698              LV88:                                 ;next position
3699   91DD  E6 42              INC     ADCHANNEL
3700   91DF  E6 65              INC     POSITION
3701   91E1  A5 65              LDA     POSITION
3702   91E3  C9 08              CMP     #8
3703   91E5  D0 A0              BNE     LV83
3704   91E7  80 92              BRA     LV82
3705
3706              LV90:                                 ;ID done
3707   91E9  20 00 00           jsr     R7_ad_off
3708   91EC  20 5B B7           JSR     DKCLR
3709   91EF                     MESSAGE MSG175
3714   91F6                     SET_CURSOR B
3718   91FB  AD 4D 19           lda     DEFAULT
3719   91FE  AC 4E 19           ldy     DEFAULT+1
3720   9201  20 54 B9           JSR     DISPID
```

```
3721  9204                              SET_CURSOR LINE2+11
3725  9209                              QM      .
3729  9209  20 4B B7        ?1:         JSR     GETKEY
3730  920D  F0 FB                       beq     ?1
3731  920F  C9 01                       cmp     #okkey          ;accept it
3732  9211  F0 10                       beq     ?ok
3733  9213  C9 02                       cmp     #helpkey
3734  9215  D0 09                       bne     ?ng             ;or reject it and do over
3735  921B                              HELP    none
3740  9222  80 C5                       BRA     LV90
3741  9224  4C BC 8F        ?ng:        jmp     new_id
3742                        ?ok:                                ;save new ID, enable all IDed valves
3743  9227  20 01 B9                    JSR     BFR2VID
3744  922A  AD 4D 19                    lda     DEFAULT
3745  922D  8D 3B 0B                    sta     numsta
3746  9230  AD 4E 19                    lda     DEFAULT+1
3747  9233  8D 3C 0B                    sta     pump
3748
3749  9236            end_ID:
3750  9236  A9 01                       lda     #1              ;make new schedule
3751  9238  8D DE 19                    sta     exec_command
3752  923B  20 D5 83                    jsr     executive
3753  923E  A9 02                       lda     #2              ;and idle
3754  9240  8D DE 19                    sta     exec_command
3755  9243  20 D5 83                    jsr     executive
3756  9246  4C 8C 8A                    jmp     next_system
3757
3758
3759                              ;--------------------------------
3760                              ;     monthly budgets
3761                              ;--------------------------------
3762
3763                        MONTHLY:                             ;enter/edit monthly budgets
3764  9249  AD 86 0B                    LDA     MO_BUDGET
3765  924C  8D 62 02                    STA     IBFR+7
3766  924F  8D 4D 19                    STA     DEFAULT         ;save old setting
3767
3768  9252            HOTCONFIRM:
3769  9252  20 5B B7                    JSR     DKCLR           ;confirm hottest month
3770  9255                              MESSAGE MSG237
3775  925C  AD 62 02                    LDA     IBFR+7
3776  925F  20 00 00                    jsr     display_month
3777  9262                              QM
3781  9267  20 4B B7        ?1:         JSR     GETKEY
3782  926A  F0 FB                       beq     ?1
3783  926C  C9 01                       cmp     #okkey
3784  926E  F0 0E                       beq     ?ok
3785  9270  C9 02                       cmp     #helpkey
3786  9272  D0 3A                       BNE     HOTENTRY
3787  9274                              HELP    none
3792  927B  4C 52 92                    JMP     HOTCONFIRM
3793
3794  927E  AD 62 02        ?ok:        LDA     IBFR+7          ;hottest month confirmed
3795  9281  8D 86 0B                    STA     MO_BUDGET
3796  9284  CD 4D 19                    CMP     DEFAULT
3797  9287  F0 22                       BEQ     HOT6            ;if hottest month changed,
3798  9289  85 41                       STA     MSB             ;setup monthly budgets from table
```

```
3799  92BB  64 40              STZ     LSB
3800  92BD  A6 40      HOT2:   LDX     LSB             ;counter 0-11 into table
3801  928F  BD 1D C4           LDA     BUDGETTBL,X
3802  9292  A6 41              LDX     MSB             ;store at month, starting at hottest
3803  9294  9D 86 0B           STA     MO_BUDGET,X
3804  9297  E6 41              INC     MSB             ;wrap month if Dec.
3805  9299  A5 41              LDA     MSB
3806  929B  C9 0D              CMP     #13
3807  929D  D0 04              BNE     HOT3
3808  929F                     set     MSB
3812  92A3  E6 40      HOT3:   INC     LSB             ;move the whole table
3813  92A5  A5 40              LDA     LSB
3814  92A7  C9 0C              CMP     #12
3815  92A9  D0 E2              BNE     HOT2
3816  92AB  4C CF 92   HOT6:   JMP     MO_SETTINGS
3817
3818                   HOTENTRY:                       ;enter new hottest month
3819  92AE  20 5B B7           JSR     DKCLR
3820  92B1                     MESSAGE MS6237
3825  92B8  AD 62 02           lda     IBFR+7          ;month is 1-12,
3826  92BB  20 00 00           jsr     get_month
3827  92BE  90 09              BCC     HOT4
3828  92C0                     HELP    none
3833  92C7  80 E5              BRA     HOTENTRY
3834  92C9  8D 62 02   HOT4:   STA     IBFR+7
3835  92CC  4C 52 92           JMP     HOTCONFIRM
3836
3837                   MO_SETTINGS:                    ;enter/edit the individual budgets
3838
3839  92CF  9C 62 02           STZ     IBFR+7          ;month 1-12
3840  92D2             MONEXT:
3841  92D2  EE 62 02           INC     IBFR+7
3842  92D5  AD 62 02           LDA     IBFR+7
3843  92D8  C9 0D              CMP     #13
3844  92DA  D0 03              BNE     MOS1
3845  92DC  4C A9 93           JMP     MOEND
3846  92DF  AE 62 02   MOS1:   LDX     IBFR+7          ;budget array
3847  92E2  BD 86 0B           LDA     MO_BUDGET,X
3848  92E5  8D 4D 19           STA     DEFAULT
3849  92E8  4C 47 93           JMP     MOCONFIRM
3850
3851                   MOENTRY:                        ;enter new budget
3852  92EB  20 5B B7           JSR     DKCLR
3853  92EE                     MESSAGE MS6238
3858  92F5                     SET_CURSOR LINE2
3862  92FA  AD 62 02           lda     IBFR+7
3863  92FD  20 00 00           jsr     display_month
3864  9300                     SKIP    1
3870  9309                     DISP    '='
3874  930E                     SKIP    4
3880  9317                     DISP    'Z'
3884  931C                     BACKUP  4
3890  9325  AD 4D 19           lda     DEFAULT
3891  9328                     select  10,100,1
3902  9339  90 03              bcc     MOS5
3903  933B                     HELP    none
3908  9342  80 A7              BRA     MOENTRY
```

```
3909  9344  8D 4D 19    MO55:       STA     DEFAULT
3910
3911                    MOCONFIRM:                          ;show default and confirm
3912  9347  20 5B B7                JSR     DKCLR
3913  934A                          MESSAGE MSG238
3918  9351                          SET_CURSOR LINE2
3922  9356  AD 62 02                lda     IBFR+7
3923  9359  20 00 00                jsr     display_month
3924  935C                          SKIP    1
3930  9365                          DISP    '='
3934  936A                          SKIP    1
3940  9373  AD 4D 19                LDA     DEFAULT
3941  9376  20 00 00                jsr     d3d
3942  9379                          DISP    '?'
3946  937E                          GM
3950  9383  20 4B B7    ?2:         JSR     GETKEY
3951  9386  F0 FB                   beq     ?2
3952  9388  C9 01                   cmp     #okkey
3953  938A  F0 11                   beq     ?ok
3954  938C  C9 02                   cmp     #helpkey
3955  938E  D0 0A                   bne     ?ng
3956  9390                          HELP    none
3961  9397  4C 47 93                JMP     MOCONFIRM
3962  939A  4C EB 92    ?ng:        JMP     MOENTRY
3963
3964  939D  AD 4D 19    ?ok:        LDA     DEFAULT        ;default is confirmed
3965  93A0  AE 62 02                LDX     IBFR+7
3966  93A3  9D B6 0B                STA     MO_BUDGET,X
3967  93A6  4C D2 92                JMP     MONEXT
3968
3969  93A9  4C 8C 8A    MOEND:      JMP     next_system
3970
3971
3972
3973                    ;--------------------------------
3974                    ;     VIEW INFO
3975                    ;--------------------------------
3976
3977                    VIEW_INFO:                          ;select function
3978  93AC  64 48                   stz     sub_mode
3979  93AE  20 5B B7    VIEW1:      JSR     DKCLR
3980  93B1                          MESSAGE MSG20
3985  93B9                          SET_CURSOR LINE2
3989  93BD  A5 48                   lda     sub_mode
3990  93BF                          local_option infoopt
3996  93C7  85 48                   sta     sub_mode
3997  93C9  90 0D                   bcc     ?1
3998  93CB  0A                      asl     a              ;context sensitive help
3999  93CC  AA                      tax
4000  93CD  BC ED 93                ldy     ?htable,x
4001  93D0  BD EE 93                lda     ?htable+1,x
4002  93D3  20 E1 B7                jsr     help_bank1
4003  93D6  80 D6                   bra     VIEW1
4004  93D8              ?1:
4005  93D8  0A                      asl     a              ;then go there
4006  93D9  AA                      tax
4007  93DA  BD E7 93                lda     ?tbl,x
```

```
4008   93DD   85 4E                 sta       srcptr
4009   93DF   BD E8 93              lda       ?tbl+1,x
4010   93E2   85 4F                 sta       srcptr+1
4011   93E4   6C 4E 00              jmp       (srcptr)
4012
4013   93E7                 ?tbl:
4014   93E7   F993                  WORD      DAILY
4015   93E9   BC95                  WORD      HIST
4016   93EB   C797                  WORD      next_main
4017
4018   93ED                 ?htable:
4019   93ED   0000                  word      DailySchedHELP
4020   93EF   0000                  word      HistoryHELP
4021   93F1   0000                  word      InfoDoneHELP
4022
4023   93F3                 last_view:
4024   93F3   A9 02                 lda       #2
4025   93F5   85 48                 sta       sub_mode
4026   93F7   80 B5                 bra       VIEW1
4027
4028
4029                        ;------------------------------
4030                        ;     Daily Schedule
4031                        ;------------------------------
4032
4033                        DAILY:                          ;see today's schedule
4034   93F9   A9 01                 lda       #1            ;make new schedule
4035   93FB   8D DE 19              sta       exec_command
4036   93FE   20 D5 83              jsr       executive
4037   9401   AD 3E 0F              LDA       NSTARTS       ;msg if no starts to show
4038   9404   D0 03                 BNE       RE30
4039   9406   4C E1 94              JMP       RERROR
4040
4041   9409   64 49        RE30:    stz       iptr
4042   940B   20 5B B7     RE31:    JSR       DKCLR         ;select ending time or start times
4043   940E                         MESSAGE   MSG297
4048   9415                         SET_CURSOR LINE2
4052   941A   A5 49                 lda       iptr
4053   941C                         local_option revopt
4059   9424   90 09                 bcc       ?1
4060   9426                         HELP      none
4065   942D   80 DA                 bra       RE30
4066   942F   F0 07        ?1:      beq       RE125
4067   9431   C9 01                 cmp       #1
4068   9433   F0 49                 beq       RE100
4069   9435   4C F3 93              jmp       last_view
4070
4071   9438   20 5B B7     RE125:   JSR       DKCLR         ;show ending time
4072   943B                         MESSAGE   MSG182
4077   9442                         SKIP      1
4083   944B                         MOV16     DONETIME,OFFSET
4089   9455   20 00 B7              JSR       MIN2HM
4090   9458   20 B9 B1              JSR       DISPTIME
4091   945B   20 EE B7              jsr       prompt
4092   945E   20 4B B7     ?1:      JSR       GETKEY
4093   9461   F0 FB                 beq       ?1
4094   9463   C9 01                 cmp       #okkey
```

```
4095  9465  F0 0A                  beq     ?ok
4096  9467  C9 03                  cmp     #upkey
4097  9469  F0 06                  beq     ?ok
4098  946B  C9 02                  cmp     #helpkey
4099  946D  F0 05                  beq     ?help
4100  946F  80 ED                  bra     ?1
4101  9471  4C EB 94        ?ok:   JMP     RE199
4102  9474                  ?help: HELP    none
4107  947B  4C 09 94               JMP     RE30
4108
4109                        RE100:                          ;show start times
4110  947E  20 1A C2               JSR     FIRSTSTART      ;init STARTPTR
4111  9481  AD 36 0F               LDA     NSTARTS
4112  9484  85 4C           ?2:    STA     CTR
4113  9486  A2 08                  LDX     #8
4114  9488  9E 55 19        ?3:    STZ     VCTR,X          ;clear valve counters
4115  948B  9E BF 19               STZ     VSYR,X
4116  948E  9E C8 19               stz     VSPEC,X
4117  9491  CA                     DEX                     ;# of starts displayed of each type
4118  9492  10 F4                  bpl     ?3
4119  9494  A5 4C           ?1:    LDA     CTR
4120  9496  D0 03                  BNE     ?7
4121  9498  4C D2 94               JMP     RE150
4122  949B  20 F0 94        ?7:    JSR     SHOW_START
4123  949E  20 EE B7               jsr     prompt
4124  94A1  20 4B B7        ?4:    JSR     GETKEY
4125  94A4  F0 FB                  beq     ?4
4126  94A6  C9 01                  cmp     #okkey
4127  94A8  F0 13                  beq     ?next
4128  94AA  C9 03                  cmp     #upkey
4129  94AC  F0 0F                  beq     ?next
4130  94AE  C9 02                  cmp     #helpkey
4131  94B0  F0 02                  beq     ?help
4132                        ;      cmp     #downkey        ;problems with N of N counters
4133                        ;      beq     ?prev
4134  94B2  80 ED                  bra     ?4
4135
4136  94B4                  ?help: HELP    none
4141  94BB  80 C1                  BRA     RE100
4142  94BD  20 21 B4        ?next: JSR     NEXTSTART
4143  94C0  C6 4C                  DEC     CTR
4144  94C2  80 D0                  BRA     ?1
4145  94C4  A5 4C           ?prev: lda     CTR
4146  94C6  CD 36 0F               cmp     NSTARTS
4147  94C9  F0 C9                  beq     ?1
4148  94CB  20 31 B4               JSR     PREVSTART
4149  94CE  E6 4C                  INC     CTR
4150  94D0  80 C2                  BRA     ?1
4151
4152  94D2  20 5B B7        RE150: JSR     DKCLR           ;end of starts
4153  94D5                         MESSAGE MSG301
4158  94DC  20 47 B5               JSR     MSGWAIT
4159  94DF  80 0A                  bra     RE199
4160
4161  94E1                  RERROR:
4162  94E1                         HELP    no_schedule
4167  94E3  4C F3 93               jmp     last_view       ;then leave
```

```
4165
4166  94EB  E6 49        RE199:      inc      iptr
4167  94ED  4C 0B 94                 jmp      RE31
4168
4169
4170
4171                     SHOW_START:              ;show the duration, cycle, and time
4172                                              ;at STARTPTR
4173                                              ;in: NSPLIT(),NSYR, NSPEC()
4174                                              ;out: VCTR(), VSYR(), VSPEC() incremented
4175
4177  94F0  20 5B B7                 JSR      DKCLR
4178  94F3  20 F4 B0                 JSR      FLASH
4179  94F6  A0 02                    LDY      #2
4180  94F8  B1 6B                    LDA      (STARTPTR),Y
4181  94FA  85 45                    STA      VALVE
4182  94FC  20 DA B1                 JSR      DSTA
4183  94FF  A0 03                    LDY      #3            ;show type
4184  9501  B1 6B                    LDA      (STARTPTR),Y
4185  9503  85 40                    STA      LSB
4186  9505  D0 09                    bne      ?d1
4187  9507                           MESSAGE  MSG148
4192  950E  80 21                    bra      ?bdone
4193  9510  C9 01        ?d1:        cmp      #1
4194  9512  D0 09                    bne      ?d2
4195  9514                           MESSAGE  MSG149
4200  951B  80 14                    bra      ?bdone
4201  951D  C9 02        ?d2:        cmp      #2
4202  951F  D0 09                    bne      ?d3
4203  9521                           MESSAGE  MSG150
4208  9528  80 07                    bra      ?bdone
4209  952A         ?d3:              MESSAGE  MSG151
4214
4215  9531  A6 45        ?bdone: LDX  VALVE
4216  9533  A5 40                    LDA      LSB           ;show X of X
4217  9535  C9 01                    CMP      #1
4218  9537  D0 08                    BNE      ?s
4219  9539  FE BF 19                 INC      VSYR,X        ;syringes
4220  953C  BD BF 19                 LDA      VSYR,X
4221  953F  80 12                    BRA      ?4
4222  9541  C9 03        ?s:         cmp      #3
4223  9543  D0 08                    bne      ?5
4224  9545  FE C8 19                 inc      VSPEC,X       ;specials
4225  9548  BD C8 19                 LDA      VSPEC,x
4226  954B  80 06                    bra      ?4
4227  954D  FE 55 19     ?5:         INC      VCTR,X        ;base or soak
4228  9550  BD 55 19                 LDA      VCTR,X
4229  9553  C9 64        ?4:         CMP      #100
4230  9555                           BLT      ?0
4233  9557  20 00 00                 jsr      d3d
4234  955A  80 03                    BRA      ?1
4235  955C  20 00 00     ?0:         jsr      d2d
4236  955F         ?1:               SET_CURSOR 11
4240  9564                           DISP     'o'
4244  9569                           DISP     'f'
4248  956E  A6 45                    LDX      VALVE
4249  9570  A5 40                    LDA      LSB
4250  9572  C9 01                    CMP      #1
4251  9574  D0 05                    BNE      ?t
```

```
4252  9576  AD 42 0F            LDA    NSYR            ;syringes
4253  9579  80 0C               BRA    ?2
4254  957B  C9 03       ?1:     cmp    #3
4255  957D  D0 05               bne    ?3
4256  957F  BD 43 0F            lda    NSPEC,x         ;specials
4257  9582  80 03               bra    ?2
4258  9584  BD 39 0F    ?3:     LDA    NSPLIT,X        ;base or soak
4259  9587  20 00 00    ?2:     jsr    d3d
4260  958A              ?6:     SET_CURSOR LINE2
4264  958F  A0 04               LDY    #4
4265  9591  B1 6B               LDA    (STARTPTR),Y
4266  9593  85 59               STA    OFFSET
4267  9595  C8                  INY
4268  9596  B1 6B               LDA    (STARTPTR),Y
4269  9598  85 5A               STA    OFFSET+1
4270  959A  20 00 B7            JSR    MIN2HM
4271  959D  20 50 B5            JSR    DISPDURATION
4272  95A0                      SET_CURSOR LINE2+7
4276  95A5                      DISP   '@'
4280  95AA  A0 00               LDY    #0
4281  95AC  B1 6B               LDA    (STARTPTR),Y
4282  95AE  85 59               STA    OFFSET
4283  95B0  C8                  INY
4284  95B1  B1 6B               LDA    (STARTPTR),Y
4285  95B3  85 5A               STA    OFFSET+1
4286  95B5  20 00 B7            JSR    MIN2HM
4287  95B8  20 B9 B1            JSR    DISPTIME
4288  95BB  60                  RTS
4289
4290                          ;--------------------------------
4291                          ;    HISTORY
4292                          ;--------------------------------
4293
4294                            comment ^
4295                    Reading history returns 8 bytes on the stack as follows:
4296                    byte 0=key
4297                    bytes 1-2 = month, day
4298                    bytes 3-4 = hour, minute
4299
4300                            key    name            byte5           byte6           byte7
4301                            ---    ----            -----           -----           -----
4302                            01     valve cycle     valve#          duration        duration
4303                            02     manual valve    valve#          -               -
4304                            11     SL              -               -               -
4305                            12     SVL             -               duration        duration
4306                            13     self-test       pass/fail       -               -
4307                            21     pwrkey in       -               -               -
4308                            22     batt low        -               -               -
4309                            23     serial link     caller          -               -
4310                            24     start run       password#       -               -
4311                            25     stop run        password#       -               -
4312                            ^
4313
4314  95BC              HIST:
4315                                                  ;select which bank to display
4316
4317  95BC  A9 00               lda    #0              ;put read pointer at oldest entry
```

```
4318   95BE   20 00 00              jsr    history_read_init
4319   95C1   9C DD 19              stz    hflag          ;history empty flag
4320
4321   95C4   A9 00        hread:   lda    #0
4322   95C6   20 00 00              jsr    history_read   ;read entry
4323   95C9   A2 07                 ldx    #7             ;pull off stack into hbfr
4324   95CB   68           ?1:      pla
4325   95CC   9D 65 02              sta    hbfr,x
4326   95CF   CA                    dex
4327   95D0   10 F9                 bpl    ?1
4328   95D2   AD 65 02              lda    hbfr           ;if key=0, then end
4329   95D5   F0 56                 beq    hdone
4330
4331   95D7                         set    hflag
4335   95DC   20 70 96              jsr    history_line1  ;else display the event
4336   95DF   AD 6A 02              lda    hbfr+5
4337   95E2   85 45                 sta    VALVE
4338   95E4   20 C3 B1              jsr    DSTA#          ;show valve #
4339   95E7                         SKIP   1
4345   95F0   AD 65 02              lda    hbfr           ;and auto or manual
4346   95F3   C9 01                 cmp    #$01
4347   95F5   D0 12                 bne    ?2
4348   95F7   AD 6B 02              lda    hbfr+6
4349   95FA   85 59                 sta    OFFSET
4350   95FC   AD 6C 02              lda    hbfr+7
4351   95FF   85 5A                 sta    OFFSET+1
4352   9601   20 00 B7              jsr    MIN2HM
4353   9604   20 50 B5              jsr    DISPDURATION
4354   9607   80 07                 bra    hkey
4355   9609                ?2:      MESSAGE vmanual
4360
4361   9610   20 4B B7     hkey:    jsr    GETKEY         ;entry shown, wait for key
4362   9613   F0 FB                 beq    hkey
4363   9615   C9 03                 cmp    #upkey
4364   9617   F0 06                 beq    ?up
4365   9619   C9 04                 cmp    #downkey
4366   961B   F0 04                 beq    ?down
4367   961D   80 F1                 bra    hkey
4368   961F   80 A3        ?up:     bra    hread          ;next entry
4369                       ?down:                         ;previous entry
4370   9621   A9 00                 lda    #0
4371   9623   20 00 00              jsr    history_backup
4372   9626   A9 00                 lda    #0
4373   9628   20 00 00              jsr    history_backup
4374   962B   80 97                 bra    hread
4375
4376   962D   20 5B B7     hdone:   JSR    DKCLR          ;end of history
4377   9630                         MESSAGE MSG50
4382   9637   20 47 B5              JSR    MSGWAIT
4383   963A   20 47 B5              JSR    MSGWAIT
4384
4385   963D   AD DD 19     DH92:    lda    hflag          ;if history not empty,
4386   9640   F0 2B                 beq    ?no
4387   9642   20 5B B7              JSR    DKCLR          ;erase history?
4388   9645                         MESSAGE MSG42
4393   964C                         OH
4397   9651   20 4B B7     ?1:      JSR    GETKEY
```

```
4398  9654  F0 FB                   beq       ?1
4399  9656  C9 01                   CMP       #okkey
4400  9658  F0 0E                   BEQ       ?ok
4401  965A  C9 02                   CMP       #helpkey
4402  965C  D0 0F                   BNE       ?no
4403  965E                          HELP      none
4408  9665  4C 3D 96                JMP       DH92
4409
4410  9668  A9 00           ?ok:    lda       #0
4411  966A  20 00 00                jsr       history_write_init
4412
4413  966D  4C F3 93        ?no:    jmp       last_view
4414
4415                        history_line1:                ;show first line of history
4416                                                      ;event is in hbfr
4417  9670  20 5B B7                jsr       DKCLR
4418  9673  AD 66 02                lda       hbfr+1
4419  9676  20 00 00                jsr       display_month   ;show month,day, hour, minute
4420  9679                          SKIP      1
4426  9682  AD 67 02                lda       hbfr+2
4427  9685  20 00 00                jsr       d2d
4428  9688                          DISP      ','
4432  968D                          SKIP      1
4438  9696  AD 68 02                lda       hbfr+3
4439  9699  AC 69 02                ldy       hbfr+4
4440  969C  20 00 00                jsr       display_time
4441  969F  20 EE B7                jsr       prompt
4442  96A2                          SET_CURSOR LINE2        ;return with char_index at line 2
4446  96A7  60                      rts
4447
4448
4449
4450
4451  96A8                          INCLUDE   SCHED.ASM
4452
4453                        ;---------------------------------
4454                        ;   SETUP SCHEDULES
4455                        ;---------------------------------
4456
4457        0000            rnew    equ       0             ;value of REVIEW variable
4458        0001            rmodify equ       1
4459
4460
4461
4462                        ;   Title: Schedule intialize
4463                        ;
4464                        ;   Purpose: Init all schedules from factory default
4465                        ;
4466                        ;   Entry: none
4467                        ;   Exit: main, alt pgms set up
4468                        ;         main program is in OBJECT
4469                        ;   RAM used: none
4470
4471  96A8                  schedule_init:
4472  96A8  20 41 B4                jsr       OBJCLEAR        ;init MAIN, ALT programs from FACTORY
4473  96AB  A9 02                   lda       #2
4474  96AD  8D 80 03                sta       SOURCE
```

```
4475  96B0  20 59 B4           jsr     S20
4476  96B3              SET     SOURCE
4480  96BB  20 80 B4           jsr     D2S
4481  96BB  9C 80 0B           stz     SOURCE
4482  96BE  20 80 B4           jsr     D2S
4483  96C1  A9 01              lda     #1              ;generate a schedule
4484  96C3  8D DE 19           sta     exec_command
4485  96C6  20 D5 83           jsr     executive
4486  96C9  60                 rts
4487
4488
4489
4490  96CA              ENTER_SCHEDULE:
4491  96CA  64 48              stz     sub_mode
4492  96CC  20 5B B7   ?2:     JSR     DKCLR
4493  96CF              SET_CURSOR LINE2
4497  96D4  20 30 B2           JSR     DISP_SOURCE
4498  96D7  A9 3F              lda     #'?'
4499  96D9  20 00 00           jsr     dchar
4500  96DC              SET_CURSOR 0
4504  96E1  A5 48              lda     sub_mode
4505  96E3              local_option  opt5
4511  96EB  85 48              sta     sub_mode
4512  96ED  90 14              bcc     ?1
4513  96EF  D0 09              bne     ?0
4514  96F1              HELP    EnterNewHELP
4519  96F8  80 D2              bra     ?2
4520  96FA       ?0:    HELP    ChangeProgHELP
4525  9701  80 C9              bra     ?2
4526  9703       ?1:
4527  9703  0A                 asl     a               ;then go there
4528  9704  AA                 tax
4529  9705  BD 12 97           lda     ?tbl,x
4530  9708  85 4E              sta     srcptr
4531  970A  BD 13 97           lda     ?tbl+1,x
4532  970D  85 4F              sta     srcptr+1
4533  970F  6C 4E 00           jmp     (srcptr)
4534
4535  9712       ?tbl:
4536  9712  6997              WORD    NEW_SCHEDULE
4537  9714  1897              WORD    OLD_SCHEDULE
4538  9716  C787              WORD    next_main
4539
4540                    ;--------------------------------------
4541
4542              OLD_SCHEDULE:                      ;review/modify existing schedule
4543  9718  A9 01              lda     #modify
4544  971A  8D D1 19           sta     REVIEW
4545  971D  AD 80 0B           lda     SOURCE
4546  9720  C9 02              cmp     #2
4547  9722  F0 57              beq     SCHED2
4548  9724  64 49              stz     iptr
4549  9726  20 5B B7   OLD1:   jsr     DKCLR           ;select which area of pgm to modify
4550  9729              MESSAGE MSG258
4555  9730              SET_CURSOR LINE2
4556  9735  A5 49              lda     iptr
4560  9737              local_option  accept
```

```
4586  973F  90 09              bcc    ?1
4587  9741         HELP  .none
4577  9743  80 DC              bra    OLD1
4573  974A  85 49     ?1:      sta    iptr              ;store selection
4574  974C  0A                 asl    a
4575  974D  AA                 tax
4576  974E  BD 5B 97           lda    ?tbl,x
4577  9751  85 4E              sta    srcptr
4578  9753  BD 5C 97           lda    ?tbl+1,x
4579  9756  85 4F              sta    srcptr+1
4580  9758  6C 4E 00           jmp    (srcptr)
4581
4582  975B         ?tbl:
4583  975B  7E97               word   enter_durations
4584  975D  8B97               word   enter_starting
4585  975F  2698               word   day_cycles
4586  9761  6298               word   advanced_options
4587  9763  2C9C               word   save_program
4588
4589  9765         next_modify:
4590  9765  E6 49              inc    iptr
4591  9767  80 BD              bra    OLD1
4592
4593         ;-------------------------------------------------------------
4594
4595  9769         NEW_SCHEDULE:
4596  9769  A9 00              lda    #new
4597  976B  8D D1 19           sta    REVIEW
4598  976E  20 41 B4           jsr    OBJCLEAR
4599  9771  20 14 B5           jsr    init_splits       ;default is splits enabled
4600
4601  9774         SCHED1:
4602  9774  AD 80 0B           lda    SOURCE            ;if factory, enter one-screen pgm
4603  9777  C9 02              cmp    #2
4604  9779  D0 03              bne    enter_durations
4605  977B  4C CB A9  SCHED2:  jmp    SET_FACTORY       ;returns to save_program
4606
4607  977E         enter_durations:
4608  977E  20 16 9F           JSR    BLOCK1            ;enter durations
4609  9781  AD D1 19           lda    REVIEW
4610  9784  C9 01              cmp    #modify
4611  9786  D0 03              bne    enter_starting
4612  9788  4C 65 97           jmp    next_modify
4613
4614  978B         enter_starting:
4615  978B  20 55 A4           JSR    BLOCK5            ;enter starting time
4616  978E  AD D1 19           lda    REVIEW
4617  9791  C9 01              cmp    #modify
4618  9793  D0 03              bne    day_option
4619  9795  4C 65 97           jmp    next_modify
4620
4621           day_option:                              ;skip day options?
4622  9798  20 5B B7  ?1:      JSR    DKCLR
4623  979B               MESSAGE MSG260
4628  97A2               SET_CURSOR 0
4632  97A7  A9 00              LDA    #0
4633  97A9               local_option opt5
```

```
4639  97B1  90 09              bcc      ?2
4640  97B3                     HELP     none
4645  97BA  80 DC              BRA      ?1
4646  97BC  8D 5B 02    ?2:    STA      IBFR
4647  97BF  D0 0B              bne      day_option1        ;no
4648  97C1  9C 64 02           stz      IBFR+9             ;yes, use defaults of
4649  97C4                     SET      CYCLE_TYPE         ;all same, specific days
4653  97C9  4C 26 98           jmp      day_cycles
4654
4655
4656                    day_option1:                       ;enter all same or ISC
4657  97CC  20 5B B7    ?1:    JSR      DKCLR
4658  97CF                     MESSAGE  MSG263
4663  97D6                     SET_CURSOR 0
4667  97DB  A9 00              LDA      #0
4668  97DD                     local_option opt7
4674  97E5  90 09              bcc      ?2
4675  97E7                     HELP     none
4680  97EE  80 DC              BRA      ?1
4681  97F0  8D 64 02    ?2:    STA      IBFR+9             ;store selection
4682
4683                    day_option2:                       ;enter type of day cycle
4684  97F3  20 5B B7    ?1:    JSR      DKCLR
4685  97F6                     MESSAGE  MSG269
4690  97FD                     SET_CURSOR 0
4694  9802  A9 00              LDA      #0
4695  9804                     local_option cycopt
4701  980C  90 09              bcc      ?2
4702  980E                     HELP     none
4707  9815  80 DC              BRA      ?1
4708  9817  8D 0B 0E    ?2:    STA      CYCLE_TYPE         ;store selection
4709  981A  C9 02              cmp      #2
4710  981C                     BGE      day_cycles
4713  981E  AD 0B 0E           lda      CYCLE_TYPE         ;swap 0,1 selection
4714  9821  49 01              eor      #00000001b         ;so 0=so many, 1=specific
4715  9823  8D 0B 0E           sta      CYCLE_TYPE
4716
4717                  . day_cycles:                        ;enter day cycles
4718  9826  20 42 A1           JSR      BLOCK3             ;enter base cycles
4719  9829  AD D1 19           lda      REVIEW
4720  982C  C9 01              cmp      #modify
4721  982E  D0 03              bne      advanced
4722  9830  4C 65 97           jmp      next_modify
4723
4724                    advanced:                          ;want advanced options?
4725  9833  20 5B B7    ?1:    JSR      DKCLR
4726  9836                     MESSAGE  MSG270
4731  983D                     SET_CURSOR 0
4735  9842  9C D5 19           STZ      option
4736  9845  A9 00              LDA      #0
4737  9847                     local_option opt6
4743  984F  90 09              bcc      ?2
4744  9851                     HELP     none
4749  9858  80 D9              BRA      ?1
4750  985A  8D 5B 02    ?2:    STA      IBFR
4751  985D  D0 03              bne      advanced_options   ;yes
4752  985F  4C 2D 9C           jmp      save_program       ;no
```

```
4753
4754
4755                             ;--------------------------------
4756                             ;      optional features
4757                             ;--------------------------------
4758
4759                             advanced_options:              ;enter all the goodies
4760   9862   9C D5 19                  stz    option
4761   9865   20 5B B7           adv1:  JSR    DKCLR
4762   9868                             MESSAGE MS649
4767   986F                             SET_CURSOR LINE2
4771   9874   AD D5 19                  LDA    option
4772   9877                             local_option advopt
4778   987F   90 09                     bcc    ?2
4779   9881                             HELP   none
4784   9889   80 DB                     BRA    adv1
4785   988A   8D D5 19           ?2:    sta    option           ;store selection
4786   988D   0A                        asl    a
4787   988E   AA                        tax
4788   988F   BD 9C 98                  lda    ?tbl,x
4789   9892   85 4E                     sta    srcptr
4790   9894   BD 9D 98                  lda    ?tbl+1,x
4791   9897   85 4F                     sta    srcptr+1
4792   9899   6C 4E 00                  jmp    (srcptr)
4793
4794   989C                      ?tbl:
4795   989C   BA99                      word   auto_split
4796   989E   529A                      word   excluded
4797   98A0   EA9A                      word   syringes
4798   98A2   7F9B                      word   soaks
4799   98A4   5E9C                      word   specials
4800   98A6   AD98                      word   end_advanced
4801
4802   98A8                      next_option:
4803   98A8   EE D5 19                  inc    option
4804   98AB   80 BB                     bra    adv1
4805
4806   98AD                      end_advanced:
4807   98AD   AD D1 19                  lda    REVIEW
4808   98B0   C9 01                     cmp    #modify
4809   98B2   D0 03                     bne    ?1
4810   98B4   4C 65 97                  jmp    next_modify
4811   98B7   4C 2C 9C           ?1:    jmp    save_program
4812
4813                             ;--------------------------------
4814                             ;      auto splits
4815                             ;--------------------------------
4816
4817                             auto_split:                    ;see site info?
4818   98BA   AD D1 19                  lda    REVIEW
4819   98BD   C9 00                     cmp    #rnew
4820   98BF   D0 06                     bne    modify_auto
4821   98C1   9C DA 19                  stz    block
4822   98C4   4C 3F 99                  jmp    enter_auto
4823
4824   98C7                      modify_auto:
4825   98C7   AD 0C 0E                  lda    MAXON            ;see if splits enabled
```

```
4826  98CA  D0 36                    bne       ?auto
4827
4828                     ?noauto:                                ;no auto modify menu
4829  98CC  20 5B B7                 jsr       DKCLR
4830  98CF                           MESSAGE   auto_msg
4835  98D6                           SET_CURSOR LINE2
4839  98DB  A9 01                    lda       #1
4840  98DD                           local_option no_extra
4846  98E5  90 09                    bcc       ?2
4847  98E7                           HELP      none
4852  98EE  80 DC                    bra       ?noauto
4853  98F0  8D 5B 02     ?2:         sta       IBFR
4854  98F3  D0 0A                    bne       ?5
4855  98F5  9C DA 19                 stz       block           ;add
4856  98F8                           SET       MAXON
4860  98FD  F0 40                    beq       enter_auto
4861  98FF  4C A8 98     ?5:         jmp       next_option     ;keep as is
4862
4863  9902  20 5B B7     ?auto:      jsr       DKCLR           ;auto modify menu
4864  9905                           MESSAGE   auto_msg
4869  990C                           SET_CURSOR LINE2
4873  9911  A9 01                    lda       #1
4874  9913                           local_option  extra
4880  991B  90 09                    bcc       ?1
4881  991D                           HELP      none
4886  9924  80 DC                    bra       ?auto
4887  9926  8D 5B 02     ?1:         sta       IBFR
4888  9929  F0 0E                    beq       ?cancel         ;cancel
4889  992B  C9 01                    cmp       #1
4890  992D  F0 03                    beq       ?a              ;see/change
4891  992F  4C A8 98                 jmp       next_option     ;keep as is
4892  9932  A9 01        ?a:         lda       #1
4893  9934  8D DA 19                 sta       block
4894  9937  80 06                    bra       enter_auto
4895
4896  9939                     ?cancel:
4897  9939  9C 0C 0E                 stz       MAXON           ;disable splits (from base water)
4898  993C  4C A8 98                 jmp       next_option
4899
4900                     enter_auto:                            ;see site info?
4901  993F  20 5B B7     ?1:         JSR       DKCLR
4902  9942                           MESSAGE   MS6273
4907  9949                           SET_CURSOR 0
4911  994E  A9 00                    LDA       #0
4912  9950                           local_option opt8
4918  9958  90 09                    bcc       ?2
4919  995A                           HELP      none
4924  9961  80 DC                    BRA       ?1
4925  9963  8D 5B 02     ?2:         STA       IBFR
4926  9966  D0 03                    bne       site_info       ;yes
4927  9968  4C 4C 9A                 jmp       split           ;no
4928
4929  996B                     site_info:
4930  996B  64 45                    STZ       VALVE
4931  996D  20 50 B0     S2SKIP:     JSR       NXTVALVE
4932  9970  90 03                    BCC       S2NEXT
4933  9972  4C 4C 9A                 JMP       S2END
```

```
4934  9975              S2NEXT:
4935  9975  A6 45               LDX    .VALVE         ;start with existing site info
4936  9977  BD 29 0B            LDA    TERRAIN,X
4937  997A  8D 4F 19            STA    DEFAULT+2
4938  997D  BD 32 0B            LDA    SPRINKLER,X
4939  9980  8D 50 19            STA    DEFAULT+3
4940  9983  4C E8 99            JMP    S2CONFIRM
4941
4942              S2ENTRY:                             ;enter new site info
4943  9986  20 5B B7            JSR    DKCLR
4944  9989  20 DA B1            JSR    DSTA
4945  998C                      DISP   ':'
4949  9991                      MESSAGE MSG213
4954  9998                      SET_CURSOR LINE2
4958  999D  AD 4F 19            LDA    DEFAULT+2
4959  99A0                      local_option  teropt  ;select terrain
4965  99A8  90 09               BCC    SS2G
4966  99AA                      HELP   none
4971  99B1  80 D3               BRA    S2ENTRY
4972  99B3  8D 4F 19   SS2G:    sta    DEFAULT+2
4973  99B6  20 5B B7            JSR    DKCLR
4974  99B9  20 DA B1            JSR    DSTA
4975  99BC                      DISP   ':'
4979  99C1                      MESSAGE MSG213
4984  99C8                      SET_CURSOR LINE2
4988  99CD  AD 50 19            LDA    DEFAULT+3
4989  99D0                      local_option  spropt  ;select sprinkler type
4995  99D8  90 09               BCC    SS2H
4996  99DA                      HELP   none
5001  99E1  80 A3               BRA    S2ENTRY
5002  99E3              SS2H:
5003  99E3  8D 50 19            STA    DEFAULT+3
5004  99E6  80 00               BRA    S2CONFIRM
5005
5006              S2CONFIRM:                           ;show default and confirm
5007  99E8  20 5B B7            JSR    DKCLR
5008  99EB  20 F4 B0            JSR    FLASH
5009  99EE  20 DA B1            JSR    DSTA
5010  99F1                      DISP   ':'
5014  99F6  AD 4F 19            LDA    DEFAULT+2      ;get message addr from table
5015  99F9  0A                  asl    a
5016  99FA  AA                  tax
5017  99FB  BC 89 C2            ldy    terrain_tbl,x
5018  99FE  BD 8A C2            lda    terrain_tbl+1,x
5019  9A01  20 BE B7            jsr    display_bank1
5020  9A04                      DISP   ','
5024  9A09                      SET_CURSOR LINE2
5028  9A0E  AD 50 19            LDA    DEFAULT+3
5029  9A11  0A                  asl    a
5030  9A12  AA                  tax
5031  9A13  BC 95 C2            ldy    sprink_tbl,x
5032  9A16  BD 96 C2            lda    sprink_tbl+1,x
5033  9A19  20 BE B7            jsr    display_bank1
5034  9A1C                      ON
5035  9A1C  20 4B B7   S2C:     JSR    GETKEY
5039  9A1F  F0 FB               beq    S2C
5040  9A21  C9 01               cmp    #0kley
```

```
                    F0 11           beq     S2OK
                    C9 02           cmp     #helpkey
                    D0 0A           BNE     ?ng
                                    HELP    none
                    4C E9 99        JMP     S2CONFIRM
                    4C 96 99  ?ng:  JMP     S2ENTRY A6 45     S2OK: LDX     VALVE           ;default is confirmed
                    AD 4F 19        LDA     DEFAULT+2
                    9D 29 0B        STA     TERRAIN,X
                    AD 50 19        LDA     DEFAULT+3
                    9D 32 0B        STA     SPRINKLER,X
                    4C 8D 99        JMP     S2SKIP
                              S2END:

5061      9A4C            split:
5061      9A4C  20 F2 9F        JSR     BLOCK2          ;get split info
5062      9A4F  4C A8 98        jmp     next_option ;-------------------------------
                              ;     excluded period
                              ;-------------------------------

5068      9A52            excluded:
5069      9A52  AD D1 19        lda     REVIEW
5070      9A55  C9 00           cmp     #rnew
5071      9A57  D0 05           bne     modify_xtime
5072      9A59  9C DA 19        stz     block
5073      9A5C  4C E4 9A        jmp     enter_xtime
5074
5075      9A5F            modify_xtime:
5076      9A5F  AD 1E 0E        lda     XFROM           ;modify xtime
5077      9A62  0D 1F 0E        ora     XFROM+1
5078      9A65  0D 20 0E        ora     XTO             ;see if any xtime
5079      9A68  0D 21 0E        ora     XTO+1
5080      9A6B  D0 31           bne     ?xtime
5081
5082                            ?noxtime:               ;no xtime modify menu
5083      9A6D  20 5B E7        jsr     DKCLR
5084      9A70            MESSAGE MSG4B
5089      9A77            SET_CURSOR LINE2
5093      9A7C  A9 01           lda     #1
5094      9A7E            local_option no_extra
5100      9A86  90 09           bcc     ?2
5101      9A88            HELP    none
5105      9A8F  80 DC           bra     ?noxtime
5107      9A91  8D 5B 02  ?2:   sta     IBFR
5108      9A94  D0 05           bne     ?5
5109      9A96  9C DA 19        stz     block           ;add
5110      9A99  F0 49           beq     enter_xtime
5111      9A9B  4C A8 98  ?5:   jmp     next_option     ;keep as is
5112
5113      9A9E  20 5B E7  ?xtime: jsr   DKCLR           ;xtime modify menu
5114      9AA1            MESSAGE MSG4S
5119      9AA8            SET_CURSOR LINE2
                  A9 01           lda     #1
                            local_option extra
```

```
5130  9A97  90 09              bcc    ?1
5131  9A99              HELP   none
5135  9A9D  80 DC              bra    ?xtime
5137  9AC2  8D 5B 02    ?1:    sta    IBFR
5138  9AC5  F0 0E              beq    ?cancel        ;cancel
5139  9AC7  C9 01              cmp    #1
5140  9AC9  F0 03              beq    ?a             ;see/change
5141  9ACB  4C A8 9B           jmp    next_option    ;keep as is
5142  9ACE  A9 01       ?a:    lda    #1
5143  9AD0  8D DA 19           sta    block
5144  9AD3  80 0F              bra    enter_xtime
5145
5146  9AD5              ?cancel:
5147  9AD5  9C 1E 0E           stz    XFROM          ;wipe out xtime
5148  9AD8  9C 1F 0E           stz    XFROM+1
5149  9ADB  9C 20 0E           stz    XTO
5150  9ADE  9C 21 0E           stz    XTO+1
5151  9AE1  4C A8 9B           jmp    next_option
5152
5153  9AE4              enter_xtime:
5154  9AE4  20 B5 A2           JSR    BLOCK4         ;enter excluded period
5155  9AE7  4C A8 9B           jmp    next_option
5156
5157                    ;--------------------------------
5158                    ;    syringes
5159                    ;--------------------------------
5160
5161  9AEA              syringes:
5162  9AEA  AD D1 19           lda    REVIEW
5163  9AED  C9 00              cmp    #rnew
5164  9AEF  D0 06              bne    modify_syringes
5165  9AF1  9C DA 19           stz    block
5166  9AF4  4C 70 9B           jmp    enter_syringes
5167
5168  9AF7              modify_syringes:
5169  9AF7  AD 7D 0E           lda    SOFTEN         ;modify syringes
5170  9AFA  0D 7E 0E           ora    SOFTEN+1       ;see if any syringes
5171  9AFD  D0 31              bne    ?syringe
5172
5173                    ?nosyringe:                  ;no syringe modify menu
5174  9AFF  20 5B B7           jsr    DKCLR
5175  9B02              MESSAGE syringe_msg
5180  9B09              SET_CURSOR LINE2
5184  9B0E  A9 01              lda    #1
5185  9B10              local_option no_extra
5191  9B18  90 09              bcc    ?2
5192  9B1A              HELP   none
5197  9B21  80 DC              bra    ?nosyringe
5198  9B23  8D 5B 02    ?2:    sta    IBFR
5199  9B26  D0 05              bne    ?5
5200  9B28  9C DA 19           stz    block          ;add
5201  9B2B  F0 43              beq    enter_syringes
5202  9B2D  4C A8 9B    ?5:    jmp    next_option    ;keep as is
5203
5204  9B30  20 5B B7    ?syringe: jsr  DKCLR          ;syringe modify menu
5205  9B33              MESSAGE syringe_msg
5210  9B3A              SET_CURSOR LINE2
```

```
5214   993F   A9 01                    lda       #1
5215   9941                            local_option  extra
5221   9949   90 09                    bcc       ?1
5222   994B                            HELP      none
5227   9952   80 DC                    bra       ?syringe
5228   9954   8D 59 02        ?1:      sta       IBFR
5229   9957   F0 0E                    beq       ?cancel      ;cancel
5230   9959   C9 01                    cmp       #1
5231   995B   F0 03                    beq       ?a           ;see/change
5232   995D   4C A8 98                 jmp       next_option  ;keep as is
5233   9960   A9 01           ?a:      lda       #1
5234   9962   8D DA 19                 sta       block
5235   9965   80 09                    bra       enter_syringes
5236
5237   9967                   ?cancel:
5238   9967   9C 7D 0E                 stz       SOFTEN       ;wipe out syringes
5239   996A   9C 7E 0E                 stz       SOFTEN+1
5240   996D   4C A8 98                 jmp       next_option
5241
5242   9970                   enter_syringes:
5243   9970   20 E8 A4                 JSR       BLOCK6       ;enter active months
5244   9973   20 7D A5                 JSR       BLOCK7       ;enter durations
5245   9976   20 B8 A8                 JSR       BLOCK8       ;enter period
5246   9979   20 44 A6                 JSR       BLOCK9       ;enter interval
5247   997C   4C A8 98                 jmp       next_option
5248
5249                                   ;--------------------------------
5250                                   ;    soak
5251                                   ;--------------------------------
5252
5253   997F                   soaks:
5254   997F   AD D1 19                 lda       REVIEW
5255   9982   C9 00                    cmp       #rnew
5256   9984   D0 06                    bne       modify_soak
5257   9986   9C DA 19                 stz       block
5258   9989   4C 23 9C                 jmp       enter_soaks
5259
5260   998C                   modify_soak:
5261   998C   A9 08                    lda       #8           ;modify soaks
5262   998E   85 71                    sta       scratch
5263   9990   A6 71           ?0:      ldx       scratch      ;see if any soaks
5264   9992                            DEX
5271   9997   BD 7F 0E                 lda       DUR3,x
5272   999A   1D 80 0E                 ora       DUR3+1,x
5273   999D   D0 35                    bne       ?soak
5274   999F   C6 71                    dec       scratch
5275   99A1   D0 EE                    bne       ?0
5276
5277                          ?nosoak:                        ;no soak review menu
5278   99A3   20 5B B7                 jsr       DKCLR
5279   99A6                            MESSAGE soak_msg
5284   99AD                            SET_CURSOR LINE2
5288   99B2   A9 01                    lda       #1
5289   99B4                            local_option no_extra
5295   99BC   90 09                    bcc       ?2
5296   99BE                            HELP      none
5297   99C5                            bra       ?nosoak
```

```
5302  9BC7  8D 5B 02   ?2:     sta     IBFR
5303  9BCA  D0 05              bne     ?5
5304  9BCC  9C DA 19           stz     block
5305  9BCF  F0 52              beq     enter_soaks     ;add
5306  9BD1  4C A9 98   ?5:     jmp     next_option     ;keep as is
5307
5308  9BD4  20 5B B7   ?soak:  jsr     DKCLR           ;soak review menu
5309  9BD7                     MESSAGE soak_msg
5314  9BDE                     SET_CURSOR LINE2
5318  9BE3  A9 01              lda     #1
5319  9BE5                     local_option    extra
5325  9BED  90 03              bcc     ?1
5326  9BEF                     HELP    none
5331  9BF6  80 DC              bra     ?soak
5332  9BF8  8D 5B 02   ?1:     sta     IBFR
5333  9BFB  F0 0E              beq     ?cancel         ;cancel
5334  9BFD  C9 01              cmp     #1
5335  9BFF  F0 03              beq     ?a              ;see/change
5336  9C01  4C A9 98           jmp     next_option     ;keep as is
5337  9C04  A9 01      ?a:     lda     #1
5338  9C06  8D DA 19           sta     block
5339  9C09  80 18              bra     enter_soaks
5340
5341  9C0B             ?cancel:
5342  9C0B  A9 08              lda     #8              ;wipe out soaks
5343  9C0D  85 71              sta     scratch
5344  9C0F  A6 71      ?3:     ldx     scratch
5345  9C11                     DEX
5352  9C16  9E 7F 0E           stz     DUR3,x
5353  9C19  9E 80 0E           stz     DUR3+1,x
5354  9C1C  C6 71              dec     scratch
5355  9C1E  D0 EF              bne     ?3
5356  9C20  4C A9 98           jmp     next_option
5357
5358  9C23             enter_soaks:
5359  9C23  20 FA A6           JSR     BLOCK10         ;enter soak durations
5360  9C26  20 6E A9           JSR     BLOCK11         ;enter soak cycles
5361  9C29  4C A9 98           jmp     next_option
5362
5363
5364             save_program:                          ;program entered, now store it away
5365  9C2C  AD 60 05           lda     SOURCE
5366  9C2F  C9 02              cmp     #2
5367  9C31  D0 05              bne     ?1              ;if factory then source already saved,
5368  9C33  20 59 B4           jsr     S2O             ;convert to object
5369  9C36  80 03              bra     ?2
5370  9C38  20 80 B4   ?1:     jsr     O2S             ;else save entered object to source
5371  9C3B  20 5B B7   ?2:     JSR     DKCLR
5372  9C3E                     MESSAGE MSG179
5377  9C45                     SET_CURSOR LINE2
5381  9C4A  20 30 B2           JSR     DISP_SOURCE
5382  9C4D  20 47 B5           jsr     MSGWAIT
5383  9C50  20 47 B5           jsr     MSGWAIT
5384
5385  9C53  A9 01              lda     #1              ;generate the schedule based on program
5386  9C55  8D DE 19           sta     exec_command
5387  9C58  20 CC B0           jsr     executive
```

```
5389
5389   9C5B  4C C7 87              jmp      next_main
5390
5391
5392                               ;-------------------------------
5393                               ;    special schedule
5394                               ;-------------------------------
5395
5396                                                        ;special blocks are:
5397                                                        ;byte 0 - station #
5398                                                        ;byte 1-2 - cycle
5399                                                        ;byte 3-4 - time
5400                                                        ;byte 5-6 - duration
5401                                                        ;byte 7 - spare
5402
5403                               specials:                ;special program
5404   9C5E  AD D1 19              lda      REVIEW
5405   9C61  C9 00                 cmp      #rnew
5406   9C63  D0 06                 bne      modify_spec
5407   9C65  9C DA 19              stz      block
5408   9C68  4C DE 9C              jmp      enter_spec
5409
5410   9C6B                        modify_spec:
5411   9C6B  AD A3 0E              lda      NSPECIAL         ;modify spec
5412   9C6E  D0 31                 bne      ?spec
5413
5414                               ?nospec:                 ;no spec modify menu
5415   9C70  20 5B B7              jsr      DKCLR
5416   9C73                        MESSAGE  spec_msg
5421   9C7A                        SET_CURSOR LINE2
5425   9C7F  A9 01                 lda      #1
5426   9C81                        local_option no_extra
5432   9C89  90 09                 bcc      ?2
5433   9C8B                        HELP     none
5438   9C92  80 DC                 bra      ?nospec
5439   9C94  8D 5B 02     ?2:      sta      IBFR
5440   9C97  D0 05                 bne      ?5
5441   9C99  9C DA 19              stz      block            ;add
5442   9C9C  F0 40                 beq      enter_spec
5443   9C9E  4C A8 9E     ?5:      jmp      next_option      ;keep as is
5444
5445   9CA1  20 5B B7     ?spec:   jsr      DKCLR            ;spec modify menu
5446   9CA4                        MESSAGE  spec_msg
5451   9CAB                        SET_CURSOR LINE2
5455   9CB0  A9 01                 lda      #1
5456   9CB2                        local_option extra
5462   9CBA  90 09                 bcc      ?1
5463   9CBC                        HELP     none
5468   9CC3  80 DC                 bra      ?spec
5469   9CC5  8D 5B 02     ?1:      sta      IBFR
5470   9CC8  F0 0E                 beq      ?cancel          ;cancel
5471   9CCA  C9 01                 cmp      #1
5472   9CCC  F0 03                 beq      ?a               ;see/change
5473   9CCE  4C A8 9E              jmp      next_option      ;keep as is
5474   9CD1  A9 01        ?a:      lda      #1
5475   9CD3  8D DA 19              sta      block
5476   9CD6  80 06                 bra      enter_spec
```

```
                         ?cancel:
           9C A3 0E               stz    NSPECIAL          ;wipe out spec
           4C A6 9B               jmp    next_option enter_spec:
                                  LDW    specram,SPECIALS  ;the special block
           64 70                  STZ    specram+2         ;do 16 of them
           80 46                  BRA    SPNEXT 5480  9000  20 08 9F   SPSKIP:    JSR    INCBLOCK          ;point to next block
5481  9003  E6 70                 INC    specram+2
5482  9005  A5 70                 LDA    specram+2
5483  9007  C9 10                 CMP    #16
5484  9009  D0 03                 BNE    ?1
5485  900B  4C 00 9F              JMP    SPLEND
5486
5487  900E  A5 70      ?1:        LDA    specram+2         ;if more blocks,
5488  9010  CD A3 0E              cmp    NSPECIAL
5489  9013                        BGE    SPS3
5490  9015  4C 30 9D              JMP    SPNEXT            ;then show next one
5491
5492                                                       ;no more blocks,
5493  9018  20 5E B7   SPS3:      JSR    DKCLR             ;else ask if want another
5494  901B             SET_CURSOR LINE2
5495  901D             MESSAGE MSG135
5496  9022             SET_CURSOR 0
5497  9026  A9 01                 lda    #1
5498  9028             local_option opt3
5499  902B  90 09                 bcc    ?1
5500  902D             HELP none
5501  902D  80 D7                 BRA    SPS3
5502  902F  F0 08      ?1:        beq    SPN               ;more
5503  9031  4C 00 9F              JMP    SPLEND            ;no more
5504
5505  9034  AD DA 19   SPNEXT:    lda    block             ;entry or confirm for new station
5506  9037  D0 22                 bne    SPE
5507                                                       ;new input, use defaults
5508  9039  64 45      SPN:       STZ    VALVE
5509  903B  20 50 B0              JSR    NXTVALVE
5510  903E  A5 45                 LDA    VALVE
5511  9040  8D 4D 19              STA    DEFAULT           ;1st avail. special
5512  9043  A9 01                 LDA    #1
5513  9045  8D 4E 19              STA    DEFAULT+1
5514  9048  A9 7F                 LDA    #01111111B        ;daily
5515  904A  8D 4F 19              STA    DEFAULT+2
5516  904D  9C 50 19              STZ    DEFAULT+3         ;midnight
5517  9050  9C 51 19              STZ    DEFAULT+4
5518  9053  9C 52 19              STZ    DEFAULT+5         ;no duration
5519  9056  9C 53 19              STZ    DEFAULT+6
5520  9059  80 12                 BRA    SPENTRY
5521                   SPE:                                ;modify or review input
5522  905B  A2 00                 LDX    #0                ;get info from special block
5523  905D  A0 00                 LDY    #0
5524  905F  B1 6E      SPE1:      LDA    (specram),Y
5525  9061  9D 4D 19              STA    DEFAULT,X
5526  9064  C8                    INY
```

```
5560  9D61  C8                             INY
5561  9D62  E0 08                          CPX   #8
5562  9D64  D0 F5                          BNE   SPE1
5563  9D66  4C 79 9E                       JMP   SPCONFIRM
5564
5565                   SPENTRY:                                ;enter a new special block
5566  9D69  20 5B B7                       JSR   DKCLR
5567  9D6C                                 MESSAGE MS673                ;get station #
5572  9D73                                 SKIP  1
5576  9D7C                                 DISP  '#'
5582                                                                   ;select from IDed stations
5583  9D81  AD 4D 19                       lda   DEFAULT                ;start at DEFAULT
5584  9D84  A2 01                          ldx   #1                     ;select from 1-numsta
5585  9D86  DA                             phx
5586  9D87  AE 3B 0B                       ldx   numsta
5587  9D8A  DA                             phx
5588  9D8B  A2 01                          ldx   #1
5589  9D8D  DA                             phx
5590  9D8E  AC 18 02                       ldy   char_index
5591  9D91  A2 00                          ldx   #0
5592  9D93  20 00 00                       jsr   get_number
5593  9D96  90 03                          BCC   ?1
5594  9D98  4C 6F 9E                       JMP   SPHELP
5595  9D9B  8D 4D 19       ?1:             STA   DEFAULT
5596
5597  9D9E                                 MOV16 DEFAULT+1,IBFR          ;get cycle
5603  9DAA  AD 02 05                       LDA   CYCLE_TYPE
5604  9DAD  C9 01                          CMP   #1
5605  9DAF  F0 10                          BEQ   SPL21
5606  9DB1  20 39 B3                       JSR   ENTER_SO_MANY           ;get so many days
5607  9DB4  90 03                          BCC   SPL24
5608  9DB6  4C 6F 9E                       JMP   SPHELP
5609  9DB9  AD 5B 02       SPL24:          LDA   IBFR
5610  9DBC  8D 4E 19                       STA   DEFAULT+1
5611  9DBF  80 14                          BRA   SPL22
5612  9DC1  20 5E B3       SPL21:  JSR     ENTER_SPECIFIC               ;get specific days
5613  9DC4  90 03                          BCC   SPL25
5614  9DC6  4C 6F 9E                       JMP   SPHELP
5615  9DC9                   SPL25:        MOV16 IBFR,DEFAULT+1
5621
5622  9DD5  20 00 00       SPL22:  JSR     line2_clear                   ;show result
5626  9DD8                                 SET_CURSOR 6
5627  9DDD                                 DISP  ','
5631  9DE2                                 SKIP  1
5637  9DEB  20 F6 B5                       JSR   DISPCYC
5638
5639  9DEE                   SPL30:        SET_CURSOR LINE2
5643  9DF3                                 MOV16 DEFAULT+3,OFFSET        ;get time
5649  9DFD  20 00 B7                       JSR   MIN2HM
5650  9E00  20 62 B7                       JSR   get_time
5651  9E03  B0 6A                          BCS   SPHELP
5652  9E05  20 B8 B6                       JSR   HM2MIN
5653  9E08                                 MOV16 OFFSET,DEFAULT+3
5659
5660  9E10                                 SET_CURSOR LINE2+7
5664  9E17                                 DISP  ','
```

```
5674  9E35                              MOV16    DEFAULT+5,OFFSET        ;get duration
5680  9E3F   20 00 B7                   JSR      .MIN2HM
5681  9E32   20 5B B6                   JSR      get_duration
5682  9E35   B0 38                      BCS      SPHELP
5683  9E37   20 E9 B6                   JSR      HH2MIN
5684  9E3A                              MOV16    OFFSET,DEFAULT+5
5690
5691  9E44                              ADD16    DEFAULT+3,DEFAULT+5,LSB
5700  9E55   A5 41                      LDA      MSB                    ;error if time+duration is
5701  9E57   C9 05                      CMP      #$05                   ;past midnite
5702  9E59                              BLT      SPCONFIRM
5705  9E5B   F0 02                      BEQ      SPL31
5706  9E5D   80 06                      BRA      SPL32
5707  9E5F   A5 40            SPL31:    LDA      LSB
5708  9E61   C9 A0                      CMP      #$A0
5709  9E63                              BLT      SPCONFIRM              ;else confirm all params
5712  9E65             SPL32: HELP      none
5717  9E6C   4C 69 9D                   JMP      SPENTRY
5718
5719  9E6F             SPHELP: HELP     none                            ;help requested
5724  9E76   4C 69 9D                   JMP      SPENTRY
5725
5726                             SPCONFIRM:                             ;show default and confirm
5727  9E79   20 55 87                   JSR      DKCLR
5728  9E7C   AD 4D 19                   LDA      DEFAULT
5729  9E7F   85 45                      STA      VALVE
5730  9E81   20 C3 B1                   JSR      DSTA#
5731  9E84                              DISP     ','
5735  9E89                              SKIP     1
5741  9E92                              MOV16    DEFAULT+1,IBFR
5747  9E9E   20 FE 35                   JSR      DISPLYC
5748  9EA1                              SET_CURSOR LINE2
5752  9EA6                              MOV16    DEFAULT+3,OFFSET
5758  9EB0   20 00 B7                   JSR      MIN2HM
5759  9EB3   20 B9 B1                   JSR      DISPTIME
5760  9EB6                              DISP     ','
5764  9EBB                              SKIP     1
5770  9EC4                              MOV16    DEFAULT+5,OFFSET
5776  9ECE   20 00 B7                   JSR      MIN2HM
5777  9ED1   20 56 B5                   JSR      DISPDURATION
5778  9ED4                              ON
5782  9ED9   20 4B B7  SPC:   JSR      GETKEY
5783  9EDC   F0 FB                      beq      SPC
5784  9EDE   C9 01                      cmp      #okkey
5785  9EE0   F0 0C                      BEQ      SPOK
5786  9EE2   C9 02                      cmp      #helpkey
5787  9EE4   D0 05                      BNE      ?ng
5788  9EE6   20 54 B2                   JSR      CONFIRM_HELP
5789  9EE9   80 8E                      BRA      SPCONFIRM
5790  9EEB   4C 69 9D  ?ng:    JMP      SPENTRY
5791
5792                    SPOK:                                           ;default is confirmed
5793  9EEE   A2 00                      LDX      #0                    ;store away
5794  9EF0   A0 00                      LDY      #0
5795  9EF2   BD 4D 19  SPE2:  LDA      DEFAULT,X
5796  9EF5   91 6E                      STA      (spcram),Y
5797  9EF7   E8                         INX
```

```
5788  9EF8  C8                     INY
5789  9EF9  E0 08                  CPX   #8
5800  9EFB  D0 F8                  BNE   SPE2
5801  9EFD  4C EA 9C               JMP   SPSKIP         ;try next block
5802
5803  9F00           SPLEND:
5804  9F00  A5 70                  lda   specram+2
5805  9F02  8D A3 0E               sta   NSPECIAL
5806  9F05  4C A8 98               jmp   next_option
5807
5808           INCBLOCK:                                ;inc pointer by 8
5809  9F08  A5 6E                  LDA   specram
5810  9F0A  18                     CLC
5811  9F0B  69 08                  ADC   #8
5812  9F0D  85 6E                  STA   specram
5813  9F0F  A5 6F                  LDA   specram+1
5814  9F11  69 00                  ADC   #0
5815  9F13  85 6F                  STA   specram+1
5816  9F15  60                     RTS
5817
5818
5819           ;-------------------------------
5820           ;     schedule entry blocks
5821           ;-------------------------------
5822
5823           BLOCK1:                                  ;enter 100% durations for all valves
5824  9F16  64 45                  STZ   VALVE
5825  9F18  20 50 B0  B1SKIP: JSR  NXTVALVE
5826  9F1B  90 03                  BCC   B1NEXT
5827  9F1D  4C F1 9F               JMP   B1END
5828  9F20  AD D1 19  B1NEXT: LDA  REVIEW
5829  9F23  C9 00                  cmp   #new
5830  9F25  D0 08                  BNE   B1E
5831  9F27  9C 4D 19               STZ   DEFAULT        ;new input
5832  9F2A  9C 4E 19               STZ   DEFAULT+1
5833  9F2D  80 15                  BRA   B1ENTRY
5834  9F2F  AE 45     B1E:   LDX   VALVE              ;modify or review input
5835  9F31            DEX
5840  9F33  BD 22 0E               LDA   DUR1,X
5843  9F36  8D 4D 19               STA   DEFAULT
5844  9F39  BD 23 0E               LDA   DUR1+1,X
5845  9F3F  8D 4E 19               STA   DEFAULT+1
5846  9F42  80 37                  BRA   B1CONFIRM
5847
5848           B1ENTRY:                                 ;enter a new duration
5849  9F44  20 5E B7               JSR   DKCLR
5850  9F47  20 C0 B1               JSR   DSTA#
5851  9F4A            MESSAGE MSG37
5856  9F51            MOV16 DEFAULT,OFFSET
5862  9F5B  20 00 B7               JSR   MINZRM
5863  9F5E  20 59 B5               JSR   get_duration   ;get it in hours, minutes format
5864  9F61  B0 0F                  BCS   B1F
5865  9F63  20 B9 B6               JSR   HMZMIN
5866  9F66            MOV16 OFFSET,DEFAULT
5872  9F70  80 09                  BRA   B1CONFIRM
5873  9F72            B1F:  HELP   none
5878  9F72  84 18                  BRA   B1ENTRY
```

```
5879
5880                          B1CONFIRM:                       ;show default and confirm
5881   9F7B  20 5B B7                   JSR    BKCLR
5882   9F7E  AD 4D 19                   LDA    DEFAULT
5883   9F81  0D 4E 19                   ORA    DEFAULT+1
5884   9F84  F0 1C                      BEQ    B1A
5885   9F86  20 C3 B1                   JSR    DSTA#
5886   9F89                             MESSAGE MSG637
5891   9F90                             MOV16  DEFAULT,OFFSET
5897   9F9A  20 00 B7                   JSR    MIN2HM
5898   9F9D  20 50 B5                   JSR    DISPDURATION
5899   9FA0  80 0F                      BRA    B1B
5900   9FA2             B1A             MESSAGE MSG147          ;no watering
5905   9FA9                             SET_CURSOR LINE2
5908   9FAE  20 C3 B1                   JSR    DSTATION#
5910   9FB1             B1B:            GH
5914   9FB6  20 4B B7   B1C:    JSR    GETKEY
5915   9FB9  F0 FB                      beq    B1C
5916   9FBB  C9 01                      cmp    #okkey
5917   9FBD  F0 09                      beq    B1OK
5918   9FBF  C9 02                      cmp    #helpkey
5919   9FC1  D0 B1                      bne    B1ENTRY
5920   9FC3  20 54 B2                   JSR    CONFIRM_HELP
5921   9FC6  80 B3                      BRA    B1CONFIRM
5922
5923   9FC8  A6 45      B1OK:   LDX    VALVE           ;default is confirmed
5924   9FCA                             DEX
5931   9FCF  AD 4D 19                   LDA    DEFAULT
5932   9FD2  9D 22 0E                   STA    DUR1,X
5933   9FD5  AD 4E 19                   LDA    DEFAULT+1
5934   9FD8  9D 23 0E                   STA    DUR1+1,X
5935   9FDB  20 50 B0                   JSR    NXTVALVE
5936   9FDE  90 02                      BCC    B1E
5937   9FE0  80 0F                      BRA    B1END           ;next valve if any
5938
5939   9FE2  AD D1 19   B1D:    LDA    REVIEW          ;if new,
5940   9FE5  C9 00                      cmp    #new
5941   9FE7  D0 05                      bne    B1Z
5942   9FE9  20 04 B2                   JSR    ISCOPY          ;copy to next valve?
5943   9FEC  B0 BC                      BCS    B1CONFIRM       ;yes
5944   9FEE  4C 20 9F   B1Z:    JMP    B1NEXT          ;no
5945
5946   9FF1  60         B1END:  RTS
5947
5948                   ;--------------------------------
5949
5950                          BLOCK2:                   ;enter split criteria
5951   9FF2  AD DA 19                   lda    block
5952   9FF5  D0 0D                      bne    BK2C
5953   9FF7  20 5B B7                   JSR    BKCLR           ;if new, show using site info...
5954   9FFA                             MESSAGE MSG214
5959   A001  20 47 B5                   JSR    MSGWAIT
5960
5961   A004  64 45      BK2C:   STZ    VALVE           ;entry of MAXON/MINOFF
5962   A006  20 50 B0   B2SKIP: JSR    NXTVALVE
5963   A009  90 0C                      BCC    B2NEXT
5964   A00B  4C 41 A1                   JMP    B2END
```

```
                              B2NEXT:
              AD DA 19                LDA    block
              D0 14                   BNE    B2E A6 45                   LDX    VALVE
              BD 29 0B                LDA    TERRAIN,X
              8D 4F 19                STA    DEFAULT+2       ;terrain
              BD 32 0B                LDA    SPRINKLER,X
              8D 50 19                STA    DEFAULT+3       ;sprinkler type
              20 62 B2                JSR    GETONOFF        ;get ON/OFF from tables
              4C AF A0                JMP    B2CONFIRM       ;show the split A6 45         B2E:      LDX    VALVE           ;modify or review input
              BD 0C 0E                LDA    MAXON,X
              8D 4D 19                STA    DEFAULT
              BD 15 0E                LDA    MINOFF,X
              8D 4E 19                STA    DEFAULT+1
              4C AF A0                JMP    B2CONFIRM B2ENTRY:                       ;enter new splits
      A058    20 5B B7        B2YES:  JSR    DKCLR           ;User entry of ON/OFF
      A05B    20 DA B1                JSR    DSTA
      A05E                            MESSAGE MSG23
      A045    64 60                   STZ    SUB
      A047    20 5F B0                JSR    SHOW_DUR
      A04A                            SET_CURSOR LINE2
      A04F                            MESSAGE MSG31
      A055                            SET_CURSOR LINE2+7
      A058    AD 4E 19                LDA    DEFAULT+1
      A05B    20 00 00                JSR    d3d
      A061                            SET_CURSOR LINE2
      A065    AD 4D 19                LDA    DEFAULT         ;select MAXON
      A069                            select 2,90,1
      A07A    90 09                   BCC    B2S
      A07C                            HELP   none
      A083    80 B3                   BRA    B2YES
      A085    8D 4D 19       B2S:     STA    DEFAULT B20:                           ;select MINOFF
      A088                            SET_CURSOR LINE2+7
      A08D    AD 4E 19                LDA    DEFAULT+1
      A090                            select 0,240,30
      A0A1    90 09                   BCC    B2R
      A0A3                            HELP   none
      A0AA    80 BC                   BRA    B2YES
      A0AC    8D 4E 19       B2R:     STA    DEFAULT+1

B2CONFIRM:                     ;show default and confirm
      A0AF    20 5B B7                JSR    DKCLR
      A0B2    AD 4D 19                LDA    DEFAULT
      A0B5    A6 45                   LDX    VALVE
      A0B7    9D 0C 0E                STA    MAXON,X
      A0BA    64 60                   STZ    SUB
      A0BC    20 FA B0                JSR    HOWMANY
      A0BF    20 DA B1                JSR    DSTA
      A0C2                            DISP   ':'
```

```
6073  A0C7                        SKIP    1
6078  A0C8    A5 69               LDA     QUOTIENT
6080  A0D2    20 00 00            jsr     d3d
6081  A0D5                        MESSAGE MSG25
6086  A0DC                        SET_CURSOR LINE2
6090  A0E1                        MESSAGE MSG31
6095  A0E8                        SET_CURSOR LINE2
6099
6100  A0ED    A5 69               lda     QUOTIENT        ;show base dur if <maxon
6101  A0EF    C9 02               cmp     #2
6102  A0F1                        bge     ?1
6103  A0F3    A6 45               ldx     VALVE
6105  A0F5                        DELX
6113  A0FA    BD 22 0E            lda     DUR1,x
6114  A0FD    80 03               bra     ?2
6115  A0FF    AD 4D 19    ?1:     LDA     DEFAULT         ;else show maxon
6116  A102    20 00 00    ?2:     jsr     d2d
6117
6119  A105                        SET_CURSOR LINE2+7
6122  A10A    AD 4E 19            LDA     DEFAULT+1
6123  A10D    20 00 00            jsr     d3d
6124  A110                        SET_CURSOR LINE2+15
6128  A115            B2B:        EH
6132  A11A    20 48 B7    B2C:    JSR     GETKEY
6133  A11D    F0 FB               beq     B2C
6134  A11F    C9 01               cmp     #okkey
6135  A121    F0 0D               BEQ     B2OK
6136  A123    C9 02               cmp     #helpkey
6137  A125    D0 06               BNE     ?ng
6138  A127    20 54 B2            JSR     CONFIRM_HELP
6139  A12A    4C AF A0            JMP     B2CONFIRM
6140  A12D    4C 38 A0    ?ng:    JMP     B2ENTRY
6141
6142  A130    A6 45       B2OK:   LDX     VALVE           ;default is confirmed
6143  A132    AD 4D 19            LDA     DEFAULT
6144  A135    9D 0C 0E            STA     MAXON,X
6145  A138    AD 4E 19            LDA     DEFAULT+1
6146  A13B    9D 15 0E            STA     MINOFF,X
6147  A13E    4C 06 A0            JMP     B2SKIP
6148
6149  A141    60          B2END:  RTS
6150
6151                              ;--------------------------------
6152
6153                        BLOCK3:                       ;enter base cycles
6154                                                      ;IBFR+9 = 0 for all same, 1 for ISC
6155                                                      ;(only if new, modify doesn't know)
6156  A142    64 60               STZ     SUB
6157  A144    64 45               STZ     VALVE
6158  A146    64 68               STZ     R6              ;1st station flag
6159  A148    20 50 B0    B3SKIP: JSR     NXTVALVE
6160  A14B    90 03               BCC     B3NEXT
6161  A14D    4C B4 A2            JMP     B3END
6162  A150    A6 45       B3NEXT: LDX     VALVE           ;skip valves with 0 duration
6163  A152                        DELX
6170  A157    FD 22 0E            LDA     DUR1,Y
6171  A15A    1D 2D 0E            ORA     DUR1+1,Y
```

```
6172  A15D  F0 E9                BEQ    B3SKIP
6173  A15F  AD D1 19              LDA    REVIEW
6174  A162  C9 00                 cmp    #rnew
6175  A164  D0 31                 BNE    B3E
6176
6177  A166  A5 6B                 LDA    R6            ;new input
6178  A168  D0 06                 BNE    B3AA          ;if not 1st valve,
6179  A16A                        set    R6
6183  A16E  80 10                 BRA    B3BB
6184  A170  AD 64 02     B3AA:    lda    IBFR+9        ;copy if all same
6185  A173  F0 08                 beq    ?1
6186  A175  20 04 B2              JSR    ISCOPY        ;else see if want to copy
6187  A178  90 06                 BCC    B3BB
6188  A17A  4C 4B A2              JMP    B3CONFIRM
6189  A17D  4C 9E A2     ?1:      JMP    B3OK
6190
6191  A180  AD 0B 0E     B3BB:    LDA    CYCLE_TYPE    ;new, use defaults
6192  A183  C9 02                 cmp    #2
6193  A185                        BLT    B3FF
6196  A187  A9 02                 LDA    #2            ;if ration, every 2nd day
6197  A189  80 02                 BRA    B3GG
6198  A18B  A9 01        B3FF:    LDA    #1            ;else every 1st day or week
6199  A18D  8D 4D 19     B3GG:    STA    DEFAULT
6200  A190  A9 7F                 LDA    #01111111B    ;specific days default
6201  A192  8D 4E 19              STA    DEFAULT+1
6202  A195  80 16                 BRA    B3ENTRY
6203
6204                    B3E:                           ;modify
6205  A197  A6 45                 LDX    VALVE         ;use existing values
6206  A199                        DELX
6213  A19E  BD 34 0E              LDA    CYCLE1,X
6214  A1A1  8D 4D 19              STA    DEFAULT
6215  A1A4  BD 35 0E              LDA    CYCLE1+1,X
6216  A1A7  8D 4E 19              STA    DEFAULT+1
6217  A1AA  4C 4B A2              JMP    B3CONFIRM
6218
6219                    B3ENTRY:                       ;enter new cycle
6220  A1AD  AD 0B 0E              LDA    CYCLE_TYPE
6221  A1B0  C9 01                 CMP    #1
6222  A1B2  F0 52                 BEQ    B3T
6223  A1B4  20 5B B7              JSR    DKCLR         ;enter so many days
6224  A1B7  AD D1 19              lda    REVIEW        ;show ALL if new and all same
6225  A1BA  C9 00                 cmp    #rnew
6226  A1BC  D0 0E                 bne    ?1
6227  A1BE  AD 64 02              lda    IBFR+9
6228  A1C1  D0 09                 bne    ?1
6229  A1C3                        MESSAGE MSG47
6234  A1CA  80 03                 bra    ?2
6235  A1CC  20 DA B1     ?1:      JSR    DSTA
6238  A1CF                 ?2:    MESSAGE MSG28
6241  A1D5  20 5F B0              JSR    SHOW_DUR
6242  A1D9                        MOV16  DEFAULT,IBFR
6248  A1E5  AD 0B 0E              lda    CYCLE_TYPE    ;if ration, enter by twos
6249  A1E8  F0 05                 beq    ?3
6250  A1EA  20 14 B3              jsr    ENTER_RATION
6251  A1ED  80 03                 bra    ?4
6252  A1EF  20 3E B3     ?3:      JSR    ENTER_SO_MANY ;else enter 1-9..
```

```
6253  A1F2  90 09        ?4:       BCC      B3U
6254
6255  A1F4               B3DD:     HELP     none            ;help requested
6260  A1FB  80 B0                  BRA      B3ENTRY
6261  A1FD  AD 5B 02     B3U:      LDA      IBFR            ;input completed
6262  A200  8D 4D 19               STA      DEFAULT
6263  A203  4C 4B A2               JMP      B3CONFIRM
6264
6265                     B3T:                               ;enter specific days
6266  A206  20 5B B7               JSR      DKCLR
6267  A209  AD D1 19               lda      REVIEW
6268  A20C  C9 00                  cmp      #rnev
6269  A20E  D0 0E                  bne      ?1
6270  A210  AD 64 02               lda      IBFR+9
6271  A213  D0 09                  bne      ?1
6272  A215                         MESSAGE  MSG47
6277  A21C  80 03                  bra      ?2
6278  A21E  20 DA B1     ?1:       JSR      DSTA
6279  A221               ?2:       MESSAGE  MSG29
6284  A228                         DISP     ':'
6288  A22D  20 5E B3               JSR      ENTER_SPECIFIC
6289  A230  90 0A                  BCC      B3Z
6290  A232                         HELP     none
6295  A239  4C AD A1               JMP      B3ENTRY
6296  A23C               B3Z:      MOV16    IBFR,DEFAULT
6302  A248  4C 4B A2               JMP      B3CONFIRM
6303
6304                     B3CONFIRM:                         ;show default and confirm
6305  A24B  20 5B B7               JSR      DKCLR           ;show duration
6306  A24E  AD D1 19               lda      REVIEW
6307  A251  C9 00                  cmp      #rnev
6308  A253  D0 0E                  bne      ?1
6309  A255  AD 64 02               lda      IBFR+9
6310  A258  D0 09                  bne      ?1
6311  A25A                         MESSAGE  MSG47
6316  A261  80 03                  bra      ?2
6317  A263  20 DA B1     ?1:       JSR      DSTA
6318  A266               ?2:       MESSAGE  MSG2B
6323  A26D  20 5F B0               JSR      SHOW_DUR
6324  A270                         SET_CURSOR LINE2
6328  A275                         MOV16    DEFAULT,IBFR
6334  A281  20 6E B5               JSR      DISPCYCLE
6335  A284               B3S:      ON
6339  A289  20 4B B7     B3C:      JSR      GETKEY
6340  A28C  F0 FB                  beq      B3C
6341  A28E  C9 01                  cmp      #okkey
6342  A290  F0 0C                  beq      B3OK
6343  A292  C9 02                  cmp      #helpkey
6344  A294  F0 03                  beq      ?help
6345  A296  4C AD A1               jmp      B3ENTRY
6346  A299  20 54 B2     ?help:    JSR      CONFIRM_HELP
6347  A29C  80 AD                  BRA      B3CONFIRM
6348
6349  A29E  A6 45        B3OK:     LDX      VALVE           ;default is confirmed
6350  A2A0                         DEX
6357  A2A5  AD 4D 19               LDA      DEFAULT
6358  A2A8  9D 3A 0E               STA      CYCLES,X
```

```
6359  A2AB  AD 4E 19              LDA   DEFAULT+1
6360  A2AE  9D 35 0E              STA   CYCLE1+1,X
6361  A2B1  4C 48 A1              JMP   B3SKIP
6362
6363  A2B4  60            B3END:  RTS
6364
6365                              ;--------------------------------
6366
6367                      BLOCK4:                    ;enter excluded time
6368  A2B5  64 68                 STZ   R6
6369  A2B7  80 04                 BRA   BK4
6370                      BLOCK8:                    ;enter syringe period
6371  A2B9                        set   R6
6375
6376  A2BD  AD DA 19      BK4:    lda   block
6377  A2C0  D0 0E                 bne   B4E
6378  A2C2  9C 4D 19              STZ   DEFAULT    ;new input
6379  A2C5  9C 4E 19              STZ   DEFAULT+1
6380  A2C8  9C 4F 19              STZ   DEFAULT+2
6381  A2CB  9C 50 19              STZ   DEFAULT+3
6382  A2CE  80 3A                 BRA   B4ENTRY
6383                      B4E:                       ;modify or review input
6384  A2D0  A5 68                 LDA   R6
6385  A2D2  F0 1E                 BEQ   BK4A
6386  A2D4                        MOV16 SYRINGE_START,DEFAULT
6392  A2E0                        MOV16 SYRINGE_END,DEFAULT+2
6393  A2EC  4C AE A3              JMP   B4CONFIRM
6399  A2EF                BK4A:   MOV16 XFROM,DEFAULT
6405  A2FB                        MOV16 XTO,DEFAULT+2
6411  A307  4C AE A3              JMP   B4CONFIRM
6412
6413                      B4ENTRY:                   ;enter excluded time
6414  A30A  20 5B B7              JSR   DXCLR      ;enter FROM time
6415  A30D  A5 68                 LDA   R6
6416  A30F  F0 05                 BEQ   BK4C
6417  A311                        MESSAGE MSG306
6422  A318  80 07                 BRA   BK4D
6423  A31A                BK4C:   MESSAGE MSG45
6428  A321                BK4D:   SET_CURSOR LINE2
6432  A325                        MOV16 DEFAULT,OFFSET
6438  A330  20 00 B7              JSR   MIN2HX
6439  A333  20 61 B7              JSR   get_time
6440  A336  90 0A                 BCC   B4N
6441  A338                        HELP  none
6446  A33F  4C 0A A3              JMP   B4ENTRY
6447  A342  20 5E B6      B4N:    JSR   HM2MIN     ;save entered time
6448  A345                        MOV16 OFFSET,DEFAULT
6454  A34F                        SET_CURSOR LINE2+7
6459  A354                        DISP  '-'
6462                                                 ;enter TO time
6463  A359                        MOV16 DEFAULT,DEFAULT+2
6468  A365                        MOV16 DEFAULT+2,OFFSET
6475  A36F  20 00 B7              JSR   MIN2HX
6476  A372  20 61 B7              JSR   get_time
6477  A375  90 0A                 BCC   B4O
6478  A377                        HELP  none
6483  A37E  4C 0A A3              JMP   B4ENTRY
```

```
                  20 B3 B5    B4D:    JSR     HM2MIN          ;save entered time
                                      MOV16   OFFSET,DEFAULT+2
                  AD 4E 19            LDA     DEFAULT+1       ;if FROM>=UNTIL then error
                  CD 50 19            CMP     DEFAULT+3
                  F0 04               BEQ     B4P
                                      BLT     B4CONFIRM
                  ED 0A               BRA     B4Q
                  AD 4D 19    B4P:    LDA     DEFAULT
                  CD 4F 19            CMP     DEFAULT+2
                  F0 02               BEQ     B4Q
                                      BLT     B4CONFIRM
                              B4Q:    HELP    none
                  4C 0A A3            JMP     B4ENTRY B4CONFIRM:                      ;show default and confirm
                  20 5B B7            JSR     DKCLR
                  A5 68               LDA     R5
                  F0 09               BEQ     BK4E
                                      MESSAGE MSG206
                  80 07               BRA     BK4F
                              BK4E:   MESSAGE MSG48
                              BK4F:   SET_CURSOR LINE2
                  AD 4D 19            LDA     DEFAULT         ;no watering time if all 0
                  0D 4E 19            ORA     DEFAULT+1
                  0D 4F 19            ORA     DEFAULT+2
                  0D 50 19            ORA     DEFAULT+3
                  F0 27               BEQ     B4G
                                      MOV16   DEFAULT,OFFSET
                  20 00 B7            JSR     MIN2HM
                  20 B9 B1            JSR     DISPTIME
                                      DISP    '-'
                                      MOV16   DEFAULT+2,OFFSET
                  20 00 B7            JSR     MIN2HM
                  20 B9 B1            JSR     DISPTIME
                  80 07               BRA     B4F
                              B4G:    MESSAGE MSG162
                  20 5C B2    B4F:    JSR     CONFIRM_BLINK
                  20 4E B7    B4C:    JSR     GETKEY
                  F0 FB               beq     B4C
                  C9 01               cmp     #okkey
                  F0 0C               BEQ     B4OK
                  C9 02               cmp     #helpkey
                  D0 05               BNE     ?ng
                  20 54 B2            JSR     CONFIRM_HELP
                  80 93               BRA     B4CONFIRM
                  4C 0A A3    ?ng:    JMP     B4ENTRY B4OK:
                  A5 68               LDA     R5
                  F0 1A               BEQ     BK4G
                                      MOV16   DEFAULT,SYRINGE_START
                                      MOV16   DEFAULT+2,SYRINGE_END
                  80 18               BRA     B4END
                              BK4G:   MOV16   DEFAULT,XFROM
                                      MOV16   DEFAULT+2,XTO
                  60          B4END:  RTS
```

```
6601
6603
6604                          BLOCK5:                        ;enter start time
6605   A455  AD D1 19              LDA    REVIEW
6606   A458  C9 00                 cmp    #rnew
6607   A45A  D0 08                 BNE    B5E
6608   A45C  9C 4D 19              STZ    DEFAULT          ;new input
6609   A45F  9C 4E 19              STZ    DEFAULT+1
6610   A462  80 0E                 BRA    B5ENTRY
6611                          B5E:                          ;modify or review input
6612   A464                        MOV16  BASE_START,DEFAULT
6618   A470  80 33                 BRA    B5CONFIRM
6619
6620                          B5ENTRY:                      ;enter a new start time
6621   A472  20 5B B7              JSR    DKCLR
6622   A475                        MESSAGE MS635
6627   A47C                        MOV16  DEFAULT,OFFSET
6633   A485  20 00 B7              JSR    MIN2HM
6634   A489  20 B2 B7              JSR    get_time
6635   A48C  90 0A                 BCC    B5K
6636   A48E                        HELP   none
6641   A495  4C 72 A4              JMP    B5ENTRY
6642   A498  20 B6 B6       B5K:   JSR    HM2MIN           ;save entered time
6643   A49B                        MOV16  OFFSET,DEFAULT
6649
6650                          B5CONFIRM:                    ;show default and confirm
6651   A4A5  20 5B B7              JSR    DKCLR
6652   A4A8                        MESSAGE MS636
6657   A4AF                        MOV16  DEFAULT,OFFSET
6663   A4B9  20 00 B7              JSR    MIN2HM
6664   A4BC  20 B9 B1              JSR    DISPTIME
6665   A4BF                        ON
6669   A4C4  20 4B B7       B5C:   JSR    GETKEY
6670   A4C7  F0 FB                 beq    B5C
6671   A4C9  C9 01                 cmp    #okkey
6672   A4CB  F0 09                 beq    B5OK
6673   A4CD  C9 02                 cmp    #helpkey
6674   A4CF  D0 A1                 bne    B5ENTRY
6675   A4D1  20 54 92              JSR    CONFIRM_HELP
6676   A4D4  80 CF                 BRA    B5CONFIRM
6677
6678                          B5OK:                         ;default is confirmed
6679   A4D6                        MOV16  DEFAULT,BASE_START
6685
6686   A4E2  60             B5END: RTS
6687
6688                          ;-------------------------------
6689
6690                          BLOCK6:                       ;syringe active months
6691   A4E3  AD DA 19              lda    block
6692   A4E6  D0 0A                 bne    B6E
6693   A4E8  A2 0C                 LDX    #12              ;start with all off
6694   A4EA  9E 8C 0E       B6A:   STZ    ACTIVE_MONTH,X
6695   A4ED  CA                    DEX
6696   A4EE  D0 FA                 BNE    B6A
6697   A4F0  80 08                 BRA    B6ENTRY
6698   A4F2  C9 5F          B6E:   BRA    B6CONFIRM
```

```
6699
6700                          B6ENTRY:                    ;enter months
6701   A4F4                       set       IBFR+7
6705   A4F9   20 5B B7   B6V:     JSR       DKCLR
6706   A4FC                       MESSAGE   MSG187         ;show months selected so far
6711   A503                       SET_CURSOR 4
6715   A508   20 54 B1            JSR       SHOW_MONTHS
6718   A50B                       SET_CURSOR LINE2+9
6720   A510   AD 62 02            lda       IBFR+7
6721   A513   20 00 00            JSR       display_month
6722   A516                       OM
6725   A51B   20 4B B7   B6B:     JSR       GETKEY
6727   A51E   F0 FB               beq       B6B
6728   A520   C9 01               cmp       #okkey
6729   A522   F0 16               BEQ       B6G
6730   A524   C9 02               CMP       #helpkey
6731   A526   D0 0A               BNE       B6W
6732   A528                       HELP      none
6737   A52F   4C F4 A4            JMP       B6ENTRY
6738   A532   AE 62 02   B6W:     LDX       IBFR+7
6739   A535   9E 6C 0E            STZ       ACTIVE_MONTH,X
6740   A538   80 0B               BRA       B6J
6741   A53A   AE 62 02   B6G:     LDX       IBFR+7
6742   A53D   A9 01               LDA       #1
6743   A53F   9D 6C 0E            STA       ACTIVE_MONTH,X
6744   A542   EE 62 02   B6J:     INC       IBFR+7
6745   A545   AD 62 02            LDA       IBFR+7           ;do all 12 months
6746   A548   C9 0D               CMP       #13
6747   A54A   D0 AD               BNE       B6V
6748
6749   A54C                       B6CONFIRM:
6750   A54C   20 5B B7            JSR       DKCLR
6751   A54F                       MESSAGE   MSG190
6756   A556                       SET_CURSOR LINE2
6760   A55B   20 54 B1            JSR       SHOW_MONTHS
6761   A55E                       OM
6765   A563   20 4B B7   B6F:     JSR       GETKEY
6766   A566   F0 FB               beq       B6F
6767   A568   C9 01               cmp       #okkey
6768   A56A   F0 10               BEQ       B6OK
6769   A56C   C9 02               cmp       #helpkey
6770   A56E   D0 05               BNE       ?1
6771   A570   20 54 B2            JSR       CONFIRM_HELP
6772   A573   80 D7               BRA       B6CONFIRM
6773   A575   C9 03      ?1:      cmp       #upkey
6774   A577   D0 EA               bne       B6F
6775   A579   4C F4 A4   ?no:     jmp       B6ENTRY
6776
6777   A57C                       B6OK:
6778   A57C   60         B6END:   RTS
6779
6780                              ;--------------------------------
6781
6782                              BLOCK7:                   ;enter syringe durations
6783
6784   A57D   64 45               STZ       VALVE
6785   A57F   20 5A B0   B7SK19:  JSR       xxxxxx
```

```
6785  A582  90 03                    BCC     B7NEXT
6787  A584  4C 43 A6                 JMP     B7END
6788  A587  AD DA 19    B7NEXT: lda  block
6789  A58A  D0 07               bne  B7E
6790  A58C  A9 05               LDA  #5
6791  A58E  8D 4D 19            STA  DEFAULT     ;new input
6792  A591  80 0F               BRA  B7ENTRY
6793  A593  A6 45       B7E:    LDX  VALVE       ;modify or review input
6794  A595                      DEX
6801  A59A  BD 4B 0E            LDA  DUR2,X
6802  A59D  8D 4D 19            STA  DEFAULT
6803  A5A0  80 36               BRA  B7CONFIRM
6804
6805                    B7ENTRY:                 ;enter a new duration
6806  A5A2  20 5B B7            JSR  DKCLR
6807  A5A5  20 C3 B1            JSR  DSTA#
6808  A5A8              MESSAGE MSG191
6813  A5AF              SET_CURSOR LINE2+11
6817  A5B4  AD 4D 19            LDA  DEFAULT
6818  A5B7              select  0,15,1
6829  A5C8  B0 05               BCS  B7F
6830  A5CA  8D 4D 19            STA  DEFAULT
6831  A5CD  80 09               BRA  B7CONFIRM
6832  A5CF          B7F:    HELP none
6837  A5D6  80 CA               BRA  B7ENTRY
6838
6839                    B7CONFIRM:               ;show default and confirm
6840  A5D8  20 5B B7            JSR  DKCLR
6841  A5DB  AD 4D 19            LDA  DEFAULT
6842  A5DE  F0 1C               BEQ  B7A
6843  A5E0  20 C3 B1            JSR  DSTA#
6844  A5E3              MESSAGE MSG191
6849  A5EA              SET_CURSOR LINE2+11
6853  A5EF  AD 4D 19            LDA  DEFAULT
6854  A5F2  20 00 00            jsr  d2d
6855  A5F5              SET_CURSOR LINE2+15
6859  A5FA  80 0F               BRA  B7B
6860  A5FC          B7A:    MESSAGE MSG192       ;no watering
6865  A603              SET_CURSOR LINE2
6869  A608  20 E3 B1            JSR  DSTATION#
6870  A60B          B7B:    ON
6874  A610  20 45 B7    B7C:    JSR  GETKEY
6875  A613  F0 FB               beq  B7C
6876  A615  C9 01               cmp  #okkey
6877  A617  F0 09               BEQ  B7OK
6878  A619  C9 02               cmp  #helpkey
6879  A61B  D0 85               BNE  B7ENTRY
6880  A61D  20 54 B2            JSR  CONFIRM_HELP
6881  A620  80 B6               BRA  B7CONFIRM
6882
6883  A622  A6 45       B7OK:   LDX  VALVE       ;default is confirmed
6884  A624                      DEX
6891  A629  AD 4D 19            LDA  DEFAULT
6892  A62C  9D 4B 0E            STA  DUR2,X
6893  A62F  20 50 B0            JSR  NXTVALVE
6894  A632  90 02               BCC  B7D
6895  A634  80 03               BRA  B7END       ;next valve if any
```

```
6896   A636   AD DA 19      B7D:      lda      block          ;if new,
6897   A639   D0 05                   bne      B7Z
6898   A63B   20 04 B2                JSR      ISCOPY         ;copy to next valve?
6899   A63E   B0 98                   BCS      B7CONFIRM      ;yes
6900   A640   4C 87 A5      B7Z:      JMP      B7NEXT         ;no
6901
6902   A643   60            B7END:    RTS
6903
6904                                  ;--------------------------------
6905
6906                        BLOCK9:                           ;get how often to syringe
6907   A644   AD DA 19                lda      block
6908   A647   D0 08                   bne      B9E
6909   A649   A9 3C                   LDA      #60
6910   A64B   8D 7D 0E                STA      SOFTEN         ;new input
6911   A64E   9C 7E 0E                STZ      SOFTEN+1
6912   A651   4C 57 A6                JMP      B9ENTRY
6913                        B9E:                              ;review or modify
6914   A654   4C DC A6                JMP      B9CONFIRM
6915   A657         B9ENTRY:
6916   A657   20 5B B7                JSR      DXCLR
6917   A65A   64 45                   STZ      VALVE
6918   A65C                           MESSAGE  MSG139
6923   A663                           MOV16    SOFTEN,OFFSET
6929   A66D   20 00 B7                JSR      MIN2HM
6930   A670   20 58 B6                JSR      get_duration
6931   A673   90 09                   BCC      B9F
6932   A675                           HELP     none
6937   A67C   80 D9                   BRA      B9ENTRY
6938
6939   A67E   20 28 B6      B9F:      JSR      HM2MIN
6940   A681                           MOV16    OFFSET,SOFTEN
6946   A68B   64 40                   STZ      LSB            ;check input
6947   A68D   64 41                   STZ      MSB
6948   A68F                           set      VALVE
6952   A693   A6 45         B9G:      LDX      VALVE          ;if SOFTEN
6953   A695                           DBLX
6960   A69A   18                      CLC
6961   A69B   A5 40                   LDA      LSB
6962   A69D   7D 48 0E                ADC      DUR2,X
6963   A6A0   85 40                   STA      LSB
6964   A6A2   A5 41                   LDA      MSB
6965   A6A4   7D 49 0E                ADC      DUR2+1,X
6966   A6A7   85 41                   STA      MSB
6967   A6A9   E6 45                   INC      VALVE
6968   A6AB   A5 45                   LDA      VALVE
6969   A6AD   C9 09                   CMP      #9
6970   A6AF   D0 E2                   BNE      B9G
6971   A6B1   A5 40                   LDA      LSB
6972   A6B3   18                      CLC
6973   A6B4   69 08                   ADC      #8
6974   A6B6   85 40                   STA      LSB
6975   A6B8   A5 41                   LDA      MSB
6976   A6BA   69 00                   ADC      #0
6977   A6BC   85 41                   STA      MSB
6978   A6BE   AD 7E 0E                LDA      SOFTEN+1       ;: sum of syringe durations+8,
6979   A6C1   C5 41                   CMP      MSB
```

```
                                BLT     B9J
              F0 02              BEQ    B9I
              80 13              BRA    B9CONFIRM
              AD 7D 0E    B9I:   LDA    SOFTEN
              C9 40              CMP    LSB
                                 BLT    B9J
              80 0A              BRA    B9CONFIRM
                          B9J:   HELP   none            ;then error
              4C 57 A6           JMP    B9ENTRY B9CONFIRM:
              20 72 B1           JSR    SHOW_SYRCYC     ;confirm number of syringes
                                 GM
              20 4B B7    B9A:   JSR    GETKEY
              F0 FB              beq    B9A
              C9 01              cmp    #okkey
              F0 0C              BEQ    B9OK
              C9 02              cmp    #helpkey
              D0 05              BNE    ?no
              20 54 B2           JSR    CONFIRM_HELP
              80 E5              BRA    B9CONFIRM
              4C 57 A6    ?no:   JMP    B9ENTRY

B9OK:
              60          B9END: RTS

;------------------------------

BLOCK10:                      ;soak criteria
              64 45       BK10C: STZ    VALVE           ;entry of soak duration
              AD DA 19           lda    block
              D0 0D              bne    B10SKIP
              20 5B B7           JSR    DKCLR
                                 MESSAGE MSG228          ;use site info
              20 47 B5           JSR    MSGWAIT 20 50 B0    B10SKIP: JSR   NXTVALVE
              90 03              BCC    B10NEXT
              4C 64 A8           JMP    B10END
                          B10NEXT:
              AD DA 19           lda    block
              D0 14              bne    B10E            ;new input,
                          ISSITE:                       ;calculate with site info
              A6 45              LDX    VALVE
              BD 29 0E           LDA    TERRAIN,X
              8D 4F 19           STA    DEFAULT+2
              BD 22 0E           LDA    SPRINKLER,X
              8D 50 19           STA    DEFAULT+3
              20 8A B2           JSR    GETSOAKDUR
              4C 91 A7           JMP    B10CONFIRM A6 45       B10E:  LDX    VALVE           ;modify or review input
                                 DEX
              BD 7F 0E           LDA    DUR3,X
              8D 4D 19           STA    DEFAULT
              BD 80 0E           LDA    DUR3+1,X
              8D 4E 19           STA    DEFAULT+1
```

```
7058   A742  4C 91 A7              JMP      B10CONFIRM
7059
7060                     B10ENTRY:                         ;enter new soaks
7061   A745  20 5B B7    B10YES:   JSR      DKCLR
7062   A748  20 DA B1              JSR      DSTA
7063   A74B                        MESSAGE  MSG29
7068   A752  64 60                 STZ      SUB
7069   A754  20 5F B0              JSR      SHOW_DUR
7070   A757                        SET_CURSOR LINE2
7074   A75C                        MESSAGE  MSG183
7079   A763  A9 02                 LDA      #2
7080   A765  85 60                 STA      SUB
7081   A767                        MOV16    DEFAULT,OFFSET
7087   A771  20 00 B7              JSR      MIN2HM
7088   A774  20 5B B6              JSR      get_duration
7089   A777  B0 0F                 BCS      B10S
7090   A779  20 B8 B6              JSR      HM2MIN
7091   A77C                        MOV16    OFFSET,DEFAULT
7097   A785  80 0B                 BRA      B10CONFIRM
7098   A788            B10S:       HELP     none
7103   A78F  80 B4                 BRA      B10ENTRY
7104
7105                     B10CONFIRM:                       ;show default and confirm
7106   A791  AD 4D 19              LDA      DEFAULT
7107   A794  0D 4E 19              ORA      DEFAULT+1
7108   A797  D0 03                 bne      ?0
7109   A799  4C 21 A8              jmp      B10A
7110   A79C  20 5B B7   ?0:        JSR      DKCLR
7111   A79F  20 DA B1              JSR      DSTA
7112   A7A2                        MESSAGE  MSG186
7117   A7A9                        MOV16    DEFAULT,OFFSET
7123   A7B3  20 00 B7              JSR      MIN2HM
7124   A7B6  20 50 B5              JSR      DISPDURATION
7125   A7B9                        SET_CURSOR LINE2
7129   A7BE  A6 45                 LDX      VALVE
7130   A7C0  BD 0C 0E              LDA      MAXON,X
7131   A7C3  D0 03                 BNE      B10Z
7132   A7C5                        MESSAGE  MSG230           ;no splits
7137   A7CC  80 60                 BRA      B10B
7138   A7CE            B10Z:       MESSAGE  MSG184
7143   A7D5                        SET_CURSOR LINE2+5
7147   A7DA  A9 02                 LDA      #2
7148   A7DC  85 60                 STA      SUB
7149   A7DE  A6 45                 LDX      VALVE
7150   A7E0                        DBLX
7157   A7E5  AD 4D 19              LDA      DEFAULT
7158   A7E8  9D 7F 0E              STA      DUR3,X
7159   A7EB  AD 4E 19              LDA      DEFAULT+1
7160   A7EE  9D 80 0E              STA      DUR3+1,X
7161   A7F1  20 FA B0              JSR      HOWMANY
7162   A7F4  20 00 00              jsr      d2d
7163   A7F7                        SKIP     1
7169
7170   A800  A5 8F                 lda      QUOTIENT        ;show soak dur if <maxon
7171   A802  C9 02                 cmp      #2
7172   A804                        bge      ?1
7175   A806  A6 45                 ldx      VALVE
```

```
7178  A80B                          DBLX
7183  A80D  BD 7F 0E                lda     DUR3,X
7184  A810  80 05                   bra     ?2
7185  A812  A6 45           ?1:     ldx     VALVE           ;else show maxon
7186  A814  BD 0C 0E                lda     MAXON,X
7187  A817  20 00 00        ?2:     jsr     d2d
7188
7189  A81A                          SET_CURSOR LINE2+15
7193  A81F  80 0D                   BRA     B10B
7194  A821  20 5B B7        B10A:   JSR     DKCLR
7195  A824                          MESSAGE MSG195          ;no soak
7200  A828  20 E3 B1                JSR     DSTATION#
7201  A82E                  B10B:   DM
7205  A833  20 4B B7        B10C:   JSR     GETKEY
7206  A836  F0 FB                   beq     B10C
7207  A838  C9 01                   cmp     #okkey
7208  A83A  F0 0D                   BEQ     B10OK
7209  A83C  C9 02                   cmp     #helpkey
7210  A83E  D0 06                   BNE     ?ng
7211  A840  20 54 B2                JSR     CONFIRM_HELP
7212  A843  4C 91 A7                JMP     B10CONFIRM
7213  A846  4C 45 A7        ?ng:    JMP     B10ENTRY
7214
7215  A849  A6 45           B10OK:  LDX     VALVE           ;default is confirmed
7216  A84B                          DBLX
7223  A850  AD 4D 19                LDA     DEFAULT
7224  A853  9D 7F 0E                STA     DUR3,X
7225  A856  AD 4E 19                LDA     DEFAULT+1
7226  A859  9D 80 0E                STA     DUR3+1,X
7227  A85C  20 50 B0                JSR     NXTVALVE
7228  A85F  B0 03                   BCS     B10END
7229  A861  4C 16 A7        B10B:   JMP     B10NEXT         ;no
7230
7231  A864  60              B10END: RTS
7232
7233
7234                                ;--------------------------------
7235
7236                        BLOCK11:                        ;enter soak cycles
7237  A865  A9 02                   LDA     #2
7238  A867  85 60                   STA     SUB
7239  A869  64 45                   STZ     VALVE
7240  A86B  64 69                   STZ     R6              ;1st station flag
7241  A86D  20 50 B0        B11SKIP: JSR    NXTVALVE
7242  A870  90 03                   BCC     B11NEXT
7243  A872  4C CA A9                JMP     B11END
7244  A875  A6 45           B11NEXT: LDX    VALVE           ;skip valves with 0 duration
7245  A877                          DBLX
7252  A87C  BD 7F 0E                LDA     DUR3,X
7253  A87F  1D 80 0E                ORA     DUR3+1,X
7254  A882  F0 E9                   BEQ     B11SKIP
7255  A884  AD DA 19                lda     block
7256  A887  D0 1E                   bne     B11E
7257
7258  A889  A5 69                   LDA     R6              ;new input
7259  A88B  D0 06                   BNE     B11AA           ;if not 1st valve,
7260  A88D                          set     R6
```

```
7264  A881  80 05              BRA    B11BB
7265  A883  20 04 B2    B11AA: JSR    JSCOPY        ;see if want to copy
7266  A886  90 03              BCC    B11BB
7267  A888  4C 3D A9            JMP    B11CONFIRM
7268  A88B  A9 02       B11BB: LDA    #2            ;every 2 weeks
7269  A88D  8D 4D 19           STA    DEFAULT
7270  A8A0  A9 01              LDA    #1            ;specific days, MON
7271  A8A2  8D 4E 19           STA    DEFAULT+1
7272  A8A5  80 2C              BRA    B11ENTRY
7273
7274  A8A7  A6 45       B11E:  LDX    VALVE         ;modify or review input
7275  A8A9              DBLX
7282  A8AE  BD 91 0E           LDA    CYCLE2,X
7283  A8B1  8D 4D 19           STA    DEFAULT
7284  A8B4  AD 0B 0E           LDA    CYCLE_TYPE
7285  A8B7  C9 01              CMP    #1
7286  A8B9  F0 0C              BEQ    B11F
7287  A8BB  AD 4D 19           LDA    DEFAULT       ;so many days, convert #days to #weeks
7288  A8BE  20 39 B7           JSR    DAY2WEEK
7289  A8C1  8D 4D 19           STA    DEFAULT
7290  A8C4  4C 3D A9           JMP    B11CONFIRM
7291
7292  A8C7  BD 92 0E    B11F:  LDA    CYCLES+1,X    ;specific days, convert bit DOW to 1-7
7293  A8CA  20 26 B7           JSR    BIT2DOW
7294  A8CD  8D 4E 19           STA    DEFAULT+1
7295  A8D0  4C 3D A9           JMP    B11CONFIRM
7296
7297              B11ENTRY:                         ;enter new cycle
7298  A8D3  20 58 B7           JSR    DKCLR
7299  A8D6  20 DA B1           JSR    DSTA
7300  A8D9              MESSAGE MSG134
7305  A8E0              SET_CURSOR LINE2
7308  A8E5  AD 4D 19           LDA    DEFAULT
7310  A8E8              select 2,26,2
7321  A8F9  90 09              BCC    B11U
7322  A8FB              HELP   none
7327  A902  80 CF              BRA    B11ENTRY
7328  A904  8D 4D 19    B11U:  STA    DEFAULT
7329
7330  A907  AD 0B 0E           LDA    CYCLE_TYPE
7331  A90A  C9 01              CMP    #1
7332  A90C  F0 03              BEQ    B11T
7333  A90E  4C 3D A9           JMP    B11CONFIRM
7334  A911         B11T: SET_CURSOR LINE2+9         ;enter specific day
7338  A916              DISP   'o'
7342  A91B              DISP   'n'
7346  A920              SKIP   1
7352  A929  AD 4E 19           LDA    DEFAULT+1
7353  A92C  20 00 00           jsr    get_dow
7354  A92F  90 09              BCC    B11V
7355  A931              HELP   none
7360  A938  80 99              BRA    B11ENTRY
7361  A93A  8D 4E 19    B11V:  STA    DEFAULT+1
7362
7363              B11CONFIRM:                       ;show default and confirm
7364  A93D  20 58 B7           JSR    DKCLR         ;show duration
7365  A940  20 DA B1           JSR    DSTA
```

```
7365  A943                        MESSAGE    MSG134
7371  A94A                        SET_CURSOR LINE2
7375  A94F  AD 4D 19              LDA        DEFAULT
7376  A952  20 00 00              jsr        d2d
7377  A955                        SET_CURSOR LINE2+9
7381  A95A  AD 0B 0E              LDA        CYCLE_TYPE
7382  A95D  C9 01                 CMP        #1
7383  A95F  D0 1C                 BNE        B11B
7384  A961                        DISP       'o'
7388  A966                        DISP       'n'
7392  A96B                        SKIP       1
7398  A974  AD 4E 19              LDA        DEFAULT+1
7399  A977  8D 61 02              STA        IBFR+6
7400  A97A  20 00 00              jsr        display_dow
7401  A97D                B11B:   GM
7405  A982  20 4B B7      B11C:   JSR        GETKEY
7406  A985  F0 FB                 beq        B11C
7407  A987  C9 01                 cmp        #okkey
7408  A989  F0 0C                 BEQ        B11OK
7409  A98B  C9 02                 cmp        #helpkey
7410  A98D  D0 05                 bne        ?ng
7411  A98F  20 54 B2              JSR        CONFIRM_HELP
7412  A992  80 A9                 BRA        B11CONFIRM
7413  A994  4C D3 A9      ?ng:    JMP        B11ENTRY
7414
7415                      B11OK:                         ;default is confirmed
7416  A997  AD 0B 0E              LDA        CYCLE_TYPE
7417  A99A  C9 01                 CMP        #1
7418  A99C  D0 19                 BNE        B11Q
7419  A99E  AD 4E 19              LDA        DEFAULT+1
7420  A9A1  20 32 B7              JSR        DOW2BIT
7421  A9A4  A6 45                 LDX        VALVE
7422  A9A6                        DEX
7429  A9AB  9D 92 0E              STA        CYCLES+1,X
7430  A9AE  AD 4D 19              LDA        DEFAULT
7431  A9B1  9D 91 0E              STA        CYCLES,X
7432  A9B4  4C 6D A9              JMP        B11SKIP
7433  A9B7  AD 4D 19      B11Q:   LDA        DEFAULT      ;so many days
7434  A9BA  20 44 B7              JSR        WEEK2DAY
7435  A9BD  A6 45                 LDX        VALVE
7436  A9BF                        DEX
7443  A9C4  9D 91 0E              STA        CYCLES,X
7444  A9C7  4C 6D A9              JMP        B11SKIP
7445
7446  A9CA  60            B11END: RTS
7447
7448
7449                              ;-------------------------------
7450                              ;   factory schedule
7451                              ;-------------------------------
7452
7453                      SET_FACTORY:                    ;see or change factory program
7454  A9CB                        MOV16      FACTORY,DEFAULT  ;start time
7460  A9D7  AD 15 0B              LDA        FACTORY+2
7461  A9DA  8D 4F 19              STA        DEFAULT+2    ;duration
7462  A9DD  20 5B B7      VMF5:   JSR        DKCLR        ;confirm program
7463  A9E0                        MESSAGE    MSG101
```

```
                              SET_CURSOR 8
                              MOV16   DEFAULT,OFFSET
               20 00 B7       JSR     MIN2HM
               20 B9 B1       JSR     DISPTIME
                              SET_CURSOR LINE2
               AD 4F 19       LDA     DEFAULT+2
               20 00 00       jsr     d2d
                              SET_CURSOR LINE2+15
                              QM
               20 4B B7  ?0:  JSR     GETKEY
               F0 FB          beq     ?0
               C9 01          cmp     #okkey
               F0 0D          beq     ?ok
               C9 02          cmp     #helpkey
               D0 21          BNE     VMF2
                              HELP    none
               80 BE          BRA     VMF5

?ok: MOV16   DEFAULT,FACTORY  ;save input
               AD 4F 19       LDA     DEFAULT+2
               8D 15 0B       STA     FACTORY+2
               20 59 B4       jsr     S20
               4C 2C 9C       JMP     save_program VMF2:
               20 59 B7       JSR     DXCLR            ;enter new program
                              MESSAGE MSS101
                              SET_CURSOR LINE2
               AD 4F 19       LDA     DEFAULT+2
               20 00 00       jsr     d2d
                              SET_CURSOR 8
                              MOV16   DEFAULT,OFFSET
               20 00 B7       JSR     MIN2HM
               20 62 B7       jsr     get_time
               90 09          BCC     ?3
                              HELP    none
               80 CB          bra     VMF2
               20 56 E5  ?3:  JSR     HM2MIN           ;save entered time
                              MOV16   OFFSET,DEFAULT
                              SET_CURSOR LINE2
               AD 4F 19       lda     DEFAULT+2
                              select  1,60,1
               90 09          bcc     ?4
                              HELP    none
               80 9A          bra     VMF2
                         ?4:
               8D 4F 19       STA     DEFAULT+2
               4C DD A9       JMP     VMF5

INCLUDE  RUN.ASM

;---------------------------------
```

```
7592                          ;    RUN SCHEDULE
7593                          ;----------------------------------
7594
7595  AAA8                    RUN_SCHEDULE:
7596
7597  AAA8  20 37 AF                   jsr     SET_TIME
7598
7599                          ;----------------------------------
7600                          ;    select type of run
7601                          ;----------------------------------
7602
7603                          run_type:                          ;select auto or semi-auto
7604  AAAE  AD 81 0B                   lda     SEMIAUTO
7605  AAB1  8D DF 19                   sta     runram             ;init buffer area
7606  AAB4  AD 82 0B                   lda     SEMI_TEST
7607  AAB7  8D E0 19                   sta     runram+1
7608  AABA  AD 83 0B                   lda     RAIN_DELAY
7609  AABD  8D E1 19                   sta     runram+2
7610  AAC0  AD 84 0B                   lda     BUDGET_TYPE
7611  AAC3  8D E2 19                   sta     runram+3
7612  AAC6  64 48                      stz     sub_mode
7613
7614  AAC8  20 55 B7          ?2:      JSR     DKCLR
7615  AACB                             MESSAGE MSG252
7620  AAD2                             SET_CURSOR LINE2
7624  AAD7  A5 48                      LDA     sub_mode
7625  AAD9                             local_option schopt
7631  AAE1  85 48                      sta     sub_mode
7632  AAE3  90 0D                      bcc     ?1
7633  AAE5  0A                         asl     a                 ;context sensitive help
7634  AAE6  AA                         tax
7635  AAE7  BC 07 AB                   ldy     ?htable,x
7636  AAEA  BD 08 AB                   lda     ?htable+1,x
7637  AAED  20 E1 B7                   jsr     help_bank1
7638  AAF0  80 D6                      bra     ?2
7639  AAF2             ?1:
7640  AAF2  0A                         asl     a                 ;then go there
7641  AAF3  AA                         tax
7642  AAF4  BD 01 AB                   lda     ?tbl,x
7643  AAF7  85 4E                      sta     srcptr
7644  AAF9  BD 02 AB                   lda     ?tbl+1,x
7645  AAFC  85 4F                      sta     srcptr+1
7646  AAFE  6C 4E 00                   jmp     (srcptr)
7647
7648  AB01                    ?tbl:
7649  AB01  0DAB                       WORD    auto_run
7650  AB03  CAAB                       WORD    semi_auto_run
7651  AB05  C787                       WORD    next_main
7652
7653  AB07                    ?htable:
7654  AB07  0000                       word    AutoRunHELP
7655  AB09  0000                       word    SemiAutoHELP
7656  AB0B  0000                       word    ExitRunHELP
7657
7658                          ;----------------------------------
7659                          ;    auto run
7660                          ;----------------------------------
```

```
7681
7682    AB0D                        auto_run:
7683    AB0D    9C DF 19                    stz       runram
7684    AB10    20 5B B7                    JSR       DKCLR           ;want options?
7685    AB13                                MESSAGE   MSG280
7670    AB1A                                SET_CURSOR 0
7674    AB1F    A9 00                       LDA       #0
7675    AB21                                local_option opt5
7681    AB29    90 09                       bcc       ?1
7682    AB2B                                HELP      none
7687    AB32    80 D9                       BRA       auto_run
7688    AB34    8D 5B 02        ?1:         STA       IBFR
7689    AB37    D0 17                       bne       option_type     ;yes, get them
7690
7691                                                                  ;options skipped, initialize
7692    AB39    20 07 83                    jsr       FIRSTDAY        ;day 1
7693    AB3C    A9 64                       LDA       #100            ;no budgeting (100%)
7694    AB3E    8D 95 05                    STA       YEAR_BUDGET
7695    AB41    8D 93 05                    sta       FINETUNE
7696    AB44    9C E2 19                    STZ       runram+3
7697    AB47    9C E1 19                    STZ       runram+2        ;no rain delay
7698    AB4A    20 E4 B3                    jsr       all_enable      ;no disabled stations
7699    AB4D    4C 45 AC                    jmp       ready_run
7700
7701    AB50                        option_type:
7702    AB50    20 5B B7                    JSR       DKCLR
7703    AB53                                MESSAGE   MSG281
7708    AB5A                                SET_CURSOR LINE2
7712    AB5F                                MESSAGE   MSG284
7717    AB66                                SET_CURSOR LINE2
7721    AB6B    A9 00                       lda       #0
7722    AB6D                                local_option resopt
7728    AB75    90 09                       bcc       ?1
7729    AB77                                HELP      none
7734    AB7E    80 D0                       bra       option_type
7735    AB80    85 49           ?1:         sta       iptr
7736    AB82    F0 03                       beq       more_options    ;if resume, keep existing daynums
7737    AB84    20 07 83                    jsr       FIRSTDAY        ;else start over
7738
7739                                more_options:                     ;enter budgets, rain delay, disables
7740    AB87    64 49                       stz       iptr
7741    AB89    20 5B B7        mo1:        JSR       DKCLR
7742    AB8C                                MESSAGE   MSG281
7747    AB93                                SET_CURSOR LINE2
7751    AB98    A5 49                       LDA       iptr
7752    AB9A                                local_option runopt
7758    ABA2    90 05                       bcc       ?1
7759    ABA4                                HELP      none
7764    ABAB    80 DC                       BRA       mo1
7765    ABAD    85 49           ?1:         STA       iptr            ;store selection
7766    ABAF    0A                          asl       a               ;then go there
7767    ABB0    AA                          tax
7768    ABB1    BD BE AB                    lda       ?tbl,x
7769    ABB4    85 4E                       sta       srcptr
7770    ABB6    BD BF AB                    lda       ?tbl+1,x
7771    ABB9    85 4F                       sta       srcptr+1
7772    ABBB    6C 4F                       jmp       (srcptr)
```

```
7773
7774  ABEE                    ?tbl:
7775  ABEE  B3AC                      WORD    get_budgets
7776  ABD0  2BAE                      WORD    get_rain
7777  ABC2  5BAE                      WORD    get_disables
7778  ABD4  45AC                      WORD    ready_run
7779
7780  ABD6                    next_run_option:
7781  ABD6  E6 49                     inc     iptr
7782  ABD8  80 BF                     bra     ao1
7783
7784                          ;----------------------------
7785                          ;     semi_auto
7786                          ;----------------------------
7787
7788  ABDA                    semi_auto_run:
7789                                                          ;select which duration to use
7790  ABDA  20 5B B7                  JSR     DKCLR
7791  ABDD                            MESSAGE MSG275
7796  ABD4                            SET_CURSOR LINE2
7800  ABD9                            MESSAGE MSG279
7805  ABE0                            SET_CURSOR LINE2
7809  ABE5  A9 00                     LDA     #0
7810  ABE7                            local_option semiopt
7816  ABEF  90 09                     bcc     ?1
7817  ABF1                            HELP    none
7822  ABF8  80 D0                     BRA     semi_auto_run
7823  ABFA  8D 5B 02        ?1:       STA     IBFR            ;store selection
7824  ABFD  D0 04                     bne     ?a
7825  ABFF  A9 80                     lda     #10000000b      ;normal
7826  AC01  80 06                     bra     ?3
7827  AC03  C9 02           ?a:       cmp     #2
7828  AC05  F0 07                     beq     ?test
7829  AC07  A9 20                     lda     #00100000b      ;soak
7830  AC09  8D DF 19        ?3:       sta     runram
7831  AC0C  80 37                     bra     ready_run
7832
7833  AC0E  A9 40           ?test:    lda     #01000000b      ;test
7834  AC10  8D DF 19                  sta     runram
7835  AC13  20 5B B7                  JSR     DKCLR           ;enter test duration
7836  AC16                            MESSAGE MSG117
7841  AC1D                            SET_CURSOR LINE2
7845  AC22  A9 02                     LDA     #2              ;get duration, default=2
7846  AC24                            select  1,30,1
7857  AC35  90 09                     BCC     ?2
7858  AC37                            HELP    none            ;no help yet
7863  AC3E  80 CE                     bra     ?test
7864  AC40  8D E0 19        ?2:       sta     runram+1
7865  AC43  80 00                     bra     ready_run
7866
7867
7868                          ;----------------------------
7869                          ;     ready to run
7870                          ;----------------------------
7871
7872  AC45                    ready_run:
7873  AC45  20 5B B7                  JSR     DKCLR           ;see if user is ready
```

```
874   AC4B                              MESSAGE   MSG292
879   AC4F                              SET_CURSOR 0
883   AC51   A9 00                      LDA       #0
884   AC56                              local_option opt10
890   AC5E   90 09                      bcc       ?1
891   AC60                              HELP      none
896   AC67   80 DC                      BRA       ready_run
897   AC69   8D 58 02      ?1:          STA       IBFR
898   AC6C   F0 03                      beq       do_run_run   ;ready
899   AC6E   4C C7 87                   jmp       next_main    ;no, abort
7900
7901  AC71                 do_run_run:
7902  AC71   AD DF 19                   lda       runram       ;save user entered run params
7903  AC74   8D 81 0B                   sta       SEMIAUTO
7904  AC77   AD E0 19                   lda       runram+1
7905  AC7A   8D 82 0B                   sta       SEMI_TEST
7906  AC7D   AD E1 19                   lda       runram+2
7907  AC80   8D 83 0B                   sta       RAIN_DELAY
7908  AC83   AD E2 19                   lda       runram+3
7909  AC86   8D 84 0B                   sta       BUDGET_TYPE
7910  AC89
7911  AC89   A9 01                      lda       #1           ;make new schedule
7912  AC8B   8D DE 19                   sta       exec_command
7913  AC8E   20 D5 83                   jsr       executive
7914  AC91   A9 03                      lda       #3           ;start running it
7915  AC93   8D DE 19                   sta       exec_command
7916  AC96   20 D5 83                   jsr       executive
7917  AC99   A9 24                      lda       #$24         ;tell history
7918  AC9B   20 76 87                   jsr       log_history
7919  AC9E   A5 4B                      lda       FLAGS        ;tell no_batt this is legal exit
7920  ACA0   09 08                      ora       #00001000b
7921  ACA2   85 4B                      sta       FLAGS
7922  ACA4   20 5B B7      ?4:          JSR       DKCLR        ;give pwrkey out msg
7923  ACA7                              MESSAGE   MSG116
7928  ACAE   20 4B B7      ?5:          JSR       GETKEY       ;wait for pwrkey out
7929  ACB1   80 FB                      bra       ?5           ;keep doing maintenance
7930
7931
7932                                    ;----------------------------------------
7933
7934  ACB3                 get_budgets:
7935  ACB3   20 5B B7                   JSR       DKCLR        ;use monthly or yearly budget?
7936  ACB6                              MESSAGE   MSG246
7941  ACBD                              SET_CURSOR LINE2
7945  ACC2   A9 00                      LDA       #0
7946  ACC4                              local_option budopt
7952  ACCC   90 09                      BCC       ?6
7953  ACCE                              HELP      none
7958  ACD5   80 DC                      bra       get_budgets
7959  ACD7   F0 02         ?6:          beq       use_monthly
7960  ACD9   80 11                      bra       use_yearly
7961
7962                       use_monthly:              ;use monthly budget
7963  ACDB   AE 04 02                   LDX       month
7964  ACDE   BD 86 0B                   LDA       MO_BUDGET,X
7965  ACE1   8D 4D 19                   STA       DEFAULT
7966  ACE4                              set       runram+3
```

```
                            jmp     EGLCONFIRM
            use_yearly:                             ;use a global budget
            A9 64           LDA     #100
            8D 4D 19        STA     DEFAULT
            9C E2 19        STZ     runram+3 yconfirm:
            20 5B B7        jsr     DKCLR
                            MESSAGE MSG241
                            SET_CURSOR LINE2+5
            AD 93 0B        lda     FINETUNE
            20 00 00        jsr     d3d
            A9 25           lda     #'%'
            20 00 00        jsr     dchar
                            ON
            20 4B B7  ?0:   jsr     GETKEY
            F0 FB           beq     ?0
            C9 01           cmp     #okkey
            F0 0D           beq     ?ok
            C9 02           cmp     #helpkey
            D0 0C           bne     yentry
                            HELP    none
            80 CB           bra     yconfirm
            4C C6 AB  ?ok:  jmp     next_run_option yentry:
            20 5B B7        jsr     DKCLR
                            MESSAGE MSG241
                            SET_CURSOR LINE2+8
            A9 25           lda     #'%'
            20 00 00        jsr     dchar
                            SET_CURSOR LINE2+5
            AD 93 0B        lda     FINETUNE
                            select  10,200,10
            90 09           bcc     ?0
                            HELP    none
            80 C8           bra     yentry
            8D 93 0B  ?0:   sta     FINETUNE
            80 8B           bra     yconfirm EGLCONFIRM:                             ;confirm entry
            20 EA AD        jsr     EGLSCREEN
                            SET_CURSOR LINE2+15
                            ON
            20 4B B7  ?11:  JSR     GETKEY
            F0 FB           beq     ?11
            C9 01           CMP     #okkey
            F0 0D           BEQ     EGLOK
            C9 02           CMP     #helpkey
            D0 0C           BNE     EGLENTRY
                            HELP    none
            80 DD           BRA     EGLCONFIRM EGLOK:
            4C C6 AB        jmp     next_run_option
```

```
075                    EGLENTRY:                        ;enter a new fine tuning #
075   AD8F  20 EA AD              jsr      EGLSCREEN
077   AD92                        SET_CURSOR 8
081   AD97  A9 03                 lda      #3
082   AD99  AE 18 02               ldx      char_index
083   AD9C  20 00 00               jsr      blinkem
084   AD9F  20 4B B7    ?21:      JSR      GETKEY
085   ADA2  F0 FB                  beq      ?21
086   ADA4  C9 01                  CMP      #okkey
087   ADA6  D0 03                  BNE      ?22
088   ADA8  4C 69 AD               JMP      EGLCONFIRM
089   ADAB  C9 02       ?22:      CMP      #helpkey
090   ADAD  D0 09                  BNE      ?23
091   ADAF                        HELP     none
095   ADB6  80 D7                  bra      EGLENTRY
097   ADB8  C9 03       ?23:      cmp      #upkey
098   ADBA  D0 16                  bne      ?24
099   ADBC  AD 93 0B               lda      FINETUNE
100   ADBF  18                     clc
101   ADC0  69 0A                  adc      #10
102   ADC2  8D 93 0B               sta      FINETUNE
103   ADC5  C9 C8                  cmp      #200
104   ADC7                         blt      ?2a
107   ADC9  F0 05                  beq      ?2a
108   ADCB  A9 0A                  lda      #10
109   ADCD  8D 93 0B               sta      FINETUNE
110   ADD0  80 BD       ?2a:      bra      EGLENTRY
111   ADD2  C9 04       ?24:      cmp      #downkey
112   ADD4  D0 D5                  bne      ?22
113   ADD6  AD 93 0B               lda      FINETUNE
114   ADD9  38                     sec
115   ADDA  E9 0A                  sbc      #10
116   ADDC  8D 93 0B               sta      FINETUNE
117   ADDF  C9 0A                  cmp      #10
118   ADE1                         bge      ?2b
121   ADE3  A9 C8                  lda      #200
122   ADE5  8D 93 0B               sta      FINETUNE
123   ADE8  80 A5       ?2b:      bra      EGLENTRY
124
125
126                    EGLSCREEN:                       ;show the fine tuning screen
127   ADEA  20 5B B7               JSR      DKCLR
128   ADED                        MESSAGE  MSG242
133   ADF4                        SET_CURSOR 8
137   ADF9  AD 93 0B               lda      FINETUNE
138   ADFC  20 00 00               jsr      d3d
139   ADFF                        SET_CURSOR LINE2+7
143   AE04  AD 04 02               lda      month
144   AE07  20 00 00               jsr      display_month
145   AE0A                        SET_CURSOR LINE2+11
149   AE0F  -AD 93 0B              lda      FINETUNE
150   AE12  AC 4D 19               ldy      DEFAULT
151   AE15  20 00 00               jsr      R9_mult
152   AE18  A2 00                  ldx      #0              ;divisor
153   AE1A  DA                     phx
154   AE1B  A2 64                  ldx      #100
155   AE1D  DA                     phx
```

```
3156  AE1E  48                       pha                    ;dividend (result of mult)
3157  AE1F  5A                       phy
3158  AE20  20 00 00                 jsr     R9_div16
3159  AE23  98                       tya
3160  AE24  20 00 00                 jsr     d3d
3161  AE27  60                       rts
3162
3163
3164                         ;------------------------------------------------
3165
3166                         get_rain:                       ;select rain delay
3167  AE28  20 5B B7                 JSR     DKCLR
3168  AE2B                           MESSAGE MSG131
3173  AE32                           SET_CURSOR LINE2+4
3177  AE37  A9 01                    LDA     #1
3178  AE39                           select  0,90,1
3189  AE4A  90 09                    BCC     ?1
3190  AE4C                           HELP    none
3195  AE53  80 D3                    bra     get_rain
3196  AE55  8D E1 19         ?1:     STA     runram+2
3197  AE58  4C C6 AB                 jmp     next_run_option
3198
3199                         ;------------------------------------------------
3200
3201  AE5B                   get_disables:
3202  AE5B  A2 08                    LDX     #8              ;move current valve status to bfr
3203  AE5D  BD A1 0B         ?A:     LDA     ENABLES,X
3204  AE60  9D 4D 17                 STA     mmi_bfr,X
3205  AE63  CA                       DEX
3206  AE64  D0 F7                    BNE     ?A
3207  AE66  20 5B B7         ?0:     JSR     DKCLR           ;verify current status
3208  AE69  20 FC AE                 JSR     DISPEV
3209  AE6C                           SET_CURSOR LINE2
3213  AE71                           MESSAGE MSG128
3218  AE78                           BM
3222  AE7D  20 4B B7         ?4:     JSR     GETKEY
3223  AE80  F0 FB                    beq     ?4
3224  AE82  C9 01                    CMP     #okkey
3225  AE84  F0 0D                    beq     ?ok
3226  AE86  C9 02                    CMP     #helpkey
3227  AE88  D0 17                    BNE     ?ng
3228  AE8A                           HELP    none
3233  AE91  80 CB                    BRA     get_disables
3234
3235  AE93  A2 08            ?ok:    LDX     #8              ;ok, save mmi_bfr to enables
3236  AE95  BD 4D 17         ?B:     LDA     mmi_bfr,X
3237  AE98  9D A1 0B                 STA     ENABLES,X
3238  AE9B  CA                       DEX
3239  AE9C  D0 F7                    BNE     ?B
3240  AE9E  4C C6 AB                 jmp     next_run_option
3241
3242  AEA1
3243  AEA1  20 25 AF         ?ng:    JSR     ALL_DISABLE
3244  AEA4  64 45                    STZ     VALVE
3245  AEA6  20 5B B7                 JSR     DKCLR
3246  AEA9  80 43                    BRA     ?20
3247  AEAB  20 5B B7         ?13:    JSR     DKCLR           ;use this station?
```

```
248  AEAE  20 FC AE              JSR      DISPEV
249  AED1                        SET_CURSOR LINE2
253  AED6                        MESSAGE  MSG129
258  AEDD  20 C3 B1              JSR      DSTA#
259  AEC0                        QM
263  AEC5  20 4B B7     ?11:     JSR      GETKEY
264  AEC8  F0 F8                 beq      ?11
265  AECA  C9 04                 cmp      #downkey
266  AECC  F0 F7                 beq      ?11
267  AECE  C9 01                 CMP      #okkey
268  AED0  F0 15                 BEQ      ?15
269  AED2  C9 02                 CMP      #helpkey
270  AED4  D0 0A                 BNE      ?12
271  AED6                        HELP     none
276  AEDD  4C 5B AE              JMP      get_disables
277
278  AEE0  A6 45        ?12:     LDX      VALVE        ;disable valve in bfr
279  AEE2  9E 4D 17              stz      aai_bfr,X
280  AEE5  80 07                 BRA      ?20
281  AEE7  A6 45        ?15:     LDX      VALVE        ;enable valve in bfr
282  AEE9  A9 01                 LDA      #1
283  AEEB  9D 4D 17              STA      aai_bfr,X
284  AEEE  E6 45        ?20:     inc      VALVE        ;next valve
285  AEF0  A5 45                 lda      VALVE
286  AEF2  CD 3B 0B              cmp      numsta
287  AEF5                        blt      ?13
288  AEF7  F0 B2                 beq      ?13
289  AEF9  4C 66 AE              JMP      ?0
292
293                     DISPEV:                        ;display enabled valves
294  AEFC                        MESSAGE  MSG127
299  AF03                        set      LSB
303  AF07  A6 40        ?1:      LDX      LSB
304  AF09  BD 4D 17              LDA      aai_bfr,X
305  AF0C  F0 06                 BEQ      ?2
306  AF0E  A5 40                 LDA      LSB
307  AF10  09 30                 ORA      #ASCMASK
308  AF12  80 02                 BRA      ?3
309  AF14  A9 2D        ?2:      LDA      #'-'
310  AF16  20 00 00     ?3:      jsr      dchar
311  AF19  E6 40                 INC      LSB
312  AF1B  A5 40                 LDA      LSB
313  AF1D  CD 3B 08              cmp      numsta
314  AF20                        blt      ?1
317  AF22  F0 E3                 beq      ?1
318  AF24  60                    RTS
319
320                     ALL_DISABLE:                   ;disable valve bfr
321  AF25                        set      VALVE
325  AF29  A6 45        ?1:      LDX      VALVE
326  AF2B  9E 4D 17              stz      aai_bfr,X
327  AF2E  E6 45                 INC      VALVE
328  AF30  A5 45                 LDA      VALVE
329  AF32  C9 09                 CMP      #9
330  AF34  D0 F3                 BNE      ?1
331  AF36  60                    RTS
```

```
;---------------------------------
;      set date &.time
;---------------------------------

SET_TIME:                           ;set up time and day
AF37  78                SEI
AF38  A2 05             LDX     #5
AF3A  BD 01 02  STI0:   LDA     hour,X             ;move current time to working area
AF3D  9D 5F 02          STA     IBFR+4,X           ;IBFR+4=hour, minute
AF40  CA                DEX                        ;IBFR+6=dow
AF41  10 F7             BPL     STI0               ;IBFR+7=month,day,year
AF43  58                CLI
AF44  20 5B B7  STI1:   JSR     DKCLR              ;show working time and date
AF47                    MESSAGE MSG89
AF4E  20 B9 B1          JSR     DISPTIME
AF51                    SET_CURSOR LINE2
AF56  AD 61 02          lda     IBFR+6
AF59  20 00 00          jsr     display_dow
AF5C                    SKIP    2
AF65  AD 62 02          lda     IBFR+7
AF68  AC 63 02          ldy     IBFR+8
AF6B  AE 64 02          ldx     IBFR+9
AF6E  20 00 00          jsr     display_date
AF71                    QM
AF76  20 4B E7  ?1:     JSR     GETKEY             ;wait for an answer
AF79  F0 FB             beq     ?1
AF7B  C9 01             CMP     #okkey
AF7D  F0 0D             BEQ     STIOK              ;time good, exit
AF7F  C9 02             cmp     #helpkey
AF81  D0 20             bne     STI10              ;change time
AF83                    HELP    none
AF8A  80 A8             BRA     SET_TIME AFBC  78        STIOK:  SEI
AFBD  A2 05             LDX     #5                 ;OK key, keep time as displayed
AFBF  BD 5F 02  ·ST9:   LDA     IBFR+4,X
AF92  9D 01 02          STA     hour,X
AF95  CA                DEX
AF96  10 F7             BPL     ST9
AF9B  AE 04 02          LDX     month
AF9B  BD A3 C2          LDA     DAYTBL,X
AF9E  8D 07 02          STA     dim
AFA1  58                CLI
AFA2  60                rts AFA3  20 5B B7  STI10:  JSR     DKCLR              ;change time
AFA6                    MESSAGE MSG89
AFAD                    SET_CURSOR 8               ;get time
AFB2  20 62 B7          JSR     get_time
AFB5  90 09             BCC     STI12
AFB7            STIH:   HELP    none
AFBE  80 E3             BRA     STI10
AFC0            STI12:  SET_CURSOR LINE2           ;get day of week
AFC5  AD 61 02          LDA     IBFR+6
AFC8  20 00 00          jsr     get_dow
AFCB  B0 EA             BCS     STIH
```

```
                                STI30:                          ;input the date
                                      SET_CURSOR  LINE2+5
             AD 62 02                 LDA      IBFR+7
             20 00 00                 jsr      get_month
             B0 ..                    BCS      STIH
             8D 62 02   STI33:        STA      IBFR+7           ;keep selection
                                      SET_CURSOR  LINE2+9
                                      set      IBFR+1           ;select day based on days in month
             AE 62 02                 LDX      IBFR+7
             BD A3 C2                 LDA      DAYTBL,X
             8D 5D 02                 STA      IBFR+2
             AD 63 02                 LDA      IBFR+8           ;default=present day,
             8D 5B 02                 STA      IBFR
             DD A3 C2                 CMP      DAYTBL,X         ;unless > present day,
             F0 07                    BEQ      ?5
                                      BLT      ?5
                                      set      IBFR             ;then start at day=1
  B005  AD 5B 02          ?5:         lda      IBFR
  B008  A2 01                         ldx      #1
  B00A  DA                            phx
  B00B  AE 5D 02                      ldx      IBFR+2           ;up limit = days in month
  B00E  DA                            phx
  B00F  A2 01                         ldx      #1
  B011  DA                            phx
  B012  AC 12 02                      ldy      char_index
  B015  A2 00                         ldx      #0
  B017  20 00 00                      jsr      get_number
  B01A  90 03                         BCC      ?6
  B01C  4C B7 AF                      JMP      STIH
  B01F  8D 63 02          ?6:         STA      IBFR+8           ;keep day B022                                SET_CURSOR  LINE2+11
  B027                                DISP     ','
  B02C                                DISP     $27
  B031  AD 64 02                      LDA      IBFR+9
  B034                                select   0,99,1           ;select year
  B045  90 03                         BCC      STI34
  B047  4C B7 AF                      JMP      STIH
  B04A  8D 64 02   STI34:             STA      IBFR+9           ;keep year
  B04D  4C 44 AF                      JMP      STI1             ;verify B050                                INCLUDE  SUBS.ASM
                                ;--------------------------------
                                ;       SUBROUTINES
                                ;--------------------------------

NXTVALVE:                       ;out: the next valid valve in VALVE
  B050                          NXTSTA:
```

```
513                                             ;    carry set if no more stations
514   B050  E6 45              INC   VALVE
515   B052  A6 45              LDX   VALVE
516   B054  EC 3B 0B           CPX   numsta
517   B057  F0 04              beq   ?1
518   B059                     blt   ?1
521   B05B  38                 sec
522   B05C  60                 rts
523   B05D  18          ?1:    clc
524   B05E  60                 rts
525
526                     SHOW_DUR:                ;show the duration for VALVE
527                                              ;in: VALVE, SUB
528   B05F  A5 60              LDA   SUB         ;which duration to show?
529   B061  F0 06              BEQ   SHD1
8530  B063  C9 01              CMP   #1
8531  B065  F0 15              BEQ   SHD2
8532  B067  80 26              BRA   SHD3
8533  B069  A6 45       SHD1:  LDX   VALVE       ;show DUR1
8534  B06B                     DBLX
541   B070  BD 22 0E           LDA   DUR1,X
542   B073  85 59              STA   OFFSET
543   B075  BD 23 0E           LDA   DUR1+1,X
544   B078  85 5A              STA   OFFSET+1
545   B07A  80 26              BRA   SHD4
546   B07C  A6 45       SHD2:  LDX   VALVE       ;show DUR2
547   B07E                     DBLX
548   B083  BD 48 0E           LDA   DUR2,X
555   B086  85 59              STA   OFFSET
556   B088  BD 49 0E           LDA   DUR2+1,X
557   B08B  85 5A              STA   OFFSET+1
558   B08D  80 13              BRA   SHD4
559   B08F  A6 45       SHD3:  LDX   VALVE       ;show DUR3
560   B091                     DBLX
567   B096  BD 7F 0E           LDA   DUR3,X
568   B099  85 59              STA   OFFSET
569   B09B  BD 80 0E           LDA   DUR3+1,X
570   B09E  85 5A              STA   OFFSET+1
571   B0A0  80 00              BRA   SHD4
572   B0A2  20 00 B7    SHD4:  JSR   MIN2HM
573   B0A5  20 50 B5           JSR   DISPDURATION
574   B0A8  60                 RTS
575
576                     SHOW_CYCLE:              ;show the cycle for valve
577                                              ;in: VALVE,SUB
578   B0A9  A5 60              LDA   SUB         ;which cycle to show?
579   B0AB  F0 06              BEQ   SHC1
580   B0AD  C9 01              CMP   #1
591   B0AF  F0 17              BEQ   SHC2
592   B0B1  80 2A              BRA   SHC3
593   B0B3  A6 45       SHC1:  LDX   VALVE       ;show CYCLE1
594   B0B5                     DBLX
 1    B0BA  BD 34 0E           LDA   CYCLE1,X
 2    B0BD  8D 5B 02           STA   IBFR
 3    B0C0  BD 35 0E           LDA   CYCLE1+1,X
 4    B0C3  8D 5C 02           STA   IBFR+1
 5    B0C6  80 28              BRA   SHC4
```

```
595  B0CB  A6 45        SHC2:    LDX     VALVE          ;show CYCLE2
597  B0CA               DBLX
604  B0CF  BD 5A 0E              LDA     CYCLE2,X
605  B0D2  8D 5B 02              STA     IBFR
606  B0D5  BD 5B 0E              LDA     CYCLE2+1,X
607  B0D8  8D 5C 02              STA     IBFR+1
608  B0DB  80 13                 BRA     SHC4
609  B0DD  A6 45        SHC3:    LDX     VALVE          ;show CYCLE3
610  B0DF               DBLX
617  B0E4  BD 91 0E              LDA     CYCLE3,X
618  B0E7  8D 5B 02              STA     IBFR
619  B0EA  BD 92 0E              LDA     CYCLE3+1,X
620  B0ED  8D 5C 02              STA     IBFR+1
621  B0F0  20 6E B5     SHC4:    JSR     DISPCYCLE
622  B0F3  60                    RTS
623
624
625  B0F4  A9 32        FLASH:   lda     #50            ;flash the screen
626  B0F6  20 00 00              jsr     R9_wait_ms
627  B0F9  60                    rts
628
629
630
631               HOWMANY:                              ;how many splits
632                                                     ;in: VALVE, SUB, MAXON
633                                                     ;out: QUOTIENT, A=DUR/MAXON
634  B0FA  A6 45                 ldx     VALVE
635  B0FC  A5 60                 LDA     SUB
636  B0FE  F0 0D                 BEQ     ?0
637  B100                        DBLX                   ;soak duration
644  B105  BC 7F 0E              ldy     DUR3,X
645  B108  BD 80 0E              lda     DUR3+1,X
646  B10B  80 08                 BRA     ?2
647  B10D               ?0:      DBLX                   ;base duration
654  B112  BC 22 0E              ldy     DUR1,X
655  B115  BD 23 0E              lda     DUR1+1,X
656  B118  48           ?2:      pha
657  B119  A6 45                 ldx     VALVE          ;divisor
658  B11B  BD 0C 0E              lda     MAXON,X
659  B11E  AA                    tax
660  B11F  68                    pla
661  B120  20 00 00              jsr     R9_divide      ;quotient = duration / maxon
662  B123  85 69                 sta     QUOTIENT
663  B125  98                    tya                    ;if any remainder,
664  B126  F0 02                 BEQ     ?1
665  B128  E6 69                 INC     QUOTIENT       ;inc result
666  B12A  A5 69        ?1:      LDA     QUOTIENT
667  B12C  60                    RTS
668
669               CALCNSYR:                             ;out: QUOTIENT=
670                                                     ;SYRINGE_END - SYRINGE_START / SOFTEN
671  B12D                        push16  SOFTEN         ;divisor
677  B135  38                    SEC
678  B136  AD 7B 0E              LDA     SYRINGE_END
679  B139  ED 79 0E              SBC     SYRINGE_START
680  B13C  85 40                 STA     LSB
681  B13E  AD 7C 0E              LDA     SYRINGE_END+1
```

```
692  B141  ED 7A 0E         SBC      SYRINGE_START+1
693  B144  85 41            STA      MSB
694  B146                   push16   LSB              ;dividend
700  B14C  20 00 00         jsr      R9_div16
701  B14F  84 69            sty      QUOTIENT         ;lsb of result
702  B151  E6 69            INC      QUOTIENT
703  B153  60               RTS
694
695
696                SHOW_MONTHS:                       ;display active months
697  B154                   SET      LSB
701  B158  A6 40     ?C:    LDX      LSB
702  B15A  BD 6C 0E         LDA      ACTIVE_MONTH,X
703  B15D  F0 05            BEQ      ?D
704  B15F  BD 89 C3         LDA      MONTBL,X
705  B162  80 02            BRA      ?E
706  B164  A9 2D     ?D:    lda      #'-'
707  B166  20 00 00  ?E:    jsr      dchar
708  B169  E6 40            INC      LSB
709  B16B  A5 40            LDA      LSB
710  B16D  C9 0D            CMP      #13
711  B16F  D0 E7            BNE      ?C
712  B171  60               RTS
713
714                SHOW_SYRCYC:                       ;show number of syringes and interval
715  B172  20 2D B1         JSR      CALCNSYR
716  B175  20 5B B7         JSR      DKCLR
717  B178  A5 69            LDA      QUOTIENT
718  B17A  20 00 00         jsr      d2d
719  B17D                   MESSAGE  MSG140
724  B184  A5 69            LDA      QUOTIENT
725  B186  C9 01            CMP      #1
726  B188  D0 14            BNE      SHSY1
727  B18A  20 00 00         jsr      line2_clear      ;only 1 syringe
728  B18D                   MOV16    SYRINGE_START,OFFSET
734  B197  20 00 B7         JSR      MIN2HH
735  B19A  20 B9 B1         JSR      DISPTIME
736  B19D  60               RTS
737  B19E       SHSY1:      SET_CURSOR LINE2          ;more than 1 syringe
741  B1A3                   MOV16    SOFTEN,OFFSET
747  B1AD  20 00 B7         JSR      MIN2HH
748  B1B0  20 50 B5         JSR      DISPDURATION
749  B1B3                   SET_CURSOR LINE2+15
753  B1B8  60               RTS
754
755                DISPTIME:                          ;show the time in IBFR+4, #5
756  B1B9  AD 5F 02         lda      IBFR+4
757  B1BC  AC 60 02         ldy      IBFR+5
758  B1BF  20 00 00         jsr      display_time
759  B1C2  60               rts
770
771
772  B1C3       DSTAI:      MESSAGE  MSG673           ;display Sta in
777  B1CA                   SKIP     1
773  B1D3                   DISP     '!'
777  B1D8  80 22            BRA      DV
778
```

```
779  B1DA                DSTA:    MESSAGE  MSG73        ;display Stan
784  B1E1   80 19                 BRA      DV
785
786  B1E3                DSTATION#: MESSAGE MSG32       ;display Station #n
791  B1EA   80 10                 BRA      DV
792
793                      DVALVEMSG:                     ;display "Valve #n"
794  B1EC                         MESSAGE  MSG126         ;in: VALVE
799
800  B1F3   20 FC B1     DVALVE:  JSR      DV           ;display valve# and space
801  B1F6                         DISP     ' '
805  B1FB   60                    RTS
806
807  B1FC   A5 45        DV:      LDA      VALVE        ;display valve #
808  B1FE   09 30                 ORA      #ASCMASK
809  B200   20 00 00              jsr      dchar
810  B203   60                    RTS
811
812                      ISCOPY:                        ;show copy screen,
813                                                     ;return carry set if copy requested
814  B204   20 5B B7              JSR      DKCLR
815  B207                         MESSAGE  MSG34
820  B20E   20 E3 B1              JSR      DSTATION#
821  B211                         @M
825  B216   20 4B B7     ?1:      JSR      GETKEY
826  B219   F0 FB                 beq      ?1
827  B21B   C9 01                 CMP      #okkey
828  B21D   F0 0D                 BEQ      ?ok
829  B21F   C9 02                 CMP      #helpkey
830  B221   D0 0B                 BNE      ?ng
831  B223                         HELP     none
836  B22A   80 D8                 BRA      ISCOPY
837  B22C   38           ?ok:     SEC
838  B22D   60                    RTS
839  B22E   18           ?ng:     CLC
840  B22F   60                    RTS
841
842                      DISP_SOURCE:                   ;show the source
843  B230   AD 80 0B              LDA      SOURCE
844                      DISP_SOURCEA:                  ;alt entry, source in A.
845  B233   AA                    tax
846  B234   D0 09                 bne      ?2
847  B236                         MESSAGE  MSG203
852  B23D   80 14                 bra      ?done
853  B23F   C9 01        ?2:      cmp      #1
854  B241   D0 09                 bne      ?3
855  B243                         MESSAGE  MSG204
860  B24A   80 07                 bra      ?done
861  B24C                ?3:      MESSAGE  MSG205
866  B253   60           ?done:   rts
867
868
869                      CONFIRM_HELP:                  ;help screen for all confirm screens
870  B254                         HELP     none
875  B25B   60                    RTS
876
877                      CONFIRM_BLINK:                 ;use ? for modify or new, OK for review
```

```
                        ON
                        RTS

GETONOFF:              ;retrieve MAXON/MINOFF from tables
                                    ;DEFAULT+2=terrain, +3=sprinkler type
                                    ;out: DEFAULT= MAXON, +1= MINOFF
         AE 4F 19       LDX  DEFAULT+2      ;find MINOFF
         BD 99 C3       LDA  MINOFFTBL,X    ;index = terrain
         8D 4E 19       STA  DEFAULT+1
         AD 50 19       lda  DEFAULT+3      ;find MAXON
         85 55          sta  R1
         18             CLC                 ;index = 6*(sprinkler type) + (terrain)
         65 55          ADC  R1
         65 55          ADC  R1
         65 55          ADC  R1
         65 55          ADC  R1
         65 55          ADC  R1
         AE 4F 19       LDX  DEFAULT+2
         86 55          STX  R1
         65 55          ADC  R1
         AA             TAX
         BD 9F C3       LDA  MAXONTBL,X
         8D 4D 19       STA  DEFAULT
         60             RTS GETSOAKDUR:            ;retrieve Soak duration from table
                                    ;in: DEFAULT+2=terrain, +3=sprinkler type
                                    ;out: DEFAULT,+1= Soak dur
B28A     AD 50 19       LDA  DEFAULT+3
B28D     85 55          STA  R1
B28F     18             CLC            ;index = 6*(sprinkler type) + (terrain)
B290     65 55          ADC  R1
B292     65 55          ADC  R1
B294     65 55          ADC  R1
B296     65 55          ADC  R1
B298     65 55          ADC  R1
B29A     AE 4F 19       LDX  DEFAULT+2
B29D     86 55          STX  R1
B29F     65 55          ADC  R1
B2A1     AA             TAX
B2A2                    DBLX           ;double it to get words
B2A7     BD C9 C3       LDA  SOAKDURTBL,X
B2AA     8D 4D 19       STA  DEFAULT
B2AD     BD CA C3       LDA  SOAKDURTBL+1,X
B2B0     8D 4E 19       STA  DEFAULT+1
B2B3     60             RTS ISSOAK:                ;out: carry set if want soaks
                                    ; else carry clear and soak durs=0
B2B4     20 5B B7       JSR  DKCLR
B2B7                    MESSAGE MSG141
B2BE                    ON
B2C3     20 4B B7  ?1:  JSR  GETKEY
B2C6     F0 FB          beq  ?1
B2C9     C9 01          CMP  #okkey
B2CB     F0 17          BEQ  ?ok
B2CD     C9 02          CMP  #helpkey
```

```
951  B2CE  D0 09              BNE     ?ng
952  B2D0              HELP    none
957  B2D7  80 DB              BRA     ISSOAK
958  B2D9  A2 11       ?ng:   LDX     #17             ;clear soak durations
959  B2DB  9E 7F 0E    ?2:    STZ     DUR3,X
960  B2DE  CA                 DEX
961  B2DF  10 FA              BPL     ?2
962  B2E1  18                 CLC
963  B2E2  60                 RTS
964  B2E3  38          ?ok:   SEC
965  B2E4  60                 RTS
966
967                    ISSYR:                         ;out: carry set if want syringes
968                                                   ; else carry clear and soften=0
969  B2E5  20 5B B7           JSR     DKCLR
8970 B2E8                     MESSAGE MSG65
8975 B2EF                     @M
8979 B2F4  20 4B B7    ?1:    JSR     GETKEY
8980 B2F7  F0 FB              beq     ?1
9981 B2F9  C9 01              CMP     #okkey
982  B2FB  F0 15              BEQ     ?ok
983  B2FD  C9 02              CMP     #helpkey
984  B2FF  D0 09              BNE     ?ng
985  B301              HELP    none
990  B308  80 DB              BRA     ISSYR
991  B30A  9C 7D 0E    ?ng:   STZ     SOFTEN
992  B30D  9C 7E 0E           STZ     SOFTEN+1
993  B310  18                 CLC
994  B311  60                 RTS
995  B312  38          ?ok:   SEC
996  B313  60                 RTS
997
998
999                    ENTER_RATION:                  ;in: IBFR
000                                                   ;out: IBFR, carry set if HELP
001                                                   ;       line 2 used
002  B314                     SET_CURSOR LINE2
006  B319  20 6E B5           JSR     DISPCYCLE       ;show present selection
007  B31C                     SET_CURSOR LINE2+6
011  B321  AD 5B 02           LDA     IBFR
012  B324                     select  2,90,2
023  B335  8D 5B 02           sta     IBFR
024  B338  60                 RTS
025
026
027                    ENTER_SO_MANY:                 ;in: IBFR
028                                                   ;out: IBFR, carry set if HELP
029                                                   ;       line 2 used
030  B339                     SET_CURSOR LINE2
034  B33E  20 6E B5           JSR     DISPCYCLE       ;show present selection
035  B341                     SET_CURSOR LINE2+6
039  B346  AD 5B 02           LDA     IBFR
040  B349                     select  1,90,1
051  B35A  8D 5B 02           sta     IBFR
052  B35D  60                 RTS
053
054
```

```
                        ENTER_SPECIFIC:         ;in: nothing
                                                ;out: IBFR, IBFR+1
                                                ;      line 2 and half of line 1 used
      B35E              SET     IBFR+6          ;start at monday
      B363              SET     IBFR
      B368  9C 5C 02    STZ     IBFR+1          ;default specific days = none
                  ?V:                           ;show days selected so far on line1
      B36B              SET_CURSOR 8
      B370  20 3B B6    JSR     DSP
      B373  20 00 00    jsr     line2_clear
      B376              MESSAGE MSG26
                                                ;show day of week in IBFR+6
      B37D  AD 61 02    lda     IBFR+6
      B380  20 00 00    jsr     display_dow
      B383              SKIP    1
      B38C              QN
      B391  20 4B B7  ?F: JSR   GETKEY
      B394  F0 FB       beq     ?F
      B396  C9 01       CMP     #okkey
      B398  F0 0D       BEQ     ?ok
      B39A  C9 02       CMP     #helpkey
      B39C  D0 03       BNE     ?1
      B39E  4C 1F B4    JMP     ?HELP
      B3A1  C9 03  ?1:  cmp     #upkey
      B3A3  D0 EC       bne     ?F
      B3A5  80 14       bra     ?ng B3A7  A9 0B  ?ok: LDA     #8              ;watering day,
      B3A9  38          SEC                     ;set bit in IBFR+1 corresponding to day
      B3AA  ED 61 02    SBC     IBFR+6
      B3AD  AA          TAX
      B3AE  A9 00       LDA     #0
      B3B0  38          SEC
      B3B1  2A     ?A:  ROL     A
      B3B2  CA          DEX
      B3B3  D0 FC       BNE     ?A
      B3B5  0D 5C 02    ORA     IBFR+1
      B3B8  8D 5C 02    STA     IBFR+1
      B3BB  EE 61 02 ?ng: INC   IBFR+6
      B3BE  AD 61 02    LDA     IBFR+6          ;do all 7 days
      B3C1  C9 08       CMP     #8
      B3C3  D0 A6       BNE     ?V
      B3C5  A2 01       LDX     #1
      B3C7  BD 76 C3 ?X: LDA    CBTBL,X         ;if not one specific day,
      B3CA  CD 5C 02    CMP     IBFR+1
      B3CD  F0 0B       BEQ     ?Y
      B3CF  E8          INX
      B3D0  E0 08       CPX     #8
      B3D2  D0 F3       BNE     ?X
      B3D4  4C 1D B4    JMP     ?OK             ;then leave it a weekly cycle (IBFR=1)

B3D7  8E 61 02 ?Y: STX    IBFR+6          ;else select # of weeks
      B3DA  20 00 00    jsr     line2_clear
      B3DD  AD 61 02    lda     IBFR+6
      B3E0  20 00 00    jsr     display_dow
      B3E3              SKIP    1
      B3EC              MESSAGE MSG36
```

```
142  B3F3                              SET_CURSOR  LINE2+11
146  B3F8                              MESSAGE     MSG35
151  B3FF                              SET_CURSOR  LINE2+10
155  B404  AD 5B 02                    LDA         IBFR
156  B407                              select      1,9,1
167  B418  B0 05                       BCS         ?HELP
168  B41A  8D 5B 02                    STA         IBFR
169  B41D            ?OK:
170  B41D  18                          CLC
171  B41E  60                          RTS
172  B41F            ?HELP:
173  B41F  38                          SEC
174  B420  60                          RTS
175
176
177                       NEXTSTART:               ;move STARTPTR to next start time
178                                                ;check for STARTCTR=128 before calling!
179  B421  18                          CLC
180  B422  A5 6B                       LDA         STARTPTR
181  B424  69 08                       ADC         #8
182  B426  85 6B                       STA         STARTPTR
183  B428  A5 6C                       LDA         STARTPTR+1
184  B42A  69 00                       ADC         #0
185  B42C  85 6C                       STA         STARTPTR+1
186  B42E  E6 6D                       INC         STARTCTR
187  B430  60                          RTS
188
189                       PREVSTART:               ;move STARTPTR back one
190                                                ;check for STARTCTR=0 before calling!
191  B431  38                          sec
192  B432  A5 6B                       LDA         STARTPTR
193  B434  E9 08                       sbc         #8
194  B436  85 6B                       STA         STARTPTR
195  B438  A5 6C                       LDA         STARTPTR+1
196  B43A  E9 00                       sbc         #0
197  B43C  85 6C                       STA         STARTPTR+1
198  B43E  C6 6D                       dec         STARTCTR
199  B440  60                          rts
200
201                       OBJCLEAR:                ;clear the object area
202  B441                              pushptr     OBJBASE
203  B447                              pushptr     SOURCELEN    ;300 bytes
214  B44D  20 00 00                    jsr         R9_clear_RAM
215  B450  9C 36 0F                    STZ         NSTARTS
216  B453  A9 FF                       lda         #$FF
217  B455  8D 0A 0E                    sta         SOURCE_TYPE  ;mark object as invalid
218  B458  60                          RTS
219
220                       S20:                     ;move source code to object area
221                                                ;in: SOURCE
222  B459  AD 80 0B                    LDA         SOURCE
223  B45C  C9 02                       CMP         #2
224  B45E  F0 54                       BEQ         SF0
225  B460  AE 80 0B                    LDX         SOURCE
226  B463                              DEX
3    B463  BD B1 B4                    LDA         SOURCEADDR+1,X  ;move valve settings from source
4    B466  48                          pha
```

```
265  B46C  BD B0 B4           LDA      SOURCEADDR,X
266  B46F  48                 pha
267  B470                     pushptr  OBJBASE         ;to object
268  B476                     pushptr  SOURCELEN
269  B47C  20 00 00           jsr      R9_block_move
270  B47F  60                 RTS
271
272                  O2S:                              ;move object back to source
273  B480  AD 80 0B           lda      SOURCE
274  B483  8D 0A 0E           sta      OBJBASE         ;tag the program
275  B486  AD 80 0B           LDA      SOURCE
276  B489  C9 02              CMP      #2
277  B48B  D0 03              bne      ?1
278  B48D  4C FB B4           jmp      SF2
279  B490  AE 80 0B   ?1:     LDX      SOURCE
280  B493                     DBLX
281  B498                     pushptr  OBJBASE         ;move valve settings from object
273  B49E  BD B1 B4           LDA      SOURCEADDR+1,X  ;to source
274  B4A1  48                 pha
275  B4A2  BD B0 B4           LDA      SOURCEADDR,X
276  B4A5  48                 pha
277  B4A6                     pushptr  SOURCELEN
283  B4AC  20 00 00           jsr      R9_block_move
284  B4AF  60                 RTS
285
286                  SOURCEADDR:                       ;program locations
287  B4B0  B20B               word     MAIN            ;source=0
288  B4B2  DE0C               word     ALT             ;source=1
289
290                  SF0:                              ;move factory pgm to object area
291                                                    ;object area must be cleared already
292  B4B4  AD 80 0B           LDA      SOURCE
293  B4B7  8D 0A 0E           STA      SOURCE_TYPE     ;move source type
294  B4BA  A9 01              lda      #1
295  B4BC  8D 08 0E           sta      CYCLE_TYPE      ;specific days
296  B4BF                     MOV16    FACTORY,BASE_START  ;move start time
302  B4CB                     SET      LSB
306  B4CF  A6 40      SF1:    LDX      LSB
307  B4D1                     DBLX
314  B4D6  A9 01              LDA      #1
315  B4D8  9D 34 0E           STA      CYCLE1,X        ;all cycles=daily
316  B4DB  A9 7F              lda      #01111111b
317  B4DD  9D 35 0E           sta      CYCLE1+1,X
318  B4E0  AD 15 0B           LDA      FACTORY+2       ;all durations=factory
319  B4E3  9D 22 0E           STA      DUR1,X
320  B4E6  AD 16 0B           LDA      FACTORY+3
321  B4E9  9D 23 0E           STA      DUR1+1,X
322  B4EC  E6 40              INC      LSB
323  B4EE  A5 40              LDA      LSB
324  B4F0  CD 3B 0B           CMP      numsta
325  B4F3                     blt      SF1
328  B4F5  F0 DB              beq      SF1
329  B4F7  20 14 B5           jsr      init_splits
330  B4FA  60                 RTS
331
332                  SF2:                              ;save factory pgm
333  B4FB                     MOV16    BASE_START,FACTORY  ;save start time
```

```
            AD 24 0E        LDA     DUR1+2
            8D 15 0B        STA     FACTORY+2       ;save duration
            AD 25 0E        LDA     DUR1+3
            8D 16 0B        STA     FACTORY+3
                            RTS init_splits:
                            SET     LSB
            A5 40       ?0: ldx     LSB
            BD 29 0B        lda     TERRAIN,X       ;get splits from tables
            8D 4F 19        sta     DEFAULT+2
            BD 32 0B        lda     SPRINKLER,X
            8D 50 19        sta     DEFAULT+3
            20 62 B2        JSR     GETONOFF
            A5 40           ldx     LSB
            AD 4D 19        lda     DEFAULT
            9D 0C 0E        sta     MAXON,X
            AD 4E 19        lda     DEFAULT+1
            9D 15 0E        sta     MINOFF,X
            E6 40           inc     LSB
            A5 40           lda     LSB
            C9 08           cmp     #8
            F0 D9           beq     ?0
                            blt     ?0
      B541  A9 01           lda     #1              ;enable splits
      B543  8D 0C 0E        sta     MAXON
      B546  60              rts ;       Title: Message wait
;
;       Purpose: Wait 2.5 sec. real time
;
;       Entry: none
;       Exit: none
;       RAM used: none MSGWAIT:                        ;wait while msg is being read
      B547  A9 3E           lda     #62
      B549  85 44           sta     TIMCTR2
      B54B  A5 44       ?0: lda     TIMCTR2
      B54D  D0 FC           bne     ?0
      B54F  60              rts ;       Title: Display duration
;
;       Purpose: Show duration on screen
;
;       Entry: IBFR+4 = hours, IBFR+5 = minutes
;       Exit: none
;       RAM used: none DISPDURATION:                   ;display the hour and minute 0h+00m
                                                    ;IBFR+4= hour, minute
      B550  AD 5F 02        LDA     IBFR+4          ;show hour
      B553  09 30           ORA     #ASCMASK
```

```
9401  B555  20 00 00           jsr      dchar
9402  B558                     DISP     'h'
9406  B55D                     DISP     ':'
9410  B562  AD 60 02           LDA      IBFR+5       ;show minute
9411  B565  20 00 00           jsr      d2d          ;without suppressing leading 0
9412  B568  A9 6D              LDA      #'m'
9413  B56A  20 00 00           jsr      dchar
9414  B56D  60                 RTS
9415
9416                      ;    Title: Display watering cycle
9417                      ;
9418                      ;    Purpose: Show cycle on screen
9419                      ;
9420                      ;    Entry: CYCLE_TYPE=0: IBFR= 1-90 days, IBFR+1=don't care
9421                      ;           CYCLE_TYPE=1: IBFR= cycle in weeks (1-9)
9422                      ;                        IBFR+1= the specific days (XMTWTFSS)
9423                      ;    Exit: none
9424                      ;    RAM used: none
9425
9426  B56E              DISPCYCLE:
9427  B56E  AD 0B 0E           LDA      CYCLE_TYPE
9428  B571  C9 01              CMP      #1
9429  B573  F0 3A              BEQ      ?5
9430
9431  B575  AD 0B 0E           lda      CYCLE_TYPE
9432  B578  D0 09              bne      ?a
9433  B57A                     MESSAGE  MSG38         ;every
9438  B581  80 14              bra      ?c
9439  B583  C9 02        ?a:   cmp      #2
9440  B585  D0 09              bne      ?b
9441  B587                     MESSAGE  MSG38A        ;ODD
9446  B58E  80 07              bra      ?c
9447  B590        ?b:          MESSAGE  MSG38B        ;EVEN
9452
9453  B597  AD 5B 02     ?c:   LDA      IBFR          ;XX days
9454  B59A  20 00 00           jsr      d2d
9455  B59D                     MESSAGE  MSG33         ;days
9460  B5A4                     SKIP     1
9466  B5AD  80 46              BRA      ?20
9467
9468  B5AF  AD 5B 02     ?5:   LDA      IBFR
9469  B5B2  C9 01              CMP      #1
9470  B5B4  F0 2C              BEQ      ?10
9471  B5B6  AD 5C 02     ?0:   LDA      IBFR+1        ;cycle > 1 week
9472  B5B9  F0 16              BEQ      ?2
9473  B5BB  20 26 B7           JSR      BIT2DOW
9474                                                  ;show day of week
9475  B5BE  20 00 00           jsr      display_dow
9476  B5C1                     SKIP     1
9482  B5CA                     MESSAGE  MSG39
9487  B5D1  AD 5B 02     ?2:   LDA      IBFR          ;show how many weeks
9488  B5D4  09 30              ORA      #ASCMASK
9489  B5D6  20 00 00           jsr      dchar
9490  B5D9                     MESSAGE  MSG35
9495  B5E0  80 13              BRA      ?20
9496  B5E2              ?10:   MESSAGE  MSG38         ;weekly cycle
9501  B5E9  20 3E B6           JSR      DSP
```

```
9502  B5EC                           SKIP    1
9508  B5F5  60          ?20:         RTS
9509
9510
9511                    ;     Title: Display cycle (abbreviated format)
9512                    ;
9513                    ;     Purpose: Show cycle in 7 characters
9514                    ;              XX_days, MTWTFSS, or MON@2wk
9515                    ;
9516                    ;     Entry: same as DISPCYCLE
9517                    ;     Exit: none
9518                    ;     RAM used:  none
9519
9520                    DISPCYC:                    ;show abbreviated cycle
9521                                                ;same inputs as DISPCYCLE
9522  B5F6  AD 0B 0E                 LDA     CYCLE_TYPE
9523  B5F9  C9 01                    CMP     #1
9524  B5FB  F0 0F                    BEQ     ?5
9525  B5FD  AD 5B 02                 LDA     IBFR         ;XX days
9526  B600  20 00 00                 jsr     d2d
9527  B603                           MESSAGE MSG33
9532  B60A  80 2E                    BRA     ?20
9533  B60C  AD 5B 02    ?5:          LDA     IBFR
9534  B60F  C9 01                    CMP     #1
9535  B611  F0 24                    BEQ     ?10
9536  B613  AD 5C 02    ?0:          LDA     IBFR+1       ;cycle > 1 week
9537  B616  F0 0B                    BEQ     ?2
9538  B618  20 26 B7                 JSR     BIT2DOW
9539                                              ;show day of week
9540  B61B  20 00 00                 jsr     display_dow
9541  B61E                           DISP    '@'
9545  B623  AD 5B 02    ?2:          LDA     IBFR         ;show how many weeks
9546  B626  09 30                    ORA     #ASCMASK
9547  B628  20 00 00                 jsr     dchar
9548  B62B                           DISP    'w'
9552  B630                           DISP    'k'
9556  B635  80 03                    BRA     ?20
9557  B637  20 3B B6    ?10:         JSR     DSP          ;weekly cycle
9558  B63A  60          ?20:         RTS
9559
9560
9561                    DSP:                     ;show specific days
9562                                             ;in: cycle byte in IBFR+1
9563  B63B  AD 5C 02                 LDA     IBFR+1       ;XMTWTFSS
9564  B63E  85 40                    STA     LSB
9565  B640  A2 00                    LDX     #0
9566  B642  26 40                    ROL     LSB
9567  B644  26 40       DP11:        ROL     LSB
9568  B646  90 05                    BCC     DP12
9569  B648  BD 62 C3                 LDA     SDTBL,X      ;day set, show first letter of day
9570  B64B  80 02                    BRA     DP13
9571  B64D  A9 2D       DP12:        LDA     #'-'         ;day not set, show -
9572  B64F  20 00 00    DP13:        jsr     dchar
9573  B652  E8                       INX
9574  B653  E0 07                    CPX     #7
9575  B655  D0 ED                    BNE     DP11
9576  B657  60                       RTS
```

```
9577
9578
9579
9580
9581                          ;       Title: Get duration
9582                          ;
9583                          ;       Purpose: Input duration from user
9584                          ;
9585                          ;       Entry: char_index
9586                          ;              IBFR+4=hour, IBFR+5=minute
9587                          ;       Exit: IBFR+4=hour, IBFR+5=minute, char_index
9588                          ;              carry set if help requested
9589                          ;       RAM used: R4
9590
9591   B658                   get_duration:
9592
9593   B658  AD 18 02                 lda    char_index    ;store starting video location
9594   B65B  85 59                    sta    R4
9595
9596   B65D                           MESSAGE MSG18        ;show blank template
9601   B664                           BACKUP  6
9607
9608   B66D  AD 5F 02                 lda    IBFR+4        ;get hour
9609   B670                           select 0,8,1
9620   B681  B0 33                    bcs    ?help
9621   B683  8D 5F 02                 sta    IBFR+4
9622
9623   B686  AD 5F 02                 lda    IBFR+4        ;if max. hour,
9624   B689  C9 08                    cmp    #8
9625   B68B  D0 05                    bne    ?1
9626   B68D  9C 60 02                 stz    IBFR+5        ;then minute=0
9627   B690  80 22                    bra    ?ok
9628   B692              ?1:          SKIP   2             ;else get minute
9634   B69B  AD 60 02                 lda    IBFR+5
9635   B69E                           select 0,59,1
9646   B6AF  B0 05                    bcs    ?help
9647   B6B1  8D 60 02                 sta    IBFR+5
9648
9649   B6B4  18        ?ok:           clc
9650   B6B5  60                       rts
9651   B6B6  38        ?help:         sec
9652   B6B7  60                       rts
9653
9654
9655
9656
9657                          ;       Title: Hour, minute to Minutes
9658                          ;
9659                          ;       Purpose: Convert hours, minutes to minutes
9660                          ;
9661                          ;       Entry: IBFR+4=hr, IBFR+5=min
9662                          ;       Exit: OFFSET = 16 bit minutes
9663                          ;       RAM used: none
9664
9665   B6B8                   HM2MIN:
9666   B6B8  AE 5F 02                 LDX    IBFR+4
9667   B6BB  64 5A                    STZ    OFFSET+1
```

```
9668  B6BD  AD 60 02              LDA   IBFR+5
9669  B6C0  85 59                 STA   OFFSET       ;leftover minutes
9670  B6C2  8A            HM0:    TXA
9671  B6C3  F0 10                 BEQ   HM1
9672  B6C5  CA                    DEX
9673  B6C6  A5 59                 LDA   OFFSET       ;add 60 to minutes
9674  B6C8  18                    CLC
9675  B6C9  69 3C                 ADC   #60
9676  B6CB  85 59                 STA   OFFSET
9677  B6CD  A5 5A                 LDA   OFFSET+1
9678  B6CF  69 00                 ADC   #0
9679  B6D1  85 5A                 STA   OFFSET+1
9680  B6D3  80 ED                 BRA   HM0          ;until no more hours
9681  B6D5  60            HM1:    RTS
9682
9683
9684                      ;       Title:  Hour, minute to Minutes
9685                      ;
9686                      ;       Purpose: Convert hours, minutes to minutes
9687                      ;
9688                      ;       Entry: A=hr, Y=min
9689                      ;       Exit:  A=msb, Y=lsb of 16 bit minutes
9690                      ;       RAM used: none
9691
9692  B6D6          hm2m:
9693  B6D6  A6 71                 ldx   scratch
9694  B6D8  DA                    phx
9695  B6D9  A6 72                 ldx   scratch+1
9696  B6DB  DA                    phx
9697  B6DC  AA                    tax                ;hours
9698  B6DD  98                    tya                ;minutes
9699  B6DE  85 71                 STA   scratch      ;leftover minutes
9700  B6E0  64 72                 STZ   scratch+1
9701  B6E2  8A            ?0:     TXA
9702  B6E3  F0 10                 BEQ   ?1
9703  B6E5  CA                    DEX
9704  B6E6  A5 71                 LDA   scratch      ;add 60 to minutes
9705  B6E8  18                    CLC
9706  B6E9  69 3C                 ADC   #60
9707  B6EB  85 71                 STA   scratch
9708  B6ED  A5 72                 LDA   scratch+1
9709  B6EF  69 00                 ADC   #0
9710  B6F1  85 72                 STA   scratch+1
9711  B6F3  80 ED                 BRA   ?0           ;until no more hours
9712  B6F5  A5 72         ?1:     lda   scratch+1
9713  B6F7  A4 71                 ldy   scratch
9714  B6F9  FA                    plx
9715  B6FA  85 72                 sta   scratch+1
9716  B6FC  FA                    plx
9717  B6FD  85 71                 sta   scratch
9718  B6FF  60                    rts
9719
9720
9721
9722                      ;       Title: Minutes to hour, minute
9723                      ;
9724                      ;       Purpose: Convert minutes to hours & minutes
```

```
;       Entry: OFFSET = 16 bit minutes
;       Exit:  IBFR+4= hr, IBFR+5= min
;       RAM used:  none MIN2HM:                          ;convert minutes to hr, min
                                               ;in: OFFSET= 16 bit minutes
9731    9C 5F 02        STZ    IBFR+4
9732    9C 60 02        STZ    IBFR+5
9734    A5 5A    HM2:   LDA    OFFSET+1
9735    D0 06           BNE    HM3
9736    A5 59           LDA    OFFSET
9737    C9 3C           CMP    #60
9738                    BLT    HM4
9741    A5 59    HM3:   LDA    OFFSET           ;subtract 60 form total minutes
9742    38              SEC
9743    E9 3C           SBC    #60
9744    85 59           STA    OFFSET
9745    A5 5A           LDA    OFFSET+1
9746    E9 00           SBC    #0
9747    85 5A           STA    OFFSET+1
9748    EE 5F 02        INC    IBFR+4           ;and add 1 hr
9749    80 E4           BRA    HM2
9750    8D 60 02 HM4:   STA    IBFR+5           ;remaining minutes
9751    60              RTS ;       Title: Bit to day of week
;
;       Purpose: Convert bit set to day of the week
;
;       Entry: bit set in A (XMTWTFSS)
;       Exit: A= day of the week (1-7, 1=Monday)
;       RAM used: none 9761 B726         BIT2DOW:
9762 B726 18              CLC
9763 B727 A2 01           LDX    #1
9764 B729 2A              ROL    A
9765 B72A 2A      ?3:     ROL    A
9766 B72B B0 03           BCS    ?1
9767 B72D E8              INX
9768 B72E 80 FA           BRA    ?3
9769 B730 8A      ?1:     TXA
9770 B731 60              RTS ;       Title: Day of week to bit
;
;       Purpose: Convert day of the week to bit set in byte
;
;       Entry: A has day of the week (1-7, 1=Monday)
;       Exit: A has bit set (XMTWTFSS)
;       RAM used: none DOW2BIT:                         ;opposite of BIT2DOW
9782 B732 18              CLC
9783 B733 AA              TAX
```

```
9784  B734  A9 80              LDA    #10000000B
9785  B736  6A         ?1:     ROR    A
9786  B737  CA                 DEX
9787  B738  D0 FC              BNE    ?1
9788  B73A  60                 RTS
9789
9790
9791                    ;      Title: Day to week
9792                    ;
9793                    ;      Purpose: Convert # of days to # of weeks
9794                    ;
9795                    ;      Entry: A= number of days
9796                    ;      Exit: A= number of weeks (integer divide)
9797                    ;      RAM used:  none
9798
9799                    DAY2WEEK:                   ;A = A / 7
9800  B73B  A8                 tay                 ;dividend lsb
9801  B73C  A9 00              lda    #0           ;dividend msb
9802  B73E  A2 07              ldx    #7           ;divisor
9803  B740  20 00 00           jsr    R9_divide
9804  B743  60                 rts                 ;result in A
9805
9806
9807                    ;      Title: Week to day
9808                    ;
9809                    ;      Purpose: Convert # of weeks to # of days
9810                    ;
9811                    ;      Entry: A=# of weeks
9812                    ;      Exit: A=# of days
9813                    ;      RAM used:  none
9814
9815                    WEEK2DAY:                   ;A = A * 7
9816                                                ;multiplier already in A
9817  B744  A0 07              ldy    #7           ;multiplicand
9818  B746  20 00 00           jsr    R9_mult
9819  B749  98                 tya                 ;8 bit result in A
9820  B74A  60                 rts
9821
9822
9823
9824                    ;      Title: get key
9825                    ;
9826                    ;      Purpose: Return a key if any
9827                    ;               This routine is the place where the CPU spends most
9828                    ;               of its time in the human-machine interface mode.
9829                    ;               For this reason, the maintenance task is called here.
9830                    ;
9831                    ;      Entry: none
9832                    ;      Exit: key pressed in A, Z flag set if no key
9833                    ;      RAM used:  ?
9834
9835                    GETKEY:                     ;return key pressed in A
9836                                                ;z flag set if no key
9837  B74B  20 2E 83           jsr    maintenance  ;maintain system
9838  B74E  20 00 00           jsr    R2_get_key
9839  B751  AA                 tax
9840  B752  F0 06              beq    ?1
```

```
9841  B754  78              sei
9842  B755  20 00 00         jsr    R2_clear_key
9843  B758  58              cli
9844  B759  AA              tax
9845  B75A  60         ?1:  rts
9846
9847
9848              DKCLR:                       ;clear display and keys
9849  B75B  20 00 00         jsr    video_clear
9850  B75E  20 4B B7         jsr    GETKEY
9851  B761  60              rts
9852
9853              get_time:                    ;get time from user
9854                                           ;in: IBFR+4=hour, minute
9855                                           ;out: carry set if help,
9856                                           ;   else IBFR+4=hour, minute
9857  B762  AD 5F 02         lda    IBFR+4
9858  B765  AC 60 02         ldy    IBFR+5
9859  B768  20 00 00         JSR    enter_time
9860  B76B  90 01            BCC    ?1
9861  B76D  60              rts
9862  B76E  8D 5F 02    ?1:  sta    IBFR+4
9863  B771  8C 60 02         sty    IBFR+5
9864  B774  18              clc
9865  B775  60              rts
9866
9867
9868              ;    Title: Log history
9869              ;
9870              ;    Purpose: Assemble data to be sent to history manager
9871              ;
9872              ;    Entry: A=key (bbbbtttt, b=bank, t=type)
9873              ;           different params needed depending on key
9874              ;    Exit: event logged
9875              ;    RAM used:  hbfr
9876
9877              log_history:                 ;assemble data to be sent to history
9878  B776  8D 65 02         sta    hbfr
9879  B779  29 0F            and    #00001111b
9880  B77B  8D 66 02         sta    hbfr+1    ;hbfr+1=type
9881  B77E  4E 65 02         lsr    hbfr
9882  B781  4E 65 02         lsr    hbfr
9883  B784  4E 65 02         lsr    hbfr
9884  B787  4E 65 02         lsr    hbfr      ;hbfr=bank
9885  B78A  F0 01            beq    ?bank0
9886                                           ;history banks 1-2 not avail yet
9887  B78C  60              rts
9888  B78D         ?bank0:
9889  B78D  48              pha               ;push the key
9890  B78E  AE 04 02         ldx    month     ;push the date, time
9891  B791  DA              phx
9892  B792  AE 05 02         ldx    day
9893  B795  DA              phx
9894  B796  AE 01 02         ldx    hour
9895  B799  DA              phx
9896  B79A  AE 02 02         ldx    minute
9897  B79D  DA              phx
```

```
9899  B79E  A5 45                    lda     VALVE           ;push valve
9899  B7A0  48                       pha
9900  B7A1  AD 66 02                 lda     hbfr+1
9901  B7A4  C9 02                    cmp     #2
9902  B7A6  F0 0B                    beq     ?0
9903  B7A8  A0 04                    ldy     #4              ;auto, push scheduled duration
9904  B7AA  B1 6B                    lda     (STARTPTR),y
9905  B7AC  48                       pha
9906  B7AD  C8                       iny
9907  B7AE  B1 6B                    lda     (STARTPTR),y
9908  B7B0  48                       pha
9909  B7B1  80 04                    bra     ?done
9910  B7B3  A9 00          ?0:       lda     #0              ;manual, push spare bytes
9911  B7B5  48                       pha
9912  B7B6  48                       pha
9913
9914  B7B7  AD 65 02       ?done:    lda     hbfr            ;8 bytes are on stack
9915  B7BA  20 00 00                 jsr     history_write
9916  B7BD  60                       rts
9917
9918
9919                       ;         Title:  display bank1
9920                       ;
9921                       ;         Purpose: Get text from bank 1 of ROM and display it
9922                       ;
9923                       ;         Entry: A=msb, Y=lsb of text address (external)
9924                       ;         Exit:  text displayed
9925                       ;         RAM used: none
9926
9927  B7BE           display_bank1:
9928  B7BE  A2 00                    ldx     #0
9929  B7C0  20 E0 FF                 jsr     to_bank1        ;bank1 code moves text to msgbfr
9930  B7C3  A9 0A                    lda     #>msgbfr        ;then show it
9931  B7C5  A0 00                    ldy     #<msgbfr
9932  B7C7  20 00 00                 jsr     display_msg
9933  B7CA  60                       rts
9934
9935
9936                       ;         Title:  get option from bank 1
9937                       ;
9938                       ;         Purpose: Get text from bank 1 of ROM and select option
9939                       ;
9940                       ;         Entry: A=msb, Y=lsb of text address (external)
9941                       ;         Exit:  same as get_option
9942                       ;         RAM used: none
9943
9944  B7CB           get_option_bank1:
9945  B7CB  DA                       phx                     ;save initial selection
9946  B7CC  A2 01                    ldx     #1
9947  B7CE  20 E0 FF                 jsr     to_bank1        ;bank1 code moves text to msgbfr
9948  B7D1  68                       pla                     ;get back initial selection
9949  B7D2  A2 0A                    ldx     #>msgbfr        ;then show options
9950  B7D4  DA                       phx
9951  B7D5  A2 00                    ldx     #<msgbfr
9952  B7D7  DA                       phx
9953  B7D8  A2 01                    ldx     #1              ;mode 1
9954  B7DA  AC 18 02                 ldy     char_index      ;cursor location
```

```
9955                                                        ;initial selection still in A
9956   B7DD   20 00 00              jsr     get_option
9957   B7E0   60                    rts
9958
9959
9960                        ;       Title:  help_bank1
9961                        ;
9962                        ;       Purpose:  Get help text from bank 1 of ROM and display it
9963                        ;
9964                        ;       Entry: A=msb, Y=lsb of text address (external)
9965                        ;       Exit:  help entered
9966                        ;       RAM used:  none
9967
9968   B7E1                 help_bank1:
9969   B7E1   A2 01                  ldx     #1
9970   B7E3   20 E0 FF              jsr     to_bank1        ;bank1 code moves text to msgbfr
9971   B7E6   A9 0A                  lda     #)msgbfr        ;then show it
9972   B7E8   A0 00                  ldy     #(msgbfr
9973   B7EA   20 00 00              jsr     help_manager
9974   B7ED   60                    rts
9975
9976
9977                        ;       Title:  prompt
9978                        ;
9979                        ;       Purpose:  Show blinking up arrow in lower right corner
9980                        ;
9981                        ;       Entry: none
9982                        ;       Exit:  none
9983                        ;       RAM used:  none
9984
9985   B7EE                 prompt:
9986   B7EE   AD 18 02              lda     char_index
9987   B7F1   48                    pha
9988   B7F2                         SET_CURSOR LINE2+15
9992   B7F7   A9 06                  lda     #6
9993   B7F9   20 00 00              jsr     bchar
9994   B7FC   68                    pla
9995   B7FD   8D 18 02              sta     char_index
9996   B800   60                    rts
9997
9998                        ;--------------------------------------------------
9999                        ;       eeprom virtual device
10000                       ;--------------------------------------------------
10001
10002
10003                       ;       Title:  ram_to_ee
10004                       ;
10005                       ;       Purpose:  Move 128 bytes from ram area to EEPROM
10006                       ;
10007                       ;       Entry:  data at eeram
10008                       ;       Exit:   ram in eeprom
10009                       ;       RAM used:  none
10010
10011  BB01                 ram2ee:
10012  BB01   A9 0B                  lda     #)eeram
10013  BB03   A0 00                  ldy     #(eeram
10014  BB05   20 00 00              jsr     R3_write_all
```

```
10015   EE0E    60                          rts
10016
10017
10018
10019                           ;           Title:  ee to ram
10020                           ;
10021                           ;           Purpose: Read EEPROM contents into 128 byte ram area
10022                           ;
10023                           ;           Entry: none
10024                           ;           Exit: eeram area changed
10025                           ;           RAM used: none
10026
10027   EE0F                    ee2ram:
10028   EE0F    A9 0B                       lda     #)eeram
10029   EE0B    A0 00                       ldy     #(eeram
10030   EE0D    20 00 00                    jsr     R3_read_all
10031   EE10    60                          rts
10032
10033
10034
10035                           ;           Title:  eeram init
10036                           ;
10037                           ;           Purpose: fill virtual ram area with default values
10038                           ;
10039                           ;           Entry: 128 bytes at SSTBL
10040                           ;           Exit: eeram area changed
10041                           ;           RAM used: none
10042
10043   BB11                    eeram_init:
10044   BB11    A2 00                       ldx     #0
10045   BB13    BD B0 C2        ?loop:      lda     SSTBL,x
10046   BB16    9D 00 0B                    sta     eeram,x
10047   BB19    E8                          inx
10048   BB1A    E0 80                       cpx     #128
10049   BB1C    D0 F5                       bne     ?loop
10050   BB1E    60                          rts
10051
10052
10053                           ;           Title:  write ee checksum
10054                           ;
10055                           ;           Purpose: store 16-bit checksum in last 2 bytes of eeram
10056                           ;           Entry: A=msb, Y=lsb of checksum
10057                           ;           Exit: none
10058                           ;           RAM used: none
10059
10060   BB1F                    write_eesum:
10061   BB1F    8C 7E 0B                    sty     eesum
10062   BB22    8D 7F 0B                    sta     eesum+1
10063   BB25    60                          rts
10064
10065
10066                           ;           Title:  read ee checksum
10067                           ;
10068                           ;           Purpose: Calculate checksum of 126 bytes at eeram
10069                           ;                    and compare with eesum last 2 bytes of eeram)
10070                           ;           Entry: none
10071                           ;           Exit: A=msb, Y=lsb of checksum
```

```
10072                          ;       carry set if calculated sum does not match eesum
10073                          ;       RAM used; scratch+1
10074
10075  BB26                    read_eesum:
10076  BB26  64 71                     stz     scratch
10077  BB28  64 72                     stz     scratch+1
10078  BB2A  A2 00                     ldx     #0
10079  BB2C  BD 00 0B  ?loop:  lda     eeram,x                 ;read byte
10080  BB2F  18                        clc
10081  BB30  65 71                     adc     scratch
10082  BB32  85 71                     sta     scratch         ;add to sum
10083  BB34  A5 72                     lda     scratch+1
10084  BB36  69 00                     adc     #0
10085  BB38  85 72                     sta     scratch+1
10086  BB3A  E8                        inx
10087  BB3B  E0 7E                     cpx     #126
10088  BB3D  D0 ED                     bne     ?loop
10089
10090  BB3F  A5 71                     lda     scratch         ;checksum is neg of sum
10091  BB41  49 FF                     eor     #$FF
10092  BB43  85 71                     sta     scratch
10093  BB45  A5 72                     lda     scratch+1
10094  BB47  49 FF                     eor     #$FF
10095  BB49  85 72                     sta     scratch+1
10096
10097  BB4B  A4 71                     ldy     scratch         ;compare with existing sum
10098  BB4D  CC 7E 0B                  cpy     eesum           ;return lsb in Y
10099  BB50  D0 09                     bne     ?ng
10100  BB52  A5 72                     lda     scratch+1       ;msb in A
10101  BB54  CD 7F 0B                  cmp     eesum+1
10102  BB57  D0 02                     bne     ?ng
10103  BB59  18        ?ok:    clc                             ;match
10104  BB5A  60                        rts
10105  BB5B  38        ?ng:    sec                             ;no match
10106  BB5C  60                        rts
10107
10108
10109
10110
10111
10112
10113
10114
10115
10116  BB5D                            INCLUDE     VALVE.ASM
10117                          ;----------------------------------
10118                          ;       VALVE RESOURCE
10119                          ;----------------------------------
10120
10121
10122                          ;       Title:  valve on
10123                          ;       Purpose: turn valve bit on
10124                          ;               valve will be turned on by valve_update
10125                          ;
10126                          ;       Entry: valve number (1-8) in A
10127                          ;       Exit: none
10128                          ;       RAM used: none
```

```
:0129
:0130  B85D                valve_on:
:0131  B85D  AA                    tax
:0132  B85E  BD E5 19              lda    VS,X
:0133  B861  09 11                 ora    #00010001B      ;on and new
:0134  B863  9D E5 19              sta    VS,X
:0135  B866  60                    rts
10136
10137
10138               ;       Title:   valve off
10139               ;       Purpose: turn valve bit off
10140               ;                valve will be turned off by valve_update
10141               ;
10142               ;       Entry: valve number (1-8) in A
10143               ;       Exit: none
10144               ;       RAM used: none
10145
10146  B867                valve_off:
10147  B867  AA                    tax
10148  B868  BD E5 19              lda    VS,X
10149  B86B  29 EF                 and    #11101111B      ;off
10150  B86D  09 01                 ora    #00000001b      ;and new
10151  B86F  9D E5 19              sta    VS,X
10152  B872  60                    rts
10153
10154
10155               ;       Title:   valve update
10156               ;       Purpose: send out valve pulses
10157               ;                based on VS bytes
10158               ;
10159               ;       Entry: VS (0-8)
10160               ;       Exit: none
10161               ;       RAM used: VS
10162
10163  B873                valve_update:
10164  B873                        set    VS              ;for valve=1 to 8
10168  B878  AE E5 19      ?0:     ldx    VS
10169  B87B  BD E5 19              lda    VS,x
10170  B87E  29 01                 and    #00000001b      ;if new,
10171  B880  F0 23                 beq    ?next
10172  B882  BD E5 19              lda    VS,x            ;make old
10173  B885  29 FE                 and    #11111110b
10174  B887  9D E5 19              sta    VS,x
10175  B88A  29 10                 and    #00010000b
10176  B88C  F0 05                 beq    ?off
10177                      ?on:                           ;turn on if requested
10178  B88E  BD 17 0B              LDA    VALVEID,X       ;get valve position and polarity
10179  B891  80 05                 bra    ?1
10180                      ?off:                          ;turn off if requested
10181  B893  BD 17 0B              LDA    VALVEID,X       ;get valve position
10182  B896  49 40                 EOR    #01000000B      ;reverse the polarity
10183
10184  B898  85 06         ?1:     STA    VALVE_SETUP     ;valve position and polarity
10185  B89A  A9 03                 lda    #3
10186  B89C  85 07                 sta    VALVE_ENABLE    ;pulse on
:0187  B89E  A9 38                 lda    #56             ;wait via software loop
.0188  B8A0  20 00 00              jsr    R9_wait_ms
```

```
:0189   B8A3  64 07               STZ    VALVE_ENABLE  ;pulse off
10190
10191   B8A5  EE E5 19   ?next:    inc    VS            ;next valve
10192   B8A8  AD E5 19             lda    VS
10193   B8AB  C9 09                cmp    #9
10194   B8AD  D0 C9                bne    ?0
10195   B8AF  60                   rts
10196
10197
10198                    ALL_VALVES_OFF:               ;turn all valves off that are on
10199                                                  ;carry set if any valves turned off
10200   B8B0  9C E5 19             STZ    VS
10201   B8B3  A9 08                LDA    #8
10202   B8B5  85 45                STA    VALVE
10203   B8B7  A6 45     ?0:        LDX    VALVE
10204   B8B9  BD E5 19             LDA    VS,X
10205   B8BC  29 10                AND    #00010000B
10206   B8BE  F0 0A                BEQ    ?1
10207   B8C0  A5 45                lda    VALVE
10208   B8C2  20 67 B8             jsr    valve_off
10209   B8C5                       SET    VS
10213   B8CA  C6 45     ?1:        DEC    VALVE
10214   B8CC  D0 E9                BNE    ?0
10215   B8CE  AD E5 19             LDA    VS
10216   B8D1  D0 02                BNE    ?2
10217   B8D3  18                   CLC                  ;nothing to turn off
10218   B8D4  60                   RTS
10219   B8D5  20 73 B8  ?2:        jsr    valve_update  ;somebody needs turning off
10220   B8D8  38                   sec
10221   B8D9  60                   RTS
10222
10223
10224
10225
10226                    ;     Title: is valve
10227                    ;     Purpose: test valve
10228                    ;
10229                    ;     Entry: valve number (1-8) in A
10230                    ;            A/D must be on
10231                    ;     Exit: reading in A, Y=0 if valve, 1 if open, 2 if shorted
10232                    ;     RAM used: none
10233
10234                    is_valve:                      ;get position from valve #
10235   B8DA  AA                   tax
10236   B8DB  BD 17 0B             lda    VALVEID,x
10237   B8DE  29 07                and    #00000111b
10238   B8E0  20 00 00             jsr    R6_isvalve    ;send it to kernal routine
10239   B8E3  60                   rts
10240
10241
10242
10243                    ;     Title: all enable
10244                    ;     Purpose: enable all valves
10245                    ;
10246                    ;     Entry: none
10247                    ;     Exit: none
10248                    ;     RAM used: VS
```

```
10249
10250                              all_enable:                    ;enable all valves
10251     B8E4                         set     VS
10255     B8E9  AD E5 19     ?1:       lda     VS
10256     B8EC  20 FA B8               jsr     valve_enable
10257     B8EF  EE E5 19               inc     VS
10258     B8F2  AD E5 19               lda     VS
10259     B8F5  C9 09                  cmp     #9
10260     B8F7  D0 F0                  bne     ?1
10261     B8F9  60                     rts
10262
10263                         ;    Title: valve_enable
10264                         ;    Purpose: enable a valve
10265                         ;
10266                         ;    Entry: valve number (1-8) in A
10267                         ;    Exit: none
10268                         ;    RAM used: none
10269
10270     B8FA                valve_enable:
10271     B8FA  AA                     tax
10272     B8FB  A9 01                  lda     #1
10273     B8FD  9D A1 0B               sta     ENABLES,X
10274     B900  60                     rts
10275
10276
10277
10278                         ;    Title: buffer to valve ID
10279                         ;    Purpose: move input buffer to valve ID
10280                         ;
10281                         ;    Entry: ami_bfr is position ordered, contains valve #s
10282                         ;           example: ami_bfr,3 = 6 means valve 6 @ position 3
10283                         ;                    ami_bfr,2 = 0 means no wire @ position 2
10284                         ;    Exit: VALVEID is valve ordered, contains byte to send to drivers
10285                         ;           example: VALVEID,3 = 4 means valve 3 is @ position 4
10286                         ;                    the actual byte will be 00100100b
10287                         ;                    VALVEID,8 = $80 means valve 8 not assigned.
10288                         ;    RAM used: POSITION, VALVE
10289
10290     B901                BFR2VID:
10291     B901  A2 08                  LDX     #8
10292     B903  9E 17 0B     BF0:      STZ     VALVEID,X      ;clear valve ID area
10293     B906  CA                     DEX
10294     B907  D0 FA                  BNE     BF0
10295
10296     B909                         set     VALVE          ;for each valve,
10300     B90D  A2 08        ?pos:     ldx     #8
10301     B90F  BD 4D 17     ?0:       lda     ami_bfr,x      ;find it's position
10302     B912  C5 45                  cmp     VALVE
10303     B914  F0 07                  beq     ?found
10304     B916  CA                     dex
10305     B917  10 F6                  bpl     ?0
10306                        ?not_found:                      ;not found, set MSB
10307     B919  A9 80                  lda     #$80
10308     B91B  80 01                  bra     ?1
10309     B91D  8A           ?found:   txa
10310     B91E  A6 45        ?1:       ldx     VALVE          ;store position
10311     B920  9D 17 0B               sta     VALVEID,x      ;position duplicated in bits 3-5
```

```
                            ASL    A
                            ASL    A
                            ASL    A
                            ORA    VALVEID,X
                            STA    VALVEID,X

INC    VALVE          ;until no more left
                            LDA    VALVE
                            CMP    #9
                            BNE    ?pos
                            RTS VID2BFR:                        ;move existing valve IDs to bfr area
                            JSR    CLR_IDBFR      ;clear bfr area
                            SET    VALVE
10331  B93C  A6 45   IB1:    LDX    VALVE          ;for each valve,
10332  B93E  BD 17 OB        LDA    VALVEID,X      ;move position to bfr
10333  B941  30 08           bmi    IB2            ;unless valve not assigned
10334  B943  29 07           AND    #00000111B
10335  B945  AA              TAX
10336  B946  A5 45           LDA    VALVE
10337  B948  9D 4D 17        STA    mi_bfr,X
10338  B94B  E6 45   IB2:    INC    VALVE          ;until no more
10339  B94D  A5 45           LDA    VALVE
10340  B94F  C9 09           CMP    #9
10341  B951  D0 E9           BNE    IB1
10342  B953  60              RTS
10343
10344                  ;     Title: display station ID
10345                  ;     Purpose: show IDs in mi_bfr
10346                  ;     Entry: ID in mi_bfr
10347                  ;            A=number of stations, Y=pump number
10348                  ;            char_index
10349                  ;     Exit: ID displayed
10350                  ;     RAM used: scratch+1, POSITION
10351
10352                  DISPID:                    ;display contents of ID bfr
10353  B954  85 71           sta    scratch
10354  B956  84 72           sty    scratch+1
10355  B958  64 65           STZ    POSITION
10356  B95A  A6 65   DID0:   LDX    POSITION       ;in positional order (0-7)
10357  B95C  BD 4D 17        LDA    mi_bfr,X
10358  B95F  F0 0E           beq    ?0
10359  B961  C5 72           cmp    scratch+1      ;if =pump then show P
10360  B963  D0 04           bne    ?1
10361  B965  A9 50           lda    #'P'
10362  B967  80 0C           bra    DID2
10363  B969  C5 71   ?1:     cmp    scratch        ;if > numsta then
10364  B96B                  blt    DID1
10367  B96D  F0 04           beq    DID1
10368  B96F  A9 2D   ?0:     LDA    #'-'           ;show special-char
10369  B971  80 02           BRA    DID2
10370  B973  09 30   DID1:   ORA    #ASCMASK       ;else show valve #
10371  B975  20 00 00 DID2:  jsr    dchar
10372  B978  E6 65           INC    POSITION
10373  B97A  A5 65           LDA    POSITION
```

```
10374  B97C  C9 0B            CMP     #B
10375  B97E  D0 DA            BNE     DID0
10376  B980  60               RTS
10377
10378                CLR_IDBFR:                      ;store zeros in ID bfr
10379  B981  A2 07            LDX     #7
10380  B983  9E 4D 17  CI0:   STZ     msi_bfr,X      ;clear bfr area
10381  B986  CA               DEX
10382  B987  10 FA            BPL     CI0
10383  B989  60               RTS
10384
10385
10386                ;THESE ROUTINES MANAGE VALVES FOR WATERING
10387
10388                VALVEON:                        ;start up a valve start
10389  B98A  A6 45            LDX     VALVE          ;clear time on
10390  B98C             DBLX
10397  B991  9E 79 19         STZ     TIMEON,X
10398  B994  9E 7A 19         STZ     TIMEON+1,X
10399  B997  A0 04            LDY     #4             ;set up duration
10400  B999  B1 6B            LDA     (STARTPTR),Y
10401  B99B  9D 67 19         STA     TR,X
10402  B99E  C8               INY
10403  B99F  B1 6B            LDA     (STARTPTR),Y
10404  B9A1  9D 68 19         STA     TR+1,X
10405  B9A4  A5 45            lda     VALVE
10406  B9A6  20 5D BB         jsr     valve_on
10407  B9A9  A9 01            lda     #$01
10408  B9AB  20 76 B7         jsr     log_history    ;tell history
10409  B9AE  60               RTS
10410
10411                VALVEOFF:                       ;finish a valve start
10412  B9AF  A5 45            lda     VALVE          ;turn the valve off
10413  B9B1  20 67 BB         jsr     valve_off
10414  B9B4  60               RTS
10415
10416
10417                ;   Title:   station wire check
10418                ;   Purpose: check condition of 8 positions
10419                ;
10420                ;   Entry:   none
10421                ;   Exit:    8 ASCII bytes on stack
10422                ;            top connector position pushed last
10423                ;   RAM used: none
10424
10425  B9B5         station_wire_check:
10426  B9B5             save_retadr
10432  B9BD  20 00 00         jsr     R7_ad_on
10433  B9C0  A9 07            lda     #7
10434  B9C2  8D E5 19         sta     VS             ;start at position 8
10435  B9C5  AD E5 19  ?loop: lda     VS
10436  B9C8  20 00 00         jsr     R6_isvalve
10437  B9CB  C0 02            cpy     #2
10438  B9CD  D0 04            bne     ?1
10439  B9CF  A9 78            lda     #'x'           ;shorted
10440  B9D1  80 0A            bra     ?3
10441  B9D3  C0 01    ?1:     cpy     #1
```

```
0442  B9D5  F0 04              beq      ?2
0443  B9D7  A9 56              lda      #'V'         ;good valve
0444  B9D9  80 02              bra      ?3
0445  B9DB  A9 6F       ?2:    lda      #'o'         ;open
0446  B9DD  48          ?3:    pha
0447  B9DE  CE E5 19           dec      VS
0448  B9E1  10 E2              bpl      ?loop
0449  B9E3
0450  B9E3  20 00 00           jsr      R7_ad_off
0451  B9E6                     get_retadr
0452  B9EE  60                 rts
0458
0459
0460                    ;      Title: self test
0461                    ;      Purpose: check condition of valves
0462                    ;
0463                    ;      Entry: none
0464                    ;      Exit: selfram = valves shorted
0465                    ;            selfram+1 = valves open
0466                    ;            both 0 = all valves OK (1-numsta)
0467                    ;      RAM used: scratch
0468
0469  B9EF               selftest:
0470  B9EF  20 00 00           jsr      R7_ad_on
0471  B9F2  A9 01              lda      #1
0472  B9F4  85 71              sta      scratch      ;valve number
0473  B9F6  9C E3 19           stz      selfram      ;valves shorted
0474  B9F9  9C E4 19           stz      selfram+1    ;valves open
0475
0476  B9FC  A5 71       ?loop: lda      scratch      ;test the valve
0477  B9FE  20 DA B9           jsr      is_valve
0478  BA01  C0 02              cpy      #2           ;save the results
0479  BA03  F0 06              beq      ?2
0480  BA05  C0 01              cpy      #1
0481  BA07  F0 0C              beq      ?1
0482  BA09  80 14              bra      ?0
0483  BA0B  38          ?2:    sec                   ;valve shorted
0484  BA0C  6E E3 19           ror      selfram
0485  BA0F  18                 clc
0486  BA10  6E E4 19           ror      selfram+1
0487  BA13  80 30              bra      ?done        ;skip pulse
0488  BA15  18          ?1:    clc                   ;valve open
0489  BA16  6E E3 19           ror      selfram
0490  BA19  38                 sec
0491  BA1A  6E E4 19           ror      selfram+1
0492  BA1D  80 0B              bra      ?3
0493  BA1F  18          ?0:    clc                   ;good valve
0494  BA20  6E E3 19           ror      selfram
0495  BA23  18                 clc
0496  BA24  6E E4 19           ror      selfram+1
0497
0498                    ?3:                          ;now hit valves to avoid sticking
0499  BA27  A6 71              ldx      scratch      ;if was on before test, no need to pulse
0500  BA29  BD E5 19           lda      VS,x
0501  BA2C  29 10              and      #00010000b
0502  BA2E  D0 15              bne      ?done
0503
```

```
0504   BA30   A5 71              lda      scratch         ;turn valve on
0505   BA32   20 5D B8           jsr      valve_on
0506   BA35   20 73 B8           jsr      valve_update
0507   BA38   A9 3C              lda      #60             ;give it time to complete it's travel
0508   BA3A   20 00 00           jsr      R9_wait_ms
0509   BA3D   A5 71              lda      scratch
0510   BA3F   20 67 B8           jsr      valve_off       ;then turn it off
0511   BA42   20 73 B8           jsr      valve_update
0512
0513   BA45   E6 71      ?done:  inc      scratch         ;test valves 1-numsta
0514   BA47   A5 71              lda      scratch
0515   BA49   CD 3B 0B           cmp      numsta
0516   BA4C                      blt      ?loop
0519   BA4E   F0 AC              beq      ?loop
0520   BA50   C9 09              cmp      #9
10521  BA52   F0 0A              beq      ?exit
10522  BA54   18                 clc                      ;keep going to right justify results
10523  BA55   6E E3 19           ror      selfram
10524  BA58   18                 clc
10525  BA59   6E E4 19           ror      selfram+1
10526  BA5C   80 E7              bra      ?done
10527  BA5E   20 00 00   ?exit:  jsr      R7_ad_off
10528  BA61   60                 rts
10529
10530
10531
10532
10533                        ;   Title: disable shorts
10534                        ;   Purpose: prevent watering with shorted valves
10535                        ;
10536                        ;   Entry: valves shorted in A (msb=stn#8, lsb=stn#1)
10537                        ;   Exit: ENABLES modified
10538                        ;   RAM used:  none
10539
10540  BA62                      disable_shorts:
10541  BA62   A2 01              ldx      #1
10542  BA64   4A         ?loop:  lsr      A
10543  BA65   90 03              bcc      ?next
10544  BA67   9E A1 0B           stz      ENABLES,x       ;disable shorted valve
10545  BA6A   E8         ?next:  inx
10546  BA6B   E0 09              cpx      #9
10547  BA6D   D0 F5              bne      ?loop
10548  BA6F   60                 rts
10549
10550
10551
10552
10553
10554
10555
10556  BA70                      INCLUDE        GEN.ASM
10557
10558                        ;.  Title: generate
10559                        ;
10560                        ;   Purpose: Create today's watering schedule
10561                        ;
10562                        ;   Entry: A= budget to use
```

```
10563                      ;              Y=mode  bit 0 - 1=use scheduled base
10564                      ;                      bit 1 - 1=use syringes
10565                      ;                      bit 2 - 1=use scheduled soak
10566                      ;                      bit 3 - 1=use special
10567                      ;                      bit 4 - 1=use xtime
10568                      ;                      bit 5 - 1=use semi-auto soak dur
10569                      ;                      bit 6 - 1=use semi-auto test dur
10570                      ;                      bit 7 - 1=use semi-auto base dur
10571                      ;              X=semi-auto test duration)
10572                      ;              stack: return address
10573                      ;                     lsb, msb of day number for base
10574                      ;                     lsb, msb of week number for base
10575                      ;                     day of the week
10576                      ;                     lsb, msb of day number for special
10577                      ;                     lsb, msb of week number for special
10578                      ;              Program to use is in OBJECT
10579                      ;
10580                      ;       Exit:  Schedule is created at STARTS, and
10581                      ;              NSTARTS = total starts, 0 if nothing scheduled
10582                      ;              DONETIME shows when watering will be finished
10583                      ;                     =0 if nothing scheduled for today
10584                      ;              NSPLIT = number of splits for each valve
10585                      ;                      (base or soak)
10586                      ;              NSYR = number of syringes (same for each valve)
10587                      ;              NSPEC = number of special starts for each valve
10588                      ;              (schedule may go past midnite)
10589                      ;
10590                      ;       RAM used:  lots of it
10591
10592
10593        0000           dead_time    equ     0       ;minutes between valve starts
10594
10595                       GENERATE:                    ;generate today's schedule
10596                                                    ;save passed params
10597  BA70  8D AD 19               sta    gram         ;budget
10598  BA73  8C AE 19               sty    gram+1       ;mode
10599  BA76  8E AF 19               stx    gram+2       ;semi-auto test duration
10600  BA79  7A                     ply                 ;save return address
10601  BA7A  FA                     plx
10602  BA7B  68                     pla                 ;save day number
10603  BA7C  8D B2 19               sta    gbfr
10604  BA7F  68                     pla
10605  BA80  8D B3 19               sta    gbfr+1
10606  BA83  68                     pla
10607  BA84  8D B4 19               sta    gbfr+2
10608  BA87  68                     pla
10609  BA88  8D B5 19               sta    gbfr+3
10610  BA8B  68                     pla
10611  BA8C  8D B6 19               sta    gbfr+4
10612  BA8F  68                     pla
10613  BA90  8D B7 19               sta    gbfr+5
10614  BA93  68                     pla
10615  BA94  8D B8 19               sta    gbfr+6
10616  BA97  68                     pla
10617  BA98  8D B9 19               sta    gbfr+7
10618  BA9B  68                     pla
10619  BA9C  8D BA 19               sta    gbfr+8
```

```
10620  BA5F  DA                    phx                    ;restore return address
10621  BAA0  5A                    phy
10622                               ;
10623  BAA1  A5 45                 lda   VALVE            ;save non-local variables
10624  BAA3  48                    pha
10625  BAA4  A5 40                 lda   LSB
10626  BAA6  48                    pha
10627  BAA7  A5 41                 lda   MSB
10628  BAA9  48                    pha
10629  BAAA  A5 60                 lda   SUB
10630  BAAC  48                    pha
10631
10632  BAAD  A2 08       6E00:     LDX   #8               ;clear split counters
10633  BAAF  9E 39 0F    6E9:      STZ   NSPLIT,X
10634  BAB2  9E 43 0F              STZ   NSPEC,X
10635  BAB5  CA                    DEX
10636  BAB6  D0 F7                 BNE   6E9
10637  BAB8  9C 36 0F              STZ   NSTARTS
10638  BABB  9C 42 0F              STZ   NSYR
10639  BABE                        SET   VALVE
10643  BAC2  9C 37 0F              stz   DONETIME
10644  BAC5  9C 38 0F              stz   DONETIME+1
10645                                                     ;from 6E10-6E40:
10646                                                     ;set up TR, NXTTIME, and BASETYPE
10647                                                     ;for each station
10648
10649  BAC8  A6 45       6E10:     ldx   VALVE            ;start with no duration
10650  BACA                        DBLX
10657  BACF  9E 67 19              stz   TR,x
10658  BAD2  9E 68 19              stz   TR+1,x
10659
10660  BAD5  AD AE 19              lda   gran+1           ;if semi-auto,
10661  BAD8  29 E0                 and   #11100000b
10662  BADA  F0 53                 beq   6E11
10663                                                     ;then use selected duration
10664  BADC  A6 45                 ldx   VALVE
10665  BADE  AD AE 19              lda   gran+1
10666  BAE1  29 80                 and   #10000000b
10667  BAE3  F0 17                 beq   ?2
10668  BAE5  9E A3 19              stz   BASETYPE,x       ;if normal,
10669  BAE8                        DBLX
10676  BAED  BD 22 0E              lda   DUR1,x           ;then use base duration
10677  BAF0  9D 67 19              sta   TR,x
10678  BAF3  BD 23 0E              lda   DUR1+1,x
10679  BAF6  9D 68 19              sta   TR+1,x
10680  BAF9  4C 7B BC              jmp   6E30
10681  BAFC  AD AE 19    ?2:       lda   gran+1
10692  BAFF  29 20                 and   #00100000b
10683  BB01  F0 19                 beq   ?3
10684  BB03  A9 02                 lda   #2               ;if soak,
10685  BB05  9D A3 19              sta   BASETYPE,x
10686  BB08                        DBLX
10693  BB0D  BD 7F 0E              lda   DUR3,x           ;then use soak duration
10694  BB10  9D 67 19              sta   TR,x
10695  BB13  BD 80 0E              lda   DUR3+1,x
10696  BB16  9D 68 19              sta   TR+1,x
10697  BB19  4C 7B BC              jmp   6E30
```

```
10698  BB1C  A9 02       ?3:     lda     #2              ;else use test duration
10699  BB1E  9D A3 19            sta     BASETYPE,x
10700  BB21                      DBLX
10707  BB26  AD AF 19            lda     gram+2
10708  BB29  9D 67 19            sta     TR,x
10709  BB2C  4C 7B BC            jmp     6E30
10710
10711                    6E11:                           ;not semi_auto
10712  BB2F  A6 45               LDX     VALVE           ;work with base water
10713  BB31  9E A3 19            STZ     BASETYPE,X
10714
10715  BB34  AD AE 19            lda     gram+1          ;ignore if mode says so
10716  BB37  29 01               and     #00000001b
10717  BB39  F0 4E               beq     6EN
10718
10719  BB3B  AD 0B 0E            LDA     CYCLE_TYPE      ;first see who's scheduled to water today
10720  BB3E  C9 01               CMP     #1
10721  BB40  D0 03               BNE     6E12
10722  BB42  4C C4 BB            JMP     6E15
10723                                                    ;so many days
10724  BB45              6E12:   MOV16   gbfr,LSB        ;see if user cycle=current day
10730  BB4F  80 0A               BRA     6E14
10731  BB51              6E13:   MOV16   gbfr+2,LSB      ;see if user cycle=current week
10737  BB5B              6E14:   DEC16   LSB             ;if DIVIDEND=1, (first day or week)
10748  BB6A  A5 40               LDA     LSB             ;everything is scheduled
10749  BB6C  05 41               ORA     MSB
10750  BB6E  F0 1C               BEQ     6EV
10751  BB70  A6 45               LDX     VALVE
10752  BB72                      DBLX
10759  BB77  BD 34 0E            LDA     CYCLE1,X
10760  BB7A  AA                  tax
10761  BB7B  E0 01               cpx     #1              ;if user cycle=1, always water
10762  BB7D  F0 0D               BEQ     6EV
10763  BB7F  A5 40               lda     LSB
10764  BB81  A4 41               ldy     MSB
10765  BB83  20 00 00            jsr     R9_divide       ;divide today by cycle
10766  BB86  98                  tya                     ;if no remainder, then water today
10767  BB87  F0 03               BEQ     6EV
10768
10769                    6EN:                            ;else no water today for this valve
10770  BB89  4C E2 BB            JMP     6E20
10771
10772  BB8C  A6 45      6EV:     LDX     VALVE           ;water today
10773  BB8E                      DBLX
10780  BB93  BD 22 0E            LDA     DUR1,X          ;use entered duration
10781  BB96  9D 67 19            STA     TR,X
10782  BB99  85 40               STA     LSB
10783  BB9B  BD 23 0E            LDA     DUR1+1,X
10784  BB9E  9D 68 19            STA     TR+1,X
10785                                                    ;modified by budget
10786  BBA1  AC AD 19            ldy     gram
10787  BBA4  A5 40               lda     LSB             ;TR = TR * budget /100
10788  BBA6  20 00 00            jsr     R9_mult
10789  BBA9  A2 00               ldx     #0              ;divisor
10790  BBAB  DA                  phx
10791  BBAC  A2 64               ldx     #100
10792  BBAE  DA                  phx
```

```
10793  BBAF  48              pha                      ;dividend
10794  BBB0  5A              phy
10795  BBB1  20 00 00        jsr     R9_div16
10796  BBB4  A6 45           LDX     VALVE            ;store quotient
10797  BBB6          DBLX
10804  BBBB  9D 68 19        sta     TR+1,X
10805  BBBE  98              tya
10806  BBBF  9D 67 19        sta     TR,X
10807  BBC2  80 1E           BRA     6E20
10808
10809                                                 ;specific days
10810  BBC4          6E15:
10811  BBC4  AD B6 19        LDA     gbfr+4           ;generate at day of week
10812  BBC7  85 40           STA     LSB
10813  BBC9  A6 45   6E17:   LDX     VALVE            ;specific days
10814  BBCB          DBLX
10821  BBD0  BD 35 0E        LDA     CYCLE1+1,X       ;see if programmed day matches today
10822  BBD3  2A              ROL     A
10823  BBD4  A6 40           LDX     LSB
10824  BBD6  2A      6E16:   ROL     A
10825  BBD7  CA              DEX
10826  BBD8  D0 FC           BNE     6E16
10827  BBDA  90 03           BCC     6E18             ;not today
10828  BBDC  4C 51 BB        JMP     6E13             ;now see if it's the right week
10829  BBDF  4C 89 BB 6E18:  JMP     6EN
10830
10831                                                 ;a soak day will override the base watering
10832  BBE2  A6 45   6E20:   LDX     VALVE            ;SEE IF SOAK DAY
10833  BBE4  AD AE 19        lda     gram+1           ;ignore if mode says so
10834  BBE7  29 04           and     #00000100b
10835  BBE9  F0 0D           beq     6E2A
10836  BBEB          DBLX
10843  BBF0  BD 7F 0E        LDA     DUR3,X           ;or if no soak duration,
10844  BBF3  1D 80 0E        ORA     DUR3+1,X
10845  BBF6  D0 03           BNE     6E21
10846  BBF8  4C 7B BC 6E2A:  JMP     6E30
10847  BBFB  AD 0B 0E 6E21:  LDA     CYCLE_TYPE
10848  BBFE  C9 01           CMP     #1
10849  BC00  F0 5E           BEQ     6E25
10850
10851                                                 ;so many days
10852  BC02          6E22:   MOV16   gbfr,LSB         ;see if user cycle=current day
10858  BC0C  80 0A           BRA     6E24
10859  BC0E          6E23:   MOV16   gbfr+2,LSB       ;see if user cycle=current week
10865  BC18          6E24:   DEC16   LSB              ;if DIVIDEND=1, (first day or week)
10876  BC27  A5 40           LDA     LSB              ;everything is scheduled
10877  BC29  05 41           ORA     MSB
10878  BC2B  F0 19           BEQ     6ES
10879  BC2D  A6 45           LDX     VALVE
10880  BC2F          DBLX
10887  BC34  BD 91 0E        LDA     CYCLE3,X
10888  BC37  AA              tax
10889  BC38  E0 01           cpx     #1               ;if user cycle=1, always soak
10890  BC3A  F0 0A           beq     6ES
10891  BC3C  A4 40           ldy     LSB
10892  BC3E  A5 41           lda     MSB
10893  BC40  20 00 00        jsr     R9_divide        ;divide today by cycle
```

| | | | | | | |
|---|---|---|---|---|---|---|
| 10894 | BC43 | 9B | | tya | | ;if no remainder, then water today |
| 10895 | BC44 | D0 35 | | BNE | 6E30 | |
| 10896 | | | | | | |
| 10897 | BC46 | A6 45 | 6E5: | LDX | VALVE | ;water with soak duration |
| 10898 | BC48 | A9 02 | | LDA | #2 | |
| 10899 | BC4A | 9D A3 19 | | STA | BASETYPE,X | |
| 10900 | BC4D | | | DBLX | | |
| 10907 | BC52 | BD 7F 0E | | LDA | DUR3,X | |
| 10908 | BC55 | 9D 67 19 | | STA | TR,X | |
| 10909 | BC58 | BD 80 0E | | LDA | DUR3+1,X | |
| 10910 | BC5B | 9D 68 19 | | STA | TR+1,X | |
| 10911 | BC5E | 80 1B | | BRA | 6E30 | |
| 10912 | | | | | | |
| 10913 | | | | | | ;specific days |
| 10914 | BC60 | | 6E25: | | | |
| 10915 | BC60 | AD B5 19 | | LDA | gbfr+4 | ;generate at day of week |
| 10916 | BC63 | 85 40 | | STA | LSB | |
| 10917 | BC65 | A6 45 | 6E27: | LDX | VALVE | |
| 10918 | BC67 | | | DBLX | | |
| 10925 | BC6C | BD 92 0E | | LDA | CYCLE3+1,X | ;see if programmed day matches today |
| 10926 | BC6F | 2A | | ROL | A | |
| 10927 | BC70 | A6 40 | | LDX | LSB | |
| 10928 | BC72 | 2A | 6E26: | ROL | A | |
| 10929 | BC73 | CA | | DEX | | |
| 10930 | BC74 | D0 FC | | BNE | 6E26 | |
| 10931 | BC76 | 90 03 | | BCC | 6E30 | ;not today |
| 10932 | BC78 | 4C 0E BC | | JMP | 6E23 | ;now see if it's the right week |
| 10933 | | | | | | |
| 10934 | BC7B | | 6E30: | | | |
| 10935 | BC7B | A6 45 | | LDX | VALVE | ;if valve has no time today, |
| 10936 | BC7D | | | DBLX | | |
| 10943 | BC82 | BD 67 19 | | LDA | TR,X | |
| 10944 | BC85 | 1D 68 19 | | ORA | TR+1,X | |
| 10945 | BC88 | D0 13 | | BNE | ?2 | |
| 10946 | BC8A | A6 45 | ?3: | LDX | VALVE | ;then don't water with this valve |
| 10947 | BC8C | | | DBLX | | |
| 10954 | BC91 | A9 FF | | LDA | #$FF | |
| 10955 | BC93 | 9D 92 19 | | STA | NXTTIME+1,X | |
| 10956 | BC96 | A9 FF | | LDA | #$FF | |
| 10957 | BC98 | 9D 91 19 | | STA | NXTTIME,X | |
| 10958 | BC9B | 80 0C | | BRA | ?5 | |
| 10959 | BC9D | AD 46 0E | ?2: | LDA | BASE_START | |
| 10960 | BCA0 | 9D 91 19 | | STA | NXTTIME,X | ;else set to start ASAP |
| 10961 | BCA3 | AD 47 0E | | LDA | BASE_START+1 | |
| 10962 | BCA6 | 9D 92 19 | | STA | NXTTIME+1,X | |
| 10963 | | | | | | |
| 10964 | BCA9 | E6 45 | ?5: | INC | VALVE | ;do the next valve |
| 10965 | BCAB | A5 45 | | LDA | VALVE | |
| 10966 | BCAD | CD 3B 0B | | cmp | numsta | |
| 10967 | BCB0 | | | blt | ?6 | |
| 10970 | BCB2 | F0 02 | | beq | ?6 | |
| 10971 | BCB4 | 80 03 | | bra | 6E40 | |
| 10972 | BCB6 | 4C CB BA | ?6: | JMP | 6E10 | |
| 10973 | | | | | | |
| 10974 | | | 6E40: | | | ;set up syring starts (NXTTIME(0)) if any |
| 10975 | | | | | | ;and E=time to begin generating |
| 10976 | | | | | | |

```
0977  BCB9                       MOV16  BASE_START,E
0983  BCC5                       MOV16  SYRINGE_START,NXTTIME
0989  BCD1  AD 7D 0E             LDA    SOFTEN          ;if SOFTEN=0,
0990  BCD4  0D 7E 0E             ORA    SOFTEN+1
0991  BCD7  F0 09                BEQ    ?5
0992  BCD9  AD AE 19             lda    gram+1          ;or if mode says so,
0993  BCDC  29 02                and    #00000010b
0994  BCDE  F0 02                BEQ    ?5
0995  BCE0  80 0C                bra    ?4
0996  BCE2  A9 FF        ?5:     LDA    #$FF            ;then no syringing
0997  BCE4  8D 92 19             STA    NXTTIME+1
0998  BCE7  A9 FF                LDA    #$FF
0999  BCE9  8D 91 19             STA    NXTTIME
              80 20              BRA    ?3
11001
11002                    ?4:                            ;start at base or syringe start,
11003  BCEE  AD 7A 0E             LDA    SYRINGE_START+1 ;whichever is earlier
11004  BCF1  CD 8E 19             CMP    E+1
11005  BCF4                       BLT    ?1
11008  BCF6  F0 02                BEQ    ?2
11009  BCF8  80 14                BRA    ?3
11010  BCFA  AD 79 0E     ?2:     LDA    SYRINGE_START
11011  BCFD  CD 8D 19             CMP    E
11012  BD00                       BGE    ?3
11015  BD02                ?1:    MOV16  SYRINGE_START,E
11021  BD0E
11022  BD0E                ?3:
11023  BD0E  20 1A C2             JSR    FIRSTSTART      ;init start pointer
11024
11025                    GENXT:                          ;OK, now we generate starts
11026  BD11  A9 FF                LDA    #$FF            ;find next valve up
11027  BD13  85 41                STA    MSB             ;it's the one with the lowest NXTTIME
11028  BD15  A9 FF                LDA    #$FF
11029  BD17  85 40                STA    LSB             ;LSB holds lowest time so far
11030  BD19  A9 08                LDA    #8              ;if a tie, the lowest valve # wins
11031  BD1B  8D B1 19             STA    gram+4
11032  BD1E  85 45                STA    VALVE
11033  BD20  AE B1 19    ?1:      LDX    gram+4          ;if NXTTIME <= lowest time,
11034  BD23                       DBLX
11041  BD28  BD 92 19             LDA    NXTTIME+1,X
11042  BD2B  C5 41                CMP    MSB
11043  BD2D                       BLT    ?4
11046  BD2F  F0 02                BEQ    ?2
11047  BD31  80 21                BRA    ?5
11048  BD33  BD 91 19    ?2:      LDA    NXTTIME,X
11049  BD36  C5 40                CMP    LSB
11050  BD38                       BLT    ?4
11053  BD3A  F0 02                BEQ    ?4
11054  BD3C  80 16                BRA    ?5
11055  BD3E  AD B1 19    ?4:      LDA    gram+4          ;then save that valve
11056  BD41  85 45                STA    VALVE
11057  BD43  A6 45                LDX    VALVE           ;and new lowest time
11058  BD45                       DBLX
11065  BD4A  BD 91 19             LDA    NXTTIME,X
11066  BD4D  85 40                STA    LSB
11067  BD4F  BD 92 19             LDA    NXTTIME+1,X
11068  BD52  85 41                STA    MSB
```

```
                        ?5:     DEC     gram+4
                                BNE     ?1

LDX     VALVE           ;if time remaining is 0 for next valve,
                                DBLX
                                LDA     TR,X
                                ORA     TR+1,X
                                BNE     6E50
                                JMP     6E65            ;that means no more watering left 6E50:   MOV16   E,S             ;start at end of last watering
                                LDX     VALVE
                                DBLX
                                LDA     S+1             ;if start before next allowable time,
                                CMP     NXTTIME+1,X
                                BLT     ?2
                                BEQ     ?1
                                BRA     6E55
                        ?1:     LDA     S
                                CMP     NXTTIME,X
                                BLT     ?2
                                BRA     6E55
                        ?2:     LDX     VALVE           ;then move start to there
                                DBLX
                                LDA     NXTTIME,X
                                STA     S
                                LDA     NXTTIME+1,X
                                STA     S+1

6E55:                           ;check if start is in syringe time
                                LDA     S+1
                                CMP     NXTTIME+1       ;if start >= NXTTIME(0)
                                BEQ     6E56
                                BLT     6E60
                                JMP     6SC
                        6E56:   LDA     S
                                CMP     NXTTIME
                                BLT     6E60
                                JMP     GSC             ;then generate syringe cycles 6E60:   LDA     gram+1          ;check if start is in xtime
                                and     #00001000b      ;skip check if mode says so
                                beq     6E70
                                LDA     S+1
                                CMP     XFROM+1         ;if start < XFROM
                                BLT     6E70
                                BEQ     ?1
                                BRA     ?2
                        ?1:     LDA     S
                                CMP     XFROM
                                BLT     6E70
                        ?2:     LDA     S+1             ;or if start >= XTO
                                CMP     XTO+1
                                BLT     ?4
                                BEQ     ?3
                                BRA     6E70
                        ?3:     LDA     S
```

| | | | | | | |
|---|---|---|---|---|---|---|
|11163|BDE9|CD 20 0E| |CMP|XTO| |
|11164|BDEC| | |BLT|?4| |
|11167|BDEE|80 26| |BRA|6E70|;then do nothing|
|11168|BDF0| |?4:|MOV16|XTO,E|;else move to end of xtime|
|11174|BDFC|4C 11 BD| |JMP|6ENXT| |
|11175| | | | | | |
|11176|BDFF|AD 92 19|6E65:|LDA|NXTTIME+1|;base watering done|
|11177|BE02|C9 FF| |CMP|#$FF|;check if any more syringes|
|11178|BE04|F0 03| |BEQ|?B| |
|11179|BE06|4C 04 C1| |JMP|GSC|;yes, generate syringe|
|11180|BE09|AD 91 19|?B:|LDA|NXTTIME| |
|11181|BE0C|C9 FF| |CMP|#$FF| |
|11182|BE0E|F0 03| |BEQ|?A| |
|11183|BE10|4C 04 C1| |JMP|GSC| |
|11184|BE13|4C B9 BF|?A:|JMP|6E97|;nope, all done|
|11185| | | | | | |
|11186|BE16|A6 45|6E70:|LDX|VALVE|;calculate watering time|
|11187|BE18| | |DBLX| | |
|11194|BE1D|BD 67 19| |LDA|TR,X|;use all of the time remaining|
|11195|BE20|8D 8F 19| |STA|WT| |
|11196|BE23|BD 68 19| |LDA|TR+1,X| |
|11197|BE26|8D 90 19| |STA|WT+1| |
|11198| | | | | | |
|11199|BE29|A6 45| |LDX|VALVE|;unless limited by MAXON|
|11200|BE2B|BD A3 19| |lda|BASETYPE,X|;(skip if base and disabled)|
|11201|BE2E|D0 05| |bne|?1| |
|11202|BE30|AD 0C 0E| |lda|MAXON| |
|11203|BE33|F0 25| |beq|6E75| |
|11204|BE35|BD 0C 0E|?1:|lda|MAXON,X|;(skip if MAXON=0)|
|11205|BE38|F0 20| |beq|6E75| |
|11206|BE3A|8D B1 19| |STA|gram+4|;if WT>MAXON then WT=MAXON|
|11207|BE3D| | |DBLX| | |
|11214|BE42|AD 90 19| |LDA|WT+1| |
|11215|BE45|D0 0A| |BNE|6E73| |
|11216|BE47|AD 8F 19| |LDA|WT| |
|11217|BE4A|CD B1 19| |CMP|gram+4| |
|11218|BE4D| | |BLT|6E75| |
|11221|BE4F|F0 09| |BEQ|6E75| |
|11222|BE51|AD B1 19|6E73:|LDA|gram+4| |
|11223|BE54|8D BF 19| |STA|WT| |
|11224|BE57|9C 90 19| |STZ|WT+1| |
|11225|BE5A| | | | | |
|11226|BE5A|9C B2 19|6E75:|STZ|gram+5|;init watering interrupted flag|
|11227|BE5D| | |ADD16|S,WT,E|;end= start + watering time|
|11236|BE70|18| |clc| |;insert dead time|
|11237|BE71|AD 8D 19| |lda|E| |
|11238|BE74|69 00| |adc|#dead_time| |
|11239|BE76|8D 8D 19| |sta|E| |
|11240|BE79|AD 8E 19| |lda|E+1| |
|11241|BE7C|69 00| |adc|#0| |
|11242|BE7E|8D 8E 19| |sta|E+1| |
|11243| | | | | |;check for watering into syringe cycle|
|11244|BE81|AD 8E 19| |LDA|E+1|;if end>NXTTIME(0)|
|11245|BE84|CD 92 19| |CMP|NXTTIME+1| |
|11246|BE87| | |BLT|6E80| |
|11249|BE89|F0 02| |BEQ|?B| |
|11250|BE8B|80 0A| |BRA|?A| |

```
11251  BE8D  AD 8D 19    ?B:    LDA    E
11252  BE90  CD 91 19           CMP    NXTTIME
11253  BE93                     BLT    6E80
11256  BE95  F0 28              BEQ    6E80
11257  BE97  38          ?A:    SEC                    ;then stop watering one min before
11258  BE98  AD 91 19           LDA    NXTTIME         ;start of syringe cycle
11259  BE9B  ED 8B 19           SBC    S
11260  BE9E  8D 8F 19           STA    WT
11261  BEA1  AD 92 19           LDA    NXTTIME+1
11262  BEA4  ED 8C 19           SBC    S+1
11263  BEA7  8D 90 19           STA    WT+1
11264  BEAA                     DEC16  WT
11275  BEBD  80 4B              BRA    6E8A
11276
11277  BEBF  AD AE 19    6E80:  LDA    gram+1          ;check for watering into xtime
11278  BEC2  29 08              and    #00001000b      ;skip check if mode says so
11279  BEC4  F0 2C              beq    ?3
11280  BEC6  AD 8C 19           LDA    S+1
11281  BEC9  CD 21 0E           CMP    XTO+1           ;if start >= XTO
11282  BECC                     BLT    ?7
11285  BECE  F0 02              BEQ    ?1
11286  BED0  80 20              BRA    ?3
11287  BED2  AD 8B 19    ?1:    LDA    S
11288  BED5  CD 20 0E           CMP    XTO
11289  BED8                     BGE    ?3
11292  BEDA  AD 8E 19    ?7:    LDA    E+1             ;or if end<=XFROM
11293  BEDD  CD 1F 0E           CMP    XFROM+1
11294  BEE0                     BLT    ?3
11297  BEE2  F0 02              BEQ    ?2
11298  BEE4  80 0E              BRA    ?4
11299  BEE6  AD 8D 19    ?2:    LDA    E
11300  BEE9  CD 1E 0E           CMP    XFROM
11301  BEEC                     BLT    ?3
11304  BEEE  F0 02              BEQ    ?3
11305  BEF0  80 02              BRA    ?4
11306  BEF2  80 2B       ?3:    BRA    6E85            ;then leave end alone
11307
11308  BEF4  38          ?4:    SEC                    ;else stop watering at beginning
11309  BEF5  AD 1E 0E           LDA    XFROM           ;of Xtime
11310  BEF8  ED 8B 19           SBC    S
11311  BEFB  8D 8F 19           STA    WT
11312  BEFE  AD 1F 0E           LDA    XFROM+1
11313  BF01  ED 8C 19           SBC    S+1
11314  BF04  8D 90 19           STA    WT+1
11315  BF07              6E8A:  ADD16  S,WT,E          ;calculate new end
11324  BF1A                     SET    gram+5              ;and set interrupted flag
11328
11329                    6E85:                          ;we now have a good watering time
11330                                                   ;with flag set if interrupted
11331
11332  BF1F  A6 45       6E87:  LDX    VALVE           ;modify time remaining
11333  BF21                     DBLX                   ;by subtracting watering time from it
11340  BF26  38                 SEC
11341  BF27  BD 67 19           LDA    TR,X
11342  BF2A  ED 8F 19           SBC    WT
11343  BF2D  9D 67 19           STA    TR,X
11344  BF30  BD 68 19           LDA    TR+1,X
```

| | | | | | |
|---|---|---|---|---|---|
|11345|BF33|ED 90 19| |SBC|WT+1|
|11346|BF36|9D 68 19| |STA|TR+1,X|
|11347|BF39|A6 45| |LDX|VALVE ;then set up for next time|
|11348|BF3B| | |DBLX| |
|11355|BF40|BD 67 19| |LDA|TR,X|
|11356|BF43|1D 68 19| |ORA|TR+1,X|
|11357|BF46|D0 0C| |BNE|6E90|
|11358|BF48|A9 FF| |LDA|#$FF ;no time left for this station,|
|11359|BF4A|9D 92 19| |STA|NXTTIME+1,X ;so no next time|
|11360|BF4D|A9 FF| |LDA|#$FF|
|11361|BF4F|9D 91 19| |STA|NXTTIME,X|
|11362|BF52|80 4E| |BRA|6E95|
|11363| | | | | |
|11364|BF54|AD B2 19|6E90:|LDA|gram+5       ;storing interrupted,|
|11365|BF57|F0 0F| |BEQ|6E91|
|11366|BF59|A6 45| |LDX|VALVE ;then make it next one to start|
|11367|BF5B| | |DBLX| |
|11374|BF60|9E 92 19| |STZ|NXTTIME+1,X|
|11375|BF63|9E 91 19| |STZ|NXTTIME,X|
|11376|BF66|80 3A| |BRA|6E95|
|11377|BF68|A6 45|6E91:|ldx|VALVE ;else next time=end|
|11378|BF6A| | |DBLX| |
|11385|BF6F|AD 8D 19| |lda|E|
|11386|BF72|9D 91 19| |sta|NXTTIME,X|
|11387|BF75|AD 8E 19| |lda|E+1|
|11388|BF78|9D 92 19| |sta|NXTTIME+1,X|
|11389|BF7B|A6 45| |ldx|VALVE ;add MINOFF to it|
|11390|BF7D|BD A3 19| |lda|BASETYPE,X ;(skip if base and disabled)|
|11391|BF80|D0 05| |bne|?1|
|11392|BF82|AD 0C 0E| |lda|MAXON|
|11393|BF85|F0 1B| |beq|6E95|
|11394|BF87|BD 15 0E|?1:|LDA|MINOFF,X|
|11395|BF8A|85 56| |STA|R2|
|11396|BF8C| | |DBLX| |
|11403|BF91|18| |CLC| |
|11404|BF92|BD 91 19| |LDA|NXTTIME,X|
|11405|BF95|65 56| |ADC|R2|
|11406|BF97|9D 91 19| |STA|NXTTIME,X|
|11407|BF9A|BD 92 19| |LDA|NXTTIME+1,X|
|11408|BF9D|69 00| |ADC|#0|
|11409|BF9F|9D 92 19| |STA|NXTTIME+1,X|
|11410| | | | | |
|11411|BFA2|A6 45|6E95:|LDX|VALVE ;send along base or soak|
|11412|BFA4|BD A3 19| |LDA|BASETYPE,X|
|11413|BFA7|85 60| |STA|SUB|
|11414|BFA9|20 25 C2| |JSR|BUILD_START ;make a start @ STARTPTR|
|11415| | | | |;using S, WT, VALVE|
|11416|BFAC|90 03| |BCC|6E96|
|11417|BFAE|4C B7 C0| |JMP|6ERR1 ;too many starts|
|11418|BFB1|A6 45|6E96:|LDX|VALVE|
|11419|BFB3|FE 39 0F| |INC|NSPLIT,X|
|11420|BFB6|4C 11 BD| |JMP|GENXT ;else do_next start|
|11421| | | | | |
|11422| | |6E97:| |;good exit|
|11423|BFB9|AD AE 19| |lda|gram+1 ;if mode says so,|
|11424|BFBC|29 0B| |and|#00001000b|
|11425|BFBE|D0 03| |bne|GENSPECIAL ;then do specials|

```
11426  BFC0  4C AD C0                  jmp       GS97
11427
11428
11429                       GENSPECIAL:                      ;generate today's special starts
11430  BFC3  AD A3 0E                  lda       NSPECIAL
11431  BFC6  D0 03                     bne       ?0
11432  BFC8  4C AD C0                  jmp       GS97
11433  BFCB            ?0:             LDW       gptr,SPECIALS   ;the special block in question
11438  BFD3  9C BC 19                  STZ       gctr            ;do 16 of them
11440
11441  BFD6            GS10:
11442  BFD6  A0 05                     LDY       #5              ;duration=0 are dead blocks
11443  BFD8  B1 81                     LDA       (gptr),Y
11444  BFDA  C8                        INY
11445  BFDB  11 81                     ORA       (gptr),Y
11446  BFDD  F0 02                     beq       ?1
11447  BFDF  80 03                     bra       GS11
11448  BFE1  4C 92 C0    ?1:           JMP       NEXTBLOCK       ;don't use this block
11449
11450                       GS11:                              ;see if block scheduled for turn-on today
11451  BFE4  AD 0B 0E                  LDA       CYCLE_TYPE
11452  BFE7  C9 01                     CMP       #1
11453  BFE9  D0 03                     BNE       GS12
11454  BFEB  4C 2E C0                  JMP       GS15
11455                                                          ;so many days
11456  BFEE            GS12:           MOV16     gbfr+5,LSB       ;see if user cycle=current day
11462  BFF8  80 0A                     BRA       GS14
11463  BFFA            GS13:           MOV16     gbfr+7,LSB       ;see if user cycle=current week
11469  C004            GS14:           DEC16     LSB             ;if DIVIDEND=1, (first day or week)
11480  C013  A5 40                     LDA       LSB             ;everything is scheduled
11481  C015  05 41                     ORA       MSB
11482  C017  F0 2A                     BEQ       GS30
11483  C019  A0 01                     LDY       #1
11484  C01B  B1 81                     LDA       (gptr),Y
11485  C01D  AA                        tax
11486  C01E  E0 01                     cpx       #1              ;if user cycle=1, always water
11487  C020  F0 21                     beq       GS30
11488  C022  A5 41                     lda       MSB
11489  C024  A4 40                     ldy       LSB
11490  C026  20 00 00                  jsr       R9_divide       ;divide today by cycle
11491  C029  98                        tya                       ;if no remainder, then water today
11492  C02A  F0 17                     BEQ       GS30
11493  C02C  80 64                     BRA       NEXTBLOCK       ;else don't turn on today
11494
11495                                                          ;specific days
11496  C02E  AD B6 19    GS15:         LDA       gbfr+4          ;generate at day of week
11497  C031  85 40                     STA       LSB
11498  C033  A0 02       GS17:         LDY       #2
11499  C035  B1 81                     LDA       (gptr),Y        ;see if programmed day matches today
11500  C037  2A                        ROL       A
11501  C038  A6 40                     LDX       LSB
11502  C03A  2A          GS16:         ROL       A
11503  C03B  CA                        DEX
11504  C03C  D0 FC                     BNE       GS16
11505  C03E  90 52                     BCC       NEXTBLOCK       ;not today
11506  C040  4C FA BF                  JMP       GS13            ;now see if it's the right week
11507
```

```
11508
11509                 6S30:                            ;generate a start for this block
11510                                                  ;at STARTPTR
11511   C043  AD 36 OF        LDA    NSTARTS          ;error if no more room
11512   C046  C9 80           CMP    #128
11513   C048                  BLT    6S31
11514   C04A  4C B7 C0        JMP    GERR1
11515   C04D  A0 03    6S31:  LDY    #3               ;build a start
11516   C04F  B1 81           LDA    (gptr),Y         ;start time
11519   C051  A0 00           LDY    #0
11520   C053  91 6B           STA    (STARTPTR),Y
11521   C055  A0 04           LDY    #4
11522   C057  B1 81           LDA    (gptr),Y
11523   C059  A0 01           LDY    #1
11524   C05B  91 6B           STA    (STARTPTR),Y
11525   C05D  A0 00           LDY    #0
11526   C05F  B1 81           LDA    (gptr),Y         ;station
11527   C061  A0 02           LDY    #2
11528   C063  91 6B           STA    (STARTPTR),Y
11529   C065  A9 03           LDA    #3               ;type=special
11530   C067  A0 03           LDY    #3
11531   C069  91 6B           STA    (STARTPTR),Y
11532   C06B  A0 05           LDY    #5
11533   C06D  B1 81           LDA    (gptr),Y         ;duration
11534   C06F  A0 04           LDY    #4
11535   C071  91 6B           STA    (STARTPTR),Y
11536   C073  A0 06           LDY    #6
11537   C075  B1 81           LDA    (gptr),Y
11538   C077  A0 05           LDY    #5
11539   C079  91 6B           STA    (STARTPTR),Y
11540   C07B  C8              INY
11541   C07C  A9 00           LDA    #0               ;spares
11542   C07E  91 6B           STA    (STARTPTR),Y
11543   C080  C8              INY
11544   C081  91 6B           STA    (STARTPTR),Y
11545   C083  B2 81           lda    (gptr)           ;inc number of specials for this valve
11546   C085  AA              tax
11547   C086  FE 43 0F        inc    NSPEC,X
11548   C089  EE 36 OF        INC    NSTARTS          ;one more start saved
11549   C08C  20 C9 C0        jsr    calc_done        ;update DONETIME
11550   C08F  20 21 B4        JSR    NEXTSTART        ;move STARTPTR
11551
11552                 NEXTBLOCK:                       ;look at the next block
11553   C092  18              clc                     ;point to it
11554   C093  A5 81           lda    gptr
11555   C095  69 08           adc    #8
11556   C097  85 81           sta    gptr
11557   C099  A5 82           lda    gptr+1
11558   C09B  69 00           adc    #0
11559   C09D  85 82           sta    gptr+1
11560   C09F  EE BC 19        INC    gctr             ;any more?
11561   C0A2  AD BC 19        LDA    gctr
11562   C0A5  CD A3 0E        CMP    NSPECIAL
11563   C0A8  F0 03           BEQ    6S97             ;no, all done
11564   C0AA  4C D6 BF        JMP    6S10             ;yes, do next
11565
11566                 6S97:                            ;good exit
```

```
1567    C0AD   20 B0 C1              JSR     SORT            ;put starts in order
1568
1569                                          ;
1570
1571                         GENDONE:                         ;done
1572    C0B0   A9 00                 LDA     #0              ;no errors
1573    C0B2   8D B2 19              sta     gram+5
1574    C0B5   80 05                 bra     gexit
1575
1576                                                         ;generator errors
1577    C0B7   A9 01        GERR1:   LDA     #1              ;1=too many starts
1578    C0B9   8D B2 19              sta     gram+5
1579
1580    C0BC   68           gexit:   pla                     ;restore non-local vars
1581    C0BD   85 60                 sta     SUB             ;before returning
1582    C0BF   68                    pla
1583    C0C0   85 41                 sta     MSB
1584    C0C2   68                    pla
1585    C0C3   85 40                 sta     LSB
1586    C0C5   68                    pla
1587    C0C6   85 45                 sta     VALVE
1588    C0C8   60                    rts
1589
11590                        calc_done:                      ;set new DONETIME if this start
11591                                                        ;if > existing DONETIME
11592   C0C9   A0 00                 ldy     #0              ;donetime of current start =
11593   C0CB   B1 6B                 lda     (STARTPTR),y    ;starting time + duration
11594   C0CD   85 40                 sta     LSB
11595   C0CF   C8                    iny
11596   C0D0   B1 6B                 lda     (STARTPTR),y
11597   C0D2   85 41                 sta     MSB
11598   C0D4   18                    clc
11599   C0D5   A0 04                 ldy     #4
11600   C0D7   B1 6B                 lda     (STARTPTR),y
11601   C0D9   65 40                 adc     LSB
11602   C0DB   85 40                 sta     LSB
11603   C0DD   A0 05                 ldy     #5
11604   C0DF   B1 6B                 lda     (STARTPTR),y
11605   C0E1   65 41                 adc     MSB
11606   C0E3   85 41                 sta     MSB
11607                                                        ;is this >existing DONETIME?
11608   C0E5   A5 41                 lda     MSB
11609   C0E7   CD 38 0F              cmp     DONETIME+1
11610   C0EA                         blt     ?old
11613   C0EC   F0 02                 beq     ?1
11614   C0EE   80 09                 bra     ?new
11615   C0F0   A5 40        ?1:      lda     LSB
11616   C0F2   CD 37 0F              cmp     DONETIME
11617   C0F5                         blt     ?old
11620   C0F7   F0 0A                 beq     ?old
11621   C0F9   A5 40        ?new:    lda     LSB
11622   C0FB   8D 37 0F              sta     DONETIME
11623   C0FE   A5 41                 lda     MSB
11624   C100   8D 38 0F              sta     DONETIME+1
11625   C103   60           ?old:    rts
11626
11627
```

```
11628
11629                            6SC:                              ;generate syringe cycles
11630   C104   A9 01                     LDA     #1
11631   C106   85 60                     STA     SUB
11632   C108   EE 42 0F                  INC     NSYR
11633   C10B                             MOV16   NXTTIME,E
11639   C117   64 45                     stz     VALVE
11640   C119   E6 45            6SC1:    inc     VALVE            ;for valve = 1 to numsta
11641   C11B   A5 45                     lda     VALVE
11642   C11D   CD 3B 0B                  cmp     numsta
11643   C120                             blt     ?1
11646   C122   F0 03                     beq     ?1
11647   C124   4C 7A C1                  JMP     6SC5
11648
11649   C127   A6 45            ?1:      LDX     VALVE
11650   C129                             DBLX
11657   C12E   BD 4B 0E                  LDA     DUR2,X           ;if no duration, skip
11658   C131   1D 49 0E                  ORA     DUR2+1,X
11659   C134   F0 E3                     BEQ     6SC1
11660
11661   C136   BD 4B 0E                  LDA     DUR2,X           ;else WT=duration
11662   C139   8D 8F 19                  STA     WT
11663   C13C   BD 49 0E                  LDA     DUR2+1,X
11664   C13F   8D 90 19                  STA     WT+1
11665   C142                             MOV16   E,S              ;start=end of last one
11671   C14E                             ADD16   S,WT,E           ;end=start + WT, nothing can interfere
11680
11681   C161   18                        clc                      ;insert dead time
11682   C162   AD 8D 19                  lda     E
11683   C165   69 00                     adc     #dead_time
11684   C167   8D 8D 19                  sta     E
11685   C16A   AD 8E 19                  lda     E+1
11686   C16D   69 00                     adc     #0
11687   C16F   8D 8E 19                  sta     E+1
11688
11689   C172   20 25 C2         6SC3:    JSR     BUILD_START      ;make the start
11690   C175   90 A2                     BCC     6SC1             ;next valve
11691   C177   4C B7 C0                  JMP     6ERR1            ;oops, too many
11692                            6SC5:                             ;find next syringe time
11693   C17A                             ADD16   NXTTIME,SOFTEN,NXTTIME
11702   C18D   AD 92 19                  LDA     NXTTIME+1        ;if nxttime > end of syringes
11703   C190   CD 7C 0E                  CMP     SYRINGE_END+1
11704   C193                             BLT     6SC9
11707   C195   F0 02                     BEQ     6SC7
11708   C197   80 0A                     BRA     6SC8
11709   C199   AD 91 19         6SC7:    LDA     NXTTIME
11710   C19C   CD 7B 0E                  CMP     SYRINGE_END
11711   C19F                             BLT     6SC9
11714   C1A1   F0 0A                     BEQ     6SC9
11715   C1A3   A9 FF            6SC8:    LDA     #$FF             ;then no more
11716   C1A5   8D 92 19                  STA     NXTTIME+1
11717   C1A8   A9 FF                     LDA     #$FF
11718   C1AA   8D 91 19                  STA     NXTTIME
11719   C1AD   4C 11 BD         6SC9:    JMP     6ENXT            ;go back to base watering
11720
11721
11722
```

```
1723                          SORT:                       ;sorts NSTARTS start times at STARTS
1724                                                      ;into chronological order
1725                                                      ;on exit, STARTPTR points to last start
1726   C1B0                          LDW    STARTPTR,STARTS
1732   C1B9  64 40                   STZ    LSB            ;clear interchange flag
1733   C1BA  AD 36 0F                LDA    NSTARTS
1734   C1BD  F0 5A                   BEQ    S020
1735   C1BF  8D BC 19                STA    gctr           ;# of swaps=# of starts -1
1736   C1C2  CE BC 19                DEC    gctr
1737   C1C5  F0 52                   BEQ    S020
1738   C1C7  A0 01            S00:   LDY    #1             ;is most sig byte less?
1739   C1C9  B1 6B                   LDA    (STARTPTR),Y
1740   C1CB  A0 09                   LDY    #9
1741   C1CD  D1 6B                   CMP    (STARTPTR),Y
1742   C1CF                          BLT    S02            ;yes, don't swap
11745  C1D1  F0 02                   BEQ    S01            ;same, look at least sig
11746  C1D3  80 0C                   BRA    SWAP           ;no, swap
11747  C1D5  A0 00            S01:   LDY    #0             ;is least sig byte less?
11748  C1D7  B1 6B                   LDA    (STARTPTR),Y
11749  C1D9  A0 08                   LDY    #8
11750  C1DB  D1 6B                   CMP    (STARTPTR),Y
11751  C1DD                          BLT    S02            ;yes, don't swap
11754  C1DF  F0 22                   BEQ    S02            ;same, don't swap
11755  C1E1                   SWAP:  SET    LSB            ;swap the pair
11759  C1E5  A0 00                   LDY    #0
11760  C1E7  B1 6B            S010:  LDA    (STARTPTR),Y   ;push both starts
11761  C1E9  48                      PHA
11762  C1EA  C8                      INY
11763  C1EB  C0 10                   CPY    #16
11764  C1ED  D0 F8                   BNE    S010
11765  C1EF  A0 07                   LDY    #7             ;pull 2nd start into 1st location
11766  C1F1  68               S011:  PLA
11767  C1F2  91 6B                   STA    (STARTPTR),Y
11768  C1F4  88                      DEY
11769  C1F5  C0 FF                   CPY    #$FF
11770  C1F7  D0 F8                   BNE    S011
11771  C1F9  A0 0F                   LDY    #15            ;pull 1st start into 2nd location
11772  C1FB  68               S012:  PLA
11773  C1FC  91 6B                   STA    (STARTPTR),Y
11774  C1FE  88                      DEY
11775  C1FF  C0 07                   CPY    #7
11776  C201  D0 F8                   BNE    S012
11777  C203  18               S02:   CLC                   ;point to next start in list
11778  C204  A5 6B                   LDA    STARTPTR
11779  C206  69 08                   ADC    #8
11780  C208  85 6B                   STA    STARTPTR
11781  C20A  A5 6C                   LDA    STARTPTR+1
11782  C20C  69 00                   ADC    #0
11783  C20E  85 6C                   STA    STARTPTR+1
11784  C210  CE BC 19                DEC    gctr
11785  C213  D0 B2                   BNE    S00            ;sort until list is finished
11786  C215  A5 40                   LDA    LSB            ;were all starts in order?
11787  C217  D0 97                   BNE    SORT           ;no, go through again
11788  C219  60               S020:  RTS
11789
11790
1791                          FIRSTSTART:                  ;set pointers to beginning of obj starts
```

```
1792    C21A                              LDW    STARTPTR,STARTS
1798    C222    64 6D                     STZ    STARTCTR
1799    C224    60                        RTS
1800
1801
1802                              ;       Title: build start
1803                              ;
1804                              ;       Purpose: Create a start at STARTPTR
1805                              ;
1806                              ;       Entry: S, WT, VALVE
1807                              ;              SUB (0=base, 1=syringe, 2=soak, 3=special)
1808                              ;              NSTARTS, STARTPTR
1809                              ;
1810                              ;       Exit:  Carry set if no more room
1811                              ;              start created at STARTPTR:
11812                             ;                     byte 0 = lsb of time
11813                             ;                     byte 1 = msb of time
11814                             ;                     byte 2 = valve # (0-7)
11815                             ;                     byte 3 = type of start (same as SUB above)
11816                             ;                     byte 4 = lsb of duration
11817                             ;                     byte 5 = msb of duration
11818                             ;                     byte 6,7 = spares
11819                             ;              NSTARTS incremented
11820                             ;              STARTPTR points to next avail start
11821                             ;              DONETIME updated
11822                             ;
11823                             ;       RAM used: none
11824
11825   C225                      BUILD_START:
11826   C225    AD 36 0F                  LDA    NSTARTS
11827   C228    C9 80                     CMP    #128
11828   C22A                              BLT    ?1
11831   C22C    38                        SEC
11832   C22D    60                        RTS
11833   C22E    A0 00             ?1:     LDY    #0              ;build a start
11834   C230    AD 8B 19                  LDA    S               ;start time
11835   C233    91 6B                     STA    (STARTPTR),Y
11836   C235    C8                        INY
11837   C236    AD 8C 19                  LDA    S+1
11838   C239    91 6B                     STA    (STARTPTR),Y
11839   C23B    C8                        INY
11840   C23C    A5 45                     LDA    VALVE           ;valve
11841   C23E    91 6B                     STA    (STARTPTR),Y
11842   C240    C8                        INY
11843   C241    A5 60                     LDA    SUB             ;type byte
11844   C243    91 6B                     STA    (STARTPTR),Y
11845   C245    C8                        INY
11846   C246    AD 8F 19                  LDA    WT              ;duration
11847   C249    91 6B                     STA    (STARTPTR),Y
11848   C24B    C8                        INY
11849   C24C    AD 90 19                  LDA    WT+1
11850   C24F    91 6B                     STA    (STARTPTR),Y
11851   C251    C8                        INY
11852   C252    A9 00                     LDA    #0              ;spares
11853   C254    91 6B                     STA    (STARTPTR),Y
11854   C256    C8                        INY
11855   C257    91 6B                     STA    (STARTPTR),Y
```

```
1851  C113  EE 36 0F                INC    NSTARTS      ;one more start saved
1852  C116  20 C9 C0                jsr    calc_done    ;update DONETIME
1853  C119  20 21 B4                JSR    NEXTSTART    ;move STARTPTR
1854  C11C  18                      CLC
1855  C11D  60                      RTS 1856
1857
1858                        ;   Title: point
1859                        ;
1860                        ;   Purpose: Find next start to do in daily schedule
1861                        ;
1862                        ;   Entry: Real time clock, daily schedule
1863                        ;
1864                        ;   Exit:  STARTPTR points to next avail start
1865                        ;          carry set if done
1866                        ;   RAM used:  STARTPTR, STARTCTR
1867
1868                        POINT:               ;point to next real time start
1869
1870  C264  20 1A C2                JSR    FIRSTSTART   ;put pointer at beginning
1871  C267  A5 6D           ?0:     LDA    STARTCTR     ;see if any more starts
1872  C269  CD 36 0F                CMP    NSTARTS
1873  C26C  F0 19                   BEQ    ?nomore      ;nope, we missed the whole day
1874  C26E  A0 01                   LDY    #1           ;see if current time
1875  C270  B1 6B                   LDA    (STARTPTR),Y ;is < start time
1876  C272  C5 64                   CMP    WATERCLK+1
1877  C274  F0 04                   BEQ    ?1
1878  C276                          BLT    ?2
1879  C278  80 0B                   BRA    ?done
1880  C27A  B2 6B           ?1:     LDA    (STARTPTR)
1881  C27C  C5 63                   CMP    WATERCLK
1882  C27E                          BGE    ?done
1883  C280  20 21 B4        ?2:     JSR    NEXTSTART    ;start was < current time,
1884  C283  80 E2                   BRA    ?0           ;look at next one
1885  C285  18              ?done:  clc
1886  C286  60                      rts
1887  C287                  ?nomore:
1888  C287  38                      sec
1889  C289  60                      rts

1906  C289                          INCLUDE   INT.ASM

;-------------------------------------
                            ;   TABLES
                            ;-------------------------------------

1912  C289                  terrain_tbl:
1913  C289  0000 0000 0000          WORD   MSG215,MSG216,MSG217,MSG218,MSG219,MSG220
      C28F  0000 0000 0000
1914  C295                  sprink_tbl:
1915  C295  0000 0000 0000          WORD   MSG221,MSG222,MSG223,MSG224,MSG225,MSG226,MSG227
```

```
        C29B  0000 0000 0000
        C2A1  0000
11916
11917   C2A3  00              DAYTBL: BYTE   0                       ;number of days in each month
11918   C2A4  1F                      BYTE   31                      ;JAN
11919   C2A5  1C                      BYTE   28                      ;FEB
11920   C2A6  1F                      BYTE   31                      ;MAR
11921   C2A7  1E                      BYTE   30                      ;APR
11922   C2A8  1F                      BYTE   31                      ;MAY
11923   C2A9  1E                      BYTE   30                      ;JUN
11924   C2AA  1F                      BYTE   31                      ;JUL
11925   C2AB  1F                      BYTE   31                      ;AUG
11926   C2AC  1E                      BYTE   30                      ;SEP
11927   C2AD  1F                      BYTE   31                      ;OCT
11928   C2AE  1E                      BYTE   30                      ;NOV
11929   C2AF  1F                      BYTE   31                      ;DEC
11930
11931                         SSTBL:                                 ;128 byte virtual eeprom area
11932   C2B0  00 00 00 00 00          BYTE   0,0,0,0,0,0,0,0,0       ;controller name
11933   C2B9  00 00 00 00 00          BYTE   0,0,0,0,0,0,0,0,0,0     ;passwords disabled
11934   C2C3  A4 01 05 00             BYTE   $A4,$1,5,0              ;factory, 5m @ 7:00
11935   C2C7  00                      BYTE   0                       ;default valve ID table
11936   C2C8  00                      BYTE   00000000B               ;valve 1, position 0, +
11937   C2C9  09                      BYTE   00001001B               ;valve 2, position 1, +
11938   C2CA  12                      BYTE   00010010B               ;valve 3, position 2, +
11939   C2CB  1B                      BYTE   00011011B               ;valve 4, position 3, +
11940   C2CC  24                      BYTE   00100100B               ;valve 5, position 4, +
11941   C2CD  2D                      BYTE   00101101B               ;valve 6, position 5, +
11942   C2CE  36                      BYTE   00110110B               ;valve 7, position 6, +
11943   C2CF  3F                      BYTE   00111111B               ;valve 8, position 7, +
11944   C2D0  00 00 00 00 00          BYTE   0,0,0,0,0,0,0,0,0       ;sensor ID
11945   C2D9  00 00 00 00 00          BYTE   0,0,0,0,0,0,0,0,0       ;terrain
11946   C2E2  00 00 00 00 00          BYTE   0,0,0,0,0,0,0,0,0       ;sprinkler types
11947   C2EB  08                      BYTE   8                       ;8 stations
11948   C2EC  00                      BYTE   0                       ;no pump
11949   C2ED  00 00 00 00 00          BYTE   0,0,0,0,0,0,0,0,0,0,0,0,0 ;spares
11950   C2FA  00 00 00 00 00          byte   0,0,0,0,0,0,0,0,0
11951   C304  00 00 00 00 00          BYTE   0,0,0,0,0,0,0,0,0
11952   C30D  00 00 00 00 00          BYTE   0,0,0,0,0,0,0,0,0
11953   C316  00 00 00 00 00          BYTE   0,0,0,0,0,0,0,0,0
11954   C31F  00 00 00 00 00          BYTE   0,0,0,0,0,0,0,0,0
11955   C328  00 00 00 00 00          byte   0,0,0,0,0,0,0,0
11956
11957                         RUNTBL:                                 ;executive params
11958   C330  00 00 00                BYTE   0,0,0                   ;main pgm
11959   C333  00 00 64                BYTE   0,0,100                 ;no rain delay, use yearly budget of 100%
11960   C336  07 1E 32 3C 46          BYTE   7,30,50,60,70,80,90,100,90,70,50,30,30  ;mo budgets
11961   C343  64                      BYTE   100                     ;fine tuning budget
11962   C344  01 00 01 00             BYTE   1,0,1,0                 ;daynum = 1st day, 1st week
11963   C348  01 00 01 00             BYTE   1,0,1,0                 ;special daynum
11964   C34C  00 00 00 00 00          BYTE   0,0,0,0,0               ;spares
11965                                                                ;run params
11966   C351  00 01 01 01 01          BYTE   0,1,1,1,1,1,1,1,1       ;all valves enabled
11967   C35A  00 00                   BYTE   0,0                     ;new time
11968   C35C  00 01                   BYTE   0,1                     ;idle
11969   C35E  00 00 00 00             BYTE   0,0,0,0                 ;spares
11970
```

```
1971   C362  4D 54 57 54 46   SDTBL:    BYTE    'MTWTFSS'
1972
1973   C369  20 4A 46 4D 41   MONTBL:   BYTE    ' JFMAMJJASOND'
1974
1975                          CBTBL:                                     ;cycle byte specific days
1976   C376  80                         BYTE    10000000B                ;bit not used
1977   C377  40                         BYTE    01000000B                ;Mon
1978   C378  20                         BYTE    00100000B                ;Tue
1979   C379  10                         BYTE    00010000B                ;Wed
1980   C37A  08                         BYTE    00001000B                ;Thur
1981   C37B  04                         BYTE    00000100B                ;Fri
1982   C37C  02                         BYTE    00000010B                ;Sat
1983   C37D  01                         BYTE    00000001B                ;Sun
1984
1985                          TYPETBL:                                   ;start type for set ups
11986  C37E  00                         BYTE    0
11987  C37F  E0                         BYTE    11100000B                ;mini
11988  C380  E0                         BYTE    11100000B                ;normal
11989  C381  E0                         BYTE    11100000B                ;special
11990  C382  E0                         BYTE    11100000B                ;ration
1991   C383  81                         BYTE    10000001B                ;add-on soak
1992   C384  82                         BYTE    10000010B                ;add-on syringe
1993
1994                          BITON:                                     ;use OR to turn bit on
1995   C385  01                         BYTE    00000001B                ;bit 0
1996   C386  02                         BYTE    00000010B
1997   C387  04                         BYTE    00000100B
1998   C388  08                         BYTE    00001000B
1999   C389  10                         BYTE    00010000B
2000   C38A  20                         BYTE    00100000B
2001   C38B  40                         BYTE    01000000B
2002   C38C  80                         BYTE    10000000B
2003
2004                          BITOFF:                                    ;use AND to turn bit off
2005   C38D  FE                         BYTE    11111110B                ;bit 0
2006   C38E  FD                         BYTE    11111101B
2007   C38F  FB                         BYTE    11111011B
2008   C390  F7                         BYTE    11110111B
2009   C391  EF                         BYTE    11101111B
2010   C392  DF                         BYTE    11011111B
2011   C393  BF                         BYTE    10111111B
2012   C394  7F                         BYTE    01111111B
2013
2014
2015                          CONTRAST_TBL:                              ;contrast for LCD
2016   C395  00 08 04 00                BYTE    0,8,4,0
2017
2018                          MINOFFTBL:                                 ;minimum OFF times for terrain
2019   C399  1E 1E 1E 1E 1E             BYTE    30,30,30,30,30,30
2020
2021                          MAXONTBL:                                  ;maximum ON times for sprinkler type,
2022   C39F  03 03 06 03 03             BYTE    3,3,6,3,3,2              ;and terrain
2023   C3A5  05 05 09 05 05             BYTE    5,5,9,5,5,3
2024   C3AB  08 08 10 08 08             BYTE    8,8,16,8,8,5
2025   C3B1  08 08 10 08 08             BYTE    8,8,16,8,8,5
2026   C3B7  0A 0A 14 0A 0A             BYTE    10,10,20,10,10,7
2027   C3BD  05 05 09 05 05             BYTE    5,5,9,5,5,3
```

```
2028   C3C3   1E 1E 3C 1E 1E          BYTE    30,30,60,30,30,30
2029
2030                          SOAKDURTBL:                                     ;Soak durations for sprinkler type,
2031   C3C9   1500 1500 2400          WORD    21,21,36,36,48,32               ;and terrain
       C3CF   2400 3000 2000
2032   C3D5   2300 2300 3600          WORD    35,35,54,60,80,48
       C3DB   3C00 5000 3000
2033   C3E1   3800 3800 6000          WORD    56,56,96,96,128,80
       C3E7   6000 8000 5000
.2034  C3ED   3800 3800 6000          WORD    56,56,96,96,128,80
       C3F3   6000 8000 5000
.2035  C3F9   4600 4600 7800          WORD    70,70,120,120,160,112
       C3FF   7800 A000 7000
.2036  C405   2300 2300 3600          WORD    35,35,54,60,80,48
       C40B   3C00 5000 3000
12037  C411   D200 D200 6901          WORD    210,210,360,360,480,480
       C417   6801 E001 E001
12038
12039
12040
12041                         BUDGETTBL:                                      ;default monthly budgets (bell curve)
12042  C41D   64 5A 46 32 1E          BYTE    100,90,70,50,30,30,30,50,60,70,80,90
12043
.2044
.2045
12046                         ;----------------------------------
.2047                         ;    INTERRUPT ROUTINE
.2048                         ;----------------------------------
.2049
.2050                         ;INT reloads the TIMER to generate the next INT
.2051
.2052                         ;These are the tasks of the interrupt:
.2053                         ;    Decrement a generic down counter
12054                         ;    Service the key manager
12055                         ;    Service the display manager
12056
.2057
12058  C429   48       INTR:  PHA                     ;interrupt service routine (TIMER)
12059  C42A   DA              PHX                     ;save registers
12060  C42B   5A              PHY
12061
12062  C42C   C6 43           DEC     TIMCTR          ;decrement down counter
12063  C42E   C6 44           DEC     TIMCTR2
12064  C430   C6 54           DEC     SECCTR+1        ;decrement seconds counter
12065  C432   D0 06           BNE     ?1
12066  C434   C6 53           DEC     SECCTR
12067  C436   A9 19           LDA     #PERSEC
12068  C438   85 54           STA     SECCTR+1
12069
12070  C43A   20 00 00   ?1:  jsr     R1_display_irq  ;update display
12071  C43D   20 00 00        jsr     R1_display_update
12072
12073  C440   20 00 00        jsr     R2_key_update   ;update key manager
12074
12075  C443   20 00 00        jsr     game_irq_service ;service game if active
12076  C446   20 00 00        jsr     monitor_irq_service
12077
```

```
2078  C449  20 00 00            jsr     R4_timer_start  ;restart TIMER
2079
2080  C44C  7A                  PLY                     ;restore registers
2081  C44D  FA                  PLX
2082  C44E  68                  PLA
2083  C44F  40                  RTI
2084
2085  C450  40          NMIINT: RTI                     ;never happens
2086
2087
2088                            ;------------------------------------
2089                            ;    BANK SWITCH CODE
2090                            ;------------------------------------
2091
2092  FFE0                      ORG     $FFE0
2093
2094  FFE0              to_bank1:
2095  FFE0  78                  sei
2096  FFE1  48                  pha
2097  FFE2  A9 10               lda     #00010000b
2098  FFE4  85 1D               sta     E2
2099  FFE6  68                  pla                     ;gone to bank 1
2100  FFE7  4C 00 00            jmp     0000            ;
2101                                                    ;
2102                    from_bank1:                     ; (this code never executes)
2103  FFEA  64 1D               stz     E2              ;
2104  FFEC  58                  cli                     ;back in bank 0
2105  FFED  60                  rts
2106
2107
2108                            ;------------------------------------
2109                            ;    VECTORS
2110                            ;------------------------------------
2111  FFF5                      ORG     $FFF5
2112  FFF5              pversion:
2113  FFF5  33 2E 30 36 00      BYTE    '3.06',0        ;version #
2114
2115  FFFA                      ORG     0FFFAH
2116  FFFA  50C4                WORD    NMIINT
2117  FFFC  0080                WORD    RESET
2118  FFFE  29C4                WORD    INTR
2119
2120
2121
2122
2123
2124  0000                      END
```

What is claimed is:

1. A manually operable interface to a machine comprising:

a display for displaying a hierarchy of messages, one message at a time step-wise sequentially among a plurality of messages at each of a plurality of levels of the hierarchy;

a manually actuable first-direction sequencing switch manually actuable for causing the display to step-wise sequentially display each of the plurality of messages at one level of the hierarchy in a first direction in response to each actuation;

a manually actuable adoption switch manually actuable at a time after a desired one of the plurality of messages at the one level of the hierarchy has been displayed for causing (i) an adoption and use of the currently displayed message by the machine and (ii) the display to display messages from another hierarchical level having a selected relationship to said currently displayed message in order to effect branching within the hierarchal tree of messages without ever leaving the hierarchal tree; and a manually actuable second-direction sequencing switch manually actuable for causing the display to step-wise sequentially display each of the plurality of messages at one level of the hierarchy in a second direction in response to each actuation.

2. The interface according to claim 1 further comprising:

a manually actuable help switch manually actuable for causing the display to display a new message associated with a currently displayed message.

3. The interface according to claim 2 further comprising:

an instructional means for causing during a time period the display to display a plurality of instructional messages that (i) induce manual actuation of each of the first-direction sequencing switch, the adoption switch, the second-direction sequencing switch, and the help switch, and that (ii) require a particular one of these induced manual actuations to be performed in turn before the display will display a next sequential one of the plurality of instructional messages.

4. In a machine that interfaces to a man for alternative control and data entry having a control state having a hierarchy of control levels, the machine being capable of accepting selected commands at each control level associated with the control level for effecting control of the machine, and an alternative related data entry state having a hierarchy of data entry levels, the machine being capable of accepting selected ones of an plurality of datums at each data entry level associated with the data entry level for effecting entry of data into the machine; an improved man/machine interface for controlling and entering data into the multi-stated multi-level hierarchical machine, the interface comprising:

a display for displaying in the control state of the machine, and at one control level of the control state, a one of the commands associated with this control level, one command at a time, and for displaying in the data entry state of the machine, and at one data entry level of the data entry state, a one of the datums associated with the data entry level, one datum at a time;

a manually actuable first selection switch for causing the display to sequentially display in the control state of the machine and at a selected control level of this control state, commands associated with this one control level in a first direction in an endless loop and - for causing the display to sequentially display in the data entry state of the machine and at a selected data entry level of this data entry state, datums associated with this one data entry level in the first direction in an endless loop;

a manually actuable adoption switch for causing the machine to accept and adopt, in the control state of the machine, the currently displayed command, for causing the machine to accept and adopt, in the data entry state of the machine, the currently displayed datum, and for causing the display to advance to a next state as a function of a predetermined relationship to the currently displayed command or datum; and a manually actuable second selection switch for causing the display to sequentially display, (i) in the control state of the machine at a selected control level of this control state, commands associated with the selected control level stepwise in a second direction in an endless loop and, (ii) in the data entry state of the machine at some one data entry level of this data entry state, the currently displayed datum stepwise in a second direction in an endless loop of the datums associated with this one data entry level.

5. The interface according to claim 4 wherein the display comprises:

a display for further displaying context-sensitive help messages, each of which help messages is relevant to some selected ones of the commands and the datums, one help message at a time; and wherein the interface further comprises:

a manually actuable help switch for effecting display a help message that is associated with, currently displayed command or datum.

6. The interface according to claim 4 in a machine further having a help state having a multiplicity of context-sensitive help messages each of which is relevant to selected ones of the commands and the datums, and wherein the display comprises:

a help message display for displaying context-sensitive help messages, one help message at a time; and wherein the manually actuable first selection switch comprises:

a manually actuable pushbutton switch for further causing the display to advance, in the help state of the machine, the currently displayed help message stepwise in a first direction.

7. The interface according to claim 4 in a machine further having a help state having a multiplicity of context-sensitive help messages each of which is relevant to some selected or ones of the commands and the datums, the display comprises:

a help message display means for displaying one at a time context-sensitive help messages, each of which help messages is relevant to selected ones of the commands, the datums and the help messages themselves; wherein the manually actuable first selection switch comprises:

a manually actuable pushbutton switch for further causing the display to advance, in the help state of the machine, the currently displayed help message stepwise in a first direction; and wherein the interface further comprises:

a manually actuable help switch for causing the display to display a help message that is associated, in the control state of the machine at some one control level, with the currently displayed command and, in the data entry state of the machine at some one data entry level, with the currently displayed datum and, in the help state of the machine, with the currently displayed help message.

8. An interface to a machine for use by a man comprising:

a display for displaying each of a multiplicity of datums one datum at a time, and for alternatively displaying each of a multiplicity of explanatory messages associated with the multiplicity of datums one message at a time;

a manually actuable adoption switch for causing the machine to adopt and use a currently displayed one of the multiplicity of datums;

a manually actuable selection switch for causing the display to display a next one of the multiplicity of datums; and a manually actuable help switch for causing the display to display a one of the multiplicity of messages associated with a currently-displayed one of the multiplicity of datums; and for thereafter causing the display to automatically redisplay said currently-displayed one of the multiplicity of datums.

9. The interface according to claim 8 wherein the multiplicity of datums are in the form of a multiplicity of questions;

wherein the multiplicity of messages associated with the multiplicity of questions are in the form of a multiplicity of explanations of the associated questions.

10. A manually operable interface to a machine comprising:

a display for displaying, from a multiplicity of messages that are organized in a hierarchal tree having a plurality of messages at each of a plurality of hierarchical levels, one message at a time from a plurality of messages at a selected hierarchical level in a continuous loop;

a first stepping switch manually actuable for causing the display to step in a first direction through the plurality of messages that at the one hierarchal level, one message at a time;

an adoption switch, manually actuable for a selected time after manual actuation of the first stepping switch, for causing adoption and use by the machine of the currently displayed message and the display to advance to displaying further messages, one message at a time, at a next hierarchical level having a selected relationship to the one hierarchical level; and a second stepping switch manually actuable for causing the display to step in a second direction, opposite to the first direction, through its currently displayed plurality of messages, one message at a time;

wherein the adoption switch is actuable for a selected time after manual actuation of the first stepping switch and the second stepping switch.

11. The interface according to claim 10 further comprising:

a help switch, manually actuable alternatively to the first stepping switch and the second stepping switch and the adoption switch, for causing the display to display a message that is associated with the currently displayed message.

12. A man-machine interface comprising:

a display for displaying each of a multiplicity of datums one at a time, and for alternatively displaying each of a multiplicity of messages associated with the previously displayed datum;

a manually actuable selection switch;

means responsive to actuation of said selection switch for effecting selection and use of a currently displayed one of said multiplicity of datums;

a manually actuable advance switch;

means responsive to actuation of said advance switch for effecting display by said display of a next one of said multiplicity of datums;

a manually actuable help switch; and means responsive to actuation of said help switch to effect display by said display of one of said multiplicity of messages corresponding to the previously displayed one of said multiplicity of datums, and for subsequently displaying said datum after actuation of said manually actuable selection switch.

13. The interface according to claim 12 wherein each of said multiplicity of datums is in the form of a question; and wherein each of said multiplicity of messages is associated with one of said datums and includes an explanation thereof.

14. An interface to a machine for use by a man comprising:

a display (i) for displaying a multiplicity of datums that are organized in a hierarchal tree having a plurality of datums at each of a plurality of levels between a root level and leaf level, one datum at a time, and (ii) for displaying, at other times to the multiplicity of datums, a multiplicity of messages that are associated with the multiplicity of datums, this displaying of a multiplicity of messages also being one at a time;

a first manually actuable switch for causing the display to sequentially display the plurality of datums that are upon a one hierarchal level in an endless loop, commencing at root level and proceeding step-wise one datum at a time;

a second manually actuable switch for causing, at such times as the display is displaying a one of the multiplicity of datums, (i) adoption and use by the machine of a currently displayed one of the multiplicity of datums, and (ii) the display to branch to displaying a plurality of datums that are upon a next hierarchal level to the hierarchal level of a the currently-displayed one of the plurality of datums;

a third manually actuable switch for causing the display to display a one of the multiplicity of messages that is associated with a currently-displayed one of the multiplicity of datums, after which display an actuation of the second manually actuable switch will cause the display to return to redisplaying said currently-displayed one of the multiplicity of datums.

15. An interface to a machine for use by a man comprising:

a display for displaying a multiplicity of datums one at a time;

a first manually actuable switch for causing the display to step-wise sequentially advance in its one-at-a-time displaying of the multiplicity of datums in a first direction;

a second manually actuable switch for causing the machine to adopt and use a currently-displayed one of the multiplicity of datums; and a third manually actuable switch for causing the display to step-wise sequentially advance in its one-at-a-time displaying of the multiplicity of datums in a second direction.

16. The interface according to claim 15 wherein the display is for displaying a multiplicity of datums organized in a hierarchy having a plurality of datums upon a plurality of levels;

wherein the first and the third manually actuable switches are for causing the display to step-wise advance in a one-at-a-time displaying of a plurality of datums that are upon a single hierarchal level in an endless loop; and wherein the second manually actuable switch is further for causing the display to progress to displaying a plurality of datums that are upon a next hierarchal level to the hierarchal level of the currently-displayed one of the plurality of datums.

17. The interface according to claim 15 wherein the display is further for displaying, at other times to the multiplicity of datums, a multiplicity of messages that are associated with the multiplicity of datums, this displaying of a multiplicity of messages also being one at a time; and wherein the interface further comprises:

a fourth manually actuable switch for causing the display to display a one of the multiplicity of messages that is associated with a currently-displayed one of the multiplicity of datums, after which display actuations of the first and the third manually actuable switches will cause the display to return to redisplay said currently-displayed one of the multiplicity of datums.

18. An interface to a machine for use by a man comprising:

a display for displaying a multiplicity of datums one at a time, and at other times a multiplicity of messages that are associated with the multiplicity of datums also one at a time;

a manually actuable advancing switch for causing the display to step-wise advance in its one-at-a-time displaying of the multiplicity of datums, or from a displayed one of the multiplicity of messages back to redisplaying of an associated one of the multiplicity of datums, as the case may be;

a manually actuable adoption switch for causing the machine to adopt and use a currently-displayed one of the multiplicity of datums; and a manually actuable help switch for causing the display to display a one of the multiplicity of messages that is associated with a currently displayed one of the multiplicity of datums.

19. The interface according to claim 18 wherein the display is for displaying a multiplicity of datums in the form of a multiplicity of questions, and at other times a multiplicity of messages each in the form of an explanation to an associated one of the multiplicity of questions.

20. The interface according to claim 18 wherein the display is for further displaying a multiplicity of datums organized in a hierarchy having a plurality of datums upon a plurality of levels;

wherein the manually actuable advancing switch is further for causing the display to automatically advance in its one-at-a-time displaying among a plurality of datums that are upon a single hierarchal level in an endless loop; and wherein the manually actuable adoption switch is further for causing the display to progress to displaying a plurality of datums that are upon a next hierarchal level to the hierarchal level of the currently-displayed one of the plurality of datums.

21. A method of query-response programming of complex sequences comprising:

organizing the complex sequences into a hierarchy of a multiplicity of questions, the hierarchy of questions consisting of a first plurality of questions at a first, root, level, with at least some of these first plurality of questions having an associated second plurality of questions, with some ones of these second plurality of questions having an associated third plurality of questions and so on, the complex sequences being entirely broken down into a hierarchal tree of questions ranging from broader questions at the root level to more specific questions of the leaf level;

cyclically displaying each successive plurality, starting with the first, of questions to a human user/programmer, the user/programmer permissively adopting for each single question displayed one of the options of a. selecting an advance response, in which case the cyclically displayed question will advance to the next successive question in the same hierarchal plurality, and so on in an endless loop while the premise or the article of the currently displayed question is not adopted;

b. selecting an OK response meaning that the premise or article of the currently-displayed question is adopted, in which case IF the currently-displayed question is not of a leaf-level plurality of questions THEN progressing to a next associated plurality of questions and proceeding to the cyclically displaying of this plurality of questions ELSE IF the currently-displayed question is of a leaf level plurality of questions THEN returning to the cyclically displaying of the first plurality of questions; and c. selecting a HELP response, meaning help is requested, that will result in temporary display of a context sensitive help message explaining to the user/programmer the responses that are being elicited by the currently cyclically displayed plurality of questions and how the user/programmer may evoke these responses.

22. The method according to claim 21 wherein continuously performing a.) selecting an advance response causes not only that the displayed question will immediately cycle to the next successive question but that, the a.) selecting an advance response being continued, the displayed question will cycle to still another successive question at the expiration of a reduced latency time, this faster cycling thereafter being continued until, and unless, the a.) selecting an advanced response is ceased.

23. The method according to claim 21 wherein adoption of the user programmer of the displayed option b.) selecting an OK response results in the further step comprising:

displaying a confirmation message to the user/programmer showing the particular question/response adopted by act of the user/programmer's b.) selecting an OK response until the user/programmer adopts a one of the options of b1. selecting again the OK response, herein meaning that the currently displayed confirmation message is adopted, in which case IF further questions/responses of the same plurality of questions/responses remain unanswered and are potentially adoptable THEN returning to the display of successive further ones of the same plurality of questions/responses ELSE IF no further questions/responses of the same plurality of questions/ responses remain unanswered and adoptable THEN returning to the cyclically displaying of the first plurality of questions/responses; and b2. selecting the advance response, herein meaning that the currently displayed confirmation message is not adopted, in which case the displayed question/response will ultimately return to that question/response for which, when previously displayed, the programmer/user did adopt the option b.) selecting an OK response.

24. A man-machine interface for manually controlling and entering data into a programmable machine, the interface comprising:
- a display for sequentially displaying each of a multiplicity of all available control options for the machine in loops, each containing a plurality of control options, and for separate times sequentially displaying a multiplicity of all available datum options one datum option at a time in a loop containing a plurality of datum options associated with a particular control option;
- a first-direction step-wise sequencing switch actuable by a man for causing the display to step-wise sequence in a first direction (1) its display of the multiplicity of control options, and (2) its display of the multiplicity of datum options, as a function that either (1) the loop of control options or (2) the loop of datum options is currently displayed;
- a second-direction step-wise sequencing switch actuable by a man for causing the display to step-wise sequence in a second direction (1) its display of the multiplicity of control options, and (2) its display of the multiplicity of datum options, as a function that either the (1) loop of control options or (2) the loop of data options is currently displayed;
- wherein the displaying of the display, and the causing of the selection switch shifts back and forth between loops of pluralities of control options and pluralities of datum options;
- wherein all control options and all datum options that the machine can accept are displayed by the display in response to actuation of the sequencing switch and are adopted in response to actuation of the selection switch.

25. The man-machine interface according to claim 24 further comprising:
- a help switch actuable by a man for causing the display to next display a help message that is associated with a currently-displayed one of the multiplicity of control options and the multiplicity of datum options, after which interruption the display returns, under control of the first-direction and the second-direction step sequencing switches to step-wise sequencing its display of the multiplicity of control options and the multiplicity of datum options.

26. The man-machine interface according to claim 24 wherein the control options displayed by the display are in the form of questions.

* * * * *